US011902253B2

(12) United States Patent
Shribman et al.

(10) Patent No.: US 11,902,253 B2
(45) **Date of Patent: *Feb. 13, 2024**

(54) SYSTEM AND METHOD FOR MANAGING NON-DIRECT URL FETCHING SERVICE

(71) Applicant: BRIGHT DATA LTD., Netanya (IL)

(72) Inventors: Derry Shribman, Tel Aviv (IL); Ofer Vilenski, Moshav Hadar Am (IL)

(73) Assignee: BRIGHT DATA LTD., Netanya (IL)

( * ) Notice: Subject to any disclaimer, the term of this patent is extended or adjusted under 35 U.S.C. 154(b) by 201 days.

This patent is subject to a terminal disclaimer.

(21) Appl. No.: 17/572,020

(22) Filed: Jan. 10, 2022

(65) Prior Publication Data

US 2022/0158978 A1 May 19, 2022

Related U.S. Application Data

(63) Continuation of application No. 17/599,584, filed as application No. PCT/IL2020/050335 on Mar. 20, 2020, now Pat. No. 11,411,922.

(Continued)

(51) Int. Cl.

*H04L 29/06* (2006.01)
*H04L 9/40* (2022.01)
*G06F 16/955* (2019.01)

(52) U.S. Cl.

CPC ........ *H04L 63/0272* (2013.01); *G06F 16/955* (2019.01); *G06F 16/9566* (2019.01); *H04L 63/029* (2013.01)

(58) Field of Classification Search

None

See application file for complete search history.

(56) References Cited

U.S. PATENT DOCUMENTS

| | | | |
|---|---|---|---|
| 3,962,539 | A | 6/1976 | Ehrsam et al. |
| 4,347,827 | A | 9/1982 | Cascio |

(Continued)

FOREIGN PATENT DOCUMENTS

| | | | |
|---|---|---|---|
| CA | 2328548 | A1 | 6/2002 |
| CA | 2353623 | A1 | 1/2003 |

(Continued)

OTHER PUBLICATIONS

RFC 3089, entitled: “A SOCKS-based IPv6/IPv4 Gateway Mechanism”, Apr. 2001 (12 pages).

(Continued)

*Primary Examiner* — Shin-Hon (Eric) Chen

(74) *Attorney, Agent, or Firm* — May Patents Ltd. c/o Dorit Shem-Tov

(57) ABSTRACT

A method for providing and managing non-direct URL fetching service for retrieving a content from a web server to a client device is disclosed, such as for overcoming geo-blocking or a Man-In-The-Middle (MITM) attack. The non-direct fetching method may use intermediate devices, such as proxy server, Data-Center proxy server, tunnel devices, or any combination thereof. A URL request may be sent in parallel using both direct and non-direct fetching schemes, in order to verify the need for using the non-direct fetching service. Direct or non-direct fetching scheme may be selected by using a file that associates a fetching scheme to the requested URL. The selection of the fetching mechanism may use dynamically in real-time updating of a Proxy Auto-Configuration (PAC) file. As part of an accounting scheme, quotas may be applied to a cumulative received data or a time duration of using a non-direct fetching service.

106 Claims, 86 Drawing Sheets

Related U.S. Application Data

(60) Provisional application No. 62/872,926, filed on Jul. 11, 2019, provisional application No. 62/827,889, filed on Apr. 2, 2019.

(56) References Cited

U.S. PATENT DOCUMENTS 4,405,829 A 9/1983 Rivest et al.
4,853,884 A 8/1989 Brown et al.
4,855,894 A 8/1989 Asahi
4,905,176 A 2/1990 Schulz
5,519,693 A 5/1996 Galuszka
5,577,243 A 11/1996 Sherwood et al.
5,578,755 A 11/1996 Offenberg
5,734,829 A 3/1998 Robinson
5,826,014 A 10/1998 Coley
5,961,593 A 10/1999 Gabber et al.
5,962,786 A 10/1999 Le Traon et al.
5,974,566 A 10/1999 Ault
6,012,083 A 1/2000 Savitzky
6,012,090 A 1/2000 Chung
6,085,193 A 7/2000 Malkin
6,134,584 A 10/2000 Chang
6,154,782 A 11/2000 Kawaguchi
6,185,625 B1 2/2001 Tso
6,236,652 B1 5/2001 Preston et al.
6,240,444 B1 5/2001 Fin
6,266,704 B1 7/2001 Reed
6,311,216 B1 10/2001 Smith
6,351,775 B1 2/2002 Yu
6,356,934 B1 * 3/2002 Delph .................. G06F 16/954 709/204
6,389,422 B1 5/2002 Doi
6,389,462 B1 5/2002 Cohen
6,397,259 B1 5/2002 Lincke et al.
6,412,008 B1 6/2002 Fields et al.
6,421,733 B1 7/2002 Tso
6,449,640 B1 9/2002 Haverstock
6,513,061 B1 1/2003 Ebata
6,519,693 B1 2/2003 Debey
6,601,098 B1 7/2003 Case et al.
6,658,463 B1 12/2003 Dillon et al.
6,661,799 B1 12/2003 Molitor
6,665,715 B1 12/2003 Houri
6,670,212 B2 12/2003 McNie et al.
6,687,732 B1 2/2004 Bector
6,701,374 B2 3/2004 Gupta
6,785,705 B1 8/2004 Kocherlakota
6,795,848 B1 9/2004 Border et al.
6,820,133 B1 11/2004 Grove
6,829,638 B1 12/2004 McBrearty
6,842,463 B1 1/2005 Drwiega
6,868,453 B1 3/2005 Watanabe
6,895,011 B1 5/2005 Lassers
6,961,783 B1 11/2005 Cook
7,007,228 B1 2/2006 Carro
7,027,418 B2 4/2006 Gan et al.
7,047,315 B1 5/2006 Srivastava
7,009,927 B2 8/2006 Cudd
7,120,666 B2 10/2006 McCanne et al.
7,124,157 B2 10/2006 Ikake
7,139,557 B2 11/2006 Tang et al.
7,145,933 B1 12/2006 Szajnowski
7,162,539 B2 1/2007 Garcia-Luna-Aceves et al.
7,203,741 B2 4/2007 Marco et al.
7,234,059 B1 6/2007 Beaver
7,246,272 B2 7/2007 Cabezas
7,326,866 B2 2/2008 Whitmore et al.
7,353,279 B2 4/2008 Durvasula et al.
7,381,366 B2 6/2008 Carter
7,401,115 B1 7/2008 Arsenault
7,440,994 B2 10/2008 Harrow et al.
7,464,123 B2 12/2008 Croker
7,562,112 B2 7/2009 Harrow et al.
7,565,450 B2 7/2009 Garcia-Luna-Aceves et al.
7,574,515 B2 8/2009 Fontijn et al.
7,605,714 B2 10/2009 Thompson et al.
7,617,729 B2 11/2009 Axelrod et al.
7,620,703 B1 11/2009 Shteyn
7,639,682 B2 12/2009 Suzuki et al.
7,673,048 B1 3/2010 O'toole et al.
7,706,362 B1 4/2010 Senthilnathan
7,716,985 B2 5/2010 Zhang et al.
7,719,971 B1 5/2010 Issa
7,742,485 B2 6/2010 Zhang
7,751,628 B1 7/2010 Reisman
7,761,500 B1 7/2010 Wei et al.
7,734,777 B2 8/2010 Raja
7,774,155 B2 8/2010 Sato et al.
7,783,777 B1 8/2010 Pabla et al.
7,788,378 B2 8/2010 Rao
7,801,824 B1 9/2010 Bryar
7,805,517 B2 9/2010 Shim
7,818,430 B2 10/2010 Zuckerman
7,831,720 B1 11/2010 Noureddine
7,853,472 B2 12/2010 Al-Abdulqader
7,853,795 B2 12/2010 Dick et al.
7,860,988 B2 12/2010 Aoki
7,865,585 B2 1/2011 Samuels
7,877,511 B1 1/2011 Berger
7,890,547 B2 2/2011 Hotti
7,890,624 B2 2/2011 Bivens
7,892,876 B2 2/2011 Mehregany
7,894,431 B2 2/2011 Goring
7,917,755 B1 * 3/2011 Giliyaru ................ G06F 40/194 713/169
7,929,429 B2 4/2011 Bornstein
7,929,535 B2 4/2011 Chen et al.
7,984,110 B1 7/2011 Raman
8,041,784 B1 10/2011 Amidon
8,135,912 B2 3/2012 Shribman et al.
8,144,611 B2 3/2012 Agarwal
8,156,275 B2 4/2012 de Cesare
8,301,787 B2 10/2012 Li
8,302,161 B2 10/2012 Burch et al.
8,306,022 B1 11/2012 Cranor
8,375,434 B2 2/2013 Cottrell
8,453,227 B2 * 5/2013 Aiello .................. H04L 63/029 726/11
8,458,786 B1 6/2013 Kailash
8,464,350 B2 6/2013 Kanevsky
8,479,251 B2 7/2013 Feinleib et al.
8,499,059 B2 7/2013 Stoyanov
8,504,723 B2 8/2013 Kohli
8,508,472 B1 8/2013 Wieder
8,514,812 B2 8/2013 Tang et al.
8,527,631 B1 9/2013 Liang
8,533,628 B2 9/2013 Rohrabaugh
8,560,604 B2 10/2013 Shribman et al.
8,577,724 B1 11/2013 Gandhi
8,595,786 B2 11/2013 Choi
8,612,641 B1 12/2013 Bozarth et al.
8,627,422 B2 1/2014 Hawkes
8,639,630 B2 1/2014 Fomenko et al.
8,655,838 B2 2/2014 Wright
8,655,985 B2 2/2014 De
8,671,221 B2 3/2014 Shribman et al.
8,719,430 B2 5/2014 Van Ackere et al.
8,719,505 B2 6/2014 Shribman et al.
8,832,179 B2 9/2014 Owen et al.
8,838,811 B2 9/2014 Chen et al.
8,935,798 B1 1/2015 Smith
9,201,808 B2 1/2015 Shribman et al.
8,948,832 B2 2/2015 Hong et al.
8,957,988 B2 2/2015 Wexler et al.
8,972,602 B2 3/2015 Mithyantha
8,990,357 B2 3/2015 Graham-Cumming
9,015,335 B1 4/2015 Gigliotti
9,049,247 B2 6/2015 Holloway
9,059,938 B1 6/2015 Strand
9,100,320 B2 8/2015 Hsy
9,122,554 B2 9/2015 Callaghan
9,154,557 B2 10/2015 Lev-Ran
9,177,157 B2 11/2015 Binder

(56) References Cited

U.S. PATENT DOCUMENTS 9,201,840 B2 12/2015 Martini et al.
9,237,210 B2 1/2016 Liu
9,241,044 B2 1/2016 Shribman et al.
9,244,682 B2 1/2016 Rowles et al.
9,253,164 B2 2/2016 Gouge
9,313,100 B1 4/2016 Jenkins
9,378,473 B2 6/2016 Wolfe
9,380,028 B2 6/2016 Rizzo
9,418,243 B2 8/2016 Bauer
9,380,523 B1 9/2016 Mijar
9,444,903 B2 9/2016 Nuaimi
9,634,994 B2 4/2017 Prince
9,660,895 B1 5/2017 Bennett
9,742,866 B2 8/2017 Shribman
9,769,121 B2 9/2017 Joy et al.
9,838,497 B2 12/2017 Lawrence
9,979,674 B1 5/2018 Kumar
9,990,295 B2 6/2018 Shribman et al.
10,104,165 B1 10/2018 Killian
10,110,606 B2 10/2018 Mizhar
10,277,711 B2 4/2019 Shribman
10,361,911 B2 7/2019 Brandwine
10,404,791 B2 9/2019 Puri
10,410,244 B2 9/2019 Toval
10,484,510 B2 11/2019 Shribman
10,511,630 B1 * 12/2019 Weiss ...................... H04L 63/20
10,594,660 B2 3/2020 Smith
10,601,948 B1 3/2020 Juravicius
10,601,984 B2 3/2020 Olligschlaeger
10,637,956 B1 4/2020 Juravicius
10,743,051 B1 * 8/2020 Reed .................. H04N 21/6581
10,749,893 B1 8/2020 Dahlberg
10,771,524 B1 9/2020 Long
10,798,209 B1 10/2020 Juravicius et al.
10,805,181 B2 10/2020 Boutros et al.
10,972,434 B2 * 4/2021 Kupisiewicz ....... H04L 12/4641
11,140,235 B1 10/2021 Vilcinskas et al.
11,258,872 B1 * 2/2022 Gogel ..................... H04L 67/02
11,469,992 B2 10/2022 Gerstel
2001/0011312 A1 8/2001 Chu
2001/0054020 A1 12/2001 Barth
2002/0007413 A1 1/2002 Garcia-Luna-Aceves et al.
2002/0026517 A1 2/2002 Watson
2002/0059371 A1 5/2002 Jamail
2002/0059429 A1 5/2002 Carpenter
2002/0069241 A1 6/2002 Narlikar et al.
2002/0073075 A1 6/2002 Dutta
2002/0073232 A1 6/2002 Hong
2002/0091760 A1 7/2002 Rozen
2002/0103823 A1 8/2002 Jackson
2002/0112036 A1 8/2002 Bohannon
2002/0112152 A1 8/2002 VanHeyningen
2002/0169818 A1 11/2002 Stewart
2002/0178217 A1 11/2002 Nguyen
2002/0194292 A1 12/2002 King
2003/0009518 A1 1/2003 Harrow et al.
2003/0009583 A1 1/2003 Chan et al.
2003/0018705 A1 1/2003 Chen
2003/0018834 A1 1/2003 Eilers
2003/0061282 A1 3/2003 Ebata et al.
2003/0074403 A1 4/2003 Harrow et al.
2003/0095520 A1 5/2003 Aalbers
2003/0097408 A1 5/2003 Kageyama
2003/0120805 A1 6/2003 Couts
2003/0149720 A1 8/2003 Goldstein
2003/0163413 A1 8/2003 Wiczkowski
2003/0174648 A1 9/2003 Wang et al.
2003/0200307 A1 10/2003 Raju et al.
2003/0204602 A1 10/2003 Hudson et al.
2003/0210694 A1 11/2003 Jayaraman et al.
2003/0217144 A1 11/2003 Fu et al.
2003/0229718 A1 12/2003 Tock
2003/0229785 A1 12/2003 Daseke
2004/0006615 A1 1/2004 Jackson
2004/0044731 A1 3/2004 Chen
2004/0052257 A1 3/2004 Abdo
2004/0054800 A1 3/2004 Shah
2004/0068579 A1 4/2004 Marmigere
2004/0088646 A1 5/2004 Yeager et al.
2004/0111529 A1 6/2004 Parmar
2004/0117455 A1 6/2004 Kaminsky
2004/0133692 A1 7/2004 Blanchet
2004/0136370 A1 7/2004 Moore et al.
2004/0143665 A1 7/2004 Mace
2004/0153473 A1 8/2004 Hutchinson
2004/0199629 A1 10/2004 Bomer
2004/0212490 A1 10/2004 Fredericks
2004/0215717 A1 10/2004 Seifert
2004/0230593 A1 11/2004 Rudin
2004/0236962 A1 11/2004 Wong
2004/0254907 A1 12/2004 Crow et al.
2004/0257761 A1 12/2004 Park
2004/0263479 A1 12/2004 Shkolnikov
2005/0015552 A1 1/2005 So et al.
2005/0018645 A1 1/2005 Mustonen et al.
2005/0022236 A1 1/2005 Ito et al.
2005/0027782 A1 2/2005 Jalan
2005/0050097 A1 3/2005 Yeh
2005/0060542 A1 3/2005 Risan
2005/0091540 A1 4/2005 Dick
2005/0096753 A1 5/2005 Arling
2005/0097217 A1 5/2005 Val et al.
2005/0097221 A1 5/2005 James
2005/0097441 A1 5/2005 Herbach
2005/0108551 A1 5/2005 Toomey
2005/0125412 A1 * 6/2005 Glover ................ G06F 16/9538
2005/0138426 A1 6/2005 Styslinger
2005/0165903 A1 7/2005 Doan
2005/0180319 A1 8/2005 Hutnik
2005/0198309 A1 9/2005 Li et al.
2005/0228964 A1 10/2005 Sechrest et al.
2006/0015545 A1 1/2006 Ezra
2006/0026304 A1 2/2006 Price
2006/0036755 A1 2/2006 Abdullah
2006/0039352 A1 2/2006 Karstens
2006/0047844 A1 3/2006 Deng
2006/0059091 A1 3/2006 Wang
2006/0075114 A1 4/2006 Panasyuk
2006/0164383 A1 7/2006 Machin et al.
2006/0184647 A1 8/2006 Dixit
2006/0206586 A1 9/2006 Ling
2006/0212542 A1 9/2006 Fang
2006/0212584 A1 9/2006 Yu et al.
2006/0224687 A1 10/2006 Popkin et al.
2006/0236083 A1 10/2006 Fritsch
2006/0242318 A1 10/2006 Nettle
2006/0256772 A1 11/2006 Yarlagadda
2006/0259728 A1 11/2006 Chandrasekaran et al.
2006/0271438 A1 11/2006 Shotland
2006/0280191 A1 12/2006 Nishida
2006/0293052 A1 12/2006 Orler
2007/0011674 A1 1/2007 Joo
2007/0047452 A1 3/2007 Lohr
2007/0050522 A1 3/2007 Grove
2007/0052672 A1 3/2007 Ritter et al.
2007/0061440 A1 3/2007 Sundaram
2007/0073878 A1 3/2007 Issa
2007/0088821 A1 4/2007 Sankuratripati
2007/0100839 A1 5/2007 Kim
2007/0142036 A1 6/2007 Wikman et al.
2007/0156855 A1 7/2007 Johnson
2007/0160072 A1 7/2007 Thalanany et al.
2007/0171921 A1 7/2007 Wookey
2007/0174246 A1 7/2007 Sigurdsson
2007/0177513 A1 8/2007 Kuokkanen
2007/0226810 A1 9/2007 Hotti
2007/0239655 A1 10/2007 Agetsuma
2007/0283026 A1 12/2007 Lohmar
2008/0008089 A1 1/2008 Bornstein et al.
2008/0010365 A1 1/2008 Schneider
2008/0034416 A1 2/2008 Kumar
2008/0037536 A1 2/2008 Padmanabhan
2008/0052156 A1 2/2008 Brenner
2008/0071925 A1 3/2008 Leighton

(56) References Cited

U.S. PATENT DOCUMENTS

| | | | |
|---|---|---|---|
| 2008/0072178 | A1 | 3/2008 | Budzisch |
| 2008/0091812 | A1 | 4/2008 | Lev-Ran |
| 2008/0098101 | A1 | 4/2008 | Black |
| 2008/0109446 | A1 | 5/2008 | Wang |
| 2008/0125123 | A1 | 5/2008 | Dorenbosch |
| 2008/0134258 | A1 | 6/2008 | Goose et al. |
| 2008/0155016 | A1 | 6/2008 | Tsai |
| 2008/0162700 | A1 | 7/2008 | Aborn |
| 2008/0196098 | A1 | 8/2008 | Cottrell |
| 2008/0201438 | A1 | 8/2008 | Mandre |
| 2008/0214152 | A1 | 9/2008 | Ramer |
| 2008/0222244 | A1 | 9/2008 | Huang |
| 2008/0222267 | A1 | 9/2008 | Horn |
| 2008/0222291 | A1 | 9/2008 | Weller et al. |
| 2008/0225710 | A1 | 9/2008 | Raja |
| 2008/0228537 | A1 | 9/2008 | Monfried |
| 2008/0228938 | A1 | 9/2008 | Plamondon |
| 2008/0235385 | A1 | 9/2008 | Li |
| 2008/0235391 | A1 | 9/2008 | Painter et al. |
| 2008/0235623 | A1 | 9/2008 | Li |
| 2008/0235746 | A1 | 9/2008 | Peters |
| 2008/0086730 | A1 | 10/2008 | Vertes |
| 2008/0243735 | A1 | 10/2008 | Rish |
| 2008/0256175 | A1 | 10/2008 | Lee |
| 2008/0263180 | A1 | 10/2008 | Hurst |
| 2008/0282112 | A1 | 11/2008 | Bailey |
| 2008/0288973 | A1 | 11/2008 | Carson |
| 2008/0298328 | A1 | 12/2008 | Sharma |
| 2008/0320151 | A1 | 12/2008 | McCanne |
| 2009/0010426 | A1 | 1/2009 | Redmond |
| 2009/0016337 | A1 | 1/2009 | Jorgensen |
| 2009/0037529 | A1 | 2/2009 | Armon-Kest |
| 2009/0037977 | A1 | 2/2009 | Gai |
| 2009/0055471 | A1 | 2/2009 | Kozat |
| 2009/0070489 | A1 | 3/2009 | Lu |
| 2009/0077233 | A1 | 3/2009 | Kurebayashi |
| 2009/0100005 | A1 | 4/2009 | Guo |
| 2009/0106551 | A1 | 4/2009 | Boren |
| 2009/0136219 | A1 | 5/2009 | Kikugawa |
| 2009/0150534 | A1 | 6/2009 | Miller |
| 2009/0150930 | A1 | 6/2009 | Sherwin |
| 2009/0157850 | A1 | 6/2009 | Gagliardi |
| 2009/0177761 | A1 | 7/2009 | Meyer |
| 2009/0182843 | A1 | 7/2009 | Hluchyj |
| 2009/0187654 | A1 | 7/2009 | Raja |
| 2009/0193498 | A1 | 7/2009 | Agarwal |
| 2009/0199000 | A1 | 8/2009 | Hsu |
| 2009/0204700 | A1 | 8/2009 | Sudhaka |
| 2009/0216887 | A1 | 8/2009 | Hertle |
| 2009/0217351 | A1 | 8/2009 | Burch |
| 2009/0222515 | A1 | 9/2009 | Thompson |
| 2009/0228603 | A1 | 9/2009 | Ritzau et al. |
| 2009/0232003 | A1 | 9/2009 | Vasseur |
| 2009/0234970 | A1 | 9/2009 | Sun |
| 2009/0248793 | A1 | 10/2009 | Jacobsson et al. |
| 2009/0278506 | A1 | 11/2009 | Winger |
| 2009/0292816 | A1 | 11/2009 | Etchegoyen |
| 2009/0300208 | A1 | 12/2009 | Lepeska |
| 2009/0313318 | A1 | 12/2009 | Dye |
| 2009/0319502 | A1 | 12/2009 | Chalouhi et al. |
| 2009/0320119 | A1 | 12/2009 | Hicks |
| 2009/0327489 | A1 | 12/2009 | Swildens |
| 2010/0031183 | A1 | 2/2010 | Kang |
| 2010/0036954 | A1 | 2/2010 | Sakata |
| 2010/0042724 | A1 | 2/2010 | Jeon |
| 2010/0067703 | A1 | 3/2010 | Candelore |
| 2010/0082513 | A1 | 4/2010 | Liu |
| 2010/0094970 | A1 | 4/2010 | Zuckerman |
| 2010/0095208 | A1 | 4/2010 | White |
| 2010/0100952 | A1 | 4/2010 | Sample |
| 2010/0105443 | A1 | 4/2010 | Vaisanen |
| 2010/0110368 | A1 | 5/2010 | Chaum |
| 2010/0115613 | A1 | 5/2010 | Ramaswami |
| 2010/0125673 | A1 | 5/2010 | Richardson |
| 2010/0125675 | A1 | 5/2010 | Richardson |
| 2010/0145925 | A1 | 6/2010 | Flinta |
| 2010/0146569 | A1 | 6/2010 | Janardhan |
| 2010/0161752 | A1 | 6/2010 | Collet |
| 2010/0161756 | A1 | 6/2010 | Lewis |
| 2010/0161760 | A1 | 6/2010 | Maloo |
| 2010/0161799 | A1 | 6/2010 | Maloo |
| 2010/0180082 | A1 | 7/2010 | Sebastian |
| 2010/0235438 | A1 | 9/2010 | Narayanan et al. |
| 2010/0235473 | A1 | 9/2010 | Koren |
| 2010/0262650 | A1 | 10/2010 | Chauhan |
| 2010/0322237 | A1 | 12/2010 | Raja |
| 2011/0007665 | A1 | 1/2011 | Dinur |
| 2011/0022582 | A1 | 1/2011 | Unnikrishnan |
| 2011/0023125 | A1 | 1/2011 | Kim |
| 2011/0035503 | A1 | 2/2011 | Zaid |
| 2011/0066924 | A1 | 3/2011 | Dorso |
| 2011/0087733 | A1 | 4/2011 | Shribman et al. |
| 2011/0106972 | A1 | 5/2011 | Grube |
| 2011/0117938 | A1 | 5/2011 | Pyo |
| 2011/0128911 | A1 | 6/2011 | Shaheen |
| 2011/0137973 | A1 | 6/2011 | Wei |
| 2011/0154477 | A1 | 6/2011 | Parla |
| 2011/0173345 | A1 | 7/2011 | Knox |
| 2011/0218866 | A1 | 9/2011 | Wilson |
| 2011/0264809 | A1 | 10/2011 | Koster |
| 2011/0320589 | A1 | 12/2011 | Hietala |
| 2012/0023212 | A1 | 1/2012 | Roth |
| 2012/0036220 | A1 | 2/2012 | Dare |
| 2012/0050144 | A1 | 3/2012 | Morlock |
| 2012/0059934 | A1 | 3/2012 | Rafiq et al. |
| 2012/0096116 | A1 | 4/2012 | Mislove |
| 2012/0099566 | A1 | 4/2012 | Laine et al. |
| 2012/0124173 | A1 | 5/2012 | De et al. |
| 2012/0124239 | A1 | 5/2012 | Shribman et al. |
| 2012/0124384 | A1 | 5/2012 | Livni et al. |
| 2012/0136926 | A1 | 5/2012 | Dillon |
| 2012/0144047 | A1 | 6/2012 | Armstrong |
| 2012/0164980 | A1 | 6/2012 | Van Phan |
| 2012/0166582 | A1 | 6/2012 | Binder |
| 2012/0166611 | A1 | 6/2012 | Kim |
| 2012/0185947 | A1 | 7/2012 | Phillips |
| 2012/0198524 | A1 | 8/2012 | Celebisoy |
| 2012/0209945 | A1 | 8/2012 | Chandrasekhar |
| 2012/0246273 | A1 | 9/2012 | Bornstein |
| 2012/0254370 | A1 | 10/2012 | Bacher |
| 2012/0254456 | A1 | 10/2012 | Visharam et al. |
| 2012/0254960 | A1 | 10/2012 | Lortz |
| 2012/0264520 | A1 | 10/2012 | Marsland |
| 2012/0290717 | A1 | 11/2012 | Luna |
| 2012/0297041 | A1 | 11/2012 | Momchilov |
| 2012/0310906 | A1 | 12/2012 | Miller et al. |
| 2012/0323674 | A1 | 12/2012 | Simmons |
| 2013/0007031 | A1 | 1/2013 | Makino |
| 2013/0007232 | A1 | 1/2013 | Wang |
| 2013/0007253 | A1 | 1/2013 | Li |
| 2013/0019258 | A1 | 1/2013 | Bhatia |
| 2013/0046817 | A1 | 2/2013 | Isbister |
| 2013/0047020 | A1 | 2/2013 | Hershko |
| 2013/0064370 | A1 | 3/2013 | Gouge et al. |
| 2013/0067086 | A1 | 3/2013 | Hershko |
| 2013/0072233 | A1 | 3/2013 | Sandholm |
| 2013/0080498 | A1 | 3/2013 | Desilva |
| 2013/0080575 | A1 | 3/2013 | Prince |
| 2013/0081129 | A1 | 3/2013 | Niemelä |
| 2013/0083800 | A1 | 4/2013 | Lezama Bounine |
| 2013/0091273 | A1 | 4/2013 | Ly |
| 2013/0117413 | A1 | 5/2013 | Kaneko |
| 2013/0145017 | A1 | 6/2013 | Luna |
| 2013/0157699 | A1 | 6/2013 | Talwar |
| 2013/0166768 | A1 | 6/2013 | Gouache et al. |
| 2013/0167045 | A1 | 6/2013 | Xu |
| 2013/0169513 | A1 | 7/2013 | Heinrich et al. |
| 2013/0171964 | A1 | 7/2013 | Bhatia |
| 2013/0173756 | A1 | 7/2013 | Luna |
| 2013/0191456 | A1 | 7/2013 | Ting et al. |
| 2013/0201316 | A1 | 8/2013 | Binder et al. |
| 2013/0212462 | A1 | 8/2013 | Athas |
| 2013/0219281 | A1 | 8/2013 | Trevelyan |
| 2013/0219458 | A1 | 8/2013 | Ramanathan |

(56) References Cited

U.S. PATENT DOCUMENTS

2013/0263280 A1 10/2013 Cote
2013/0268357 A1 10/2013 Heath
2013/0304796 A1 11/2013 Jackowski
2013/0326607 A1 12/2013 Feng
2013/0339477 A1 12/2013 Majeti
2013/0340031 A1 12/2013 Amit
2014/0013001 A1 1/2014 Cox
2014/0040035 A1 2/2014 Cusack
2014/0045547 A1 2/2014 Singamsetty et al.
2014/0070613 A1 3/2014 Garb et al.
2014/0078462 A1 3/2014 Abreu
2014/0122580 A1 5/2014 Nuaimi
2014/0122865 A1 5/2014 Ovsiannikov
2014/0133392 A1 5/2014 Das et al.
2014/0159877 A1 6/2014 Huang
2014/0189802 A1 7/2014 Montgomery
2014/0199044 A1 7/2014 Gupta
2014/0215391 A1 7/2014 Little et al.
2014/0222963 A1 8/2014 Gangadharan
2014/0222974 A1 8/2014 Liu
2014/0223537 A1 8/2014 Islam
2014/0244778 A1 8/2014 Wyatt
2014/0258465 A1 9/2014 Li
2014/0259093 A1 9/2014 Narayanaswamy
2014/0283068 A1 9/2014 Call et al.
2014/0301334 A1 10/2014 Labranche
2014/0337308 A1 11/2014 De Francisci Morales
2014/0344908 A1 11/2014 Rizzo
2014/0359081 A1 12/2014 Van Deventer
2014/0372627 A1 12/2014 Axelrod
2014/0376403 A1 12/2014 Shao
2015/0006615 A1 1/2015 Wainner
2015/0016261 A1 1/2015 Backholm
2015/0026239 A1 1/2015 Hofmann
2015/0026341 A1 1/2015 Blacka
2015/0032803 A1 1/2015 Graham-Cumming
2015/0039674 A1 2/2015 Agarwal
2015/0067819 A1 3/2015 Shribman et al.
2015/0120863 A1 4/2015 Wu
2015/0135302 A1 5/2015 Cohen
2015/0149431 A1 5/2015 Trevelyan
2015/0163087 A1 6/2015 Conner et al.
2015/0189401 A1 7/2015 Yi
2015/0206176 A1 7/2015 Toval et al.
2015/0208352 A1 7/2015 Backholm
2015/0215426 A1 7/2015 Torii et al.
2015/0244839 A1 8/2015 Horn
2015/0277559 A1 10/2015 Vescovi et al.
2015/0295988 A1 10/2015 Goodwin
2015/0341812 A1 11/2015 Dion
2015/0341901 A1 11/2015 Ryu
2015/0349556 A1 12/2015 Mercando et al.
2015/0350362 A1 12/2015 Pollack
2015/0372972 A1 12/2015 Kennedy
2015/0373443 A1 12/2015 Carroll
2016/0035019 A1 2/2016 Rosner
2016/0077547 A1 3/2016 Aimone
2016/0098049 A1 4/2016 Fan
2016/0105530 A1* 4/2016 Shribman ............ H04L 67/141
709/218
2016/0170814 A1 6/2016 Li
2016/0173452 A1 6/2016 Seo
2016/0188657 A1 6/2016 Montana
2016/0205557 A1 7/2016 Tuupola et al.
2016/0162706 A1 9/2016 Famulari
2016/0261688 A1 9/2016 Anand
2016/0269369 A1 9/2016 Thomson
2016/0323409 A1 11/2016 Kölhi
2016/0337426 A1 11/2016 Shribman et al.
2016/0337464 A1 11/2016 Eriksson
2016/0352628 A1 12/2016 Reddy et al.
2016/0365989 A1 12/2016 Herrero
2016/0366233 A1 12/2016 Le
2016/0380778 A1 12/2016 Shen et al.
2017/0006075 A1 1/2017 Li
2017/0041416 A1 2/2017 Zhou
2017/0048192 A1 2/2017 Herrero
2017/0094710 A1 3/2017 Nirantar
2017/0118313 A1 4/2017 Aladdin et al.
2017/0187472 A1 6/2017 Chini et al.
2017/0221092 A1 8/2017 Toval et al.
2017/0250861 A1 8/2017 Gheorghe
2017/0272316 A1 9/2017 Johnson
2017/0339253 A1 11/2017 Pathak
2017/0359349 A1 12/2017 Knecht
2017/0374566 A1 12/2017 Backholm
2018/0019909 A1 1/2018 Tanabe et al.
2018/0020324 A1 1/2018 Beauford
2018/0034766 A1 2/2018 Chiba
2018/0042067 A1 2/2018 Nirantar
2018/0047072 A1 2/2018 Chow
2018/0077624 A1 3/2018 Jung
2018/0070129 A1 5/2018 Cholas et al.
2018/0167336 A1 6/2018 Lawrence
2018/0213038 A1 7/2018 Chung
2018/0213060 A1 7/2018 Koonce
2018/0219830 A1 8/2018 O'Brien
2018/0225387 A1 8/2018 Pang
2018/0226760 A1 8/2018 Bolouri-Saransar et al.
2018/0227210 A1 8/2018 Cosgrove
2018/0262388 A1 9/2018 Johnson
2018/0302292 A1 10/2018 Khurana et al.
2018/0349354 A1 12/2018 Gonzalez
2018/0367433 A1 12/2018 Luna
2018/0367560 A1 12/2018 Mahaffey
2018/0375828 A1 12/2018 Rawat
2018/0375896 A1 12/2018 Wang
2018/0375952 A1 12/2018 Knecht
2019/0028548 A1 1/2019 Lauer
2019/0033845 A1 1/2019 Cella
2019/0036777 A1 1/2019 Frizzell
2019/0037047 A1 1/2019 Shribman
2019/0098518 A1 3/2019 Luna
2019/0102280 A1 4/2019 Caldato
2019/0116236 A1 4/2019 He
2019/0124018 A1 4/2019 Zhang
2019/0137594 A1 5/2019 Annamalai et al.
2019/0138560 A1 5/2019 Holloway
2019/0155665 A1 5/2019 Bott
2019/0171474 A1 6/2019 Malboubi
2019/0174449 A1 6/2019 Shan
2019/0180316 A1 6/2019 Toval
2019/0182034 A1 6/2019 McCarthy et al.
2019/0199611 A1 6/2019 Kotadia
2019/0238510 A1 8/2019 Li
2019/0268308 A1 8/2019 Sinha
2019/0334864 A1* 10/2019 Yin .................... H04L 63/0272
2019/0373083 A1 12/2019 Nucci
2019/0385057 A1 12/2019 Litichever et al.
2020/0007494 A1 1/2020 Prince
2020/0136911 A1 4/2020 Assali
2020/0186614 A1 6/2020 Luna
2020/0205058 A1 6/2020 Yoshikawa
2020/0259893 A1 8/2020 James
2020/0287867 A1 9/2020 Knecht
2020/0296036 A1* 9/2020 Chu ........................ H04L 67/63
2020/0358858 A1* 11/2020 Shribman ............... G06F 9/547
2021/0058271 A1 2/2021 Sung
2021/0075860 A1 3/2021 Binder et al.
2021/0194986 A1 6/2021 Shribman et al.
2021/0234721 A1 7/2021 Shribman et al.
2022/0070216 A1 3/2022 Kohavi
2022/0103523 A1* 3/2022 Starr .................. H04L 63/0272
2022/0164400 A1 5/2022 Holloway

FOREIGN PATENT DOCUMENTS

CN 102314348 1/2012
CN 105245607 B 1/2016
CN 106534244 A 3/2017
CN 106547793 A 3/2017
CN 107832355 A 3/2018
CN 107864143 A 3/2018
CN 108551452 9/2018

(56) References Cited

FOREIGN PATENT DOCUMENTS

| | | | |
|---|---|---|---|
| CN | 108924199 | A | 11/2018 |
| CN | 110062025 | A | 7/2019 |
| CN | 110071980 | A | 7/2019 |
| CN | 110147271 | A | 8/2019 |
| EP | 1672826 | | 6/2006 |
| EP | 2597869 | A1 | 12/2013 |
| EP | 2922275 | B1 | 3/2016 |
| GB | 2418108 | A | 3/2006 |
| JP | H11-355302 | | 12/1999 |
| JP | 2007280388 | | 10/2007 |
| KR | 1020090097034 | | 9/2009 |
| WO | 97/42582 | A1 | 11/1997 |
| WO | 2004094980 | | 11/2004 |
| WO | 2007/136665 | | 11/2007 |
| WO | 2009/086134 | A1 | 7/2009 |
| WO | 2010/014747 | A2 | 2/2010 |
| WO | 2010090562 | A1 | 12/2010 |
| WO | 2011/005390 | A2 | 1/2011 |
| WO | 2011068784 | A1 | 9/2011 |
| WO | 2015034752 | A1 | 3/2015 |
| WO | 2015/157646 | | 10/2015 |
| WO | 2016/123293 | A1 | 8/2016 |
| WO | 2016181383 | | 11/2016 |
| WO | 2016/198961 | A2 | 12/2016 |
| WO | 2019/043687 | | 3/2019 |
| WO | 2019043687 | | 3/2019 |

OTHER PUBLICATIONS

RFC 6455 entitled: "The WebSocket Protocol", Dec. 2011 (71 pages).
RFC 2663 entitled: "IP Network Address Translator (NAT) Terminology and Considerations", Aug. 1999 (30 pages).
RFC 3715 entitled: "IPsec-Network Address Translation (NAT) Compatibility Requirements", Mar. 2004 (18 pages).
RFC 3947 entitled: "Negotiation of NAT-Traversal in the IKE", Jan. 2005 (16 pages).
RFC 5128 entitled: "State of Peer-to-Peer (P2P) Communication across Network Address Translators (NATs)", Mar. 2008 (32 pages).
RFC 5245 entitled: "Interactive Connectivity Establishment (ICE): A Protocol for Network Address Translator (NAT) Traversal for Offer/Answer Protocols", Apr. 2010 (117 pages).
RFC 5389 entitled: "Session Traversal Utilities for NAT (STUN)", Oct. 2008 (51 pages).
RFC 7350 entitled: "Datagram Transport Layer Security (DTLS) as Transport for Session Traversal Utilities for NAT (STUN)", Aug. 2014 (16 pages).
Bryan Ford (of Massachusetts Institute of Technology), Pyda Srisuresh (of Caymas Systems, Inc.) and Dan Kegel, "Peer-to-Peer Communication Across Network Address Translators", published 2008 (14 pages).
Huynh Cong Phuoc, Ray Hunt, and Andrew Mckenzie (all of University of Canterbury, Chistchurch, New Zealand), "NAT Traversal Techniques in Peer-to-Peer Networks", Jan. 2008 (5 pages).
Paper by Oracle Corporation, entitled: "Oracle Sharding: Linear Scalability, Fault Isolation and Geo-distribution for Web-scale OLTP Applications", Apr. 2017 (22 pages).
MongoDB Documentation Project paper entitled: "Sharding and MongoDB", Jan. 12, 2015 (Release 2.8.0-rc3) (83 pages).
RFC 7157 "IPv6 Multihoming without Network Address Translation", Mar. 2014 (22 pages).
RFC 3467, "Role of the Domain Name System (DNS)", Feb. 2003 (31 pages).
RFC 6195, "Domain Name System (DNS) IANA Considerations", Mar. 2011 (17 pages).
"Slice Embedding Solutions for Distributed Service Architectures"—Esposito et al., Boston University, Feb. 12, 2011 http://www.cs.bu.edu/techreports/pdf/2011-025-slice-embedding.pdf (Year 2011) (16 pages).
Bluetooth SIG standard Covered Core Package version: 4.2, entitled: "Master Table of Contents & Compliance Requirements—Specification vol. 0", published Dec. 2, 2014 (2,772 pages).
Carles Gomez et al. [Sensors 2012, 12, 11734-11753; doi: 10.3390/s120211734] entitled: "Overview and Evaluation of Bluetooth Low Energy: An Emerging Low-Power Wireless Technology", published 2012 in Sensors [ISSN 1424-8220] (20 pages).
Datasheet # SWRS158A entitled: "CC2650 SimpleLink™ Multistandard Wireless MCU", by Texas Instrument, published Feb. 2015, Revised Oct. 2015 (59 pages).
Texas Instrument 2015 publication # SWRT022 entitled: "SimpleLink™ Ultra-Low Power—Wireless Microcontroller Platform" (3 pages).
Jun Wang, Wei Liu, Sanjiv Kumar, and Shih-Fu Chang, to the Proceedings of the IEEE (http://arxiv.org/abs/1509.05472v1) entitled: "Learning to Hash for Indexing Big Data—A Survey", Submitted on Sep. 17, 2015 (22 pages).
Josef Pieprzyk and Babak Sadeghiyan, by Springer-Verlag [ISBN 3-540-57500-6] entitled: "Design of Hashing Algorithms", published 1993 (208 pages).
RFC 4634 entitled: "US Secure Hash Algorithms (SHA and HMAC-SHA)", Jul. 2006 (108 pages).
RFC 3874 entitled: "A 224-bit One-way Hash Function: SHA-224", Sep. 2004 (6 pages).
Doxa Chatzopoulou and Marios Kokkodis, entitled: "IP Geolocation", Jan. 2007 (7 pages).
Jayaprabha Bendale and Prof. J. Ratanaraj Kumar, article (ISSN:0975-9646), entitled: "Review of Different IP Geolocation Methods and Concepts", published in (IJCSIT) International Journal of Computer Science and Information Technologies, vol. 5 (1), 2014, 436-440, downloaded from the Internet Aug. 2017 (5 pages).
Media Presentation. ISO/IEC 23009-1:2012(E), MPEG-DASH standard, entitled: "Information technology—Dynamic adaptive streaming over HTTP (DASH)—Part 1: Media presentation description and segment formats", Jan. 5, 2012 (133 pages).
Cooper et al., RFC 3040, Internet Web Replication and Caching Taxonomy (Jan. 2001) (32 pages).
Data-sheet 'Datasheet SQ-SEN-200 Omnidirectional Tilt and Vibration Sensor' Updated Aug. 3, 2009 (6 pages).
Marek's—totally not insane—idea of the day, entitled: "Dissecting SSL handshake", Jun. 2012 (9 pages).
Netronome Systems, Inc. white-paper, entitled: "Examining SSL-encrypted Communications", published 2010 (8 pages).
RFC 2544 entitled: "Benchmarking Methodology for Network Interconnect Devices", Mar. 1999 (32 pages).
ITU-T Y. 1564 entitled: "Ethernet Service Activation Test Methodology", Feb. 2016 (38 pages).
Data-sheet LIS302DL STMicroelectronics NV, 'MEMS motion sensor 3-axis—±2g/±8g smart digital output "piccolo" accelerometer', Rev. 4, Oct. 2008 (42 pages).
Third-party submission under 37 CFR 1.290 filed on Jul. 23, 2019 and entered in U.S. Appl. No. 16/140,749.
Third-party submission under 37 CFR 1.290 filed on Jul. 23, 2019 and entered in U.S. Appl. No. 16/140,785.
Third-party submission under 37 CFR 1.290 filed on Jul. 23, 2019 and entered in U.S. Appl. No. 16/214,433.
Third-party submission under 37 CFR 1.290 filed on Jul. 23, 2019 and entered in U.S. Appl. No. 16/214,451.
Third-party submission under 37 CFR 1.290 filed on Jul. 23, 2019 and entered in U.S. Appl. No. 16/214,476.
Third-party submission under 37 CFR 1.290 filed on Jul. 23, 2019 and entered in U.S. Appl. No. 16/214,496.
Third-party submission under 37 CFR 1.290 filed on Jul. 23, 2019 and entered in U.S. Appl. No. 16/292,363.
Third-party submission under 37 CFR 1.290 filed on Jul. 22, 2019 and entered in U.S. Appl. No. 16/292,364.
Third-party submission under 37 CFR 1.290 filed on Jul. 23, 2019 and entered in U.S. Appl. No. 16/292,374.
Third-party submission under 37 CFR 1.290 filed on Jul. 23, 2019 and entered in U.S. Appl. No. 16/292,382.
Third-party submission under 37 CFR 1.290 filed on Jul. 25, 2019 and entered in U.S. Appl. No. 16/365,250.
Third-party submission under 37 CFR 1.290 filed on Jul. 25, 2019 and entered in U.S. Appl. No. 16/365,315.

(56) References Cited

OTHER PUBLICATIONS

"Tunneling for Transparency: A Large-Scale Analysis of End-to-End Violations in the Internet", Taejoong Chung, David Choffnes, and Alan Mislove, all of Northeastern University, IMC 2016, Nov. 14-16, 2016, Santa Monica, CA, USA, [DOI: http://dx.doi.org/10.1145/2987443.2987455] (16 pages).
N. Gautam, "Performance Analysis and Optimization of Web Proxy Servers and Mirror Sites", European Journal Operational Research 142 (2002), 396-418 (23 pages).
Andrew Daviel et al., Geographic extensions for HTTP transactions, Dec. 7, 2007 (15 pages).
HTTPS FAQ, The HTTPS-Only Standard, Jul. 6, 2015 (3 pages).
RFC 2818, "HTTP Over TLS", May 2000 (7 pages).
RFC 1866, "Hypertext Markup Language—2.0", Nov. 1995 (77 pages).
Rob Thubron, "Opera Builds Free and Unlimited VPN Service Directly Into Its Desktop Browser", Apr. 16, 2016 (6 pages).
Anthony Caruana, "3 Ways To Sneak Past Site Blocks", Mar. 12, 2018 (7 pages).
Jack Schofield, "How Can I Access Restriced UK Sites When I'm Overseas?", Oct. 3, 2014 (6 pages).
Huang, S. et al., "Middleboxes in the Internet: a HTTP perspective", 2017 Network Traffic Conference, IEEE, Jun. 21-23, 2017, pp. 1-9 (9 pages).
Goldbert, I. and Shostack A., "Freedom Network 1.0 Architecture and Protocols", Zero-Knowledge Systems Inc, Nov. 29, 1999 (23 pages).
Screenshot from Internet Archive demonstrating availability of Goldbert, I. and Shostack A., "Freedom Network 1.0 Architecture and Protocols" (1 page).
Fifield David et al., "Evading Censorship with Browser-Based Proxies", Privacy Enhancing Technologies 2012, vol. 7384, Berlin, Springer, 2012, pp. 239-258 (20 pages).
Skvorc, D. et al., "Performance Evaluation of Websocket Protocol for Implementation of Full-Duplex Web Streams", 37th International Convention MIPRO, IEEE, May 26-30, 2014, pp. 1003-1008 (6 pages).
Rao A. et al., "Using the Middle to Meddle with Mobile", CCIS, Dec. 2013 (14 pages).
Screenshot from Internet Archive demonstrating availability of Rao A. et al., "Using the Middle to Meddle with Mobile" (1 page).
Netronome Systems, Inc., "Examining SSL-encrypted Communications", White Paper, 2010 (8 pages).
Screenshot from Internet Archive demonstrating availability of Netronome Systems, Inc., "Examining SSL-encrypted Communications" (1 pages).
Peterson, Larry L. and Davie, Bruce S., "Computer Networks. A Systems Approach", 2nd Ed., San Francisco, 2000, p. 610 (18 pages).
Liu, C. et al., "Managing Internet Information Servuces", Sebastopol, O'Reilly & Associates, 1994, pp. 497-513 (19 pages).
Tanenbaum, Andrew S. and Wetherall, David J., "Computer Networks", 5th Ed., Boston, 2011 pp. 813-822 (12 pages).
Comer, D.E., "Internetworking with TCP/IP—vol. 1: Principles, Protocols and Architectures", 5th Ed., New Jersey, 2006, pp. 249-268 (22 pages).
Krishnamurthy, B. and Rexford, J., "Web Protocols and Practice" HTTP/1.1, networking protocols, caching and traffic measurement, Indianapolis, 2001, pp. 184-203 and 249-254 (29 pages).
GeoSurf, "What is IP Rotation—Rotating Proxy Server", Nov. 12, 2017 (4 pages).
Bright Data, "The Ultimate Guide to Buying a Proxy Server", DataCenter Proxies, ProxyCompass Apr. 26, 2022 (23 pages).
"Keep Alive"—Imperva, 2019 https://www.imperva.com/learn/performance/keep-alive (2019) (3 pages).
Third party observation filed on Jun. 21, 2019 in PCT Application No. PCT/IL2018/050910 (7 pages).
IETF named: IPv6 Tunnel Broker, Apr. 1999—First uploaded document submitted with third party observation dated Jun. 21, 2019 (13 pages).
RFC 3053 (Jan. 2001) named: IPv6 Tunnel Broker—Secod uploaded document submitted with third party observation dated Jun. 21, 2019 (13 pages).
Octoparse Blog: "Top 20 Web Crawling Tools to Scrape the Websites Quickly", Aug. 23, 2019 (15 pages).
RFC 3143, Known HTTP Proxy/Caching Problems, Jun. 2001 (32 pages).
EBook authored by Gustavo Alessandro Andrade Santana, "Data Center Virtualization Fundamentals", published 2014 by Cisco Systems, Inc. (Cisco Press) [ISBN-13: 978-1-58714-324-3] (1406 pages).
IBM RedBook entitled: "IBM PowerVM Virtualization—Introduction and Configuration" published by IBM Corporation Jun. 2013 (790 pages).
IBM Corporation, "Power Systems—Introduction to virtualization", published 2009 (54 pages).
Cisco Systems, Inc. publication No. 1-587005-001-3 (Jun. 1999), "Internetworking Technologies Handbook", Chapter 7: "Ethernet Technologies", pp. 7-1 to 7-38 (38 pages).
Standard Microsystems Corporation (SMSC) data-sheet "LAN91C111 10/100 Non-PCI Ethernet Single Chip MAC + PHY" Data-Sheet, Rev. 15 (Feb. 20, 2004) (127 pages).
Chapter 2: "Structural Overview of ISP Networks" of the book entitled: "Guide to Reliable Internet Services and Applications", by Robert D. Doverspike, K.K. Ramakrishnan, and Chris Chase, published 2010 (ISBN: 978-1-84882-827-8) (76 pages).
Cisco Systems, Inc. document entitled: "An Introduction to IP Security (IPSec) Encryption", updated May 19, 2008 (26 pages).
RFC 1919, "Classical versus Transparent IP Proxies", Mar. 1996 (35 pages).
Wessels, "Squid: The Definitive Guide," ISBN-10: 9780596001629, ISBN-13: 978-0596001629, O'Reilly Media; 1st Ed. (Jan. 1, 2004) (468 pages).
Luotonen, "Web Proxy Servers," ISBN-10: 0136806120, ISBN-13: 978-0136806127, Prentice Hall; 1st Ed. (Dec. 30, 1997-1998) (452 pages).
Outonen et al., "World-Wide Web proxies," Computer Networks and ISDN Systems 27, 147-154 (Elsevier Science B.V.) (1994) (8 pages).
ProxyList.net, as captured by the Wayback Machine (web.archive.org), on Jul. 17, 2011 (1 page).
Printout of VIP72 Youtube web page at https://www.youtube.com/watch?v=L0Hct2kSnn4, retrieved Nov. 21, 2019 (1 page).
VIP72 Scene Images extracted from VIP72.com/nvpnnet, MPEG-4 video recording of "nVPN.net | Double your Safety and use Socks5 +nVpn", accessed from https://www.youtube.com/watch?v=L0Hct2kSnn4, published Sep. 11, 2011 (221 pages).
VIP72.com home page as of 2013 from Wayback Machine (3 pages).
AnchorFree and performed by AV-TEST GmbH entitled: "VPN Comparative Test", Jun. 15, 2018 (29 pages).
RFC 1750, "Randomness Recommendations for Security", Dec. 1994 (31 pages).
True Random No. Generation IC RPG100 / RPG100B available from FDK Corporation and described in the data sheet 'Physical Random No. generator RPG100.RPG100B' Rev. 08 publication No. HM-RAE106-0812 (13 pages).
Cisco Systems, Inc. handbook 'Internetworking Technologies Handbook' (Jul. 1999) [No. 1-58705-001-3] chapter 18 entitled: "Virtual Private Networks", (pp. 18-1 to 18-4) (4 pages).
Cisco Systems, Inc. handbook 'Internetworking Technologies Handbook' (Jul. 1999) [No. 1-58705-001-3] chapter 19 entitled: "Voice / Data Integration Technologies" (pp. 19-1 to 19-30) (30 pages).
RFC 1323, "TCP Extensions for High Performance", May 1992 (37 pages).
RFC 6323, "Sender RTT Estimate Option for the Datagram Congestion Control Protocol (DCCP)", Jul. 2011 (13 pages).
Karn, Phil and Craig Partridge in ACM SIGCOMM '87—Computer Communication Review publication, entitled: "Improving Round-Trip Time Estimates in Reliable Transport Protocols", (8 pages).
RFC 792, "Internet Control Message Protocol: DARPA Internet Program Protocol Specification", Sep. 1981 (21 pages).

(56) References Cited

OTHER PUBLICATIONS

RFC 1885, "Internet Control Message Protocol (ICMPv6) for the Internet Protocol Version 6 (IPv6) Specification", Dec. 1995 (20 pages).
RFE 2463, "Internet Control Message Protocol (ICMPv6) for the Internet Protocol Version 6 (IPv6) Specification", Dec. 1998 (18 pages).
RFC 6520, "Transport Layer Security (TLS) and Datagram Transport Layer Security (DTLS) Heartbeat Extension", Feb. 2012 (9 pages).
Telecom Regulatory Authority, entitled: "WiFi Technology" ,Jul. 2003 (60 pages).
RFC 2131, entitled "Dynamic Host Configuration Protocol", Mar. 1997 (45 pages).
RFC 3315, entitled: "Dynamic Host Configuration Protocol for IPV6 (DHCPv6)", Jul. 2003 (101 pages).
RFC 3467 entitled: "Role of the Domain Name System (DNS)", Feb. 2003 (31 pages).
RFC 6195 entitled: "Domain Name System (DNS) IANA Considerations", Mar. 2011 (17 pages).
RFC 1591 entitled: "Domain Name System Structure and Delegation", Mar. 1994 (7 pages).
RFC 2637 entitled: "Point-to-Point Tunneling Protocol (PPTP)", Jul. 1999 (57 pages).
RFC 2661 entitled: "Layer Two Tunneling Protocol "L2TP"", Aug. 1999 (80 pages).
Cisco Systems, Inc. publication No. 1-587005-001-3 (Jun. 1999), "Internetworking Technologies Handbook", Chapter Chapter 18: "Multiservice Access Technologies" (pp. 18-1 to 18-10) (10 pages).
IBM Corporation Redbook series, entitled: "A Comprehensive Guide to Virtual Private Networks" "vol. I: IBM Firewall, Server and Client Solutions" [SG24-5201-00, Jun. 1998] (250 pages).
IBM Corporation Redbook series, entitled: "A Comprehensive Guide to Virtual Private Networks" "vol. II: IBM Nways Router Solutions" [SG24-5234-01, Nov. 1999] (642 pages).
IBM Corporation Redbook series, entitled: "A Comprehensive Guide to Virtual Private Networks" "vol. III: Cross-Platform Key and Policy Management" [SG24-5309-00, Nov. 1999] (686 pages).
RFC 4026 entitled: "Provider Provisioned Virtual Private Network (VPN) Terminology", Mar. 2005 (20 pages).
RFC 2764 entitled: "A Framework for IP Based Virtual Private Networks", Feb. 2000 (62 pages).
RFC 3931 entitled: "Layer Two Tunneling Protocol - Version 3 (L2TPv3)", Mar. 2005 (94 pages).
RFC 2547 entitled: "BGP/MPLS VPNs", Mar. 1999 (25 pages).
RFC 2409 entitled: "The Internet Key Exchange (IKE)", Nov. 1998 (41 pages).
RFC 4306 entitled: "Internet Key Exchange (IKEv2) Protocol", Dec. 2005 (99 pages).
RFC 2631 entitled: "Diffie-Hellman Key Agreement Method", Jun. 1999 (12 pages).
RFC 1928, entitled: "SOCKS Protocol Version 5", Mar. 1996 (9 pages).
RFC 1929, entitled: "Username/Password Authentication for SOCKS V5", Mar. 1996 (2 pages).
RFC 1961, entitled: "GSS-API Authentication Method for SOCKS Version 5", Jun. 1996 (9 pages).
RFC 2187, "Application of Internet Cache Protocol (ICP), version 2", Sep. 1997 (24 pages).
Duane Wessels, "ICP and the Squid Web Cache", Aug. 13, 1997 (25 pages).
RFC 1738, "Uniform Resource Locators (URL)", Dec. 1994 (25 pages).
European Search Report of EP 20195075 dated Nov. 13, 2020.
David Gourley et al., "HTTP-The-Definitive-Guide", O'Reilly Media, Inc. Sep. 27, 2002 (658 pages).
Roger Dingledine, Nick Mathewon, and Paul Syverson, Tor: The Second-Generation Onion Router, In Proceedings of the 13th conference on USENIX Security Symposium, vol. 13, 2004 (17 pages).
Goldschlag D.M., Reed M.G., Syverson P.F., Hiding Routing Information, Lecture Notes in Computer Science, vol. 1174, Springer, Berlin, Heidelberg, 1996 (14 pages).
Schneier, Anonymity and Tor Network, Schneier on Security Sep. 20, 2007, https://www.schneier.com/blog/archives/2007/09...html, p. 1-22, accessed Apr. 26, 2020 (22 pages).
Reed M.G., Syverson P.F. Goldschlag D.M., Protocols Using Anonymous Connections: Mobile applications, Lecture Notes in Computer Science, vol. 1361, Springer, Berlin, Heidelberg, 1997 (11 pages).
Nick Mathewon, and Roger Dingledine, Location Diversity in Anonymity Networks, In Proceedings of the 2004 ACM workshop on Privacy in the electronic society. Association for Computing Machinery, New York, NY, USA 66-67 (11 pages).
Mathew Edman and Paul Syverson, As-Awareness in Tor Path Selection, In Proceedings of the 16th ACM conference on Computer and Communication Security (CCS 09). Association for Computing Machinery, New York, NY, USA 380-389 (10 pages).
Banerjee, Priyanka, Anonymous Routing in Wireless Networks: Onion Routing, Team Project Report 2007, p. 1-16 (16 pages).
McCoy D., Bauer K., Grunwald D., Kohno T., Sicker D., Shining Light in Dark Places: Understandings the Tor Network, Lecture Notes in Computer Science, vol. 5134, Springer, Berlin, Heidelberg, 2008 (14 pages).
Harry Newton, Newton's Telecom Dictionary, Mar. 2004, CNP Books, p. 182, 183, 433, 434, 435, 437, 665, 737 (10 pages).
Chakravarty et al., Identifying Proxy Nodes in a Tor Anonymization Circuit, 2008, IEEE International Conference on Signal Image Technology and Internet Based Systems, Bali, 2008, pp. 633-639 (7 pages).
Orfali et al., Client/Server Survival Guide, 3rd ed., John Wiley and Sons Inc. 1999, p. 15 (3 pages).
Reed M.G., Syverson P.F., Goldschlag D.M., Proxies for Anonymous Routing, In Proceedings 12th Annual Computer Security Applications Conference, 1996, pp. 95-104 (10 pages).
Dejuan Lukan, "Achieving Anonymity with Tor Part 2: Proxies and DNS Servers", InfoSec Resource, Aug. 16, 2012 (20 pages).
Rajkurnar Buyya et al., "Content Delivery Networks" ® 2008 Springer-Verlag Berlin Heidelberg (392 pages).
Request for Comments 1123, "Requirements for Internet Hosts—Application and Support", Oct. 1989 (98 pages).
Andrew S. Tanenbaum, "Computer Networks", 4th Edition, 2003 (908 pages).
Chou Chie Ming et al., "Triggering and Relay Node Selection for Self-User Relaying", IEEE Communications Letters, vol. 19, No. 11, Nov. 1, 2015 pp. 2029-2032 (4 pages).
Request for Comments 2396, "Uniform Resource Identifiers (URI): Generic Syntax", Aug. 1998 (40 pages).
Ashish Mohta, worldproxy202—Proxy that's pretty useful, available at https://web.archive.org/web/20080601050011/http://www.technospot.net/blogs/worldproxy202-proxy-that's-pretty-useful, Jun. 1, 2006 (6 pages).
Wikioedia article on "Routing", https://en.wikipedia.org/wiki/Routing Jul. 26, 2021 (8 pages).
International Search Report of PCT/US2010/034072 dated Jul. 1, 2010.
Screen captures from YouTube video clip entitle "nVpn net | Double your Safety and use Socks5 + nVpn" , last accessed Nov. 20, 2018 <https://www.youtube.com/watch?v=L0Hct2kSnn4> (38 pages).
Screen captures from YouTube video clip entitle "Andromeda" , publicly known and available as of at least 2011 <https://www.youtube.com/watch?v=yRRYpFLbKNU> (47 pages).
Screen captures from YouTube video clip entitle "Change Your Country IP Address & Location with Easy Hide IP Software", publicly known and available as of at least 2011, <https://www.youtube.com/watch?v=ulwkf1sOfdA and https://www.youtube.com/watch?v=iFEMT-o9DTc> (9 pages).
SpyEye, https://www.symantec.com/security-center/writeup/2010-020216-0135-9; http://securesql.info/riskyclouds/spyeye-user-manual; known as of at least 2010 (13 pages).
CoralCDN ("CoralCDN"), https://pdos.csail.mit.edu/6.824/papers/freedman-coral.pdf (14 pages).
International Search Report issued in PCT Application No. PCT/US2010/051881 dated Dec. 9, 2010.

(56) References Cited

OTHER PUBLICATIONS

Supplementary European Search Report issued in EP Application No. 10822724 dated Apr. 24, 2013.
Notice of Preliminary Rejection in KR Application No. 10-2012-7011711 dated Jul. 15, 2016.
YouTube video clip entitled "nVpn.net | Double your Safety and use Socks5 + nVpn" <https://www.youtube.com/watch?v=L0Hct2kSnn4>.
YouTube video clip entitled "Andromeda" <https://www.youtube.com/watch?v=yRRYpFLbKNU>.
YouTube video clip entitled "Change Your Country IP Address & Location with Easy Hide IP Software" <https://www.youtube.com/watch?v=ulwkf1sOfdA and https://www.youtube.com/watch?v=iFEMT-o9DTc>.
Kozierok, The TCP/IP Guide—TCP Connection Preparation, Apr. 6, 2005 (3 pages).
Jovovic, Turning your HD TV into an Android SmartTV is easier than you think!, Feb. 26, 2013 (3 pages).
Allen, A Software Developer's Guide to HTTP Part III—Connections, Jan. 26, 2012 (10 pages).
Google Scholar: MorphMix citation in Alessandro Acquisti, et al., Digital Privacy: Theory, Technologies, and Practices (2007) (2 pages).
RFC 959, File Transfer Protocol (FTP), Oct. 1985 (69 pages).
RFC 821, Jonathan B. Postel, Simple Mail Transfer Protocol, Aug. 1982 (70 pages).
RFC 918, Post Office Protocol, Oct. 1984 (5 pages).
RFC 937, Post Office Protocol—Version 2, Feb. 1985 (24 pages).
Roger Dingledine et al., "The Free Haven Project: Distributed Anonymous Storage Service", Dec. 17, 2000 (23 pages).
Michael Freedman et al., "Tarzan: A Peer-to-Peer Anonymizing Network Layer", Nov. 18-22, 2002 (14 pages).
RFC 791, Darpa Internet Program Protocol Specification, Sep. 1981 (49 pages).
RFC 1034, "Domain Names—Concepts and Facilities", Nov. 1987 (55 pages).
RFC 1035, "Domain Names—Implementation and Specification", Nov. 1987 (54 pages).
RFC 1939, Post Office Protocol—Version 3, May 1996 (23 pages).
RFC 2186, Internet Cache Protocol (ICP), version 2, Sep. 1997 (9 pages).
W3C, Glossary of Terms for Device Independence, Jan. 2005 (12 pages).
RFC 1001: Protocol Standard for a NetBIOS Service on a TCP/UDP Transport: Concepts and Methods, Mar. 1987 (68 pages).
RFC 1630: Universal Resource Identifiers in WWW, Jun. 1994 (28 pages).
RFC 2960: Stream Control Transmission Protocol, Oct. 2000 (134 pages).
L.L. Peterson, B.S. Davie, Computer Networks: A Systems Approach, 4th ed., San Francisco, CA, 2007 (20 pages).
Mell et al., "Creating a Patch and Vulnerability Management Program", NIST Special Publication 800-40 Version 2.0, 2005 (76 pages).
Rowstron et al., "Pastry: Scalable, Decentralized Object Location, and Routing for Large-Scale Peer-to-Peer Systems", IFIP/ACM International Conference on Distributed Systems Platforms and Open Distributed Processing: Middleware 2001, pp. 329-350 (22 pages).
Ratnasamy, et al., "Topologically aware overlay construction and server selection", Proceedings Twenty-First Annual Joint Conference of the IEEE Computer and Communications Societies, vol. 3, pp. 1190-1199 (2002) (10 pages).
Padmanabhan et al., "An Investigation of Geographic Mapping Techniques for Internet Hosts", ACM SIGCOMM Computer Communication Review, vol. 3, No. 4, pp. 173-185 (2001) (13 pages).
Freedman et al., "OASIS: Anyeast for Any Service", Proceedings of the 3rd Conference on Networked Systems Design & Implementation, vol. 3, pp. 129-142 (2006) (14 pages).
Agarwal et al., "Matchmaking for Online Games and Other Latency-Sensitive P2P Systems", ACM SIGCOMM Computer Communication Review, vol. 39. No. 4, pp. 315-326 (2009) (12 pages).
H. Casanova, "Benefits and Drawbacks of Redundant Batch Requests", Journal of Grid Computing, vol. 5, pp. 235-250 (2007) (16 pages).
S. J. Murdoch, "New Tor distribution for testing: Tor Browser Bundle", Jan. 30, 2008 post to tor-talk mailing list (1 page).
Erich Gamma et al., Design Patterns: Elements of Reusable Object-Oriented Software (1st ed., 1994) (12 pages).
L.J Fogel et al., "Modeling the Human Operator with Finite-State Machines" NASA Contractor Report (Jul. 1968) (238 pages).
MacPherson Decl. Exh. A, IEEE 802.11-2007—Telecommunications and Information Exchange Between Systems—Local and Metropolitan Area Networks—Specific Requirements—Part 11: Wireless LAN Medium Access Control (MAC) and Physical Layer (PHY) Specifications, Revision of ANSI/IEEE Std 802.11, 1999 Edition (R2003) (1236 pages).
W. R. Stevens "TCP/IP Illustrated, vol. I: The Protocols", Addison Wesley Longman, Inc. 1994 (67 pages).
Michael J. Freedman et al., "Democratizing content publication with Coral", In Proc. 1st Symposium, Mar. 2004 (14 pages).
Andy Oram, "Peer-to-Peer: Harnessing the Power of Disruptive Technology", Chapters Accountability and Free Haven, First Edition Mar. 2001 (265 pages).
RFC 2109, HTTP State Management Mechanism, Feb. 1997 (21 pages).
Reed et al, "Anonymous Connections and Onion Routing", Naval Research Laboratory, Mar. 1998 https://www.onion- router.net/Publications/JSAC-1998.pdf (Year: 1998).
European Search Report for EP 14182547.1, dated Jul. 30, 2015.
R. Fielding et al., RFC 2616: Hypertext Transfer Protocol—HTTP/1.1, Jun. 1999, retrieved from the Internet http://rcf-editor.org [retrieved Apr. 15, 2002].
"On the leakage of personally identifiable information via online social networks", Wills et al. AT&T, Apr. 2009 http://www2.research.att.com/-bala/papers/wosn09.pdf.
Dejan Lukan, Achieving Anonymity with Tor Part 2: Proxies and DNA Servers, INFOSEC Aug. 16, 2012 (17 pages).
Kim et al, "RAD: Recipient Anonymous Data Delivery Based on Public Routing Proxies" Computer Notworks, vol. 55, Issue 15 Elsevier, Science Direct, Oct. 27, 2011 (16 pages).
Arndt Rachel, "How to get around Country-Specific streaming rules" Jul. 31, 2013 (2 pages).
Anonymous, "Where is located a website? Website location finder : IPVoid", Mar. 20, 2019 (1 page).
Authors Alain Durand (IMAG) et al., "IPv6 Tunnel Broker <draft-ietf-ngtrans-broker-00_txt>", Internet Society (ISOC), Apr. 2, 1999 (14 pages).
Sophie Gastellier-Prevost et al., "Defeating pharming attacks at the client-side", Network and System Security (NSS), Sep. 6, 2011 (8 pages).
Bharat K et al. "Mirror, Mirror on the Web: a study of host pairs with replicated content", Computer Networks, Amsterdam, vol. 31, No. 11-16, May 17, 1999 (12 pages).
European Search Report of EP 20190259 dated Dec. 16, 2020.
European Search Report of EP 20195090 dated Dec. 8, 2020.
Michael K. Reiter and Aviel D. Rubin, "Crowds: Anonymity for Web Transactions", ACM Transactions on Information and System Security, Nov. 1998 (27 pages).
Rennhard, Marc, "MorphMix—A Peer-to-Peer based System for Anonymous Internet Access", 2004 (307 pages).
HAProxy Architecture Guide, Version 1.2.18, Willy Tarreau, May 25, 2008 (23 pages).
RFC 760, Dod Standard Internet Protocol, Jan. 1980 (46 pages).
HAProxy Reference Manual, Version 1.2.18, Willy Tarreau, May 25, 2008 (40 pages).
RFC 1180, A TCP/IP Tutorial, Jan. 1991 (28 pages).
RFC 1122, Requirements for Internet Hosts—Communication Layers, Oct. 1989 (116 pages).
Andrei Popescu, Google, Inc, Geolocation API Specification, W3C Working Draft Dec. 22, 2008 (8 pages).
Andrei Popescu, Google, Inc, Geolocation API Specification, W3C Recommendation Oct. 24, 2013 (10 pages).

(56) References Cited

OTHER PUBLICATIONS

Certification dated Nov. 8, 2019 of Anjali Shresta of Google, Proof of Date for VIP72 Youtube web page and video (4 pages).
William R. Stanek, Introducing Microsoft Windows Vista 81, 2006 (9 pages).
Gavin Gear, Windows 8 Task Manager In-Depth, Jun. 6, 2013 (32 pages).
Greg Shultz, Windows Vista's Task Manager: The harder-to-detect changes—TechRepublic, Feb. 21, 2007 (16 pages).
Scott Lowe, Use Resource Monitor to monitor network performance—TechRepublic, Jul. 29, 2011 (11 pages).
IETF RFC 2914, "Congestion Control Principles", Sep. 2000 (17 pages).
Berners-Lee et al., RFC 1945, Hypertext Transfer Protocol, HTTP/1.0 (May 1996) (60 pages).
IEEE Std 802-2001, IEEE Standard for Local and Metropolitan Area Networks: Overview and Architecture, Feb. 7, 2002 (47 pages).
RFC 2068, Hypertext Transfer Protocol—HTTP/1.1, Jan. 1997 (162 pages).
RFC 3022, Traditional IP Network Address Translator (Traditional NAT), Jan. 2001 (16 pages).
Michael J. Freedman, Princeton University, "Experiences with CoralCDN: a five-year operational view", Proceeding NSDI'10 Proceedings of the 7th USENIX conference on Networked systems design and implementation San Jose, California—Apr. 28-30, 2010 (17 pages).
"The BitTorrent Protocol Specification", Website: https://web.archive.org/web/20120513011037/http:/www.bittorrent.org/beps/bep_0003.html describing BitTorrent dated Jan. 10, 2008 downloaded using web archive on Aug. 16, 2019 (6 pages).
"BitTorrent", Website: https://en.wikipedia.org/w/index.php?title=BitTorrent&oldid=530466721 describing BitTorrent dated Dec. 30, 2012 downloaded using Wikipedia on Aug. 16, 2019 (9 pages).
"VIP SOCKS/VPN Service", Website: http://vip72.com:80/?drgn=1 describing VIP72 proxy service dated Jan. 2010 downloaded using VIP Technologies webpage on Aug. 16, 2019 (3 pages).
"Welcome to Easy Hide IP", Website: https://web.archive.org/web/20130702093456/http://www.easy-hide-ip.com:80/describing Easy Hide IP dated Jun. 26, 2007 downloaded using web archive on Aug. 16, 2019 (2 pages).
"You make it fun; we'll make it run", Website: https://web.archive.org/web/20130726050810/https://www.coralcdn.org describing CoralCDN dated Jan. 25, 2005 downloaded using web archive on Aug. 16, 2019 (2 pages).
"Net Transport", Website: http://www.xi-soft.com/default.htm describing Net Transport Overview dated 2005 downloaded using Net Transport webpage on Aug. 16, 2019 (2 pages).
Net Transport—Develop History, Website: http://www.xi-soft.com/download.htm describing Net Transport Download dated 2005 downloaded using Net Transport webpage on Aug. 16, 2019 (10 pages).
Net Transport FAQ, Website: http://www.xi-soft.com/faq.htm describing Net Transport FAQ dated 2005 downloaded using Net Transport webpage on Aug. 16, 2019 (4 pages).
Net Transport News, Website: http://www.xi-soft.com/news.htm describing Net Transport News dated 2005 downloaded using Net Transport webpage on Aug. 16, 2019 (5 pages).
International Search Report issued in PCT Application No. PCT/IL2020/050335 dated Nov. 16, 2020.
Written Opinion issued in PCT Application No. PCT/IL2020/050335 dated Nov. 16, 2020.
David Fifield et al., "Blocking resistant communication through domain fronting", Proceeding on Privacy Enhanching Technologies 2015, May 15, 2015 (19 pages).
Wang Qiyan et al., "CensorSpoofer: Asymmetric Communication with IP Spoofing for ensorship-Resistant Web Browsing", Mar. 9, 2012 (16 pages).
Floss Manuals, "Circumvention Tools", Free Software Foundation Inc., May 31, 2021 (240 pages).
Cisco Systems, Inc. (Jul. 1999), publication No. 1-587005-001-3, "Internetworking Technologies Handbook" Chapter 5: "Routing Basics" (pp. 5-1 to 5-10) (5 pages).
Cisco Systems, Inc. (Jul. 1999), publication No. 1-587005-001-3, "Internetworking Technologies Handbook" Chapter 30: "Internet Protocols" (pp. 30-31 to 30-16) (16 pages).
Cisco Systems, Inc. (Jul. 1999), publication No. 1-587005-001-3, "Internetworking Technologies Handbook" Chapter 32: "IPv6" (pp. 32-1 to 32-6) (6 pages).
Cisco Systems, Inc. (Jul. 1999), publication No. 1-587005-001-3, "Internetworking Technologies Handbook" Chapter 45: "OSI Routing" (pp. 45-1 to 45-8) (8 pages).
Cisco Systems, Inc. (Jul. 1999), publication No. 1-587005-001-3, "Internetworking Technologies Handbook" Chapter 51: "Security" (pp. 51-1 to 51-12) (12 pages).
IBM Corporation, International Technical Support Organization Redbook Documents No. GG24-4756-00, "Local Area Network Concepts and Products: LAN Operation Systems and Management", 1st Edition May 1996 (216 pages).
Redbook Document No. GG24-4338-00, "Introduction to Networking Technologies", 1st Edition Apr. 1994 (222 pages).
Redbook Document No. SG24-2580-01 "Ip Network Design Guide", 2nd Edition Jun. 1999 (324 pages).
Redbook Document No. GG24-3376-07 "TCP/IP Tutorial and Technical Overview", ISBN 0738494682 8th Edition Dec. 2006 (1004 pages).
IETF RFC 7231, " Hypertext Transfer Protocol (HTTP/1.1): Semantics and Content", Jun. 2014 (101 pages).
Microsoft publication entitled: "Inside-Out Windows Server 2012", by William R. Stanek, published 2013 by Microsoft Press. (1552 pages).
"UNIX Tutorial" by tutorialspoint.com, downloaded on Jul. 2014 (152 pages).
"Windows Internals—Part 1" by Mark Russinovich, David A. Solomon, and Alex loescu, published by Microsoft Press in 2012 (752 pages).
"Windows Internals—Part 2", by Mark Russinovich, David A. Solomon, and Alex Ioescu, published by Microsoft Press in 2012 (672 pages).
Jerry Honeycutt, "Introducing Windows 8—An Overview for IT Professionals" Microsoft Press 2012 (168 pages).
Samsung Electronics Co., Ltd. presentation entitled: "Google™ Chrome OS User Guide" published 2011 (41 pages).
Application Note No. RES05B00008-0100/Rec. 1.00 by Renesas Technology Corp. entitled: "R8C Family—General RTOS Concepts", published Jan. 2010 (20 pages).
Walter Cedeno et al., "An Overview of Real-Time Operating Systems", The Association for Laboratory Automation, Feb. 2007 (6 pages).
Chapter 2 entitled: "Basic Concepts of Real Time Operating Systems" of a book entitled: "Hardware-Dependent Software—Principles and Practice", published 2009 [ISBN-978-1-4020-9435-4] by Springer Science + Business Media B.V. (304 pages).
Nicolas Melot, "Study of an operating system: FreeRTOS—Operating systems for embedded devices", (downloaded Jul. 2015) (39 pages).
Dr. Richard Wall entitled: "Carebot PIC32 MX7ck implementation of Free RTOS", (dated Sep. 23, 2013) (18 pages).
"FreeRTOS™ Modules" published in the www,freertos.org website dated Nov. 26, 2006 (112 pages).
Rich Goyette of Carleton University as part of 'SYSC5701: Operating System Methods for Real-Time Applications', entitled: "An Analysis and Description of the Inner Workings of the FreeRTOS Kernel", published Apr. 1, 2007 (46 pages).
Sun Microsystem Inc., "tmpfs: A Virtual Memory File System" by Peter Snyder, downloaded on Jul. 2014 (8 pages).
"Microsoft Windows Driver Model (WDM)", by Mohamad (Hani) Atassy, submitted to Dr. Dennis R. Hafermann dated Jan. 28, 2002 (32 pages).
Melekam Tsegaye and Ricahrd Foss, both from Rhodes University, South-Africa, "A Comparison of the Linux and Windows Device Driver Architecture", downloaded from the Internet on Jul. 2014 (26 pages).

(56) References Cited

OTHER PUBLICATIONS

Prof. M. Saeed, "Welcome to Version 2.0 of the Win32 API Tutorial", published by Brook Miles, downloaded from the Internet on Jul. 2014 (108 pages).
IBM Corporation (headquartered in Armonk, New York) publication No. SC34-2597-03, "Device Drivers, Features, and Commands on Red Hat Enterprise Linux 6.3", IBM Corporation 2002, 2012, downloaded from the Internet on Jul. 2014 (580 pages).
Wofgang Mauerer, "Professional Linux Kernel Architecture", Wiley Publishing, Inc., published 2008 (1370 pages).
Peter Jay Salzman, Michael Burian, and Ori Pomerantz, "The Linux Kernel Module Programming Guide" ver. 2.6.4, from Rhodes University, South-Africa, dated May 18, 2007, downloaded from the Internet on Jul. 2014 (82 pages).
"Filter Driver Development Guide" Version 1.0a by Microsoft Corporation, dated 2004 (28 pages).
Brian Mariani, "Userland Hooking in Windows", presentation by High-Tech Bridge SA, dated Aug. 2011 (33 pages).
Brian Mariani, "Inline Hooking in Windows", presentation by High-Tech Bridge SA, dated Sep. 2011 (26 pages).
Marko Vuskovic 1998-2002 publication 'Operating Systems', Chapter 9: "Interprocess Communication" (20 pages.
Amin Tootoonchian, "Tutorial on Socket Programming", University of Toronto, Department of Computer Science, downloaded on Aug. 2014 (27 pages).
SAS Institute Inc. SHARE Session 5958 tutorial 'C Socket Programming Tutorial', "Writing Client / Server Programs in C Using Sockets (A Tutorial) Part I", by Greg Granger, dated Feb. 1998 (31 pages).
Alan Grosskurth and Michael W. Godfrey of the University of Waterloo in Canada, "Architecture and evolution of the modern web browser", Jun. 20, 2006 (24 pages).
"Step by Step Tutorials for Microsoft Internet Explorer 8 Accessibility Options" Microsoft 2009 publication (25 pages).
Apple publication entitled: "Safari Web Content Guide", dated Oct. 12, 2011 (113 pages).
IPhone 6 technical specification (retrieved Oct. 2015 from www.apple.com/iphone-6/specs/) (32 pages).
User Guide, "iPhone User Guide for iOS 8.4 Software", dated 2015 (019-00155/2015-06) by Apple Inc. (196 pages).
User manual numbered English (EU), "SM-G925F SM-G925FQ SM-G925I User Manual" Mar. 2015 (Rev. 1.0) (145 pages).
Galaxy S6 Edge—Technical Specification (retrieved Oct. 2015 from www.samsung.com/us/explore/galaxy-s-6-features-and-specs) (1 page).
"Android Tutorial", downloaded from tutorialspoint.com on Jul. 2014 (216 pages).
"iOS Tutorial", downloaded from tutorialspoint.com on Jul. 2014 (185 pages).
Hans-Petter Halvorsen, "Introduction to Database Systems", Telemark University College, dated Mar. 3, 2014 (40 pages).
Tutorial entitled: "Oracle / SQL Tutorial" by Michael Gertz of University of California, revised Version 1.01, Jan. 2000 (66 pages).
Yong Wang et al., "Towards Street-Level Client-Independent IP Geolocation", 2011 (14 pages).
Information Systems Audit and Control Association (ISACA) white paper entitled: "Geolocation: Risk, Issues and Strategies", 2011 (13 pages).
Book by John Wiley & Sons, Inc., "Cloud Computing and Virtualization" authored by Dac-Nhuong Le et al, published 2018 [ISBN 978-1-119-48790-6] (223 pages).

* cited by examiner

100

| | 102a | 102b | 102c | 102d | 102e | 102f | 102g | 102h |
|---|---|---|---|---|---|---|---|---|
| 101 | Date - Time | Tunnel IP Address | Geographic Location | ASN | Connection Type | Operating System | BW (Kb/s) | RTT (ms) |
| 101a | 3/5 – 19:35 | 80.12.105.150 | Paris, France | 3215 | VDSL | Chrome 2.0 | 1000 | 30 |
| 101b | 3/5 - 19:38 | 176.94.1.17 | Munich, Germany | 3209 | 3G | iOS 3.0 | 350 | 70 |
| 101c | 5/5 - 00:05 | 162.115.192.24 | Boston, MA, USA | 12079 | DOCSIS | Windows 10 | 2500 | 540 |
| 101d | 11/5 -00:07 | 83.220.232.67 | Moskow, Russia | 16345 | ADSL | Windows 7 | 1400 | 170 |
| 101e | 12/5 - 00:15 | 185.93.228.98 | Riad, Saudi-Arabia | 30148 | WiFi | Android 2.0 | 1200 | 120 |
| 101f | 12/5 - 05:38 | 59.144.192.23 | Mumbai, India | 9498 | 4G/LTE | iOS 4.0 | 2100 | 230 |
| 101g | 12/5 - 22:13 | 200.196.224.89 | San-Paulo, Brazil | 11419 | ADSL | Chrome 3.0 | 800 | 310 |

| | 102a | 102b | 102c | 102d | 102e | 102f | 102g | 102h | 102i |
|---|---|---|---|---|---|---|---|---|---|
| 101 | Date - Time | Tunnel IP Address | Geographic Location | ASN | Connection Type | Operating System | BW (Kb/s) | RTT (ms) | IDLE |
| 101a | 3/5 – 19:35 | 80.12.105.150 | Paris, France | 3215 | VDSL | Chrome 2.0 | 1000 | 30 | Y |
| 101b | 3/5 - 19:38 | 176.94.1.17 | Munich, Germany | 3209 | 3G | iOS 3.0 | 350 | 70 | N |
| 101c | 5/5 - 00:05 | 162.115.192.24 | Boston, MA, USA | 12079 | DOCSIS | Windows 10 | 2500 | 540 | N |
| 101d | 11/5 -00:07 | 83.220.232.67 | Moskow, Russia | 16345 | ADSL | Windows 7 | 1400 | 170 | Y |
| 101e | 12/5 - 00:15 | 185.93.228.98 | Riad, Saudi-Arabia | 30148 | WiFi | Android 2.0 | 1200 | 120 | Y |
| 101f | 12/5 - 05:38 | 59.144.192.23 | Mumbai, India | 9498 | 4G/LTE | iOS 4.0 | 2100 | 230 | N |
| 101g | 12/5 - 22:13 | 200.196.224.89 | San-Paulo, Brazil | 11419 | ADSL | Chrome 3.0 | 800 | 310 | Y |

FIG. 37
NETFLIX
14:57
Unlimited Movies, TV shows, and more.
Watch anywhere. Cancel anytime.
WATCH FREE FOR 30 DAYS

| | 512a | 512b | 512c |
|---|---|---|---|
| 511 | **URL** | Fetching Scheme | Proxy Server |
| 511a | URL#21 | Direct | |
| 511b | URL#22 | Non-Direct | Proxy#1 |
| 511c | URL#23 | Direct | |
| 511d | URL#24 | Non-Direct | Proxy#2 |
| 511e | URL#25 | Non-Direct | Proxy#3 |
| 511f | URL#26 | Direct | |

| | 512a | 512b | 512c |
|---|---|---|---|
| 511 | **URL** | Fetching Scheme | Proxy Server |
| 511a | URL#21 | Direct | |
| 511b | URL#22 | Non-Direct | Proxy#1 |
| 511c | URL#23 | Direct | |
| 511d | URL#24 | Non-Direct | Proxy#2 |
| 511e | URL#25 | Non-Direct | Proxy#3 |
| 511f | URL#26 | Direct | |
| 531c | URL#33 | Direct | |
| 531e | URL#35 | Non-Direct | Proxy#6 |

| | |
|---|---|
| 454a | URL#1 |
| 454b | URL#2 |
| 454c | URL#3 |
| 454d | URL#4 |
| 454e | URL#5 |
| 454f | URL#6 |

451

| | 452a | 452b | 452c |
|---|---|---|---|
| | Web Server Country | Tunnel Country | Usage Counter |
| 451a | China | US | 325 |
| 451b | China | UK | 120 |
| 451c | China | Argentina | 35 |
| 451d | China | Brazil | 30 |
| 451e | China | Bulgaria | 3 |
| 451f | Hungary | Egypt | 950 |
| 451g | Hungary | Lebanon | 82 |
| 451h | Hungary | Spain | 33 |
| 451i | Hungary | Germany | 14 |
| 451j | Israel | UK | 157 |
| 451k | Israel | Australia | 49 |
| 451l | Israel | US | 34 |
| 451m | Israel | Germany | 9 |

| | 452d | 452b | 452c |
| --- | --- | --- | --- |
| | Customer Country | Tunnel Country | Usage Counter |
| 451a → | China | US | 325 |
| 451b → | China | UK | 120 |
| 451c → | China | Argentina | 35 |
| 451d → | China | Brazil | 30 |
| 451e → | China | Bulgaria | 3 |
| 451f → | Hungary | Egypt | 950 |
| 451g → | Hungary | Lebanon | 82 |
| 451h → | Hungary | Spain | 33 |
| 451i → | Hungary | Germany | 14 |
| 451j → | Israel | UK | 157 |
| 451k → | Israel | Australia | 49 |
| 451l → | Israel | US | 34 |
| 451m → | Israel | Germany | 9 |

455

| | |
| --- | --- |
| URL#1 | 454a |
| URL#2 | 454b |
| URL#3 | 454c |
| URL#4 | 454d |
| URL#5 | 454e |
| URL#6 | 454f |

| | 472a | 472b | 472c | 472d | 472e | 472f |
|---|---|---|---|---|---|---|
| 471 | Customer IP | Cumulative Traffic Quota | Data Usage | Duration Quota | Duration Usage | Accounting Period |
| 471a | IP#1 | 2 GB | 85% | 2 Hours | 34% | 1 Week |
| 471b | IP#2 | 1 GB | 10% | 3 Hours | 100% | 1 Month |
| 471c | IP#3 | 5 GB | 100% | 23 Hours | 23% | 1 Day |
| 471d | IP#4 | 0.5 GB | 0% | 30 Minutes | 0% | 12 Hours |
| 471e | IP#5 | 5 GB | 4% | Unlimited | 0% | 1 Month |
| 471f | IP#6 | Unlimited | 0% | 1 Hour | 35% | 1 Week |
| 471g | IP#7 | 2 GB | 92% | 45 Minutes | 94% | 2 Days |

IP#3 Quota Table

480

| | 482a | 482b | 482c | 482d | 482e | 482f |
|---|---|---|---|---|---|---|
| 481 | URL Request | Cumulative Traffic Quota | Data Usage | Duration Quota | Duration Usage | Accounting Period |
| 481a | URL#1 | 3 GB | 91% | 2 Hours | 41% | 1 Month |
| 481b | URL#2 | 0.5 GB | 0% | 3 Hours | 0% | 1 Week |
| 481c | URL#3 | 4 GB | 100% | 3 Hours | 23% | 12 Hours |
| 481d | URL#4 | 0.2 GB | 0% | Unlimited | 0% | 1 Day |
| 481e | URL#5 | 6 GB | 3% | 30 Minutes | 10% | 1 Month |
| 481f | URL#6 | 2.5 GB | 12% | 1 Hour | 100% | 2 Days |

FIG. 48

SYSTEM AND METHOD FOR MANAGING NON-DIRECT URL FETCHING SERVICE

RELATED APPLICATION

This patent application is a continuation application of U.S. patent application Ser. No. 17/599,584 filed on Sep. 29, 2021, which is a national phase application of a PCT Application No. PCT/IL2020/050335 that was filed on Mar. 20, 2020 and which claims the benefit of U.S. Provisional Application Ser. No. 62/827,889, which was filed on Apr. 2, 2019, and from U.S. Provisional Application Ser. No. 62/872,926, which was filed on Jul. 11, 2019, which are all hereby incorporated herein by reference in their entirety.

TECHNICAL FIELD

This disclosure relates generally to an apparatus and method for improving communication over the Internet by a non-direct fetching scheme that is based on using intermediate nodes, and in particular, overcoming Internet blocking and optimizing the usage and the management of the non-direct fetching service.

BACKGROUND

Unless otherwise indicated herein, the materials described in this section are not prior art to the claims in this application and are not admitted to be prior art by inclusion in this section.

The Internet is a global system of interconnected computer networks that use the standardized Internet Protocol Suite (TCP/IP), including the Transmission Control Protocol (TCP) and the Internet Protocol (IP), to serve billions of users worldwide. It is a network of networks that consists of millions of private, public, academic, business, and government networks, of local to global scope, that are linked by a broad array of electronic and optical networking technologies. The Internet carries a vast range of information resources and services, such as the interlinked hypertext documents on the World Wide Web (WWW) and the infrastructure to support electronic mail. The Internet backbone refers to the principal data routes between large, strategically interconnected networks and core routers in the Internet. These data routes are hosted by commercial, government, academic, and other high-capacity network centers, the Internet exchange points and network access points that interchange Internet traffic between the countries, continents and across the oceans of the world. Traffic interchange between Internet service providers (often Tier 1 networks) participating in the Internet backbone exchange traffic by privately negotiated interconnection agreements, primarily governed by the principle of settlement-free peering.

The Transmission Control Protocol (TCP) is one of the core protocols of the Internet Protocol suite (IP) described in RFC 675 and RFC 793, and the entire suite is often referred to as TCP/IP. TCP provides reliable, ordered and error-checked delivery of a stream of octets between programs running on computers connected to a local area network, intranet or the public Internet. It resides at the transport layer. Web browsers typically use TCP when they connect to servers on the World Wide Web, and used to deliver email and transfer files from one location to another. HTTP, HTTPS, SMTP, POP3, IMAP, SSH, FTP, Telnet and a variety of other protocols that are typically encapsulated in TCP. As the transport layer of TCP/IP suite, the TCP provides a communication service at an intermediate level between an application program and the Internet Protocol (IP). Due to network congestion, traffic load balancing, or other unpredictable network behavior, IP packets can be lost, duplicated, or delivered out of order. TCP detects these problems, requests retransmission of lost data, rearranges out-of-order data, and even helps minimize network congestion to reduce the occurrence of the other problems. Once the TCP receiver has reassembled the sequence of octets originally transmitted, it passes them to the receiving application. Thus, TCP abstracts the application's communication from the underlying networking details. The TCP is utilized extensively by many of the Internet's most popular applications, including the World Wide Web (WWW), E-mail, File Transfer Protocol, Secure Shell, peer-to-peer file sharing, and some streaming media applications.

While IP layer handles actual delivery of the data, TCP keeps track of the individual units of data transmission, called segments, which a message is divided into for efficient routing through the network. For example, when an HTML file is sent from a web server, the TCP software layer of that server divides the sequence of octets of the file into segments and forwards them individually to the IP software layer (Internet Layer). The Internet Layer encapsulates each TCP segment into an IP packet by adding a header that includes (among other data) the destination IP address. When the client program on the destination computer receives them, the TCP layer (Transport Layer) reassembles the individual segments and ensures they are correctly ordered and error free as it streams them to an application.

The TCP protocol operations may be divided into three phases. Connections must be properly established in a multi-step handshake process (connection establishment) before entering the data transfer phase. After data transmission is completed, the connection termination closes established virtual circuits and releases all allocated resources. A TCP connection is typically managed by an operating system through a programming interface that represents the local end-point for communications, the Internet socket. During the duration of a TCP connection, the local end-point undergoes a series of state changes.

Since TCP/IP is based on the client/server model of operation, the TCP connection setup involves the client and server preparing for the connection by performing an OPEN operation. A client process initiates a TCP connection by performing an active OPEN, sending a SYN message to a server. A server process using TCP prepares for an incoming connection request by performing a passive OPEN. Both devices create for each TCP session a data structure used to hold important data related to the connection, called a Transmission Control Block (TCB).

There are two different kinds of OPEN, named 'Active OPEN' and 'Passive OPEN'. In Active OPEN the client process using TCP takes the "active role" and initiates the connection by actually sending a TCP message to start the connection (a SYN message). In Passive OPEN the server process designed to use TCP is contacting TCP and saying: "I am here, and I am waiting for clients that may wish to talk to me to send me a message on the following port number". The OPEN is called passive because aside from indicating that the process is listening, the server process does nothing. A passive OPEN can in fact specify that the server is waiting for an active OPEN from a specific client, though not all TCP/IP APIs support this capability. More commonly, a server process is willing to accept connections from all corners. Such a passive OPEN is then to be unspecified.

In passive OPEN, the TCP uses a three-way handshake, and before a client attempts to connect with a server, the server must first bind to and listen at a port to open it up for connections. Once the Passive OPEN is established, a client may initiate an Active OPEN. To establish a connection, the three-way (or 3-step) handshake occurs:

1. SYN: The active open is performed by the client sending a SYN to the server. The client sets the segment's sequence number to a random value A.
2. SYN-ACK: In response, the server replies with a SYN-ACK. The acknowledgment number is set to one more than the received sequence number, i.e. A+1, and the sequence number that the server chooses for the packet is another random number, B.
3. ACK: Finally, the client sends an ACK back to the server. The sequence number is set to the received acknowledgement value, i.e. A+1, and the acknowledgement number is set to one more than the received sequence number i.e. B+1.

At this point, both the client and server have received an acknowledgment of the connection. The steps 1, 2 establish the connection parameter (sequence number) for one direction and it is acknowledged. The steps 2, 3 establish the connection parameter (sequence number) for the other direction and it is acknowledged, and then a full-duplex communication is established.

TCP keepalive. When two hosts are connected over a network via TCP/IP, TCP Keepalive Packets can be used to determine if the connection is still valid, and terminate it if needed. Most hosts that support TCP also support TCP Keepalive, where each host (or peer) periodically sends a TCP packet to its peer which solicits a response. The TCP keepalive scheme involves using timers when setting up a TCP connection, and when the keepalive timer reaches zero, a keepalive probe packet is sent with no data in it and the ACK flag turned on. This procedure is useful because if the other peers lose their connection (for example by rebooting) the broken connection is noticed, even no traffic on it is exchanged. If the keepalive probe is not replied to, the connection cannot be considered valid anymore. The TCP keepalive mechanism may be used to prevent inactivity from disconnecting the channel. For example, when being behind a NAT proxy or a firewall, a host may be disconnected without a reason. This behavior is caused by the connection tracking procedures implemented in proxies and firewalls, which keep track of all connections that pass through them. Due to the physical limits of these machines, they can only keep a finite number of connections in their memory. The most common and logical policy is to keep newest connections and to discard old and inactive connections first.

A keepalive signal is often sent at predefined intervals, and plays an important role on the Internet. After a signal is sent, if no reply is received the link is assumed to be down and future data will be routed via another path until the link is up again. A keepalive signal can also be used to indicate to Internet infrastructure that the connection should be preserved. Without a keepalive signal, intermediate NAT-enabled routers can drop the connection after timeout. Since the only purpose is to find links that don't work or to indicate connections that should be preserved, keepalive messages tend to be short and not take much bandwidth.

Transmission Control Protocol (TCP) keepalives are an optional feature, and if included must default to off. The keepalive packet contains null data, and in an Ethernet network, a keepalive frame length is 60 bytes, while the server response to this, also a null data frame, is 54 bytes. There are three parameters related to keepalive: Keepalive time is the duration between two keepalive transmissions in idle condition where TCP keepalive period is required to be configurable and by default is set to no less than 2 hours, Keepalive interval is the duration between two successive keepalive retransmissions, if acknowledgement to the previous keepalive transmission is not received, and Keepalive retry is the number of retransmissions to be carried out before declaring that remote end is not available.

The Internet Protocol (IP) is the principal communications protocol used for relaying datagrams (packets) across a network using the Internet Protocol Suite. Responsible for routing packets across network boundaries, it is the primary protocol that establishes the Internet. IP is the primary protocol in the Internet Layer of the Internet Protocol Suite and has the task of delivering datagrams from the source host to the destination host based on their addresses. For this purpose, IP defines addressing methods and structures for datagram encapsulation. Internet Protocol Version 4 (IPv4) is the dominant protocol of the Internet. IPv4 is described in Internet Engineering Task Force (IETF) Request for Comments (RFC) 791 and RFC 1349, and the successor, Internet Protocol Version 6 (IPv6), is currently active and in growing deployment worldwide. IPv4 uses 32-bit addresses (providing 4 billion: $4.3\times10^9$ addresses), while IPv6 uses 128-bit addresses (providing 340 undecillion or $3.4\times10^{38}$ addresses), as described in RFC 2460.

An overview of an IP-based packet 15 is shown in FIG. 2*a*. The packet may be generally segmented into the IP data 16*b* to be carried as payload, and the IP header 16*f*. The IP header 16*f* contains the IP address of the source as Source IP Address field 16*d* and the Destination IP Address field 16*c*. In most cases, the IP header 16*f* and the payload 16*b* are further encapsulated by adding a Frame Header 16*e* and Frame Footer 16*a* used by higher layer protocols.

The Internet Protocol is responsible for addressing hosts and routing datagrams (packets) from a source host to the destination host across one or more IP networks. For this purpose the Internet Protocol defines an addressing system that has two functions. Addresses identify hosts and provide a logical location service. Each packet is tagged with a header that contains the meta-data for the purpose of delivery. This process of tagging is also called encapsulation. IP is a connectionless protocol for use in a packet-switched Link Layer network, and does not need circuit setup prior to transmission. The aspects of guaranteeing delivery, proper sequencing, avoidance of duplicate delivery, and data integrity are addressed by an upper transport layer protocol (e.g., TCP—Transmission Control Protocol and UDP—User Datagram Protocol).

The main aspects of the IP technology are IP addressing and routing. Addressing refers to how IP addresses are assigned to end hosts and how sub-networks of IP host addresses are divided and grouped together. IP routing is performed by all hosts, but most importantly by internetwork routers, which typically use either Interior Gateway Protocols (IGPs) or External Gateway Protocols (EGPs) to help make IP datagram forwarding decisions across IP connected networks. Core routers serving in the Internet backbone commonly use the Border Gateway Protocol (BGP) as per RFC 4098 or Multi-Protocol Label Switching (MPLS). Other prior art publications relating to Internet related protocols and routing include the following chapters of the publication number 1-587005-001-3 by Cisco Systems, Inc. (July 1999) entitled: "*Internetworking Technologies Handbook*", which are all incorporated in their entirety for all purposes as if fully set forth herein: Chapter 5*: "Routing Basics*" (pages 5-1 to 5-10), Chapter 30*: "Internet Protocols*" (pages 30-1 to 30-16), Chapter 32*: "IPv6*" (pages 32-1 to 32-6), Chapter 45*: "OSI Routing*" (pages 45-1 to 45-8) and Chapter 51: "Security" (pages 51-1 to 51-12), as well as in a IBM Corporation, International Technical Support Organization Redbook Documents No. GG24-4756-00, entitled: "*Local area Network Concepts and Products: LAN Operation Systems and management*", 1st Edition May 1996, Redbook Document No. GG24-4338-00, entitled: "*Introduction to Networking Technologies*", 1st Edition April 1994, Redbook Document No. GG24-2580-01 *"IP Network Design Guide*", 2nd Edition June 1999, and Redbook Document No. GG24-3376-07 *"TCP/IP Tutorial and Technical Overview*", ISBN 0738494682 8th Edition December 2006, which are incorporated in their entirety for all purposes as if fully set forth herein.

An Internet packet typically includes a value of Time-to-Live (TTL) for avoiding the case of packet looping endlessly. The initial TTL value is set in the header of the packet, and each router in the packet path subtracts one from the TTL field, and the packet is discarded upon the value exhaustion. Since the packets may be routed via different and disparately located routers and servers, the TTL of the packets reaching the ultimate destination computer are expected to vary.

The Internet architecture employs a client-server model, among other arrangements. The terms 'server' or 'server computer' relates herein to a device or computer (or a plurality of computers) connected to the Internet and is used for providing facilities or services to other computers or other devices (referred to in this context as 'clients') connected to the Internet. A server is commonly a host that has an IP address and executes a 'server program', and typically operates as a socket listener. Many servers have dedicated functionality such as web server, Domain Name System (DNS) server (described in RFC 1034 and RFC 1035), Dynamic Host Configuration Protocol (DHCP) server (described in RFC 2131 and RFC 3315), mail server, File Transfer Protocol (FTP) server and database server. Similarly, the term 'client' is used herein to include, but not limited to, a program or to a device or a computer (or a series of computers) executing this program, which accesses a server over the Internet for a service or a resource. Clients commonly initiate connections that a server may accept. For non-limiting example, web browsers are clients that connect to web servers for retrieving web pages, and email clients connect to mail storage servers for retrieving mails.

Web page. A web-page (or webpage) is typically a collection of information, consisting of one or more resources, intended to be rendered simultaneously, and identified by a single Uniform Resource Identifier. More specifically, a web page may consist of a resource with zero, one, or more embedded resources intended to be rendered as a single unit, and referred to by the URI of the one resource which is not embedded. A Uniform Resource Identifier (URI) is intended to be recognized by a user as representing the identity of a specific Web Page (resource). A resource may include a network data object or service that can be identified by a URI. Resources may be available in multiple representations (e.g. multiple languages, data formats, size, resolution) or vary in other ways. The URI specification defines a Uniform Resource Identifier (URI) or URL (Uniform Resource Locator) as a compact string of characters for identifying an abstract or physical resource.

HTTP. The Hypertext Transfer Protocol (HTTP) is an application protocol for distributed, collaborative, hypermedia information systems, commonly used for communication over the Internet. Hypertext is. HTTP is the protocol to exchange or transfer hypertext, which is a structured text that uses logical links (hyperlinks) between nodes containing text. HTTP version 1.1 was standardized as RFC 2616 (June 1999), which was replaced by a set of standards (obsoleting RFC 2616), including RFC 7230—HTTP/1.1: Message Syntax and Routing, RFC 7231—'HTTP/1.1: Semantics and Content', RFC 7232—'HTTP/1.1: Conditional Requests', RFC 7233—'HTTP/1.1: Range Requests', RFC 7234—'HTTP/1.1: Caching', and RFC 7235—'HTTP/1.1: Authentication'. HTTP functions as a request-response protocol in the client-server computing model. A web browser, for example, may be the client and an application running on a computer hosting a website may be the server. The client submits an HTTP request message to the server. The server, which provide resources such as HTML files and other content, or performs other functions on behalf of the client, returns a response message to the client. The response contains completion status information about the request and may also contain requested content in its message body. A web browser is an example of a User Agent (UA). Other types of user agent include the indexing software used by search providers (web crawlers), voice browsers, mobile apps and other software that accesses, consumes or displays web content.

HTTP is designed to permit intermediate network elements to improve or enable communications between clients and servers. High-traffic websites often benefit from web cache servers that deliver content on behalf of upstream servers to improve response time. Web browsers cache previously accessed web resources and reuse them when possible, to reduce network traffic. HTTP proxy servers at private network boundaries can facilitate communication for clients without a globally routable address, by relaying messages with external servers. HTTP is an application layer protocol designed within the framework of the Internet Protocol Suite. Its definition presumes an underlying and reliable transport layer protocol, and Transmission Control Protocol (TCP) is commonly used. However, HTTP can use unreliable protocols such as the User Datagram Protocol (UDP), for example, in the Simple Service Discovery Protocol (SSDP). HTTP resources are identified and located on the network by Uniform Resource Identifiers (URIs) or, more specifically, Uniform Resource Locators (URLs), using the http or https URI schemes. URIs and hyperlinks in Hypertext Markup Language (HTML) documents form webs of inter-linked hypertext documents. An HTTP session is a sequence of network request-response transactions. An HTTP client initiates a request by establishing a Transmission Control Protocol (TCP) connection to a particular port on a server. An HTTP server listening on that port waits for a client's request message. Upon receiving the request, the server sends back a status line, such as "HTTP/1.1 200 OK", and a message of its own. The body of this message is typically the requested resource, although an error message or other information may also be returned. HTTP is a stateless protocol. A stateless protocol does not require the HTTP server to retain information or status HTTP persistent connection, also called HTTP keep-alive, or HTTP connection reuse, refers to using a single TCP connection to send and receive multiple HTTP requests/responses, as opposed to opening a new connection for every single request/response pair. Persistent connections provide a mechanism by which a client and a server can signal the close of a TCP connection. This signaling takes place using the Connection header field. The HTTP persistent connection is described in IETF RFC 2616, entitled: "*Hypertext Transfer Protocol—HTTP/*1.1". In HTTP 1.1, all connections are considered persistent unless declared otherwise. The HTTP persistent connections do not use separate keepalive messages, but they allow multiple requests to use a single connection. The advantages of using persistent connections involve lower CPU and memory usage (because fewer connections are open simultaneously), enabling HTTP pipelining of requests and responses, reduced network congestion (due to fewer TCP connections), and reduced latency in subsequent requests (due to minimal handshaking). Any connection herein may use, or be based on, an HTTP persistent connection.

HTTPS. HTTPS (also referred to as HTTP over Transport Layer Security (TLS), HTTP over SSL, and HTTP Secure) is a communications protocol for secure communication over a computer network which is widely used on the Internet. HTTPS consists of communication over Hypertext Transfer Protocol (HTTP) within a connection encrypted by Transport Layer Security, or its predecessor, Secure Sockets Layer. The main motivation for HTTPS is authentication of the visited website and protection of the privacy and integrity of the exchanged data. HTTPS typically provides authentication of the website and associated web server with which one is communicating, which protects against man-in-the-middle attacks. Additionally, it provides bidirectional encryption of communications between a client and server, which protects against eavesdropping and tampering with or forging the contents of the communication. In practice, this provides a reasonable guarantee that one is communicating with precisely the website that one intended to communicate with (as opposed to an impostor), as well as ensuring that the contents of communications between the user and site cannot be read or forged by any third party.

The HTTPS Uniform Resource Identifier (URI) scheme has identical syntax to the standard HTTP scheme, aside from its scheme token. However, HTTPS signals the browser to use an added encryption layer of SSL/TLS to protect the traffic. SSL/TLS is especially suited for HTTP, since it can provide some protection even if only one side of the communication is authenticated. This is the case with HTTP transactions over the Internet, where typically only the server is authenticated (by the client examining the server's certificate). HTTPS creates a secure channel over an insecure networks, hence ensuring reasonable protection from eavesdroppers and man-in-the-middle attacks, provided that adequate cipher suites are used and that the server certificate is verified and trusted. Because HTTPS piggybacks HTTP entirely on top of TLS, the entirety of the underlying HTTP protocol can be encrypted. This includes the request URL (which particular web page was requested), query parameters, headers, and cookies (which often contain identity information about the user). However, because host (website) addresses and port numbers are necessarily part of the underlying TCP/IP protocols, HTTPS cannot protect their disclosure. In practice this means that even on a correctly configured web server, eavesdroppers can infer the IP address and port number of the web server (sometimes even the domain name e.g., www.example.org, but not the rest of the URL) that one is communicating with, as well as the amount (data transferred) and duration (length of session) of the communication, though not the content of the communication.

Deploying HTTPS also allows the use of HTTP/2 (or its predecessor, the now-deprecated protocol SPDY), that are new generations of HTTP, designed to reduce page load times and latency. HTTP Strict Transport Security (HSTS) is typically used with HTTPS to protect users from man-in-the-middle attacks, especially SSL stripping. While HTTPS URLs begin with "https://" and use port 443 by default, or alternatively 8443, the HTTP URLs begin with "http://" and use port 80 by default, and HTTP is not encrypted and is thus vulnerable to man-in-the-middle and eavesdropping attacks, which can let attackers gain access to website accounts and sensitive information, and modify webpages to inject malware or advertisements. HTTPS is designed to withstand such attacks and is considered secure against them (with the exception of older, deprecated versions of SSL).

HTTP Status codes. The Hypertext Transfer Protocol (HTTP) is a stateless application-level protocol for distributed, collaborative, hypertext information systems. The semantics of HTTP/1.1 messages, as expressed by request methods, request header fields, response status codes, and response header fields, along with the payload of messages (metadata and body content) and mechanisms for content, are described in IETF RFC 7231, entitled: "*Hypertext Transfer Protocol* (*HTTP*/1.1): Semantics and Content" (June 2014), which is incorporated in its entirety for all purposes as if fully set forth herein. Status codes are typically issued by a server in response to a client request made to the server. The first digit of the status code specifies one of five standard classes of responses. The message phrases shown are typical, but any human-readable alternative may be provided.

All HTTP response status codes are separated into five classes or categories. The first digit of the status code defines the class of response, while the last two digits do not have any classifying or categorization role. There are five classes defined by the standard: 1xx (100 to 199) informational response—the request was received, continuing process; 2xx (200 to 299) successful—the request was successfully received, understood and accepted; 3xx (300-399) redirection—further action needs to be taken in order to complete the request; 4xx (400 to 499) client error—the request contains bad syntax or cannot be fulfilled; and 5xx (500 to 599) server error—the server failed to fulfil an apparently valid request.

The status code '200 OK' is a standard response for successful HTTP requests. The actual response will depend on the request method used. In a GET request, the response will contain an entity corresponding to the requested resource. In a POST request, the response will contain an entity describing or containing the result of the action.

The HTTP 404, '404 Not Found', '404', 'Page Not Found', or 'Server Not Found' error message is a Hypertext Transfer Protocol (HTTP) standard response code, in computer network communications, to indicate that the browser was able to communicate with a given server, but the server could not find what was requested. Further, when the requested information is found but access is not granted, the server may return a 404 error if it wishes to not disclose this information, as well. The website hosting server will typically generate a "404 Not Found" web page when a user attempts to follow a broken or dead link; hence the 404 error is one of the most recognizable errors encountered on the World Wide Web. When communicating via HTTP, a server is required to respond to a request, such as a web browser request for a web page, with a numeric response code and an optional, mandatory, or disallowed (based upon the status code) message. In the code 404, the first digit indicates a client error, such as a mistyped Uniform Resource Locator (URL). The following two digits indicate the specific error encountered. HTTP's use of three-digit codes is similar to the use of such codes in earlier protocols such as FTP and NNTP. At the HTTP level, a 404 response code is followed by a human-readable "reason phrase". The HTTP specification suggests the phrase "Not Found"[2] and many web servers by default issue an HTML page that includes both the 404 code and the "Not Found" phrase.

A 404 error is often returned when pages have been moved or deleted. In the first case, it is better to employ URL mapping or URL redirection by returning a 301 Moved Permanently response, which can be configured in most server configuration files, or through URL rewriting; in the second case, a 410 Gone should be returned. Because these two options require special server configuration, most websites do not make use of them. A 404 error indicates that the server itself was found, but that the server was not able to retrieve the requested page.

5xx Server errors indicate that the server failed to fulfill a request. Response status codes beginning with the digit "5" indicate cases in which the server is aware that it has encountered an error or is otherwise incapable of performing the request. Except when responding to a HEAD request, the server should include an entity containing an explanation of the error situation, and indicate whether it is a temporary or permanent condition. Likewise, user agents should display any included entity to the user. These response codes are applicable to any request method.

URL Redirection. URL redirection, also referred to as 'URL forwarding', is a technique for making a web page available under more than one URL address. When a web browser attempts to open a URL that has been redirected, a page with a different URL is opened. Similarly, domain redirection or domain forwarding is when all pages in a URL domain are redirected to a different domain, as when wikipedia.com and wikipedia.net are automatically redirected to wikipedia.org. URL redirection is done for various reasons: for URL shortening; to prevent broken links when web pages are moved; to allow multiple domain names belonging to the same owner to refer to a single web site; to guide navigation into and out of a website; for privacy protection; and for hostile purposes such as phishing attacks or malware distribution.

'3xx Redirection' is a class of status code indicates the client must take additional action to complete the request. Many of these status codes are used in URL redirection. A user agent may carry out the additional action with no user interaction only if the method used in the second request is GET or HEAD. A user agent may automatically redirect a request. A user agent should detect and intervene to prevent cyclical redirects. In the HTTP protocol used by the World Wide Web, a redirect is a response with a status code beginning with 3 that causes a browser to display a different page. If a client encounters a redirect, it needs to make a number of decisions how to handle the redirect. Different status codes are used by clients to understand the purpose of the redirect, how to handle caching and which request method to use for the subsequent request. The HTTP/1.1 defines several status codes for redirection (RFC 7231): 300 multiple choices (e.g. offer different languages); 301 moved permanently (redirects permanently from one URL to another passing link equity to the redirected page); 302 found (originally "temporary redirect" in HTTP/1.0 and popularly used for CGI scripts; superseded by 303 and 307 in HTTP/1.1 but preserved for backward compatibility); 303 see other (forces a GET request to the new URL even if original request was POST); 307 temporary redirect (provides a new URL for the browser to resubmit a GET or POST request); and 308 permanent redirect (provides a new URL for the browser to resubmit a GET or POST request).

ASN. Within the Internet, an Autonomous System (AS) is a collection of connected Internet Protocol (IP) routing prefixes under the control of one or more network operators on behalf of a single administrative entity or domain that presents a common, clearly defined routing policy to the Internet. Autonomous System (AS) Numbers (ASNs) are used by various routing protocols, and IANA allocates AS Numbers to Regional Internet Registries (RIRs). The RIRs further allocate or assign AS Numbers to network operators in line with RIR policies. Originally the definition required control by a single entity, typically an Internet Service Provider (ISP) or a very large organization with independent connections to multiple networks, that adhere to a single and clearly defined routing policy, as originally defined in RFC 1771. The newer definition in RFC 1930 came into use to support multiple organizations that run Border Gateway Protocol (BGP) using private AS numbers to an ISP that connects all those organizations to the Internet. Even though there may be multiple autonomous systems supported by the ISP, the Internet only sees the routing policy of the ISP. That ISP must have an officially registered Autonomous System Number (ASN). A unique ASN is allocated to each AS for use in BGP routing, and an ASN uniquely identifies each network on the Internet. ASN representation is described in IETF 5396 dated December 2008 and entitled: "*Textual Representation of Autonomous System (AS) Numbers*", and four octets ASKs are described in IETF RFC 6793 dated December 2012 entitled: "*BGP Support for Four-Octet Autonomous System (AS) Number Space*".

Autonomous systems can be grouped into four categories, depending on their connectivity and operating policy. A multihomed autonomous system is an AS that maintains connections to more than one other AS. This allows the AS to remain connected to the Internet in the event of a complete failure of one of their connections. However, unlike a transit AS, this type of AS would not allow traffic from one AS to pass through on its way to another AS. A stub autonomous system refers to an AS that is connected to only one other AS. This may be an apparent waste of an AS number if the network's routing policy is the same as its upstream AS's. However, the stub AS may, in fact, have peering with other autonomous systems that is not reflected in public route-view servers. Specific examples include private interconnections in the financial and transportation sectors. A transit autonomous system is an AS that provides connections through itself to other networks. That is, network A can use network B, the transit AS, to connect to network C. If one AS is an ISP for another, then the former is a transit AS. An Internet Exchange Point autonomous system (IX or IXP) is a physical infrastructure through which Internet service providers (ISPs) or content delivery networks (CDNs) exchange Internet traffic between their networks (autonomous systems).

OS. An Operating System (OS) is software that manages computer hardware resources and provides common services for computer programs. The operating system is an essential component of any system software in a computer system, and most application programs usually require an operating system to function. For hardware functions such as input and output and memory allocation, the operating system acts as an intermediary between programs and the computer hardware, although the application code is usually executed directly by the hardware and will frequently make a system call to an OS function or be interrupted by it. Common features typically supported by operating systems include process management, interrupts handling, memory management, file system, device drivers, networking (such as TCP/IP and UDP), and Input/Output (I/O) handling. Examples of popular modern operating systems include Android, BSD, iOS, Linux, OS X, QNX, Microsoft Windows, Windows Phone, and IBM z/OS.

A server device (in server/client architecture) typically offers information resources, services, and applications to clients, and is using a server dedicated or oriented operating system. Current popular server operating systems are based on Microsoft Windows (by Microsoft Corporation, headquartered in Redmond, Washington, U.S.A.), Unix, and Linux-based solutions, such as the 'Windows Server 2012' server operating system is part of the Microsoft 'Windows Server' OS family, that was released by Microsoft on 2012, providing enterprise-class datacenter and hybrid cloud solutions that are simple to deploy, cost-effective, application-focused, and user-centric, and is described in Microsoft publication entitled: "*Inside-Out Windows Server* 2012", by William R. Stanek, published 2013 by Microsoft Press, which is incorporated in its entirety for all purposes as if fully set forth herein.

Unix operating systems are widely used in servers. Unix is a multitasking, multiuser computer operating system that exists in many variants, and is characterized by a modular design that is sometimes called the "Unix philosophy," meaning the OS provides a set of simple tools that each perform a limited, well-defined function, with a unified filesystem as the main means of communication, and a shell scripting and command language to combine the tools to perform complex workflows. Unix was designed to be portable, multi-tasking and multi-user in a time-sharing configuration, and Unix systems are characterized by various concepts: the use of plain text for storing data; a hierarchical file system; treating devices and certain types of Inter-Process Communication (IPC) as files; and the use of a large number of software tools, small programs that can be strung together through a command line interpreter using pipes, as opposed to using a single monolithic program that includes all of the same functionality. Under Unix, the operating system consists of many utilities along with the master control program, the kernel. The kernel provides services to start and stop programs, handles the file system and other common "low level" tasks that most programs share, and schedules access to avoid conflicts when programs try to access the same resource or device simultaneously. To mediate such access, the kernel has special rights, reflected in the division between user-space and kernel-space. Unix is described in a publication entitled: "*UNIX Tutorial*" by tutorialspoint.com, downloaded on July 2014, which is incorporated in its entirety for all purposes as if fully set forth herein.

A client device (in server/client architecture) typically receives information resources, services, and applications from servers, and is using a client dedicated or oriented operating system. Current popular server operating systems are based on Microsoft Windows (by Microsoft Corporation, headquartered in Redmond, Washington, U.S.A.), which is a series of graphical interface operating systems developed, marketed, and sold by Microsoft. Microsoft Windows is described in Microsoft publications entitled: "*Windows Internals—Part* 1" and "*Windows Internals—Part* 2", by Mark Russinovich, David A. Solomon, and Alex Ioescu, published by Microsoft Press in 2012, which are both incorporated in their entirety for all purposes as if fully set forth herein. Windows 8 is a personal computer operating system developed by Microsoft as part of Windows NT family of operating systems, that was released for general availability on October 2012, and is described in Microsoft Press 2012 publication entitled: "*Introducing Windows 8—An Overview for IT Professionals*" by Jerry Honeycutt, which is incorporated in its entirety for all purposes as if fully set forth herein.

Chrome OS is a Linux kernel-based operating system designed by Google Inc. out of Mountain View, California, U.S.A., to work primarily with web applications. The user interface takes a minimalist approach and consists almost entirely of just the Google Chrome web browser; since the operating system is aimed at users who spend most of their computer time on the Web, the only "native" applications on Chrome OS are a browser, media player and file manager, and hence the Chrome OS is almost a pure web thin client OS.

The Chrome OS is described as including a three-tier architecture: firmware, browser and window manager, and system-level software and userland services. The firmware contributes to fast boot time by not probing for hardware, such as floppy disk drives, that are no longer common on computers, especially netbooks. The firmware also contributes to security by verifying each step in the boot process and incorporating system recovery. The system-level software includes the Linux kernel that has been patched to improve boot performance. The userland software has been trimmed to essentials, with management by Upstart, which can launch services in parallel, re-spawn crashed jobs, and defer services in the interest of faster booting. The Chrome OS user guide is described in the Samsung Electronics Co., Ltd. presentation entitled: "*Google™ Chrome OS USER GUIDE*" published 2011, which is incorporated in its entirety for all purposes as if fully set forth herein.

RTOS. A Real-Time Operating System (RTOS) is an Operating System (OS) intended to serve real-time applications that process data as it comes in, typically without buffer delays. Processing time requirements (including any OS delay) are typically measured in tenths of seconds or shorter increments of time, and is a time bound system which has well defined fixed time constraints. Processing is commonly to be done within the defined constraints, or the system will fail. They either are event driven or time sharing, where event driven systems switch between tasks based on their priorities while time sharing systems switch the task based on clock interrupts. A key characteristic of an RTOS is the level of its consistency concerning the amount of time it takes to accept and complete an application's task; the variability is jitter. A hard real-time operating system has less jitter than a soft real-time operating system. The chief design goal is not high throughput, but rather a guarantee of a soft or hard performance category. An RTOS that can usually or generally meet a deadline is a soft real-time OS, but if it can meet a deadline deterministically it is a hard real-time OS. An RTOS has an advanced algorithm for scheduling, and includes a scheduler flexibility that enables a wider, computer-system orchestration of process priorities. Key factors in a real-time OS are minimal interrupt latency and minimal thread switching latency; a real-time OS is valued more for how quickly or how predictably it can respond than for the amount of work it can perform in a given period of time.

Common designs of RTOS include event-driven, where tasks are switched only when an event of higher priority needs servicing; called preemptive priority, or priority scheduling, and time-sharing, where task are switched on a regular clocked interrupt, and on events; called round robin. Time sharing designs switch tasks more often than strictly needed, but give smoother multitasking, giving the illusion that a process or user has sole use of a machine. In typical designs, a task has three states: Running (executing on the CPU); Ready (ready to be executed); and Blocked (waiting for an event, I/O for example). Most tasks are blocked or ready most of the time because generally only one task can run at a time per CPU. The number of items in the ready queue can vary greatly, depending on the number of tasks the system needs to perform and the type of scheduler that the system uses. On simpler non-preemptive but still multitasking systems, a task has to give up its time on the CPU to other tasks, which can cause the ready queue to have a greater number of overall tasks in the ready to be executed state (resource starvation).

RTOS concepts and implementations are described in an Application Note No. RES05B00008-0100/Rec. 1.00 published January 2010 by Renesas Technology Corp. entitled: "*R8C Family—General RTOS Concepts*", in JAJA Technologfy Review article published February 2007 [1535-5535/$32.00] by The Association for Laboratory Automation [doi:10.1016/j.jala.2006.10.016] entitled: "*An Overview of Real-Time Operating Systems*", and in Chapter 2 entitled: "*Basic Concepts of Real Time Operating Systems*" of a book published 2009 [ISBN—978-1-4020-9435-4] by Springer Science+Business Media B.V. entitled: "*Hardware-Dependent Software—Principles and Practice*", which are all incorporated in their entirety for all purposes as if fully set forth herein.

QNX. One example of RTOS is QNX, which is a commercial Unix-like real-time operating system, aimed primarily at the embedded systems market. QNX was one of the first commercially successful microkernel operating systems and is used in a variety of devices including cars and mobile phones. As a microkernel-based OS, QNX is based on the idea of running most of the operating system kernel in the form of a number of small tasks, known as Resource Managers. In the case of QNX, the use of a microkernel allows users (developers) to turn off any functionality they do not require without having to change the OS itself; instead, those services will simply not run.

FreeRTOS. FreeRTOS™ is a free and open-source Real-Time Operating system developed by Real Time Engineers Ltd., designed to fit on small embedded systems and implements only a very minimalist set of functions: very basic handle of tasks and memory management, and just sufficient API concerning synchronization. Its features include characteristics such as preemptive tasks, support for multiple microcontroller architectures, a small footprint (4.3 Kbytes on an ARM7 after compilation), written in C, and compiled with various C compilers. It also allows an unlimited number of tasks to run at the same time, and no limitation about their priorities as long as used hardware can afford it.

FreeRTOS™ provides methods for multiple threads or tasks, mutexes, semaphores and software timers. A tick-less mode is provided for low power applications, and thread priorities are supported. Four schemes of memory allocation are provided: allocate only; allocate and free with a very simple, fast, algorithm; a more complex but fast allocate and free algorithm with memory coalescence; and C library allocate and free with some mutual exclusion protection. While the emphasis is on compactness and speed of execution, a command line interface and POSIX-like IO abstraction add-ons are supported. FreeRTOS™ implements multiple threads by having the host program call a thread tick method at regular short intervals.

The thread tick method switches tasks depending on priority and a round-robin scheduling scheme. The usual interval is 1/1000 of a second to 1/100 of a second, via an interrupt from a hardware timer, but this interval is often changed to suit a particular application. FreeRTOS™ is described in a paper by Nicolas Melot (downloaded July 2015) entitled: "Study of an operating system: *FreeRTOS—Operating systems for embedded devices*", in a paper (dated Sep. 23, 2013) by Dr. Richard Wall entitled: "*Carebot PIC32 MX7ck implementation of Free RTOS*", FreeRTOS™ modules are described in web pages entitled: "FreeRTOS™ Modules" published in the www,freertos.org web-site dated 26 Nov. 2006, and FreeRTOS kernel is described in a paper published 1 Apr. 2007 by Rich Goyette of Carleton University as part of '*SYSC5701: Operating System Methods for Real-Time Applications*', entitled: "*An Analysis and Description of the Inner Workings of the FreeRTOS Kernel*", which are all incorporated in their entirety for all purposes as if fully set forth herein.

SafeRTOS. SafeRTOS was constructed as a complementary offering to FreeRTOS, with common functionality but with a uniquely designed safety-critical implementation. When the FreeRTOS functional model was subjected to a full HAZOP, weakness with respect to user misuse and hardware failure within the functional model and API were identified and resolved. Both SafeRTOS and FreeRTOS share the same scheduling algorithm, have similar APIs, and are otherwise very similar, but they were developed with differing objectives. SafeRTOS was developed solely in the C language to meet requirements for certification to IEC61508. SafeRTOS is known for its ability to reside solely in the on-chip read only memory of a microcontroller for standards compliance. When implemented in hardware memory, SafeRTOS code can only be utilized in its original configuration, so certification testing of systems using this OS need not re-test this portion of their designs during the functional safety certification process.

VxWorks. VxWorks is an RTOS developed as proprietary software and designed for use in embedded systems requiring real-time, deterministic performance and, in many cases, safety and security certification, for industries, such as aerospace and defense, medical devices, industrial equipment, robotics, energy, transportation, network infrastructure, automotive, and consumer electronics. VxWorks supports Intel architecture, POWER architecture, and ARM architectures. The VxWorks may be used in multicore asymmetric multiprocessing (AMP), symmetric multiprocessing (SMP), and mixed modes and multi-OS (via Type 1 hypervisor) designs on 32- and 64-bit processors. VxWorks comes with the kernel, middleware, board support packages, Wind River Workbench development suite and complementary third-party software and hardware technologies. In its latest release, VxWorks 7, the RTOS has been re-engineered for modularity and upgradeability so the OS kernel is separate from middleware, applications and other packages. Scalability, security, safety, connectivity, and graphics have been improved to address Internet of Things (IoT) needs.

μC/OS. Micro-Controller Operating Systems (MicroC/OS, stylized as μC/OS) is a real-time operating system (RTOS) that is a priority-based preemptive real-time kernel for microprocessors, written mostly in the programming language C, and is intended for use in embedded systems. MicroC/OS allows defining several functions in C, each of which can execute as an independent thread or task. Each task runs at a different priority, and runs as if it owns the central processing unit (CPU). Lower priority tasks can be preempted by higher priority tasks at any time. Higher priority tasks use operating system (OS) services (such as a delay or event) to allow lower priority tasks to execute. OS services are provided for managing tasks and memory, communicating between tasks, and timing.

Operating systems: An Operating System (OS) is software that manages computer hardware resources and provides common services for computer programs. The operating system is an essential component of any system software in a computer system, and most application programs usually require an operating system to function. For hardware functions such as input and output and memory allocation, the operating system acts as an intermediary between programs and the computer hardware, although the application code is usually executed directly by the hardware and will frequently make a system call to an OS function or be interrupted by it. Common features typically supported by operating systems include process management, interrupts handling, memory management, file system, device drivers, networking (such as TCP/IP and UDP), and Input/Output (I/O) handling. Examples of popular modern operating systems include Android, BSD, iOS, Linux, OS X, QNX, Microsoft Windows, Windows Phone, and IBM z/OS.

Process management: The operating system provides an interface between an application program and the computer hardware, so that an application program can interact with the hardware only by obeying rules and procedures programmed into the operating system. The operating system is also a set of services which simplify development and execution of application programs. Executing an application program involves the creation of a process by the operating system kernel which assigns memory space and other resources, establishes a priority for the process in multi-tasking systems, loads program binary code into memory, and initiates execution of the application program which then interacts with the user and with hardware devices. The OS must allocate resources to processes, enable processes to share and exchange information, protect the resources of each process from other processes, and enable synchronization among processes. The OS maintains a data structure for each process, which describes the state and resource ownership of that process and enables the OS to exert control over each process.

In many modern operating systems, there can be more than one instance of a program loaded in memory at the same time; for example, more than one user could be executing the same program, each user having separate copies of the program loaded into memory. With some programs, known as re-entrant type, it is possible to have one copy loaded into memory, while several users have shared access to it so that they each can execute the same program-code. The processor at any instant can only be executing one instruction from one program but several processes can be sustained over a period of time by assigning each process to the processor at intervals while the remainder becomes temporarily inactive. A number of processes being executed over a period of time instead of at the same time is called concurrent execution. A multiprogramming or multitasking OS is a system executing many processes concurrently. A multiprogramming requires that the processor be allocated to each process for a period of time, and de-allocated at an appropriate moment. If the processor is de-allocated during the execution of a process, it must be done in such a way that it can be restarted later as easily as possible.

There are two typical ways for an OS to regain control of the processor during a program's execution in order for the OS to perform de-allocation or allocation: The process issues a system call (sometimes called a software interrupt); for example, an I/O request occurs requesting to access a file on hard disk. Alternatively, a hardware interrupt occurs; for example, a key was pressed on the keyboard, or a timer runs out (used in pre-emptive multitasking). The stopping of one process and starting (or restarting) of another process is called a context switch or context change. In many modern operating systems, processes can consist of many sub-processes. This introduces the concept of a thread. A thread may be viewed as a sub-process; that is, a separate, independent sequence of execution within the code of one process. Threads are becoming increasingly important in the design of distributed and client-server systems and in software run on multi-processor systems.

Modes: Many contemporary processors incorporate a mode bit to define the execution capability of a program in the processor. This bit can be set to a kernel mode or a user mode. A kernel mode is also commonly referred to as supervisor mode, monitor mode or ring 0. In kernel mode, the processor can execute every instruction in its hardware repertoire, whereas in user mode, it can only execute a subset of the instructions. Instructions that can be executed only in kernel mode are called kernel, privileged or protected instructions to distinguish them from the user mode instructions. For example, I/O instructions are privileged. So, if an application program executes in user mode, it cannot perform its own I/O, and must request the OS to perform I/O on its behalf. The system may logically extend the mode bit to define areas of memory to be used when the processor is in kernel mode versus user mode. If the mode bit is set to kernel mode, the process executing in the processor can access either the kernel or user partition of the memory. However, if user mode is set, the process can reference only the user memory space, hence two classes of memory are defined, the user space and the system space (or kernel, supervisor or protected space). In general, the mode bit extends the operating system's protection rights, and is set by the user mode trap instruction, also called a supervisor call instruction. This instruction sets the mode bit, and branches to a fixed location in the system space. Since only the system code is loaded in the system space, only the system code can be invoked via a trap. When the OS has completed the supervisor call, it resets the mode bit to user mode prior to the return.

Computer operating systems provide different levels of access to resources, and these hierarchical protection domains are often referred to as 'protection rings', and are used to protect data and functionality from faults (by improving fault tolerance) and malicious behaviour (by providing computer security). A protection ring is one of two or more hierarchical levels or layers of privilege within the architecture of a computer system. These levels may be hardware-enforced by some CPU architectures that provide different CPU modes at the hardware or microcode level. Rings are arranged in a hierarchy from most privileged (most trusted, usually numbered zero) to least privileged (least trusted, usually with the highest ring number). On most operating systems, kernel mode or 'Ring 0' is the level with the most privileges and interacts most directly with the physical hardware such as the CPU and memory. Special gates between rings are provided to allow an outer ring to access an inner ring's resources in a predefined manner, as opposed to allowing arbitrary usage. Correctly gating access between rings can improve security by preventing programs from one ring or privilege level from misusing resources intended for programs in another. For example, spyware running as a user program in Ring 3 should be prevented from turning on a web camera without informing the user, since hardware access should be a Ring 1 function reserved for device drivers. Programs such as web browsers running in higher numbered rings must request access to the network, a resource restricted to a lower numbered ring.

Kernel: With the aid of the firmware and device drivers, the kernel provides the most basic level of control over all of the computer's hardware devices. It manages memory access for programs in the RAM, it determines which programs get access to which hardware resources, it sets up or resets the CPU's operating states for optimal operation at all times, and it organizes the data for long-term non-volatile storage with file systems on such media as disks, tapes, flash memory, etc. The part of the system executing in kernel supervisor state is called the kernel, or nucleus, of the operating system. The kernel operates as trusted software, meaning that when it was designed and implemented, it was intended to implement protection mechanisms that could not be covertly changed through the actions of untrusted software executing in user space. Extensions to the OS execute in user mode, so the OS does not rely on the correctness of those parts of the system software for correct operation of the OS. Hence, a fundamental design decision for any function to be incorporated into the OS is whether it needs to be implemented in the kernel. If it is implemented in the kernel, it will execute in kernel (supervisor) space, and have access to other parts of the kernel. It will also be trusted software by the other parts of the kernel. If the function is implemented to execute in user mode, it will have no access to kernel data structures.

There are two techniques by which a program executing in user mode can request the kernel's services, namely 'System call' and 'Message passing'. Operating systems are typically with one or the other of these two facilities, but commonly not both. Assuming that a user process wishes to invoke a particular target system function, in the system call approach, the user process uses the trap instruction, so the system call should appear to be an ordinary procedure call to the application program; the OS provides a library of user functions with names corresponding to each actual system call. Each of these stub functions contains a trap to the OS function, and when the application program calls the stub, it executes the trap instruction, which switches the CPU to kernel mode, and then branches (indirectly through an OS table), to the entry point of the function which is to be invoked. When the function completes, it switches the processor to user mode and then returns control to the user process; thus simulating a normal procedure return. In the message passing approach, the user process constructs a message, that describes the desired service, and then it uses a trusted send function to pass the message to a trusted OS process. The send function serves the same purpose as the trap; that is, it carefully checks the message, switches the processor to kernel mode, and then delivers the message to a process that implements the target functions. Meanwhile, the user process waits for the result of the service request with a message receive operation. When the OS process completes the operation, it sends a message back to the user process.

Interrupts handling: Interrupts are central to operating systems, as they provide an efficient way for the operating system to interact with and react to its environment. Interrupts are typically handled by the operating system's kernel, and provide a computer with a way of automatically saving local register contexts, and running specific code in response to events. When an interrupt is received, the computer's hardware automatically suspends whatever program is currently running, saves its status, and runs computer code previously associated with the interrupt. When a hardware device triggers an interrupt, the operating system's kernel decides how to deal with this event, generally by running some processing code. The amount of code being run depends on the priority of the interrupt, and the processing of hardware interrupts is executed by a device driver, which may be either part of the operating system's kernel, part of another program, or both. Device drivers may then relay information to a running program by various means. A program may also trigger an interrupt to the operating system. For example, if a program wishes to access a hardware (such as a peripheral), it may interrupt the operating system's kernel, which causes control to be passed back to the kernel. The kernel will then process the request. If a program wishes additional resources (or wishes to shed resources) such as memory, it will trigger an interrupt to get the kernel's attention. Each interrupt has its own interrupt handler. The number of hardware interrupts is limited by the number of interrupt request (IRQ) lines to the processor, but there may be hundreds of different software interrupts. Interrupts are a commonly used technique for computer multitasking, especially in real-time computing systems, which are commonly referred to as interrupt-driven systems.

Memory management: A multiprogramming operating system kernel is responsible for managing all system memory which is currently in use by programs, ensuring that a program does not interfere with memory already in use by another program. Since programs time share, each program must have independent access to memory. Memory protection enables the kernel to limit a process' access to the computer's memory. Various methods of memory protection exist, including memory segmentation and paging. In both segmentation and paging, certain protected mode registers specify to the CPU what memory address it should allow a running program to access. Attempts to access other addresses will trigger an interrupt which will cause the CPU to re-enter supervisor mode, placing the kernel in charge. This is called a segmentation violation (or Seg-V), and the kernel will generally resort to terminating the offending program, and will report the error.

Memory management further provides ways to dynamically allocate portions of memory to programs at their request, and free it for reuse when no longer needed. This is critical for any advanced computer system where more than a single process might be underway at any time. Several methods have been devised that increase the effectiveness of memory management. Virtual memory systems separate the memory addresses used by a process from actual physical addresses, allowing separation of processes and increasing the effectively available amount of RAM using paging or swapping to secondary storage. The quality of the virtual memory manager can have an extensive effect on overall system performance.

File system: Commonly a file system (or filesystem) is used to control how data is stored and retrieved. By separating the data into individual pieces, and giving each piece a name, the information is easily separated and identified, where each piece of data is called a "file". The structure and logic rules used to manage the groups of information and their names is called a "file system". There are many different kinds of file systems. Each one has a different structure and logic, properties of speed, flexibility, security, size and more. Some file systems have been designed to be used for specific applications. For example, the ISO 9660 file system is designed specifically for optical discs. File systems can be used on many different kinds of storage devices. Some file systems are used on local data storage devices; others provide file access via a network protocol (for example, NFS, SMB, or 9P clients). Some file systems are "virtual", in that the "files" supplied are computed on request (e.g. procfs) or are merely a mapping into a different file system used as a backing store. The file system manages access to both the content of files and the metadata about those files. It is responsible for arranging storage space;

reliability, efficiency, and tuning with regard to the physical storage medium are important design considerations.

A disk file system takes advantages of the ability of disk storage media to randomly address data in a short amount of time. Additional considerations include the speed of accessing data following that initially requested and the anticipation that the following data may also be requested. This permits multiple users (or processes) access to various data on the disk without regard to the sequential location of the data. Examples include FAT (FAT12, FAT16, FAT32), exFAT, NTFS, HFS and HFS+, HPFS, UFS, ext2, ext3, ext4, XFS, btrfs, ISO 9660, Files-11, Veritas File System, VMFS, ZFS, ReiserFS and UDF. Some disk file systems are journaling file systems or versioning file systems.

TMPFS. TMPFS (or tmpfs) is a common name for a temporary file storage facility on many Unix-like operating systems. While intended to appear as a mounted file system, it is stored in volatile memory instead of a non-volatile storage device. A similar construction is a RAM disk, which appears as a virtual disk drive and hosts a disk file system. The tmpfs is typically a file system based on SunOS virtual memory resources, which does not use traditional non-volatile media to store file data; instead, tmpfs files exist solely in virtual memory maintained by the UNIX kernel. Because tmpfs file systems do not use dedicated physical memory for file data, but instead use VM system resources and facilities, they can take advantage of kernel resource management policies. Tmpfs is designed primarily as a performance enhancement to allow short-lived files to be written and accessed without generating disk or network I/O. Tmpfs maximizes file manipulation speed while preserving UNIX file semantics. It does not require dedicated disk space for files and has no negative performance impact. The tmpfs is described in a Sun Microsystem Inc. paper entitled: "*tmpfs: A Virtual Memory File System*" by Peter Snyder, downloaded on July 2014, which is incorporated in its entirety for all purposes as if fully set forth herein.

Device drivers: A device driver is a specific type of computer software developed to allow interaction with hardware devices. Typically, this constitutes an interface for communicating with the device, through the specific computer bus or communications subsystem that the hardware is connected to, providing commands to and/or receiving data from the device, and on the other end, the requisite interfaces to the operating system and software applications. It is a specialized hardware-dependent computer program which is also operating system specific that enables another program, typically an operating system or applications software package or computer program running under the operating system kernel, to interact transparently with a hardware device, and usually provides the requisite interrupt handling necessary for any necessary asynchronous time-dependent hardware interfacing needs.

Networking: Most operating systems support a variety of networking protocols, hardware, and applications for using them, allowing computers running dissimilar operating systems to participate in a common network, for sharing resources such as computing, files, printers, and scanners, using either wired or wireless connections. Networking can essentially allow a computer's operating system to access the resources of a remote computer, to support the same functions as it could if those resources were connected directly to the local computer. This includes everything from simple communication, to using networked file systems, or sharing another computer's graphics or sound hardware. Some network services allow the resources of a computer to be accessed transparently, such as SSH, which allows networked users direct access to a computer's command line interface. A client/server networking allows a program on a computer, called a client, to connect via a network to another computer, called a server. Servers offer (or host) various services to other network computers and users. These services are usually provided through ports or numbered access points beyond the server's network address. Each port number is usually associated with a maximum of one running program, which is responsible for handling requests to that port. A daemon, being a user program, can in turn access the local hardware resources of that computer by passing requests to the operating system kernel.

Input/Output (I/O) handling: An input/output (or I/O) is the communication between an information processing system (such as a computer) and the outside world, possibly a human or other information processing system. The inputs are typically the signals or data received by the system, and the outputs are the signals or data sent from it. I/O devices may be used by a person (or other system) to communicate with a computer. For instance, a keyboard or a mouse may be an input device for a computer, while monitors and printers are considered output devices for a computer. Devices for communication between computers, such as modems and network cards, typically serve for both input and output.

User interface: Every computer that is to be operated by a human being requires a user interface, usually referred to as a 'shell', and is essential if human interaction is to be supported. The user interface views the directory structure and requests services from the operating system that will acquire data from input hardware devices, such as a keyboard, mouse or credit card reader, and requests operating system services to display prompts, status messages and such on output hardware devices, such as a video monitor or printer. The two most common forms of a user interface have historically been the command-line interface, where computer commands are typed out line-by-line, and the Graphical User Interface (GUI), where a visual environment (most commonly a WIMP) is present. Typically the GUI is integrated into the kernel, allowing the GUI to be more responsive by reducing the number of context switches required for the GUI to perform its output functions.

WDM. The Windows Driver Model (WDM), also known as the Win32 Driver Model, is a standard model defining a framework for device drivers specified by Microsoft, providing unified driver models. The WDM model is based on WDM drivers that are layered in a complex hierarchy and communicate with each other via I/O Request Packets (IRPs). The WDM was introduced with Windows 98 and Windows 2000 to replace VxD which was used on older versions of Windows such as Windows 95 and Windows 3.1, as well as the Windows NT Driver Model, and WDM drivers are usable on all of Microsoft's operating systems of Windows 95 and later. The WDM is described in the publication entitled: "*Microsoft Windows Driver Model* (*WDM*)", by Mohamad (Hani) Atassy, submitted to Dr. Dennis R. Hafermann dated Jan. 28, 2002, and in publication entitled: "*A Comparison of the Linux and Windows Device Driver Architecture*", by Melekam Tsegaye and Ricahrd Foss, both from Rhodes University, South-Africa, downloaded from the Internet on July 2014, both are incorporated in their entirety for all purposes as if fully set forth herein.

A general schematic view of the WDM architecture 930 is shown on FIG. 3. In the example shown, three applications designated as application #1 931*a*, application #2 931*b*, and application #3 931*c*, are accessing three peripheral hardware devices, designated as peripheral #1 939*a*, peripheral #2 939$b$, and peripheral #3 939$c$. The model involves three layers. The lower layer is the hardware layer 930$c$, which includes the hardware devices and peripherals, accessed by a processor (such as a processor 27) via a hardware bus 930$d$, which may correspond to an internal bus 13 shown in FIG. 1. The highest layer is a 'user space' layer 930$a$, corresponding to the user mode and to the higher 'ring' layers such as Ring 3, and is relating to the space is the memory area where application software and some drivers execute. The kernel of the operating system provides the services as part of a 'kernel space' layer 930$b$, serving as an intermediate layer between the user space layer 930$a$ and the hardware layer 930$c$. The kernel space 930$b$ operates in a highly privileged hierarchical protection domain, and is strictly reserved for running privileged kernel, kernel extensions, and most device drivers, and is typically corresponding to the kernel mode and to the 'ring-0' layer (in x86 processors). The kernel mode may be supported by the processor hardware, or may be supported by a code segment level.

The user mode applications (such as application #1 931$a$, application #2 931$b$, and application #3 931$c$) access the kernel space 930$b$ by the invoking of system calls respectively denoted as connections 932$a$, 932$b$ and 932$c$. Typically, such system calls are processed via intermediating entity known as Windows API, such as a Win32 API 933, which access the kernel space 930$b$ via a standard messaging 934. The Win32 API 933 is an example of a Windows API (informally WinAPI), which is Microsoft's core set of Application Programming Interfaces (APIs) available in the Microsoft Windows operating systems. Almost all Windows programs interact with the Windows API; on the Windows NT line of operating systems, a small number (such as programs started early in the Windows startup process) uses the Native API. Supporting for developers is in the form of the Windows Software Development Kit (SDK), providing documentation and tools necessary to build software based upon the Windows API and associated Windows interfaces. The Win32 API 933 is the 32-bit API for modern versions of Windows, and consists of functions implemented, as with Win16, in system DLLs. The core DLLs of the Win32 include the kernel32.dll, user32.dll, and gdi32.dll. The Win32 API is described in the tutorial entitled: "*Welcome to Version* 2.0 *of the Win*32 *API Tutorial*" by Prof. M. Saeed, published by Brook Miles, downloaded from the Internet on July 2014, which is incorporated in its entirety for all purposes as if fully set forth herein.

System calls provide an essential interface between a process and the operating system. A system call is how a program requests a service from an operating system's kernel. This may include hardware related services (e.g., accessing the hard disk), creating and executing new processes, and communicating with integral kernel services (such as scheduling). A system call is typically processed in the kernel mode, which is accomplished by changing the processor execution mode to a more privileged one. The hardware sees the world in terms of the execution mode according to the processor status register, and processes are an abstraction provided by the operating system. A system call does not require a context switch to another process, it is processed in the context of whichever process invoked it. The system calls are often executed via traps or interrupts; that automatically puts the CPU into some required privilege level, and then passes control to the kernel, which determines whether the calling program should be granted the requested service. If the service is granted, the kernel executes a specific set of instructions over which the calling program has no direct control, returns the privilege level to that of the calling program, and then returns control to the calling program. Implementing system calls requires a control transfer, which involves some sort of architecture-specific feature.

System calls can be roughly grouped into five major categories: Process control, such as load, execute, create/terminate process, get/set process attributes, wait for time, wait event, and signal event; file management, such as request/release device, create/delete file, open/close file, read/write/reposition file, and get/set file attributes; device management, such as read/write/reposition device, get/set device attributes, and logically attach/detach devices; information maintenance, such as get/set time or date, get/set system data, and get/set process, file, or device attributes; and communication such as create, delete communication connection, transfer status information, and attach or detach remote devices.

The system calls are commonly handled by an I/O manager 935$b$, which allows devices to communicate with user-mode subsystems. It translates user-mode read and write commands into read or write IRPs which it passes to device drivers. It accepts file system I/O requests and translates them into device specific calls, and can incorporate low-level device drivers that directly manipulate hardware to either read input or write output. It also includes a cache manager to improve disk performance by caching read requests and write to the disk in the background. The I/O manager 935$b$ may interface a power manager 935$c$, which deals with power events (power-off, stand-by, hibernate, etc.) and notifies affected drivers with special IRPs (Power IRPs).

A PnP manager 935$a$ handles 'Plug and Play' and supports device detection and installation at boot time. It also has the responsibility to stop and start devices on demand, which can happen when a bus (such as USB or FireWire) gains a new device and needs to have a device driver loaded to support it. The PnP manager 935$a$ may be partly implemented in user mode, in the Plug and Play Service, which handles the often complex tasks of installing the appropriate drivers, notifying services and applications of the arrival of new devices, and displaying GUI to the user.

I/O Request Packets (IRPs) are kernel mode structures that are used to communicate with each other and with the operating system. They are data structures that describe I/O requests, to a driver, all of these parameters (such as buffer address, buffer size, I/O function type, etc.) are passed via a single pointer to this persistent data structure. The IRP with all of its parameters can be put on a queue if the I/O request cannot be performed immediately. I/O completion is reported back to the I/O manager by passing its address to a routine for that purpose, IoCompleteRequest. The IRP may be repurposed as a special kernel APC object if such is required to report completion of the I/O to the requesting thread. IRPs are typically created by the I/O Manager in response to I/O requests from user mode. However, IRPs are sometimes created by the plug-and-play manager, power manager, and other system components, and can also be created by drivers and then passed to other drivers.

The WDM uses kernel-mode device drivers to enable it to interact with hardware devices, where each of the drivers has well defined system routines and internal routines that it exports to the rest of the operating system. DriverEntry is the first routine called after a driver is loaded, and is responsible for initializing the driver. All devices are seen by user mode code as a file object in the I/O manager, though to the I/O manager itself the devices are seen as device objects, which it defines as either file, device or driver objects. The drivers may be aggregated as a driver stack 936, including kernel mode drivers in three levels: highest level drivers 936*a*, intermediate drivers 936*b*, and low level drivers 936*c*. The highest level drivers 936*a*, such as file system drivers for FAT and NTFS, rely on the intermediate drivers 936*b*, which consist of function drivers or main driver for a device, that are optionally sandwiched between lower and higher level filter drivers. The highest level drivers typically know how files are represented on disk, but not the details of how to actually fetch the data, the intermediate level drivers process the requests from the highest level driver by breaking down a large request into a series of small chunks. The function driver commonly possesses the details relating to how the hardware of the peripheral works, typically relies on a bus driver, or a driver that services a bus controller, adapter, or bridge, which can have an optional bus filter driver that sits between itself and the function driver. For example, a PCI bus driver detects the PCI-slot plugged card or hardware, and determines the I/O-mapped or the memory-mapped connection with the host. Intermediate drivers 936*b* rely on the low level drivers 936*c* to function. The lowest level drivers 936*c* are either legacy device drivers that control a device directly, or can be a PnP hardware bus. These lower level drivers 936*c* directly control hardware and do not rely on any other drivers. The I/O manager 935*b* communicate with the high-level driver 936*a* using IRP 937*a*, the high-level driver 936*a* communicate with the intermediate level driver 936*b* using IRP 937*b*, the intermediate level driver 936*b* communicate with the low-level driver 936*c* using IRP 937*c*, and the low-level driver 936*c* communicate with a HAL 938 using IRP 937*d*.

WDM drivers can be classified into the following types and sub-types: Device function drivers, bus drivers, and filter drivers. A function driver is the main driver for a device. A function driver is typically written by the device vendor and is required (unless the device is being used in raw mode). A function driver can service one or more devices. Miniport drivers are a type of function drivers for interfaces such as USB, audio, SCSI and network adapters. They are hardware specific, but the control access to the hardware is through a specific bus class driver. Class drivers are a type of function drivers and can be thought of as built-in framework drivers that miniport and other class drivers can be built on top of. The class drivers provide interfaces between different levels of the WDM architecture. Common functionality between different classes of drivers can be written into the class driver and used by other class and miniport drivers. The lower edge of the class driver will have its interface exposed to the miniport driver, while the upper edge of top level class drivers is operating system specific. Class drivers can be dynamically loaded and unloaded at will. They can do class specific functions that are not hardware or bus-specific (with the exception of bus-type class drivers) and in fact sometimes only do class specific functions such as enumeration.

A bus driver services a bus controller, adapter, or bridge. Microsoft provides bus drivers for most common buses, such as Advanced configuration and Power Interface (ACPI), Peripheral Component Interconnect (PCI), PnPISA, SCSI, Universal Serial Bus (USB), and FireWire. A bus driver can service more than one bus if there is more than one bus of the same type on the machine. The ACPI bus driver interacts with the ACPI BIOS to enumerate the devices in the system and control their power use, the PCI bus driver (such as pci.sys) enumerates and configures devices connected via the PCI bus, the FireWire and the USB bus driver respectively enumerates and controls devices connected via the IEEE 1394 high speed bus and the USB. The stream class driver provides a basic processing supporting high bandwidth, time critical, and video and audio data related hardware, and uses minidrivers for interfacing the actual hardware, and hard-disk, floppies, CDs, and DVDs are interfaces using SCSI and CDROM/DVD class driver. The Human Input Device (HID) provides an abstract view of input devices, and the Still Image Architecture (SIA) class driver is used to obtain content from a scanner and a still camera, using minidrivers. For example, accessing a hard disk (such as HDD 25*c*) involves a file system driver as high-level driver, a volume manager driver as intermediate level driver, and a disk driver as a low-level driver.

Filter drivers are optional drivers that add value to or modify the behavior of a device and may be non-device drivers. A filter driver can also service one or more devices. Upper level filter drivers sit above the primary driver for the device (the function driver), while lower level filter drivers sit below the function driver and above the bus driver. A driver service is a type of kernel-level filter driver implemented as a Windows service that enables applications to work with devices.

The Hardware Abstraction Layer 938, or HAL, is a layer between the physical hardware layer 930*c* of the computer and the rest of the operating system. It was designed to hide differences in hardware and therefore provide a consistent platform on which the kernel is run. The HAL 938 includes hardware-specific code that controls I/O interfaces, interrupt controllers and multiple processors. Typically the particular hardware abstraction does not involve abstracting the instruction set, which generally falls under the wider concept of portability. Abstracting the instruction set, when necessary (such as for handling the several revisions to the x86 instruction set, or emulating a missing math coprocessor), is performed by the kernel, or via platform virtualization.

Linux is a Unix-like and mostly POSIX-compliant computer operating system assembled under the model of free and open source software development and distribution. The defining component of Linux is the Linux kernel, an operating system kernel first released on 5 Oct. 1991 by Linus Torvalds. Linux was originally developed as a free operating system for Intel x86-based personal computers, but has since been ported to more computer hardware platforms than any other operating system. Linux also runs on embedded systems such as mobile phones, tablet computers, network routers, facility automation controls, televisions, and video game consoles. Android, which is a widely used operating system for mobile devices, is built on top of the Linux kernel. Typically, Linux is packaged in a format known as a Linux distribution for desktop and server use.

Linux distributions include the Linux kernel, supporting utilities and libraries and usually a large amount of application software to fulfill the distribution's intended use. A Linux-based system is a modular Unix-like operating system. Such a system uses a monolithic kernel, the Linux kernel, which handles process control, networking, and peripheral and file system access. Device drivers are either integrated directly with the kernel or added as modules loaded while the system is running. Some components of an installed Linux system are a bootloader, for example GNU GRUB or LILO, which is executed by the computer when it is first turned on, and loads the Linux kernel into memory; an init program, which is the first process launched by the Linux kernel, and is at the root of the process tree, and starts processes such as system services and login prompts (whether graphical or in terminal mode); Software libraries which contain code which can be used by running processes; and user interface programs such as command shells or windowing environments. A version of Linux is described, for example, in IBM Corporation (headquartered in Armonk, New-York, U.S.A.) publication No. SC34-2597-03 entitled: "*Device Drivers, Features, and Commands on Red Hat Exterprise Linux* 6.3", downloaded from the Internet on July 2014, which is incorporated in its entirety for all purposes as if fully set forth herein.

The general schematic Linux driver architecture 950 is shown in FIG. 3*a*, and the Linux kernel is further described in Wiley Publishing, Inc. publication entitled: "*Professional Linux Kernel Architecture*", by Wofgang Mauerer published 2008, and Linux programming is described in the book entitled: "*The Linux Kernel Module Programming Guide*" ver. 2.6.4 by Peter Jay Salzman, Michael Burian, and Ori Pomerantz, dated May 18, 2007, and in the publication entitled: "*A Comparison of the Linux and Windows Device Driver Architecture*", by Melekam Tsegaye and Richard Foss, both from Rhodes University, South-Africa, downloaded from the Internet on July 2014, which are all incorporated in their entirety for all purposes as if fully set forth herein.

Similar to the WDM 930 shown in FIG. 3, the Linux kernel involves a 'System Call Interface' 953, receiving system calls 952*a*, 952*b*, and 952*c* from the respective applications such as an application #1 931*a*, an application #2 931*b*, and an application #3 931*c*, and serves as the denomination for the entirety of all implemented and available system calls in a kernel. The Linux kernel is based on a layered modules stack 954, which may include three levels of modules, such as module #1 954*a*, module #2 954*b*, and module #3 954*c*, where the module #1 954*a* communicate over connection 955*a* with the system call interface 953, the module #2 954*b* communicates with the module #1 954*a* over connection 955*b*, the module #3 954*c* communicates over the connection 955*c* with the module #2 954*b* and over a connection 955*d* with the HAL 938.

Similar to the WDM 930 shown in FIG. 3, the Linux kernel shown as the arrangement 950 in FIG. 3*a*, is using the concept of layered architecture of a modules stack 954, which may comprise module #1 954*a*, module #2 954*b*, and module #3 954*c*, communicating using messaging mechanism, such as a connection 955*a* between the system call interface 953 and the module #1 954*a*, a connection 955*b* between the module #1 954*a* and the module #2 954*b*, a connection 955*c* between the module #2 954*b* and the module #3 954*c*, and a connection 955*d* between the module #3 954*c* and the HAL 938.

The modules in the modules stack 954, typically referred to as Loadable Kernel Modules (or LKM), are object files that contain code to extend the running Linux kernel, or so-called base kernel. LKMs are typically used to add support for new hardware and/or filesystems, or for adding system calls. When the functionality provided by a LKM is no longer required, it can be unloaded in order to free memory and other resources. Loadable kernel modules in Linux are located in /lib/modules and have had the extension '.ko' ("kernel object") since version 2.6 (previous versions used the '.o' extension), and are loaded (and unloaded) by the modprobe command. The lsmod command lists the loaded kernel modules. In emergency cases, when the system fails to boot (due to e.g. broken modules), specific modules can be enabled or disabled by modifying the kernel boot parameters list (for example, if using GRUB, by pressing 'e' in the GRUB start menu, then editing the kernel parameter line). Linux allows disabling module loading via sysctl option /proc/sys/kernel/modules_disabled. An initramfs system may load specific modules needed for a machine at boot and then disable module loading.

Multitasking. A multitasking is a method where multiple tasks (also known as processes or programs) are performed during the same period of time, and executed concurrently (in overlapping time periods, new tasks starting before others have ended) instead of sequentially (one completing before the next starts). The tasks share common processing resources, such as a CPU and main memory. Multitasking does not necessarily mean that multiple tasks are being executed, exactly at the same instant. In other words, multitasking does not imply parallelism, but it does mean that more than one task can be part-way through execution at the same time, and more than one task is advancing over a given period of time.

In the case of a computer with a single CPU, only one task is said to be running at any point in time, meaning that the CPU is actively executing instructions for that task. Multitasking solves the problem by scheduling which task may be the one running at any given time, and when another waiting task gets its turn. The act of reassigning a CPU from one task to another one is called a context switch. When context switches occur frequently enough, the illusion of parallelism is achieved. Even on computers with more than one CPU (called multiprocessor machines) or more than one core in a given CPU (called multicore machines), where more than one task can be executed at a given instant (one per CPU or core), multitasking allows many more tasks to be run than the number of available CPUs.

Operating systems may adopt one of many different scheduling strategies. In multiprogramming systems, the running task keeps running until it performs an operation that requires waiting for an external event (e.g. reading from a tape) or until the computer's scheduler forcibly swaps the running task out of the CPU. Multiprogramming systems are designed to maximize CPU usage. In time-sharing systems, the running task is required to relinquish the CPU, either voluntarily or by an external event such as a hardware interrupt. Time sharing systems are designed to allow several programs to execute simultaneously. In real-time systems, some waiting tasks are guaranteed to the CPU when an external event occurs. Real time systems are designed to control mechanical devices such as industrial robots, which require timely processing.

Multiprocessing. Multiprocessing is the use of two or more processors or Central Processing Units (CPUs) within a single computer system, typically combined with the ability to allocate tasks between them. In order to process programs simultaneously, the multiple processors commonly share main memory and peripherals. In a multiprocessing system, all CPUs may be equal, or some may be reserved for special purposes. A combination of hardware and operating system software design considerations determine the symmetry (or lack thereof) in a given system. For example, hardware or software considerations may require that only one particular CPU respond to all hardware interrupts, whereas all other work in the system may be distributed equally among CPUs; or execution of kernel-mode code may be restricted to only one particular CPU, whereas user-mode code may be executed in any combination of processors. Systems that treat all CPUs equally are called symmetric multiprocessing (SMP) systems. In systems where all CPUs are not equal, system resources may be divided in a number of ways, including Asymmetric Multiprocessing (ASMP), Non-Uniform Memory Access (NUMA) multiprocessing, and clustered multiprocessing.

In multiprocessing, the processors are typically used to execute a single sequence of instructions in multiple contexts (single-instruction, multiple-data or SIMD, often used in vector processing), multiple sequences of instructions in a single context (multiple-instruction, single-data or MISD, used for redundancy in fail-safe systems and sometimes applied to describe pipelined processors or hyper-threading), or multiple sequences of instructions in multiple contexts (multiple-instruction, multiple-data or MIMD). Tightly coupled multiprocessor systems contain multiple CPUs that are connected at the bus level, and may have access to a central shared memory (SMP or UMA), or may participate in a memory hierarchy with both local and shared memory (NUMA). Chip multiprocessors, also known as multi-core computing, involves more than one processor placed on a single chip and can be thought of the most extreme form of tightly-coupled multiprocessing. Loosely coupled multiprocessor systems (often referred to as clusters) are based on multiple standalone single, or dual processor commodity computers interconnected via a high-speed communication system (Gigabit Ethernet is common). Tightly-coupled systems perform better and are physically smaller than loosely-coupled systems, but have historically required greater initial investments and may depreciate rapidly. Nodes in a loosely-coupled system are usually inexpensive commodity computers and can be recycled as independent machines upon retirement from the cluster.

Filter driver. A filter driver is a Microsoft Windows compatible driver that extends or modifies the function of peripheral devices, or supports a specialized device in a personal computer, and commonly relates to a driver, program, or module that is inserted into the existing driver stack to perform some specific function, while not affecting the normal working of the existing driver stack in any major way. Any number of filter drivers can be added to Windows, where upper-level filter drivers sit above the primary driver for the device (the function driver), while lower level filter drivers sit below the function driver and above a bus driver. Filter drivers may work on a certain brand of devices such as a mouse or keyboard, or they may perform some operation on a class of devices, such as any mouse or any keyboard. A filter driver may be developed using the guide entitled: "*Filter Driver Development Guide*" Version 1.0a by Microsoft Corporation, dated 2004, which is incorporated in its entirety for all purposes as if fully set forth herein.

Hook. A hook (also known as a hook procedure or hook function) is a mechanism by which an application can intercept events, such as messages, mouse actions, and keystrokes, and generally refers to a function provided by a software application that receives certain data before the normal or intended recipient of the data. The hook function can thus examine or modify certain data before passing on the data. The hook function allows a software application to examine, or modify data before the data is passed to the intended recipient. A function that intercepts a particular type of event is known as a hook procedure. The hook procedure can act on each event it receives, and then modify or discard the event. The term 'hooking' is used herein to include, but not limited to, a range of techniques used to alter or augment the behavior of an operating system, applications, or other software components by intercepting function calls, messages, or events passed between software components. A code that handles such intercepted function calls, events or messages is called a "hook". Hooking is used for many purposes, including debugging and extending functionality.

Examples may include intercepting keyboard or mouse event messages before they reach an application, or intercepting operating system calls in order to monitor behavior, or modify the function of an application or another component. It is also widely used in benchmarking programs, for example frame rate measuring in 3D games, where the output and input are done through hooking. Hooking is described in the presentations by High-Tech Bridge SA and titled: "*Userland Hooking in Windows*" dated August 2011, and "*Inline Hooking in Windows*" dated September 2011, both by Brian Mariani, and both incorporated in their entirety for all purposes as if fully set forth herein.

Physical modification. A hooking may be achieved by physically modifying an executable or library before an application is run through techniques of reverse engineering. This is typically used to intercept function calls to either monitor or replace them entirely. For example, by using a disassembler, the entry point of a function within a module can be found. It can then be altered to dynamically load some other library module and then have it execute desired methods within that loaded library. If applicable, altering an import table of an executable is another related approach by which hooking can be achieved. This table can be modified to load any additional library modules as well as changing what external code is invoked when a function is called by an application. An alternate method for achieving the function of hooking is by intercepting function calls through a wrapper library. When creating a wrapper, you make your own version of a library that an application loads, with all the same functionality of the original library that it will replace, so all the functions that are accessible, are essentially the same between the original and the replacement. This wrapper library can be designed to call any of the functionality from the original library, or replace it with an entirely new set of logic.

Runtime modification. Operating systems and software may provide the means to easily insert event hooks at runtime, as long as the process inserting the hook is granted enough permission to do so. Microsoft Windows allows inserting hooks that can be used to process or modify system events and application events for dialogs, scrollbars, and menus, as well as other items. It also allows a hook to insert, remove, process, or modify keyboard and mouse events. Linux provides another example where hooks can be used in a similar manner to process network events within the kernel through NetFilter. When such functionality is not provided, a special form of hooking employs intercepting library function calls that are made by a process. Function hooking is implemented by changing the very first few code instructions of the target function to jump to an injected code. Alternatively, on systems using the shared library concept, the interrupt vector table or the import descriptor table can be modified in memory.

A hook chain is a list of pointers to special, application-defined callback functions called hook procedures. When a message occurs that is associated with a particular type of hook, the operating system passes the message to each hook procedure referenced in the hook chain, one after the other. The action of a hook procedure can depend on the type of hook involved. For example, the hook procedures for some types of hooks can only monitor messages, while others can modify the messages, or stop their progress through the chain, restricting them from reaching the next hook procedure, or a destination window.

Plug-in. A plug-in (or 'plugin', 'extension', or 'add-on'/'addon') is a software component that adds a specific feature to an existing software application, such as enabling customization. The common examples are the plug-ins used in web browsers to add new features such as search-engines or virus scanners, or the ability to utilize a new file type such as a new video format. An 'Add-on' (or 'addon') is the general term for what enhances an application, and comprises snap-in, plug-in, theme, and skin. An extension add-on tailors the core features of an application by adding an optional module, whereas a plug-in add-on would tailor the outer layers of an application to personalize functionality. A theme or a skin add-on is a preset package containing additional or changed graphical appearance details, achieved by the use of a Graphical User Interface (GUI) that can be applied to a specific software and websites to suit the purpose, topic, or tastes of different users to customize the look and feel of a piece of computer software or an operating system front-end GUI (and window managers).

Typically, the host application provides services which the plug-in can use, including a way for plug-ins to register themselves with the host application, and protocol for the exchange of data with plug-ins. Plug-ins depend on the services provided by the host application and do not usually work by themselves. Conversely, the host application operates independently of the plug-ins, making it possible for end-users to add and update plug-ins dynamically without needing to make changes to the host application. The term 'plug-in' is used herein to include, but not limited to, a software extension, which is software that serves to extend the capabilities of, or data available to existing software application; it becomes included in the program. Therefore, after integration, extensions can be seen as part of the browser itself, tailored from a set of optional modules.

IPC. An Inter-Process Communication (IPC) (also be referred to as inter-thread communication and inter-application communication) is a set of methods for the exchange of data between multiple threads, in one or more processes. IPC methods may use message passing, synchronization, shared memory, and Remote Procedure Calls (RPC). It provides an environment that allows process cooperation, and may be used for providing information sharing, computational speedup, modularity, convenience, and privilege separation. In the Windows operating system environment, the IPC provides mechanisms for facilitating communications and data sharing between processes or applications.

Common IPC methods include file sharing, where a record (or any other information) stored on disk (or any other memory) can be accessed by name by any process; a signal which is an asynchronous notification sent to a process, or to a specific thread within the same process in order to notify it of an event that occurred; a socket which is a data stream sent over a network interface, either to a different process on the same computer or on another computer, such as Internet sockets; a pipe (or pipeline) which is a two-way data stream interfaced through standard input and output and is read character by character, commonly used in Unix-like computer operating systems; message queues which are anonymous data stream similar to the pipe that stores and retrieves information in packets, providing an asynchronous communications protocol; a semaphore which is a variable or abstract data type that is used for controlling access to a common resource; a shared memory which is a memory that may be simultaneously accessed by multiple programs with an intent to provide communication among them, or avoid redundant copies, such as where one process creates an area in RAM which other processes can access; and memory mapped file, where a file that is physically present on-disk, but can also be a device, shared memory object, or other resource that the operating system can reference through a file descriptor. Few IPC mechanisms are described in Chapter 9 of the Marko Vuskovic publication 'Operating Systems', entitled: "INTERPROCESS COMMUNICATION", which is incorporated in its entirety for all purposes as if fully set forth herein.

The Windows operating system supports IPC mechanisms such as a clipboard, where the clipboard acts as a central depository for data sharing among applications, so when a user performs a cut or copy operation in an application, the application puts the selected data on the clipboard in one or more standard, or application-defined formats, and any other application can then retrieve the data from the clipboard, choosing from the available formats that it understands; using Component Object Model (COM), where applications that use Object Linking and Embedding (OLE) manage compound documents can be used to call on other applications for data editing; Using Data Copy enabling an application to send information to another application using the WM_COPYDATA message; DDE protocol that enables applications to exchange data in a variety of formats; and mailslots providing one-way communication where processes write messages to their mailslot.

Browser extension. A browser extension is a computer program that extends the functionality of a web browser in some way. Extensions can be created through the use of web technologies such as HTML, JavaScript, and CSS. Browser extensions can also improve the user interface of the web browser without directly affecting the viewable content of a web page, which can be achieved through a variety of add-ons, such as toolbars and plug-ins. The syntax for extensions may differ from browser to browser, or at least enough different that an extension working on a browser does not work on another one.

Plug-ins add specific abilities into browsers using Application Programming Interfaces (APIs) allowing third parties to create plug-ins that interact with the browser. The original API was NPAPI, but subsequently Google introduced the PPAPI interface in Chrome. In addition, plug-ins allow browser extensions to perform tasks such as blocking ads, creating a secure online connection, and adding applications to a browser. Common browser plug-ins include the Adobe Flash Player, the QuickTime Player, and the Java plug-in, which can launch a user-activated Java applet on a web page, and the applet is then executed within a Java Virtual Machine (JVM) in a process separate from the web browser itself.

Sockets. A socket (a.k.a. 'network socket') is an endpoint of an IPC flow across a computer network. In the case the communication is based on IP (Internet Protocol), the network sockets are referred to as Internet sockets. A socket API is an application programming interface (API), usually provided by the operating system that allows application programs to control and use network sockets. Internet socket APIs are usually based on the Berkeley sockets standard. A socket address is the combination of an IP address and a port number, similar to one end of a telephone connection in the combination of a phone number and a particular extension. Based on this address, internet sockets deliver incoming data packets to the appropriate application process or thread. Sockets are further described in a University of Toronto, Department of Computer Science presentation entitled: "*Tutorial on Socket Programming*" by Amin Tootoonchian, downloaded on August 2014, and in the SAS Institute Inc.

SHARE Session 5958 tutorial 'C Socket Programming Tutorial' entitled: "*Writing Client/Server Programs in C Using Sockets* (*A Tutorial*) *Part I*", by Greg Granger, dated February of 1998, which are both incorporated in their entirety for all purposes as if fully set forth herein.

An Internet socket is characterized by a unique combination of a Local socket address (Local IP address and port number), remote socket address (used for established TCP sockets), and the used Protocol, typically a transport protocol (e.g., TCP, UDP, raw IP, or others). Within the operating system and the application that created a socket, a socket is referred to by a unique integer value called a socket descriptor. The operating system forwards the payload of incoming IP packets to the corresponding application by extracting the socket address information from the IP and transport protocol headers, and stripping the headers from the application data.

Several Internet socket types are available, such as Datagram sockets, also known as connectionless sockets, which use User Datagram Protocol (UDP), Stream sockets, also known as connection-oriented sockets, which use Transmission Control Protocol (TCP) or Stream Control Transmission Protocol (SCTP), and Raw sockets (or Raw IP sockets), typically available in routers and other network equipment. Here the transport layer is bypassed, and the packet headers are made accessible to the application. Other socket types are implemented over other transport protocols, such as Systems Network Architecture (SNA). Communicating local and remote sockets are called socket pairs. Each socket pair is described by a unique 4-tuple consisting of source and destination IP addresses and port numbers, i.e. of local and remote socket addresses. In the TCP case, each unique socket pair 4-tuple is assigned a socket number, while in the UDP case each unique local socket address is assigned a socket number.

The socket is primarily a concept used in the Transport Layer of the Internet model. Networking equipment such as routers and switches, do not require implementations of the Transport Layer, as they operate on the Link Layer level (switches) or at the Internet Layer (routers). However, stateful network firewalls, network address translators, and proxy servers keep track of active socket pairs. Also in fair queuing, layer 3 switching and quality of service (QoS) support in routers, packet flows may be identified by extracting information about the socket pairs. Raw sockets are typically available in network equipment and are used for routing protocols such as IGRP and OSPF, and in Internet Control Message Protocol (ICMP).

Web browser. A web browser (commonly referred to as a browser) is a software application for retrieving, presenting, and traversing information resources on the World Wide Web. An information resource is identified by a Uniform Resource Identifier (URI/URL) and may be part of a web page, a web-page, an image, a video, or any other piece of content. Hyperlinks present in resources enable users easily to navigate their browsers to related resources. Although browsers are primarily intended to use the World Wide Web, they can also be used to access information provided by web servers in private networks or files in file systems. The primary purpose of a web browser is to bring information resources to the user ("retrieval" or "fetching"), allowing them to view the information ("display", "rendering"), and then access other information ("navigation", "following links"). Currently the major web browsers are known as Firefox, Internet Explorer, Google Chrome, Opera, and Safari.

The process begins when the user inputs a Uniform Resource Locator (URL), for example 'http://en.wikipedia.org/', into the browser. The prefix of the URL, the Uniform Resource Identifier or URI, determines how the URL will be interpreted. The most commonly used kind of URI starts with http: and identifies a resource to be retrieved over the Hypertext Transfer Protocol (HTTP). Many browsers also support a variety of other prefixes, such as https: for HTTPS, ftp: for the File Transfer Protocol, and file: for local files. Prefixes that the web browser cannot directly handle are often handed off to another application entirely. For example, mailto: URIs are usually passed to the user's default e-mail application, and news: URIs are passed to the user's default newsgroup reader. In the case of http, https, file, and others, once the resource has been retrieved the web browser will display it. HTML and associated content (image files, formatting information such as CSS, etc.) is passed to the browser's layout engine to be transformed from markup to an interactive document, a process known as "rendering". Aside from HTML, web browsers can generally display any kind of content that can be part of a web page. Most browsers can display images, audio, video, and XML files, and often have plug-ins to support Flash applications and Java applets. Upon encountering a file of an unsupported type or a file that is set up to be downloaded rather than displayed, the browser prompts the user to save the file to disk. Information resources may contain hyperlinks to other information resources. Each link contains the URI of a resource to go to. When a link is clicked, the browser navigates to the resource indicated by the link's target URI, and the process of bringing content to the user begins again. The architecture of a web browser is described in the publication entitled: "*Architecture and evolution of the modern web browser*" by Alan Grosskurth and Michael W. Godfrey of the University of Waterloo in Canada, dated Jun. 20, 2006, which is incorporated in its entirety for all purposes as if fully set forth herein.

A currently popular web browser is the Internet Explorer (formerly Microsoft Internet Explorer and Windows Internet Explorer, commonly abbreviated IE or MSIE) from Microsoft Corporation, headquartered in Redmond, Washington, U.S.A., which is a series of graphical web browsers developed by Microsoft and included as part of the Microsoft Windows line of operating systems. The Internet Explorer 8 is described, for example, in Microsoft 2009 publication entitled: "*Step by Step Tutorials for Microsoft Internet Explorer* 8 *Accessibility Options*", which is incorporated in its entirety for all purposes as if fully set forth herein. Another popular web browser is the Google Chrome which is a freeware web browser developed by Google, headquartered in Googleplex, Mountain View, California, U.S.A. Google Chrome aims to be secure, fast, simple, and stable, providing strong application performance and JavaScript processing speed.

A mobile browser, also called a microbrowser, minibrowser, or Wireless Internet Browser (WIB), is a web browser designed for use on a mobile device such as a mobile phone or PDA. Mobile browsers are optimized so as to display Web content most effectively for small screens on portable devices. Mobile browser software must be small and efficient to accommodate the low memory capacity and low-bandwidth of wireless handheld devices. Some mobile browsers can handle more recent technologies like CSS 2.1, JavaScript, and Ajax. Websites designed for access from these browsers are referred to as wireless portals or collectively as the Mobile Web. They may automatically create "mobile" versions of each page, for example this one The mobile browser typically connects via cellular network, via Wireless LAN, or via other wireless networks, and are using standard HTTP over TCP/IP, and displays web pages written in HTML, XHTML Mobile Profile (WAP 2.0), or WML (which evolved from HDML). WML and HDML are stripped-down formats suitable for transmission across limited bandwidth, and wireless data connection called WAP. WAP 2.0 specifies XHTML Mobile Profile plus WAP CSS, subsets of the W3C's standard XHTML and CSS with minor mobile extensions. Some mobile browsers are full-featured Web browsers capable of HTML, CSS, ECMAScript, as well as mobile technologies such as WML, i-mode HTML, or cHTML. To accommodate small screens, some mobile browsers use Post-WIMP interfaces. An example of a mobile browser is Safari, which is a mobile web browser developed by Apple Inc. (headquartered in Apple Campus, Cupertino, California, U.S.A), included with the OS X and iOS operating systems, and described in Apple publication entitled: "*Safari Web Content Guide*", dated March 2014, which is incorporated in its entirety for all purposes as if fully set forth herein.

Smartphone. A mobile phone (also known as a cellular phone, cell phone, smartphone, or hand phone) is a device which can make and receive telephone calls over a radio link whilst moving around a wide geographic area, by connecting to a cellular network provided by a mobile network operator. The calls are to and from the public telephone network, which includes other mobiles and fixed-line phones across the world. The Smartphones are typically hand-held and may combine the functions of a personal digital assistant (PDA), and may serve as portable media players and camera phones with high-resolution touch-screens, web browsers that can access, and properly display, standard web pages rather than just mobile-optimized sites, GPS navigation, Wi-Fi, and mobile broadband access. In addition to telephony, the Smartphones may support a wide variety of other services such as text messaging, MMS, email, Internet access, short-range wireless communications (infrared, Bluetooth), business applications, gaming and photography.

An example of a contemporary smartphone is model iPhone 6 available from Apple Inc., headquartered in Cupertino, California, U.S.A. and described in iPhone 6 technical specification (retrieved October 2015 from www.apple.com/iphone-6/specs/), and in a User Guide dated 2015 (019-00155/2015-06) by Apple Inc. entitled: "*iPhone User Guide For iOS* 8.4 *Software*", which are both incorporated in their entirety for all purposes as if fully set forth herein. Another example of a smartphone is Samsung Galaxy S6 available from Samsung Electronics headquartered in Suwon, South-Korea, described in the user manual numbered English (EU), March 2015 (Rev. 1.0) entitled: "*SM-G925F SM-G925FQ SM-G9251 User Manual*" and having features and specification described in "*Galaxy S6 Edge—Technical Specification*" (retrieved October 2015 from www.samsung.com/us/explore/galaxy-s-6-features-and-specs), which are both incorporated in their entirety for all purposes as if fully set forth herein.

A mobile operating system (also referred to as mobile OS), is an operating system that operates a smartphone, tablet, PDA, or other mobile device. Modern mobile operating systems combine the features of a personal computer operating system with other features, including a touch-screen, cellular, Bluetooth, Wi-Fi, GPS mobile navigation, camera, video camera, speech recognition, voice recorder, music player, near field communication and infrared blaster. Currently popular mobile OS are Android, Symbian, Apple iOS, BlackBerry, MeeGo, Windows Phone, and Bada. Mobile devices with mobile communications capabilities (e.g. smartphones) typically contain two mobile operating systems—the main user-facing software platform is supplemented by a second low-level proprietary real-time operating system that operates the radio and other hardware.

Android is an open source and Linux-based mobile operating system (OS) based on the Linux kernel that is currently offered by Google. With a user interface based on direct manipulation, Android is designed primarily for touchscreen mobile devices such as smartphones and tablet computers, with specialized user interfaces for televisions (Android TV), cars (Android Auto), and wrist watches (Android Wear). The OS uses touch inputs that loosely correspond to real-world actions, such as swiping, tapping, pinching, and reverse pinching to manipulate on-screen objects, and a virtual keyboard. Despite being primarily designed for touchscreen input, it also has been used in game consoles, digital cameras, and other electronics. The response to user input is designed to be immediate and provides a fluid touch interface, often using the vibration capabilities of the device to provide haptic feedback to the user. Internal hardware such as accelerometers, gyroscopes and proximity sensors are used by some applications to respond to additional user actions, for example adjusting the screen from portrait to landscape depending on how the device is oriented, or allowing the user to steer a vehicle in a racing game by rotating the device, simulating control of a steering wheel.

Android devices boot to the homescreen, the primary navigation and information point on the device, which is similar to the desktop found on PCs. Android homescreens are typically made up of app icons and widgets; app icons launch the associated app, whereas widgets display live, auto-updating content such as the weather forecast, the user's email inbox, or a news ticker directly on the homescreen. A homescreen may be made up of several pages that the user can swipe back and forth between, though Android's homescreen interface is heavily customizable, allowing the user to adjust the look and feel of the device to their tastes. Third-party apps available on Google Play and other app stores can extensively re-theme the homescreen, and even mimic the look of other operating systems, such as Windows Phone. The Android OS is described in a publication entitled: "*Android Tutorial*", downloaded from tutorialspoint.com on July 2014, which is incorporated in its entirety for all purposes as if fully set forth herein.

iOS (previously iPhone OS) from Apple Inc. (headquartered in Cupertino, California, U.S.A.) is a mobile operating system distributed exclusively for Apple hardware. The user interface of the iOS is based on the concept of direct manipulation, using multi-touch gestures. Interface control elements consist of sliders, switches, and buttons. Interaction with the OS includes gestures such as swipe, tap, pinch, and reverse pinch, all of which have specific definitions within the context of the iOS operating system and its multi-touch interface. Internal accelerometers are used by some applications to respond to shaking the device (one common result is the undo command) or rotating it in three dimensions (one common result is switching from portrait to landscape mode). The iOS is described in the publication entitled: "*IOS Tutorial*", downloaded from tutorialspoint.com on July 2014, which is incorporated in its entirety for all purposes as if fully set forth herein.

Database. A database is an organized collection of data, typically managed by a DataBase Management System (DBMS) that organizes the storage of data and performs other functions such as the creation, maintenance, and usage of the database storage structures. The data is typically organized to model aspects of reality in a way that supports processes requiring information. Databases commonly also provide users with a user interface and front-end that enables the users to query the database, often in complex manners that require processing and organization of the data. The term "database" is used herein to refer to a database, or to both a database and the DBMS used to manipulate it. Database management systems (DBMS) are typically computer software applications that interact with the user, other applications, and the database itself to capture and analyze data, typically providing various functions that allow entry, storage and retrieval of large quantities of information, as well as providing ways to manage how that information is organized. A general-purpose DBMS is designed to allow the definition, creation, querying, update, and administration of databases. Examples of DBMSs include MySQL, PostgreSQL, Microsoft SQL Server, Oracle, Sybase and IBM DB2. Database technology and application is described in a document published by Telemark University College entitled: "*Introduction to Database Systems*", authored by Hans-Petter Halvorsen (dated 2014 Mar. 3), which is incorporated in its entirety for all purposes as if fully set forth herein.

SQL. Structured Query Language (SQL) is a widely-used programming language for working with relational databases, designed for managing data held in a relational database management system (RDBMS), or for stream processing in a relational data stream management system (RDSMS). SQL consists of a data definition language and a data manipulation language. The scope of SQL includes data insert, query, update and delete, schema creation and modification, and data access control. Although SQL is often described as, and largely is, a declarative language (4GL), it also includes procedural elements. SQL is designed for querying data contained in a relational database, and is a set-based, declarative query language. The SQL is standardized as ISO/IEC 9075:2011 standard: "*Information technology—Database languages—SQL*". The ISO/IEC 9075 standard is complemented by ISO/IEC 13249 standard: "*SQL Multimedia and Application Packages*" that defines interfaces and packages based on SQL. The aim is a unified access to typical database applications like text, pictures, data mining or spatial data. SQL is described in the tutorial entitled: "*Oracle/SQL Tutorial*" by Michael Gertz of the University of California, which is incorporated in its entirety for all purposes as if fully set forth herein.

Geolocation. IP-based geolocation (commonly known as geolocation) is a mapping of an IP address (or MAC address) to the real-world geographic location of a computing device or a mobile device connected to the Internet. The IP address based location data may include information such as country, region, city, postal/zip code, latitude, longitude, or Timezone. Deeper data sets can determine other parameters such as domain name, connection speed, ISP, Language, proxies, company name, US DMA/MSA, NAICS codes, and home/business classification. The geolocation is further described in the publication entitled: "*Towards Street-Level Client-Independent IP Geolocation*" by Yong Wang et al., downloaded from the Internet on July 2014, and in an Information Systems Audit and Control Association (ISACA) 2011 white paper entitled: "*Geolocation: Risk, Issues and Strategies*", which are both incorporated in their entirety for all purposes as if fully set forth herein. There are a number of commercially available geolocation databases, such as a web-site http://www.ip2location.com operated by Ip2location.com headquartered in Penang, Malaysia, offering IP geolocation software applications, and geolocation databases may be obtained from IpInfoDB operating website http://ipinfodb.com, and by Max Mind, Inc., based in Waltham, Massachusetts, U.S.A, operating the web-site www.maxmind.com/en/home.

Further, the W3C Geolocation API is an effort by the World Wide Web Consortium (W3C) to standardize an interface to retrieve the geographical location information for a client-side device. It defines a set of objects, ECMA Script standard compliant, executing in the client application, give the client's device location through the consulting of Location Information Servers, which are transparent for the Application Programming Interface (API). The most common sources of location information are IP address, Wi-Fi and Bluetooth MAC address, radio-frequency identification (RFID), Wi-Fi connection location, or device Global Positioning System (GPS) and GSM/CDMA cell IDs. The location is returned with a given accuracy depending on the best location information source available. The W3C Recommendation for the geolocation API specifications draft dated Oct. 24, 2013, is available from the web-site http://www.w3.org/TR/2013/REC-geolocation-API-20131024. Geolocation-based addressing is described in U.S. Pat. No. 7,929,535 to Chen et al., entitled: "*Geolocation-based Addressing Method for IPv6 Addresses*", and in U.S. Pat. No. 6,236,652 to Preston et al., entitled: "*Geo-spacial Internet Protocol Addressing*", and in U.S. Patent Application Publication No. 2005/0018645 to Mustonen et al., entitled: "*Utilization of Geographic Location Information in IP Addressing*", which are all incorporated in their entirety for all purposes as if fully set forth herein.

Virtualization. The term virtualization typically refers to the technology that allows for the creation of software-based virtual machines that can run multiple operating systems from a single physical machine. In one example, virtual machines can be used to consolidate the workloads of several under-utilized servers to fewer machines, perhaps a single machine (server consolidation), providing benefits (perceived or real, but often cited by vendors) such as savings on hardware, environmental costs, management, and administration of the server infrastructure. Virtualization scheme allows for the creation of substitutes for real resources, that is, substitutes that have the same functions and external interfaces as their counterparts, but that differ in attributes, such as size, performance, and cost. These substitutes are called virtual resources, and their users are typically unaware of the substitution.

Virtualization is commonly applied to physical hardware resources by combining multiple physical resources into shared pools from which users receive virtual resources. With virtualization, you can make one physical resource look like multiple virtual resources. Virtual resources can have functions or features that are not available in their underlying physical resources. Virtualization can provide the benefits of consolidation to reduce hardware cost, such as to efficiently access and manage resources to reduce operations and systems management costs while maintaining needed capacity, and to have a single server function as multiple virtual servers. In addition, virtualization can provide optimization of workloads, such as to respond dynamically to the application needs of its users, and to increase the use of existing resources by enabling dynamic sharing of resource pools. Further, virtualization may be used for IT flexibility and responsiveness, such as by having a single, consolidated view of, and easy access to, all available resources in the network, regardless of location, and reducing the management of your environment by providing emulation for compatibility and improved interoperability.

Virtual machine (VM). Virtual machine is a representation of a real machine using software that provides an operating environment that can run or host a guest operating system. In one example, a virtual machine may include a self-contained software emulation of a machine, which does not physically exist, but shares resources of an underlying physical machine Like a physical computer, a virtual machine runs an operating system and applications. Multiple virtual machines can operate concurrently on a single host system. There are different kinds of virtual machines, each with different functions: System virtual machines (also termed full virtualization VMs) provide a substitute for a real machine. They provide functionality needed to execute entire operating systems. A hypervisor uses native execution to share and manage hardware, allowing for multiple environments that are isolated from one another, yet exist on the same physical machine. Modern hypervisors use hardware-assisted virtualization, virtualization-specific hardware, primarily from the host CPUs. Process virtual machines are designed to execute computer programs in a platform-independent environment. Some virtual machines, such as QEMU, are designed to also emulate different architectures and allow execution of software applications and operating systems written for another CPU or architecture. Operating-system-level virtualization allows the resources of a computer to be partitioned via the kernel's support for multiple isolated user space instances, which are usually called containers and may look and feel like real machines to the end users.

Guest Operating System. A guest operating system is an operating system running in a virtual machine environment that would otherwise run directly on a separate physical system. Operating-system-level virtualization, also known as containerization, refers to an operating system feature in which the kernel allows the existence of multiple isolated user-space instances. Such instances, called containers, partitions, Virtualization Engines (VEs) or jails (FreeBSD jail or chroot jail), may look like real computers from the point of view of programs running in them. A computer program running on an ordinary operating system can see all resources (connected devices, files and folders, network shares, CPU power, quantifiable hardware capabilities) of that computer. However, programs running inside a container can only see the container's contents and devices assigned to the container. In addition to isolation mechanisms, the kernel often provides resource-management features to limit the impact of one container's activities on other containers. With operating-system-virtualization, or containerization, it is possible to run programs within containers, to which only parts of these resources are allocated. A program expecting to see the whole computer, once run inside a container, can only see the allocated resources and believes them to be all that is available. Several containers can be created on each operating system, to each of which a subset of the computer's resources is allocated. Each container may contain any number of computer programs. These programs may run concurrently or separately, even interact with each other.

Hypervisor. Hypervisor commonly refers to a thin layer of software that generally provides virtual partitioning capabilities which runs directly on hardware, but underneath higher-level virtualization services. The hypervisor typically manages virtual machines, allowing them to interact directly with the underlying hardware. System virtualization creates many virtual systems within a single physical system. Virtual systems are independent operating environments that use virtual resources. System virtualization can be approached through hardware partitioning or hypervisor technology. Hardware partitioning subdivides a physical server into fractions, each of which can run an operating system. These fractions are typically created with coarse units of allocation, such as whole processors or physical boards. This type of virtualization allows for hardware consolidation, but does not have the full benefits of resource sharing and emulation offered by hypervisors. Hypervisors use a thin layer of code in software or firmware to achieve fine-grained, dynamic resource sharing. Because hypervisors provide the greatest level of flexibility in how virtual resources are defined and managed, they are the primary technology for system virtualization.

Virtual Machine Monitor. A Virtual Machine Monitor (VMM) is computer software, firmware or hardware that creates and runs virtual machines. A computer on which a hypervisor runs one or more virtual machines is called a host machine, and each virtual machine is called a guest machine. The hypervisor presents the guest operating systems with a virtual operating platform and manages the execution of the guest operating systems. Multiple instances of a variety of operating systems may share the virtualized hardware resources: for example, Linux, Windows, and macOS instances can all run on a single physical x86 machine. This contrasts with operating-system-level virtualization, where all instances (usually called containers) must share a single kernel, though the guest operating systems can differ in user space, such as different Linux distributions with the same kernel. Typically, a VMM refers to a software that runs in a layer between a hypervisor or host operating system and one or more virtual machines that provides the virtual machines abstraction to the guest operating systems. With full virtualization, the VMM exports a virtual machine abstraction identical to the physical machine, so the standard operating system can run just as they would on physical hardware.

Hardware virtualization or platform virtualization refers to the creation of a virtual machine that acts like a real computer with an operating system. Software executed on these virtual machines is separated from the underlying hardware resources. In hardware virtualization, the host machine is the actual machine on which the virtualization takes place, and the guest machine is the virtual machine. The words host and guest are used to distinguish the software that runs on the physical machine from the software that runs on the virtual machine. The software or firmware that creates a virtual machine on the host hardware is called a hypervisor or Virtual Machine Manager. Different types of hardware virtualization include full-virtualization, where almost complete simulation of the actual hardware to allow software, which typically consists of a guest operating system, to run unmodified, and Para-virtualization, where a hardware environment is not simulated; however, the guest programs are executed in their own isolated domains, as if they are running on a separate system. Guest programs need to be specifically modified to run in this environment.

Hardware-assisted virtualization is a way of improving overall efficiency of virtualization. It involves CPUs that provide support for virtualization in hardware, and other hardware components that help improve the performance of a guest environment. Hardware virtualization can be viewed as part of an overall trend in enterprise IT that includes autonomic computing, a scenario in which the IT environment will be able to manage itself based on perceived activity, and utility computing, in which computer processing power is seen as a utility that clients can pay for only as needed. The usual goal of virtualization is to centralize administrative tasks while improving scalability and overall hardware-resource utilization. With virtualization, several operating systems can be run in parallel on a single central processing unit (CPU). This parallelism tends to reduce overhead costs and differs from multitasking, which involves running several programs on the same OS. Using virtualization, an enterprise can better manage updates and rapid changes to the operating system and applications without disrupting the user.

Server Virtualization. Server virtualization is a virtualization technique that involves partitioning a physical server into a number of small, virtual servers with the help of virtualization software. In server virtualization, each virtual server runs multiple operating system instances at the same time. A Virtual Private Server (VPS) is a virtual machine sold as a service by an Internet hosting service, that runs its own copy of an Operating System (OS), and customers may have superuser-level access to that operating system instance, so they can install almost any software that runs on that OS. For many purposes they are functionally equivalent to a dedicated physical server, and being software-defined, are able to be much more easily created and configured. They are typically priced much lower than an equivalent physical server. However, as they share the underlying physical hardware with other VPS's, performance may be lower, depending on the workload of any other executing virtual machines. Dedicated Servers may also be more efficient with CPU dependent processes such as hashing algorithms.

Application Virtualization. Application virtualization is software technology that encapsulates computer programs from the underlying operating system on which it is executed. A fully virtualized application is not installed in the traditional sense, although it is still executed as if it were. The application behaves at runtime like it is directly interfacing with the original operating system and all the resources managed by it, but can be isolated or sandboxed to varying degrees. Application virtualization is layered on top of other virtualization technologies, allowing computing resources to be distributed dynamically in real-time. In this context, the term "virtualization" commonly refers to the artifact being encapsulated (application), which is quite different from its meaning in hardware virtualization, where it refers to the artifact being abstracted (physical hardware).

Network Virtualization. Network Virtualization refers to the process of combining hardware and software network resources to create a single pool of resources that make up a virtual network that can be accessed without regard to the physical component. Network virtualization typically involves combining hardware and software network resources and network functionality into a single, software-based administrative entity, a virtual network. Network virtualization involves platform virtualization, often combined with resource virtualization. Network virtualization is categorized as either external virtualization, combining many networks or parts of networks into a virtual unit, or internal virtualization, providing network-like functionality to software containers on a single network server.

Storage Virtualization. Storage virtualization refers to the process of consolidating the physical storage from multiple network storage devices so that it appears to be a single storage unit. Within the context of a storage system, there are two primary types of virtualization that can occur: Block virtualization used in this context refers to the abstraction (separation) of logical storage (partition) from physical storage so that it may be accessed without regard to physical storage or heterogeneous structure. This separation allows the administrators of the storage system greater flexibility in how they manage storage for end users. File virtualization addresses the NAS challenges by eliminating the dependencies between the data accessed at the file level and the location where the files are physically stored. This provides opportunities to optimize storage use and server consolidation and to perform non-disruptive file migrations.

Desktop Virtualization. Desktop virtualization refers to the process of virtualizing desktop computers using virtualization software, such that the desktop computer and the associated operating system and applications are separated from the physical client device that is used to access it. Desktop virtualization is software technology that separates the desktop environment and associated application software from the physical client device that is used to access it.

Desktop virtualization can be used in conjunction with application virtualization and user profile management systems, now termed "user virtualization," to provide a comprehensive desktop environment management system. In this mode, all the components of the desktop are virtualized, which allows for a highly flexible and much more secure desktop delivery model. In addition, this approach supports a more complete desktop disaster recovery strategy as all components are essentially saved in the data center and backed up through traditional redundant maintenance systems. If a user's device or hardware is lost, the restore is straightforward and simple, because the components will be present at login from another device. In addition, because no data is saved to the user's device, if that device is lost, there is much less chance that any critical data can be retrieved and compromised. Virtual Desktop Infrastructure (VDI)—The practice of hosting a desktop environment within a virtual machine that runs on a centralized or remote server.

An example of a virtualization architecture 900 is shown in FIG. 3*b*, where three virtual machines are exemplified. A Virtual Machine (VM) #1 910*a* provides virtualization for the application 901*a* that uses the guest OS 902*a*, which in turn interfaces with the virtual hardware 903*a* that emulates the actual hardware. Similarly, a Virtual Machine (VM) #2 910*b* provides virtualization for the application 901*b* that uses the guest OS 902*b*, which in turn interfaces with the virtual hardware 903*b* that emulates the associated actual hardware, and a Virtual Machine (VM) #3 910*c* provides virtualization for the application 901*c* that uses the guest OS 902*c*, which in turn interfaces with the virtual hardware 903*c* that emulates the associated actual hardware. The abstraction layer is provided by VMM 904, allowing of hardware-independence of operating system and applications, provisioning on any single physical system, and managing the applications and the OSs as a single encapsulated unit.

A hosted architecture 900*a* for virtualization is shown in FIG. 3*c*, where a wide range of actual host hardware 906 may be used by implementing a host operating system 905 layer between the actual hardware 906 and the VMM 904. Such configuration relies on the host OS 905 for device support and physical resource management. In contrast, a bare-metal architecture 900*b* is shown in FIG. 3*d*, where a hypervisor layer (in addition to, or as part of, the VMM 904) is used as the first layer, allowing the VMM 904 to have direct access to the hardware resources, hence providing more efficient, and greater scalability, robustness, and performance.

Cloud computing and virtualization is described in a book entitled "*Cloud Computing and Virtualization*" authored by Dac-Nhuong Le (Faculty of Information Technology, Haiphong University, Haiphong, Vietnam), Raghvendra Kumar (Department of Computer Science and Engineering, LNCT, Jabalpur, India), Gia Nhu Nguyen (Graduate School, Duy Tan University, Da Nang, Vietnam), and Jyotir Moy Chatterjee (Department of Computer Science and Engineering at GD-RCET, Bhilai, India), and published 2018 by John Wiley & Sons, Inc. [ISBN 978-1-119-48790-6], which is incorporated in its entirety for all purposes as if fully set forth herein. The book describes the adoption of virtualization in data centers creates the need for a new class of networks designed to support elasticity of resource allocation, increasing mobile workloads and the shift to production of virtual workloads, requiring maximum availability. Building a network that spans both physical servers and virtual machines with consistent capabilities demands a new architectural approach to designing and building the IT infrastructure. Performance, elasticity, and logical addressing structures must be considered as well as the management of the physical and virtual networking infrastructure. Once deployed, a network that is virtualization-ready can offer many revolutionary services over a common shared infrastructure. Virtualization technologies from VMware, Citrix and Microsoft encapsulate existing applications and extract them from the physical hardware. Unlike physical machines, virtual machines are represented by a portable software image, which can be instantiated on physical hardware at a moment's notice. With virtualization, comes elasticity where computer capacity can be scaled up or down on demand by adjusting the number of virtual machines actively executing on a given physical server. Additionally, virtual machines can be migrated while in service from one physical server to another.

Extending this further, virtualization creates "location freedom" enabling virtual machines to become portable across an ever-increasing geographical distance. As cloud architectures and multi-tenancy capabilities continue to develop and mature, there is an economy of scale that can be realized by aggregating resources across applications, business units, and separate corporations to a common shared, yet segmented, infrastructure. Elasticity, mobility, automation, and density of virtual machines demand new network architectures focusing on high performance, addressing portability, and the innate understanding of the virtual machine as the new building block of the data center. Consistent network-supported and virtualization-driven policy and controls are necessary for visibility to virtual machines' state and location as they are created and moved across a virtualized infrastructure.

Virtualization technologies in data center environments are described in a eBook authored by Gustavo Alessandro Andrade Santana and published 2014 by Cisco Systems, Inc. (Cisco Press) [ISBN-13: 978-1-58714-324-3] entitled: "*Data Center Virtualization Fundamentals*", which is incorporated in its entirety for all purposes as if fully set forth herein. PowerVM technology for virtualization is described in IBM RedBook entitled: "*IBM PowerVM Virtualization—Introduction and Configuration*" published by IBM Corporation June 2013, and virtualization basics is described in a paper by IBM Corporation published 2009 entitled: "*Power Systems—Introduction to virtualization*", which are both incorporated in their entirety for all purposes as if fully set forth herein.

FIG. 1 shows a block diagram that illustrates a system 10 including a computer system 11 and an associated Internet 113 connection. Such configuration is typically used for computers (hosts) connected to the Internet 113 and executing a server or a client (or a combination) software. The system 11 may be used as a portable electronic device such as a notebook/laptop computer, a media player (e.g., MP3 based or video player), a desktop computer, a laptop computer, a cellular phone, a Personal Digital Assistant (PDA), an image processing device (e.g., a digital camera or video recorder), and/or any other handheld or fixed location computing devices, or a combination of any of these devices. Note that while FIG. 1 illustrates various components of a computer system, it is not intended to represent any particular architecture or manner of interconnecting the components; as such details are not germane. It will also be appreciated that network computers, handheld computers, cell phones and other data processing systems which have fewer components or perhaps more components may also be used. The computer system of FIG. 1 may, for example, be an Apple Macintosh computer or Power Book, or an IBM compatible PC. The computer system 11 includes a bus 13, an interconnect, or other communication mechanism for communicating information, and the processor 27, commonly in the form of an integrated circuit, coupled to the bus 13 for processing information and for executing the computer executable instructions. Computer system 11 also includes a main memory 25*a*, such as a Random Access Memory (RAM) or other dynamic storage device, coupled to bus 13 for storing information and instructions to be executed by the processor 27. Main memory 25*a* also may be used for storing temporary variables or other intermediate information during execution of instructions to be executed by processor 27. The computer system 11 further includes a Read Only Memory (ROM) 25*b* (or other non-volatile memory) or other static storage device coupled to the bus 13 for storing static information and instructions for the processor 27. A storage device 25*c*, such as a magnetic disk or optical disk, a hard disk drive (HDD) for reading from and writing to a hard disk, a magnetic disk drive for reading from and writing to a magnetic disk, and/or an optical disk drive (such as DVD) for reading from and writing to a removable optical disk, is coupled to bus 13 for storing information and instructions. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices. Typically, the computer system 11 includes an Operating System (OS) stored in a non-volatile storage for managing the computer resources and provides the applications and programs with an access to the computer resources and interfaces. An operating system commonly processes system data and user input, and responds by allocating and managing tasks and internal system resources, such as controlling and allocating memory, prioritizing system requests, controlling input and output devices, facilitating networking and managing files. Non-limiting examples of operating systems are Microsoft Windows, Mac OS X, and Linux.

The term "processor" is used herein to include, but not limited to, any integrated circuit or other electronic device (or collection of devices) capable of performing an operation on at least one instruction, including, without limitation, Reduced Instruction Set Core (RISC) processors, CISC microprocessors, Microcontroller Units (MCUs), CISC-based Central Processing Units (CPUs), and Digital Signal Processors (DSPs). The hardware of such devices may be integrated onto a single substrate (e.g., silicon "die"), or distributed among two or more substrates. Furthermore, various functional aspects of the processor may be implemented solely as software or firmware associated with the processor.

The computer system 11 may be coupled via the bus 13 to a display 17, such as a Cathode Ray Tube (CRT), a Liquid Crystal Display (LCD), a flat screen monitor, a touch screen monitor or similar means for displaying text and graphical data to a user. The display may be connected via a video adapter for supporting the display. The display 17 allows a user to view, enter, and/or edit information that is relevant to the operation of the system. An input device 18, including alphanumeric and other keys, is coupled to the bus 13 for communicating information and command selections to the processor 27. Another type of user input device is a cursor control 19, such as a mouse, a trackball, or cursor direction keys for communicating direction information and command selections to the processor 27 and for controlling cursor movement on the display 17. This input device typically has two degrees of freedom in two axes, a first axis (e.g., x) and a second axis (e.g., y), that allows the device to specify positions in a plane.

The computer system 11 may be used for implementing the methods and techniques described herein. According to one embodiment, those methods and techniques are performed by the computer system 11 in response to the processor 27 executing one or more sequences of one or more instructions contained in a main memory 25*a*. Such instructions may be read into the main memory 25*a* from another computer-readable medium, such as the storage device 25*c*. Execution of the sequences of instructions contained in the main memory 25*a* causes the processor 27 to perform the process steps described herein. In alternative embodiments, hard-wired circuitry may be used in place of or in combination with software instructions to implement the arrangement. Thus, embodiments of the invention are not limited to any specific combination of hardware circuitry and software.

The term "computer-readable medium" (or "machine-readable medium") is used herein to include, but not limited to, any medium or any memory, that participates in providing instructions to a processor, (such as the processor 27) for execution, or any mechanism for storing or transmitting information in a form readable by a machine (e.g., a computer). Such a medium may store computer-executable instructions to be executed by a processing element and/or control logic, and data which is manipulated by a processing element and/or control logic, and may take many forms, including but not limited to, non-volatile medium, volatile medium, and transmission medium. Transmission media includes coaxial cables, copper wire and fiber optics, including the wires that comprise the bus 13. Transmission media can also take the form of acoustic or light waves, such as those generated during radio-wave and infrared data communications, or other form of propagating signals (e.g., carrier waves, infrared signals, digital signals, etc.). Common forms of computer-readable media include, for example, a floppy disk, a flexible disk, hard disk, magnetic tape, or any other magnetic medium, a CD-ROM, any other optical medium, punch-cards, paper-tape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer-readable media may be involved in carrying one or more sequences of one or more instructions to the processor 27 for execution. For example, the instructions may initially be carried on a magnetic disk of a remote computer. The remote computer can load the instructions into its dynamic memory and send the instructions over a telephone line using a modem. A modem local to the computer system 11 can receive the data on the telephone line and use an infrared transmitter to convert the data to an infrared signal. An infrared detector can receive the data carried in the infrared signal and appropriate circuitry can place the data on the bus 13. The bus 13 carries the data to the main memory 25*a*, from which the processor 27 retrieves and executes the instructions. The instructions received by the main memory 25*a* may optionally be stored on the storage device 25*c* either before or after execution by the processor 27.

The computer system 11 commonly includes a communication interface 29 coupled to the bus 13. The communication interface 29 provides a two-way data communication coupling to a network link 28 that is connected to a local network 14. For example, the communication interface 29 may be an Integrated Services Digital Network (ISDN) card or a modem to provide a data communication connection to a corresponding type of telephone line. As another non-limiting example, the communication interface 29 may be a local area network (LAN) card to provide a data communication connection to a compatible LAN. For example, Ethernet based connection based on IEEE802.3 standard may be used, such as 10/100BaseT, 1000BaseT (gigabit Ethernet), 10 gigabit Ethernet (10GE or 10 GbE or 10 GigE per IEEE Std. 802.3ae-2002as standard), 40 Gigabit Ethernet (40 GbE), or 100 Gigabit Ethernet (100 GbE as per Ethernet standard IEEE P802.3ba). These technologies are described in Cisco Systems, Inc. Publication number 1-587005-001-3 (June 1999), "Internetworking Technologies Handbook", Chapter 7: "Ethernet Technologies", pages 7-1 to 7-38, which is incorporated in its entirety for all purposes as if fully set forth herein. In such a case, the communication interface 29 typically includes a LAN transceiver or a modem, such as Standard Microsystems Corporation (SMSC) LAN91C111 10/100 Ethernet transceiver, described in a Standard Microsystems Corporation (SMSC) data-sheet "LAN91C111 10/100 Non-PCI Ethernet Single Chip MAC+PHY" Data-Sheet, Rev. 15 (02-20-04), which is incorporated in its entirety for all purposes as if fully set forth herein.

The Internet 113 is a global system of interconnected computer networks that use the standardized Internet Protocol Suite (TCP/IP), including Transmission Control Protocol (TCP) and the Internet Protocol (IP), to serve billions of users worldwide. It is a network of networks that consists of millions of private, public, academic, business, and government networks, of local to global scope, that are linked by a broad array of electronic and optical networking technologies. The Internet carries a vast range of information resources and services, such as the interlinked hypertext documents on the World Wide Web (WWW) and the infrastructure to support electronic mail. The Internet backbone refers to the principal data routes between large, strategically interconnected networks and core routers in the Internet. These data routes are hosted by commercial, government, academic and other high-capacity network centers, the Internet exchange points and network access points that interchange Internet traffic between the countries, continents and across the oceans of the world. Traffic interchange between Internet service providers (often Tier 1 networks) participating in the Internet backbone exchange traffic by privately negotiated interconnection agreements, primarily governed by the principle of settlement-free peering.

An Internet Service Provider (ISP) 12 is an organization that provides services for accessing, using, or participating in the Internet 113. Internet Service Providers may be organized in various forms, such as commercial, community-owned, non-profit, or otherwise privately owned. Internet services typically provided by ISPs include Internet access, Internet transit, domain name registration, web hosting, and colocation. Various ISP Structures are described in Chapter 2*: "Structural Overview of ISP Networks*" of the book entitled: "*Guide to Reliable Internet Services and Applications*", by Robert D. Doverspike, K K Ramakrishnan, and Chris Chase, published 2010 (ISBN: 978-1-84882-827-8), which is incorporated in its entirety for all purposes as if fully set forth herein.

A mailbox provider is an organization that provides services for hosting electronic mail domains with access to storage for mailboxes. It provides email servers to send, receive, accept, and store email for end users or other organizations. Internet hosting services provide email, web-hosting, or online storage services. Other services include virtual server, cloud services, or physical server operation. A virtual ISP (VISP) is an operation that purchases services from another ISP, sometimes called a wholesale ISP in this context, which allow the VISP's customers to access the Internet using services and infrastructure owned and operated by the wholesale ISP. It is akin to mobile virtual network operators and competitive local exchange carriers for voice communications. A Wireless Internet Service Provider (WISP) is an Internet service provider with a network based on wireless networking. Technology may include commonplace Wi-Fi wireless mesh networking, or proprietary equipment designed to operate over open 900 MHz, 2.4 GHz, 4.9, 5.2, 5.4, 5.7, and 5.8 GHz bands or licensed frequencies in the UHF band (including the MMDS frequency band) and LMDS.

ISPs may engage in peering, where multiple ISPs interconnect at peering points or Internet exchange points (IXs), allowing routing of data between each network, without charging one another for the data transmitted—data that would otherwise have passed through a third upstream ISP, incurring charges from the upstream ISP. ISPs requiring no upstream and having only customers (end customers and/or peer ISPs), are referred to as Tier 1 ISPs.

A multitasking is a method where multiple tasks (also known as processes or programs) are performed during the same period of time—they are executed concurrently (in overlapping time periods, new tasks starting before others have ended) instead of sequentially (one completing before the next starts). The tasks share common processing resources, such as a CPU and main memory. Multitasking does not necessarily mean that multiple tasks are executing at exactly the same instant. In other words, multitasking does not imply parallelism, but it does mean that more than one task can be part-way through execution at the same time, and more than one task is advancing over a given period of time.

In the case of a computer with a single CPU, only one task is the to be running at any point in time, meaning that the CPU is actively executing instructions for that task. Multitasking solves the problem by scheduling which task may be the one running at any given time, and when another waiting task gets a turn. The act of reassigning a CPU from one task to another one is called a context switch. When context switches occur frequently enough, the illusion of parallelism is achieved. Even on computers with more than one CPU (called multiprocessor machines) or more than one core in a given CPU (called multicore machines), where more than one task can be executed at a given instant (one per CPU or core), multitasking allows many more tasks to be run than there are CPUs.

Operating systems may adopt one of many different scheduling strategies. In multiprogramming systems, the running task keeps running until it performs an operation that requires waiting for an external event (e.g. reading from a tape) or until the computer's scheduler forcibly swaps the running task out of the CPU. Multiprogramming systems are designed to maximize CPU usage. In time-sharing systems, the running task is required to relinquish the CPU, either voluntarily or by an external event such as a hardware interrupt. Time sharing systems are designed to allow several programs to execute apparently simultaneously. In real-time systems, some waiting tasks are guaranteed to be given the CPU when an external event occurs. Real time systems are designed to control mechanical devices such as industrial robots, which require timely processing.

Encryption based mechanisms are commonly end-to-end processes involving only the sender and the receiver, where the sender encrypts the plain text message by transforming it using an algorithm, making it unreadable to anyone, except the receiver which possesses special knowledge. The data is then sent to the receiver over a network such as the Internet, and when received the special knowledge enables the receiver to reverse the process (decrypt) to make the information readable as in the original message. The encryption process commonly involves computing resources such as processing power, storage space and requires time for executing the encryption/decryption algorithm, which may delay the delivery of the message.

Transport Layer Security (TLS) and its predecessor Secure Sockets Layer (SSL) are non-limiting examples of end-to-end cryptographic protocols, providing secured communication above the OSI Transport Layer, using keyed message authentication code and symmetric cryptography. In client/server applications, the TLS client and server negotiate a stateful connection by using a handshake procedure, during which various parameters are agreed upon, allowing a communication in a way designed to prevent eavesdropping and tampering. The TLS 1.2 is defined in RFC 5246, and several versions of the protocol are in widespread use in applications such as web browsing, electronic mail, Internet faxing, instant messaging and Voice-over-IP (VoIP). In application design, TLS is usually implemented on top of any of the Transport Layer protocols, encapsulating the application-specific protocols such as HTTP, FTP, SMTP, NNTP, and XMPP. Historically, it has been used primarily with reliable transport protocols such as the Transmission Control Protocol (TCP). However, it has also been implemented with datagram-oriented transport protocols, such as the User Datagram Protocol (UDP) and the Datagram Congestion Control Protocol (DCCP), a usage which has been standardized independently using the term Datagram Transport Layer Security (DTLS). A prominent use of TLS is for securing World Wide Web traffic carried by HTTP to form HTTPS. Notable applications are electronic commerce and asset management. Increasingly, the Simple Mail Transfer Protocol (SMTP) is also protected by TLS (RFC 3207). These applications use public key certificates to verify the identity of endpoints. Another Layer 4 (Transport Layer) and upper layers encryption-based communication protocols include SSH (Secure Shell) and SSL (Secure Socket Layer).

To provide the server name, RFC 4366 Transport Layer Security (TLS) Extensions allow clients to include a Server Name Indication extension (SNI) in the extended ClientHello message. This extension hints the server immediately which name the client wishes to connect to, so the server can select the appropriate certificate to send to the clients.

Layer 3 (Network Layer) and lower layer encryption based protocols include IPsec, L2TP (Layer 2 Tunneling Protocol) over IPsec, and Ethernet over IPsec. The IPsec is a protocol suite for securing IP communication by encrypting and authenticating each IP packet of a communication session. The IPsec standard is currently based on RFC 4301 and RFC 4309, and was originally described in RFCs 1825-1829, which are now obsolete, and uses the Security Parameter Index (SPI, as per RFC 2401) as an identification tag added to the header while using IPsec for tunneling the IP traffic. An IPsec overview is provided in Cisco Systems, Inc. document entitled: "*An Introduction to IP Security (IPSec) Encryption*", which is incorporated in its entirety for all purposes as if fully set forth herein.

Two common approaches to cryptography are found in U.S. Pat. No. 3,962,539 to Ehrsam et al., entitled "*Product Block Cipher System for Data Security*", and in U.S. Pat. No. 4,405,829 to Rivest et al., entitled "*Cryptographic Communications System and Method*", which are both incorporated in their entirety for all purposes as if fully set forth herein. The Ehrsam patent discloses what is commonly known as the Data Encryption Standard (DES), while the Rivest patent discloses what is commonly known as the RSA algorithm (which stands for Rivest, Shamir and Adleman who first publicly described it), which is widely used in electronic commerce protocols. The RSA involves using a public key and a private key. DES is based upon secret-key cryptography, also referred to as symmetric cryptography, and relies upon a 56-bit key for encryption. In this form of cryptography, the sender and receiver of cipher text both possess identical secret keys, which are, in an ideal world, completely unique and unknown to the world outside of the sender and receiver. By encoding plain text into cipher text using the secret key, the sender may send the cipher text to the receiver using any available public or otherwise insecure communication system. The receiver, having received the cipher text, decrypts it using the secret key to arrive at the plain text.

SNI. Server Name Indication (SNI) is an extension to the TLS computer networking protocol by which a client indicates which hostname it is attempting to connect to at the start of the handshaking process. This allows a server to present multiple certificates on the same IP address and TCP port number and hence allows multiple secure (HTTPS) websites (or any other Service over TLS) to be served by the same IP address without requiring all those sites to use the same certificate. It is the conceptual equivalent to HTTP/1.1 name-based virtual hosting, but for HTTPS. The desired hostname is not encrypted, so an eavesdropper can see which site is being requested.

SNI addresses this issue by having the client sends the name of the virtual domain as part of the TLS negotiation. This enables the server to select the correct virtual domain early and present the browser with the certificate containing the correct name. Therefore, with clients and servers that implement SNI, a server with a single IP address can serve a group of domain names for which it is impractical to get a common certificate. SNI was added to the IETF's Internet RFCs in June 2003 through RFC 3546, Transport Layer Security (TLS) Extensions. The latest version of the standard is RFC 6066. For an application program to implement SNI, the TLS library it uses must implement it and the application must pass the hostname to the TLS library. Further, the TLS library may either be included in the application program or be a component of the underlying operating system.

Proxy server. A proxy server is a server (a computer system or an application) that acts as an intermediary for requests from clients seeking resources from other servers. A client connects to the proxy server, requesting some service, such as a file, connection, web page, or other resource, available from a different server and the proxy server evaluates the request as a way to simplify and control its complexity. Proxies may be used to add structure and encapsulation to distributed systems. Today, most proxies are web proxies, facilitating access to content on the World Wide Web and providing anonymity. A proxy server may reside on the user's local computer, or at various points between the user's computer and destination servers on the Internet. A proxy server that passes requests and responses unmodified is usually called a gateway or sometimes a tunneling proxy. A forward proxy is an Internet-facing proxy used to retrieve from a wide range of sources (in most cases anywhere on the Internet). Forward proxies are proxies in which the client server names the target server to connect to, and are able to retrieve from a wide range of sources (in most cases anywhere on the Internet). An open proxy is a forwarding proxy server that is accessible by any Internet user, while browsing the Web or using other Internet services. There are varying degrees of anonymity, however, as well as a number of methods of 'tricking' the client into revealing itself regardless of the proxy being used. Proxy server is further described in IETF RFC 1919 (March 1996) "*Classical versus Transparent IP Proxies*" and in IETF RFC 3143 (March 1996) "*Known HTTP Proxy/Caching Problems*" (June 2001), which are both incorporated in their entirety for all purposes as if fully set forth herein.

A reverse proxy (or surrogate) is a proxy server that appears to clients to be an ordinary server. Requests are forwarded to one or more proxy servers which handle the request. The response from the proxy server is returned as if it came directly from the original server, leaving the client no knowledge of the origin servers. Reverse proxies are installed in the neighborhood of one or more web servers. All traffic coming from the Internet and with a destination of one of the neighborhood's web servers goes through the proxy server. The use of "reverse" originates in its counterpart "forward proxy" since the reverse proxy sits closer to the web server and serves only a restricted set of websites.

FIG. 5 shows a system 50 including two client devices, a client device #1 31*a* and a client device #2 31*b*, that may access the web servers (data servers) 22*a* and 22*b*. These network elements communicate with each other using the Internet 113. An illustrative example of direct fetching or content without any use of any intermediary device (such as a proxy server) is shown in a schematic messaging flow diagram 50*a* in FIG. 5*a*. As part of executing a web server application in the client device #1 31*a*, a request for content from the data server #1 22*a*, typically by means of an URL request is identified. As a result, the client device #1 31*a* send a 'Content Request' message 55*a* over the Internet 113 (typically as an HTTP request) to the data server #1 22*a*. The IP packets that form the 'Content Request' message 55*a* include the IP of the data server #1 22*a* in the 'Destination IP Address' field 16*c*, and the IP address of the requesting client device #1 31*a* is included in the 'Source IP Address' field 16*d*. As a result, the data server #1 22*a* responds to the received request by sending the requested content (such as a web page) as a 'Send Content' message 55*b* over the Internet 113 (typically as an HTTP request) to the requesting client device #1 31*a*. The IP packets that form the 'Send Content' message 55*b* include the IP of the data server #1 22*a* in the 'Source IP Address' field 16*d*, and the IP address of the requesting client device #1 31*a* is included in the 'Destination IP Address' field 16*c*.

Since the IP address of the requesting client device #1 31*a* is included in the packets that are received by the data server #1 22*a* as part of the HTTP request in the 'Content Request' message 55*a* over the Internet 113, the data server #1 22*a* is aware of the identity of the requesting client #1 31*a*, revealing its identity, and no anonymity is obtained.

An illustrative example of using a proxy server is shown in a schematic messaging flow diagram 50*b* in FIG. 5*b*. A 'Content Request' message 54*a* is first sent from the client device #1 31*a* to a proxy server 53, which responds by forwarding the request to the data server #1 22*a* using a 'Content Request' message 54*b*. In turn the data server #1 22*a* replies and sends the content in a 'Send Content' message 54*c* to the requesting proxy server 53, which in turn forward the fetched content to the asking client device #1 31*a* using a 'Send Content' message 54*d*. Hence, the client device #1 31*a* received the requested content in response to the sent 'Content Request' message 54*a*.

A main benefit of using the proxy server 53 relates to the anonymity obtained. While the 'Content Request' message 54*a* typically includes the IP address of the sending requesting client device #1 31*a* (in the 'Source IP Address' field 16*d*), the request message that arrives as part of the 'Content Request' message 54*b* includes the IP address of the proxy server 53 in the 'Source IP Address' field 16*d* of the packets that form the 'Content Request' message 54*b*. Hence, the data server #1 22*a* is only aware of the identity of the proxy server 53 as the requesting device, and the anonymity of the actual requesting client #1 31*a* is reserved, while properly fetching the requested content.

A 'transparent proxy' is a proxy that does not modify the request or response beyond what is required for proxy authentication and identification. Transparent proxy, also known as an intercepting proxy, inline proxy, or forced proxy, is a proxy that intercepts normal communication at the network layer without requiring any special client configuration. Clients need not be aware of the existence of the proxy. A transparent proxy is normally located between the client and the Internet, with the proxy performing some of the functions of a gateway or router. A 'non-transparent proxy' is a proxy that modifies the request or response in order to provide some added service to the user agent, such as group annotation services, media type transformation, protocol reduction, or anonymity filtering. TCP Intercept is a traffic filtering security feature that protects TCP servers from TCP SYN flood attacks, which are a type of denial-of-service attack. TCP Intercept is available for IP traffic only. Intercepting proxies are commonly used in businesses to enforce acceptable use policy, and to ease administrative overheads, since no client browser configuration is required. This second reason however is mitigated by features such as Active Directory group policy, or DHCP and automatic proxy detection. Intercepting proxies are also commonly used by ISPs in some countries to save upstream bandwidth and improve customer response times by caching.

An 'open proxy' is used for forwarding requests from and to anywhere on the Internet, and is a forwarding proxy server that is accessible by any Internet user. An 'anonymous proxy' reveals its identity as a proxy server, but does not disclose the originating IP address of the client. While this type of server may be easily discovered, it may be beneficial for some users for hiding their originating IP address. A 'transparent proxy' does not only identifies itself as a proxy server, but with the support of HTTP header fields such as X-Forwarded-For, the originating IP address may be retrieved as well. The main benefit of using this type of server is its ability to cache a website for faster retrieval.

A 'reverse proxy' is taking requests from the Internet and forwarding them to servers in an internal network, while those making requests connect to the proxy and may not be aware of the internal network. A reverse proxy (or surrogate) is a proxy server that appears to clients to be an ordinary server. Reverse proxies forward requests to one or more ordinary servers which handle the request. The response from the proxy server is returned as if it came directly from the original server, leaving the client with no knowledge of the original server. Reverse proxies are installed in the neighborhood of one or more web servers. All traffic coming from the Internet and with a destination of one of the neighborhood's web servers goes through the proxy server. The use of "reverse" originates in its counterpart "forward proxy" since the reverse proxy sits closer to the web server and serves only a restricted set of websites. Reverse proxy servers typically support or provide Encryption/SSL acceleration—when secure web sites are created, the Secure Sockets Layer (SSL) encryption is often not done by the web server itself, but by a reverse proxy that is equipped with SSL acceleration hardware. Furthermore, a host can provide a single "SSL proxy" to provide SSL encryption for an arbitrary number of hosts; removing the need for a separate SSL Server Certificate for each host, with the downside that all hosts behind the SSL proxy have to share a common DNS name or IP address for SSL connections. Further, reverse proxy servers typically support or provide load balancing—the reverse proxy can distribute the load to several web servers, each web server serving its own application area. In such a case, the reverse proxy may need to rewrite the URLs in each web page (translation from externally known URLs to the internal locations), and serve/cache static content—a reverse proxy can offload the web servers by caching static content like pictures and other static graphical content. Further, the proxy server can optimize and compress the content to speed up the load time, and may further support or provides Spoon feeding, where reduced resource usage is caused by slow clients on the web servers by caching the content the web server sent and slowly "spoon feeding" it to the client, which benefits dynamically generated pages. Further, reverse proxy servers typically support or provide security, where the proxy server is an additional layer of defense and can protect against some OS and Web Server specific attacks, and Extranet Publishing—where a reverse proxy server facing the Internet can be used to communicate to a firewall server internal to an organization, providing extranet access to some functions while keeping the servers behind the firewalls. If used in this way, security measures should be considered to protect the rest of your infrastructure in case this server is compromised, as its web application is exposed to attack from the Internet.

A 'translation proxy' is a proxy server that is used to localize a website experience for different markets. Traffic from global audience is routed through the translation proxy to the source website, and as visitors browse the proxied site, requests go back to the source site where pages are rendered. Original language content in the response is replaced by the translated content as it passes back through the proxy. The translations used in a translation proxy can be either machine translation, human translation, or a combination of machine and human translation. Different translation proxy implementations have different capabilities. Some allow further customization of the source site for local audience such as excluding the source content or substituting the source content with the original local content. A 'SOCKS proxy' forwards arbitrary data after a connection phase, and is similar to HTTP CONNECT in web proxies.

A 'CGI web proxy' accepts target URLs using a Web form in the user's browser window, processes the request, and returns the results to the user's browser. Consequently, it can be used on a device or network that does not allow "true" proxy settings to be changed. Typically CGI proxies are powered by one of CGIProxy (written in the Perl language), Glype (written in the PHP language), or PHProxy (written in the PHP language). Some CGI proxies were set up for purposes such as making websites more accessible to disabled people, but have since been shut down due to excessive traffic, usually caused by a third party advertising the service as a means to bypass local filtering. Since many of these users do not care about the collateral damage they are causing, it became necessary for organizations to hide their proxies, disclosing the URLs only to those who take the trouble to contact the organization and demonstrate a genuine need.

A 'suffix proxy' allows a user to access web content by appending the name of the proxy server to the URL of the requested content (e.g. "en.wikipedia.org.SuffixProxy.com"). Suffix proxy servers are easier to use than regular proxy servers but they do not offer high levels of anonymity and their primary use is for bypassing web filters.

An 'I2P anonymous proxy' is part of the I2P anonymous network ('I2P'), that is a proxy network aiming at online anonymity. It implements garlic routing, which is an enhancement of Tor's onion routing. I2P is fully distributed and works by encrypting all communications in various layers and relaying them through a network of routers run by volunteers in various locations. By keeping the source of the information hidden, I2P offers censorship resistance. The goals of I2P are to protect users' personal freedom, privacy, and ability to conduct confidential business. Each user of I2P runs an I2P router on their computer (node). The I2P router takes care of finding other peers and building anonymizing tunnels through them. I2P provides proxies for all protocols (such as HTTP, IRC, and SOCKS). The Onion Router (Tor) is a system intended to provide online anonymity. Tor client software routes Internet traffic through a worldwide volunteer network of servers for concealing a user computer location or usage from someone conducting network surveillance or traffic analysis. Using Tor makes tracing Internet activity more difficult, and is intended to protect users' personal freedom, privacy. "Onion routing" refers to the layered nature of the encryption service: The original data are encrypted and re-encrypted multiple times, then sent through successive Tor relays, each one of which decrypts a "layer" of encryption before passing the data on to the next relay and ultimately the destination. This reduces the possibility of the original data being unscrambled or understood in transit. A 'DNS proxy server' takes DNS queries from a (usually local) network and forwards them to an Internet Domain Name Server. It may also cache DNS records.

Squid is an open source caching proxy for the Web, allowing for using less bandwidth on your Internet connection when surfing the Web, reducing the amount of time web pages take to load, protecting the hosts on your internal network by proxying their web traffic, collecting statistics about web traffic on your network, preventing users from visiting inappropriate web sites at work or school, ensuring that only authorized users can surf the Internet, enhancing your user's privacy by filtering sensitive information from web requests, reducing the load on your own web server(s), and converting encrypted (HTTPS) requests on one side, to unencrypted (HTTP). Squid's job is to be both a proxy and a cache. As a proxy, Squid is an intermediary in a web transaction. It accepts a request from a client, processes that request, and then forwards the request to the origin server. The request may be logged, rejected, and even modified before forwarding. As a cache, Squid stores recently retrieved web content for possible reuse later. Subsequent requests for the same content may be served from the cache, rather than contacting the origin server again. You can disable the caching part of Squid if you like, but the proxying part is essential. Squid is described in a book by Wessels entitled: "*Squid: The Definitive Guide*" published by O'Reilly Media; 1st Ed. [ISBN-10: 9780596001629, ISBN-13: 978-0596001629, (Jan. 1, 2004)], which is incorporated in its entirety for all purposes as if fully set forth herein.

Web proxy servers are described in a book by Luotonen entitled: "*Web Proxy Servers*" published by Prentice Hall; 1st Ed. [ISBN-10: 0136806120, ISBN-13: 978-0136806127, (Dec. 30, 1997)], which is incorporated in its entirety for all purposes as if fully set forth herein. An overview of proxies and reports their status is provided in a paper by Luotonen et al. entitled: "*World-Wide Web proxies*", published Computer Networks and ISDN Systems 27, 147-154 (Elsevier Science B.V.) (1994), which is incorporated in its entirety for all purposes as if fully set forth herein. A WWW proxy server, proxy for short, provides access to the Web for people on closed subnets who can only access the Internet through a firewall machine. The hypertext server developed at CERN, cern_httpd, is capable of running as a proxy, providing seamless external access to HTTP, Gopher, WAIS and FTP. ccm_httpd has had gateway features for a long time, but only this spring they were extended to support all the methods in the HTTP protocol used by WWW clients. Clients do not lose any functionality by going through a proxy, except special processing they may have done for non-native Web protocols such as Gopher and FTP. A brand new feature is caching performed by the proxy, resulting in shorter response times after the first document fetch. This makes proxies useful even to the people who do have full Internet access and do not really need the proxy just to get out of their local subnet.

An example of an open proxies is ProxyList.net, a web site that maintained a list of links to open proxies, as described in ProxyList.net and as captured by the Wayback Machine (web.archive.org), on Jul. 17, 2011, which is incorporated in its entirety for all purposes as if fully set forth herein. VIP72 is a website that sells its registered users access to anonymizing proxies, that is described in a printout that comprises a numbered sequence the representing approximately second-by-second screen dumps of the video of VIP72 YouTube web page bearing a publication date of Sep. 22, 2011, at https://www.youtube.com/watch?v=L0Hct2kSnn4, retrieved Nov. 21, 2019, and further described in VIP72 Scene Images extracted from VIP72.com/nvpnnet, MPEG-4 video recording of "nVPN.net|Double your Safety and use Socks5+ nVpn", accessed from https://www.youtube.com/watch?v=L0Hct2kSnn4, published Sep. 11, 2011, as well as VIP72.com home page as of 2013 from Wayback Machine, which are all incorporated in their entirety for all purposes as if fully set forth herein.

A proxy server in a cloud-based proxy service is described in U.S. Patent Application Publication No. 2013/0080575 to Prince et al. entitled: "Distributing transmission of requests across multiple ip addresses of a proxy server in a cloud-based proxy service", which is incorporated in its entirety for all purposes as if fully set forth herein. A first packet is received at a proxy server from a client and includes a first incoming request for an action to be performed on an identified resource. The first packet is received at the proxy server as a result of a DNS request for a domain corresponding to the identified resource resolving to an IP address of the proxy server. The proxy server selects, based on at least in part on a set of parameters associated with the first packet, one of multiple IP addresses for use as a source IP address for a second packet that carries an outgoing request and transmits the second packet. The proxy server receives a third packet that includes an incoming response from the destination origin server in response to the outgoing request and transmits a fourth packet to the client that includes an outgoing response based on the incoming response.

Distributing transmission of requests across multiple IP addresses of a proxy server is described in U.S. Patent Application Publication No. 2013/0080575 to Prince et al. entitled: "Distributing transmission of requests across multiple ip addresses of a proxy server in a cloud-based proxy service", which is incorporated in its entirety for all purposes as if fully set forth herein. A first packet is received at a proxy server from a client and includes a first incoming request for an action to be performed on an identified resource. The first packet is received at the proxy server as a result of a DNS request for a domain corresponding to the identified resource resolving to an IP address of the proxy server. The proxy server selects, based on at least in part on a set of parameters associated with the first packet, one of multiple IP addresses for use as a source IP address for a second packet that carries an outgoing request and transmits the second packet. The proxy server receives a third packet that includes an incoming response from the destination origin server in response to the outgoing request and transmits a fourth packet to the client that includes an outgoing response based on the incoming response.

Data Center (DC) Proxy Server. While the arrangement 50*b* shown in FIG. 5*b* provides some level of anonymity, such anonymity may be limited. The data server #1 22*a* may identify that the IP address corresponding to the received requests as part of the 'Content Request' 54*b* from the proxy server 53 belong to a server or a proxy server, and may block this IP address, obviating the access of the proxy server 53 to serve as an intermediate device for the client device #1 31*a*. Further, particularly if used frequently and by multiple client device, the data server #1 22*a* may detect the excessive load of requests from the proxy server 53, and may conclude that the IP address corresponding to the received requests as part of the 'Content Request' 54*b* from the proxy server 53 does not identify a client device but rather an intermediate device, and may then block this IP address, and will not respond to requests for content originating by this IP address.

An improved arrangement 50*c* is shown in FIG. 5*c*, using a Data Center (DC) proxy server 56. The DC proxy server 56 stores, or has access to, a list of IP addresses, such as the IP addresses list 58. The examplary IP addresses list 58 is exampled to include 6 IP addresses, shown as IP #1 58*a*, IP #2 58*b*, IP #3 58*c*, IP #4 58*d*, IP #5 58*e*, and IP #6 58*f*. While exampled regarding 6 IP addresses, any number of IP addresses may be equally used. The IP addresses in the list 58 serves as IP addresses 'bank', and upon receiving a request for a content (such as a URL) from a client device, the DC proxy server 56 selects one of the IP addresses (such as randomly or any other load balancing technique), and use the selected IP address for requesting the content from the web server. Since many IP addresses are used, the web server, such as the data server #1 22*a*, cannot easily identify the requests origin to be a single device, and the traffic seems to be originated from a legitimate pool of client devices.

For example, upon receiving the 'Content Request' message 54*a* from the client device #1 31*a* by the DC proxy server 56, it responds by selecting an IP address from the list 58, such as the IP #3 58*c*, and then forwarding the request to the data server #1 22*a* using the IP #3 58*c* as the originating IP address source 16*d* as part of the 'Content Request' message 54*b*. In turn the data server #1 22*a* replies and sends the content in the 'Send Content' message 54*c* to the requesting DC proxy server 56, which in turn forward the fetched content to the asking client device #1 31*a* using the 'Send Content' message 54*d*. Hence, the client device #1 31*a* received the requested content in response to the sent 'Content Request' message 54*a*, however the data server #1 22*a* is only aware of the IP #3 58*c* identity, and is not aware of the client device #1 31*a* identity (IP address).

In a case where the client device #1 31*a* requests another content from the data server #1 22*a*, it sends another 'Content Request' message 57*a* to the DC proxy server 56. Upon receiving the 'Content Request' message 57*a* from the client device #1 31*a* by the DC proxy server 56, it responds by selecting another IP address from the list 58, such as the IP #6 58*f*, and then forwarding the request to the data server #1 22*a* using the IP #6 58*f* as the originating IP address source 16*d* as part of another 'Content Request' message 57*b*. In turn the data server #1 22*a* replies and sends the content in the 'Send Content' message 57*c* to the requesting DC proxy server 56, which in turn forward the fetched content to the asking client device #1 31*a* using another 'Send Content' message 57*d*. Hence, the client device #1 31*a* received the additional requested content in response to the sent 'Content Request' message 57*a*, however the data server #1 22*a* is only aware of the IP #6 58*f* identity, and is not aware of the client device #1 31*a* identity (IP address). Further, the data server #1 22*a* receives the requests from two different IP addresses IP #3 58*c* and IP #6 58*f*, and is not aware that both requests were sent from the same originating device.

Typically DC proxy servers are offered as a service by various corporations, and not by an ISP. When you visit a website, the web server will detect the credentials of the DC proxy instead of your actual information. DC proxy server services are typically a cheap, fast, and stable way to provide anonymity, and preventing blocking by a web server. Typical DC proxy server service provide high performance and bandwidth up 1000 MB/s speed, the proxy IP addresses used may be static or dynamically changed, and have presence in multiple countries worldwide. Using DC proxies are typically used to hide user real identity or IP from the Internet. Comparison of performance of various commercially available DC proxy server services (referred to as VPN services) is described a test report by of a test commissioned by AnchorFree and performed by AV-TEST GmbH (dated Jun. 15, 2018), entitled: "*VPN Comparative Test*", which is incorporated in its entirety for all purposes as if fully set forth herein. The report presents evaluation assesses AnchorFree's Hotspot Shield Elite, Avast SecureLine, Avira Phantom VPN Pro, Cisco VPN, ExpressVPN, F-Secure FREEDOME VPN, KeepSolid's VPN Unlimited, London Trust Media's Private Internet Access, NordVPN, Pulse VPN, Symantec's Norton WiFi Privacy and Tunnel Bear. The evaluation was based on usability, privacy and security, performance, and functionality.

Random. Randomness is commonly implemented by using random numbers, defined as a sequence of numbers or symbols that lack any pattern and thus appear random, are often generated by a random number generator. Randomness for security is also described in IETF RFC 1750 *"Randomness Recommendations for Security"* (December 1994), which is incorporated in its entirety for all purposes as if fully set forth herein. A random number generator (having either analog or digital output) can be hardware based, using a physical process such as thermal noise, shot noise, nuclear decaying radiation, photoelectric effect or other quantum phenomena. Alternatively, or in addition, the generation of the random numbers can be software based, using a processor executing an algorithm for generating pseudo-random numbers which approximates the properties of random numbers.

The term 'random' herein is intended to cover not only pure random, non-deterministically and non-predicted generated signals, but also pseudo-random, deterministic signals such as the output of a shift-register arrangement provided with a feedback circuit as used to generate pseudo-random binary signals or as scramblers, and chaotic signals, and where a randomness factor may be used.

A digital random signal generator (known as random number generator) wherein numbers in binary form replaces the analog voltage value output may be used for any randomness. One approach to random number generation is based on using linear feedback shift registers. An example of random number generators is disclosed in U.S. Pat. No. 7,124,157 to Ikake entitled: "Random Number Generator", in U.S. Pat. No. 4,905,176 to Schulz entitled: "Random Number Generator Circuit", in U.S. Pat. No. 4,853,884 to Brown et al. entitled: "Random Number Generator with Digital Feedback" and in U.S. Pat. No. 7,145,933 to Szajnowski entitled: "Method and Apparatus for generating Random signals", which are incorporated in its entirety for all purposes as if fully set forth herein.

A digital random signal generator may be based on 'True Random Number Generation IC RPG100/RPG100B' available from FDK Corporation and described in the data sheet 'Physical Random number generator RPG100.RPG100B' REV. 08 publication number HM-RAE106-0812, which is incorporated in its entirety for all purposes as if fully set forth herein. The digital random signal generator can be hardware based, generating random numbers from a natural physical process or phenomenon, such as the thermal noise of semiconductor which has no periodicity. Typically, such hardware random number generators are based on microscopic phenomena such as thermal noise, shot noise, nuclear decaying radiation, photoelectric effect or other quantum phenomena, and typically contain a transducer to convert some aspect of the physical phenomenon to an electrical signal, an amplifier and other electronic to bring the output into a signal that can be converted into a digital representation by an analog to digital converter. In the case where digitized serial random number signals are generated, the output is converted to parallel, such as 8 bits data, with 256 values of random numbers (values from 0 to 255). Alternatively, a digital random signal generator may be software (or firmware) based, such as pseudo-random number generators. Such generators include a processor for executing software that includes an algorithm for generating numbers, which approximates the properties of random numbers. The random signal generator (either analog or digital) may output a signal having uniform distribution, in which there is a substantially or purely equal probability of a signal falling between two defined limits, having no appearance outside these limits. However, Gaussian and other distribution may be equally used.

Man-In-The-Middle (MITM) Attack. MITM attack is a type of unauthorized access in which a node or other agent redirects, alter, or otherwise intercepts communications between two other nodes within the computing environment. Such MITM attacks can go unnoticed for long periods of time which, in turn, allow the attackers to obtain sensitive and damaging information such as payment credentials and the like. Further, a MUM attack is a form of active wiretapping attack in which the attacker intercepts and selectively modifies communicated data to masquerade as one or more of the entities involved in a communication association. Typically in a man-in-the-middle attack (MITM), the attacker secretly relays and possibly alters the communications between two parties who believe that they are directly communicating with each other. One example of a MITM attack is active eavesdropping, in which the attacker makes independent connections with the victims and relays messages between them to make them believe they are talking directly to each other over a private connection, when in fact the entire conversation is controlled by the attacker. The attacker must be able to intercept all relevant messages passing between the two victims and inject new ones.

Internet censorship. Internet censorship is the control or suppression of what can be accessed, published, or viewed on the Internet enacted by regulators, or on their own initiative. Individuals and organizations may engage in self-censorship for moral, religious, or business reasons, to conform to societal norms, due to intimidation, or out of fear of legal or other consequences. The extent of Internet censorship varies on a country-to-country basis. While most democratic countries have moderate Internet censorship, other countries go as far as to limit the access of information such as news and suppress discussion among citizens. Internet censorship also occurs in response to or in anticipation of events such as elections, protests, and riots. An example is the increased censorship due to the events of the Arab Spring. Other types of censorship include the use of copyrights, defamation, harassment, and obscene material claims as a way to suppress content.

Blocking and filtering can be based on relatively static blacklists or be determined more dynamically based on a real-time examination of the information being exchanged. Blacklists may be produced manually or automatically and are often not available to non-customers of the blocking software. Blocking or filtering can be done at a centralized national level, at a decentralized sub-national level, or at an institutional level, for example in libraries, universities or Internet cafes. Blocking and filtering may also vary within a country across different ISPs. Countries may filter sensitive content on an ongoing basis and/or introduce temporary filtering during key time periods such as elections. In some cases the censoring authorities may surreptitiously block content to mislead the public into believing that censorship has not been applied. This is achieved by returning a fake "Not Found" error message when an attempt is made to access a blocked website.

Internet Protocol (IP) address blocking: Access to a certain IP address is denied. If the target Web site is hosted in a shared hosting server, all websites on the same server will be blocked. This affects IP-based protocols such as HTTP, FTP and POP. A typical circumvention method is to find proxies that have access to the target websites, but proxies may be jammed or blocked, and some Web sites, such as Wikipedia (when editing), also block proxies. Some large websites such as Google have allocated additional IP addresses to circumvent the block, but later the block was extended to cover the new addresses. Due to challenges with geolocation, geo-blocking is normally implemented via IP address blocking.

Domain name system (DNS) filtering and redirection: Blocked domain names are not resolved, or an incorrect IP address is returned via DNS hijacking or other means. This affects all IP-based protocols such as HTTP, FTP and POP. A typical circumvention method is to find an alternative DNS resolver that resolves domain names correctly, but domain name servers are subject to blockage as well, especially IP address blocking. Another workaround is to bypass DNS if the IP address is obtainable from other sources and is not itself blocked. Examples are modifying the Hosts file or typing the IP address instead of the domain name as part of a URL given to a Web browser.

Uniform Resource Locator (URL) filtering: URL strings are scanned for target keywords regardless of the domain name specified in the URL. This affects the HTTP protocol. Typical circumvention methods are to use escaped characters in the URL, or to use encrypted protocols such as VPN and TLS/SSL.

Packet filtering: Terminate TCP packet transmissions when a certain number of controversial keywords are detected. This affects all TCP-based protocols such as HTTP, FTP and POP, but Search engine results pages are more likely to be censored. Typical circumvention methods are to use encrypted connections—such as VPN and TLS/SSL—to escape the HTML content, or by reducing the TCP/IP stack's MTU/MSS to reduce the amount of text contained in a given packet.

Connection reset: If a previous TCP connection is blocked by the filter, future connection attempts from both sides can also be blocked for some variable amount of time. Depending on the location of the block, other users or websites may also be blocked, if the communication is routed through the blocking location. A circumvention method is to ignore the reset packet sent by the firewall.

Network disconnection: A technically simpler method of Internet censorship is to completely cut off all routers, either by software or by hardware (turning off machines, pulling out cables). A circumvention method could be to use a satellite ISP to access Internet.

Portal censorship and search result removal: Major portals, including search engines, may exclude web sites that they would ordinarily include. This renders a site invisible to people who do not know where to find it. When a major portal does this, it has a similar effect as censorship. Sometimes this exclusion is done to satisfy a legal or other requirement, other times it is purely at the discretion of the portal. For example, Google.de and Google.fr remove Neo-Nazi and other listings in compliance with German and French law.

Computer network attacks: Denial-of-service attacks and attacks that deface opposition websites can produce the same result as other blocking techniques, preventing or limiting access to certain websites or other online services, although only for a limited period of time. This technique might be used during the lead up to an election or some other sensitive period. It is more frequently used by non-state actors seeking to disrupt services.

Geoblocking. Geoblocking is a method of preventing users in a particular country from accessing content (because of licensing or other requirements). If the user attempting to access the content provides an IPv6 address, the network may attempt to obtain an IPv4 address from the IPv6 address and associate a geolocation with the user to accurately apply geoblocking, Other examples include using the attribute of the IPv4 address from the IPv6 address to select a default language for a user, assist in locating a user for law enforcement or emergency response purposes, and the like, Geo-blocking or geoblocking is technology that restricts access to Internet content based upon the user's geographical location. In a geo-blocking scheme, the user's location is determined using geolocation techniques, such as checking the user's IP address against a blacklist or whitelist, accounts, and measuring the end-to-end delay of a network connection to estimate the physical location of the user. The result of this check is used to determine whether the system will approve or deny access to the website or to particular content. The geolocation may also be used to modify the content provided, for example, the currency in which goods are quoted, the price or the range of goods that are available, besides other aspects.

Tunneling. Computer networks may use a tunneling protocol where one network protocol (the delivery protocol) encapsulates a different payload protocol. Tunneling enables the encapsulation of a packet from one type of protocol within the datagram of a different protocol. For example, VPN uses PPTP to encapsulate IP packets over a public network, such as the Internet. A VPN solution based on Point-to-Point Tunneling Protocol (PPTP), Layer Two Tunneling Protocol (L2TP), or Secure Socket Tunneling Protocol (SSTP) can be configured. By using tunneling a payload may be carried over an incompatible delivery-network, or provide a secure path through an untrusted network. Typically, the delivery protocol operates at an equal or higher OSI layer than does the payload protocol. In one example of a network layer over a network layer, Generic Routing Encapsulation (GRE), a protocol running over IP (IP Protocol Number 47), often serves to carry IP packets, with RFC 1918 private addresses, over the Internet using delivery packets with public IP addresses. In this case, the delivery and payload protocols are compatible, but the payload addresses are incompatible with those of the delivery network. In contrast, an IP payload might believe it sees a data link layer delivery when it is carried inside the Layer 2 Tunneling Protocol (L2TP), which appears to the payload mechanism as a protocol of the data link layer. L2TP, however, actually runs over the transport layer using User Datagram Protocol (UDP) over IP. The IP in the delivery protocol could run over any data-link protocol from IEEE 802.2 over IEEE 802.3 (i.e., standards-based Ethernet) to the Point-to-Point Protocol (PPP) over a dialup modem link.

Tunneling protocols may use data encryption to transport insecure payload protocols over a public network (such as the Internet), thereby providing VPN functionality. IPsec has an end-to-end Transport Mode, but can also operate in a tunneling mode through a trusted security gateway. HTTP tunneling is a technique by which communications performed using various network protocols are encapsulated using the HTTP protocol, the network protocols in question usually belonging to the TCP/IP family of protocols. The HTTP protocol therefore acts as a wrapper for a channel that the network protocol being tunneled uses to communicate. An HTTP stream with its covert channel is termed an HTTP tunnel. HTTP tunnel software consists of client-server HTTP tunneling applications that integrate with existing application software, permitting them to be used in conditions of restricted network connectivity including firewalled networks, networks behind proxy servers, and network address translation.

Virtual Private Networks (VPNs) are point-to-point connections across a private or public network, such as the Internet. A VPN client typically uses special TCP/IP-based protocols, called tunneling protocols, to make a virtual call to a virtual port on a VPN server. In a typical VPN deployment, a client initiates a virtual point-to-point connection to a remote access server over the Internet, then the remote access server answers the call, authenticates the caller, and transfers data between the VPN client and the organization's private network. To emulate a point-to-point link, data is encapsulated, or wrapped, with a header. The header provides routing information that enables the data to traverse the shared or public network to reach its endpoint. To emulate a private link, the data being sent is encrypted for confidentiality. Packets that are intercepted on the shared or public network are indecipherable without the encryption keys. The link in which the private data is encapsulated and encrypted is known as a VPN connection. Commonly two types of VPN connections are used, referred to as Remote Access VPN and Site-to-Site VPN. Popular VPN connections use PPTP, L2TP/IPsec, or SSTP protocols. The RFC 4026 provides 'Provider Provisioned Virtual Private Network (VPN) Terminology', and RFC 2547 provides a VPN method based on MPLS (Multiprotocol Label Switching) and BGP (Border Gateway Protocol).

Remote access VPN connections enable users working at home or on the road to access a server on a private network using the infrastructure provided by a public network, such as the Internet. From the user's perspective, the VPN is a point-to-point connection between the computer (the VPN client) and an organization's server. The exact infrastructure of the shared or public network is irrelevant because it appears logically as if the data is sent over a dedicated private link.

Site-to-site VPN connections (also known as router-to-router VPN connections) enable organizations to have routed connections between separate offices or with other organizations over a public network while helping to maintain secure communications. A routed VPN connection across the Internet logically operates as a dedicated wide area network (WAN) link. When networks are connected over the Internet, a router forwards packets to another router across a VPN connection. To the routers, the VPN connection operates as a data-link layer link. A site-to-site VPN connection connects two portions of a private network. The VPN server provides a routed connection to the network to which the VPN server is attached. The calling router (the VPN client) authenticates itself to the answering router (the VPN server), and, for mutual authentication, the answering router authenticates itself to the calling router. In the site-to site VPN connection, the packets sent from either router across the VPN connection typically do not originate at the routers.

There is a growing widespread use of the Internet for carrying multimedia, such as a video and audio. Various audio services include Internet-radio stations and VoIP (Voice-over-IP). Video services over the Internet include video conferencing and IPTV (IP Television). In most cases, the multimedia service is a real-time (or near real-time) application, and thus sensitive to delays over the Internet. In particular, two-way services such a VoIP or other telephony services and video-conferencing are delay sensitive. In some cases, the delays induced by the encryption process, as well as the hardware/software costs associated with the encryption, render encryption as non-practical. Therefore, it is not easy to secure enough capacity of the Internet accessible by users to endure real-time communication applications such as Internet games, chatting, VoIP, and MoIP (Multimedia-over-IP), so there may be a data loss, delay or severe jitter in the course of communication due to the property of an Internet protocol, thereby causing inappropriate real-time video communication. The following chapters of the publication number 1-587005-001-3 by Cisco Systems, Inc. (July 1999), entitled: "*Internetworking Technologies Handbook*", relate to multimedia carried over the Internet, and are all incorporated in their entirety for all purposes as if fully set forth herein: Chapter 18: "*Multiservice Access Technologies*" (pages 18-1 to 18-10), and Chapter 19: "*Voice/Data Integration Technologies*" (pages 19-1 to 19-30).

VoIP systems in widespread use today fall into three groups: systems using the ITU-T H.323 protocol, systems using the SIP protocol, and systems that use proprietary protocols. H.323 is a standard for teleconferencing that was developed by the International Telecommunications Union (ITU). It supports full multimedia, audio, video and data transmission between groups of two or more participants, and it is designed to support large networks. H.323 is network-independent: it can be used over networks using transport protocols other than TCP/IP. H.323 is still a very important protocol, but it has fallen out of use for consumer VoIP products due to the fact that it is difficult to make it work through firewalls that are designed to protect computers running many different applications. It is a system best suited to large organizations that possess the technical skills to overcome these problems.

Session Initiation Protocol (SIP) is an Internet Engineering Task Force (IETF) standard signaling protocol for teleconferencing, telephony, presence and event notification and instant messaging. It provides a mechanism for setting up and managing connections, but not for transporting the audio or video data. It is probably now the most widely used protocol for managing Internet telephony. Similar to the IETF protocols, SIP is defined in a number of RFCs, principally RFC 3261. A SIP-based VoIP implementation may send the encoded voice data over the network in a number of ways. Most implementations use a Real-time Transport Protocol (RTP), which is defined in RFC 3550. Both SIP and RTP are implemented on UDP, which, as a connectionless protocol, can cause difficulties with certain types of routers and firewalls. Usable SIP phones therefore also need to use Simple Traversal of UDP over NAT (STUN), a protocol defined in RFC 3489 that allows a client behind a NAT router to find out its external IP address and the type of NAT device.

FIG. 2 shows arrangement 20 of devices communicating over the Internet. Various devices such as a client #1 24*a*, a client #2 24*b*, a client #3 24*c*, a client #4 24*d*, and a client #5 24*e*, may communicate over the Internet 113 for obtaining data from a data server #1 22*a* and a data server #2 22*b*. It is noted that the terms 'Data Server' and 'Web server' are used herein interchangeably. In one example, the servers are HTTP servers, sometimes known as web servers. A method describing a more efficient communication over the Internet is described in U.S. Pat. No. 8,560,604 to Shribman et al., entitled: "System and Method for Providing Faster and More Efficient Data Communication" (hereinafter the "'604 patent"), which is incorporated in its entirety for all purposes as if fully set forth herein. The method described in the '604 patent uses an acceleration server 23 for managing the traffic in the network, as shown in FIG. 2. A splitting of a message or a content into slices, and transferring each of the slices over a distinct data path is described in U.S. Patent Application No. 2012/0166582 to Binder entitled: "System and Method for Routing-Based Internet Security", which is incorporated in its entirety for all purposes as if fully set forth herein.

The amount of data transferred in a given period in commonly referred to as 'bandwidth' (BW) or 'bit-rate', which is the number of bits that are conveyed or processed per unit of time. The bit rate is quantified using the bits per second unit (symbol bit/s or b/s), often in conjunction with an SI prefix such as kilo- (1 Kbit/s=1000 bit/s), mega- (1 Mbit/s=1000 Kbit/s), giga- (1 Gbit/s=1000 Mbit/s) or tera- (1 Tbit/s=1000 Gbit/s). The non-standard abbreviation bps is often used to replace the standard symbol bit/s, so that, for example, "1 Mbps" (or 1 Mb/s) is used to mean one million bits per second. One byte per second (1 B/s) corresponds to 8 bit/s.

Latency is typically defined as a time interval between the stimulation and the response, or, from a more general point of view, as a time delay between the cause and the effect of some physical change in the system being observed. Network-related latency, such as in a packet-switched network, is measured either one-way (the time from the source sending a packet to the destination receiving it), or Round-Trip delay Time (RTT), referring to the one-way latency from source to destination plus the one-way latency from the destination back to the source, plus any delays at the destination, such as processing or other delays. Round-trip latency can be measured from a single point. Latency limits total bandwidth in reliable two-way communication systems as described by the bandwidth-delay product, which refers to the product of a data link's capacity (in bits per second) and its end-to-end delay (in seconds). The result, an amount of data measured in bits (or bytes), is equivalent to the maximum amount of data on the network circuit at any given time, i.e., data that has been transmitted but not yet acknowledged. Sometimes it is calculated as the data link's capacity multiplied by its round trip time. A network with a large bandwidth-delay product is commonly known as a Long Fat Network (LFN). As defined in IETF RFC 1072, a network is considered an LFN if its bandwidth-delay product is significantly larger than 105 bits (12500 bytes).

The Round-trip Delay Time (RTD) or Round-Trip Time (RTT) is the length of time it takes for a signal to be sent and to be received and processed at the destination node, plus the length of time it takes for an acknowledgment of that signal to be received. This time delay therefore includes the propagation times between the two points of a signal. The signal is generally a data packet, and the RTT is also known as the ping time, and an internet user can determine the RTT by using the ping command. Network links with both a high bandwidth and a high RTT can have a very large amount of data (the bandwidth-delay product) "in flight" at any given time. Such "long fat pipes" require a special protocol design. One example is the TCP window scale option. The RTT was originally estimated in TCP by: $RTT=(\alpha\cdot Old\_RTT)+((1-\alpha)\cdot New\_Round\_Trip\_Sample)$, where a is a constant weighting factor ($0\leq\alpha<1$). Choosing a value a close to 1 makes the weighted average immune to changes that last a short time (e.g., a single segment that encounters long delay). Choosing a value for a close to 0 makes the weighted average response to changes in delay very quickly. Once a new RTT is calculated, it is entered into the above equation to obtain an average RTT for that connection, and the procedure continues for every new calculation. The RTT may be measured as described in IETF 1323, and may be estimated by using a method described in IETF RFC 6323, which are both incorporated in their entirety for all purposes as if fully set forth herein.

An estimation of RTT for messages using TCP may use Karn's Algorithm, described by Karn, Phil and Craig Partridge in ACM SIGCOMM '87—Computer Communication Review publication, entitled: "*Improving Round-Trip Time Estimates in Reliable Transport Protocols*", which is incorporated in its entirety for all purposes as if fully set forth herein. The round trip time is estimated as the difference between the time that a segment was sent and the time that its acknowledgment was returned to the sender, but when packets are re-transmitted there is an ambiguity: the acknowledgment may be a response to the first transmission of the segment or to a subsequent re-transmission. Karn's Algorithm ignores re-transmitted segments when updating the round trip time estimate. Round trip time estimation is based only on unambiguous acknowledgments, which are acknowledgments for segments that were sent only once.

Many software platforms provide a service called 'ping' that can be used to measure round-trip latency. Ping performs no packet processing; it merely sends a response back when it receives a packet (i.e., performs a no-op), thus it is a first rough way of measuring latency. Ping operates by sending Internet Control Message Protocol (ICMP) echo requesting packets to the target host, and waiting for an ICMP response. During this process it measures the time from transmission to reception (round-trip time) and records any packet loss. The results of the test are printed in a form of a statistical summary of the response packets received, including the minimum, maximum, and the mean round-trip times, and sometimes the standard deviation of the mean.

The Transmission Control Protocol/Internet Protocol (TCP/IP) suite normally used on the Internet has included an Internet Message Control Protocol (ICMP) that is commonly used in echo testing or ping and trace route applications. In general, the Internet standard 'ping' or 'ICMP echo' has a request/response format, wherein one device sends an ICMP echo request and another device responds to a received ICMP echo request with a transmitted ICMP echo response. Normally, IP devices are expected to implement the ICMP as part of the support for IP, to be able to use ICMP for testing. Internet RFC 792, entitled "*Internet Control Message Protocol: DARPA Internet Program Protocol Specification*", which is incorporated in its entirety for all purposes as if fully set forth herein, at least partially describes the behavior of ICMP. The ICMP echo message has a type field, a code field, a checksum field, an identifier field, a sequence number field, and a data field. According to RFC 79: "The data received in the echo message must be returned in the echo reply message". Thus, an RFC compliant ping responders or an ICMP echo reply message responders are supposed to copy the received data field in an echo request message directly into the data field of the transmitted echo response message.

A newer version of ICMP known as ICMP version 6 or ICMPv6 as described at least partially in RFCs 1885 and 2463, which are both entitled "*Internet Control Message Protocol (ICMPv6) for the Internet Protocol Version 6 (IPv6) Specification*", which are both incorporated in their entirety for all purposes as if fully set forth herein. According to RFC 2463, "Every [IPv6] node MUST implement an ICMPv6 Echo responder function that receives Echo Requests and sends corresponding Echo Replies. An IPv6 node SHOULD also implement an application-layer interface for sending Echo Requests and receiving Echo Replies, for diagnostic purposes.". Thus, responding to ICMP echo requests normally is a necessary function in supporting IPv4 and/or IPv6 standards. The ICMPv6 RFCs 1885 and 2464 goes on to specify that the data field of an ICMP echo response contains the "data from the invoking Echo Request message." Therefore, both ICMP and ICMP v6 associated with IPv4 and IPv6, respectively, specify that the data field in an ICMP echo reply message is to essentially contain a copy of the data received in the corresponding ICMP echo request message.

Moreover, the ICMP echo protocol is basically a two-way echo in which one initiating device and/or process starts the communication by transmitting an echo request message, which may be then received by an echo responder process. The echo responder process, generally located on another device, receives the echo request message and responds with an echo reply back to the initiating process. Once the initiating device and/or process receives the response or times out waiting on the response, the two-way echo exchange of messages is complete. Although the echo request and echo response normally are performed between processes on two different devices, one skilled in the art will be aware that a device can ping its own IP address implying that the echo request and echo responder reply processes are on the same device. In addition, the loopback address of network 127.0.0.0 in IPv4 can be used to allow a device to the loopback outbound echo request messages back into the device own incoming echo request responder processes. IPv6 has a loopback functionality as well.

This copying of data exactly in the ICMP echo response is somewhat wasteful because the responder generally does not convey that much (if any) information back to the ICMP echo request initiating device. Arguably the initiating device could compute bit error rate (BER) statistics on the transmitted versus the received data field in ICMP echo packets. However, such physical layer issues as BER statistics normally are not as relevant for network layer IP datagrams that already include various error control code mechanisms. Arguably the device running the responding process can communicate information to the device running the initiating process by having the device running the original responding process initiate its own echo request and wait for an echo response from the original initiating device. Such a solution results in four packets, with a first echo request from a local device responded to by a first echo response from a remote device, and with a second echo request from the remote device responded to by a second echo response from the local device.

An identifier and/or sequence number in ping packets generally has allowed the ping to be used by a device to determine the round-trip delay from the time an ICMP echo request packet is sent to the time corresponding to when an associated received ICMP echo request is received back at an initiating device. Furthermore, ping packets generally convey little or no information about the type of the device that initiated the ping. Moreover, although IPv4 has Type of Service (ToS) fields in the IP datagram, these fields have become more important as the services used over the Internet and networks using Internet technology have grown from basic computer data communication to also include real-time applications such as voice and/or video. Various Type of Service (ToS) in IPv4 and IPv6 have been used in implementing various (Quality of Service) QoS characteristics that are defined for different classes of service and/or Service Level Agreements (SLAs).

SDK. As used herein, the term Software Development Kit (SDK) refers to a specific software package, software framework, hardware platform, or a set of development tools and the like at the time of establishment of the operating system software. Typically, an SDK includes a programming package that enables a programmer to develop applications for a specific platform, and may include one or more APIs, programming tools, and documentation. It may be as simple as the implementation of one or more application programming interfaces (APIs) in the form of some libraries to interface to a particular programming language or to include sophisticated hardware that can communicate with a particular embedded system. Common tools include debugging facilities and other utilities, often presented in an integrated development environment (IDE). SDKs also frequently include sample code and supporting technical notes or other supporting documentation to help clarify points made by the primary reference material. SDKs may have attached licenses that make them unsuitable for building software intended to be developed under an incompatible license. For example, a proprietary SDK will probably be incompatible with free software development, while a GPL-licensed SDK could be incompatible with proprietary software development. LGPL SDKs are typically safe for proprietary development.

A software engineer typically receives the SDK from the target system developer. Often the SDK can be downloaded directly via the Internet or via SDKs marketplaces. Many SDKs are provided for free to encourage developers to use the system or language. Sometimes this is used as a marketing tool. Freely offered SDKs may still be able to monetize, based on user data taken from the apps, which may serve the interests of big players in the ecosystem, for example the operating system. A SDK for an operating system add-on (for instance, QuickTime for classic Mac OS) may include the add-on software itself to be used for development purposes, albeit not necessarily for redistribution together with the developed product.

Heartbeat. A heartbeat is a periodic signal generated by hardware or software to indicate normal operation or to synchronize other parts of a system. Usually a heartbeat is sent between machines at a regular interval of an order of seconds. If a heartbeat is not received for a time-usually a few heartbeat intervals—the machine that should have sent the heartbeat is assumed to have failed. As used herein, a heartbeat is a periodic message, such as a 'ping', generated by devices connected to the Internet to indicate being 'online' (connected to the Internet) and normal operation, and if a heartbeat is not received for a time, the device is assumed to be 'offline' (not connected to the Internet). A heartbeat protocol is generally used to negotiate and monitor the availability of a resource, such as a floating IP address. Typically, when a heartbeat starts on a machine, it will perform an election process with other machines on the network to determine which machine, if any, owns the resource. The IETF RFC 6520 describes Heartbeat operation for the Transport Layer Security (TLS), and is incorporated in its entirety for all purposes as if fully set forth herein.

Users in the Internet may desire anonymity in order not to be identified as a publisher (sender), or reader (receiver), of information. Common reasons include censorship at the local, organizational, or national level, personal privacy preferences such as preventing tracking or data mining activities, the material or its distribution is considered illegal or incriminating by possible eavesdroppers, the material may be legal but socially deplored, embarrassing, or problematic in the individual's social world, and fear of retribution (against whistleblowers, unofficial leaks, and activists who do not believe in restrictions on information nor knowledge). Full anonymity on the Internet, however, is not guaranteed since IP addresses can be tracked, allowing to identify the computer from which a certain post was made, albeit not the actual user. Anonymizing services, such as I2P—'The Anonymous Network' or Tor, address the issue of IP tracking, as their distributed technology approach may grant a higher degree of security than centralized anonymizing services where a central point exists that could disclose one's identity. An anonymous web browsing refers to browsing the World Wide Web while hiding the user's IP address and any other personally identifiable information from the websites that one is visiting. There are many ways of accomplishing anonymous web browsing. Anonymous web browsing is generally useful to internet users who want to ensure that their sessions cannot be monitored. For instance, it is used to circumvent traffic monitoring by organizations that want to find out or control which web sites employees visit. Further, since some web-sites response differently when approached from mobile devices, anonymity may allow for accessing such a web-site from a non-mobile device, posing as a mobile device.

WiFi. A device herein (such as the computer system 11) may consist of, be part of, or include, a Personal Computer (PC), a desktop computer, a mobile computer, a laptop computer, a notebook computer, a tablet computer, a server computer, a handheld computer, a handheld device, a Personal Digital Assistant (PDA) device, or a cellular handset. Alternatively or in addition, a device may consist of, be part of, or include, a handheld PDA device, an on-board device, an off-board device, a hybrid device, a vehicular device, a non-vehicular device, a mobile device, or a portable device. A network herein (such as the LAN 14), may consist of, be part of, or include, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), or a Wireless PAN (WPAN). Alternatively or in addition, a network herein may be operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards. Further, a network element (or a device) herein may consist of, be part of, or include, a cellular radio-telephone communication system, a cellular telephone, a wireless telephone, a Personal Communication Systems (PCS) device, a PDA device which incorporates a wireless communication device, or a mobile/portable Global Positioning System (GPS) device. The communication interface 29 may consist of, be part of, or include, a transceiver or modem for communication with the network, such as LAN 14. In the case of wired networks, the communication interface 29 connects to the network via a port 28 that may include a connector, and in the case of wireless network, the communication interface 29 connects to the network via the port 28 that may include an antenna.

The LAN 14 may be a Wireless LAN (WLAN) such as according to, or base on, IEEE 802.11-2012, and the WLAN port may be a WLAN antenna and the WLAN transceiver may be a WLAN modem. The WLAN may be according to, or base on, IEEE 802.11a, IEEE 802.11b, IEEE 802.11g, IEEE 802.11n, or IEEE 802.11ac. Commonly referred to as Wireless Local Area Network (WLAN), such communication makes use of the Industrial, Scientific and Medical (ISM) frequency spectrum. In the US, three of the bands within the ISM spectrum are the A-Band, 902-928 MHz; the B-Band, 2.4-2.484 GHz (a.k.a. 2.4 GHz); and the C-Band, 5.725-5.875 GHz (a.k.a. 5 GHz). Overlapping and/or similar bands are used in different regions such as Europe and Japan. In order to allow interoperability between equipment manufactured by different vendors, few WLAN standards have evolved, as part of the IEEE 802.11 standard group, branded as WiFi (www.wi-fi.org). The IEEE 802.11b standard describes a communication using the 2.4 GHz frequency band and supporting a communication rate of 11 Mb/s, IEEE 802.11a uses the 5 GHz frequency band to carry 54 MB/s, and IEEE 802.11g uses the 2.4 GHz band to support 54 Mb/s. The WiFi technology is further described in a publication entitled: "*WiFi Technology*" by Telecom Regulatory Authority, published on July 2003, which is incorporated in its entirety for all purposes as if fully set forth herein. The IEEE 802 defines an ad-hoc connection between two or more devices without using a wireless access point: the devices communicate directly when in range. An ad hoc network offers peer-to-peer layout and is commonly used in situations such as a quick data exchange or a multiplayer LAN game, because the setup is easy and an access point is not required.

Image/video. Any content herein may consist of, be part of, or include, an image or a video content. A video content may be in a digital video format that may be based on one out of: TIFF (Tagged Image File Format), RAW format, AVI, DV, MOV, WMV, MP4, DCF (Design Rule for Camera Format), ITU-T H.261, ITU-T H.263, ITU-T H.264, ITU-T CCIR 601, ASF, Exif (Exchangeable Image File Format), and DPOF (Digital Print Order Format) standards. A intraframe or interframe compression may be used, and the compression may a lossy or a non-lossy (lossless) compression, that may be based on a standard compression algorithm, which may be one or more out of JPEG (Joint Photographic Experts Group) and MPEG (Moving Picture Experts Group), ITU-T H.261, ITU-T H.263, ITU-T H.264 and ITU-T CCIR 601.

DHCP. The Dynamic Host Configuration Protocol (DHCP) is a standardized networking protocol used on Internet Protocol (IP) networks for dynamically distributing network configuration parameters, such as IP addresses for interfaces and services. With DHCP, network elements request IP addresses and networking parameters automatically from a DHCP server, reducing the need for a network administrator or a user to configure these settings manually.

DHCP is typically used by network elements for requesting Internet Protocol parameters, such as an IP address from a network server, and is based on the client-server model. When a network element connects to a network, its DHCP client software in the operating system sends a broadcast query requesting necessary information. Any DHCP server on the network may service the request. The DHCP server manages a pool of IP addresses and information about client configuration parameters such as default gateway, domain name, the name servers, and time servers. On receiving a request, the server may respond with specific information for each client, as previously configured by an administrator, or with a specific address and any other information valid for the entire network, and the time period for which the allocation (lease) is valid. A host typically queries for this information immediately after booting, and periodically thereafter before the expiration of the information. When an assignment is refreshed by the client computer, it initially requests the same parameter values, and may be assigned a new address from the server, based on the assignment policies set by administrators.

Depending on implementation, the DHCP server may have three methods of allocating IP-addresses: (a) Dynamic allocation, where a network administrator reserves a range of IP addresses for DHCP, and each client computer on the LAN is configured to request an IP address from the DHCP server during network initialization. The request-and-grant process uses a lease concept with a controllable time period, allowing the DHCP server to reclaim (and then reallocate) IP addresses that are not renewed. (b) Automatic allocation, where the DHCP server permanently assigns an IP address to a requesting client from the range defined by the administrator. This is similar to dynamic allocation, but the DHCP server keeps a table of past IP address assignments, so that it can preferentially assign to a client the same IP address that the client previously had. (c) Static allocation, where the DHCP server allocates an IP address based on a preconfigured mapping to each client's MAC address.

DHCP used for Internet Protocol version 4 (IPv4) is described in IETF RFC 2131, entitled "*Dynamic Host Configuration Protocol*", and DHCP for IPv6 is described IETF RFC 3315, entitled: "*Dynamic Host Configuration Protocol for IPv*6 (*DHCPv*6)", both incorporated in their entirety for all purposes as if fully set forth herein. While both versions serve the same purpose, the details of the protocol for IPv4 and IPv6 are sufficiently different that they may be considered separate protocols. For IPv6 operation, devices may alternatively use stateless address auto-configuration. IPv4 hosts may also use link-local addressing to achieve operation restricted to the local network link.

The DHCP protocol employs a connectionless service model, using the User Datagram Protocol (UDP). It is implemented with two UDP port numbers for its operations, which are the same as for the BOOTP protocol. The UDP port number 67 is the destination port of a server, and the UDP port number 68 is used by the client. DHCP operations fall into four phases: Server discovery, IP lease offer, IP request, and IP lease acknowledgment. These stages are often abbreviated as DORA for discovery, offer, request, and acknowledgment. The DHCP protocol operation begins with clients broadcasting a request. If the client and server are on different subnets, a DHCP Helper or DHCP Relay Agent may be used. Clients requesting renewal of an existing lease may communicate directly via an UDP unicast, since the client already has an established IP address at that point.

Gateway. The term 'gateway' is used herein to include, but not limited to, a network element (or node) that is equipped for interfacing between networks that uses different protocols. A gateway typically contains components such as protocol translators, impedance matching devices, rate converters, fault isolators, or signal translators, as necessary to provide networking interoperability. A gateway may be a router or a proxy server that routes between networks, and may operate at any network layer. In a network for an enterprise, a computer server acting as a gateway node is often also acting as a proxy server and a firewall server. A gateway is often associated with both a router, which knows where to direct a given packet of data that arrives at the gateway, and a switch, which furnishes the actual path in and out of the gateway for a given packet.

A subnet mask is a mask used to determine what subnet belongs to an IP address. An IP address has two components, the network address and the host address. For example, consider the IP address 150.215.017.009. Assuming this is part of a Class B network, the first two numbers (150.215) represent the Class B network address, and the second two numbers (017.009) identify a particular host on this network. A subnetting enables the network administrator to further divide the host part of the address into two or more subnets. In this case, a part of the host address is reserved to identify the particular subnet. On an IP network, clients should automatically send IP packets with a destination outside a given subnet mask to a network gateway. A subnet mask defines the IP range of a private network. For example, if a private network has a base IP address of 192.168.0.0 and has a subnet mask of 255.255.255.0, then any data going to an IP address outside of 192.168.0.X will be sent to that network gateway. While forwarding an IP packet to another network, the gateway might or might not perform Network Address Translation (NAT).

Domain Name System (DNS) is a hierarchical distributed naming system for computers, services, or any resource connected to the Internet or a private network. It associates various information with domain names assigned to each of the participating entities, and translates easily memorized domain names to the numerical IP addresses needed for the purpose of locating computer services and devices worldwide. The DNS is described, for example, in the IETF RFC 3467 entitled: "*Role of the Domain Name System* (*DNS*)", in the IETF RFC 6195 entitled: "*Domain Name System* (*DNS*) *IANA Considerations*", and in the IETF RFC 1591 entitled: "*Domain Name System Structure and Delegation*", which are incorporated in their entirety for all purposes as if fully set forth herein.

VPN. Computer networks may use a tunneling protocol where one network protocol (the delivery protocol) encapsulates a different payload protocol. Tunneling enables the encapsulation of a packet from one type of protocol within the datagram of a different protocol. For example, VPN uses PPTP to encapsulate IP packets over a public network, such as the Internet. A VPN solution based on Point-to-Point Tunneling Protocol (PPTP), Layer Two Tunneling Protocol (L2TP), or Secure Socket Tunneling Protocol (SSTP) can be configured. By using tunneling a payload may be carried over an incompatible delivery-network, or provide a secure path through an untrusted network.

Typically, the delivery protocol operates at an equal or higher OSI layer than does the payload protocol. In one example of a network layer over a network layer, Generic Routing Encapsulation (GRE), a protocol running over IP (IP Protocol Number 47), often serves to carry IP packets, with RFC 1918 private addresses, over the Internet using delivery packets with public IP addresses. In this case, the delivery and payload protocols are compatible, but the payload addresses are incompatible with those of the delivery network. In contrast, an IP payload might believe it sees a data link layer delivery when it is carried inside the Layer 2 Tunneling Protocol (L2TP), which appears to the payload mechanism as a protocol of the data link layer. L2TP, however, actually runs over the transport layer using User Datagram Protocol (UDP) over IP. The IP in the delivery protocol could run over any data-link protocol from IEEE 802.2 over IEEE 802.3 (i.e., standards-based Ethernet) to the Point-to-Point Protocol (PPP) over a dialup modem link.

Tunneling protocols may use data encryption to transport insecure payload protocols over a public network (such as the Internet), thereby providing VPN functionality. IPsec has an end-to-end Transport Mode, but can also operate in a tunneling mode through a trusted security gateway. HTTP tunneling is a technique by which communications performed using various network protocols are encapsulated using the HTTP protocol, the network protocols in question usually belonging to the TCP/IP family of protocols. The HTTP protocol therefore acts as a wrapper for a channel that the network protocol being tunneled uses to communicate. The HTTP stream with its covert channel is termed an HTTP tunnel. HTTP tunnel software consists of client-server HTTP tunneling applications that integrate with existing application software, permitting them to be used in conditions of restricted network connectivity including firewalled networks, networks behind proxy servers, and network address translation.

Virtual Private Networks (VPNs) are point-to-point connections across a private or public network, such as the Internet. A VPN client typically uses special TCP/IP-based protocols, called tunneling protocols, to make a virtual call to a virtual port on a VPN server. In a typical VPN deployment, a client initiates a virtual point-to-point connection to a remote access server over the Internet, and then the remote access server answers the call, authenticates the caller, and transfers data between the VPN client and the organization's private network. To emulate a point-to-point link, data is encapsulated, or wrapped, with a header. The header provides routing information that enables the data to traverse the shared or public network to reach its endpoint. To emulate a private link, the data being sent is encrypted for confidentiality. Packets that are intercepted on the shared or public network are indecipherable without the encryption keys. The link in which the private data is encapsulated and encrypted is known as a VPN connection.

Commonly there are two types of VPN connections, referred to as Remote Access VPN and Site-to-Site VPN. Popular VPN connections use PPTP, L2TP/IPsec, or SSTP protocols. PPTP is described in IETF RFC 2637 entitled: "*Point-to-Point Tunneling Protocol* (*PPTP*)", L2TP is described in IETF RFC 2661 entitled: "*Layer Two Tunneling Protocol "L2TP"*", which are both incorporated in their entirety for all purposes as if fully set forth herein. VPN and VPN uses are described in Cisco Systems, Inc. 2001 publication entitled: "*IP Tunneling and VPNs*", and in Cisco Systems, Inc. 2001 handbook 'Internetworking Technologies Handbook' [No. 1-58705-001-3] chapter 18 entitled: "*Virtual Private Networks*", and in IBM Corporation Redbook series publications entitled: "*A Comprehensive Guide to Virtual Private Networks*" including "*Vol. I: IBM Firewall, Server and Client Solutions*" [SG24-5201-00, June 1998], "*Vol II: IBM Nways Router Solutions*" [SG24-5234-01, November 1999], and "*Vol III: Cross-Platform Key and Policy Management*" [SG24-5309-00, November 1999], which are all incorporated in their entirety for all purposes as if fully set forth herein.

VPN and its uses are further described in the IETF RFC 4026 entitled: "*Provider Provisioned Virtual Private Network* (*VPN*) *Terminology*" that describes provider provisioned Virtual Private Network (VPN), in the IETF RFC 2764 entitled: "*A Framework for IP Based Virtual Private Networks*" that describes a framework for Virtual Private Networks (VPNs) running across IP backbones, in the IETF RFC 3931 entitled: "*Layer Two Tunneling Protocol—Version* 3 (*L2TPv*3)", and in the IETF RFC 2547 entitled: "*BGP/MPLS VPNs*" that provides a VPN method based on MPLS (Multiprotocol Label Switching) and BGP (Border Gateway Protocol), which are all incorporated in their entirety for all purposes as if fully set forth herein.

Remote access VPN connections enable users working at home or on the road to access a server on a private network using the infrastructure provided by a public network, such as the Internet. From the user's perspective, the VPN is a point-to-point connection between the computer (the VPN client) and an organization's server. The exact infrastructure of the shared or public network is irrelevant because it appears logically as if the data is sent over a dedicated private link.

Site-to-site VPN connections (also known as router-to-router VPN connections) enable organizations to have routed connections between separate offices, or with other organizations over a public network while helping to maintain secure communications. A routed VPN connection across the Internet logically operates as a dedicated wide area network (WAN) link. When networks are connected over the Internet, a router forwards packets to another router across a VPN connection. To the routers, the VPN connection operates as a data-link layer link. A site-to-site VPN connection connects two portions of a private network. The VPN server provides a routed connection to the network to which the VPN server is attached. The calling router (the VPN client) authenticates itself to the answering router (the VPN server), and for mutual authentication, the answering router authenticates itself to the calling router. In the site-to site VPN connection, the packets sent from either router across the VPN connection typically do not originate at the routers.

Negotiating encryption keys may involve performing Internet Key Exchange (IKE or IKEv2) as part of establishing a session under the Security Protocol for the Internet (IPSec), as described in IETF RFC 2409 entitled: "*The Internet Key Exchange* (*IKE*)", and in RFC 4306 entitled: "*Internet Key Exchange* (*IKEv*2) *Protocol*", which are both incorporated in their entirety for all purposes as if fully set forth herein. Alternatively or in addition, negotiating encryption keys may involve performing RSA Key Exchange or Diffie-Helman Key Exchange described in IETF RFC 2631 entitled: "*Diffie-Hellman Key Agreement Method*", which is incorporated in its entirety for all purposes as if fully set forth herein, as part of establishing a session under the Secure Socket Layer (SSL) or Transport Layer Security (TLS) protocol.

Tunnel. As used herein, the term 'tunnel' includes an intermediary program which is acting as a blind relay between two connections. Once active, a tunnel is not considered a party to the HTTP communication, though the tunnel may have been initiated by an HTTP request. The tunnel ceases to exist when both ends of the relayed connections are closed.

Proxy. As used herein, the term 'proxy' includes an intermediary program which acts as both a server and a client for the purpose of making requests on behalf of other clients. Requests are serviced internally or by passing them on, with possible translation, to other servers. A proxy MUST implement both the client and server requirements of this specification. A "transparent proxy" is a proxy that does not modify the request or response beyond what is required for proxy authentication and identification. A "non-transparent proxy" is a proxy that modifies the request or response in order to provide some added service to the user agent, such as group annotation services, media type transformation, protocol reduction, or anonymity filtering. Except where either transparent or non-transparent behavior is explicitly stated, an HTTP proxy requirements apply to both types of proxies, and is described in IETF RFC 2616, entitled: "*Hypertext Transfer Protocol—HTTP*/1.1".

HTTP tunneling. HTTP tunneling is a technique by which communications performed using various network protocols are encapsulated using the HTTP protocol, the network protocols in question usually belonging to the TCP/IP family of protocols. The HTTP protocol therefore acts as a wrapper for a channel that the network protocol being tunneled uses to communicate. The HTTP stream with its covert channel is termed an HTTP tunnel, and an HTTP tunnel software consists of client-server HTTP tunneling applications that integrate with existing application software, permitting them to be used in conditions of restricted network connectivity including firewalled networks, networks behind proxy servers, and network address translation.

An HTTP tunnel is used most often as a means for communication from network locations with restricted connectivity—most often behind NATs, firewalls, or proxy servers, and most often with applications that lack native support for communication in such conditions of restricted connectivity. Restricted connectivity in the form of blocked TCP/IP ports, blocking traffic initiated from outside the network, or blocking of all network protocols except a few is a commonly used method to lock down a network to secure it against internal and external threats.

HTTP CONNECT tunneling. A variation of HTTP tunneling when behind an HTTP proxy server is to use the "CONNECT" HTTP method. In this mechanism, the client asks an HTTP proxy server to forward the TCP connection to the desired destination. The server then proceeds to make the connection on behalf of the client. Once the connection has been established by the server, the proxy server continues to proxy the TCP stream to and from the client. Note that only the initial connection request is HTTP—after that, the server simply proxies the established TCP connection. This mechanism is how a client behind an HTTP proxy can access websites using SSL or TLS (i.e. HTTPS). Not all HTTP proxy servers support this feature, and even those that do may limit the behavior (for example only allowing connections to the default HTTPS port 443, or blocking traffic which doesn't appear to be SSL).

HTTP tunneling without using CONNECT. In some networks, the use of CONNECT method is restricted to some trusted sites. In such cases, an HTTP tunnel can still be implemented using only the usual HTTP methods as POST, GET, PUT and DELETE. This is similar to the approach used in Bidirectional-streams Over Synchronous HTTP (BOSH). In this proof-of-concept program, the server runs outside the protected network and acts as a special HTTP server. The client program is run on a computer inside the protected network. Whenever any network traffic is passed from the client, the client repackages the traffic data as an HTTP request and relays the data to the outside server, which extracts and executes the original network request for the client. The response to the request, sent to the server, is then repackaged as an HTTP response and relayed back to the client. Since all traffic is encapsulated inside normal GET and POST requests and responses, this approach works through most proxies and firewalls.

SOCKS. Socket Secure (SOCKS) is an Internet protocol that performs at Layer 5 of the OSI model (the session layer, an intermediate layer between the presentation layer and the transport layer) that exchanges network packets between a client and server through a proxy server. SOCKS5 additionally provides authentication so only authorized users may access a server. Practically, a SOCKS server proxies TCP connections to an arbitrary IP address, and provides a means for UDP packets to be forwarded. SOCKS server accepts incoming client connection on TCP port 1080. SOCKS is a de facto standard for circuit-level gateways, and is also used as a circumvention tool, allowing traffic to bypass Internet filtering to access content otherwise blocked, e.g., by governments, workplaces, schools, and country-specific web services. Client software must have native SOCKS support in order to connect through SOCKS.

Further, the SOCKS protocol provides a framework for client-server applications in both the TCP and UDP domains to conveniently and securely use the services of a network firewall. The protocol is conceptually a "shim-layer" between the application layer and the transport layer, and as such does not provide network-layer gateway services, such as forwarding of ICMP messages. SOCKS protocol typically relays TCP sessions at a firewall host to allow application users transparent access across the firewall. Because the protocol is independent of application protocols, it can be (and has been) used for many different services, such as telnet, ftp, finger, whois, gopher, WWW, etc. Access control can be applied at the beginning of each TCP session; thereafter the server simply relays the data between the client and the application server, incurring minimum processing overhead. Since SOCKS never has to know anything about the application protocol, it should also be easy for it to accommodate applications which use encryption to protect their traffic from nosey snoopers.

SOCKS operates at a lower level than HTTP proxying: SOCKS uses a handshake protocol to inform the proxy software about the connection that the client is trying to make, and then acts as transparently as possible, whereas a regular proxy may interpret and rewrite headers (say, to employ another underlying protocol, such as FTP; however, an HTTP proxy simply forwards an HTTP request to the desired HTTP server). Though HTTP proxying has a different usage model in mind, the CONNECT method allows for forwarding TCP connections; however, SOCKS proxies can also forward UDP traffic and work in reverse, while HTTP proxies cannot. HTTP proxies are traditionally more aware of the HTTP protocol, performing higher-level filtering (though that usually only applies to GET and POST methods, not the CONNECT method). SOCKS4a extends the SOCKS4 protocol to allow a client to specify a destination domain name rather than an IP address; this is useful when the client itself cannot resolve the destination host's domain name to an IP address.

The SOCKS5 protocol is defined in RFC 1928 dated March 1996 and entitled: "*SOCKS Protocol Version* 5", which is incorporated in its entirety for all purposes as if fully set forth herein. It is an extension of the SOCKS4 protocol; it offers more choices for authentication and adds support for IPv6 and UDP, the latter of which can be used for DNS lookups. The protocol specification for SOCKS Version 5 RFC 1929 dated March 1996 and entitled: "*Username/Password Authentication for SOCKS V*5", which is incorporated in its entirety for all purposes as if fully set forth herein, specifies a generalized framework for the use of arbitrary authentication protocols in the initial socks connection setup, and describes one of those protocols, as it fits into the SOCKS Version 5. RFC 1961 dated June 1996 entitled: "*GSS-API Authentication Method for SOCKS Version* 5", which is incorporated in its entirety for all purposes as if fully set forth herein, provides the specification for the SOCKS V5 GSS-API authentication protocol, and defines a GSS-API-based encapsulation for provision of integrity, authentication and optional confidentiality. RFC 3089 dated April 2001 entitled: "*A SOCKS-based IPv6/IPv*4 *Gateway Mechanism*", which is incorporated in its entirety for all purposes as if fully set forth herein, describes a SOCKS-based IPv6/IPv4 gateway mechanism that enables smooth heterogeneous communications between the IPv6 nodes and IPv4 nodes.

WebSocket. WebSocket is a computer communications protocol, providing full-duplex communication channels over a single TCP connection. The WebSocket Protocol enables two-way communication between a client running untrusted code in a controlled environment to a remote host that has opted-in to communications from that code. The security model used for this is the origin-based security model commonly used by web browsers. The protocol consists of an opening handshake followed by basic message framing, layered over TCP. The goal of this technology is to provide a mechanism for browser-based applications that need two-way communication with servers that does not rely on opening multiple HTTP connections (e.g., using XMLHttpRequest or <iframe>s and long polling). The WebSocket protocol is defined in RFC 6455 dated December 2011 and entitled: "The WebSocket Protocol", which is incorporated in its entirety for all purposes as if fully set forth herein.

While both WebSocket and HTTP protocols are located at layer 7 in the OSI model and, as such, depend on TCP at layer 4, and while WebSocket is designed to work over HTTP ports 80 and 443 as well as to support HTTP proxies and intermediaries, the protocols are different. Unlike HTTP, WebSocket provides full-duplex communication, and in addition, WebSocket enables streams of messages on top of TCP. TCP alone deals with streams of bytes with no inherent concept of a message. To achieve compatibility, the WebSocket handshake uses the HTTP Upgrade header to change from the HTTP protocol to the WebSocket protocol. The WebSocket protocol enables interaction between a web client (e.g. a browser) and a web server with lower overheads, facilitating real-time data transfer from and to the server. This is made possible by providing a standardized way for the server to send content to the client without being first requested by the client, and allowing for messages to be passed back and forth while keeping the connection open. In this way, a two-way (bi-directional) ongoing conversation can take place between the client and the server. The communications are done over TCP port number 80 (or 443 in the case of TLS-encrypted connections), which is of benefit for those environments which block non-web Internet connections using a firewall.

The WebSocket protocol specification defines ws (WebSocket) and wss (WebSocket Secure) as two new Uniform Resource Identifier (URI) schemes that are used for unencrypted and encrypted connections, respectively. Apart from the scheme name and fragment (# is not supported), the rest of the URI components are defined to use URI generic syntax. Using browser developer tools, developers can inspect the WebSocket handshake as well as the WebSocket frames. WebSocket protocol client implementations try to detect if the user agent is configured to use a proxy when connecting to destination host and port and, if it is, uses HTTP CONNECT method to set up a persistent tunnel.

While the WebSocket protocol itself is unaware of proxy servers and firewalls, it features an HTTP-compatible handshake thus allowing HTTP servers to share their default HTTP and HTTPS ports (80 and 443) with a WebSocket gateway or server. The WebSocket protocol defines a ws:// and wss:// prefix to indicate a WebSocket and a WebSocket Secure connection, respectively. Both schemes use an HTTP upgrade mechanism to upgrade to the WebSocket protocol. Some proxy servers are transparent and work fine with WebSocket; others will prevent WebSocket from working correctly, causing the connection to fail. In some cases, additional proxy server configuration may be required, and certain proxy servers may need to be upgraded to support WebSocket. If unencrypted WebSocket traffic flows through an explicit or a transparent proxy server without WebSockets support, the connection will likely fail.

Further, if an encrypted WebSocket connection is used, then the use of Transport Layer Security (TLS) in the WebSocket Secure connection ensures that an HTTP CONNECT command is issued when the browser is configured to use an explicit proxy server. This sets up a tunnel, which provides low-level end-to-end TCP communication through the HTTP proxy, between the WebSocket Secure client and the WebSocket server. In the case of transparent proxy servers, the browser is unaware of the proxy server, so no HTTP CONNECT is sent. However, since the wire traffic is encrypted, intermediate transparent proxy servers may simply allow the encrypted traffic through, so there is a much better chance that the WebSocket connection will succeed if WebSocket Secure is used.

Firewall. As used herein, the term 'firewall' is a device that inspects network traffic passing through it, and may perform actions, such as denying or permitting passage of the traffic based on a set of rules. Firewalls may be implemented as stand-alone network devices or, in some cases, integrated in a single network device, such as a router or switch that performs other functions. For instance, a network switch may perform firewall related functions as well as switching functions. A firewall may be implemented using a hardware and/or software-based, and may include all necessary subsystems that may control incoming and outgoing network traffic based on an applied rule set. A firewall may be used to establish a barrier between a trusted, secure internal network and another network, such as the Internet, that may not be secure and trusted. Firewalls exist both as software to run on general purpose hardware and as a hardware appliance. Many hardware-based firewall environments also offer other functionalities to the internal network that the firewall environments protect.

NAT Traversal. Network Address Translator (NAT) traversal is a networking technique of establishing and maintaining Internet protocol connections across gateways that implement network address translation (NAT). NAT traversal techniques are required for many network applications, such as peer-to-peer file sharing and Voice over IP. NAT devices are commonly used to alleviate IPv4 address exhaustion by allowing the use of private IP addresses on private networks behind routers with a single public IP address facing the public Internet. The internal network devices communicate with hosts on the external network by changing the source address of outgoing requests to that of the NAT device and relaying replies back to the originating device. NAT traversal techniques usually bypass enterprise security policies. Enterprise security experts prefer techniques that explicitly cooperate with NAT and firewalls, allowing NAT traversal while still enabling marshalling at the NAT to enforce enterprise security policies. IETF standards based on this security model are Realm-Specific IP (RSIP) and middlebox communications (MIDCOM).

Various NAT traversal techniques are available, such as WebSocket (ws) or WebSocket Secure (wss), Socket Secure (SOCKS) that uses proxy servers to relay traffic between networks or systems, Traversal Using Relays around NAT (TURN) that is a relay protocol designed specifically for NAT traversal, NAT hole punching is a general technique that exploits how NATs handle some protocols (for example, UDP, TCP, or ICMP) to allow previously blocked packets through the NAT, Session Traversal Utilities for NAT (STUN) is a standardized set of methods and a network protocol for NAT hole punching. It was designed for UDP but was also extended to TCP, Interactive Connectivity Establishment (ICE) is a complete protocol for using STUN and/or TURN to do NAT traversal while picking the best network route available, UPnP Internet Gateway Device Protocol (IGDP) is supported by many small NAT gateways in home or small office settings. It allows a device on a network to ask the router to open a port, NAT-PMP is a protocol introduced by Apple as an alternative to IGDP, PCP is a successor of NAT-PMP, and Application-Level Gateway (ALG) is a component of a firewall or NAT that allows for configuring NAT traversal filters.

IPsec virtual private network clients use NAT traversal in order to have Encapsulating Security Payload packets traverse NAT. IPsec uses several protocols in its operation which must be enabled to traverse firewalls and network address translators: Internet Key Exchange (IKE)—User Datagram Protocol (UDP) port 500, Encapsulating Security Payload (ESP)—IP protocol number 50, Authentication Header (AH)—IP protocol number 51, and IPsec NAT traversal—UDP port 4500, when NAT traversal is in use. Many routers provide explicit features, often called 'IPsec Passthrough'. NAT traversal and IPsec may be used to enable opportunistic encryption of traffic between systems. NAT traversal allows systems behind NATs to request and establish secure connections on demand.

NAT Traversal techniques, method, utilities and uses are described in the IETF RFC 2663 (dated August 1999) entitled: "*IP Network Address Translator* (*NAT*) *Terminology and Considerations*", in the IETF RFC 3715 (dated March 2004) entitled: "*IPsec-Network Address Translation* (*NAT*) *Compatibility Requirements*", in the IETF RFC 3947 (dated January 2005) entitled: "*Negotiation of NAT-Traversal in the IKE*", in the IETF RFC 5128 (dated March 2008) entitled: "*State of Peer-to-Peer* (*P2P*) *Communication across Network Address Translators* (*NATs*)", in the IETF RFC 5245 (dated April 2010) entitled: "*Interactive Connectivity Establishment* (*ICE*): *A Protocol for Network Address Translator* (*NAT*) *Traversal for Offer/Answer Protocols*", in the IETF RFC 5389 (dated October 2008) entitled: "*Session Traversal Utilities for NAT* (*STUN*)", and in the IETF RFC 7350 (dated August 2014) entitled: "*Datagram Transport Layer Security* (*DTLS*) *as Transport for Session Traversal Utilities for NAT* (*STUN*)", which are all incorporated in their entirety for all purposes as if fully set forth herein. One of the simplest but most robust and practical NAT traversal techniques, commonly known as "hole punching", is described in a paper by Bryan Ford (of Massachusetts Institute of Technology), Pyda Srisuresh (of Caymas Systems, Inc.) and Dan Kegel published 2008 and entitled: "*Peer-to-Peer Communication Across Network Address Translators*", which is incorporated in its entirety for all purposes as if fully set forth herein. The paper documents and analyzes Hole punching for UDP communication, and how it can be reliably used to set up peer-to-peer TCP streams as well. NAT traversal techniques in P2P networks are described in a paper dated January 2008 by Huynh Cong Phuoc, Ray Hunt, and Andrew McKenzie (all of University of Canterbury, Chistchurch, New Zealand) entitled: "*NAT Traversal Techniques in Peer-to-Peer Networks*", which is incorporated in its entirety for all purposes as if fully set forth herein. Initially Network Address Translation (NAT) detection is categorized and both UDP and TCP traversal techniques are discussed. Methodologies such as Relaying, Connection Reversal, and Hole Punching are then analyzed. Finally the development of a testbed is described which can be used to evaluate NAT traversal techniques and to determine appropriate configurations in order to achieve P2P networking.

Sharding. Database systems with large data sets and high throughput applications can challenge the capacity of a single server. High query rates can exhaust the CPU capacity of the server, and larger data sets exceed the storage capacity of a single machine. Further, working set sizes larger than the system's RAM stress the I/O capacity of disk drives. To address these issues of scales, database systems have two basic approaches: vertical scaling and sharding. Vertical scaling adds more CPU and storage resources to increase capacity. Scaling by adding capacity has limitations: high performance systems with large numbers of CPUs and large amount of RAM are disproportionately more expensive than smaller systems. Additionally, cloud-based providers may only allow users to provision smaller instances. As a result there is a practical maximum capability for vertical scaling. Sharding, or horizontal scaling, by contrast, divides the data set and distributes the data over multiple servers, or shards. Each shard is an independent database, and collectively, the shards make up a single logical database.

A database shard is a horizontal partition of data in a database or search engine, where each individual partition is referred to as a shard or database shard. Each shard is held on a separate database server instance, to spread load. Some data within a database remains present in all shards, but some appears only in a single shard. Each shard (or server) acts as the single source for this subset of data. Horizontal partitioning is a database design principle whereby rows of a database table are held separately, rather than being split into columns (which is what normalization and vertical partitioning do, to differing extents). Each partition forms part of a shard, which may in turn be located on a separate database server or physical location.

Since the tables are divided and distributed into multiple servers, the total number of rows in each table in each database is reduced. This reduces index size, which generally improves search performance. A database shard can be placed on separate hardware, and multiple shards can be placed on multiple machines. This enables a distribution of the database over a large number of machines, greatly improving performance. In addition, if the database shard is based on some real-world segmentation of the data (e.g., European customers v. American customers) then it may be possible to infer the appropriate shard membership easily and automatically, and query only the relevant shard.

Horizontal partitioning splits one or more tables by row, usually within a single instance of a schema and a database server. It may offer an advantage by reducing index size (and thus search effort) provided that there is some obvious, robust, implicit way to identify in which partition a particular row will be found, without first needing to search the index. Splitting shards across multiple isolated instances requires more than simple horizontal partitioning. The hoped-for gains in efficiency would be lost, if querying the database required both instances to be queried, just to retrieve a simple dimension table. Beyond partitioning, sharding thus splits large partitionable tables across the servers, while smaller tables are replicated as complete units.

Database sharding is described in a white paper published April 2017 by Oracle Corporation (having a World Headquarters at 500 Oracle Parkway, Redwood Shores, California 94065, USA) entitled: "*Oracle Sharding: Linear Scalability, Fault Isolation and Geo-distribution for Web-scale OLTP Applications*", and in an MongoDB Documentation Project paper dated Jan. 12, 2015 (Release 2.8.0-rc3) entitled: "*Sharding and MongoDB*", which are both incorporated in their entirety for all purposes as if fully set forth herein.

Multihoming. Multihoming refers to the practice of connecting a host or a computer network to more than one network, in order to increase reliability or performance, or to reduce cost. While a typical host or end-user network is connected to just one network, in many circumstances it can be useful to connect a host or network to multiple networks, in order to increase reliability (if a single link fails, packets can still be routed through the remaining networks), to improve performance (depending on the destination, it may be more efficient to route through one network or the other) and to decrease cost (depending on the destination, it may be cheaper to route through one network or the other).

There are several different ways to perform multihoming. In host multihoming, a single host may be connected to multiple networks. For example, a mobile phone might be simultaneously connected to a WiFi network and a 3G network, and a desktop computer might be connected to both a home network and a VPN. A multihomed host usually is assigned multiple addresses, one per connected network. In classical multihoming a network is connected to multiple providers, and uses its own range of addresses (typically from a Provider Independent (PI) range). The network's edge routers communicate with the providers using a dynamic routing protocol, typically BGP, which announces the network's address range to all providers. If one of the links fail, the dynamic routing protocol recognizes the failure within seconds or minutes, and reconfigures its routing tables to use the remaining links, transparently to the hosts. Classical multihoming is costly, since it requires the use of address space that is accepted by all providers, a public Autonomous System (AS) number, and a dynamic routing protocol. Since multihomed address space cannot be aggregated, it causes growth of the global routing table. In multihoming with multiple addresses approach, the network is connected to multiple providers, and assigned multiple address ranges, one for each provider. Hosts are assigned multiple addresses, one for each provider. Multihoming with multiple addresses is cheaper than classical multihoming, and can be used without any cooperation from the providers (e.g., in a home network) but requires additional technology in order to perform routing: for incoming traffic, hosts must be associated with multiple A or AAAA DNS records so that they are reachable through all providers; and for outgoing traffic, a technique such as source-specific routing must be used to route packets through the correct provider, and reasonable source address selection policies must be implemented by hosts. Classical multihoming is the dominant technique for IPv4, and requires that a network have its own public IP address range and a public Autonomous System (AS) number. It is also possible to implement multihoming for IPv4 using multiple NAT gateways.

Both classical multihoming and multihoming with multiple addresses may be used in IPv6. When using classical multihoming, the Provider Independent Address Space (PI) that is available in IPv6 may be used. This technique has the advantage of working like IPv4, supporting traffic balancing across multiple providers, and maintaining existing TCP and UDP sessions through cut-overs. Multihoming with multiple addresses may be implemented for IPv6, where for outgoing traffic, the host uses either protocol agnostic (Multipath TCP, SCTP, etc.) or IPv6 specific (e.g. SHIM6). The functional requirements and possible solutions for multihoming without the use of NAT in IPv6 for hosts and small IPv6 networks are described in the IETF RFC 7157 (dated March 2014) entitled: "*IPv6 Multihoming without Network Address Translation*", which is incorporated in its entirety for all purposes as if fully set forth herein.

DNS. Domain Name System (DNS) is a hierarchical distributed naming system for computers, services, or any resource connected to the Internet or a private network. It associates various information with domain names assigned to each of the participating entities, and translates easily memorized domain names to the numerical IP addresses needed for the purpose of locating computer services and devices worldwide. The DNS is described, for example, in the IETF RFC 3467 entitled: "*Role of the Domain Name System (DNS)*", in the IETF RFC 6195 entitled: "*Domain Name System (DNS) IANA Considerations*", and in the IETF RFC 1591 entitled: "*Domain Name System Structure and Delegation*", which are incorporated in their entirety for all purposes as if fully set forth herein.

A system for resolving Domain Name System (DNS) queries that contains a communication device for resolving DNS queries, wherein the communication device further contains a memory and a processor that is configured by the memory, a cache storage for use by the communication device, and a network of authoritative domain name servers, where in a process of the communication device looking up a DNS request within the cache storage, if the communication device views an expired DNS entry within the cache storage, the communication device continues the process of looking up the DNS request in the cache storage while, in parallel, sending out a concurrent DNS request to an authoritative domain name server that the expired DNS entry belongs to, is described in U.S. Pat. No. 8,671,221 to the same inventors as this application, entitled: "Method and System for Increasing Speed of Domain Name System Resolution within a Computing Device", which is incorporated in its entirety for all purposes as if fully set forth herein.

Systems and methods of storing previously transmitted data and using it to reduce bandwidth usage and accelerate future communications, and using algorithms to identify long compression history matches. A network device that may improve compression efficiency and speed is described in U.S. Pat. No. 7,865,585 to Samuels et al., entitled: "Systems and Methods for Providing Dynamic Ad Hok Proxy-Cache Hierarchies", which is incorporated in its entirety for all purposes as if fully set forth herein. Further, a method and system for accelerating the receipt of data in a client-to-client network described in U.S. Pat. No. 7,203,741 to Marco et al., entitled: "Method and System for Accelerating Receipt of Data in a Client-to-Client Network", which is incorporated in its entirety for all purposes as if fully set forth herein.

WWAN. Any wireless network herein may be a Wireless Wide Area Network (WWAN) such as a wireless broadband network, and the WWAN port may be an antenna and the WWAN transceiver may be a wireless modem. The wireless network may be a satellite network, the antenna may be a satellite antenna, and the wireless modem may be a satellite modem. The wireless network may be a WiMAX network such as according to, compatible with, or based on, IEEE 802.16-2009, the antenna may be a WiMAX antenna, and the wireless modem may be a WiMAX modem. The wireless network may be a cellular telephone network, the antenna may be a cellular antenna, and the wireless modem may be a cellular modem. The cellular telephone network may be a Third Generation (3G) network, and may use UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network and may use or be compatible with HSPA+, Mobile WiMAX, LTE, LTE-Advanced, MBWA, or may be compatible with, or based on, IEEE 802.20-2008.

WLAN. Wireless Local Area Network (WLAN), is a popular wireless technology that makes use of the Industrial, Scientific and Medical (ISM) frequency spectrum. In the US, three of the bands within the ISM spectrum are the A band, 902-928 MHz; the B band, 2.4-2.484 GHz (a.k.a. 2.4

GHz); and the C band, 5.725-5.875 GHz (a.k.a. 5 GHz). Overlapping and/or similar bands are used in different regions such as Europe and Japan. In order to allow interoperability between equipment manufactured by different vendors, few WLAN standards have evolved, as part of the IEEE 802.11 standard group, branded as WiFi (www.wi-fi.org). IEEE 802.11b describes a communication using the 2.4 GHz frequency band and supporting communication rate of 11 Mb/s, IEEE 802.11a uses the 5 GHz frequency band to carry 54 MB/s and IEEE 802.11g uses the 2.4 GHz band to support 54 Mb/s. The WiFi technology is further described in a publication entitled: "*WiFi Technology*" by Telecom Regulatory Authority, published on July 2003, which is incorporated in its entirety for all purposes as if fully set forth herein. The IEEE 802 defines an ad-hoc connection between two or more devices without using a wireless access point: the devices communicate directly when in range. An ad hoc network offers peer-to-peer layout and is commonly used in situations such as a quick data exchange or a multiplayer LAN game, because the setup is easy and an access point is not required.

A node/client with a WLAN interface is commonly referred to as STA (Wireless Station/Wireless client). The STA functionality may be embedded as part of the data unit, or alternatively be a dedicated unit, referred to as bridge, coupled to the data unit. While STAs may communicate without any additional hardware (ad-hoc mode), such network usually involves Wireless Access Point (a.k.a. WAP or AP) as a mediation device. The WAP implements the Basic Stations Set (BSS) and/or ad-hoc mode based on Independent BSS (IBSS). STA, client, bridge and WAP will be collectively referred to hereon as WLAN unit. Bandwidth allocation for IEEE 802.11g wireless in the U.S. allows multiple communication sessions to take place simultaneously, where eleven overlapping channels are defined spaced 5 MHz apart, spanning from 2412 MHz as the center frequency for channel number 1, via channel 2 centered at 2417 MHz and 2457 MHz as the center frequency for channel number 10, up to channel 11 centered at 2462 MHz. Each channel bandwidth is 22 MHz, symmetrically (+/−11 MHz) located around the center frequency. In the transmission path, first the baseband signal (IF) is generated based on the data to be transmitted, using 256 QAM (Quadrature Amplitude Modulation) based OFDM (Orthogonal Frequency Division Multiplexing) modulation technique, resulting a 22 MHz (single channel wide) frequency band signal. The signal is then up converted to the 2.4 GHz (RF) and placed in the center frequency of required channel, and transmitted to the air via the antenna. Similarly, the receiving path comprises a received channel in the RF spectrum, down converted to the baseband (IF) wherein the data is then extracted.

In order to support multiple devices and using a permanent solution, a Wireless Access Point (WAP) is typically used. A Wireless Access Point (WAP, or Access Point—AP) is a device that allows wireless devices to connect to a wired network using Wi-Fi, or related standards. The WAP usually connects to a router (via a wired network) as a standalone device, but can also be an integral component of the router itself. Using Wireless Access Point (AP) allows users to add devices that access the network with little or no cables. A WAP normally connects directly to a wired Ethernet connection, and the AP then provides wireless connections using radio frequency links for other devices to utilize that wired connection. Most APs support the connection of multiple wireless devices to one wired connection. Wireless access typically involves special security considerations, since any device within a range of the WAP can attach to the network. The most common solution is wireless traffic encryption. Modern access points come with built-in encryption such as Wired Equivalent Privacy (WEP) and Wi-Fi Protected Access (WPA), typically used with a password or a passphrase. Authentication in general, and a WAP authentication in particular, is used as the basis for authorization, which determines whether a privilege may be granted to a particular user or process, privacy, which keeps information from becoming known to non-participants, and non-repudiation, which is the inability to deny having done something that was authorized to be done based on the authentication. An authentication in general, and a WAP authentication in particular, may use an authentication server that provides a network service that applications may use to authenticate the credentials, usually account names and passwords of their users. When a client submits a valid set of credentials, it receives a cryptographic ticket that it can subsequently be used to access various services. Authentication algorithms include passwords, Kerberos, and public key encryption.

Prior art technologies for data networking may be based on single carrier modulation techniques, such as AM (Amplitude Modulation), FM (Frequency Modulation), and PM (Phase Modulation), as well as bit encoding techniques such as QAM (Quadrature Amplitude Modulation) and QPSK (Quadrature Phase Shift Keying). Spread spectrum technologies, to include both DSSS (Direct Sequence Spread Spectrum) and FHSS (Frequency Hopping Spread Spectrum) are known in the art. Spread spectrum commonly employs Multi-Carrier Modulation (MCM) such as OFDM (Orthogonal Frequency Division Multiplexing). OFDM and other spread spectrum are commonly used in wireless communication systems, particularly in WLAN networks.

BAN. A wireless network may be a Body Area Network (BAN) according to, compatible with, or based on, IEEE 802.15.6 standard, and communicating devices may comprise a BAN interface that may include a BAN port and a BAN transceiver. The BAN may be a Wireless BAN (WBAN), and the BAN port may be an antenna and the BAN transceiver may be a WBAN modem.

Bluetooth. Bluetooth is a wireless technology standard for exchanging data over short distances (using short-wavelength UHF radio waves in the ISM band from 2.4 to 2.485 GHz) from fixed and mobile devices, and building personal area networks (PANs). It can connect several devices, overcoming problems of synchronization. A Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein. Any Personal Area Network (PAN) may be according to, compatible with, or based on, Bluetooth™ or IEEE 802.15.1-2005 standard. A Bluetooth controlled electrical appliance is described in U.S. Patent Application No. 2014/0159877 to Huang entitled: "Bluetooth Controllable Electrical Appliance", and an electric power supply is described in U.S. Patent Application No. 2014/0070613 to Garb et al. entitled: "Electric Power Supply and Related Methods", which are both incorporated in their entirety for all purposes as if fully set forth herein.

Bluetooth operates at frequencies between 2402 and 2480 MHz, or 2400 and 2483.5 MHz including guard bands 2 MHz wide at the bottom end and 3.5 MHz wide at the top. This is in the globally unlicensed (but not unregulated) Industrial, Scientific and Medical (ISM) 2.4 GHz short-range radio frequency band. Bluetooth uses a radio technology called frequency-hopping spread spectrum. Bluetooth divides transmitted data into packets, and transmits each packet on one of 79 designated Bluetooth channels. Each channel has a bandwidth of 1 MHz. It usually performs 800 hops per second, with Adaptive Frequency-Hopping (AFH) enabled. Bluetooth low energy uses 2 MHz spacing, which accommodates 40 channels. Bluetooth is a packet-based protocol with a master-slave structure. One master may communicate with up to seven slaves in a piconet. All devices share the master's clock. Packet exchange is based on the basic clock, defined by the master, which ticks at 312.5 μs intervals. Two clock ticks make up a slot of 625 μs, and two slots make up a slot pair of 1250 μs. In the simple case of single-slot packets the master transmits in even slots and receives in odd slots. The slave, conversely, receives in even slots and transmits in odd slots. Packets may be 1, 3 or 5 slots long, but in all cases the master's transmission begins in even slots and the slave's in odd slots.

A master Bluetooth device can communicate with a maximum of seven devices in a piconet (an ad-hoc computer network using Bluetooth technology), though not all devices reach this maximum. The devices can switch roles, by agreement, and the slave can become the master (for example, a headset initiating a connection to a phone necessarily begins as master—as initiator of the connection—but may subsequently operate as slave). The Bluetooth Core Specification provides for the connection of two or more piconets to form a scatternet, in which certain devices simultaneously play the master role in one piconet and the slave role in another. At any given time, data can be transferred between the master and one other device (except for the little-used broadcast mode). The master chooses which slave device to address; typically, it switches rapidly from one device to another in a round-robin fashion. Since it is the master that chooses which slave to address, whereas a slave is supposed to listen in each receive slot, being a master is a lighter burden than being a slave. Being a master of seven slaves is possible; being a slave of more than one master is difficult.

Bluetooth Low Energy. Bluetooth low energy (Bluetooth LE, BLE, marketed as Bluetooth Smart) is a wireless personal area network technology designed and marketed by the Bluetooth Special Interest Group (SIG) aimed at novel applications in the healthcare, fitness, beacons, security, and home entertainment industries. Compared to Classic Bluetooth, Bluetooth Smart is intended to provide considerably reduced power consumption and cost while maintaining a similar communication range. Bluetooth low energy is described in a Bluetooth SIG published Dec. 2, 2014 standard Covered Core Package version: 4.2, entitled: "*Master Table of Contents & Compliance Requirements—Specification Volume* 0", and in an article published 2012 in Sensors [ISSN 1424-8220] by Caries Gomez et al. [Sensors 2012, 12, 11734-11753; doi:10.3390/s120211734] entitled: "*Overview and Evaluation of Bluetooth Low Energy: An Emerging Low-Power Wireless Technology*", which are both incorporated in their entirety for all purposes as if fully set forth herein.

Bluetooth Smart technology operates in the same spectrum range (the 2.400 GHz-2.4835 GHz ISM band) as Classic Bluetooth technology, but uses a different set of channels. Instead of the Classic Bluetooth 79 1-MHz channels, Bluetooth Smart has 40 2-MHz channels. Within a channel, data is transmitted using Gaussian frequency shift modulation, similar to Classic Bluetooth's Basic Rate scheme. The bit rate is 1 Mbit/s, and the maximum transmit power is 10 mW. Bluetooth Smart uses frequency hopping to counteract narrowband interference problems. Classic Bluetooth also uses frequency hopping but the details are different; as a result, while both FCC and ETSI classify Bluetooth technology as an FHSS scheme, Bluetooth Smart is classified as a system using digital modulation techniques or a direct-sequence spread spectrum. All Bluetooth Smart devices use the Generic Attribute Profile (GATT). The application programming interface offered by a Bluetooth Smart aware operating system will typically be based around GATT concepts.

NFC. Any wireless communication herein may be partly or in full in accordance with, compatible with, or based on, short-range communication such as Near Field Communication (NFC), having a theoretical working distance of 20 centimeters and a practical working distance of about 4 centimeters, and commonly used with mobile devices, such as smartphones. The NFC typically operates at 13.56 MHz as defined in IS O/IEC 18000-3 air interface, and at data rates ranging from 106 Kbit/s to 424 Kbit/s. NFC commonly involves an initiator and a target; the initiator actively generates an RF field that may power a passive target. NFC peer-to-peer communication is possible, provided both devices are powered.

The NFC typically supports passive and active modes of operation. In passive communication mode, the initiator device provides a carrier field and the target device answers by modulating the existing field, and the target device may draw its operating power from the initiator-provided electromagnetic field, thus making the target device a transponder. In active communication mode, both devices typically have power supplies, and both initiator and target devices communicate by alternately generating their own fields, where a device deactivates its RF field while it is waiting for data. NFC typically uses Amplitude-Shift Keying (ASK), and employs two different schemes to transfer data. At the data transfer rate of 106 Kbit/s, a modified Miller coding with 100% modulation is used, while in all other cases, Manchester coding is used with a modulation ratio of 10%.

Cellular. Cellular telephone network may be according to, compatible with, or may be based on, a Third Generation (3G) network that uses UMTS W-CDMA, UMTS HSPA, UMTS TDD, CDMA2000 1×RTT, CDMA2000 EV-DO, or GSM EDGE-Evolution. The cellular telephone network may be a Fourth Generation (4G) network that uses HSPA+, Mobile WiMAX, LTE, LTE-Advanced, MBWA, or may be based on or compatible with IEEE 802.20-2008.

Appliance. Home appliances are electrical and mechanical devices using technology for household use, such as food handling, cleaning, clothes handling, or environmental control. Appliances are commonly used in household, institutional, commercial or industrial setting, for accomplishing routine housekeeping tasks, and are typically electrically powered. The appliance may be a major appliance, also known as "White Goods", which is commonly large, difficult to move, and generally to some extent fixed in place (usually on the floor or mounted on a wall or ceiling), and is electrically powered from the AC power (mains) grid. Non-limiting examples of major appliances are washing machines, clothes dryers, dehumidifiers, conventional ovens, stoves, refrigerators, freezers, air-conditioners, trash compactors, furnaces, dishwasher, water heaters, microwave ovens and induction cookers. The appliance may be a small appliance, also known as "Brown Goods", which is commonly a small home appliance that is portable or semi-portable, and is typically a tabletop or a countertop type. Examples of small appliances are television sets, CD and DVD players, HiFi and home cinema systems, telephone sets and answering machines, and beverage making devices such as coffee-makers and iced-tea makers.

Some appliances main function is food storage, commonly refrigeration related appliances such as refrigerators and freezers. Other appliances main function is food preparation, such as conventional ovens (stoves) or microwave ovens, electric mixers, food processors, and electric food blenders, as well as beverage makers such as coffee-makers and iced-tea makers. Few food related appliances, commonly found in a home kitchen, are illustrated in FIG. 4, showing a dishwasher 41, a food processor 42, a refrigerator 43, an oven 44, a mixer 45, and a microwave oven 46. Some appliances main function relates to cleaning, such as clothes cleaning. Clothes cleaning appliances examples are washing/laundry machines and clothes dryers. A vacuum cleaner is an appliance used to suck up dust and dirt, usually from floors and other surfaces. Few cleaning-related appliances are illustrated in FIG. 4*a*, showing a vacuum cleaner 47, a cloth dryer 48 and a washing machine 49, as well as a still digital camera 51 and a digital video camera 52. Some appliances main function relates to temperature control, such as heating and cooling. Air conditioners and heaters, as well as HVAC (Heating, Ventilation and Air Conditioning) systems, are commonly used for climate control, usually for thermal comfort for occupants of buildings or other enclosures. Similarly, water heaters are used for heating water.

The system may be used for lighting control, moisture control, freeze control, pet feeding, propane gauge, interior and exterior cameras, security, smoke alarms, or health monitoring. In one non-limiting example, a field unit may be integrated with a smoke detector assembly, which is typically housed in a disk-shaped plastic enclosure, which may be about 150 millimeters (6 inch) in diameter and 25 millimeters (1 inch) thick, and is commonly mounted on a ceiling or on a wall.

Wearables. As used herein, the term "wearable device" (or "wearable") includes a body-borne device (or item) designed or intended to be worn by a human. Such devices are typically comfortably worn on, and are carried or transported by, the human body, and are commonly used to create constant, convenient, seamless, portable, and mostly hands-free access to electronics and computers. The wearable devices may be in direct contact with the human body (such as by touching, or attaching to, the body skin), or may be releasably attachable to clothes or other items intended or designed to be worn on the human body. In general, the goal of wearable technologies is to smoothly incorporate functional, portable electronics and computers into individuals' daily lives. Wearable devices may be releasably attached to the human body using attaching means such as straps, buckles, belts, or clasps. Alternatively or in addition, wearable devices may be shaped, structured, or having a form factor to be body releasably mountable or attachable, such as using eye-glass frames or headphones. Further, wearable devices may be worn under, with, or on top of, clothing.

Wearable devices may interact as sensors or actuators with an organ or part of the human body, such as a head mounted wearable device may include a screen suspended in front of a user's eye, without providing any aid to the user's vision. Examples of wearable devices include watches, glasses, contact lenses, pedometers, chest straps, wristbands, head bands, arm bands, belt, head wear, hats, glasses, watches, sneakers, clothing, pads, e-textiles and smart fabrics, headbands, beanies, and caps, as well as jewelry such as rings, bracelets, and hearing aid-like devices that are designed to look like earrings. A wearable device may be structured, designed, or have a form factor that is identical to, substantially similar to, or is at least in part substitute to, a traditional wearable item.

A wearable device may be a headwear that may be structured, designed, or have a form factor that is identical to, substantially similar to, or is at least in part substitute to, any headwear item. The headwear may be attached to, or be in contact with, a head part, such as a face, nose, right nostril, left nostril, right cheek, left cheek, right eye, left eye, right ear, or left ear, nose, mouth, lip, forehead, or chin. A wearable device may be structured, designed, or have a form factor that is identical to, substantially similar to, or is at least in part substitute to, a bonnet, a cap, a crown, a fillet, a hair cover, a hat, a helmet, a hood, a mask, a turban, a veil, or a wig.

A headwear device may be an eyewear that may be structured, designed, or have a form factor that is identical to, substantially similar to, or is at least in part substitute to, any eyewear item, such as glasses, sunglasses, a contact lens, a blindfold, or a goggle. A headwear device may be an earpiece that may be structured, designed, or have a form factor that is identical to, substantially similar to, or is at least in part substitute to, any earpiece item, such as a hearing aid, a headphone, a headset, or an earplug.

A wearable device may be releasably or permanently attach to, or be part of, a clothing article such as a tie, sweater, jacket, or hat. The attachment may use taping, gluing, pinning, enclosing, encapsulating, or any other method of attachment or integration known in the art. Furthermore, in some embodiments, there may be an attachment element such as a pin or a latch and hook system, of portion thereof (with the complementary element on the item to which it is to be affixed) or clip. In a non-limiting example, the attachment element has a clip-like design to allow attachment to pockets, belts, watches, bracelets, broaches, rings, shoes, hats, bike handles, necklaces, ties, spectacles, collars, socks, bags, purses, wallets, or cords.

A wearable device may be releasably or permanently attach to, or be part of, a top underwear such as a bra, camisole, or undershirt, a bottom underwear such as a diaper, panties, plastic pants, slip, thong, underpants, boxer briefs, boxer shorts, or briefs, or a full-body underwear such as bodysuit, long underwear, playsuit, or teddy. Similarly, a wearable device may be releasably or permanently attach to, or be part of, a headwear such as a Baseball cap, Beret, Cap, Fedora, hat, helmet, hood, knit cap, toque, turban, or veil. Similarly, a wearable device may be releasably or permanently attach to, or be part of, a footwear such as an athletic shoe, boot, court shoe, dress shoe, flip-flops, hosiery, sandal, shoe, spats, slipper, sock, or stocking. Further, a wearable device may be releasably or permanently attach to, or be part of, an accessory such as a bandana, belt, bow tie, coin purse, cufflink, cummerbund, gaiters, glasses, gloves, headband, handbag, handkerchief, jewellery, muff, necktie, pocket protector, pocketwatch, sash, scarf, sunglasses, suspenders, umbrella, wallet, or wristwatch.

A wearable device may be releasably or permanently attach to, or be part of, an outwear such as an apron, blazer, British warm, cagoule, cape, chesterfield, coat, covert coat, cut-off, duffle coat, flight jacket, gilet, goggle jacket, guards coat, Harrington jacket, hoodie, jacket, leather jacket, mess jacket, opera coat, overcoat, parka, paletot, pea coat, poncho, raincoat, robe, safari jacket, shawl, shrug, ski suit, sleeved blanket, smoking jacket, sport coat, trench coat, ulster coat, waistcoat, or windbreaker. Similarly, a wearable device may be releasably or permanently attach to, or be part of, a suit (or uniform) such as an academic dress, ball dress, black tie, boilersuit, cleanroom suit, clerical clothing, court dress, gymslip, jumpsuit, kasaya, lab coat, military uniform, morning dress, onesie, pantsuit, red sea rig, romper suit, school uniform, scrubs, stroller, tuxedo, or white tie. Further, a wearable device may be releasably or permanently attach to, or be part of, a dress such as a ball gown, bouffant gown, coatdress, cocktail dress, debutante dress, formal wear, frock, evening gown, gown, house dress, jumper, little black dress, princess line, sheath dress, shirtdress, slip dress, strapless dress, sundress, wedding dress, or wrap dress. Furthermore, a wearable device may be releasably or permanently attach to, or be part of, a skirt such as an A-line skirt, ballerina skirt, denim skirt, men's skirts, miniskirt, pencil skirt, prairie skirt, rah-rah skirt, sarong, Skort, tutu, or wrap. In one example, a wearable device may be releasably or permanently attach to, or be part of, a trousers (or shorts) such as bell-bottoms, bermuda shorts, bondage pants, capri pants, cargo pants, chaps, cycling shorts, dress pants, high water pants, lowrise pants, Jeans, jodhpurs, leggings, overall, Palazzo pants, parachute pants, pedal pushers, phat pants, shorts, slim-fit pants, sweatpants, windpants, or yoga pants. In one example, a wearable device may be releasably or permanently attach to, or be part of, a top such as a blouse, crop top, dress shirt, guayabera, guernsey, halterneck, henley shirt, hoodie, jersey, polo shirt, shirt, sleeveless shirt, sweater, sweater vest, t-shirt, tube top, turtleneck, or twinset.

A wearable device may be structured, designed, or have a form factor that is identical to, substantially similar to, or is at least in part substitute to, a fashion accessory. These accessories may be purely decorative, or have a utility beyond aesthetics. Examples of these accessories include, but are not limited to, rings, bracelets, necklaces, watches, watch bands, purses, wallets, earrings, body rings, headbands, glasses, belts, ties, tie bars, tie tacks, wallets, shoes, pendants, charms and bobbles. For example, wearable devices may also be incorporated into pockets, steering wheels, keyboards, pens, and bicycle handles.

In one example, the wearable device may be shaped as, or integrated with, a device that includes an annular member defining an aperture therethrough that is sized for receipt therein of a human body part. The body part may be part of a human hand such as upper arm, elbow, forearm, wrist (such as a wrist-band), or a finger (such as a ring). Alternatively or in addition, the body part may be part of a human head or neck, such as a forehead, ear, skull, or face. Alternatively or in addition, the body part may be part of a human thorax or abdomen, such as waist or hip. Alternatively or in addition, the body part may be part of a human leg or foot, such as thigh, calf, ankle, instep, knee, or toe.

In one example, the wearable device may be shaped as, or integrated with, a ring. The ring may comprise, consist essentially of or consist of a shank, which is the location that provides an opening for a finger, and a head, which comprises, consists essentially or consists of ornamental features of the ring and in some embodiments houses the signaling assembly of the present device. The head may be of any shape, e.g., a regular sphere, truncated sphere, cube, rectangular prism, cylinder, triangular prism, cone, pyramid, barrel, truncated cone, domed cylinder, truncated cylinder, ellipsoid, regular polygon prism or truncated three-dimensional polygon of e.g., 4-16 sides, such as a truncated pyramid (trapezoid), or combination thereof or it may be an irregular shape. Further, the head may comprise an upper face that contains and is configured to show one or more jewels and/or ornamental designs.

A mobile communication device configured to be worn on an index finger of a user's hand is described in U.S. Patent Application Publication No. 2015/0373443 to Carroll entitled: "Finger-wearable mobile communication device", which is incorporated in its entirety for all purposes as if fully set forth herein. The device includes a case, a microphone, a switch, and a power source. The microphone and the switch are strategically located along a shape of the case so that as worn on the user's index finger and when the switch is activated by the thumb of the user's hand, the hand naturally cups about the microphone to form a barrier to ambient noise. Further, the microphone can readily be located near a corner of the user's mouth for optimal speech-receiving conditions and to provide more private audio input.

A user controls an external electronic device with a finger-ring-mounted touchscreen is described in U.S. Patent Application Publication No. 2015/0277559 to Vescovi et al. entitled: "Devices and Methods for a Ring Computing Device", which is incorporated in its entirety for all purposes as if fully set forth herein. The device includes a computer processor, wireless transceiver, and rechargeable power source; the ring is worn on a first finger receives an input from a second finger, selects one of a plurality of touch events associated with the input, and wirelessly transmits a command associated with the touch event to the external electronic device.

A mobile communication device that comprises a fashion accessory and a signaling assembly is described in U.S. Patent Application Publication No. 2015/0349556 to Mercando et al. entitled: "Mobile Communication Devices", which is incorporated in its entirety for all purposes as if fully set forth herein. The signaling assembly may be configured to provide sensory stimuli such as a flashing LED light and a vibration. These stimuli may vary depending on the signal received from a remote communication device or from gestures made by a user or from information stored in the mobile communication device.

A wearable fitness-monitoring device is described in U.S. Pat. No. 8,948,832 to Hong et al. entitled: "Wearable Heart Rate Monitor", which is incorporated in its entirety for all purposes as if fully set forth herein. The device including a motion sensor and a photoplethysmographic (PPG) sensor. The PPG sensor includes (i) a periodic light source, (ii) a photo detector, and (iii) circuitry determining a user's heart rate from an output of the photo detector. Some embodiments provide methods for operating a heart rate monitor of a wearable fitness-monitoring device to measure one or more characteristics of a heartbeat waveform. Some embodiments provide methods for operating the wearable fitness monitoring device in a low power state when the device determines that the device is not worn by a user. Some embodiments provide methods for operating the wearable fitness-monitoring device in a normal power state when the device determines that the device is worn by a user.

A wearable device and method for processing mages to prolong battery life are described in U.S. Pat. No. 8,957,988 to Wexler et al. entitled: "Apparatus for processing images to prolong battery life", which is incorporated in its entirety for all purposes as if fully set forth herein. In one implementation, a wearable apparatus may include a wearable image sensor configured to capture a plurality of images from an environment of a user. The wearable apparatus may also include at least one processing device configured to, in a first processing-mode, process representations of the plurality of images to determine a value of at least one capturing parameter for use in capturing at least one subsequent image, and in a second processing-mode, process the representations of the plurality of images to extract information. In addition, the at least one processing device may operate in the first processing-mode when the wearable apparatus is powered by a mobile power source included in the wearable apparatus and may operate in the second processing-mode when the wearable apparatus is powered by an external power source.

A wearable device may be used for notifying a person, such as by using tactile, visual, or audible stimulus, as described for example in U.S. Patent Application No. 2015/0341901 to RYU et al. entitled: "Method and apparatus for providing notification", which is incorporated in its entirety for all purposes as if fully set forth herein, describing an electronic device that includes: a transceiver configured to communicate with at least one wearable device and receive, from the at least one wearable device, status information indicating whether the at least one wearable device is currently being worn; and a processor configured to determine whether to send a notification request to the at least one wearable device based on the status information received by the transceiver.

A communication device, system and method are described for example in U.S. Patent Application No. 2007/0052672 to Ritter et al. entitled: "Communication device, system and method", which is incorporated in its entirety for all purposes as if fully set forth herein. It is discloses comprising a Virtual Retinal Display (VRD) in form of glasses (1), at least one haptic sensor (12) mounted on the frame of the glasses or connected by a short range communication interface (13) to the glasses (1), wherein it is possible to navigate by means of a cursor through an image displayed by the Virtual Retinal Display (VRD) with the at least one haptic sensor (12). A central control unit controls (11) the Virtual Retinal Display (VRD) and the at least one haptic sensor (12). When the Virtual Retinal Display (VRD) is connected to an external device (2, 9) by a short range communication interface (13), the user can navigate through the content of the external device (2, 9) by easy use of the haptic sensor (12).

Wearable communication devices, e.g. implemented in a watch, using short range communication to a cell phone, and facilitating natural and intuitive user interface with low-power implementation are described for example in U.S. Patent Application No. 2014/0045547 to Singamsetty et al. entitled: "Wearable Communication Device and User Interface", which is incorporated in its entirety for all purposes as if fully set forth herein. The devices allow a user to easily access all features of the phone, all while a phone is nearby but not visible. Notification is performed with vibration, an LED light and OLED text display of incoming calls, texts, and calendar events. It allows communicating hands-free. This allows using the communication device as "remote control" for home devices, etc. via voice and buttons. The device comprises interfaces motion sensors such as accelerometers, magnetometer and gyroscope, infrared proximity sensors, vibrator motor, and/or voice recognition. Low power consumption is achieved by dynamical configuration of sensor parameters to support only the necessary sensor functions at any given state of the device.

A wearable electronic device that is configured to control and command a variety of wireless devices within its proximity is described in U.S. Pat. No. 7,605,714 to Thompson et al. entitled: "System and method for command and control of wireless devices using a wearable device", which is incorporated in its entirety for all purposes as if fully set forth herein. The wearable device dynamically generates a user interface corresponding to the services of a particular wireless device. Through the user interface, the wireless device surface content to a user and allows a user select interactions with the wireless devices using the wearable device.

An apparatus and method for the remote control and/or interaction-with electronic-devices such as computers; home-entertainment-systems; media-centers; televisions; DVD-players; VCR-players; music systems; appliances; security systems; toys/games; and/or displays are described in U.S. Pat. No. 8,508,472 to Wieder entitled: "Wearable remote control with a single control button", which is incorporated in its entirety for all purposes as if fully set forth herein. A user may orient a pointer (e.g., laser pointer) to place a pointer-spot on/near object(s) on an active-display(s); and/or a fixed-display(s); and/or on real-world object(s) within a display region or pointer-spot detection-region. Detectors, imager(s) and/or camera(s) may be connected/attached to the display region and/or a structure that is connected/attached to display region. When the user initiates a "select", the detectors/cameras may detect the location of the pointer-spot within the display region. Corresponding to the user's selection(s); control action(s) may be performed on the device(s) being controlled/interacted-with and additional selection-menus may be optionally presented on an active-display.

A hand-worn controller consisting of a housing having a central opening sized to permit the controller to be worn as ring on the index finger of a human hand is described in U.S. Patent Application Publication No. 2006/0164383 to Machin et al. entitled: "Remote controller ring for user interaction", which is incorporated in its entirety for all purposes as if fully set forth herein. A joystick lever projects outwardly from the housing and is positioned to be manipulated by the user's thumb. The joystick operates on or more control devices, such as switches or potentiometers, that produce control signals. A wireless communications device, such as a Bluetooth module, mounted in the housing transmits command signals to a remote utilization device, which are indicative of the motion or position of the joystick lever.

A wearable augmented reality computing apparatus with a display screen, a reflective device, a computing device and a head mounted harness to contain these components is described in U.S. Patent Application Publication No. 2012/0050144 to Morlock entitled: "Wearable augmented reality computing apparatus", which is incorporated in its entirety for all purposes as if fully set forth herein. The display device and reflective device are configured such that a user can see the reflection from the display device superimposed on the view of reality. An embodiment uses a switchable mirror as the reflective device. One usage of the apparatus is for vehicle or pedestrian navigation. The portable display and general purpose computing device can be combined in a device such as a smartphone. Additional components consist of orientation sensors and non-handheld input devices.

In one example, a wearable device may use, or may be based on, a processor or a microcontroller that is designed for wearable applications, such as the CC2650 SimpleLink™ Multistandard Wireless MCU available from Texas Instruments Incorporated (headquartered in Dallas, Texax, U.S.A.) and described in a Texas Instrument 2015 publication #SWRT022 entitled: "*SimpleLink™ Ultra-Low Power—Wireless Microcontroller Platform*", and in a Texas Instrument 2015 datasheet #SWRS158A (published February 2015, Revised October 2015) entitled: "*CC2650 SimpleLink™ Multistandard Wireless MCU*", which are both incorporated in their entirety for all purposes as if fully set forth herein.

An example of a personal multimedia electronic device, and more particularly to a head-worn device such as an eyeglass frame, is described in U.S. Patent Application No. 2010/0110368 to Chaum entitled: "System and apparatus for eyeglass appliance platform", which is incorporated in its entirety for all purposes as if fully set forth herein. The device is having a plurality of interactive electrical/optical components. In one embodiment, a personal multimedia electronic device includes an eyeglass frame having a side arm and an optic frame; an output device for delivering an output to the wearer; an input device for obtaining an input; and a processor comprising a set of programming instructions for controlling the input device and the output device. The output device is supported by the eyeglass frame and is selected from the group consisting of a speaker, a bone conduction transmitter, an image projector, and a tactile actuator. The input device is supported by the eyeglass frame and is selected from the group consisting of an audio sensor, a tactile sensor, a bone conduction sensor, an image sensor, a body sensor, an environmental sensor, a global positioning system receiver, and an eye tracker. In one embodiment, the processor applies a user interface logic that determines a state of the eyeglass device and determines the output in response to the input and the state.

An example of an eyewear for a user is described in U.S. Patent Application No. 2012/0050668 Howell et al. entitled: "Eyewear with touch-sensitive input surface", which is incorporated in its entirety for all purposes as if fully set forth herein. The eyewear includes an eyewear frame, electrical circuitry at least partially in the eyewear frame, and a touch sensitive input surface on the eyewear frame configured to provide an input to the electrical circuitry to perform a function via touching the touch sensitive input surface. In another embodiment, the eyewear includes a switch with at least two operational states. The operational states of the switch can be configured to be changed by sliding a finger across the touch sensitive input surface of the frame.

An example of a wearable computing device is described in U.S. Patent Application No. 2013/0169513 to Heinrich et al. entitled: "Wearable computing device", which is incorporated in its entirety for all purposes as if fully set forth herein. The device includes a bone conduction transducer, an extension arm, a light pass hole, and a flexible touch pad input circuit. When a user wears the device, the transducer contacts the user's head. A display is attached to a free end of an extension arm. The extension arm is pivotable such that a distance between the display and the user's eye is adjustable to provide the display at an optimum position. The light pass hole may include a light emitting diode and a flash. The touch pad input circuit may be adhered to at least one side arm such that parting lines are not provided between edges of the circuit and the side arm.

Hash function. A hash function is any function that can be used to map data of arbitrary size to data of fixed size, and the values returned by a hash function are called hash values, hash codes, digests, or simply hashes. One use is a data structure called a hash table, widely used in computer software for rapid data lookup, where hash functions accelerate table or database lookup by detecting duplicated records in a large file. A cryptographic hash function allows one to easily verify that some input data maps to a given hash value, but if the input data is unknown, it is deliberately difficult to reconstruct it (or equivalent alternatives) by knowing the stored hash value. Hash functions may include checksums, check digits, fingerprints, lossy compression, randomization functions, error-correcting codes, and ciphers. Hash functions are described in an article by Jun Wang, Wei Liu, Sanjiv Kumar, and Shih-Fu Chang, Submitted on 17 Sep. 2015 to the PROCEEDINGS OF THE IEEE (http://arxiv.org/abs/1509.05472v1) entitled: "*Learning to Hash for Indexing Big Data—A Survey*", and in a book by Josef Pieprzyk and Babak Sadeghiyan, published 1993 by Springer-Verlag [ISBN 3-540-57500-6] entitled: "*Design of Hashing Algorithms*", which are both incorporated in their entirety for all purposes as if fully set forth herein. The concept of a hash table is a generalized idea of an array where key does not have to be an integer. We can have a name as a key, or for that matter any object as the key. Hash functions are used in hash tables, to quickly locate a data record (e.g., a dictionary definition) given its search key (the headword). Specifically, the hash function is used to map the search key to a list; the index gives the place in the hash table where the corresponding record should be stored. Hash tables, also, are used to implement associative arrays and dynamic sets. Typically, the domain of a hash function (the set of possible keys) is larger than its range (the number of different table indices), and so it will map several different keys to the same index which could result in collisions. So then, each slot of a hash table is associated with (implicitly or explicitly) a set of records, rather than a single record. For this reason, each slot of a hash table is often called a bucket, and hash values are also called bucket listing or a bucket index.

Good hash functions are usually required to satisfy certain properties listed below. The exact requirements are dependent on the application. For example, a hash function well suited to indexing data will probably be a poor choice for a cryptographic hash function. A hash procedure must be deterministic—meaning that for a given input value it must always generate the same hash value. In other words, it must be a function of the data to be hashed, in the mathematical sense of the term. This requirement excludes hash functions that depend on external variable parameters, such as pseudo-random number generators or the time of day. It also excludes functions that depend on the memory address of the object being hashed in cases that the address may change during execution, although sometimes rehashing of the item is possible. The determinism is in the context of the reuse of the function. Further, a good hash function should map the expected inputs as evenly as possible over its output range. That is, every hash value in the output range should be generated with roughly the same probability. The reason for this last requirement is that the cost of hashing-based methods goes up sharply as the number of collisions—pairs of inputs that are mapped to the same hash value—increases. If some hash values are more likely to occur than others, a larger fraction of the lookup operations will have to search through a larger set of colliding table entries. Note that this criterion only requires the value to be uniformly distributed, not random in any sense. A good randomizing function is (barring computational efficiency concerns) generally a good choice as a hash function, but the converse need not be true. Hash tables often contain only a small subset of the valid inputs. For instance, a club membership list may contain only a hundred or so member names, out of the very large set of all possible names. In these cases, the uniformity criterion should hold for almost all typical subsets of entries that may be found in the table, not just for the global set of all possible entries. When testing a hash function, the uniformity of the distribution of hash values can be evaluated by the chi-squared test.

It is often desirable that the output of a hash function have fixed size. If, for example, the output is constrained to 32-bit integer values, the hash values can be used to index into an array. Such hashing is commonly used to accelerate data searches. On the other hand, cryptographic hash functions produce much larger hash values, in order to ensure the computational complexity of brute-force inversion. For example, SHA-1, one of the most widely used cryptographic hash functions, produces a 160-bit value. Producing fixed-length output from variable length input can be accomplished by breaking the input data into chunks of specific size. Hash functions used for data searches use some arithmetic expression which iteratively processes chunks of the input (such as the characters in a string) to produce the hash value. In cryptographic hash functions, these chunks are processed by a one-way compression function, with the last chunk being padded if necessary. In this case, their size, which is called block size, is much bigger than the size of the hash value. For example, in SHA-1, the hash value is 160 bits and the block size 512 bits.

Further, in many applications, the range of hash values may be different for each run of the program, or may change along the same run (for instance, when a hash table needs to be expanded). In those situations, one needs a hash function which takes two parameters—the input data z, and the number n of allowed hash values. A common solution is to compute a fixed hash function with a very large range (say, 0 to 232−1), divide the result by n, and use the division's remainder. If n is itself a power of 2, this can be done by bit masking and bit shifting. When this approach is used, the hash function must be chosen so that the result has fairly uniform distribution between 0 and n−1, for any value of n that may occur in the application. Depending on the function, the remainder may be uniform only for certain values of n, e.g., odd or prime numbers.

IETF RFC 4634 (dated July 2006) entitled: "*US Secure Hash Algorithms* (*SHA and HMAC-SHA*)", which is incorporated in its entirety for all purposes as if fully set forth herein, describes a suite of Secure Hash Algorithms (SHAs), including four beyond SHA-1, as part of a Federal Information Processing Standard (FIPS), specifically SHA-224 (RFC 3874), SHA-256, SHA-384, and SHA-512. The purpose of this document is to make source code performing these hash functions conveniently available to the Internet community. The sample code supports input strings of arbitrary bit length. SHA-1's sample code from RFC 3174 has also been updated to handle input strings of arbitrary bit length. Most of the text herein was adapted by the authors from FIPS 180-2. IETF RFC 3874 (dated September 2004) entitled: "*A 224-bit One-way Hash Function: SHA*-224", which is incorporated in its entirety for all purposes as if fully set forth herein, describes a 224-bit one-way hash function, called SHA-224. The SHA-224 is based on SHA-256, but it uses a different initial value and the result is truncated to 224 bits.

A method for fetching a content from a web server to a client device is disclosed, using tunnel devices serving as intermediate devices is described in U.S. Pat. No. 9,241,044 to Shribman et al. entitled: "System and method for improving internet communication by using intermediate nodes", which is incorporated in its entirety for all purposes as if fully set forth herein (hereinafter—"the '044 patent"). The client device accesses an acceleration server to receive a list of available tunnel devices. The requested content is partitioned into slices, and the client device sends a request for the slices to the available tunnel devices. The tunnel devices in turn fetch the slices from the data server, and send the slices to the client device, where the content is reconstructed from the received slices. A client device may also serve as a tunnel device, serving as an intermediate device to other client devices. Similarly, a tunnel device may also serve as a client device for fetching content from a data server. The selection of tunnel devices to be used by a client device may be in the acceleration server, in the client device, or in both. The partition into slices may be overlapping or non-overlapping, and the same slice (or the whole content) may be fetched via multiple tunnel devices.

In one example, the '044 patent describes an accessing to a data server is improved by using an intermediate device referred to as a 'tunnel' device that is executing a 'tunnel' flowchart. FIG. 5 shows a system 50 including two client devices, a client device #1 31*a* and a client device #2 31*b*, that may access the web servers (data servers) 22*a* and 22*b* using one or more of a tunnel device #1 33*a*, a tunnel device #2 33*b*, and a tunnel device #3 33*c*, under the management and control of an acceleration server 32. These network elements communicate with each other using the Internet 113.

A schematic messaging flow diagram 60 according to the '044 patent describing the client device #1 31*a* related 'content fetch' flowchart and the tunnel device #1 33*a* related flowchart is shown in FIG. 6. A 'Content Request' message 61*a* is first sent from the client device #1 31*a* to the selected tunnel device #1 33*a*, which responds by forwarding the request to the data server #1 22*a* using a 'Content Request' message 61*b*. In turn the data server #1 22*a* replies and sends the content in a 'Send Content' message 61*c* to the requesting tunnel device #1 33*a*, which in turn forward the fetched content to the asking client device #1 31*a* using a 'Send Content' message 61*d*.

While accessing the data server #1 22*a* was exampled above using the tunnel device #1 33*a* as an intermediary device, the system and the client #1 31*a* may use multiple tunnel devices in order to fetch the content from the same data server #1 22*a*. Two, three, four, or any other number of tunnel devices, serving as intermediary devices having the same or similar role as the tunnel device #1 33*a*, may be equally used. In one example, three tunnel devices may be used, such as adding the tunnel device #2 33*b* and the tunnel device #3 33*c*, shown in system 50 in FIG. 5.

In one example, three distinct data paths may be involved in the content fetching. In addition to the messaging data path 60, a messaging flow 60*a* shown in FIG. 6*a* describes the usage of the tunnel device #2 33*b* as an intermediary device, relating to the client device #1 31*a* 'content fetch' related flowchart and the tunnel device #2 33*b* related flowchart. A 'Content Request' message 62*a* is first sent from the client device #1 31*a* to the selected tunnel device #2 33*b*, which responds by forwarding the request to the data server #1 22*a* using a 'Content Request' message 62*b*. In turn the data server #1 22*a* replies and sends the content in a 'Send Content' message 62*c* to the requesting tunnel device #2 33*b*, which in turn forward the fetched content to the asking client device #1 31*a* using a 'Send Content' message 62*d*. Similarly, a messaging flow 60*b* shown in FIG. 6*b* describes the usage of the tunnel device #3 33*c* as an intermediary device, relating to the client device #1 31*a* associated with 'content fetch' in the respective flowchart and with the tunnel device #3 33*c* in the flowchart. The 'Content Request' message 65*a* is first sent from the client device #1 31*a* to the selected tunnel device #3 33*c*, which responds by forwarding the request to the data server #1 22*a* using the 'Content Request' message 65*b*. In turn the data server #1 22*a* replies and sends the content in the 'Send Content' message 65*c* to the requesting tunnel device #3 33*c*, which in turn forward the fetched content to the asking client device #1 31*a* using the 'Send Content' message 65*d*.

A system and a method for media streaming from multiple sources are disclosed in U.S. Patent Application Publication No. 2016/0337426 to Shribman et al. entitled: "System and Method for Streaming Content from Multiple Servers", which is incorporated in its entirety for all purposes as if fully set forth herein. A content requesting client device accesses a server to receive a list of available sources that may include multiple Content Delivery Networks (CDNs) and independent servers. Based on a pre-set criteria, such as the source delivery performance and cost, the client device partitions the content into parts, allocates a source to each part, and simultaneously receives media streams of the content parts from the allocated sources. The server may be a Video-on-Demand (VOD) server, and the content may be a single file of a video data, such as a movie. The delivery performance of the used sources is measured during the streaming for updating the partition or the allocation. The updated measured performance may be stored locally at the client device, or at a server for use by other clients. The client actions may be implemented as a client-side script.

A method for fetching a content from a web server to a client device using tunnel devices serving as intermediate devices is disclosed in Patent Cooperation Treaty (PCT) Publication WO 2019/043687 to Shribman et al., entitled: "System and Method for Improving Content Fetching by Selecting Tunnel Devices", which is incorporated in its entirety for all purposes as if fully set forth herein. The tunnel device is selected based on an attribute, such as IP Geolocation. A tunnel bank server stores a list of available tunnels that may be used, associated with values of various attribute types. The tunnel devices initiate communication with the tunnel bank server, and stays connected to it, for allowing a communication session initiated by the tunnel bank server. Upon receiving a request from a client to a content and for specific attribute types and values, a tunnel is selected by the tunnel bank server, and is used as a tunnel for retrieving the required content from the web server, using standard protocol such as SOCKS, Web Socket or HTTP Proxy. The client only communicates with a super proxy server that manages the content fetching scheme.

An aggregation or combination of Content or Application Delivery Networks is described in U.S. Pat. No. 9,378,473 to Wolfe entitled: "Content and application delivery network aggregation", which is incorporated in its entirety for all purposes as if fully set forth herein. The aggregation or combination is used to improve quality of service, including the delivery of content and media on a city, state, country and international basis. The aggregation is formed by combining multiple CDNs or ADNs so that a larger server and network footprint is created. The benefits of each CDN or ADN are aggregated to produce a better CDN/ADN service to the customer and end users.

Systems and techniques for transparently intercepting and optimizing resource requests are described in U.S. Patent Application Publication No. 2015/0163087 to Conner et al. entitled: "Transparently intercepting and optimizing resource requests", which is incorporated in its entirety for all purposes as if fully set forth herein. Some embodiments can send a request to a server. In response to the request, the embodiments can receive a first script and at least a second script from the server, wherein the first script includes instructions for intercepting invocations to a set of functions, and wherein the second script includes at least one invocation to at least one function in the set of functions. The first script can then be executed, thereby causing subsequent invocations to each function in the set of functions to be intercepted by a corresponding resource optimization handler. Next, the second script can be executed. When the executing second script invokes a function in the set of functions, the invocation of the function can be intercepted, and a resource optimization handler corresponding to the function can be invoked instead of invoking the function.

Web page. A web page (a.k.a. webpage) is a document that acts as a web resource on the World Wide Web. A web browser is typically used to retrieve and display web pages from the Internet, such as from a remote web server, by using Hypertext Transfer Protocol (HTTP) to make such requests to the web server. Typical web pages are hypertext documents that contain hyperlinks for browsing to other web pages. While the term web page usually refers to what is visible, but may also refer to the contents of the source code itself, which is usually a text file containing hypertext written in HTML or a comparable markup language. Most desktop web browsers include the ability to view the source code, but this ability may be missing or hidden on mobile browsers. Web browsers will frequently have to access multiple web resource elements, such as style sheets, scripts, and images, while presenting each web page.

A website will typically contain a group of web pages that are linked together, or have some other coherent method of navigation. The most important web page on a website is the index page. Depending on the web server settings, the index page can have any name, but the most common names are index.html and index.php. When a browser visits the homepage of a website or any URL pointing to a directory rather than a specific file, the web server serves the index page. A static web page is delivered exactly as stored, as HTML-formatted web content in the web server's file system. In contrast, a dynamic web page is generated by a web application, driven by server-side software, running on the client-side (on the web browser), or both. Dynamic web pages help the browser (the client) to enhance the web page through user input to the server.

As an information set, a web page typically contains numerous types of information that may be visible, heard, or interacted with, by the end user. Such perceived information may include textual information (with diverse rendering variations), as well as non-textual information. Non-textual information may include static images (such as raster graphics, typically JPEG, GIF, or PNG; or vector formats such as SVG or Flash), animated images (typically Animated GIF and SVG, but also Flash, Shockwave, or Java applet), audio (typically MP3, Ogg or various proprietary formats), and video (such as in WMV (Windows), RM (RealMedia), FLV (Flash Video), MPG, or MOV (QuickTime) formats). Interactive information may include Interactive text (such as DHTML), interactive illustrations (that may range from "click to play" images to games, typically using script orchestration, Flash, Java applets, SVG, or Shockwave). Other interactive information may include buttons, which are forms providing an alternative interface, typically for use with script orchestration and DHTML, Hyperlinks, and forms. Internal, typically hidden, information may include Linked Files through Hyperlink (such as DOC, XLS, PDF, etc.), metadata (such as semantic meta-information, Charset information, or Document Type Definition (DTD)), Diagrammatic and style information (such as information about rendered items (like image size attributes) and visual specifications, as Cascading Style Sheets (CSS)), and Scripts (usually JavaScript, complement interactivity, and functionality).

A static web page (sometimes called a flat page or a stationary page) is a web page that is delivered to the user's web browser exactly as stored in the web servers filesystem. Dynamic web pages are generated by a web application, typically drawing from a database to fill out a web template, then delivering the constructed page to the user's browser. A server-side dynamic web page is a web page whose construction is controlled by an application server processing server-side scripts. In server-side scripting, parameters determine how the assembly of every new web page proceeds, including the setting up of more client-side processing. A client-side dynamic web page processes the web page using HTML scripting running in the browser as it loads. JavaScript and other scripting languages determine the way the HTML in the received page is parsed into the Document Object Model (DOM), that represents the loaded web page. The same client-side techniques can then dynamically update or change the DOM in the same way.

A dynamic web page is reloaded by the user or by a computer program to change some variable content. The updating information could come from the server, or from changes made to that page's DOM. This may or may not truncate the browsing history or create a saved version to go back to, but a dynamic web page update using Ajax technologies will neither create a page to go back to, nor truncate the web browsing history forward of the displayed page. Using Ajax technologies the end user gets one dynamic page managed as a single page in the web browser while the actual web content rendered on that page can vary. The Ajax engine sits only on the browser requesting parts of its DOM, the DOM, for its client, from an application server.

Proxy Auto-Configuration (PAC) file. A PAC file is typically a JavaScript script function [FindProxyForURL(url, host)] retrieved locally or from a web server that is executed for each URL accessed to determine the appropriate proxy (if any) to be used to access the resource. The file cause the user agent to use a particular proxy server or to connect directly. The PAC file commonly defines how web browsers and other user agents can automatically choose the appropriate proxy server (access method) for fetching a given URL. Web browsers and other user agents must be configured to request this script upon startup. In case there is no bootstrap mechanism, a manual configuration is necessary. However, the process of proxy configuration may be simplified by centralizing it within a script at a single location. Multiple specifications provide a fallback when a proxy fails to respond. The browser fetches this PAC file before requesting other URLs. The URL of the PAC file is either configured manually or determined automatically by the Web Proxy Autodiscovery Protocol (WPAD). Typically when using Proxy Auto-Configuration (PAC) file, the URL is specified for a PAC file with a JavaScript function that determines the appropriate proxy for each URL. Alternatively, Web Proxy Autodiscovery Protocol (WPAD) may be used, where the browser retrieves the location of the PAC file through DHCP and DNS lookups. By convention, the PAC file is normally named proxy.pac. The WPAD standard uses wpad.dat.

In common use, a PAC file is published to a HTTP server, and client user agents are instructed to use it, either by entering the URL in the proxy connection settings of the browser or through the use of the WPAD protocol. The URL may also reference a local file as for example: file:///etc/proxy.pac. Even though most clients will process the script regardless of the MIME type returned in the HTTP reply, for the sake of completeness and to maximize compatibility, the HTTP server should be configured to declare the MIME type of this file to be either application/x-ns-proxy-autoconfig or application/x-javascript-config.

A Web site reputation service that automatically redirects a browsing request for analysis by a rating server is described in U.S. Pat. No. 8,527,631 to Liang entitled: "Web site reputation service using proxy auto-configuration", which is incorporated in its entirety for all purposes as if fully set forth herein. On the browsing request, a proxy autoconfiguration (PAC) file is downloaded from a PAC server to a Web browser of a user computer. The function of the PAC file is executed, sending a request to a rating server along with a host name of a target Web site. The function does not immediately return a proxy server, but first requests a rating of the Web site. A rating result associated with the Web site is produced by the rating server. The rating server returns the rating result and the function returns an address of a proxy server to the Web browser based upon the rating result. A user can enable the Web Proxy Autodiscovery Protocol to use the service. Access control may be implemented by applying an HTTP authentication mechanism on the Web server that hosts the PAC file.

A method that creates a proxy auto-configuration file for a system including a plurality of proxy servers is described in U.S. Patent Application No. 2004/0006615 to Jackson entitled: "Method and apparatus for creating proxy auto-configuration file", which is incorporated in its entirety for all purposes as if fully set forth herein. The method includes accessing and performing a performance test on each of the plurality of proxy servers, and creating a proxy auto-configuration (PAC) file in response to the performing. The PAC file may be posted on a web server. The method may further include iteratively updating the PAC file by periodically conducting the accessing, the performing, and the creating. The creating the PAC file may include generating a list of a selected number of best-performing proxy servers among the plurality of proxy servers. The performing the performance test may include sending a command to fetch at least one selected web page, receiving the selected web page, and determining an amount of time required to fetch the selected web page.

A PAC file manager is described in U.S. Patent Application No. 2019/0036777 to Frizzell et al. entitled: "Proxy automatic configuration file manager", which is incorporated in its entirety for all purposes as if fully set forth herein. The PAC file manager may include PAC files. The PAC files may be generated by, and be resident on, a PAC server. The PAC file manager may include update processors. Each update processor may include a capability to transmit update information to the PAC server. The update information may be for updating URLs included in the PAC files. The PAC file manager may also include general processors and proxy servers. Each time a general processor launches a web browser, the general processor may download a PAC file from the PAC server. The PAC file may be stored in a temporary file associated with the general processor. Each PAC file may include instructions to be used to direct the associated general processor how to access the URL. The instructions may identify whether to use a proxy server and which specific proxy server to use.

Methods and systems for generating a proxy automatic configuration (PAC) script based on the location of a device are described in U.S. Pat. No. 9,201,840 to Martini et al. entitled: "Generating proxy automatic configuration scripts", which is incorporated in its entirety for all purposes as if fully set forth herein. One example method includes receiving a request for a proxy automatic configuration (PAC) script from a source address associated with a device; determining, based at least in part on the source address, a location of the device; generating a PAC script based at least in part on the determined location of the device; and sending a response to the request for the PAC script including the generated PAC script.

Geolocation. IP-based geolocation (commonly known as geolocation) is a mapping of an IP address (or MAC address) to the real-world geographic location of a computing device or a mobile device connected to the Internet. The IP address based location data may include information such as country, region, city, postal/zip code, latitude, longitude, or Timezone. Deeper data sets can determine other parameters such as domain name, connection speed, ISP, language, proxies, company name, US DMA/MSA, NAICS codes, and home/business classification. The geolocation is further described in the publication entitled: "*Towards Street-Level Client-Independent IP Geolocation*" by Yong Wang et al., downloaded from the Internet on July 2014, and in an Information Systems Audit and Control Association (ISACA) 2011 white-paper entitled: "*Geolocation: Risk, Issues and Strategies*", which are both incorporated in their entirety for all purposes as if fully set forth herein. There are a number of commercially available geolocation databases, such as a web-site http://www.ip2location.com operated by Ip2location.com headquartered in Penang, Malaysia, offering IP geolocation software applications, and geolocation databases may be obtained from IpInfoDB operating website http://ipinfodb.com, and by Max Mind, Inc., based in Waltham, Massachusetts, U.S.A, operating the web-site https://www.maxmind.com/en/home. Determining the geographic location of Internet hosts is described in an article published January 2007 by Doxa Chatzopoulou and Marios Kokkodis, both of Computer Science and Engineering Department, UC Riverside, entitled: "*IP Geolocation*", which is incorporated in its entirety for all purposes as if fully set forth herein. Various techniques of IP geolocation are described in an article (ISSN:0975-9646, downloaded from the Internet August 2017) by Jayaprabha Bendale and Prof. J. Ratanaraj Kumar, both of G.S. Moze College of Engineering, Balewadi, Pune-45, University Of Pune, Pune, India, published in (IJCSIT) International Journal of Computer Science and Information Technologies, Vol. 5 (1), 2014, 436-440 and entitled: "*Review of Different IP Geolocation Methods and Concepts*", which is incorporated in its entirety for all purposes as if fully set forth herein.

Further, the W3C Geolocation API is an effort by the World Wide Web Consortium (W3C) to standardize an interface to retrieve the geographical location information for a client-side device. It defines a set of objects, ECMA Script standard compliant, that executing in the client application give the client's device location through the consulting of Location Information Servers, which are transparent for the Application Programming Interface (API). The most common sources of location information are IP address, Wi-Fi and Bluetooth MAC address, radio-frequency identification (RFID), Wi-Fi connection location, or device Global Positioning System (GPS) and GSM/CDMA cell IDs. The location is returned with a given accuracy depending on the best location information source available. The W3C Recommendation for the geolocation API specifications draft dated Oct. 24, 2013, is available from the web-site http://www.w3.org/TR/2013/REC-geolocation-API-20131024. Geolocation-based addressing is described in U.S. Pat. No. 7,929,535 to Chen et al., entitled: "Geolocation-based Addressing Method for IPv6 Addresses", and in U.S. Pat. No. 6,236,652 to Preston et al., entitled: "Geo-spacial Internet Protocol Addressing", and in U.S. Patent Application Publication No. 2005/0018645 to Mustonen et al., entitled: "Utilization of Geographic Location Information in IP Addressing", which are all incorporated in their entirety for all purposes as if fully set forth herein.

Methods and systems for geolocation routing and simulation of network conditions are disclosed in U.S. Pat. No. 9,660,895 Bennett entitled: "Geolocation routing and simulation of network conditions", which is incorporated in its entirety for all purposes as if fully set forth herein. A network traffic profile is determined for a client device. A network access server selects an endpoint server based on the location of the selected endpoint server. The network access server routes traffic from the client device to an external server through the selected endpoint server. The network traffic from the client device to the external server appears to originate from a network address of the selected endpoint server. Network conditions for the network traffic are simulated based on the network traffic profile.

Techniques for anonymous Internet access are presented in U.S. Pat. No. 8,302,161 to Burch et al. entitled: "Techniques for anonymous internet access", which is incorporated in its entirety for all purposes as if fully set forth herein. Internet requests are intercepted within a firewalled environment before being routed over the Internet to destination sites. Each Internet requests is evaluated in view of policy and one or more anonymizers are selected in response to that evaluation. The Internet requests are then routed through the appropriate anonymizers for processing to the destination sites. A relationship between an Internet Protocol (IP) address associated with the firewalled environment and IP addresses of the destination sites is masked and hidden via the anonymizers from Internet observers. Moreover, a secure communication between the firewalled environment and the anonymizers is maintained.

A method and apparatus for selectively using an anonymous proxy are disclosed in U.S. Pat. No. 8,301,787 to Li entitled: "Selective use of anonymous proxies", which is incorporated in its entirety for all purposes as if fully set forth herein. A user request for content is received. A determination is made as to whether the user request satisfies context criteria. When the user request satisfies the context criteria, the user request is forwarded to an anonymous proxy. When the user request does not satisfy the context criteria, the request is sent directly to a content provider.

For use with a network having server sites capable of being browsed by users based on identifiers received into the server sites and personal to the users, alternative proxy systems for providing substitute identifiers to the server sites that allow the users to browse the server sites anonymously via the proxy system, are presented in U.S. Pat. No. 5,961,593 to Gabber et al. entitled: "System and method for providing anonymous personalized browsing by a proxy system in a network", which is incorporated in its entirety for all purposes as if fully set forth herein. A central proxy system includes computer-executable routines that process site-specific substitute identifiers constructed from data specific to the users, that transmits the substitute identifiers to the server sites, that retransmits browsing commands received from the users to the server sites, and that removes portions of the browsing commands that would identify the users to the server sites. The foregoing functionality is performed consistently by the central proxy system during subsequent visits to a given server site as the same site specific substitute identifiers are reused. Consistent use of the site specific substitute identifiers enables the server site to recognize a returning user and, possibly, provide personalized service.

A device that receives, from a client device, a request for a resource, where the request provides an identifier of the client device, is presented in U.S. Pat. No. 8,504,723 to Kohli entitled: "Routing proxy for resource requests and resources", which is incorporated in its entirety for all purposes as if fully set forth herein. The device selects a target device for the resource, connects with the selected target device, and provides a proxy of the request to the selected target device, where the proxy of the request hides the identifier of the client device. The device receives the resource from the selected target device, where the resource provides an identifier of the target device. The device provides a proxy of the resource to the client device, where the proxy of the resource hides the identifier of the target device.

A content distributing device that receives a request message to request to transmit content is disclosed in in U.S. Patent Application Publication No. 2013/0117413 to Kaneko et al. entitled: "Content distribution device, content playback device, content distribution system, method for controlling a content distribution device, control program, and recording medium", which is incorporated in its entirety for all purposes as if fully set forth herein. Then, in a case where a device transmitted the request message is a relaying device for receiving the content thus requested and possessing and transferring the content to another device, the content distributing device transmits the content thus requested to the relaying device, or, in a case where a device transmitted the request message is a content playing device for playing the content thus requested, the content distributing device transmits, to the content playing device, an instruction to acquire the content from a relaying device which has transmitted before the content thus requested.

Various information object repository selection procedures for determining which of a number of information object repositories should service a request for the information object are described in U.S. Pat. No. 7,565,450 to Garcia-Luna-Aceves et al. entitled: "System and method for using a mapping between client addresses and addresses of caches to support content delivery", which is incorporated in its entirety for all purposes as if fully set forth herein. The selection procedures include a direct cache selection process, a redirect cache selection process, a remote DNS cache selection process, or a local DNS cache selection process. Different combinations of these procedures may also be used. For example, different combination may be used depending on the type of content being requested. The direct cache selection process may be used for information objects that will be immediately loaded without user action, while any of the redirect cache selection process, the remote DNS cache selection process and/or the local DNS cache selection process may be used for information objects that will be loaded only after some user action.

A client device that establishes a first tunnel connection or tunnel is described in U.S. Pat. No. 7,673,048 to O'toole et al. entitled: "Methods and apparatus for establishing a computerized device tunnel connection", which is incorporated in its entirety for all purposes as if fully set forth herein. The client device establishes the first tunnel connection or tunnel through a public network, with a first gateway of a private network and establishes, through the tunnel connection, a data connection with a destination device within the private network. The first gateway monitors or analyzes the geographic locations of the gateways associated with the private network relative to geographic location of the destination device associated with the data connection. Based upon such the monitoring, the first gateway transmits information to the client device relating to establishment of a second tunnel connection or tunnel with a second gateway of the private network. The client device establishes the second tunnel connection with the second gateway and establishes a data connection with the destination device through the second gateway. By establishing the second tunnel connection with the second gateway, the client device utilizes the bandwidth of the public network to exchange data with the destination device, thereby decreasing data transmission costs to the private network and decreasing private network latency.

Embodiments of a peer-to-peer-based content sharing/distribution network (CDN) are described in U.S. Pat. No. 7,783,777 to Pabla et al. entitled: "Peer-to-peer content sharing/distribution networks", which is incorporated in its entirety for all purposes as if fully set forth herein. In the embodiments, some peers are content publishers while other peers are content consumers. When a consumer peer gets content from a content publisher, the consumer peer may become a content publisher that may be accessed by other peers. If a peer desires a particular content, the peer may get the content from a nearby content publisher, saving access to a central server. The more a content is in demand, the more likely it is to be replicated, and hence more likely to be found by consumer peers on nearby content publisher peers. If a content publisher peer does not have all of a requested content, the requesting peer may be redirected to another content publisher peer to obtain the missing content. Embodiments may be implemented in peer-to-peer networks implemented according to a peer-to-peer platform.

A method of discovering a community relay node within a network community is described in U.S. Pat. No. 7,788,378 to Rao et al. entitled: "Apparatus and method for community relay node discovery", which is incorporated in its entirety for all purposes as if fully set forth herein. In the method, the community relay node is operatively coupled to an access-protected client and adapted to facilitate communication between the access-protected client and a requesting client, includes receiving a request message from a requesting client relating to a request for a community relay node, associating the request message with a serverless name resolution protocol name, selecting a community relay node from among a list of community relay nodes based on the serverless name resolution protocol name, wherein the list of community relay nodes comprises at least one internet protocol address associated with a community relay node, and returning an internet protocol address of the selected community relay node to the requesting client.

A method for reconstructing torrent content metadata, i.e. a torrent identifier, a segment length and an amount of segments of a torrent content file, without access to the torrent content metafile, is described in U.S. Pat. No. 8,719,430 to Van Ackere et al. entitled: "Method and device for reconstructing torrent content metadata", which is incorporated in its entirety for all purposes as if fully set forth herein. The method comprises the steps of: A. obtaining the torrent content identifier from torrent signaling from a client; B. obtaining a torrent content file size from the torrent signaling from the client; C. obtaining a tracker address from the torrent signaling from the client: D. obtaining a peer address from a tracker; E. contacting a peer via the peer address; F. downloading sequential minimum size blocks of a full size segment from the peer in order to determine the segment length; G. calculating the amount of segments from the torrent content file size and the segment length.

A peer-to-peer communication system, in which a peer communicating with a tracker node on a local torrent can locate and download files that are not currently available from other peers communicating on the local torrent, is described in U.S. Pat. No. 8,838,811 to Chen et al. entitled: "Method and system for scalable content storage and delivery", which is incorporated in its entirety for all purposes as if fully set forth herein. To enable this, the tracker node maintains collaboration information for a list of files. The collaboration information includes, for each file, a list of locations at which a full copy of the file may be located. The list of locations may include active peers, dormant peers and remote tracker nodes. The collaboration information may be obtained from each peer when it joins a local torrent. Upon joining the torrent, the peer may provide the local tracker node with a list of files that it is willing to serve.

Methods and systems for providing items of content over a peer-to-peer system are described in U.S. Pat. No. 8,639,630 to Fomenko et al. entitled: "Distribution of digital content", which is incorporated in its entirety for all purposes as if fully set forth herein. Items of content are requested from a central server by a downloading peer, and the central server determines uploading peers from whom the downloading peer may request parts of the content item.

A server application that is interconnected with a number of client/peer terminals, as part of an IMS network, is described in U.S. Patent Application Publication No. 2008/0109446 to Wang entitled: "Peer-to-peer file download system for IMS network", which is incorporated in its entirety for all purposes as if fully set forth herein. For peer-to-peer transfer of a selected data file, a client terminal establishes and accesses a secure account on the server application. From the server application, the client terminal obtains the network locations of one or more peer terminals having sections/pieces of the data file stored thereon. The client terminal contacts the peer terminals for obtaining the data file sections there from over the IMS network. The client terminal and/or peer terminals transmit accounting data to the server application through secure accounts. The accounting data relates to the amount of data transferred and/or to the data transfer rate, and may be used for billing purposes A method for directing a client to a content server containing desired content by providing the client with an address shared by a plurality of content servers, each of which has a copy of the desired content, is described in U.S. Patent Application Publication No. 2002/0091760 to Rozen entitled: "Distributed selection of a content server", which is incorporated in its entirety for all purposes as if fully set forth herein. The client is then served from an optimal, or closest available content server selected from the plurality of content servers. This optimal content server is selected on the basis of an optimal path from the client to the shared address.

A computer program product includes instructions that when executed by a processor perform a method for providing content in a network is described in U.S. Patent Application Publication No. 2009/0248793 to Jacobsson et al. entitled: "Providing Content In a Network", which is incorporated in its entirety for all purposes as if fully set forth herein. The method includes receiving an identifier that is forwarded from a device in a network and associated with content divided into content portions that are to be delivered to the device. The method includes selecting a content source in the network for each of the respective content portions, wherein for at least one of the content portions the content source is selected among multiple content sources associated with the respective content portion using recorded information about the multiple content sources. The method includes forwarding, in response to the identifier, source information to the device that identifies each selected content source and is configured for use by the device in requesting at least one of the multiple content portions from each selected content source.

Methods and apparatus for cooperative file distribution system employing one or more storage proxies to allow an offline receiver to obtain files or pieces thereof when the receiver comes online are provided in U.S. Patent Application Publication No. 2006/0224687 to Popkin et al. entitled: "Method and apparatus for offline cooperative file distribution using cache nodes", which is incorporated in its entirety for all purposes as if fully set forth herein. A central tracker receives an indication from the sender that the sender has the file; determines if the receiver is online; and initiates a storage of the file on one or more storage proxies if the receiver is not online. A proxy service can identify one or more potential storage proxies that can store the file and that each satisfy one or more predefined resource criteria. The sender can send a request to one or more of the storage proxies from the list of storage proxies to act as a storage proxy for the communication between the sender and the receiver. The potential storage proxies compare one or more resource measures to predefined criteria; and provide an acceptance if the one or more resource measures satisfy the predefined criteria.

Computer-based methods and apparatuses, including computer program products, for policy-based content insertion are described in U.S. Patent Application Publication No. 2009/0182843 to Hluchyj et al. entitled: "Policy-Based Content Insertion", which is incorporated in its entirety for all purposes as if fully set forth herein. A client device transmits to a content server a request for the delivery of content. The content server modifies the request based on an ingress policy. The content server transmits the modified request to a second server where the second server processes the request. The second server transmits a reply to the modified request to the content server. The reply includes a content insertion instruction. The content server transmits the content to the client device based on the content insertion instruction and/or one or more egress policies.

A system and method for efficient and private peer-to-peer file sharing consists of ascribing a uniquely identified and anonymous link (an "edgelink") to any file or set of files on a peer computer, are described in U.S. Patent Application Publication No. 2011/0035503 to Zaid et al. entitled: "System and Method for Anonymous Addressing of Content on Network Peers and for Private Peer-to-Peer File Sharing", which is incorporated in its entirety for all purposes as if fully set forth herein. The link is registered with a publishing server along with continuously updated connectivity information about the peer without registering any identifying information about the file. A peer recipient is able to access the link, receive connectivity information about the publishing peer from the server, and then receive the file from the publishing peer without file content passing through the server, mediating any intermediary NAT devices without requiring any manual or automatic device reconfiguration.

A method, system and corresponding device for load balancing are described in U.S. Patent Application Publication No. 2013/0007253 to Li et al. entitled: "Method, system and corresponding device for load balancing", which is incorporated in its entirety for all purposes as if fully set forth herein. The present invention involves in a computer application, and solves the technical problems due to the introduction of more mechanism in the prior art. The method of the present invention mainly includes acquiring by a peer address information of at least one SN from a BSSN, both the BSSN and SN belong to an overlay network; if the peer is a server, saving by the server the address information and reporting by the server server information to a SN corresponding to one of the address information, and spreading by the SN the server information to other SNs; if the peer is a client, saving by the client the address information and acquiring by the client the server information from a SN corresponding to the one of the address information and saving the server information.

Techniques for obtaining and providing a portion of content include receiving a request for the portion of the content, requesting and receiving one or more data chunks, processing the one or more data chunks, and providing one or more data blocks as the requested portion of the content, are described in U.S. Patent Application Publication No. 2013/0064370 to Gouge et al. entitled: "Distribution of portions of content", which is incorporated in its entirety for all purposes as if fully set forth herein. The processing may include validating, decrypting, and/or decompressing the one or more data chunks to create the one or more data blocks. Techniques for providing metadata and one or more data chunks may include receiving content and dividing the content into data blocks. Processing may then be performed on the data blocks to create data chunks, and the metadata may be generated from the processing. The metadata and one or more of the data chunks may be provided to a device.

A method, a device, a server and a system of/for peer to peer transfer of content are described in U.S. Pat. No. 7,574,515 to Fontijn et al. entitled: "Peer to peer transfer of content", which is incorporated in its entirety for all purposes as if fully set forth herein. the method includes the steps of receiving and transmitting, from a first device (11), a first request with a first selection criterion for a first content to a server (18) or to a second device (12); transferring the first content satisfying the first selection criterion to the first device from the server, when the server previously has acknowledged the first device as a legal recipient of the first content and in case the first content is available only on the server, and noting that the first device subsequently has the requested first content available for other devices (14, 15, 16, 17); or re-directing the first request to a third device (13) on which the server knows that the requested first content is still available and transferring the first content satisfying the first selection criterion to the first device from the third device; or transferring the first content satisfying the first selection criterion to the first device from the second device, when the first content is available on the second device, and informing the server that the first content has been transferred to the first device from the second device; and rewarding the one of the second or third device from which the first content was transferred to the first device, when content was transferred from one of these; and charging the first device for reception of the first content. This enables for download, upload and sharing of legally protected paid-for content.

A method for providing content to a remotely located electronic device is described in U.S. Patent Application Publication No. 2007/0142036 to Wikman et al. entitled: "Provision of content in mobile environments", which is incorporated in its entirety for all purposes as if fully set forth herein. The device may be connectable to the Internet, and may be accessing content on a device (e.g. an Internet server) located near a mobile intermediate device by using the mobile intermediate device (another Internet server) as a "through conduit". The intermediate device detects other devices in its proximity, lists the detected devices, detects a request to access at least one of the listed Internet servers, and forwards the access request to the listed Internet servers to be accessed. The remote device does not need to know the original content address.

Communicating in a peer-to-peer computer environment is described in U.S. Patent Application Publication No. 2011/0066924 to DORSO et al. entitled: "Communicating in a computer environment", which is incorporated in its entirety for all purposes as if fully set forth herein. A tracker peer is contacted and a list of peer nodes are obtained at a user device. A subset of peer nodes are selected from the list of peer nodes to act as relay nodes for a communication. An appropriate compression scheme is selected for the communication at the user device. Data is transmitted to at least one relay node for the at least one relay node to forward to at least one other user device, wherein the relay node is one of the subset of the peer nodes. Data is received at the user device from the at least one relay node forwarded from the at least one other user.

Dynamic Adaptive Streaming over HTTP (DASH) is intended to support a media-streaming model for delivery of media content in which control lies exclusively with the client. Clients may request data using the HTTP protocol from standard web servers that have no DASH-specific capabilities. Consequently, this standard focuses not on client or server procedures but on the data formats used to provide a DASH Media Presentation. ISO/IEC 23009-1: 2012(E), MPEG-DASH standard, Jan. 5, 2012, entitled: "*Information technology—Dynamic adaptive streaming over* 1111*P* (*DASH*)—*Part* 1*: Media presentation description and segment formats*", which is incorporated in its entirety for all purposes as if fully set forth herein, primarily specifies formats for the Media Presentation Description and Segments for dynamic adaptive streaming delivery of MPEG media over HTTP, and is applicable to streaming services over the Internet.

Standard terminology and the taxonomy of web replication and caching infrastructure as deployed is disclosed in IETF RFC 3040 entitled: "*Internet Web Replication and Caching Taxonomy*" to Cooper et al. (January 2001), which is incorporated in its entirety for all purposes as if fully set forth herein. IETF RFC 3040 introduces standard concepts, and protocols used today within this application domain. Currently deployed solutions employing these technologies are presented to establish a standard taxonomy. This document presents open protocols and points to published material for each protocol.

An address of an information object repository that should service a client request for an information object and is returned in response to a request therefor is described in U.S. Pat. No. 7,162,539 to Garcia-Luna-Aceves et al. entitled: "System and method for discovering information objects and information object repositories in computer networks", which is incorporated in its entirety for all purposes as if fully set forth herein. The address of the information object repository that is returned is selected according to specified performance metrics regardless of whether or not the information object repository maintains a local copy of the information object that is the client request. In some cases, the address of the information object repository is further selected according to an address of a client making the client request. Further, the address of the information object repository is selected from a number of addresses of information object repositories. The specified performance metrics may include one or more of an average delay from the information object repository to the client, average processing delays at the information object repository, reliability of a path from the information object repository to the client, available bandwidth in the path, and loads on the information object repository. In some cases, the information object repository may be instructed to obtain a copy of the information object after the address of the information object repository is returned in response to the request therefore.

A method and system for accelerating downloading and displaying of content in web pages in a peer-to-peer network is described in U.S. Patent Application Publication No. 2006/0212584 to Yu et al. entitled: "Method and system for accelerating downloading of web page content by a peer-to-peer network", which is incorporated in its entirety for all purposes as if fully set forth herein. A peer-to-peer network client captures a download request from a web browser, and submits a query that includes an identifier of the file to an indexing server. The peer-to-peer network client receives a peer list including connectivity information of a peer node that has stored at least a portion of the file content. The peer-to-peer network client then connects with the peer node, and downloads the portion from the peer node. The peer-to-peer client conveys the downloaded portion to the web browser.

A system and a method for automatically collecting content, is described in U.S. Patent Application Publication No. 2015/0206176 to Toval et al. entitled: "Behavioral content discovery", which is incorporated in its entirety for all purposes as if fully set forth herein. The method comprising the steps of: defining a plurality of content sites, creating a collection of virtual agents data, including user characteristic data and user behavioral data, presenting the collection of virtual agents to the plurality of content sites; receiving content from the visited internet site; and storing the received content or presenting it to a user.

A method and a system for monitoring an advertisement presented within a mobile application is described in U.S. Patent Application Publication No. 2017/0221092 to Toval et al. entitled: "System and a method for surveying advertisements in mobile applications", which is incorporated in its entirety for all purposes as if fully set forth herein. The method including tracing in real-dine executable code of the mobile application that processes an advertisement, Where this traced process of advertisement performs: negotiating advertisement display, communicating an advertisement, and displaying an advertisement. The system then detects within the process of advertisement an advertisement processed by the executable code. The system then records the advertisement as displayed, and parameters associated with the advertisement.

Facilitating browser access to cached content available from a peer to peer network is described in U.S. Patent Application Publication No. 2013/0191456 to Ting et al. entitled: "Peer to peer browser content caching", which is incorporated in its entirety for all purposes as if fully set forth herein. The facilitating comprises receiving a request for content from a content server, receiving from the content server content metadata indicating that the requested content is available from at least one alternative user computing device via a peer to peer network, instantiating on the user computing device a browser helper application which facilitates access to the peer to peer network, and receiving from the content server a lookup table comprising a list of alternative user computing devices from which the requested content is available. The lookup table can be parsed to select an alternative user computing device from which the content, or portions thereof, is requested. The received content can then be stored for later use or presented to the user via the browser.

A method and apparatus for peer-to-peer services are described in U.S. Pat. No. 7,440,994 to Harrow et al. entitled: "Method and apparatus for peer-to-peer services to shift network traffic to allow for an efficient transfer of information between devices via prioritized list", which is incorporated in its entirety for all purposes as if fully set forth herein.

A method and apparatus for peer-to-peer services are described in U.S. Pat. No. 7,562,112 to Harrow et al. entitled: "Method and apparatus for peer-to-peer services for efficient transfer of information between networks", which is incorporated in its entirety for all purposes as if fully set forth herein. In one embodiment, a request for data is received from a first local device. A determination of a second local device having the data is made. The first local device is directed to the second local device to directly obtain the data from the second local device. A direct transfer of the data from the second local device to the first local device is performed.

In consideration of the foregoing, it would be an advancement in the art to provide an improved functionality method and system that is simple, secure, anonymous, cost-effective, load balanced, redundant, optimized, reliable, provide lower CPU and/or memory usage, enable pipelining of requests and responses, reduce network congestion, easy to use, reduce latency, faster, has a minimum part count, minimum hardware, and/or uses existing and available components, protocols, programs and applications, for providing better quality of service, overload avoidance, better or optimal resources allocation and using, better communication and additional functionalities, and provides a better user experience, in particular when fetching content by a client device from a web server over the Internet.

SUMMARY

Any server herein may consist of, may include, may be part of, or may be integrated with, a proxy server. Any proxy server herein may consist of, may include, may be part of, or may be integrated with, an HTTP proxy server, a web-proxy server, a caching proxy, an open-source caching proxy server, a cloud-based proxy server, an open proxy server, a forwarding proxy server, a reverse proxy server, a transparent proxy server, a non-transparent proxy server, an anonymous proxy server, a translation proxy server, a SOCKS proxy server, a CGI web proxy server, a suffix proxy server, an I2P anonymous proxy server, a DNS proxy server, or any combination thereof.

Any method herein may be used for overcoming blocking, such as where a direct fetching scheme may fail is due to geoblocking, Internet censorship, Man-In-The-Middle (MITM) attack, or firewalling. Any method herein may be used with a non-direct fetching scheme by a web browser in a client device, and may further be used for use with a list of URLs, and may comprise: executing the web browser; identifying or intercepting a URL request for a content from a web server by the web browser; checking whether the identified URL in included in the list; responsive to the determining that the identified URL is not included in the list, fetching, using a direct fetching scheme, the URL request; and fetching, using the non-direct fetching scheme, the URL request; checking the response of the direct fetching scheme; responsive to the determining that a proper response is received by the direct fetching scheme, using the received content in the response by the web browser; responsive to the determining that the direct fetching scheme failed, checking the response of the non-direct fetching scheme; and responsive to the determining that a proper response is received by the non-direct fetching scheme, using the received content in the response by the web browser, and adding the URL to the list.

Any method herein may further comprise notifying the user in response to the determining that a proper response is received by the non-direct fetching scheme. Alternatively or in addition, any method herein may further comprise in response to the determining that the non-direct fetching scheme failed. Alternatively or in addition, any method herein may further comprise fetching, using the non-direct fetching scheme, the URL request, in response to the determining that the identified URL in included in the list. The list may be stored in the client device or in a server, and the method may further comprise sending the identified URL to the server, and may further comprise receiving the list from the server. In any method herein the fetching using the non-direct fetching scheme and the fetching using the direct fetching scheme may be performed sequentially, in parallel, or any combination thereof. Any parallel operation herein may be based on, or may use, multitasking or multiprocessing.

Any checking herein, such as the checking or a response to a URL or HTTP request, may comprise identifying or checking a HTTP status code that may be received in response to the fetching of the URL request. Any response herein may be determined as a proper response responsive to a status code of 2xx. Further, any response herein may be determined as failed or improper response responsive to a status code of 4xx or 5xx, such as responsive to a status code of HTTP 404 error message. Alternatively or in addition, any checking herein, such as the checking or a response to a URL or HTTP request, may comprise using a timeout mechanism, and any response may be determined as failed or improper response in response to not receiving a proper response after elapsed defined time period after an initiation of the fetching. Alternatively or in addition, any checking herein, such as the checking or a response to a URL or HTTP request, may comprise checking if an URL redirection is identified, and any response herein may be determined as failed or improper response in response to detecting the URL redirection, such as by checking that the HTTP status code is 3xx Redirection.

Alternatively or in addition, any checking herein, such as the checking or a response to a URL or HTTP request, may be used with a criterion, and any checking of the response may comprise verifying if the content received satisfy the criterion. Any criterion herein may relate to a feature, characteristic, or type, of the received content. Further, any criterion herein may comprises value, and any response herein may be determined as failed or improper response in response to comparing the content feature, characteristic, or type, to the value. Further, any criterion herein may comprise a value of a size of a file, and any response herein may be determined as failed or improper response in response to comparing the received content size to the value.

Any web server herein and any client device herein may be located in different geographical locations, such as two continents, two countries, two states, two regions, two cities, two streets, two ZIP codes, or two timezones. Any non-direct fetching scheme herein may use an intermediate device that may be located in the same location as the client device. Alternatively or in addition, any non-direct fetching scheme herein may use an intermediate device that may be located in the same location as the web server. Alternatively or in addition, any non-direct fetching scheme herein may use an intermediate device that may be located in a location that is different from the web server and the client device geographical locations. Any method herein may further comprise using geolocation for identifying the location of the client device or the web server, and the geolocation may be based on IP geolocation or may be based on W3C Geolocation Application Programming Interface (API).

Any direct fetching scheme herein may consist of, or may comprise: sending, by the client device, an HTTP request that includes an IP address of the client device, that is responsive to the URL to the web server; receiving, by the web server, the HTTP request from the client device; sending, by the web server, a web-page or a web-site, in response to the received HTTP request; and receiving, by the client device, the web-page or the web-site. Any HTTP request herein sent by the client device may be received unchanged by the web server so that the IP address of the client device may be known to the web server.

Any non-direct fetching scheme herein may consist of, or may comprise: sending, by the client device, an HTTP request that is responsive to the URL; receiving, by the web server, the HTTP request that includes an IP address that is distinct from the IP address of the client device; sending, by the web server, a web-page or a web-site, in response to the received HTTP request; and receiving, by the client device, the web-page or the web-site. Any HTTP request herein received by the web server may not include the IP address of the client device so that the IP address of the client device may be unknown to the web server. Any method herein may be used with a first device that may serve as an intermediary device, and any non-direct fetching scheme herein may consist of, or may comprise: sending, by the client device, the HTTP request that is responsive to the URL; sending, by the first device, the HTTP request to the web server; sending, by the web server to the first device, the web-page or the web-site, in response to the received HTTP request; and receiving, by the client device, the web-page or the web-site.

Any method herein may be used with a group of multiple devices that may comprise the first device, and any method herein may further comprise selecting the first device from the group. Any selection herein may be based on, or may use, load balancing, or alternatively or in addition may be based on, or may use, random selection. Any random selection herein may use, or may be based on, one or more random numbers generated by a random number generator, and the random number generator may be hardware based, software based, or any combination thereof. Any random number generator herein may be using thermal noise, shot noise, nuclear decaying radiation, photoelectric effect, or quantum phenomena. Alternatively or in addition, any random number generator herein may be based on executing an algorithm for generating pseudo-random numbers.

Any selection herein may be based on, or may use, an estimated geographical location of the client device or of the web server. Any method herein may further comprise estimating the geographical location of the client device, of the web server, or both, using geolocation. Any geolocation herein may be based on IP geolocation, which may be based on W3C Geolocation Application Programming Interface (API). Any selected device herein, such as the first device, may be selected based on estimated as being in the same area as the client device or the web server. Any selected device herein, such as the first device, may be selected based on estimated as being in the same continent, country, state, region, city, postal/zip code, latitude, longitude, or Timezone as the client device or the web server.

Any selected device herein, such as the first device, may be selected based on being the recent one to be selected, or based on being the least recent to be selected. Alternatively or in addition, any selected device herein, such as the first device, may be manually selected by the user, and any method herein may further comprise displaying to the user the multiple devices in the group, and selecting, by the user, the first device from the group.

Any device herein, such as the first device, may consist of, may comprise, may be part of, or may be integrated with, a server device, which may consist of, may comprise, may be part of, or may be integrated with, a proxy server. Any proxy server may consist of, may comprise, may be part of, or may be integrated with, an HTTP proxy server, a web-proxy server, a caching proxy, an open-source caching proxy server, a cloud-based proxy server, an open proxy server, a forwarding proxy server, a reverse proxy server, a transparent proxy server, a non-transparent proxy server, an anonymous proxy server, a translation proxy server, a SOCKS proxy server, a CGI web proxy server, a suffix proxy server, an I2P anonymous proxy server, a DNS proxy server, or any combination thereof.

Any method herein may be used with a list of IP addresses, any method herein may further comprise selecting an IP address from the list, and the sending, by any device such as the first device, of any HTTP request to the web server may include the selected IP address as the source address. The selected IP address may be the IP address of the first device. Any method herein may be used with multiple client devices, each may be associated with a distinct IP address from the list, and any selected IP address may be the IP address of the first device. Alternatively or in addition, any method herein may be used with multiple server devices, each may be associated with a distinct IP address from the list, and any selected IP address may be the IP address of the first device.

Any selection herein of any IP address from any list may be based on, or may use, load balancing. Further, any selection herein of any IP address from any list may be based on, or may use, random selection. Any random selection herein may use, or may be based on, one or more random numbers generated by a random number generator, and the random number generator may be hardware based, software based, or any combination thereof. Any random number generator herein may be using thermal noise, shot noise, nuclear decaying radiation, photoelectric effect, or quantum phenomena. Alternatively or in addition, any random number generator herein may be based on executing an algorithm for generating pseudo-random numbers.

Any IP address may be selected based on estimated as being in the same area as the client device, the web server, or both. Any IP address may be selected based on estimated as being in the same continent, country, state, region, city, postal/zip code, latitude, longitude, or Timezone as the client device or the web server. Alternatively or in addition, any IP address may be selected based on being the recent one to be selected, or based on being the least recent to be selected. Alternatively or in addition, any IP address may be manually selected by the user, and any method herein may further comprise displaying to the user the multiple IP addresses, and selecting, by the user, the selected IP address from the group.

Any method herein may be used with a virtualization, and any device herein, such as the first device may consist of, may comprise, may be part of, or may be integrated with, a server device that may virtualize a client device addressed by the selected IP address.

Any client device virtualization herein may be executed as part of a Virtual Machine (VM). Any method herein may be used with a host computer that implement the VM, and any method herein may further comprise executing, by the host computer, a hypervisor or a Virtual Machine Monitor (VMM). Any virtualization herein may include, may be based on, or may use, full virtualization, para-virtualization, or hardware assisted virtualization.

Any method herein may be performed by a client device and may use a Proxy Auto-Configuration (PAC) that is managed by a PAC file manager associated with a web browser, the PAC file associates each URL out of a first list of Uniform Resource Locators (URLs) to a respective first or second fetching scheme. Further, any method herein may be used with a second file that associates each URL out of a second list of URLs respectively to the first or second fetching scheme. A method may comprise executing the web browser; identifying a first URL request by the web browser; checking if the first URL is included in the second list; responsive to determining that the first URL is included in the second list, inhibiting the first URL request to be received by the PAC file manager; identifying the fetching scheme associated with the first URL in the second file; updating the PAC file with the first URL and associating the first URL with the identified fetching scheme in the second file; enabling the first URL request to be received by the PAC file manager; receiving, by the PAC file manager, the first URL; sending, to the web browser, the fetching scheme associated with the first URL in the PAC file; and fetching, by the web browser, the first URL using the fetching scheme associated with the first URL in the PAC file. Any method herein may further comprise responsive to determining that the first URL is not included in the second list, receiving, by the PAC file manager, the first URL; sending, to the web browser, the fetching scheme associated with the first URL in the PAC file; and fetching, by the web browser, the first URL using the fetching scheme associated with the first URL in the PAC file.

Any PAC file herein may comprise a JavaScript script function [FindProxyForURL(url, host)], and any method herein may comprise configuring the PAC file manually, or automatically configuring the PAC file using Web Proxy Autodiscovery Protocol (WPAD). Any updating herein may comprise automatically configuring the PAC file_using Web Proxy Autodiscovery Protocol (WPAD). Any PAC file or any file, such as the second file, may be stored in the client device or in a server device. Any method herein may further comprise receiving, by the client device, the PAC file or the second file over the Internet from the server. Any fetching scheme herein, such as the first fetching scheme, may consist of, or may comprise, direct fetching. Alternatively or in addition, any fetching scheme herein, such as the second fetching scheme, may consist of, or may comprise, non-direct fetching that may use a proxy server, and any identification of the proxy server may be associated with the respective URL as part of the PAC file or the second file.

Any identification of any content or URL request herein may be intercepted and routed to be handled as part of the 'client' application or process. Such interception may be in the form of a filter driver (or any other intermediate driver), enabling the interception as part of the OS kernel. Alternatively or in addition, the interception may be in the form of extension or a plug-in of the requesting application, such as a browser plug-in or a browser extension in the case where the application is a web browser. Alternatively or in addition, the interception of the request may use hooking of the requesting application, or of the communication-related application. Alternatively or in addition, the application and the steps described herein may communicate using an Inter-Process Communication (IPC), such as a file sharing, a signal, a socket, a pipe, a message queue, a shared memory, a semaphore, or memory mapped file. In Windows environment, the IPC may be based on a clipboard, a Component Object Model (COM), data copy, a DDE protocol, or mailslots.

Any method herein may be used for Uniform Resource Locators (URLs) content fetching by a web browser in a first client device that may utilize a fetching resource for the URLs content fetching. Any method herein may be used with a first file that may associate an amount responsive to the past utilization of the resource for each URL by the first client device. Further, any method herein may be used with a second file that associates a maximum threshold for each URL. Any method herein may comprise identifying a first URL request by the web browser; identifying, by using the second file, the maximum threshold associated with the first URL; identifying, by using the first file, the amount associated with the first URL; checking if the identified amount is lower than the identified maximum threshold; responsive to determining that the identified amount is lower than the identified maximum threshold, utilizing the resource for fetching the URL; responsive to utilizing the resource, measuring the amount of the resource used in the fetching of the first URL; and updating the first file by adding the amount measured to the amount associated with the first URL. The method may be further followed by repeating the steps for a second URL or for multiple distinct URLs.

Any fetching resource herein may consist of, may comprise, or may be responsive to, the amount of data received from the web server identified by the URL. At least one of, or all of, the maximum thresholds in the second file, may be equal to, or may be than, 0.1, 0.2, 0.3, 0.5, 0.8, 1, 2, 3, 4, 5, 8, 10, 20, 30, 50, 80, 100, 120, 150, 200, 300, 500, 1,000, 2,000, 3,000, 5,000, 10,000, 20,000, 30,000, 50,000, 100, 000 GB, or unlimited. Further, at least one of, or all of, the maximum thresholds in the second file may be more than 0.05, 0.1, 0.2, 0.3, 0.5, 0.8, 1, 2, 3, 4, 5, 8, 10, 20, 30, 50, 80, 100, 120, 150, 200, 300, 500, 1,000, 2,000, 3,000, 5,000, 10,000, 20,000, 30,000, 50,000, or 100,000 GigaByte (GB).

Any fetching resource herein may consist of, may comprise, or may be responsive to, the time duration of data receiving from the web server identified by the URL. At least one of, or all of, the maximum thresholds in the second file, may be equal to, or may be less than, 2 minutes, 5 minutes, 10 minutes, 20 minutes, 30 minutes, an hour, a day, a week, a month, two months, a quarter (3 month), a year, or unlimited. Further, at least one of, or all of, the maximum thresholds in the second file, may be more than 1 minute, 2 minutes, 5 minutes, 10 minutes, 20 minutes, 30 minutes, an hour, a day, a week, a month, two months, a quarter (3 month), or a year.

Any method herein may be used with an additional resource, and may be used with a third file that may associate an amount responsive to the past utilization of the additional resource for each URL by the first client device, and may be used with a fourth file that may associate a maximum threshold for each URL relating to the additional resource. Any method herein may further comprise identifying, by using the third file, the additional maximum threshold associated with the first URL; identifying, by using the fourth file, the additional amount associated with the first URL; and checking if the identified additional amount is lower than the identified additional maximum threshold. The utilizing the resource for fetching the URL may be further responsive to determining that the identified additional amount is lower than the identified additional maximum threshold.

The first file or the second file may be stored in the client device, or may be stored in a server. Any method herein may further comprise sending part of, or all of, the first or second file to the client device. Any fetching herein may be a non-direct fetching that utilizes a non-direct fetching service, and the method, the first or second files may be used for monitoring, billing, or accounting.

Any method herein may further comprise responsive to determining that the identified amount is equal to, or higher than, the identified maximum threshold, notifying a user of the client device, or displaying a notification to the user. Any method herein may be used with a third file that associates a time period for each URL, and any method herein may further comprise zeroing the amounts in the first file upon lapsing of the time period. Any period herein may be equal to, or less than, 2 minutes, 5 minutes, 10 minutes, 20 minutes, 30 minutes, an hour, a day, a week, a month, two months, a quarter (3 month), a year, or unlimited. Further, any period herein may be higher than 1 minute, 2 minutes, 5 minutes, 10 minutes, 20 minutes, 30 minutes, an hour, a day, a week, a month, two months, a quarter (3 month), or a year.

Any method herein may be used for selecting and using an intermediate device for a non-direct fetching by a web browser in a client device. Further, any method herein may be used with a file that associates a value to multiple sets of first and second geographical locations. Any method herein may comprise, by the client device, executing the web browser; identifying a URL request by the web browser; identifying, using geolocation, the geographical location of the web server identified by the URL; selecting a location by a user or automatically without any user intervention; increasing by 1 the value associated in the file with the web server location and the selected location; and fetching the URL request using an intermediate device in the selected location.

The selecting may be by the user, and the method may further comprise displaying, to the user, multiple locations, and the selecting may be from the displayed multiple locations. Further, the displayed multiple location may comprise the locations having largest associated values among the sets that may include the web server location and the displayed locations. The number of displayed locations may be equal to, or more than, 1, 2, 3, 4, 5, 7, 10, 12, 15, or 20. Alternatively or in addition, the selecting may be performed automatically without any user intervention.

The file may be stored in the client device. Alternatively or in addition, the file may be stored in any server, and wherein the method may further comprise receiving, by the client device, the file from the server. Any location herein may be a continent, a country, a state, a region, a city, a street, a ZIP code, or a timezone. Any geolocation herein may be based on IP geolocation, such as based on W3C Geolocation Application Programming Interface (API).

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method for selecting and using an intermediate device for a non-direct fetching by a web browser in a client device, for use with a file that associates a value to multiple sets of first and second geographical locations, the method by the client device including: executing the web browser. The method also includes identifying a URL request by the web browser. The method also includes identifying, using geolocation, the geographical location of the web server identified by the URL. The method also includes selecting a location by a user or automatically without any user intervention. The method also includes increasing by 1 the value associated in the file with the combination of the web server location and the selected location. The method also includes fetching the URL request using an intermediate device in the selected location. Other embodiments of this aspect include corresponding computer systems, apparatus, and computer programs recorded on one or more computer storage devices, each configured to perform the actions of the methods.

Implementations may include one or more of the following features. The method according where the selecting is by the user. The method according where the geolocation is based on IP geolocation. The method according where the non-direct fetching scheme includes: sending, by the client device, an http request that is responsive to the URL. The method may also include receiving, by the web server, the http request that includes an IP address that is distinct from the IP address of the client device. The method may also include sending, by the web server, a web-page or a web-site, in response to the received http request. The method may also include receiving, by the client device, the web-page or the web-site. The method may also include where the http request received by the web server does not include the IP address of the client device so that the IP address of the client device is unknown to the web server. The method according further including storing, operating, or using, by the client device, a client operating system. The method according further including storing, operating, or using, by the client device, the web browser. The method according where the client device, includes, is integrated with, or is part of, a wearable device that is wearable on a person. The method according where at least one of the steps is performed integrated with the web browser in a form of a plug-in or an extension. The method according where the client device is integrated in part or entirely in an appliance. The method according where the client device is housed in a single enclosure that is a hand-held enclosure or a portable enclosure. The method according further including storing, operating, or using an operating system, by at least one of the tunnel devices in the group, or the selected tunnel device. The method according where the URL identifies a web-page, a web-site, or a part thereof. The method according where at least part of steps are included in a Software Development Kit (SDK) that is provided as a non-transitory computer readable medium containing computer instructions, and where the method further including installing the SDK. Implementations of the described techniques may include hardware, a method or process, or computer software on a computer-accessible medium.

A method may be used for fetching a content identified by a content identifier to a client device from a web server by using tunnel devices. The method may be used with a first and second servers and a group of tunnel devices that are each connected to the Internet and are each addressable in the Internet using a respective IP address, and the first server may store a list of the IP addresses associated with the tunnel devices in the group. The method may comprise sending, by the client device to the second server, a request message that comprises the content identifier; receiving, by the second server from the client device, the request message; sending, by the second server to the first server, a first message; receiving, by the first server from the second server, the first message; selecting, by the first server, an IP address associated with a tunnel device from the list of tunnel devices, in response to the received first message; sending, by the first server to the selected tunnel device, a second message using an IP address of the selected first tunnel device; receiving, by the selected tunnel device from the first server, the second message; sending, by the selected tunnel device to the web server, a content request that comprises the content identifier; receiving, by the selected tunnel device from the web server, the content, in response to the content request; sending, by the selected tunnel device to the second server, the content; receiving, by the second server from the selected tunnel device, the content; sending, by the second server to the client device, the content; and receiving, by the client device from the second server, the content in response to the request message.

Any attribute type herein may comprise a geographical location, and any value herein may comprise a name or an identifier of a continent, a country, a region, a city, a street, a ZIP code, or a timezone. Alternatively or in addition, any attribute type herein may comprise an Internet Service Provider (ISP) or Autonomous System Number (ASN), and any value herein may respectively comprise a name or an identifier of the ISP or the ASN number. Alternatively or in addition, any attribute type herein may correspond to a hardware of software of tunnel devices. Alternatively or in addition, any attribute type herein may correspond to a communication property, type, or feature of a communication link of any device, such as any tunnel devices. Alternatively or in addition, any attribute type herein may correspond to an operating system of any device, such as the tunnel devices. Alternatively or in addition, any attribute type herein may correspond to a RTT of the tunnel devices. Alternatively or in addition, any attribute type herein may correspond to a content type, and any value of the content type may comprise a video data, audio data, and no multimedia web-page. Any method herein may be used with multiple web servers, and any attribute type may correspond to a web server from the multiple web servers, and the values comprise an identifier of the web server, and any identifier herein may comprise an IP address of the web server, a domain name, a website name, or a URL.

Any selecting herein of any IP address from any list may comprise selecting a list from the multiple distinct lists; and selecting an IP address from the selected list. Any selecting of any IP address from any selected list may be based on load balancing, and may be based on, or may be using, random, quazi-random, or deterministic selection. Alternatively or in addition, any selecting of any list from any multiple distinct lists or any selecting of any IP address from any selected list, may be based on, or may use, random selecting, that may use one or more random numbers generated by a random number generator. Any random number generator herein may be hardware based, and may be using thermal noise, shot noise, nuclear decaying radiation, photoelectric effect, or quantum phenomena. Alternatively or in addition, any random number generator herein may be software based, and may be based on executing an algorithm for generating pseudo-random numbers.

Further, any selecting of any list from any multiple distinct lists or any selecting of any IP address from any selected list may be based on, or may use, Last-In-First-Out (LIFO) or First-In-First-Out (FIFO) scheme. Alternatively or in addition, any selecting herein of any IP address from any selected list may be based on, or may be using, sequential or cyclic selection. Any message herein, such as the first message, may comprise a criterion, and any selecting herein of any list from any multiple distinct lists may be based on, may be using, or may be in response to, the criterion. Any selecting herein of any list from any multiple distinct lists may be based on load balancing. Alternatively or in addition, any selecting herein of any list from any multiple distinct lists may be based on, or may be using, random selection, sequential, or cyclic selection. Any message herein, such as the first message, may comprise a criterion, and any selecting herein of the list from any multiple distinct lists may be based on, may be using, or may be in response to, the criterion.

Any selecting herein of any list from any multiple distinct lists or any selecting herein of any IP address from any selected list may be based on, or may be in response to, a time of an action or an event. Any action herein may comprise an action by any device or apparatus herein, such as any client device, any first server, any second server, any web server, or any selected tunnel device. Any event herein may be an event affecting, or sensed by, any device or apparatus herein, such as any client device, any first server, any second server, any web server, or any selected tunnel device. Any time herein may comprise the time at the respective location of the client device, the first server, the second server, the web server, or the selected tunnel device. Any action herein may comprise any receiving of, or any transmitting of, any message over the Internet, such as sending or receiving by any device or apparatus herein, such as any client device, any first server, any second server, any web server, or any selected tunnel device. Alternatively or in addition, any action herein may comprise any selecting of any list from any multiple distinct lists, or any selecting of any IP address from any selected list.

Any list of the IP addresses herein may comprise, or may consist of, multiple distinct collections, and each collection may comprise one or more lists of any multiple distinct lists. For example, two or more collections may comprise more than 1, 2, 5, 10, 12, 15, 20, 20, 30, 50, 80, 100, 120, 150, 200, 500, 1,000, 2,000, 5,000, or 10,000 lists, or two or more collections may comprise less than 5, 10, 12, 15, 20, 20, 30, 50, 80, 100, 120, 150, 200, 500, 1,000, 2,000, 5,000, 10,000 or 20,000 lists. Further, each one of the collections may comprise more than 1, 2, 5, 10, 12, 15, 20, 20, 30, 50, 80, 100, 120, 150, 200, 500, 1,000, 2,000, 5,000, or 10,000 lists, or less than 5, 10, 12, 15, 20, 20, 30, 50, 80, 100, 120, 150, 200, 500, 1,000, 2,000, 5,000, 10,000 or 20,000 lists.

Any method herein may be used with a first device that may be connected to the Internet and may be addressable in the Internet using a first IP address. The method may further comprise sending, by the first device to the first server, a third message; receiving, by the first server from the first device, the third message; and storing, in the first server, the first IP address in the list, and adding the first device to the group of tunnel devices, so that the first device can be selected as a tunnel device as part of the selecting by the first server. The third message may comprise at least one value relating to at least one attribute type associated with the first device. Any method herein may further comprise storing, in the first server, the at least one value, as associated with the first device or with the first IP address, establishing a connection between the first server and the first device, and the first server may initiate communication with the first device using the established connection. Any connection or any established connection herein may be a TCP connection using 'Active OPEN', 'Passive OPEN', or TCP keepalive mechanism, or may use, or may be based on, a Virtual Private Network (VPN).

Any method herein may further comprise, for each of the tunnel devices in the group, sending, by the tunnel device to the first server, a third message; receiving, by the first server from the tunnel device, the third message; and storing, in the first server, the IP address of the tunnel device in the list, and adding the tunnel device to the group of tunnel devices, so that the tunnel device may be selected as a tunnel device as part of the selecting by the first server. The third message may comprise at least one value relating to at least one attribute type associated with the tunnel device. Any method herein may further comprise, storing, in the first server, the at least one value, as associated with the tunnel device or with the tunnel device IP address. Any method herein may further comprise, establishing a connection between the first server and the tunnel device, and the first server may initiate communication with the tunnel device using the established connection, and the established connection may be a TCP connection using 'Active OPEN', 'Passive OPEN', or TCP keepalive mechanism, or may use, or may be based on, a Virtual Private Network (VPN).

Each of the messages herein, such as the first and second messages, may comprise the content identifier, and the sending by the selected tunnel device to the web server of the content request that comprises the content identifier may be in response to the received second message. The sending, by the selected tunnel device to the second server of the content may comprises sending, by the selected tunnel device to the first server, the content; receiving, by the first server from the selected tunnel device, the content; sending, by the first server to the second server, the content; and receiving, by the second server from the first server, the content.

Any message herein, such as the second message, may comprise the IP address of the second server. In response to the receiving of the second message, any method herein may comprise initiating a communication, by the selected tunnel device with the second server. The initiating of the communication by the selected tunnel device may use, or may be based on, Network Address Translator (NAT) traversal scheme, which may be according to, may be based on, or may use, Internet Engineering Task Force (IETF) Request for Comments (RFC) 2663, IETF RFC 3715, IETF RFC 3947, IETF RFC 5128, IETF RFC 5245, IETF RFC 5389, or IETF RFC 7350. Alternatively or in addition, any NAT traversal scheme herein may be according to, may be based on, or may use, Traversal Using Relays around NAT (TURN), Socket Secure (SOCKS), WebSocket (ws) or WebSocket Secure (wss), NAT 'hole punching', Session Traversal Utilities for NAT (STUN), Interactive Connectivity Establishment, (ICE), UPnP Internet Gateway Device Protocol (IGDP), or Application-Level Gateway (ALG).

In response to the communication initiated by the selected tunnel device, any method herein may further comprise, sending, by the second server to the selected tunnel device, the content identifier, and the sending, by the selected tunnel device to the web server of the content request, may be in response to receiving the content identifier from the second server. Alternatively or in addition, the sending, by the selected tunnel device to the second server of the content may comprise sending, by the selected tunnel device to the second server, the content using the initiated communication.

Any communication over the Internet between the selected tunnel device and the second server, may be based on, may use, or may be compatible with, Transmission Control Protocol over Internet Protocol (TCP/IP) protocol or connection. Any communication over the Internet between the selected tunnel device and the second server, may be based on, may use, or may be compatible with, HTTP or HTTPS protocol or connection, and the second server may serve as an HTTP or HTTPS server respectively and the selected tunnel device may serve as an HTTP or HTTPS client respectively.

Any communication over the Internet between the selected tunnel device and the second server, may be based on, may use, or may be compatible with, Socket Secure (SOCKS) protocol or connection, and the second server may serve as an SOCKS server and the selected tunnel device may serve as an SOCKS client. Any SOCKS protocol or connection herein may be according to, may be based on, or may be compatible with, SOCKS4, SOCKS4a, or SOCKS5. Alternatively or in addition, any SOCKS protocol or connection herein may be according to, may be based on, or may be compatible with, IETF RFC 1928, IETF RFC 1929, IETF RFC 1961, or IETF RFC 3089. Alternatively or in addition, any communication between any two entities herein, such as over the Internet between the selected tunnel device and the second server, may be based on, may use, or may be compatible with, Socket Secure (SOCKS) or WebSocket (ws), which may be WebSocket Secure (wss), protocol or connection, and the second server may serve as an SOCKS or WebSocket server and the selected tunnel device may serve as an WebSocket client. Any WebSocket protocol or connection herein may be according to, may be based on, or may be compatible with, IETF RFC 6455. Any communication over the Internet between the selected tunnel device and the second server, may be based on, may use, or may be compatible with, HTTP Proxy protocol or connection, and the second server may serve as an HTTP Proxy server and the selected tunnel device may serve as an HTTP Proxy client. Any method herein may further comprise establishing a connection between the second server and the selected tunnel device, and the second server may initiate communication with the selected tunnel device using the established connection.

Any method herein may further comprise sending, by the second server to the client device, the IP address of the selected tunnel device; receiving, by the client device from the second server, the IP address of the selected tunnel device; and storing, by the client device, the received IP address of the selected tunnel device. Any method herein may be used with a first IP address stored in the client device, and the request message may comprise the first IP address. The first message may comprise the first IP address, and the selecting, by the first server of the tunnel device from the list of tunnel devices may be based on, or may be in response to, the received first IP address. Any selecting herein by the first server of the tunnel device may comprise selecting a tunnel device having the first IP address.

Any first tunnel device in the group may be operating in multiple states that may include an idle state and non-idle states. Any method herein may further comprise by the first tunnel device responsive to being in one of the non-idle states, determining, if an idling condition is met; responsive to the determination that the idling condition is met, shifting to the idle state; responsive to being in the idle state, determining if an idling condition is met; and responsive to the determination that the idling condition is not met, shifting to one of the non-idle states. The first tunnel device may be selected by the first server in response to the first tunnel device being in the idle state. Any method herein may further comprise receiving, by the first server from the first tunnel device, a message responsive to the first tunnel device state; and the first tunnel device may be selected by the first server in response to the first tunnel device state being the idle state.

Any method herein may further comprise sending, by the first tunnel device to the first server, a first status message in response to shifting to the idle state; and sending, by the first tunnel device to the first server, a second status message in response to shifting to a non-idle state. The first tunnel device may be selected by the first server in response to the first or second status message. Any method herein may further comprise receiving, by the first server from the first tunnel device, the first status message; and adding, the IP address of the first tunnel device to the list of IP addresses in response to received first status message. Any method herein may further comprise receiving, by the first server from the first tunnel device, the second status message; and removing, the IP address of the first tunnel device from the list of IP addresses in response to received second status message. Any method herein may be used with an additional idling condition, and any determining herein may comprise determining if the idling condition and the additional idling condition are met.

Any method herein may further comprise operating, by the first tunnel device, an operating system or a program process or thread, and any idling condition herein may be determined to be met based on, or according to, activating or executing the process or thread by the operating system or the program. The process or thread may comprise a low-priority or background task, an idle process, or a screen-saver. Further, the process or thread may comprise using the entire screen for displaying. Any method herein may further comprise monitoring or metering, by the first tunnel device, a resource utilization, and any idling condition herein may be determined to be met based on, or according to, the monitored or metered resource utilization being under a threshold, and the resource utilization may comprise the utilization of a processor in the first tunnel device. Any tunnel device herein, such as the first tunnel device, may comprise an input device for obtaining an input from a human user or operator, and any the method herein may further comprise sensing the input, by the any tunnel device (or the first tunnel device) using the input device, and any idling condition herein may be determined to be met based on, or according to, not receiving an input from the input device for a pre-set time interval. Any input device herein may comprise a pointing device, a keyboard, a touchscreen, or a microphone.

Any tunnel device herein, such as the first tunnel device, may comprise a motion sensor for sensing motion, acceleration, vibration, or location change of the first tunnel device, and any method herein may further comprise sensing, by any tunnel device (or the first tunnel device) using the motion sensor, the respective first tunnel device motion, acceleration, vibration, or location change, and any idling condition herein may be determined to be met based on, or according to, respectively sensing the motion, the vibration, the acceleration, or the location change being under a threshold. Any the motion sensor herein may comprise an accelerometer, gyroscope, vibration sensor, or a Global Positioning System (GPS) receiver.

Any tunnel device herein, such as the first tunnel device, may comprise a network interface or a network transceiver for communication over a network (such as the Internet), and any method herein may further comprise metering, by any tunnel device (or the first tunnel device), an amount of data transmitted to, or received from, the network during a time interval, and any idling condition herein may be determined to be met based on, or according to, the metered amount of data being under a threshold level. Any tunnel device herein, such as the first tunnel device, may comprise a battery, and any method herein may further comprise metering or sensing, by any tunnel device (or the first tunnel device), a battery charging level, and any idling condition herein may be determined to be met based on, or according to, the metered or sensed charge level being over a threshold level. The metering or sensing may use a Battery Management System (BMS), and the threshold level may be above 40%, 50%, 60%, 70%, 80%, or 90% of the battery defined full charge capacity.

Any method herein may be used with a first attribute type, any or each of the tunnel devices in the group may be associated with a first value relating to the first attribute type, and any method herein may further comprise, storing, by the first server, the first value for associated each of the tunnel devices in the group. Any first value herein may comprise a numeric value or an identifier of a feature, a characteristic, or a property of the first attribute type. Any selecting herein, of a tunnel device by the first server, may be based on the first value associated with the selected tunnel device, and any method herein may further comprise sending, by each of the tunnel devices in the group to the first server, the respective first value to the first server, and receiving, by the first server, the sent first value.

Any message herein, such as the request message and the first message, may comprise one or more values, and any selecting herein, of the tunnel device by the first server, may be based on comparing the one or more values to the first value associated with the selected tunnel device. Alternatively or in addition, any message herein, such as the request message and the first message, may comprise a requested value, and the selecting, of the tunnel device by the first server, may be based on the requested value being equal to the first value associated with the selected tunnel device. Alternatively or in addition, any message herein, such as the request message and the first message, may comprise multiple values, and any selecting herein, of the tunnel device by the first server, may be based on the first value of the associated with the selected tunnel device being equal to one of the multiple values. Any value herein, such as of the first attribute type, may be numerical value, and the request message and the first message may comprise a minimum value, and any selecting, of the tunnel device by the first server, may be based on the first value of the associated with the selected tunnel device being higher than the minimum value. Alternatively or in addition, values of the first attribute type are numerical values, and the request message and the first message may comprise a maximum value, and any selecting herein, of the tunnel device by the first server, may be based on the first value of the associated with the selected tunnel device being lower than the maximum value. Alternatively or in addition, the request message and the first message may further comprise a minimum value, and any selecting herein, of the tunnel device by the first server, may be based on the first value of the associated with the selected tunnel device being higher than the minimum value.

Any method herein may be used with a second attribute type, and each of the tunnel devices in the group may be associated with a second value relating to the second attribute type, and any method herein may further comprise, storing, by the first server, the second value for associated each of the tunnel devices in the group. Any selecting herein, of the tunnel device by the first server, may be based on the first and second values associated with the selected tunnel device. Any method herein may further comprise sending, by each of the tunnel devices in the group to the first server, the respective first and second values to the first server, and receiving, by the first server, the sent first and second values.

Any message herein, such as the request message and the first message, may comprise a first set of one or more values and a second set of one or more values, and any selecting herein, of the tunnel device by the first server, may be based on respectively comparing the first and second sets to the first and second values associated with the selected tunnel device. Any selected tunnel device herein may be selected by the first server so that the first value may be included in the first set and the second value may be included in the second set. Alternatively or in addition, any selected tunnel device herein may be selected by the first server so that the first value is included in the first set or the second value is included in the second set. Alternatively or in addition, any selected tunnel device herein may be selected by the first server so that the first value is included in the first set and the second value is not included in the second set.

Any first attribute type herein may comprise a geographical location, and each of the first values may comprise a name or an identifier of a continent, a country, a region, a city, a street, a ZIP code, or a timezone. Any first value herein of each of the tunnel devices in the group or each of the IP addresses may be based on IP geolocation that may be based on W3C Geolocation API. Any method herein may be used with a database associating IP addresses to geographical locations, the database may be stored in the first server, and any method herein may further comprise receiving and storing, by the first server, the database, and any method herein may further comprise estimating or associating the first value to each of the tunnel devices in the group by the database. Alternatively or in addition, any first attribute type herein may comprise identification of an Internet Service Provider (ISP) or an Autonomous System Number (ASN), and each of the first values comprises respectively a name or an identifier of the ISP or the ASN number.

Any first attribute type herein may correspond to a hardware or software of tunnel devices. Any first attribute type herein may comprise the hardware of tunnel devices, such as stationary or portable values, respectively based on the tunnel device being stationary or portable. Any first attribute type herein may comprise a program or a software application the (such as an operating system) installed, used, or operated, in tunnel devices, such as the type, make, model, or version of the software.

Any first attribute type herein may corresponds to a communication property, feature of a communication link of tunnel devices, and the communication link may correspond to the respective connection to the Internet of tunnel devices. Alternatively or in addition, the communication link may correspond to a communication link of a tunnel device with the web server, the first server, the second server, or the client device. The first attribute may correspond to a bandwidth (BW) or Round-Trip delay Time (RTT) of the communication link, and any first value herein may be the respective estimation or measurement of the BW or RTT. Any method herein may further comprise estimating or measuring, by the first server or by a tunnel device, the BW or RTT of the communication link. Alternatively or in addition, any first attribute type herein may correspond to the technology or scheme used by the tunnel devices for connecting to the Internet, and any first values herein may comprise wired or wireless values, respectively based on the tunnel device being connected to the Internet using wired or wireless connection.

Any method herein may be used with a plurality of servers that includes the first server, each of the plurality of servers may be connectable to the Internet, may be addressable in the Internet using a respective IP address, and may store a respective list of IP addresses of the tunnel devices that are part of the group. Any method herein may further comprise selecting, by the second server, the first server from the plurality of servers; and the selecting of the tunnel device by the first server may comprise selecting a tunnel device from the respective list of IP addresses of the respective selected first server. The first server may be randomly selected by the second server from the plurality of servers, such as by using one or more random numbers generated by a random number generator.

Any selection herein may be a random selection by using one or more random numbers generated by a random number generator. The random number generator may be using thermal noise, shot noise, nuclear decaying radiation, photoelectric effect, or quantum phenomena. Alternatively or in addition, the random number generator may be software based, and the random number generator may be based on executing an algorithm for generating pseudo-random numbers.

Any server herein, and each of the plurality of servers, may be associated with a one of more attribute values relating to an attribute type, and any server herein, such as the first server, may be selected by the second server from the plurality of servers based on, or according to, the respective one of more attribute values. Any attribute type herein may be a geographical location, and one of more attribute values herein may comprise a name or an identifier of a continent, a country, a region, a city, a street, a ZIP code, or a timezone. Any one of the one of more attribute values may be based on actual geographical location or on IP geolocation, which may be based on W3C Geolocation API, and any request message herein may comprise the one of more attribute values.

Any method herein may be used with a plurality of servers that may include the first server, each of the plurality of servers may be connectable to the Internet, may be addressable in the Internet using a respective IP address, and may store a respective list of IP addresses of the tunnel devices that are part of the group. Any method herein may further comprise for each of the tunnel devices in the group, selecting, by the respective tunnel device, the first server from the plurality of servers; sending, by the tunnel device to the selected first server, a third message; receiving, by the selected first server from the respective tunnel device, the third message; and storing, in the selected first server, the IP address of the respective tunnel device in the list, and adding, by the selected first server, the respective tunnel device to the group of tunnel devices, so that the respective tunnel device can be selected as a tunnel device as part of the selecting by the selected first server.

The first server may be randomly selected by the respective tunnel device from the plurality of servers. Each of the plurality of servers may be associated with a one of more attribute values relating to an attribute type, and the first server may be selected by the respective tunnel device from the plurality of servers based on, or according to, the respective one of more attribute values. Any attribute type herein may be a geographical location, and one of more attribute values may comprise a name or an identifier of a continent, a country, a region, a city, a street, a ZIP code, or a timezone. Any one of the one of more attribute values may be based on actual geographical location or on IP geolocation, which may be based on W3C Geolocation API, and any request message herein may comprise the one of more attribute values.

Any method herein may be used with a Domain Name System (DNS) server, and any content identifier herein may comprise a domain name. Any method herein may further comprise performing, by the client device using the DNS server, a DNS resolution for obtaining a numerical IP address, and the request message, the first message, and the second message may comprise the obtained numerical IP address. Alternatively or in addition, any method herein may further comprise performing, by the second server using the DNS server, a DNS resolution for obtaining a numerical IP address, and any request message herein may comprise the domain name, and the first message and the second message may comprise the obtained numerical IP address. Alternatively or in addition, any method herein may further comprise performing, by the selected tunnel device using the DNS server, a DNS resolution for obtaining a numerical IP address, and each of the request message, the first message, and the second message may comprise the domain name.

Any content herein may comprise a web-page or a website. Any content identifier herein may be, or may comprise, a Uniform Resource Identifier (URI) or a Uniform Resource Locator (URL). Any or each of each of the IP addresses herein may be in IPv4 or IPv6 form. Any web server herein may use HyperText Transfer Protocol (HTTP) or HTTP Secure (HTTPS) for responding to respective HTTP or HTTPS requests via the Internet, and any content request herein may be, or may comprise, an HTTP or an HTTPS request. Any communication over the Internet herein, such as between the client device and the second server, between the second server and the first server, between the first server and the selected tunnel device, or between the selected tunnel device and the web server, may be based on, may use, or may be compatible with, Transmission Control Protocol over Internet Protocol (TCP/IP) protocol or connection. Alternatively or in addition, the communication over the Internet between the client device and the second server, between the second server and the first server, between the first server and the selected tunnel device, and between the selected tunnel device and the web server, may be based on, may use, or may be compatible with, Transmission Control Protocol over Internet Protocol (TCP/IP) protocol or connection.

Any method herein may further be used for redundancy or resiliency, and may further comprise selecting, by any device, such as the first server, an additional IP address associated with any device, such as an additional tunnel device from the list of tunnel devices, in response to the received first message; sending, by any device, such as the additional tunnel device, to any device, such as the web server, a content request that may comprise the content identifier; receiving, by any device, such as the additional tunnel device, from any device, such as the web server, the content, in response to the content request; and receiving, by any device such as the client device, from any device, such as the second server, the content received by the additional tunnel device in response to the request message. Any selecting herein of the additional IP address may be performed after the sending of the content request by the selected tunnel device, or alternatively before the sending of the content request by the selected tunnel device.

Any method herein may further comprise sending, by any device, such as the first server, to any device, such as the additional tunnel device, an additional message using an IP address of the additional tunnel device; receiving, by any device, such as the additional tunnel device from any device, such as the first server, the additional message; sending, by any device, such as the additional tunnel device, to any device, such as the second server, the content; receiving, by any device, such as the second server, from any device, such as the additional tunnel device, the content; and sending, by any device, such as the second server to any device, such as the client device, the content.

Any selecting herein, such as by the first server, of an IP address associated with a tunnel device may comprise selecting, by any device, such as the first server, any multiple IP addresses respectively associated with multiple tunnel devices from the list of tunnel devices, in response to the received first message. At least two of, or all of, the multiple IP addresses may be selected in parallel. Alternatively or in addition, at least two of, or all of, the multiple IP addresses may be sequentially selected. Any method herein may further comprise, for each tunnel device from the multiple tunnel devices, receiving, by any device, such as the client device, the content from the tunnel device, in response to the request message. The content from at least two of, or all of, any multiple tunnel devices, may be sequentially received or in parallel. Any method herein may further comprise selecting and using, by any device, such as the client device, a content received from one of any multiple tunnel devices, such as the content first received from one of the multiple tunnel devices. Any method herein may further comprise discarding, by any device, such as the client device, the content received from non-selected ones of any multiple tunnel devices, or comparing, by any device, such as the client device, the content received from two or more of any multiple tunnel devices.

Any method herein may further comprise, for each tunnel device from any multiple tunnel devices, sending, by any device, such as the tunnel device to any device, such as the web server, a content request that may comprise the content identifier; and receiving, by any device, such as the tunnel device from any device, such as the web server, the content, in response to the content request. Any sending of the content request, or any receiving of the content from the web server, by at least two of, or all of, the multiple tunnel devices, may be performed sequentially or in parallel. Any protocols used by at least two of, or all of, any multiple tunnel devices, for the receiving of the content from the web server, may be identical, or may be different from each other.

Any method herein may further comprise, for each tunnel device from any multiple tunnel devices, sending, by any device, such as the first server, to any device, such as the tunnel device, any second message using an IP address of the tunnel device; and receiving, by any device, such as the tunnel device, from any device, such as the first server, the second message. Any sending of the second message by any device, such as by the first server to, or the receiving of the content from any device such as the first server by, at least two of, or all of, the multiple tunnel devices, may be performed sequentially or in parallel. Any protocols used by at least two of, or all of, any multiple tunnel devices, for the receiving of the content from any device such as the first server, may be identical or may be different from each other.

Any method herein may further comprise, for each tunnel device from any multiple tunnel devices sending, by any device, such as the tunnel device to the any device, such as the second server, the content; receiving, by any device, such as the second server from any device, such as the tunnel device, the content; sending, by any device such as the second server, to any device, such as the client device, the content; and receiving, by any device such as the client device, from any device, such as the second server, the content in response to the request message. Any sending of the content to the second server, or any receiving of the content from the second server, by at least two of, or all of, the multiple tunnel devices, may be performed sequentially or in parallel. Any protocols used by at least two of, or all of, the multiple tunnel devices, for the sending of the content to the second server, may be identical, or may be different from each other.

The number of any selected multiple IP addresses herein may be equal to, or more than, 2, 3, 4, 5, 6, 7, 8, 9, 10, 12, 15, 20, 30, 35, 40, 45, 50, 60, 70, or 100 IP addresses. Further, the number of any selected multiple IP addresses herein may be less than, 3, 4, 5, 6, 7, 8, 9, 10, 12, 15, 20, 30, 35, 40, 45, 50, 60, 70, 100, or 150 IP addresses. Any list of the IP addresses herein may comprise, or may consist of, multiple distinct lists, and each of the multiple distinct lists may comprise one or more of the IP addresses associated with the tunnel devices in the group, and any multiple IP addresses herein may be part of the same list of the multiple distinct lists.

Any method herein may further comprise sending, by any device, such as the client device, to any device, such as the second server, an additional request message that may comprise the content identifier; and receiving, by any device, such as the client device, the content in response to the additional request message. Any method herein may further comprise receiving, by any device, such as the second server, from any device, such as the client device, the additional request message; sending, by any device, such as the second server, to any device, such as the first server, an additional first message; receiving, by any device, such as the first server, from any device, such as the second server, the additional first message; selecting, by any device, such as the first server, an additional IP address associated with an additional tunnel device from the list of tunnel devices, in response to the received additional first message; sending, by any device, such as the selected additional tunnel device, to any device, such as the web server, a content request that comprises the content identifier; and receiving, by any device, such as the selected additional tunnel device, from any device, such as the web server, the content, in response to the content request. Further, any method herein may further comprise sending, by any device, such as the first server to the selected additional tunnel device, an additional second message using the additional IP address of the selected first tunnel device; receiving, by any device, such as the selected additional tunnel device, from any device, such as the first server, the additional second message; sending, by any device, such as the selected additional tunnel device, to any device, such as the second server, the content; receiving, by any device, such as the second server, from any device, such as the selected additional tunnel device, the content; and sending, by any device, such as the second server, to any device, such as the client device, the content.

Any sending of any additional request message may be at least in part in parallel to, or after, any sending of any other request message. Any receiving, by any device, such as the client device, the content in response to the additional request message may be in parallel, or after, the receiving, by any device, such as the client device, the content in response to any other request message. Any method herein may further comprise selecting and using, by any device, such as the client device, one of the content received in response to any additional request message and the content received in response to any other request message, such as selecting and using, the first received content. Any method herein may further comprise discarding, by any device, such as the client device, the content received from non-selected one of the content received in response to multiple request messages.

Any method herein may further comprise sending, by any device, such as the client device, to any device such as the second server, multiple request messages, and each of the multiple request messages may comprise the content identifier; and receiving, by any device, such as the client device, the content in response each of to the multiple request messages. The number of sent multiple request messages herein may be equal to, or may be more than, 2, 3, 4, 5, 6, 7, 8, 9, 10, 12, 15, 20, 30, 35, 40, 45, 50, 60, 70, or 100 messages. Alternatively or in addition, the number of sent multiple request messages herein may be less than 3, 4, 5, 6, 7, 8, 9, 10, 12, 15, 20, 30, 35, 40, 45, 50, 60, 70, 100, or 150 messages. The content received in response to at least two of, or all of, any multiple request messages, may be received sequentially or in parallel. Any protocols used for the sending of at least two of, or all of, the multiple request messages, or for the receiving of the responses therefor, may be identical, or may be different from each other. Any method herein may further comprise selecting and using, by any device, such as the client device, a content received in response for one of the sent multiple request messages, such as the first received content. Any method herein may further comprise discarding, by any device, such as the client device, the content received in response to the non-selected ones of the sent multiple request messages. Any method herein may further comprise comparing, by any device, such as the client device, the content received from in response to two or more sent multiple request messages.

Any method herein may further comprise receiving, by any device, such as the second server, from any device, such as the client device, each of the of the multiple request messages; sending, by any device, such as the second server, to any device, such as the first server, messages in response to the received multiple request messages; and receiving, by any device, such as the first server, from any device, such as the second server, the messages. Any method herein may further comprise selecting, by any device, such as the first server, for each one of the multiple request messages an IP address associated with a tunnel device from any list of tunnel devices. Any list of the IP addresses herein may comprise, or may consist of, multiple distinct lists, and each of the multiple distinct lists may comprise one or more of the IP addresses associated with the tunnel devices in the group, and any selected multiple IP addresses herein may be part of the same list of the multiple distinct lists.

Any method herein may further comprise selecting, by any device, such as the first server, an IP address associated with a tunnel device from the list of tunnel devices, in response to each of the received first message; sending, by any device, such as the first server, to any device, such as the selected tunnel device, multiple messages each using an IP address of the selected tunnel devices; receiving, by any device, such as each of the selected tunnel devices from any device, such as the first server, the messages; sending, by any device, such as by each of the selected tunnel device, to any device, such as the web server, a content request that may comprise the content identifier; receiving, by any device, such as by each of the selected tunnel device, from any device, such as the web server, the content, in response to the content request; sending, by any device, such as by each of the selected tunnel device, to any device, such as the second server, the content; receiving, by any device such as the second server, from any device, such as each of the selected tunnel device, the content; and sending, by any device, such as the second server, to any device, such as the client device, each of the received content. The protocols used for at least two of, or all of, any sending actions herein, or of the receiving actions herein, may be identical, or may be different from each other. At least two of, or all of, any sending actions herein, or any receiving actions herein, may be performed in parallel or sequentially.

Any communication over the Internet herein, such as between the client device and the second server, between the second server and the first server, between the first server and the selected tunnel device, or between the selected tunnel device and the web server, may be based on, may use, or may be compatible with, HTTP or HTTPS protocol or connection, and one of the node may serve as an HTTP or HTTPS server respectively and the other node may serve as an HTTP or HTTPS client respectively. Alternatively or in addition, the communication over the Internet between the client device and the second server, between the second server and the first server, between the first server and the selected tunnel device, and between the selected tunnel device and the web server, may be based on, may use, or may be compatible with, HTTP or HTTPS protocol or connection, and one of the node may serve as an HTTP or HTTPS server respectively and the other node may serve as an HTTP or HTTPS client respectively. Any communication over the Internet between the client device and the second server may be based on, may use, or may be compatible with, HTTPS protocol or connection, and any request message herein may be according to, may be based on, or may use, HTTPS frame or packet form. Any method herein may further comprise extracting, such as by the first or second server, the content identifier using SSL sniffing. Any request message herein may comprise an attribute value corresponding to an attribute type, and any method herein may further comprise extracting, by the first or second server, the attribute value using SSL sniffing.

Any communication over the Internet herein, such as between the client device and the second server, between the second server and the first server, or between the first server and the selected tunnel device, may be based on, uses, or may be compatible with, Socket Secure (SOCKS) protocol or connection, and one of the node may serve as an SOCKS server respectively and the other node may serve as an SOCKS client respectively. Any communication over the Internet herein between the client device and the second server, may be based on, may use, or may be compatible with, Socket Secure (SOCKS) protocol or connection. The second server may serve as an SOCKS server and the client device may serve as an SOCKS client, or the second server may serve as an SOCKS client and the client device may serve as an SOCKS server. Any SOCKS protocol or connection herein may be according to, may be based on, or may be compatible with, SOCKS4, SOCKS4a, or SOCKS5. Alternatively or in addition, any SOCKS protocol or connection herein may be according to, may be based on, or may be compatible with, IETF RFC 1928, IETF RFC 1929, IETF RFC 1961, or IETF RFC 3089.

Alternatively or in addition, any communication between any two entities herein, such as over the Internet between the client device and the second server, between the second server and the first server, or between the first server and the selected tunnel device, may be based on, uses, or may be compatible with, Socket Secure (SOCKS) or WebSocket (ws), which may be WebSocket Secure (wss), protocol or connection, and the second server may serve as an SOCKS or WebSocket server and the selected tunnel device may serve as an WebSocket client. Any WebSocket protocol or connection herein may be according to, may be based on, or may be compatible with, IETF RFC 6455.

Any communication over the Internet herein, such as between the client device and the second server, between the second server and the first server, or between the first server and the selected tunnel device, may be based on, uses, or may be compatible with, HTTP Proxy protocol or connection, and one of the node may serve as an HTTP Proxy server respectively and the other node may serve as an HTTP Proxy client respectively. Any communication over the Internet herein between the client device and the second server, may be based on, may use, or may be compatible with, HTTP Proxy protocol or connection. The second server may serve as an HTTP Proxy server and the client device may serve as an HTTP Proxy client, or the second server may serve as an HTTP Proxy client and the client device may serve as an HTTP Proxy server.

Any tunnel device, or any or each of the tunnel devices in the group may be associated with a single IP address. One or more of the tunnel devices in the group may be associated with multiple IP addresses, such as with more than 1,000, 2,000, 5,000, 10,000, 20,000, 50,000 or 100,000 distinct IP addresses. A primary or sole functionality of any or each of the one or more of the tunnel devices may be to serve as a selected tunnel device.

Any method herein may further comprise storing, operating, or using, by at least one of the tunnel devices in the group, or the selected tunnel device, a server operating system. The server operating system may consist or, may comprise, or may be based on, Microsoft Windows Server®, Linux, or UNIX. Alternatively or in addition, the server operating system may consist or, may comprise, or may be based on, one out of Microsoft Windows Server® 2003 R2, 2008, 2008 R2, 2012, or 2012 R2 variant, Linux™ or GNU/Linux based Debian GNU/Linux, Debian GNU/kFreeBSD, Debian GNU/Hurd, Fedora™, Gentoo™, Linspire™, Mandriva, Red Hat® Linux, SuSE, and Ubuntu®, UNIX® variant Solaris™, AIX®, Mac™ OS X, FreeBSD®, OpenBSD, and NetBSD®. Any method herein may further comprise storing, operating, or using, by at least one of the tunnel devices in the group, or the selected tunnel device, a client operating system. The client operating system may consist or, may comprise, or may be based on, one out of Microsoft Windows 7, Microsoft Windows XP, Microsoft Windows 8, Microsoft Windows 8.1, Linux, and Google Chrome OS. Any Operating System (OS) herein, such as any server or client operating system, may consist of, include, or be based on a real-time operating system (RTOS), such as FreeRTOS, SafeRTOS, QNX, VxWorks, or Micro-Controller Operating Systems (μC/OS).

Any method herein may further comprise storing, operating, or using, by any client device, by at least one of the tunnel devices in the group, or the selected tunnel device, a web browser. The web browser may consist of, may comprise, or may be based on, Microsoft Internet Explorer, Google Chrome, Opera™, or Mozilla Firefox®. Alternatively or in addition, the web browser may be a mobile web browser, which may consist of, may comprise of, or may be based on, Safari, Opera Mini™, or Android web browser.

At least one of the tunnel devices in the group, or the selected tunnel device, may be integrated in part or entirely in an appliance. A primary functionality of the appliance may be associated with food storage, handling, or preparation, such as heating food, and the appliance may be a microwave oven, an electric mixer, a stove, an oven, or an induction cooker. Alternatively or in addition, the appliance may be a refrigerator, a freezer, a food processor, a dishwasher, a food blender, a beverage maker, a coffeemaker, or an iced-tea maker. Alternatively or in addition, a primary function of the appliance may be associated with environmental control, and the appliance may consist of, or may be part of, an HVAC system. Alternatively or in addition, a primary function of the appliance may be associated with temperature control, and the appliance may be an air conditioner or a heater. Alternatively or in addition, a primary function of the appliance may be associated with cleaning such as clothes cleaning, and the appliance may be a washing machine, a clothes dryer, or a vacuum cleaner. Alternatively or in addition, a primary function of the appliance may be associated with water control or water heating. Alternatively or in addition, the appliance may be an answering machine, a telephone set, a home cinema method, a HiFi method, a CD or DVD player, an electric furnace, a trash compactor, a smoke detector, a light fixture, or a dehumidifier. Alternatively or in addition, the appliance may be a battery-operated portable electronic device, such as a notebook, a laptop computer, a media player, a cellular phone, a Personal Digital Assistant (PDA), an image processing device, a digital camera, a video recorder, or a handheld computing device.

Any integration herein may involve sharing a component, housing in same enclosure, sharing same processor, mounting onto same surface, or sharing a same connector, which may be a power connector for connecting to a power source. Alternatively or in addition, the integration may involve sharing the same connector for being powered from same power source, or the integration may involve sharing same power supply.

Any device herein, such as at least one of the tunnel devices in the group, or the selected tunnel device, may be housed in a single enclosure that may be a hand-held enclosure or a portable enclosure. Any device herein, such as at least one of the tunnel devices in the group, or the selected tunnel device, may be integrated with at least one of a notebook computer, a laptop computer, a media player, a Digital Still Camera (DSC), a Digital video Camera (DVC or digital camcorder), a Personal Digital Assistant (PDA), a cellular telephone, a digital camera, a video recorder, or a smartphone, which may comprise, or may be based on, an Apple iPhone 6 or a Samsung Galaxy S6.

Any method herein may further comprise storing, operating, or using an operating system, by at least one of the tunnel devices in the group, or the selected tunnel device. The operating system may be a mobile operating system that may comprise Android version 2.2 (Froyo), Android version 2.3 (Gingerbread), Android version 4.0 (Ice Cream Sandwich), Android Version 4.2 (Jelly Bean), Android version 4.4 (KitKat), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system.

Any method herein may further comprise, or may be preceded by, connecting to the Internet, by any device such as by at least one of the tunnel devices in the group or by the selected tunnel device, via a wireless network.

A non-transitory computer readable medium may contain computer instructions that, when executed by a computer processor, cause the processor to perform at least part of, or all of, the steps of any method herein. At least part of, or all of, the steps of any method herein may be included in a Software development kit (SDK) that may be provided as a non-transitory computer readable medium containing computer instructions, and any method herein may further comprise installing the SDK in any device herein. Any steps by any tunnel device herein may be included in a Software development kit (SDK) that may be provided as a non-transitory computer readable medium containing computer instructions, and any method herein may further comprise installing the SDK on any or each of the tunnel devices in the group. Any client device herein, any server herein, such as the first server or the second server, or the selected tunnel device, may comprise a non-transitory computer readable medium containing computer instructions that, when executed by a computer processor, cause the processor to perform at least part of the steps of any method herein. Any list herein may comprise at least 10,000, 20,000, 50,000, 100,000, 200,000, 500,000, 1,000,000, 2,000,000, 5,000,000, or 10,000,000 IP addresses or tunnel devices.

The first and second servers may be owned, may be operated, or may be controlled by an entity. Further, at least one of the tunnel devices in the group may be owned, may be operated, or may be controlled by the entity. A tunnel device may be randomly selected by the first server.

Each identifier of any content herein or of any device herein may be an IP address (in IPv4 or IPv6 form) or a URL. Each of the servers may be a web server using HyperText Transfer Protocol (HTTP) that responds to HTTP requests via the Internet, and the first and second requests may be HTTP requests. Each communication with a server may be based on, or using, HTTP persistent connection.

Any communication with a network element, such as with the first device, the second device, the first server, or the second server, may be based on, or be according to, TCP/IP protocol or connection, and may be preceded by the step of establishing a connection. Further, communication between any two network elements, such as between the first device and the second device, may be over the established connection. Any communication between any two network elements may use TCP, and the connection may be established by performing 'Active OPEN' or 'Passive OPEN', may use a VPN, or may use a tunneling protocol. Any content herein, such as the first content, may include, consist of, or comprise, a part or whole of files, text, numbers, audio, voice, multimedia, video, images, music, web-site page, or computer program.

Each of the network elements herein, such as any of the servers, may store, operate, or use, a server operating system, that may be based on, comprise, or use, Microsoft Windows Server®, Linux, or UNIX, such as Microsoft Windows Server® 2003 R2, 2008, 2008 R2, 2012, or 2012 R2 variant, Linux™ or GNU/Linux based Debian GNU/Linux, Debian GNU/kFreeBSD, Debian GNU/Hurd, Fedora™, Gentoo™, Linspire™, Mandriva, Red Hat® Linux, SuSE, and Ubuntu®, UNIX® variant Solaris™, AIX®, Mac™ OS X, FreeBSD®, OpenBSD, and NetBSD®. Each of the network elements herein, such as the client device or any of the tunnel devices, may store, operate, or use, a client operating system, that may consist or, comprise of, or may be based on, Microsoft Windows 7, Microsoft Windows XP, Microsoft Windows 8, Microsoft Windows 8.1, Linux, or Google Chrome OS. The client operating system may be a mobile operating system, such as Android version 2.2 (Froyo), Android version 2.3 (Gingerbread), Android version 4.0 (Ice Cream Sandwich), Android Version 4.2 (Jelly Bean), Android version 4.4 (KitKat), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system. Any Operating System (OS) herein, such as any server or client operating system, may consist of, include, or be based on a real-time operating system (RTOS), such as FreeRTOS, SafeRTOS, QNX, VxWorks, or Micro-Controller Operating Systems (μC/OS).

Any apparatus or device herein, such as any one or more of the client devices or of the tunnel devices, may consist of, may comprise, may be integrated with, or may be part of, a wearable device that may be wearable on a person. Any wearable device herein may be wearable on an organ of the person head, such as an eye, ear, face, cheek, nose, mouth, lip, forehead, or chin. Alternatively or in addition, any wearable device herein may be constructed to have a form substantially similar to, may be constructed to have a shape allowing mounting or wearing identical or similar to, or may be constructed to have a form to at least in part substitute for, headwear, eyewear, or earpiece. Any headwear herein may consist of, may be structured as, or may comprise, a bonnet, a cap, a crown, a fillet, a hair cover, a hat, a helmet, a hood, a mask, a turban, a veil, or a wig. Any eyewear herein may consist of, may be structured as, or may comprise, glasses, sunglasses, a contact lens, a blindfold, or a goggle. Any earpiece herein may consist of, may be structured as, or may comprise, a hearing aid, a headphone, a headset, or an earplug. Alternatively or in addition, any wearable device herein may be shaped for permanently or releasably being attachable to, or be part of, a clothing piece of a person, and any attaching herein may use taping, gluing, pinning, enclosing, encapsulating, a pin, or a latch and hook clip. Any clothing piece herein may be a top, bottom, or full-body underwear, or a headwear, a footwear, an accessory, an outwear, a suit, a dress, a skirt, or a top. Alternatively or in addition, any wearable device herein may further comprises an annular member defining an aperture therethrough that is sized for receipt therein of a part of a human body. Any the human body part herein may be part of a human hand that consists of, or comprises, an upper arm, elbow, forearm, wrist, or a finger. Further, any human body part herein may be part of a human head or neck that may consist of, or may comprise, a forehead, ear, skull, or face. Alternatively or in addition, any human body part herein may be part of a human thorax or abdomen that may consist of, or may comprise, a waist or hip. Further, any human body part herein may be part of a human leg or foot that may consist of, or may comprise, a thigh, calf, ankle, instep, knee, or toe.

Any system or method herein may implement redundancy, where the system or method may include one or more additional identical, similar, or different element, such as using two or more identical or similar slices or any other content parts, using two or more identical or similar network elements performing identical or similar functionalities, using two or more identical or similar hardware pieces performing identical or similar functionalities, or using two or more data-paths transporting identical or similar information. The redundancy may be based on Dual Modular Redundancy (DMR), Triple Modular Redundancy (TMR), Quadruple Modular Redundancy (QMR), 1:N Redundancy, 'Cold Standby', or 'Hot Standby'.

The steps described herein may be sequential, and performed in the described order. For example, in a case where a step is performed in response to another step, or upon completion of another step, the steps are executed one after the other. However, in case where two or more steps are not explicitly described as being sequentially executed, these steps may be executed in any order, or may be simultaneously performed. Two or more steps may be executed by two different network elements, or in the same network element, and may be executed in parallel using multiprocessing or multitasking.

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions causes the processor to perform the one or more of the methods or steps described herein.

Any method herein may be used for fetching a content identified by a content identifier to a client device from a web server, and may be further used with a first and second servers and a tunnel device that are each connected to the Internet and are each addressable in the Internet using a respective IP address. The method by the second server may comprise receiving, from the client device, a request message that comprises the content identifier; sending, to the first server, a first message; receiving, from the tunnel device or from the first server, the content; and sending, to the client device, the content, in response to the request message. Any receiving of the content may comprise receiving, from the tunnel device, the content. The method may further comprise responding to a communication initiated by the tunnel device, and the initiated communication by the tunnel device may use, or may be based on, Network Address Translator (NAT) traversal scheme. Any NAT traversal scheme herein may be according to, may be based on, or may use, Internet Engineering Task Force (IETF) Request for Comments (RFC) 2663, IETF RFC 3715, IETF RFC 3947, IETF RFC 5128, IETF RFC 5245, IETF RFC 5389, or IETF RFC 7350. Any NAT traversal scheme herein may be according to, may be based on, or may use, Traversal Using Relays around NAT (TURN), Socket Secure (SOCKS), Socket Secure (SOCKS) or WebSocket (ws), which may be WebSocket Secure (wss), NAT 'hole punching', Session Traversal Utilities for NAT (STUN), Interactive Connectivity Establishment, (ICE), UPnP Internet Gateway Device Protocol (IGDP), or Application-Level Gateway (ALG). The method may further comprise in response to the communication initiated by the tunnel device, sending, to the tunnel device, the content identifier.

The communication over the Internet with any device, with any server, or with any client device, may be based on, may use, or may be compatible with, Transmission Control Protocol over Internet Protocol (TCP/IP) protocol or connection. Further, the communication over the Internet with the tunnel device, with the first server, or with the client device, may be based on, may use, or may be compatible with, HTTP or HTTPS protocol or connection, and the second server may serve as an HTTP or HTTPS server respectively and the tunnel device may serve as an HTTP or HTTPS client respectively.

Furthermore, the communication over the Internet with the tunnel device, with the first server, or with the client device, may be based on, may use, or may be compatible with, Socket Secure (SOCKS) protocol or connection, and the second server may serve as an SOCKS server and respectively the tunnel device, the first server, or the client device may serve as an SOCKS client. Any SOCKS protocol or connection herein may be according to, may be based on, or may be compatible with, SOCKS4, SOCKS4a, or SOCKS5. Alternatively or in addition, any SOCKS protocol or connection may be according to, may be based on, or may be compatible with, IETF RFC 1928, IETF RFC 1929, IETF RFC 1961, or IETF RFC 3089. Alternatively or in addition, any communication over the Internet with the tunnel device, with the first server, or with the client device, may be based on, may use, or may be compatible with, Socket Secure (SOCKS) or WebSocket (ws), which may be WebSocket Secure (wss), protocol or connection, and the second server may serve as an SOCKS or WebSocket server and the selected tunnel device may serve as an WebSocket client. Any WebSocket protocol or connection herein may be according to, may be based on, or may be compatible with, IETF RFC 6455.

Further, the communication over the Internet with the tunnel device, with the first server, or with the client device, may be based on, may use, or may be compatible with, HTTP Proxy protocol or connection, and the second server may serve as an HTTP Proxy server and respectively the tunnel device, the first server, or the client device may serve as an HTTP Proxy client. The method may further comprise establishing a connection with the tunnel device, and the second server may initiate communication with the tunnel device using the established connection. The established connection may be a TCP connection using 'Active OPEN', 'Passive OPEN', or TCP keepalive mechanism, or the established connection may use, or may be based on, Virtual Private Network (VPN).

The method may further comprise sending, to the client device, the IP address of the tunnel device, may be used with a first IP address stored in the client device, and the request message may comprises the first IP address. Further, the first message may comprise the first IP address. The method may further be used with a plurality of servers that includes the first server. Each of the plurality of servers may be connectable to the Internet, and may be addressable in the Internet using a respective IP address. The method may further comprise selecting the first server from the plurality of servers, such as where the first server is randomly selected from the plurality of servers. The first server may be randomly selected using one or more random numbers generated by a random number generator, and the random number generator may be hardware or software based. The random number generator may use thermal noise, shot noise, nuclear decaying radiation, photoelectric effect, or quantum phenomena, or may be based on executing an algorithm for generating pseudo-random numbers.

Each of any plurality of servers herein may be associated with a one of more attribute values relating to an attribute type, and the first server may be selected from the plurality of servers based on, or according to, the respective one of more attribute values. Any message herein, such as the request message, may comprise the one of more attribute values. The attribute type may be a geographical location, and one of more attribute values may comprise a name or an identifier of a continent, a country, a region, a city, a street, a ZIP code, or a timezone. Further, one of more attribute values may be based on actual geographical location or on IP geolocation, which may be based on W3C Geolocation Application Programming Interface (API).

Any method herein may be used with a Domain Name System (DNS) server, and any content identifier herein may comprise a domain name. Any method herein may further comprise performing, using the DNS server, a DNS resolution for obtaining a numerical IP address, and any message herein, such as the request message, may comprise the domain name, and any message herein, such as the request message, such as the first message, may comprise the obtained numerical IP address.

The communication over the Internet with the client device may be based on, may use, or may be compatible with, HTTPS protocol or connection, and any message herein, such as the request message, may be according to, may be based on, or may use, HTTPS frame or packet form. Any method herein may further comprising extracting, by the first or second server, the content identifier using SSL sniffing. Any message herein, such as the request message, may comprise an attribute value corresponding to an attribute type, and the method may further comprise extracting, the attribute value using SSL sniffing.

A non-transitory computer readable medium containing computer instructions that, when executed by a computer processor, cause the processor to perform any part of, or all of, any of the methods herein. A server may comprise a non-transitory computer readable medium containing computer instructions that, when executed by a computer processor, cause the processor to perform part of, or all of, any method herein.

Any of the servers herein, such as the second server, may be storing, operating, or using, a server operating system, which may consist or, may comprise of, or may be based on, Microsoft Windows Server®, Linux, or UNIX. Alternatively or in addition, any server operating system herein may consist of, may comprise of, or may be based on, Microsoft Windows Server® 2003 R2, 2008, 2008 R2, 2012, or 2012 R2 variant, Linux™ or GNU/Linux based Debian GNU/Linux, Debian GNU/kFreeBSD, Debian GNU/Hurd, Fedora™, Gentoo™ Linspire™, Mandriva, Red Hat® Linux, SuSE, and Ubuntu®, UNIX® variant Solaris™, AIX®, Mac™ OS X, FreeBSD®, OpenBSD, or NetBSD®. Any of the servers herein, such as the first and second servers may be owned, operated, or controlled by an entity. Further, any tunnel device herein, may be owned, operated, or controlled by the entity.

A method for fetching a content identified by a content identifier by using tunnel devices may be uses with a first and second servers and a group of tunnel devices that are each connected to the Internet and are each addressable in the Internet using a respective IP address. The first server may store a list of the IP addresses associated with the tunnel devices in the group. The method by the first server may comprise receiving, from the second server, a first message that includes the content identifier; selecting, an IP address associated with a tunnel device from the list of tunnel devices, in response to the received first message; and sending, to the selected tunnel device, a second message using an IP address of the selected tunnel device. The second message may comprise the content identifier. The method may further comprise receiving, from the selected tunnel device, the content; and sending, to the second server, the content. The second message may comprise the IP address of the second server.

The method may be used with a first device that is connected to the Internet and addressable in the Internet using a first IP address. The method may further comprise receiving, from the first device, a third message; and storing, the first IP address in the list, and adding the first device to the group of tunnel devices, so that the first device can be selected as a tunnel device as part of the selecting. The third message may comprise at least one value relating to at least one attribute type associated with the first device, and the method may further comprise storing, the at least one value, as associated with the first device or with the first IP address. The method may further comprise establishing a connection with the first device, and the initiated communication with the first device may use the established connection. The established connection may be a TCP connection using 'Active OPEN', 'Passive OPEN', or TCP keepalive mechanism, or may use, or may be based on, Virtual Private Network (VPN).

Alternatively or in addition, the method may further comprise, for each of the tunnel devices in the group, receiving, from each of the tunnel devices, a respective third message; storing, the IP address of the tunnel device in the list, and adding the tunnel device to the group of tunnel devices, so that the tunnel device can be selected as a tunnel device as part of the selecting by the first server. The third message may comprise at least one value relating to at least one attribute type associated with the tunnel device, and the method may further comprise storing, the at least one value, as associated with the tunnel device or with the tunnel device IP address. Further, the method may further comprise establishing a connection with the tunnel device, and the communication may be initiated with the tunnel device using the established connection. The established connection may be a TCP connection using 'Active OPEN', 'Passive OPEN', or TCP keepalive mechanism, or the established connection may use, or may be based on, Virtual Private Network (VPN).

The first message may comprises a first IP address, and the selecting, by the first server of the tunnel device from the list of tunnel devices may be based on, or may be in response to, the received first IP address. Alternatively or in addition, the selecting of the tunnel device may comprise selecting a tunnel device having the first IP address.

The method may be used with a first tunnel device in the group that may be operating in multiple states that may include an idle state and non-idle states. The method may further comprise selecting the first tunnel device in response to the first tunnel device being in the idle state. The method may further comprise receiving, from the first tunnel device, a message responsive to the first tunnel device state; and the first tunnel device may be selected in response to the first tunnel device state being the idle state. Alternatively or in addition, the method may further comprise receiving, from the first tunnel device, a first status message; and adding, the IP address of the first tunnel device to the list of IP addresses in response to received first status message. Further, the method may further comprise receiving, from the first tunnel device, the second status message; and removing, the IP address of the first tunnel device from the list of IP addresses in response to received second status message.

The method may be used with a first attribute type, and each of the tunnel devices in the group may be associated with a first value relating to the first attribute type. The method may further comprise storing, the first value for associated each of the tunnel devices in the group. The first value may comprise a numeric value or an identifier of a feature, a characteristic, or a property of the first attribute type.

Any selecting of any tunnel device herein may be based on the first value associated with the selected tunnel device, and any method herein may further comprise receiving, from each of the tunnel devices in the group, the respective first value. The first message may comprise one or more values, and the selecting of the tunnel device, may be based on comparing the one or more values to the first value associated with the selected tunnel device. Alternatively or in addition, the first message may comprise a requested value, and the selecting of the tunnel device, may be based on the requested value being equal to the first value associated with the selected tunnel device. Alternatively or in addition, the first message may comprise multiple values, and the selecting of the tunnel device may be based on the first value associated with the selected tunnel device being equal to one of the multiple values. Any values herein of the first attribute type may be numerical values, and the first message may comprise a minimum value, and the selecting, of the tunnel device, may be based on the first value of the associated with the selected tunnel device being higher than the minimum value. Alternatively or in addition, the values of the first attribute type may be numerical values, and the first message may comprise a maximum value, and the selecting of the tunnel device, may be based on the first value associated with the selected tunnel device being lower than the maximum value. Alternatively or in addition, the first message may comprise a maximum and a minimum values, and the selecting of the tunnel device, may be based on the first value associated with the selected tunnel device being lower than the maximum value and higher than the minimum value.

Any method herein may further be used with a second attribute type, and each of the tunnel devices in the group may be associated with a second value relating to the second attribute type, and the method may further comprise, storing the second value for associated each of the tunnel devices in the group. The selecting of the tunnel device may be based on the first and second values associated with the selected tunnel device, and the method may further comprise receiving, from each of the tunnel devices in the group, the respective first and second values. Alternatively or in addition, the first message may comprise a first set of one or more values and a second set of one or more values, and the selecting of the tunnel device, may be based on respectively comparing the first and second sets to the first and second values associated with the selected tunnel device. Alternatively or in addition, the selected tunnel device may be selected so that the first value is included in the first set and the second value is included in the second set. Alternatively or in addition, the selected tunnel device may be selected so that the first value is included in the first set or the second value is included in the second set. Further, the selected tunnel device may be selected so that the first value is included in the first set and the second value is not included in the second set.

Any attribute type herein, such as the first attribute type, may comprise a geographical location, and each of the first values may comprise a name or an identifier of a continent, a country, a region, a city, a street, a ZIP code, or a timezone. Further, the first value of each of the tunnel devices in the group or each of the IP addresses may be based on IP geolocation, which may be based on W3C Geolocation API. Any method herein may be used with a database associating IP addresses to geographical locations, and the database may be stored in the first or second server. The method may further comprise receiving and storing, by the first or second server, the database, and estimating or associating the first value to each of the tunnel devices in the group by using the database. Any attribute herein, such as the first attribute type, may comprise Internet Service Provider (ISP) or Autonomous System Number (ASN) identification, and each of the first values may comprise respectively a name or an identifier of the ISP or the ASN number.

Alternatively or in addition, the first attribute type may correspond to a hardware of software of tunnel devices. The first attribute type may comprise the hardware of tunnel devices, such as stationary or portable values, respectively based on the tunnel device being stationary or portable. Alternatively or in addition, the first attribute type may comprises a software application (such as an operating system) installed, used, or operated, in tunnel devices, and the first values may comprise the type, make, model, or version of the software.

Alternatively or in addition, the first attribute type may correspond to a communication property, feature of a communication link of tunnel devices, such as corresponding to the respective connection to the Internet of tunnel devices or to the communication link of a tunnel device with the first server or the second server. The first attribute type may correspond to a bandwidth (BW) or Round-Trip delay Time (RTT) of the communication link, and the first value may be the respective estimation or measurement of the BW or RTT. Any method herein may further comprise estimating or measuring, by the first server or by a tunnel device, the BW or RTT of the communication link. Alternatively or in addition, the first attribute type may correspond to the technology or scheme used by the tunnel devices for connecting to the first server, and the first values may comprise wired or wireless values, respectively based on the tunnel device being connected to the Internet using wired or wireless connection.

The method may be used with a Domain Name System (DNS) server, and the content identifier comprises a domain name. Any method herein may further comprise performing, using the DNS server, a DNS resolution for obtaining a numerical IP address, and any message herein, such as the second message, may comprise the obtained numerical IP address.

Any communication herein, such as over the Internet with the second server or with the selected tunnel device, may be based on, may use, or may be compatible with, Transmission Control Protocol over Internet Protocol (TCP/IP) protocol or connection. Alternatively or in addition, any communication over the Internet herein, such as with the second server or with the selected tunnel device, may be based on, may use, or may be compatible with, HTTP or HTTPS protocol or connection, and one of the node may serve as an HTTP or HTTPS server respectively and the other node may serve as an HTTP or HTTPS client respectively. Further, the communication over the Internet with the second server or with the selected tunnel device may be based on, may use, or may be compatible with, HTTP or HTTPS protocol or connection, and the first server may serve as an HTTP or HTTPS server and respectively the second server or the selected tunnel device may serve as an HTTP or HTTPS client. Any communication over the Internet herein, such as with the second server or with the selected tunnel device, may be based on, may use, or may be compatible with, HTTPS protocol or connection, and any message herein, such as the first or second message, may be according to, may be based on, or may use, HTTPS frame or packet form. Any method may further comprise extracting, the content identifier using SSL sniffing. Any message herein, such as the first or second message, may comprise an attribute value corresponding to an attribute type, and any method herein may further comprise extracting the attribute value using SSL sniffing.

The communication over the Internet with the second server or with the selected tunnel device, may be based on, may use, or may be compatible with, Socket Secure (SOCKS) protocol or connection, and the first server may serve as an SOCKS server respectively and the second server or the selected tunnel device may serve as an SOCKS client respectively. Any SOCKS protocol or connection herein may be according to, may be based on, or may be compatible with, SOCKS4, SOCKS4a, or SOCKS5. Alternatively or in addition, the SOCKS protocol or connection may be according to, may be based on, or may be compatible with, IETF RFC 1928, IETF RFC 1929, IETF RFC 1961, or IETF RFC 3089. Alternatively or in addition, any communication over the Internet with the second server or with the selected tunnel device, may be based on, may use, or may be compatible with, Socket Secure (SOCKS) or WebSocket (ws), which may be WebSocket Secure (wss), protocol or connection, and the second server may serve as an SOCKS or WebSocket server and the selected tunnel device may serve as an WebSocket client. Any WebSocket protocol or connection herein may be according to, may be based on, or may be compatible with, IETF RFC 6455.

Further, any communication herein over the Internet with the second server or with the selected tunnel device, may be based on, may use, or may be compatible with, HTTP Proxy protocol or connection, and the first server may serve as an HTTP Proxy server respectively and the second server or the selected tunnel device may serve as an HTTP Proxy client respectively.

Each of the tunnel devices in the group may be associated with a single IP address. Alternatively or in addition, one or more of the tunnel devices in the group may be associated with multiple IP addresses, such as with more than 1,000, 2,000, 5,000, 10,000, 20,000, 50,000 or 100,000 distinct IP addresses. A primary or sole functionality of each of the one or more of the tunnel devices may be to serve as a selected tunnel device.

In any device (client or server) selection herein, such as when selecting a tunnel device, the device may be randomly selected. The device (such as a tunnel device) may be randomly selected using one or more random numbers generated by a random number generator, and the random number generator may be hardware based, and may be is using thermal noise, shot noise, nuclear decaying radiation, photoelectric effect, or quantum phenomena. Alternatively or in addition, the random number generator may be software based, and may be based on executing an algorithm for generating pseudo-random numbers.

A method for fetching a content identified by a content identifier to a client device from a web server by using tunnel devices may use a group of tunnel devices that may each be connected to the Internet and may each be addressable in the Internet using a respective IP address. A second server may be connected to the Internet and may be addressable in the Internet using a respective IP address. The method may comprise sending, to the second server, a request message that comprises the content identifier; and receiving, from the second server, the content in response to the request message. The method may be used with a first attribute type and with a first value relating to the first attribute type, each of the tunnel devices in the group may be associated with a first value relating to the first attribute type, and the request message may comprise one or more values associated with the first attribute type. The first value may comprise a numeric value or an identifier of a feature, a characteristic, or a property of the first attribute type, and the request message may comprise the one or more values, for selecting, of a tunnel device from the group, based on comparing the one or more values to the first value associated with the selected tunnel device.

The method may be used with a second attribute type, and each of the tunnel devices in the group may be associated with a second value relating to the second attribute type. The request message may comprise a first set of one or more values and a second set of one or more values for selecting of the tunnel device based on respectively comparing the first and second sets to the first and second values associated with the selected tunnel device. The first attribute type may comprise a geographical location, and each of the first values may comprise a name or an identifier of a continent, a country, a region, a city, a street, a ZIP code, or a timezone. Alternatively or in addition, the first value of each of the tunnel devices in the group or each of the IP addresses may be based on IP geolocation, which may be based on, or may use, W3C Geolocation API. The method may be used with a database associating IP addresses to geographical locations, and the database may be stored in the first server. The method may further comprise receiving and storing, by the first server, the database, and estimating or associating the first value to each of the tunnel devices in the group by the database. Alternatively or in addition, the first attribute type may comprise Internet Service Provider (ISP) or Autonomous System Number (ASN), and each of the first values may comprise respectively a name or an identifier of the ISP or the ASN number. Further, the first attribute type may correspond to a hardware of tunnel devices, and the first values may comprise stationary or portable values, respectively based on the tunnel device being stationary or portable. Alternatively or in addition, the first attribute type may comprises a software application (such as an operating system) installed, used, or operated, in tunnel devices, and the first values may comprise the type, make, model, or version of the software.

Alternatively or in addition, the first attribute type may correspond to a communication property, feature of a communication link of tunnel devices, such as to the respective connection to the Internet of tunnel devices, or to a communication link of a tunnel device with the web server, the first server, the second server, or the client device. The first attribute type may correspond to a bandwidth (BW) or Round-Trip delay Time (RTT) of the communication link, and the first value may be the respective estimation or measurement of the BW or RTT. The method may further comprise estimating or measuring, by the first server or by a tunnel device, the BW or RTT of the communication link. Further, the first attribute type may correspond to the technology or scheme used by the tunnel devices for connecting to the Internet, and the first values may comprise wired or wireless values, respectively based on the tunnel device being connected to the Internet using wired or wireless connection.

The method may use a Domain Name System (DNS) server, and the content identifier may comprise a domain name, and the method may further comprise performing, using the DNS server, a DNS resolution for obtaining a numerical IP address, and the request message may comprise the obtained numerical IP address.

The web server may use HyperText Transfer Protocol (HTTP) or HTTP Secure (HTTPS) for responding to respective HTTP or HTTPS requests via the Internet, and the content request may respectively be an HTTP or an HTTPS request. Further, the communication over the Internet between the client device and the second server, may be based on, may use, or may be compatible with, Transmission Control Protocol over Internet Protocol (TCP/IP) protocol or connection. Alternatively or in addition, the communication over the Internet between the client device and the second server, may be based on, may use, or may be compatible with, HTTP or HTTPS protocol or connection, and one of the node may serve as an HTTP or HTTPS server respectively and the other node may serve as an HTTP or HTTPS client respectively, such as where the second server serves as an HTTP or HTTPS server respectively and the client device serves as an HTTP or HTTPS client respectively.

Alternatively or in addition, the communication over the Internet between the client device and the second server may be based on, may use, or may be compatible with, Socket Secure (SOCKS) protocol or connection, and the second server may serve as an SOCKS server and the client device may serve as an SOCKS client. The SOCKS protocol or connection may be according to, may be based on, or may be compatible with, SOCKS4, SOCKS4a, or SOCKS5, or may be according to, may be based on, or may be compatible with, IETF RFC 1928, IETF RFC 1929, IETF RFC 1961, or IETF RFC 3089. Alternatively or in addition, any communication over the Internet between the client device and the second server may be based on, may use, or may be compatible with, Socket Secure (SOCKS) or WebSocket (ws), which may be WebSocket Secure (wss), protocol or connection, and the second server may serve as an SOCKS or WebSocket server and the selected tunnel device may serve as an WebSocket client. Any WebSocket protocol or connection herein may be according to, may be based on, or may be compatible with, IETF RFC 6455.

Further, the communication over the Internet between the client device and the second server, may be based on, may use, or may be compatible with, HTTP Proxy protocol or connection, and the second server may serve as an HTTP Proxy server and the client device may serve as an HTTP Proxy client.

At least part of steps of any method herein may be included in a Software development kit (SDK) that may be provided as a non-transitory computer readable medium containing computer instructions, and any method herein may further comprise installing the SDK. A method for fetching a content identified by a content identifier from a web server by using a tunnel device may use first and second servers and a tunnel device that are each connected to the Internet and are each addressable in the Internet using a respective IP address. The method by the tunnel device may comprise receiving, from the first or second server, a first message that comprises the content identifier; sending, to the web server, a content request that comprises the content identifier; receiving, from the web server, the content, in response to the content request; and sending, to the first or second server, the content. The first message may be received from the first server, and the content may be sent to the second server in response to the first message. Any sending, to the first or second server of the content may comprise exclusively sending, to the first server, the content; or sending, to the second server, the content. The first message may comprise the IP address of the second server.

Any tunnel device herein may be addressable in the Internet using a first IP address, and the method may further comprise sending, to the first server, a second message that may comprise at least one value relating to at least one attribute type associated with the tunnel device. The method may further comprise establishing a connection with the first server, and responding, to a communication initiating by the first server using the established connection. The established connection may be a TCP connection using 'Active OPEN', 'Passive OPEN', or TCP keepalive mechanism or may use, or may be based on, Virtual Private Network (VPN).

The method may further comprise in response to the receiving of the first message, initiating a communication, with the second server. The initiating of the communication may use, or may be based on, a Network Address Translator (NAT) traversal scheme, which may be according to, may be based on, or may use, Internet Engineering Task Force (IETF) Request for Comments (RFC) 2663, IETF RFC 3715, IETF RFC 3947, IETF RFC 5128, IETF RFC 5245, IETF RFC 5389, or IETF RFC 7350. Further, the NAT traversal scheme may be according to, may be based on, or may use, Traversal Using Relays around NAT (TURN), Socket Secure (SOCKS), NAT 'hole punching', Session Traversal Utilities for NAT (STUN), Interactive Connectivity Establishment, (ICE), UPnP Internet Gateway Device Protocol (IGDP), or Application-Level Gateway (ALG).

The communication over the Internet with the first or second server, may be based on, may use, or may be compatible with, Transmission Control Protocol over Internet Protocol (TCP/IP) protocol or connection. Further, the communication over the Internet with the first or second server, may be based on, may use, or may be compatible with, HTTP or HTTPS protocol or connection, and the first or second server may serve as an HTTP or HTTPS server and the tunnel device may serve as an HTTP or HTTPS client. Alternatively or in addition, the communication over the Internet with the first or second server, may be based on, may use, or may be compatible with, Socket Secure (SOCKS) protocol or connection, and the first or second server may serve as an SOCKS server and the tunnel device may serve as an SOCKS client. The SOCKS protocol or connection may be according to, may be based on, or may be compatible with, SOCKS4, SOCKS4a, SOCKS5, IETF RFC 1928, IETF RFC 1929, IETF RFC 1961, or IETF RFC 3089. Alternatively or in addition, any communication over the Internet with the first or second server, may be based on, may use, or may be compatible with, Socket Secure (SOCKS) or WebSocket (ws), which may be WebSocket Secure (wss), protocol or connection, and the second server may serve as an WebSocket server and the selected tunnel device may serve as an WebSocket client. Any WebSocket protocol or connection herein may be according to, may be based on, or may be compatible with, IETF RFC 6455. Alternatively or in addition, the communication over the Internet with the first or second server, may be based on, may use, or may be compatible with, HTTP Proxy protocol or connection, and the first or second server may serve as an HTTP Proxy server and the tunnel device may serve as an HTTP Proxy client.

Any device herein, such as any tunnel device, may further be operating in multiple states that includes at least an idle state and non-idle states. The method may further comprise responsive to being in one of the non-idle states, determining, if an idling condition is met; responsive to the determination that the idling condition is met, shifting to the idle state; responsive to being in the idle state, determining if an idling condition is met; and responsive to the determination that the idling condition is not met, shifting to one of the non-idle states. The method may further comprise sending, to the first server, a message responsive to the tunnel device state. Further, the method may further comprise sending, to the first server, a first status message in response to shifting to the idle state; and sending, to the first server, a second status message in response to shifting to a non-idle state.

The method may further comprise operating, an operating system or a program process or thread, and the idling condition may be determined to be met based on, or according to, activating or executing the process or thread by the operating system or the program. The process or thread may comprise any low-priority or background task, an idle process, or a screensaver. Alternatively or in addition, the process or thread may comprise using the entire screen for displaying. The method may further comprise monitoring or metering, a resource utilization, and the idling condition may be determined to be met based on, or according to, the monitored or metered resource utilization being under a threshold. The resource utilization may comprise the utilization of a processor in the tunnel device.

Alternatively or in addition, the tunnel device may comprise an input device for obtaining an input from a human user or operator, the method further comprise sensing, using the input device, the input, and the idling condition may be determined to be met based on, or according to, not receiving an input from the input device for a pre-set time interval. Any input device herein may comprise a pointing device, a keyboard, a touchscreen, or a microphone. Alternatively or in addition, the tunnel device may comprise a motion sensor for sensing motion, acceleration, vibration, or location change of the tunnel device, the method may further comprise sensing, using the motion sensor, the tunnel device motion, acceleration, vibration, or location change, and the idling condition may be determined to be met based on, or according to, respectively sensing the motion, the vibration, the acceleration, or the location change being under a threshold. Any motion sensor herein may comprise an accelerometer, gyroscope, vibration sensor, or a Global Positioning System (GPS) receiver.

Alternatively or in addition, the tunnel device may comprise a network interface or a network transceiver for communication over a network, the method may further comprise metering, an amount of data transmitted to, or received from, the network during a time interval, and the idling condition may be determined to be met based on, or according to, the metered amount of data being under a threshold level. Further, the tunnel device may comprise a battery, the method may further comprise metering or sensing, a battery charging level, and the idling condition may be determined to be met based on, or according to, the metered or sensed charge level being over a threshold level. The metering or sensing may use a Battery Management System (BMS), and the threshold level may be above 40%, 50%, 60%, 70%, 80%, or 90% of the battery defined full charge capacity.

Any tunnel device herein may be associated with a first value relating to a first attribute type, and the first value may comprise a numeric value or an identifier of a feature, a characteristic, or a property of the first attribute type. The method may further comprise sending, to the first server, the first value to the first server. The method may use a second attribute type, the tunnel device may be associated with a second value relating to the second attribute type, and the method may further comprise sending, to the first server, the second value. The first attribute type may comprise a geographical location, and each of the first values may comprise a name or an identifier of a continent, a country, a region, a city, a street, a ZIP code, or a timezone. The first value may be based on IP geolocation that may be based on W3C Geolocation API. The method may use any database associating IP addresses to geographical locations. Furthermore, any first attribute type herein may comprise Internet Service Provider (ISP) or Autonomous System Number (ASN), and the first value may comprise a name or an identifier of the ISP or the ASN number.

Any method herein may be used with a plurality of servers that includes the first server, and each of the plurality of servers may be connectable to the Internet and may be addressable in the Internet using a respective IP address. Any method herein may further comprise selecting, such as randomly selecting, the first server from the plurality of servers. The first server may be randomly selected using one or more random numbers generated by a random number generator, which may be hardware based, such as using thermal noise, shot noise, nuclear decaying radiation, photoelectric effect, or quantum phenomena. Alternatively or in addition, the random number generator may be software based, such as based on executing an algorithm for generating pseudo-random numbers. Alternatively or in addition, the method may be used with a plurality of servers that may include the first server, and each of the plurality of servers may be connectable to the Internet, and may be addressable in the Internet using a respective IP address. The method may further comprise selecting, the first server from the plurality of servers; and sending, to the selected first server, a second message. Any method herein may further comprise selecting, such as randomly selecting, the first server from the plurality of servers. The first server may be randomly selected using one or more random numbers generated by a random number generator, which may be hardware based, such as using thermal noise, shot noise, nuclear decaying radiation, photoelectric effect, or quantum phenomena. Alternatively or in addition, the random number generator may be software based, such as based on executing an algorithm for generating pseudo-random numbers.

Each of the plurality of servers may be associated with a one of more attribute values relating to an attribute type, and the first server may be selected from the plurality of servers based on, or according to, the respective one of more attribute values. The attribute type may be a geographical location, and one of more attribute values may comprise a name or an identifier of a continent, a country, a region, a city, a street, a ZIP code, or a timezone. Further, each of the one of more attribute values may be based on actual geographical location or on IP geolocation, such as W3C Geolocation API. The first message may further comprise the one of more attribute values.

The method may be used with a Domain Name System (DNS) server, and the content identifier may comprise a domain name. The method may further comprise performing, using the DNS server, a DNS resolution for obtaining a numerical IP address, and the first message or the content request may comprise the obtained numerical IP address. Any tunnel device herein may be associated with a single IP address or with multiple IP addresses. Any tunnel device herein may be associated with more than 1,000, 2,000, 5,000, 10,000, 20,000, 50,000 or 100,000 distinct IP addresses. Further, a primary or sole functionality of any tunnel device may be to serve as a tunnel device executing any method herein. The method may further comprising storing, operating, or using, a client operating system, which may consist of, may comprise, or may be based on, one out of Microsoft Windows 7, Microsoft Windows XP, Microsoft Windows 8, Microsoft Windows 8.1, Linux, and Google Chrome OS. Alternatively or in addition, the method may further comprise storing, operating, or using, a web browser, which may consist of, comprise, or may be based on, Microsoft Internet Explorer, Google Chrome, Opera™, or Mozilla Firefox®. Further, the web browser may be a mobile web browser, such as Safari, Opera Mini™, or Android web browser. Any Operating System (OS) herein, such as any server or client operating system, may consist of, include, or be based on a real-time operating system (RTOS), such as FreeRTOS, SafeRTOS, QNX, VxWorks, or Micro-Controller Operating Systems (µC/OS).

Any tunnel device herein may be integrated in part or entirely in an appliance, and a primary functionality of the appliance may be associated with food storage, handling, or preparation. The primary function of the appliance is heating food, and the appliance may be a microwave oven, an electric mixer, a stove, an oven, or an induction cooker. Alternatively or in addition, the appliance may be a refrigerator, a freezer, a food processor, a dishwasher, a food blender, a beverage maker, a coffeemaker, or an iced-tea maker. Further, the primary function of the appliance may be associated with environmental control, and the appliance may consist of, or may be part of, an HVAC system. Alternatively or in addition, the primary function of the appliance may be associated with temperature control, and the appliance may be an air conditioner or a heater. Further, the primary function of the appliance may be associated with cleaning, the primary function may be associated with clothes cleaning, and the appliance may be a washing machine or a clothes dryer, or the appliance may be a vacuum cleaner. Alternatively or in addition, the primary function of the appliance may be associated with water control or water heating. Further, the appliance may be an answering machine, a telephone set, a home cinema method, a HiFi method, a CD or DVD player, an electric furnace, a trash compactor, a smoke detector, a light fixture, or a dehumidifier. Alternatively or in addition, the appliance may be a battery-operated portable electronic device, such as a notebook, a laptop computer, a media player, a cellular phone, a Personal Digital Assistant (PDA), an image processing device, a digital camera, a video recorder, or a handheld computing device.

Any integration herein, such as with any appliance, may involve sharing a component, such as housing in same enclosure, sharing same processor, or mounting onto same surface. Further, any integration herein may involve sharing a same connector, such as a power connector for connecting to a power source, and the integration may involve sharing the same connector for being powered from same power source, or the integration may involve sharing same power supply.

Any device herein, such as any tunnel device herein, may be housed in a single enclosure that may be a hand-held enclosure or a portable enclosure, and may further be integrated with at least one of a notebook computer, a laptop computer, a media player, a Digital Still Camera (DSC), a Digital video Camera (DVC or digital camcorder), a Personal Digital Assistant (PDA), a cellular telephone, a digital camera, a video recorder, or a smartphone. Any smartphone herein may comprise, or may be based on, an Apple iPhone 6 or a Samsung Galaxy S6. Any method herein, such as any method by any tunnel device, may further comprise storing, operating, or using an operating system, which may be a mobile operating system such as Android version 2.2 (Froyo), Android version 2.3 (Gingerbread), Android version 4.0 (Ice Cream Sandwich), Android Version 4.2 (Jelly Bean), Android version 4.4 (KitKat), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system.

Any device herein, such as any tunnel device herein, may perform as part of any method herein, connecting to the Internet, via a wireless network. The wireless network may comprise, or may consist of, a Wireless Wide Area Network (WWAN), which may be a wireless broadband network, such as a WiMAX network that is according to, compatible with, or based on, IEEE 802.16-2009. Further, any wireless network herein may comprise, or may consist of, a cellular telephone network, such as a Third Generation (3G) network that uses a protocol selected from the group consisting of UMTS W-CDMA, UMTS HSPA, UMTS TDD, CDMA2000 1×RTT, CDMA2000 EV-DO, and GSM EDGE-Evolution, or the cellular telephone network may use a protocol selected from the group consisting of a Fourth Generation (4G) network that uses HSPA+, Mobile WiMAX, LTE, LTE-Advanced, MBWA, or is based on IEEE 802.20-2008. Alternatively or in addition, the wireless network may comprise, or may consist of, a Wireless Personal Area Network (WPAN), which may be according to, may be compatible with, or may be based on, Bluetooth™, Bluetooth Low Energy (BLE), or IEEE 802.15.1-2005standards, or the WPAN may be a wireless control network that may be according to, or based on, Zigbee™, IEEE 802.15.4-2003, or Z-Wave™ standards. Alternatively or in addition, any wireless network herein may comprise, or may consist of, a Wireless Local Area Network (WLAN), which may be according to, may be compatible with, or may be based on, a standard selected from the group consisting of IEEE 802.11-2012, IEEE 802.11a, IEEE 802.11b, IEEE 802.11g, IEEE 802.11n, and IEEE 802.11ac.

Any method herein may be used with a virtualization, where at least one of the steps may be executed as part of a virtualized application as part of a Virtual Machine (VM). Alternatively or in addition, the client device or any part thereof, the web server or any part thereof, at least one of the multiple tunnel devices or any part thereof, the first server or any part thereof, or the second server or any part thereof, may be implemented as virtual hardware. Further, any method herein may be used with a host computer that may implement the VM, and any method herein may further comprise executing, by the host computer, a hypervisor or a Virtual Machine Monitor (VMM), and any virtualized application herein or any hardware herein may use or may interface virtual hardware. Any virtualization herein may include, may be based on, or may uses, full virtualization, para-virtualization, or hardware assisted virtualization. At least two devices that may be selected from a group consisting of the client device, the web server, at least one of the multiple tunnel devices, the first server, and the second server, may be implemented as virtual hardware, and the at least two devices may be virtualized by the same host computer that implements the VM.

Any method herein may be used with a virtualization, and any communication between any two entities selected from a group consisting of the client device, the web server, at least one of the multiple tunnel devices, the first server, and the second server, may be executed as a virtualized network as part of a Virtual Machine (VM). Further, any method herein may be used with a host computer that may implement the VM, and any method herein may further comprise executing, by the host computer, a hypervisor or a Virtual Machine Monitor (VMM), and the virtualized network may use or may interface virtual hardware. Any such network or communication virtualization may include, may be based on, or may use, full virtualization, para-virtualization, or hardware assisted virtualization.

Any method herein may further comprise storing, operating, or using, an operating system, such as part of the client device, the web server, at least one of the multiple tunnel devices, the first server, the second server, or any combination thereof. The operating system may be executed as a guest operating system as part of a Virtual Machine (VM). Any method herein may be uses with a host computer that implement the VM, and the method may further comprise executing, by the host computer, a hypervisor or a Virtual Machine Monitor (VMM), and the guest operating system may use or may interface virtual hardware. Such virtualization may include, may be based on, or may use, full virtualization, para-virtualization, or hardware assisted virtualization.

The above summary is not an exhaustive list of all aspects of the present invention. Indeed, it is contemplated that the invention includes all systems and methods that can be practiced from all suitable combinations and derivatives of the various aspects summarized above, as well as those disclosed in the detailed description below and particularly pointed out in the claims filed with the application. Such combinations have particular advantages not specifically recited in the above summary.

BRIEF DESCRIPTION OF THE DRAWINGS

The invention is herein described, by way of non-limiting examples only, with reference to the accompanying drawings, wherein like designations denote like elements. Understanding that these drawings only provide information concerning typical embodiments of the invention and are not therefore to be considered limiting in scope:

FIG. 10 illustrates schematically a table of data relating to available tunnel devices and their attributes stored in the TB server;

FIG. 33 illustrates schematically a table of data relating to available tunnel devices associated with an idle state and their attributes stored in the TB server;

FIG. 39 illustrates schematically a table relating to a prior-art PAC file structure;

FIG. 41*b* illustrates schematically an updated PAC file;

FIG. 45 illustrates schematically a table associating usage counting values to sets of web server and intermediate device countries;

FIG. 45*a* illustrates schematically a table associating usage counting values to sets of customer and intermediate device countries;

FIG. 47 illustrates schematically a table relating to quotas and actual utilizations of a non-direct fetching service according to customer identifications;

FIG. 48 illustrates schematically a table of relating to quotas and actual utilizations of a non-direct fetching service according to various URLs.

DETAILED DESCRIPTION

Figure 1:
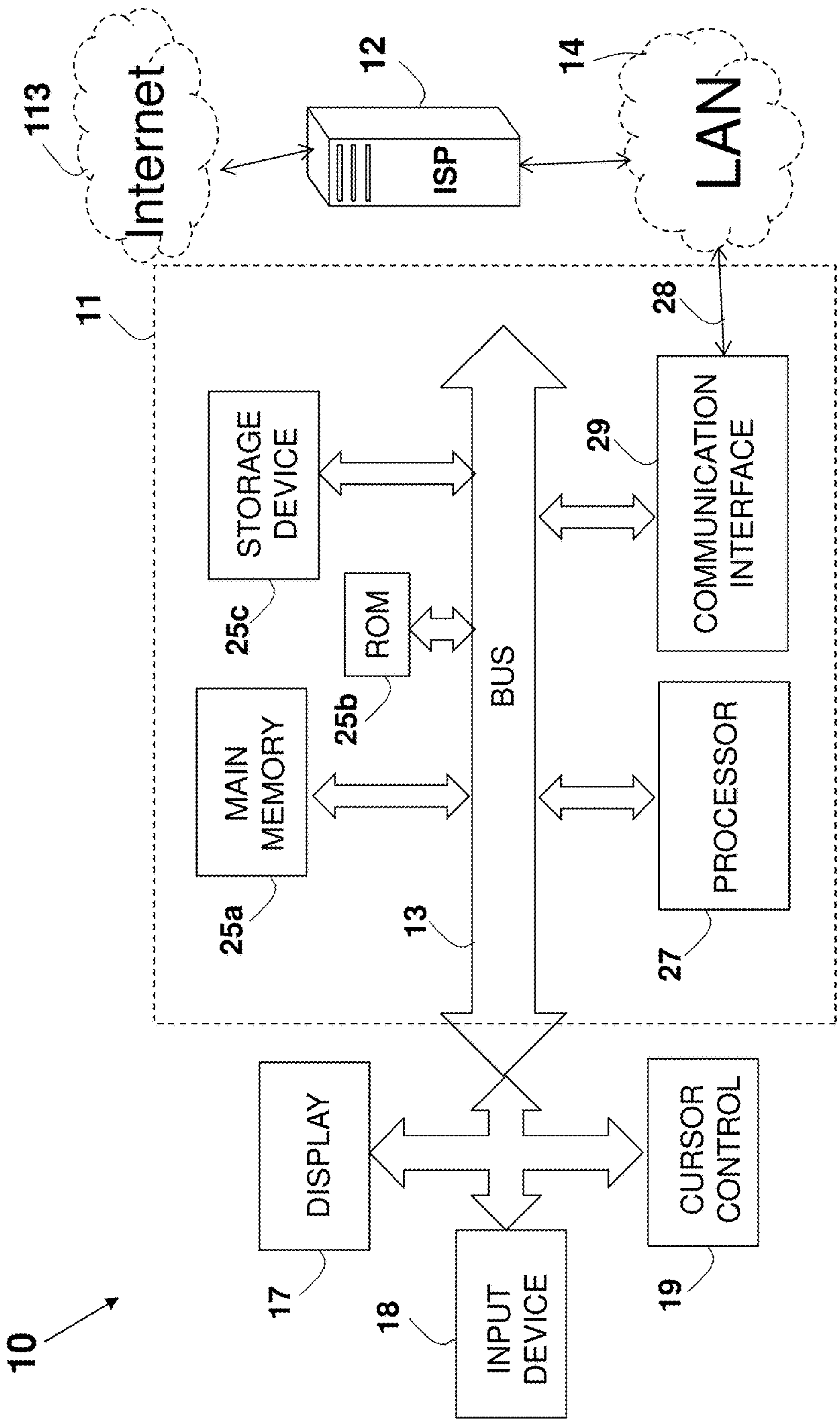
FIG. 1 illustrates schematically a block diagram of a computer connected to the Internet.

The principles and operation of an apparatus or a method according to the present invention may be understood with reference to the figures and the accompanying description wherein identical or similar components (either hardware or software) appearing in different figures are denoted by identical reference numerals. The drawings and descriptions are conceptual only. In actual practice, a single component can implement one or more functions; alternatively or in addition, each function can be implemented by a plurality of components and devices. In the figures and descriptions, identical reference numerals indicate those components that are common to different embodiments or configurations. Identical numerical references (in some cases, even in the case of using different suffix, such as 5, 5*a*, 5*b* and 5*c*) refer to functions or actual devices that are either identical, substantially similar, similar, or having similar functionality. It will be readily understood that the components of the present invention, as generally described and illustrated in the figures herein, could be arranged and designed in a wide variety of different configurations. Thus, the following more detailed description of the embodiments of the apparatus, system, and method of the present invention, as represented in the figures herein, is not intended to limit the scope of the invention, as claimed, but is merely representative of embodiments of the invention. It is to be understood that the singular forms "a," "an," and "the" herein include plural referents unless the context clearly dictates otherwise. Thus, for example, reference to "a component surface" includes reference to one or more of such surfaces. By the term "substantially" it is meant that the recited characteristic, parameter, or value need not be achieved exactly, but that deviations or variations, including, for example, tolerances, measurement error, measurement accuracy limitations and other factors known to those of skill in the art, may occur in amounts that do not preclude the effect the characteristic was intended to provide.

Each of devices herein may consist of, include, be part of, or be based on, a part of, or the whole of, the computer 11 or the system 10 shown in FIG. 1. Each of the servers herein may consist of, may include, or may be based on, a part or a whole of the functionalities or structure (such as software) of any server described in the '604 patent, such as the web server, the proxy server, or the acceleration server. Each of the clients or devices herein may consist of, may include, or may be based on, a part or a whole of the functionalities or structure (such as software) of any client or device described in the '604 patent, such as the peer, client, or agent devices.

Each of the servers herein may consist of, may include, or may be based on, a part or a whole of the functionalities or structure (such as software) of any server described in the '044 patent, such as the web server, the proxy server, or the acceleration server. Each of the clients or devices herein may consist of, may include, or may be based on, a part or a whole of the functionalities or structure (such as software) of any client or device described in the '044 patent, such as the peer, client, or agent devices. Each of the tunnel devices herein may consist of, may include, or may be based on, a part or a whole of the functionalities or structure (such as software) of any tunnel device described in the '044 patent, such as the peer, client, or agent devices.

Any of the steps or the flow charts described herein may be included as a Software Development Kit (SDK) that is provided as a non-transitory computer readable medium containing computer instructions. The SDK may be installed in a respective device, either client or a server, to be executed by a processor in that device.

Figure 7:
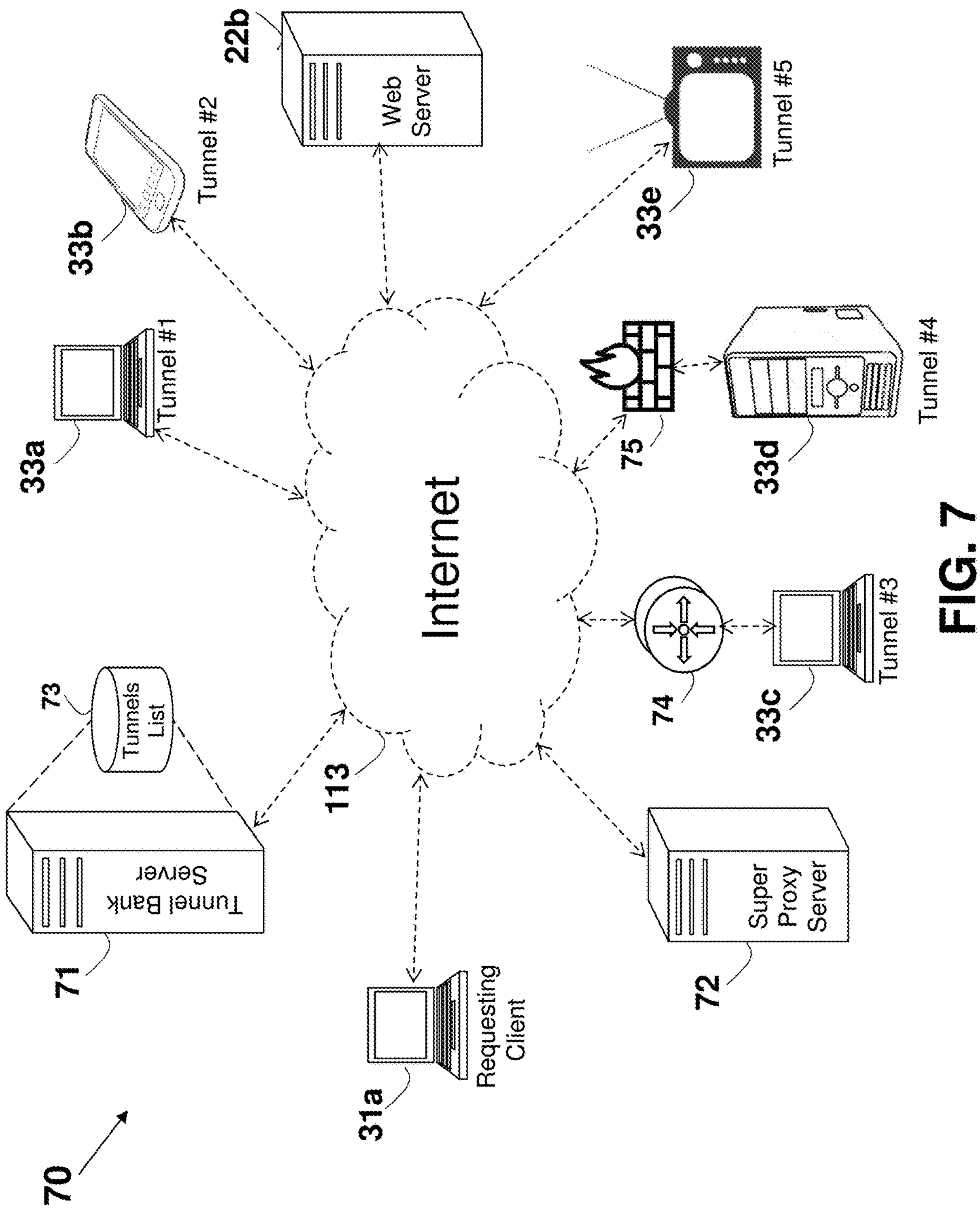
FIGS. 7 and 7*a* depict schematically a client device, tunnel devices, and servers connected to the Internet.

An example of an arrangement 70 for retrieving content by the requesting client device 31*a* from the web server 22*b* is shown in FIG. 7. Multiple Internet-connected devices may serve as tunnel devices, such as a tunnel #1 laptop device 33*a*, a tunnel #2 smartphone device 33*b*, a tunnel #3 laptop device 33*c*, a tunnel #4 desktop device 33*d*, and a tunnel #5 'Smart TV' device 33*e*. The content fetching may be handled, managed, and aided by using a Super-Proxy (SP) server 72 and a Tunnel Bank (TB) server 71.

The TB server 71 is used for storing a list of the available tunnel devices, such as their IP addresses together with attribute values that corresponds to one or more attribute types. The available tunnels list is stored in a memory 73 that is part of, integrated with, connected to, or in communication with, the TB server 71. The SP server 72 receives the content request from the requesting client 31*a*, and manages the content fetching using the TB server 71. The TB server 71 and the SP server 72 may be separated devices located at different geographic locations, as shown in the arrangement 70, may be located in a single location, or may be integrated into a single device or server that combines the functionalities of both servers.

Any device that is available for communicating over the Internet 113 may serve as a tunnel device. Any tunnel device may consist of, include, be part of, or be based on, a part of, or the whole of, the computer 11 or the system 10 shown in FIG. 1. Any tunnel device may be any computer system, either stationary (such as the desktop 33*d*) or portable (such as the laptop 33*c*). Further, any tunnel device may be a smartphone (such as the smartphone 33*b*), or may be an appliance, such as the television set 33*e*. Further, any tunnel device herein may comprise, consist of, or include a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or a non-portable device. Further, any device or network element herein may comprise, consist of, or include a major appliance (white goods) and may be an air conditioner, dishwasher, clothes dryer, drying cabinet, freezer, refrigerator, kitchen stove, water heater, washing machine, trash compactor, microwave oven and induction cooker. The appliance may similarly be a 'small' appliance such as TV set, CD or DVD player, camcorder, still camera, clock, alarm clock, video game console, HiFi or home cinema, telephone or answering machine Furthermore, a tunnel device may be integrated with an appliance. The appliance primary function may be associated with food storage, handling, or preparation, such as microwave oven, an electric mixer, a stove, an oven, or an induction cooker for heating food, or the appliance may be a refrigerator, a freezer, a food processor, a dishwasher, a food blender, a beverage maker, a coffeemaker, or an iced-tea maker. Further, the appliance primary function may be associated with environmental control such as temperature control, and the appliance may consist of, or may be part of, an HVAC system, an air conditioner or a heater. Furthermore, the appliance primary function may be associated with cleaning, such as a washing machine, a clothes dryer for cleaning clothes, or a vacuum cleaner. The appliance primary function may be associated with water control or water heating. The appliance may be an answering machine, a telephone set, a home cinema system, a HiFi system, a CD or DVD player, an electric furnace, a trash compactor, a smoke detector, a light fixture, or a dehumidifier. The appliance may be a handheld computing device or a battery-operated portable electronic device, such as a notebook or laptop computer, a media player, a cellular phone, a Personal Digital Assistant (PDA), an image processing device, a digital camera, or a video recorder. The integration with the appliance may involve sharing a component such as housing in the same enclosure, sharing the same connector such as sharing a power connector for connecting to a power source, where the integration involves sharing the same connector for being powered from the same power source. The integration with the appliance may involve sharing the same power supply, sharing the same processor, or mounting onto the same surface.

While 5 tunnel devices are shown in the example of the arrangement 70, any number of tunnels may be equally used. Preferably, the number of tunnel devices that are used may be above 5,000, 10,000, 20,000, 50,000, 100,000, 200,000, 500,000, 1,000,000, 2,000,000, 5,000,000, or 10,000,000.

A tunnel device may connects to the Internet 113 directly, such as the tunnel #1 33*a* and tunnel #2 33*b* shown to directly connect to the Internet 113 as part of the arrangement 70 shown in FIG. 7. Direct connection herein refers to the ability of any Internet connected device or server, such as the TB server 71 and the SP server 72, to communicate, or too initiate a communication session, with the Internet-connected device. Alternatively, a tunnel device may be connected to the Internet via a filtering device, such as a router, gateway, or a firewall. For example, the tunnel #3 33*c* is shown connected to the Internet 113 via a router device (or functionality) 74, and the tunnel #4 33*d* is shown connected to the Internet 113 via the a firewall device (or functionality) 75. Such filtering devices are typically used for data security, and may filter communication to, or from, the Internet relating to a connected device. In one example, only pre-approved IP addresses may initiate a communication session over the Internet with a device connected via such filtering mechanism. For example, the TB server 71 or the SP server 72 may not initiate a communication the tunnel #3 33*c* or with the tunnel #4 33*d* since such communication may be blocked by the respective router device 74 or firewall device 75.

Figure 7A:
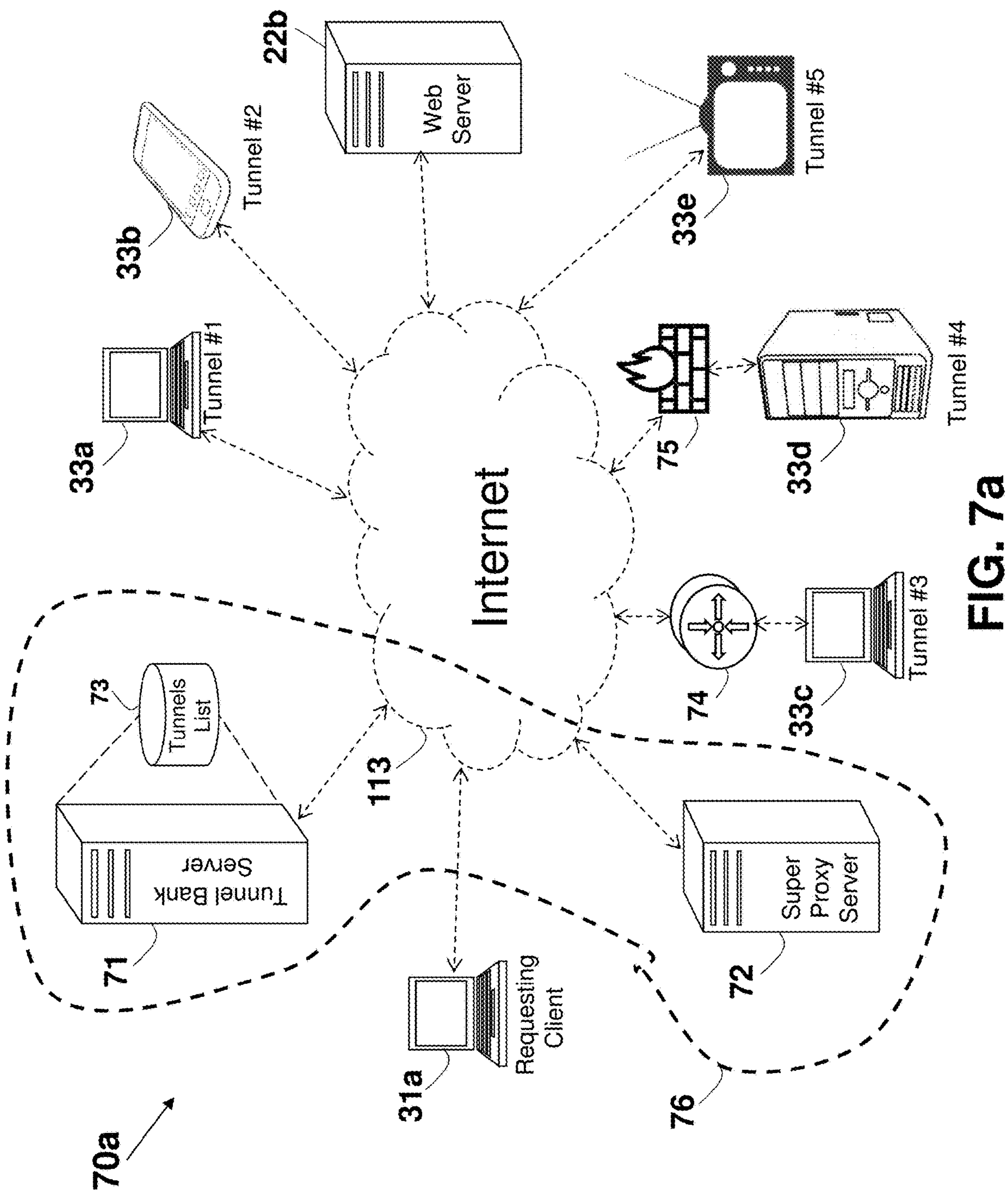

In one example, the two servers cooperatively used for assisting in the content fetching, namely the SP server 72 and the TB server 71, are owned, operated, managed, or controlled by a same entity 76, as shown in an arrangement 70*a* shown in FIG. 7*a*. In such a case, the entity 76 may provide the service of fetching content from the web server 22*b* via the various tunnels as a service, which may be a paid service.

Any content herein may consist of, or may comprise, data such as files, text, numbers, audio, voice, multimedia, video, images, music, computer programs or any other sequence of instructions, as well as any other form of information represented as a string of bits, bytes, or characters. In one example, the content may include, be a part of, or a whole of, a URL or a website page.

Each tunnel device may be associated with one or more attribute values corresponding to one or more attribute types. A table 100 shown in FIG. 10 describes an example of various attributes types and values or various (available for use) tunnel devices. A top row 101 names the attribute type of other tunnel related information, and each of the other rows may correspond to a single tunnel device. For example, a first content row 101*a* may correspond to the tunnel #1 33*a*, a second row 101*b* may correspond to the tunnel #2 33*b*, a third row 101*c* may correspond to the tunnel #3 33*c*, a fourth row 101*d* may correspond to the tunnel #4 33*d*, a fifth row 101*e* may correspond to the tunnel #5 33*e*, a sixth row 101*f* may correspond to a sixth tunnel, and a seventh row 101*g* may correspond to a seventh tunnel.

An attribute type may relate to a timing of an operation or activity by a tunnel device. A first column 102*a*, named 'Date-Time', may correspond to a timing on an event relating to the respective tunnel operation, such as a last time when the tunnel device connected to the Internet, or when the tunnel device connected to a specific entity, such as to the TB server 71 or the SP server 72. In the examples shown in the table 100, a relating timing information relating the first tunnel corresponding to the first row 101*a* is shown as a date 3/5 and a time 19:35, a relating timing information relating the second tunnel corresponding to the second row 101*b* is shown as a date 3/5 and a time 19:38, a relating timing information relating the third tunnel corresponding to the third row 101*c* is shown as a date 5/5 and a time 00:05, a relating timing information relating the fourth tunnel corresponding to the fourth row 101*d* is shown as a date 11/5 and a time 00:07, a relating timing information relating the fifth tunnel corresponding to the fifth row 101*e* is shown as a date 12/5 and a time 00:15, a relating timing information relating the sixth tunnel corresponding to the sixth row 101*f* is shown as a date 12/5 and a time 05:38, and a relating timing information relating the seventh tunnel corresponding to the seventh row 101*g* is shown as a date 12/5 and a time 22:13.

Alternatively or in addition, the attribute type may be associated with the communication link involving the connecting of a tunnel device to the Internet 113. For example, the type of connection of the device may be used as an attribute type, such as being a wired or a wireless connection. Further, the related attribute type may include the protocol or technology used for connecting the respective tunnel to the Internet 113, as exampled in a column 'Connection Type' 102*e* in the table 100. In the examples shown in the table 100, a relating communication protocol information relating the first tunnel corresponding to the first row 101*a* is shown as a value of Very High Speed Subscriber Line (VDSL) technology, a relating communication protocol information relating the second tunnel corresponding to the second row 101*b* is shown as a value of Third Generation (3G), a relating communication protocol information relating the third tunnel corresponding to the third row 101*c* is shown as a value of Data Over Cable Service Interface Specification (DOCSIS), a relating communication protocol information relating the fourth tunnel corresponding to the fourth row 101*d* is shown as a value of Asymmetric Digital Subscriber Line (ADSL), a relating communication protocol information relating the fifth tunnel corresponding to the fifth row 101*e* is shown as a value of WiFi, a relating communication protocol information relating the sixth tunnel corresponding to the sixth row 101*f* is shown as a value of 4G.LTE, and a relating communication protocol information relating the seventh tunnel corresponding to the seventh row 101*g* is shown as a value of ADSL.

Alternatively or in addition, the attribute type may be associated with the communication link involving the communication of a tunnel device with another entity over the Internet 113, such as communication with the TB server 71, the SP server 72, or the web server 22*b*. For example, the bandwidth (BW) or the RTT of such communication of the device may be used as an attribute type, as exampled in columns 'BW' 102*g* and 'RTT' 102*h* in the table 100. In the examples shown in the table 100, a relating communication metrics information relating the first tunnel corresponding to the first row 101*a* is shown as a BW value of 1000 (Kb/s) and a RTT value of 30 (ms), a relating communication metrics information relating the second tunnel corresponding to the second row 101*b* is shown as a BW value of 350 (Kb/s) and a RTT value of 70 (ms), a relating communication metrics information relating the third tunnel corresponding to the third row 101*c* is shown as a BW value of 2500 (Kb/s) and a RTT value of 540 (ms), a relating communication metrics information relating the fourth tunnel corresponding to the fourth row 101*d* is shown as a BW value of 1400 (Kb/s) and a RTT value of 170 (ms), a relating communication metrics information relating the fifth tunnel corresponding to the fifth row 101*e* is shown as a BW value of 1200 (Kb/s) and a RTT value of 120 (ms), a relating communication metrics information relating the sixth tunnel corresponding to the sixth row 101*f* is shown as a BW value of 2100 (Kb/s) and a RTT value of 230 (ms), and a relating communication metrics information relating the seventh tunnel corresponding to the seventh row 101*g* is shown as a BW value of 800 (Kb/s) and a RTT value of 310 (ms).

Alternatively or in addition, the attribute type may be associated with the tunnel connection scheme to the Internet, such as identification of the ISP or the associated ASN relating to the ISP, to the tunnel device, or to the Internet connection scheme. In the examples shown in the table 100, a column named 'ASN' 102*d* may be used, a value of the ASN corresponding to the first row 101*a* is shown as 3215 (corresponding to Orange France), a value of the ASN corresponding to the second row 101*b* is shown as 3209 (corresponding to Vodafone Germany), a value of the ASN corresponding to the third row 101*c* is shown as 12079 (corresponding to Verizon Wireless USA), a value of the ASN corresponding to the fourth row 101*d* is shown as 16345 (corresponding to Beeline Russia), a value of the ASN corresponding to the fifth row 101*e* is shown as 30148 (corresponding to Zain Saudi-Arabia), a value of the ASN corresponding to the sixth row 101*f* is shown as 9498 (corresponding to Bharti Airtel India), and a value of the ASN corresponding to the seventh row 101*g* is shown as 11419 (corresponding to Telefonica Brazil).

Alternatively or in addition, the attribute type may be associated with the tunnel device itself, such as its location. The location may be based on an actual physical geographical location or an IP geolocation. In the examples shown in the table 100, a column named 'Geographical Location' 102*c* may be used. A value of the location corresponding to the first row 101*a* is shown as 'Paris, France', a value of the location corresponding to the second row 101*b* is shown as 'Munich, Germany', a value of the location corresponding to the third row 101*c* is shown as 'Boston, Massachusetts, USA', a value of the location corresponding to the fourth row 101*d* is shown as 'Moskow, Russia', a value of the location corresponding to the fifth row 101*e* is shown as 'Riad, Saudi-Arabia', a value of the location corresponding to the sixth row 101*f* is shown as 'Mumbai, India', and a value of the location corresponding to the seventh row 101*g* is shown as 'San-Paulo, Brazil'.

Alternatively or in addition, the attribute type may be associated with the tunnel device itself, such as its structure, functionalities, or features. The attribute type may relate to hardware, software, or any combination thereof. For example, the type of the tunnel device may be used, such as being stationary or portable. Further, the processing power or the processor type may be used. For example, the type, make, and version of the any software may be used, such as the operating system, as exampled in an 'Operating System' column 102*f* in the table 100. In the examples shown in the table 100, a relating operating system relating to the first tunnel corresponding to the first row 101*a* is shown as 'Chrome 2.0', a relating operating system relating to the second tunnel corresponding to the second row 101*b* is shown as 'iOS 3.0', a relating c operating system relating to the third tunnel corresponding to the third row 101*c* is shown as 'Windows 10', a relating operating system relating the fourth tunnel corresponding to the fourth row 101*d* is shown as 'Windows 7', a relating operating system relating the fifth tunnel corresponding to the fifth row 101*e* is shown as 'Android 2.0', a relating operating system relating the sixth tunnel corresponding to the sixth row 101*f* is shown as 'iOS 4.0', and a relating operating system relating the seventh tunnel corresponding to the seventh row 101*g* is shown as 'Chrome 3.0'.

The tunnels devices may primarily be identified by their corresponding IP address, as exampled in a 'Tunnel IP Address' column 102*b* in the table 100. In the examples shown in the table 100, an IP address of the first tunnel corresponding to the first row 101*a* is shown as 80.12.105.150, an IP address of the second tunnel corresponding to the second row 101*b* is shown as 176.94.1.17, an IP address of the third tunnel corresponding to the third row 101*c* is shown as 162.115.192.24, an IP address of relating the fourth tunnel corresponding to the fourth row 101*d* is shown as 83.220.232.67, an IP address of the fifth tunnel corresponding to the fifth row 101*e* is shown as 185.93.228.98, an IP address of the sixth tunnel corresponding to the sixth row 101*f* is shown as 59.144.192.23, and an IP address of the seventh tunnel corresponding to the seventh row 101*g* is shown as 200.196.224.89.

Figure 8:
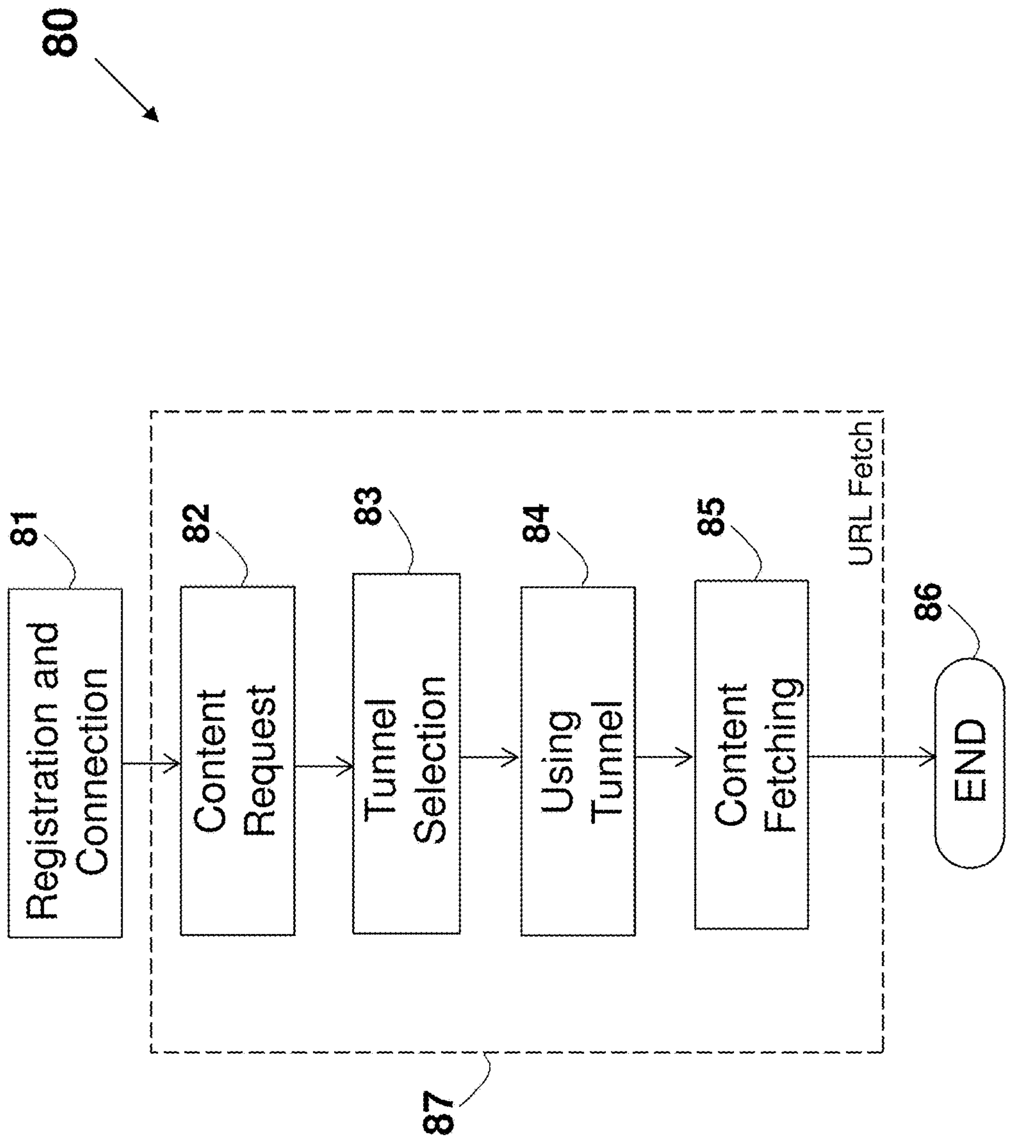
FIG. 8 illustrates schematically a simplified flowchart of a method for selecting and using a tunnel device for fetching content.

The general flow of the system operation for fetching content (such as URL) to the requesting client 31*a* from the web server 22*b* using tunnels based on the arrangement 70 shown in FIG. 7, is described in a flow chart 80 in FIG. 8. A "Registration and Connection" step 81 is continuously executed, in which devices that are available to serve as tunnels are initiating communication with the TB server 71. During this initial communication session, the tunnel device registers with the TB server 71, and provides one or more attributes values associated with various attributes types. Alternatively or in addition, the attributes values are estimated, calculated, or otherwise obtained based on the communication link with the tunnel device. As part of the registration process, a record that includes the IP address of the registering tunnel device is added to the tunnels list 73 stored with the TB server 71. In one example, the records are stored as the table 100 shown in FIG. 10, where a row represent a record of a single tunnel device. In addition to registration by adding a record to the tunnels list 73, the tunnel device opens a lasting connection via the Internet with the TB server 71. Such connection preferably allows the TB server 71 to initiate communication with the registering tunnel device even after the registration phase is over and as long as the connection is sustained, such as by using TCP keepalive mechanism. The open connection, preferably a TCP connection, allows the TB server 71 to initiate communication with the connected tunnel device even through any intermediary blocking or filtering apparatus, such as the router 74 or the firewall device 75. The connection may be terminated upon the tunnel device closing the connection, such as when powering off or disconnecting from the Internet. Upon disconnecting from a tunnel device, the respective record in the tunnels list 73 in the TB server 71 is erased, notifying that this tunnel device is no more available to be used as a tunnel device.

The connection process may involve establishing a connection (directly or via a server) between the registering tunnel device and the TB server 71. The handshaking between the two devices involves forming the connection by exchanging communication-related information. The formed connection may be used later for efficiently exchange data between the devices. In one example, the communication between the devices uses TCP, and the pre-connection is used for establishing a connection by forming 'passive open', involving exchanging SYN, SYN-ACK, and ACK messages. In another example, a VPN is formed between the devices, and the tunneling or the VPN establishment is performed as part of the pre-connection phase. The tunnel endpoints are authenticated before secure VPN tunnels can be established. User-created remote-access VPNs may use passwords, biometrics, two-factor authentication, or any other cryptographic methods. Network-to-network tunnels often use passwords or digital certificates, and permanently store the key in order to allow a tunnel to establish automatically, without intervention from a user.

In one example, the number of tunnel devices that have been registered with the TB server 71 (or the number of IP addresses) and are available to be used as tunnel device is above 10,000, 20,000, 50,000, 100,000, 200,000, 500,000, 1,000,000, 2,000,000, 5,000,000, or 10,000,000.

The content fetching scheme starts in a "Content Request" step 82, where the requesting client sends a request message to the SP server 72. The request message preferably includes the requested content, such as a URL (and/or identification of the web server 22*b*). The client device 31*a* may also include (as part of, or appended to, the request message) criteria for selecting tunnel devices to be used for fetching the requested content from the web server 22*b*, as part of a "Tunnel Selection" step 83. For example, the request message may include identification of an attribute type, and associated values for tunnels selection. The client device 31*a* may use a single value, so that only tunnel devices associated with this single value will be used. Alternatively or in addition, the client device 31*a* may use multiple values, so that only tunnel devices associated with one of these values will be used. Alternatively or in addition, the client device 31*a* may use a range of values, so that only tunnel devices associated with one of the values in the range will be used. For example, the client device 31*a* may define a minimum value (selecting only tunnel devices associated with values at or above the minimum value), may define a maximum value (selecting only tunnel devices associated with values at or below the maximum value), or may define both minimum and maximum values (selecting only tunnel devices associated with values at or above the minimum value and at or below the maximum value).

For example, in a case where the attribute value is a location, the request message may define a location of Munich, Germany. Assuming that the available tunnel devices are detailed in the table 100 in FIG. 10, only the tunnel device (such as the tunnel #2 33*b*) associated with the second row 101*b* may be selected. Alternatively or in addition, the request message may define a location of Europe. In such a case, the tunnel device (such as the tunnel #2 33*b*) associated with the second row 101*b*, or the tunnel device (such as the tunnel #1 33*a*) associated with the first row 101*a*, may be selected, since both location values are in Europe. While the location values are exampled in table 100 as cities, any location may be used as IP geolocation or physical geographical location, such as country, state or province, city, street address, or ZIP code). In one example, a tunnel device location may be obtained using its built-in Global Positioning System (GPS), and may include the latitude, longitude, and timezone of the device location.

Similarly, in a case where the attribute value is an RTT, the request message may define a RTT over 300 ms (300 ms minimum), so that either the tunnel device (such as the tunnel #3 33*c*) associated with the third row 101*c* (having 540 ms), or the tunnel device associated with the seventh row 101*g* (having 310 ms), may be selected. Similarly, in a case where the attribute value is an RTT, the request message may define a RTT below 80 ms (maximum), so that either the tunnel device (such as the tunnel #1 33*a*) that is associated with the first row 101*a* (having 30 ms), or the tunnel device (such as the tunnel #2 33*b*) that is associated with the second row 101*b* (having 70 ms), may be selected. Similarly, in a case where the attribute value is an BW, the request message may define a BW below 2200 Kb/s and above 2000 Kb/s, the tunnel device associated with the sixth row 101*f* (having 2100 Kb/s), may be selected.

In the "Tunnel Selection" step 83, the TB server 71 selects a tunnel device for use from the tunnel list stored in the storage 73, according to the criteria received from the requesting client as part of the "Content Request" step 82. It is noted that some requests may not include any criteria, and in such a case any available tunnel device may be selected by the TB server 71.

Once a tunnel device is selected by the TB server 71, the request for content is routed, by the TB server 71, the SP server 72, or any cooperation thereof, to the selected tunnel device. In turn, the tunnel device forwards the request for content, using tunneling or proxy scheme, to the web server 22*b*, as part of a "Using Tunnel" step 84. It is noted that such tunneling provides anonymity and untraceability, where the web server 22*b* is only aware of the request from the selected tunnel device, and is ignorant to the identity of the origin of the request, namely the requesting client 31*a*, which is not exposed to the web server 22*b*. For example, in case where the requesting client 31*a* is in a location A, and the selected tunnel device that is used is in a location B, the web server 22*b* may only be aware (such as by using IP geolocation) to the request arrival from the location B.

The requested content is then sent to the selected tunnel device, which in turn submits the fetched content to the requesting client 31*a* as part of a "Content Fetching" step 85, thus completing the cycle of request-response from the point-of-view of the client device 31*a*, and ending in an "END" step 86. Hence, the 'Content Fetch' cycle, that may be a 'URL Fetch' flow-chart 87 in the case where the content is a single URL, may be defined, starting from the requesting client device 31*a* issuing a content request to the SP server 72, until the fetched content is received by the requesting client device 31*a* as part of the "Content Fetching" step 85. The fetched content may be stored in the client device in any volatile or non-volatile memory, or may be stored in a local cache as described in U.S. Pat. No. 8,135,912 to the Shribman et al. entitled: "System and Method of Increasing Cache Size", which is incorporated in its entirety for all purposes as if fully set forth herein. The content is stored with its related metadata or any other identifiers, so it can be easily detected and fetched when later required.

Figure 9A:
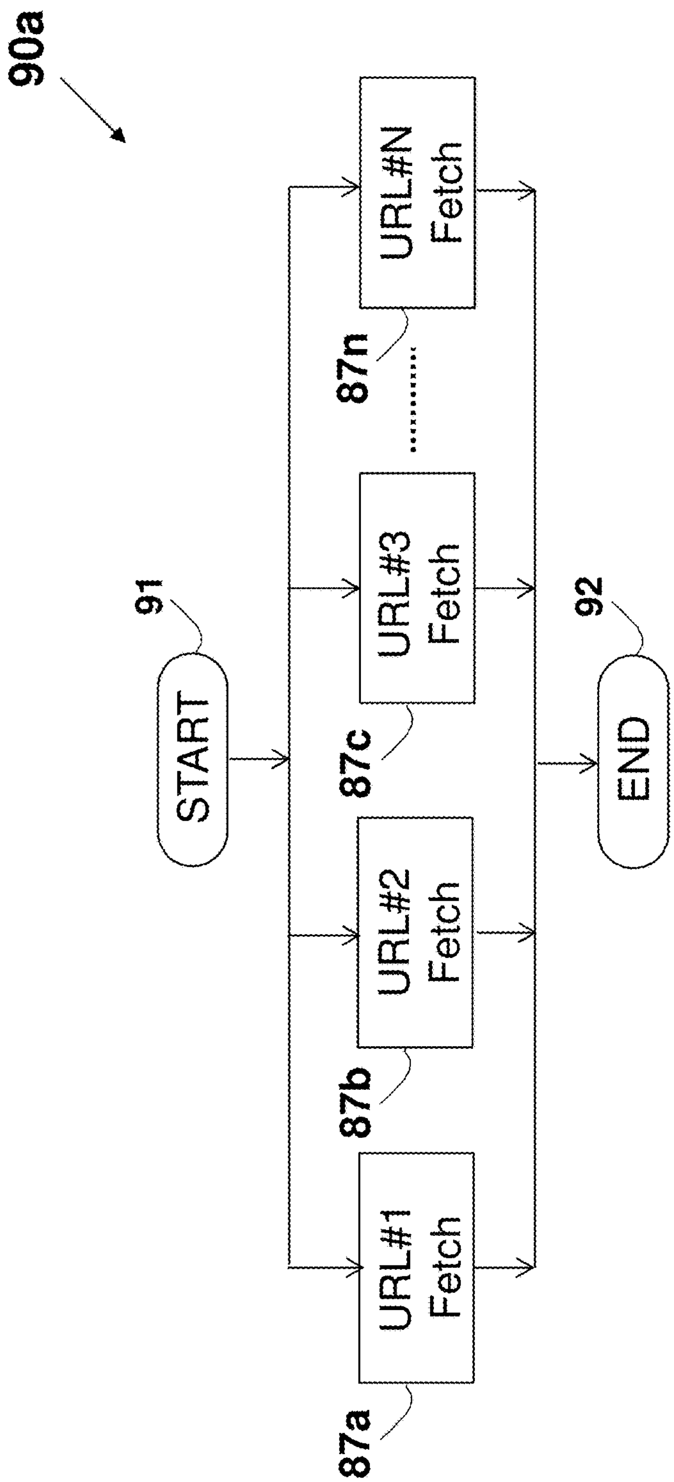
FIG. 9*a* illustrates schematically a simplified flowchart of a method for selecting and using multiple tunnel devices for fetching multiple content in parallel.
Figure 9B:
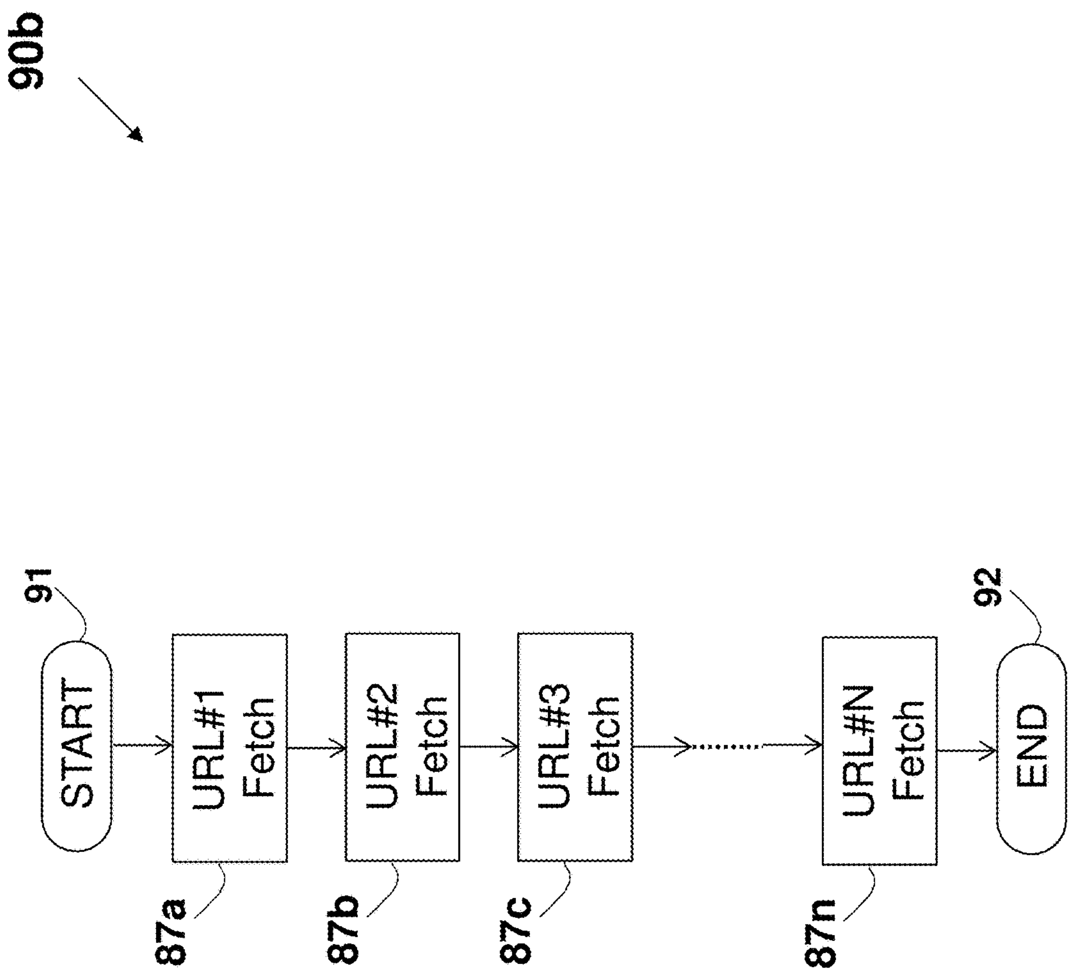
FIG. 9*b* illustrates schematically a simplified flowchart of a method for selecting and using a multiple tunnel devices for fetching multiple content in series.

While retrieving a single URL (or other content) is exampled in the flow chart 80, any number of URLs may be equally retrieved by the requesting client 31*a*. Each URL fetching may be according to, or based on, the flow chart 87 shown as part of the flow chart 80 in FIG. 8. For example, the requesting client 31*a* may request multiple web pages of the same web site. Assuming fetching of N web pages (or any other N URLs), the first URL may be fetched by executing "URL #1 Fetch" flow chart 87*a*, the second URL may be fetched by executing a "URL #2 Fetch" flow chart 87*b*, the third URL may be fetched by executing a "URL #3 Fetch" flow chart 87*c*, and so on, until the N-th URL may be fetched by executing a "URL #N Fetch" flow chart 87*n*, where each of the URL fetching scheme may be according to, or based on, the flow chart 87 shown as part of the flow chart 80 in FIG. 8. The various fetching schemes may be executed in parallel, starting in a "START" step 91 and ending in an "END" step 92, as shown in the flow chart 90*a* in FIG. 9*a*. Alternatively or in addition, the various fetching schemes may be executed in series, starting in the "START" step 91 and ending in the "END" step 92, as shown in the flow chart 90*b* in FIG. 9*b*.

In one example, the same tunnel device is selected in two, or in all, of fetching activities named "URL #1 Fetch" flow chart 87*a* to the "URL #N Fetch" flow chart 87*n*. Alternatively or in addition, a different tunnel device is selected for each of fetching activities named "URL #1 Fetch" flow chart 87*a* to the "URL #N Fetch" flow chart 87*n*, which is preferred from anonymity point of view.

Figure 11:
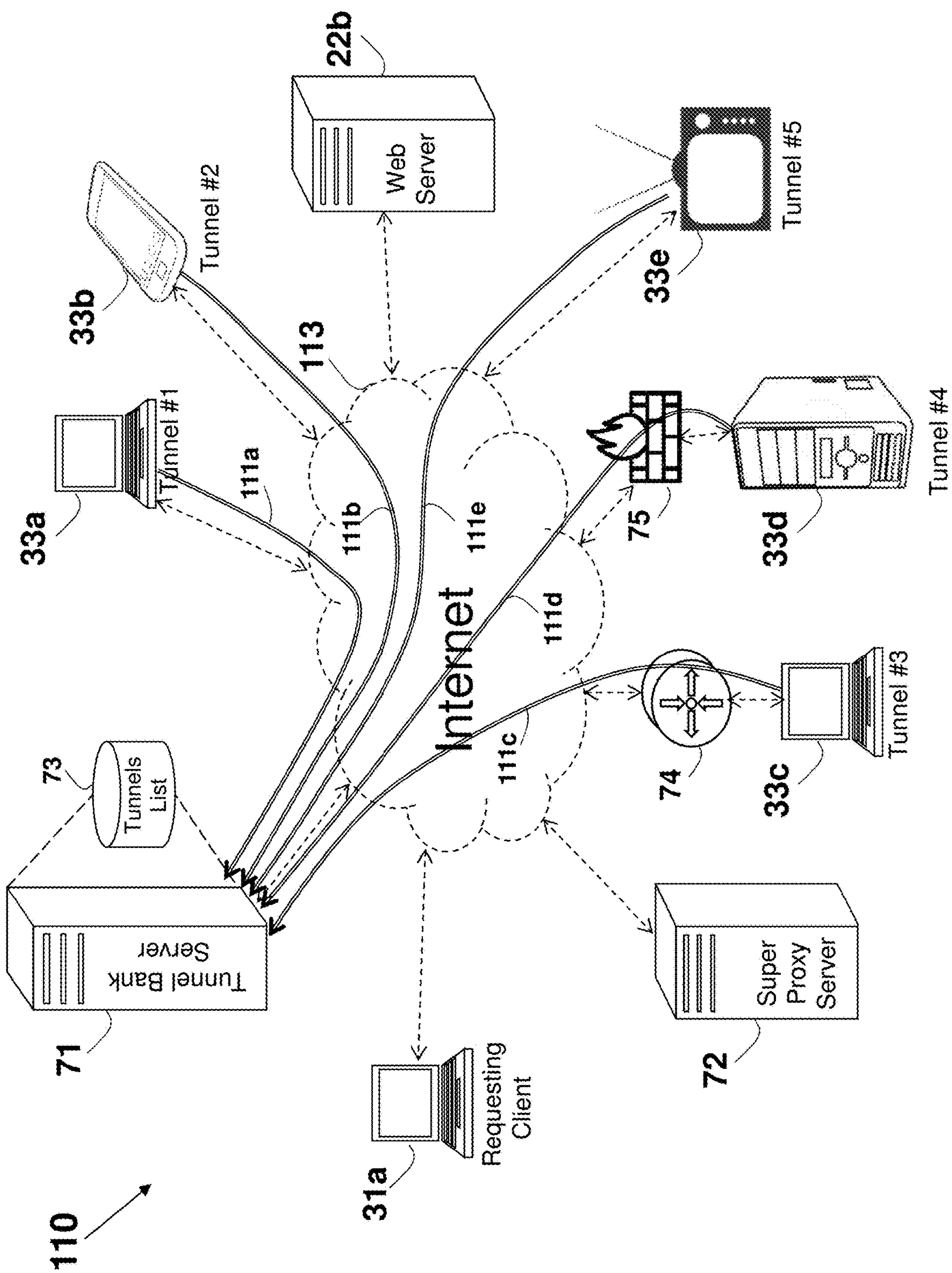
FIG. 11 depicts schematically messages exchanged over the Internet between tunnel devices and the TB server as part of the registration phase.

A schematic messaging flow diagram 110 describing the registration phase as part of the "Registration and Connection" phase 81 is shown in FIG. 11. Each of the tunnel devices initiates a communication with the TB server 71, notifying its availability to serve as a tunnel device. As part of the communication, each of the tunnel devices may transmit one or attribute values pertaining to one or more attribute types. As part of the registration phase 81, the TB server 71 adds a record (row) for each available tunnel device to the tunnels list or table in memory 73, such as adding a row for each new available tunnel device to table 100 shown in FIG. 10. In the example of the arrangement 70, the tunnel #1 33*a* connects via a data path 111*a*, the tunnel #2 33*b* connects via a data path 111*b*, the tunnel #3 33*c* connects via a data path 111*c*, the tunnel #4 33*d* connects via a data path 111*d*, and the tunnel #5 33*e* connects via a data path 111*e*.

Figure 11A:
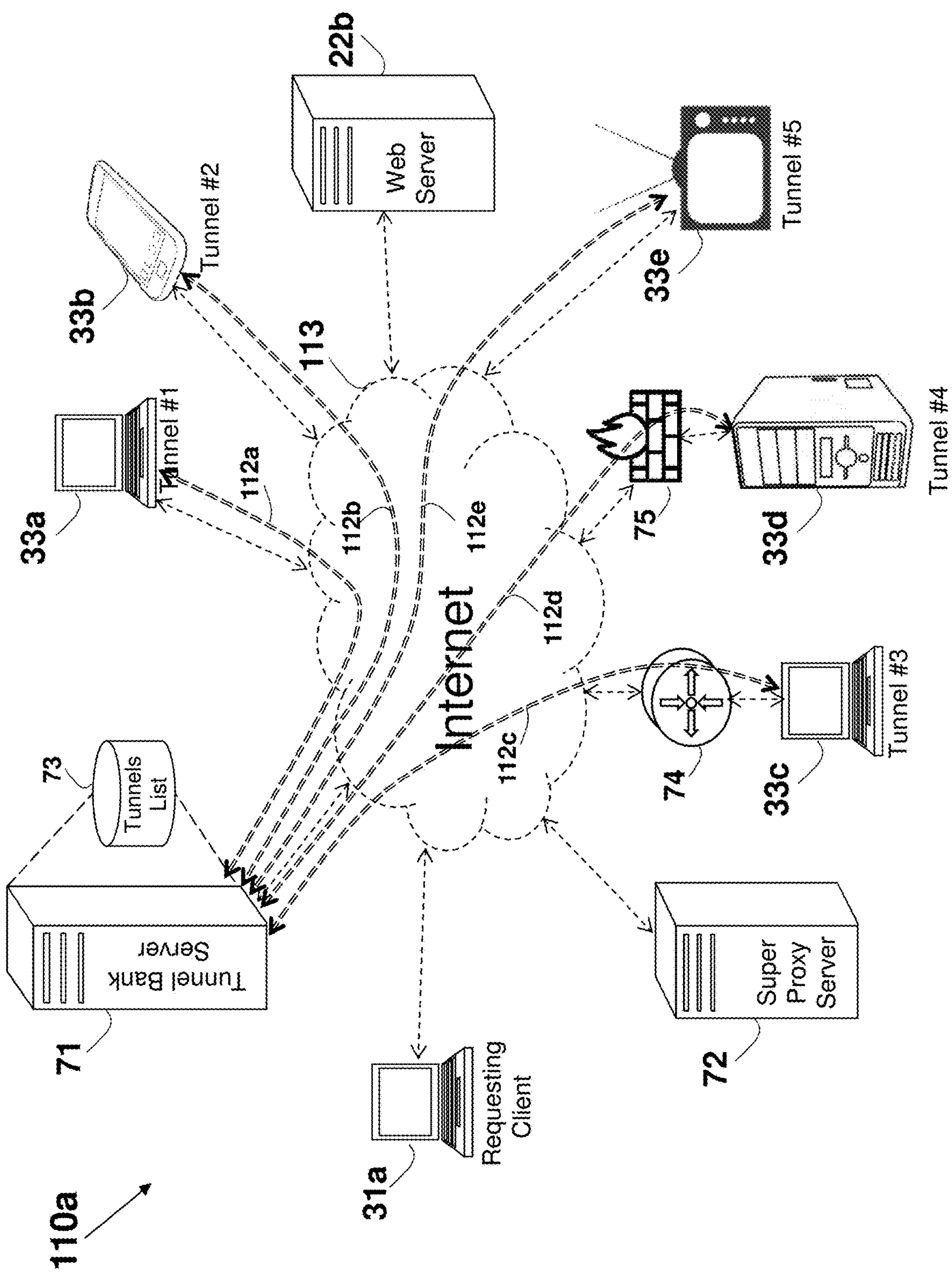
FIG. 11*a* depicts schematically connections over the Internet between tunnel devices and the TB server after the registration phase.

As part of the "Registration and Connection" phase 81, a sustained connection is established between the registered tunnel devices and the TB server 71, such as by using TCP keepalive mechanism. Shown pictorially in an arrangement 110*a* shown in FIG. 11*a* relating to the example of the arrangement 70, the tunnel #1 33*a* connection is shown as a dashed line 112*a*, the tunnel #2 33*b* connection is shown as a dashed line 112*b*, the tunnel #3 33*c* connection is shown as a dashed line 112*c*, the tunnel #4 33*d* connection is shown as a dashed line 112*d*, and the tunnel #5 33*e* connection is shown as a dashed line 112*e*. Such sustained connection (such as by using TCP keepalive mechanism) allows the TB server 71 to initiate connection with any of the registered and available tunnel devices, even in the case when a filtering apparatus, such as a router (for example the router 74) or a gateway (for example the gateway 75), is connected between a tunnel device and the Internet 113.

The connection process involves establishing a connection (directly or via a server), where the handshaking between the TB server 71 and each of tunnel devices involves forming the connection by exchanging communication-related information. The formed connection may be used later for efficiently exchange data between the devices. In one example, the communication between the devices uses TCP, and the pre-connection is used for establishing a connection by forming 'passive open', involving exchanging SYN, SYN-ACK, and ACK messages. In another example, a VPN is formed between the devices, and the tunneling or the VPN establishment is performed as part of the pre-connection phase. The tunnel endpoints are authenticated before secure VPN tunnels can be established. User-created remote-access VPNs may use passwords, biometrics, two-factor authentication, or any other cryptographic methods. Network-to-network tunnels often use passwords or digital certificates, and permanently store the key in order to allow a tunnel to establish automatically, without intervention from a user.

Figure 12:
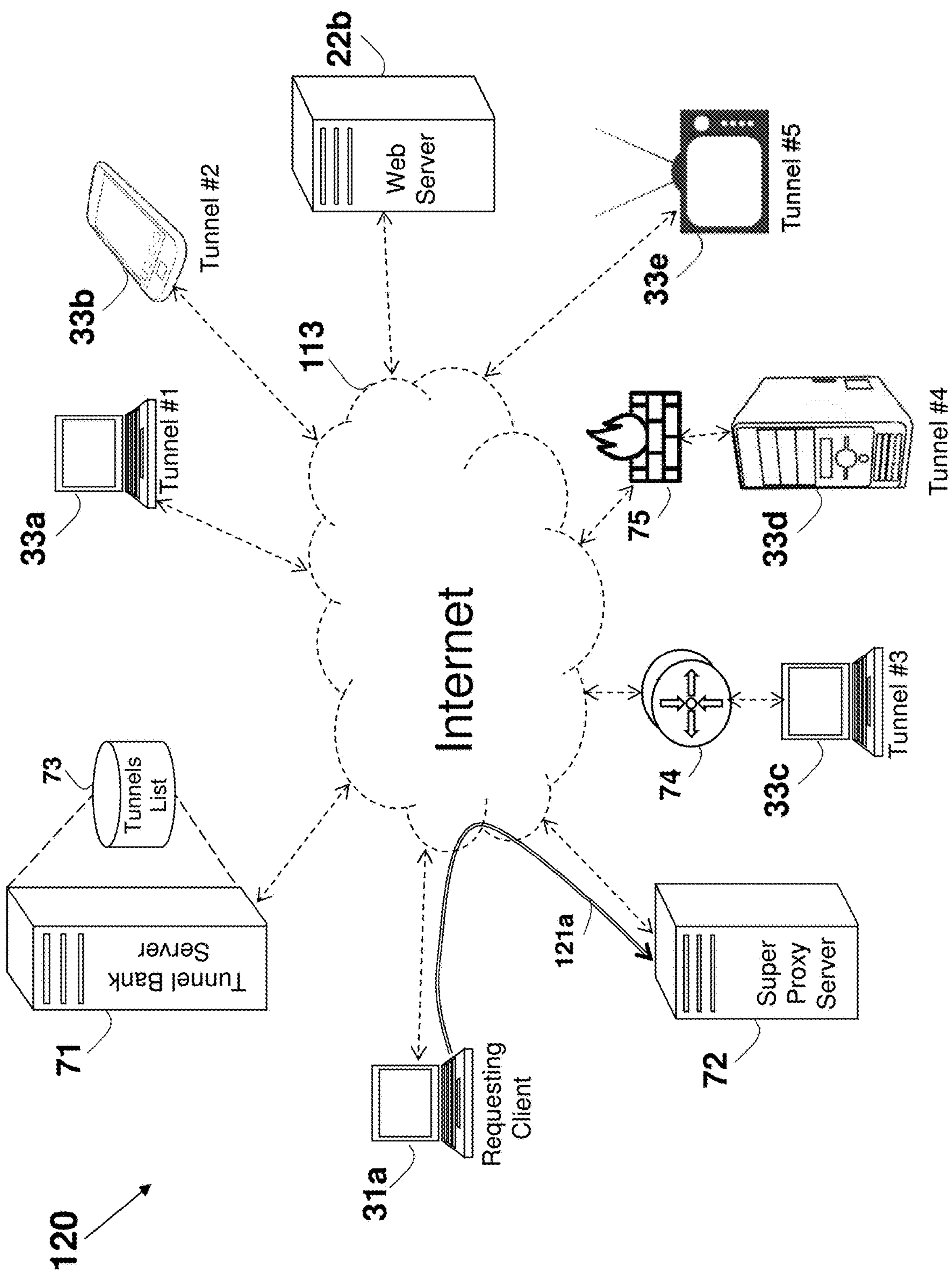
FIG. 12 depicts schematically a message exchanged over the Internet between a client device and the SP server.

The process of fetching content, corresponding to the "Content Request" step 82 that is part of the 'URL Fetch' flow chart 87, starts with the requesting client 31*a* send a request for content to the SP server 72, as shown in a message path 121*a* shown as part of a messaging chart 120 shown in FIG. 12. In one example, such request only comprises an identification (such as a URL) of the requested content. Preferably, the request includes a guidance regarding selection of a tunnel device that will be used for fetching the requested content. In one example, the request includes, either as integral part of the request, as an appended message, or as a separate message, the attribute type and an attribute value, to be used for selecting the tunnel device to be used. In another example, multiple values, or a range of values are defined for the attribute type that serves as a criterion. Further, multiple attributes types may be used, each associated with a value or with multiple values.

The content request message, as well as the attributes types and values information, may be sent over the message path 121*a* using a proprietary protocol, agreed upon between the two communicating nodes. Preferably, the SOCKS, WebSocket (ws), which may be WebSocket Secure (wss), or HTTP Proxy protocol may be used, where the client device 31*a* executes a client side protocol, and the SP server 72 executes a server side protocol.

Figure 12A:
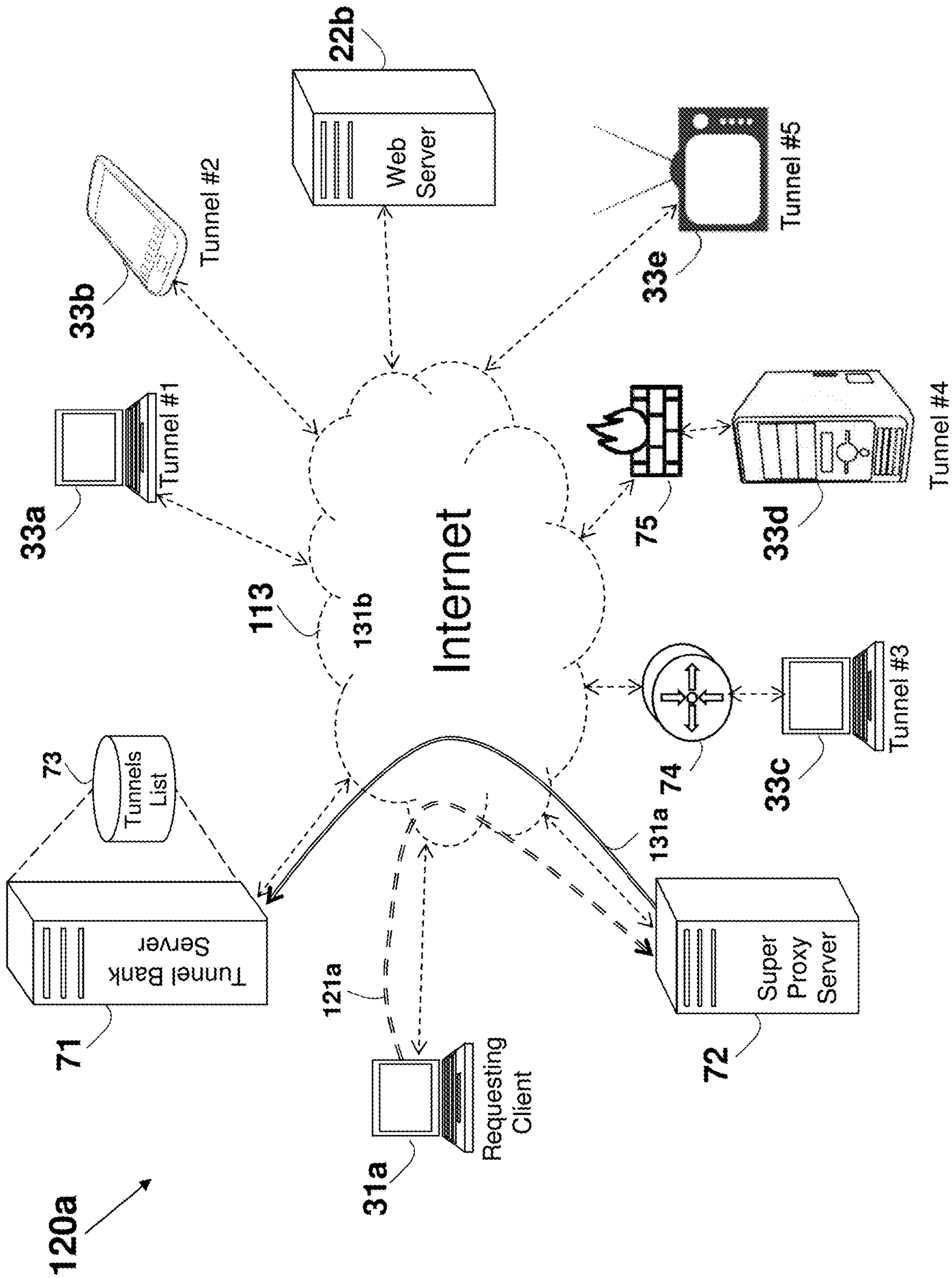
FIG. 12*a* depicts schematically a message exchanged over the Internet between the SP server and the TB server.

In response to receiving the content request over the message path 121*a*, the SP server 72 forward the content request, along with the tunnel selection criteria, to the TB server 71, shown as a message path 131*a* in the messaging chart 120*a* shown in FIG. 12*a*. The message sent over the message path 131*a* may use a proprietary protocol, agreed upon between the two communicating nodes. Preferably, the HTTP, HTTPS, Socket Secure (SOCKS), WebSocket (ws), which may be WebSocket Secure (wss), or HTTP Proxy protocol may be used, where the SP server 72 executes a client side protocol, and the TB server 71 executers a server side protocol. Alternatively or in addition, the SP server 72 may execute the server side protocol, and the TB server 71 may executer the client side protocol.

As part of the "Tunnel Selection" phase 83, according to a pre-set of criteria, according to the attributes type and values that were received from the client device 31*a* as part of the message path 121*a*, or according to any combination thereof, the TB server 71 uses the tunnels list stored in the memory 73, which may include the table 100, for selecting a tunnel device to be used. In one example, the attribute type is location and the value is Moskow, Russia, hence the tunnel #4 33*d*, which record is included in the fourth row 101*d* of the table 100, is suitable to be selected, and is selected by the TB server 71 to serve the specific content request from the client device 31*a*.

In one example, the tunnel device to be used may be randomly selected, allowing, for example, for load balancing. In one example, by randomly selecting different tunnel devices for multiple content pieces of content (such as multiple web pages of the same web site) from the same content source, the web server 22*b* senses a distributed requesting schemes, and further cannot attribute the requests to the client device 31*a*, further providing anonymity and untraceability. Randomness is commonly implemented by using random numbers, defined as a sequence of numbers or symbols that lack any pattern and thus appear random, are often generated by a random number generator. Randomness is described, for example, in IETF RFC 1750 *"Randomness Recommendations for Security*" (December 1994), which is incorporated in its entirety for all purposes as if fully set forth herein. A random number generator (having either analog or digital output) can be hardware based, using a physical process such as thermal noise, shot noise, nuclear decaying radiation, photoelectric effect or other quantum phenomena. Alternatively, or in addition, the generation of the random numbers can be software based, using a processor executing an algorithm for generating pseudo-random numbers which approximates the properties of random numbers.

In a case where no criteria for selecting is directed by the requesting client 31*a*, the TB server 71 may randomly select a tunnel device from the group or list of all currently available tunnel devices. Similarly, in a case where there are multiple tunnel devices that are available and all of them satisfy the criteria set (such as all of them are associated with a defined value, or are within the range of defined values, relating to a specific attribute type), the TB server 71 may randomly select a tunnel device from the group or list of all currently available tunnel devices that also satisfy the defined criteria.

Figure 12B:
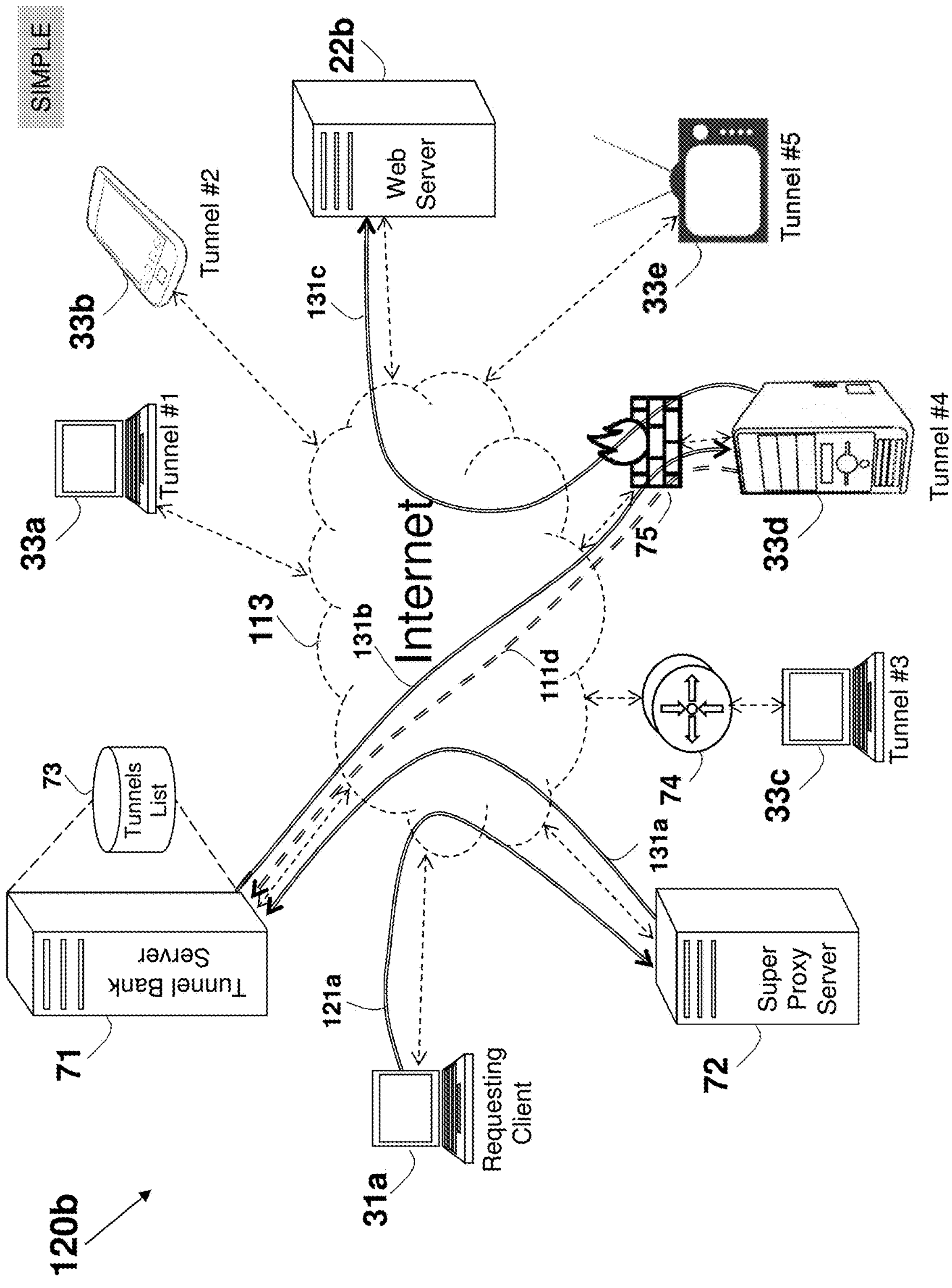
FIG. 12*b* depicts schematically messages exchanged over the Internet between the TB server and the web server using a tunnel device.

Upon completing the selection of the tunnel #4 33*d*, the TB server 71 forwards the requested content identification to the selected tunnel #4 33*d*, shown as a message path 131*b* in the messaging chart 120*b* shown in FIG. 12*b*. Such communication uses the established connection 111*d* (such as the TCP connection) that was established during the "Registration and Connection" phase 81, allowing for communication via the firewall 75. The message sent over the message path 131*b* may use a proprietary protocol, agreed upon between the two communicating nodes. Preferably, the HTTP, HTTPS, Socket Secure (SOCKS), WebSocket (ws), which may be WebSocket Secure (wss), or HTTP Proxy protocol may be used, where the TB server 71 executes a server side protocol, and the tunnel #4 33*d* executes a client side protocol. Alternatively or in addition, the TB server 71 may executes a client side protocol, and the tunnel #4 33*d* may execute a server side protocol.

In response to the request message 131*b*, the selected tunnel #4 33*d* sends a request for the identified content to the appropriate server that stores the required content, exampled to be the web server 22*b*, shown as a message path 131*c* in a messaging chart 120*b* in FIG. 12*b*. Thus, the "Using Tunnel" phase 84 is completed where the request arrives at the content source, namely the web server 22*b*. The message sent over the message path 131*c* may use a proprietary protocol, agreed upon between the two communicating nodes. Preferably, the HTTP or HTTPS protocol may be used, where the web server 22*b* executes a server side protocol, and the tunnel #4 33*d* executes a client side protocol. Further, any tunneling protocol or mechanism may be used where the selected tunnel, which is the tunnel #4 33*d* in the example herein, serves as a tunnel between the TB server 71 and the web server 22*b*.

The requested content is then fetched from the web server 22*b* to the requesting client 31*a*, as part of the "Content Fetching" phase 85, along the 'opposite' route of the request flow. As shown in a messaging chart 130 shown in FIG. 13, the content is first sent from the web server 22*b* to the selected tunnel #4 33*d* along a message path 131*d*, which in turn sends it to the TB server 71 along a message path 131*e*, which in turn sends it to the SP server 72 along a message path 131*f*, arriving at the requesting client 31*a* along a message path 131*g*, completing the request/response cycle from the client device 31*a* point of view. The same protocol or protocols used for forwarding the request from the client device 31*a* to the web server 22*b* may be equally used for any portion of the 'return' path of the requested content from the web server 22*b* to the client device 31*a*. Alternatively or in addition, the return path may use different protocol or protocols than the ones used in the requesting path.

Figure 14:
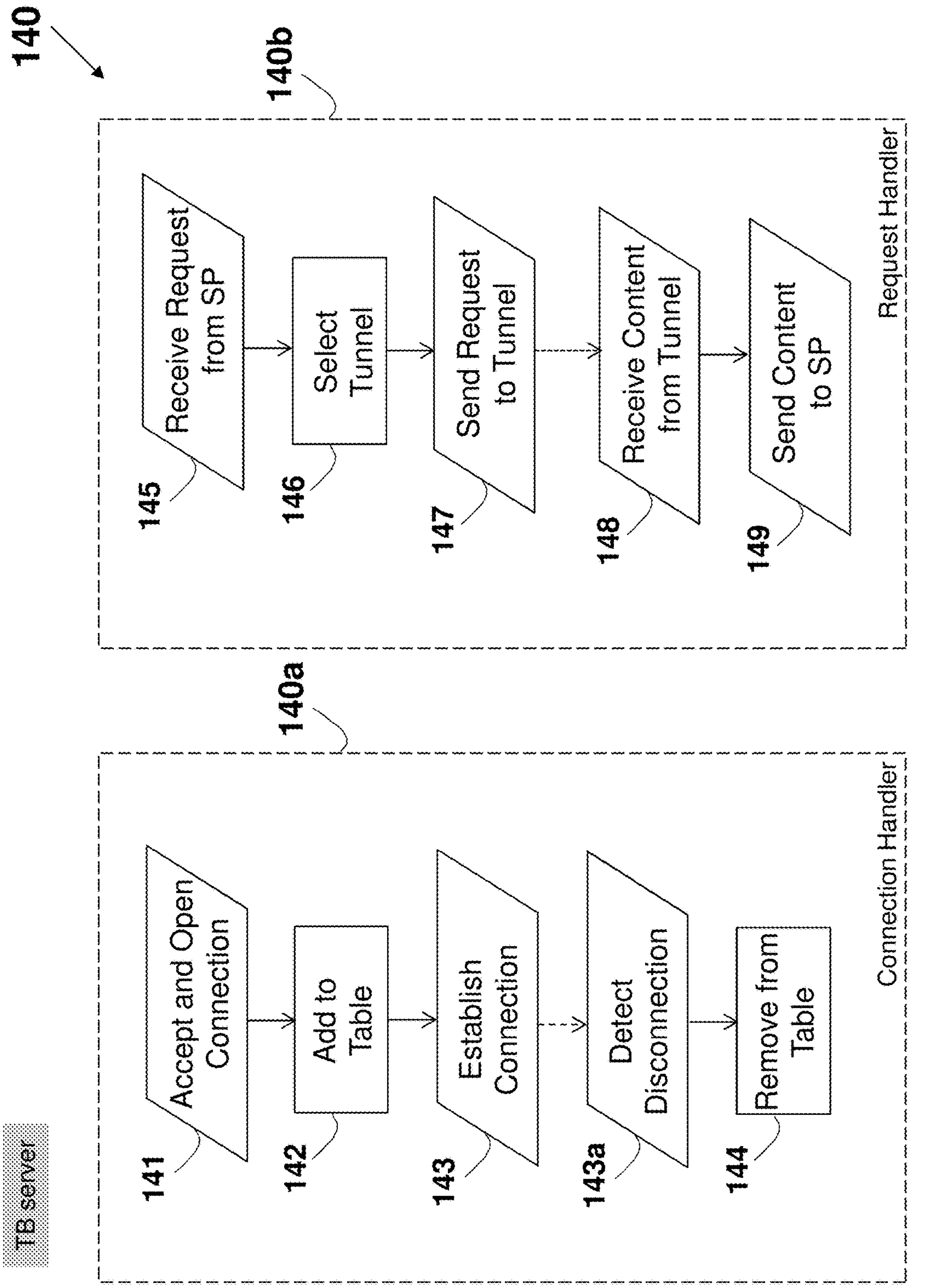
FIG. 14 illustrates schematically a simplified flowchart relating to a TB server.

The TB server 71 generally executes a flowchart 140 shown in FIG. 14. The TB server 71 generally executes in parallel at least a "Connection Handler" flow chart 140*a* and a "Request Handler" flow chart 140*b*. The "Connection Handler" flow chart 140*a* involves identifying a device that is available to server as a tunnel device. For each such device, a record of the device and its associated various attributes values is formed, stored and maintained, together with establishing a continuous connection with the tunnel device, corresponding to the "Registration and Connection" phase 81 and the messaging charts 110 and 110*a* respectively shown in FIGS. 11 and 11*a*. The TB server 71 continuously listen and wait for tunnel devices to initiate a communication. Upon receiving a communication request from a potential tunnel device, such as from the tunnel #2 33*b* shown as message path 111*b* in the chart 110, the TB server 71 accepts the communication from the tunnel device, as part of an "Accept and Open Connection" step 141. In addition to the tunnel device IP address, information regarding the connection timing, the tunnel device type, connection functionalities, operating system, processing power, and other values relating to various attribute types are obtained (such as from the tunnel device itself, from the connection, or otherwise), and stored as a record in the tunnels list 73, which may be in a form of a row in the table 100, as part of an "Add to Table" step 142. The tunnel device is then available for being selected for use in a fetching content operation, and the selection may be based on the respective information in the record in the table 100. In order to allow for the TB server 71 to initiate communication with this available tunnel device, a continuous connection is established as part of an "Establish Connection" step 143. For example, a TCP connection 112*b* (using TCP keepalive mechanism) may be used as shown in the chart 110*a*. Upon sensing that there is no response from this tunnel device as part of a "Detect Disconnection" step 143*a*, such as not receiving a keepalive message reply after a set interval, the TB server 71 assumes that this tunnel device is no longer available to be used as a tunnel device for content fetching operation, and the respective record is deleted from the table 100 as part of a "Remove from table" step 144. The "Connection Handler" flow chart 140*a* is repeated for every tunnel device, so that a large number of such instances are performed simultaneously and independently.

The "Request Handler" flow chart 140*b* involves selecting a tunnel device from the available ones based on a request from the SP server 72, and using the selected tunnel device for fetching the requested content. The "Request Handler" flow chart 140*b* is repeated for each content (such as URL) request from the client device 31*a* conveyed to it from the SP server 72, so that a large number of such instances of this operation are performed simultaneously and independently. First, a content request is received from the SP server 72 as part of a "Receive Request from SP" step 145, corresponding to the message path 131*a* shown in the messaging chart 120*b*. In general, the request includes a replica of the content request received from the requesting client 31*a*. Based on pre-set criteria and criteria that is part of the received request, the TB server 71 selects a tunnel device from the available ones, as part of a "Select Tunnel" step 146, which correspond to the "Tunnel Selection" phase 83. As part of a "Send Request to Tunnel" step 147, which corresponds to the message path 131*b* shown in the messaging chart 120*b* and performed as part of the "Using Tunnel" phase 84, the identification of the requested content of forwarded to the selected tunnel device, exampled as the tunnel #4 33*d* in the example herein. After the content if fetched by the selected tunnel device #4 33*d* from the web server 22*b*, it is forwarded and received by the TB server 71 as part of a "Receive Content from Tunnel" step 148, which corresponds to the message path 131*e* shown in the messaging chart 130 and performed as part of the "Content Fetching" phase 85. The handling of the content requested is completed by sending the fetched content as a response to the SP server 72 request as part of a "Send Content to SP" step 149, which corresponds to the message path 131*f* shown in the messaging chart 130 and performed as part of the "Content Fetching" phase 85.

Figure 15:
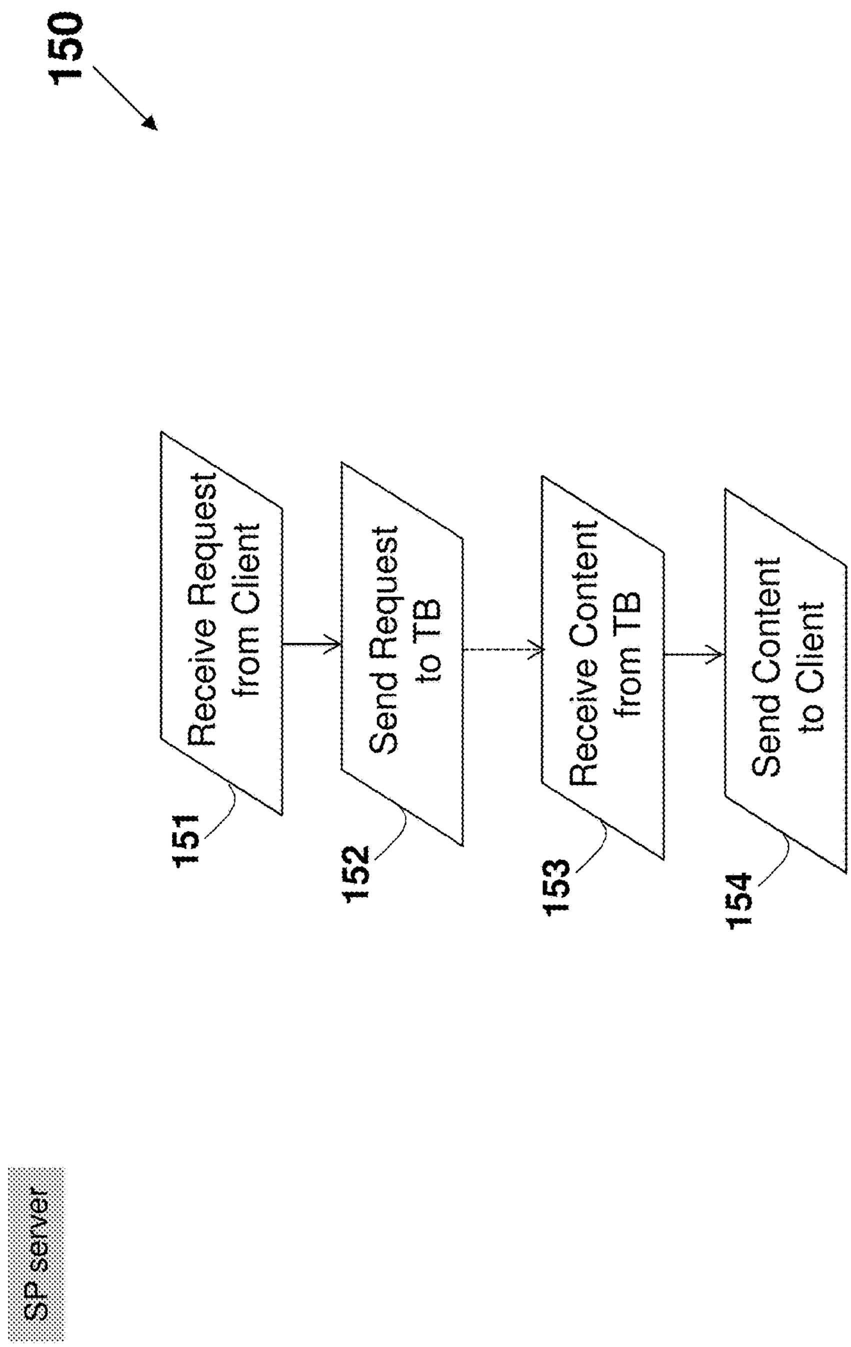
FIG. 15 illustrates schematically a simplified flowchart relating to a SP server.

The SP server 72 generally executes a flowchart 150 shown in FIG. 15 for each piece of information or content (such as a single URL) requested by the client device 31*a*. The operation starts when a content request is received from the client device 31*a* as part of a "Receive Request from Client" step 151, which corresponds to the message path 121*a* shown in the messaging chart 120 and performed as part of the "Content Request" phase 82. The request is forwarded by the SP server 72 to the TB server 71 as part of a "Send Request to TB" step 152, which corresponds to the message path 131*a* shown in the messaging chart 120*a*, and received by the TB server 71 as part of the "Receive Request from SP" step 145. Upon the content arriving to the TB server 71, it is forwarded by the TB server 71 to the requesting SP server 72 as part of the "Send Content to SP" step 149, and received as part of a "Receive Content from TB" step 153, which corresponds to the message path 131*f* shown in the messaging chart 130 and performed as part of the "Content Fetching" phase 85. The received content is then sent to the requesting client 31*a* as part of a "Send Content to Client" step 154, which corresponds to the message path 131*g* shown in the messaging chart 130 and performed as part of the "Content Fetching" phase 85.

SSL Sniffing. SSL (Secure Sockets Layer) certificates are used to secure online communication and transactions with encryption. The SSL encryption technology creates encrypted connections between a user/web browser and website/web-server. SSL certificate makes sure that all communication that gets transmitted through a browser/website/server is encrypted and decrypted in such a manner that only the sender and the recipient would be able to see it in the decrypted form. SSL sniffing refers to the intercepting and reading of SSL encrypted traffic using an MITM (Man in the Middle) proxy.

SSL sniffing works in different ways. In some SSL implementations, the MITM proxy is used to redirect the end user in a communication to a non-HTTPS website and then sniff the non-encrypted traffic in that site. At the same time, requests would be relayed to and from the HTTPS site via a proxy. The man in the middle can alternatively grab the HTTPS traffic and present a valid HTTPS certificate to the end user. The certificate would need to be trusted on the end user machine. This the end user machine would need to be compromised or a trusted certificate has to be obtained. The man in the middle would then relay traffic to the actual HTTPS site and at the same time look at the unencrypted traffic, sitting in the middle of it all. There is another option too—grabbing the encrypted traffic and recording it, in the hope that in future, technology would help decrypt the data. An implementation example of SSL Sniffing, which extracts hostname from SSL by parsing TLC/SNI record (sni.js), is described in a web-page by 'Marek's—totally not insane—idea of the day' (dated Jun. 16, 2012) entitled: "Dissecting SSL handshake", which is incorporated in its entirety for all purposes as if fully set forth herein. SSL Sniffing is further described in Netronome Systems, Inc. white-paper published 2010 (2-10) entitled: "*Examining SSL-encrypted Communications*", which is incorporated in its entirety for all purposes as if fully set forth herein.

A system, method and computer program product for guaranteeing a data transaction over a network using SSL sniffing are disclosed in U.S. Pat. No. 7,853,795 to Dick et al. entitled: "System, method and computer program product for guaranteeing electronic transactions", which is incorporated in its entirety for all purposes as if fully set forth herein. When a data transaction between at least a server and a client is detected on a network, data transmitted via the network between the server and client during the data transaction is captured. At least one identifier is associated with the captured data. A timestamp is also generated for the captured data. The timestamp includes information therein identifying at least a portion of the identifier(s). The captured data, the identifier(s) and the timestamp are stored in one or more data stores. The identifier(s) associated with the stored captured data is also mapped to an entry in an index to permit retrieval of the stored data from the data store via the index.

In one example, the message received by the SP server 72 from the client device 31*a* as part of the "Receive Request from Client" step 151 is according to HTTPS protocol, where part or all of the message is encrypted using TLS or SSL. In such a case, the SP server 72 (or the TB server 71), may use SSL Sniffing for extracting the content identifier (such as the requested URL), for extracting any attribute values included in the message, for extracting any other information that is included in the message and is required for system operation. The SP server 72 may use SSL Sniffing that includes parsing the SSL handshake, such as parsing the ClientHello and ServerHello parts of the CONNECT request in the TLS handshaking. In an example where the client device 31*a* sends an HTTPS request that includes 'CONNECT amazon.com', the SP server 72 replies with a message consisting of: 'HTTP/1.1 200 OK', and continues to apply pkg/util/tls.js Handshake:extract_sni to all following messages from the client device 31*a*. If a message contains SNI and it is amazon.com, or the message does not contain SNI—the SP server 72 sends the ClientHello to Amazon web server (which may be the web server 22*b*), and start listening for the ServerHello while applying the Handshake: extract_cert_names to all received messages therefrom, until the certificate part is being received and parsed. If the received server certificate is for amazon.com and not a different/blocked host, the SP server 72 sends a response back to the client device 31*a* and begins tunneling data without parsing.

Figure 16:
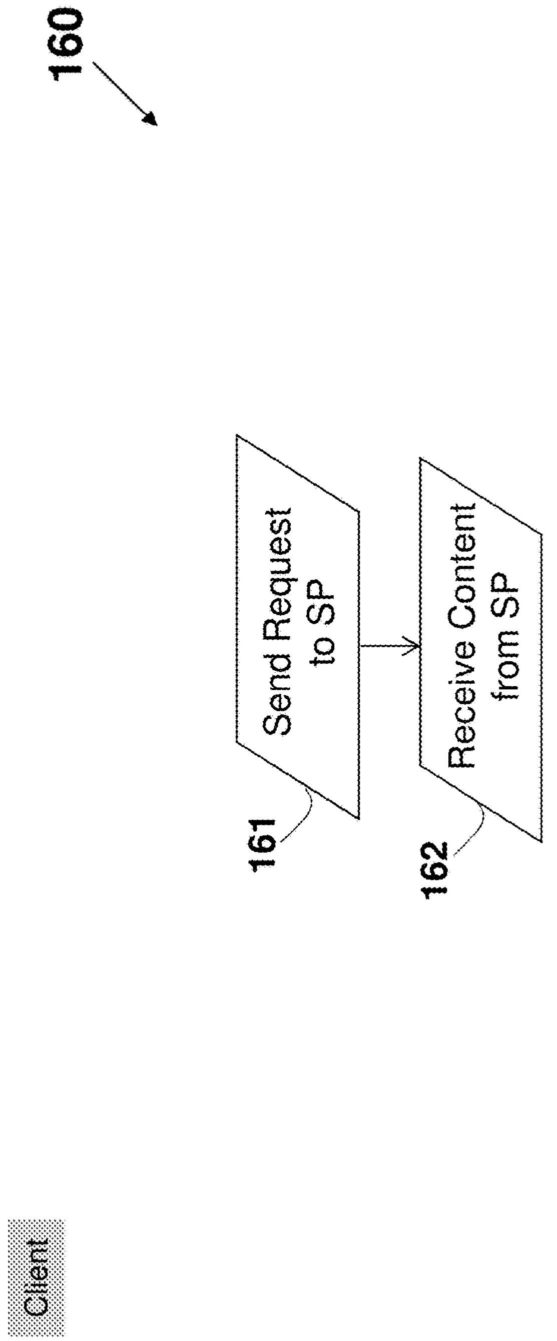
FIGS. 16 and 16*a* illustrate schematically simplified flowcharts relating to a client device.

For each piece of information or content (such as a single URL) requested by a client device, such as the exampled client device 31*a*, generally executes a flowchart 160 shown in FIG. 16. It is noted that multiple content fetching operations may be performed in parallel or in series, as described regarding the flow charts 90*a* and 90*b* above. Any content fetching operation start sending a content request to the SP server 72 as part of a "Send Request to SP" step 161, and the request is received by the SP server 72 as part of the "Receive Request from Client" step 151. This action corresponds to the message path 121*a* shown in the messaging chart 120 and performed as part of the "Content Request" phase 82. Upon availability of the requested content at the SP server 72, the content is sent to the client device 31*a* as part of the "Send Content to Client" step 154, and is received by the client device 31*a* as part of a "Receive Content from SP" step 162, which corresponds to the message path 131*g* shown in the messaging chart 130 and performed as part of the "Content Fetching" phase 85. In one example, the client device 31*a* need only to know the IP address of the SP server 72, and need only to identify the requested content and the criteria (if any) for selecting a tunnel for fetching this content. The request message sent to the SP server 72 may include identification of the requested content, such as a URL.

In one example, the client device 31*a* does not impose any limitations or does not provide any criteria or limitations for selecting a tunnel device for a specific requested content. In such a case, the tunnel selection by the TB server 71 as part of the "Select Tunnel" step 146 is not limited by the client, and any internal selection rules or mechanisms may be used. Alternatively or in addition, the client device 31*a* defines specific limitations or criteria for selecting a tunnel device for a specific requested content. Such criteria may involve defining attributes types, and a value of values relating to each attribute values. In such a case, the tunnel selection by the TB server 71 as part of the "Select Tunnel" step 146 is limited by the client, and the client set limitations will apply in addition to any internal selection rules or mechanisms may be used. Alternatively or in addition, the client device 31*a* may define a specific tunnel device, for example identified by a specific IP address, to be used for a specific requested content. For example, the web server 22*b* may differently respond to a content requesting device, based on past interactions with that device. In such a case, the client device 31*a* may execute a flow chart 160*a* shown in FIG. 16*a*. In such a case, an identification of the tunnel device that was selected as used for fetching the specific content is also sent from SP server 72 to the client device 31*a*, in addition to sending the fetched content from the SP server 72 as part of the "Send Content to Client" step 154, receiving it by the client device 31*a* as part of a "Receive Content from SP" step 162. The tunnel identification is stored by the client device 31*a* as part of a "Save Tunnel IP" step 162*a*. In a next content fetching cycle initiated by the client device 31*a*, such as when the content is to be fetched from the same web server 22*b*, the content request as part of the "Send Request to SP" step 161 is appended to further include the specific tunnel device IP address to be used, retrieved after being stored in prior operation as part of the "Save Tunnel IP" step 162*a*, as part of a "Send Tunnel IP to SP" step 161*a*. The request for a specific tunnel device is then forwarded by the SP server 72 to the TB server 71 as part of the message path 131*a*, and then the TB server 71 selects the requested tunnel device for fetching the content, as part of the "Select Tunnel" step 146.

Figure 17:
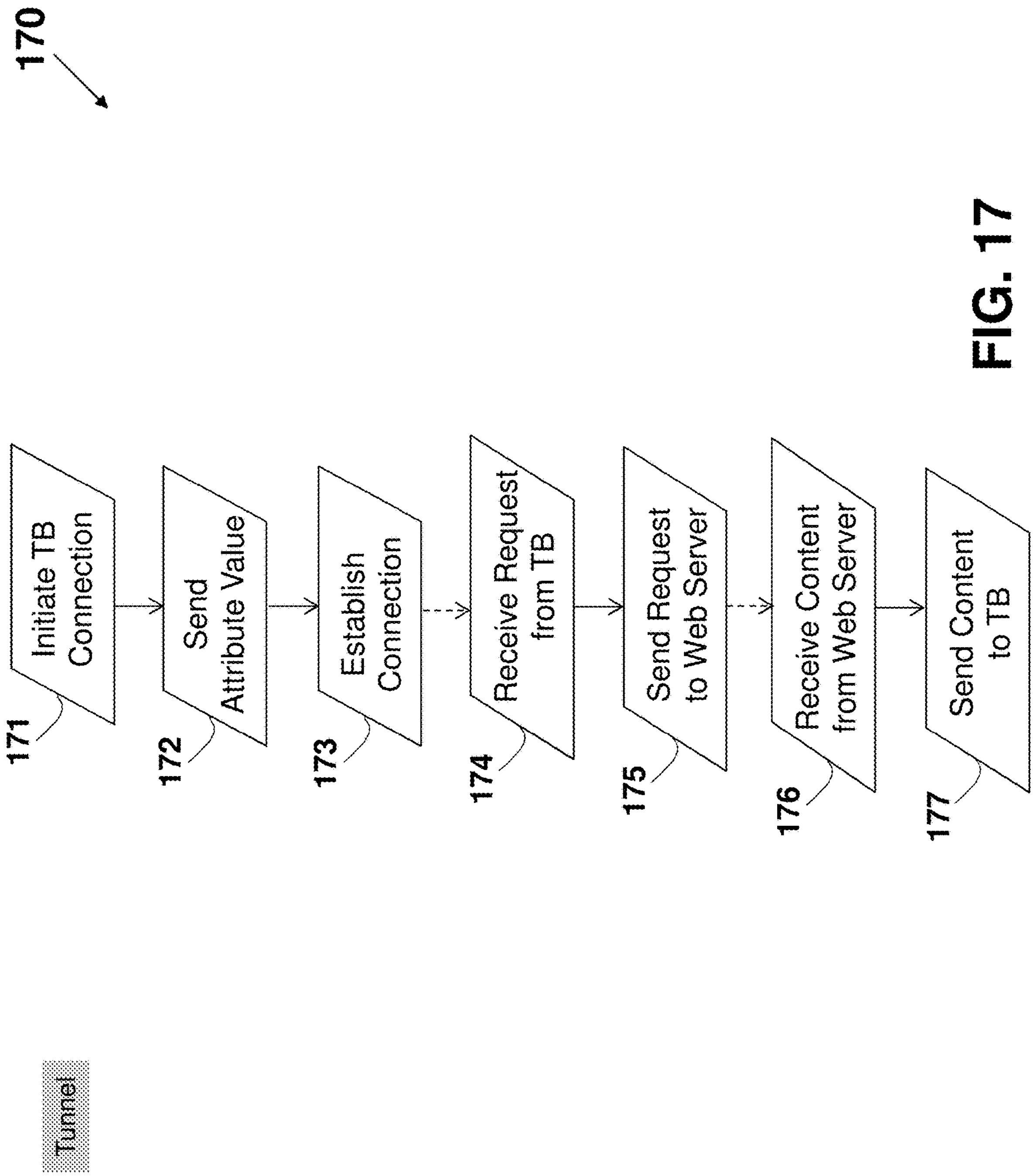
FIG. 17 illustrates schematically a simplified flowchart relating to a tunnel device.

Each of the tunnel devices, such as the tunnel #1 33*a*, the tunnel #2 33*b*, the tunnel #3 33*c*, the tunnel #4 33*d*, and the tunnel #5 33*e*, generally executes a flowchart 170 shown in FIG. 17. Upon connecting to the Internet, upon deciding to serve as a tunnel server, or upon having the ability to serve as a tunnel device, the tunnel device initiates connection to the TB server 71, as part of an "Initiate TB Connection" step 171, respectively corresponding to the message paths 111*a*, 111*b*, 111*c*, 111*d*, and 111*e*. The connection initiation as part of the "Initiate TB Connection" step 171 is responded by the TB server 71 as part of the "Accept and Open Connection" step 141 in the flow chart 140*a*, and is performed as part of the "Registration and Connection" phase 81. In an arrangement where a tunnel selection is based on attribute values, the tunnel device send the corresponding values, such as the operating system type and version (corresponding to the column 102*f* in the table 100), and any other value relating to any other attribute type, as part of a "Send Attribute Value" step 172, so the value (associated with the tunnel device IP address, for example) may be added to the tunnel registry as part of the tunnels list memory 73, such as adding a row to the table 100 by the TB server 71 as part of the "Add to Table" step 142. After initializing the communication, the tunnel device and the TB server 71 sustain a connection, such as a TCP connection using the TCP keepalive mechanism, as part of an "Establish Connection" step 173 and the "Establish Connection" step 143, respectively illustrated in the messaging chart 110*a* as message dashed lines 112*a*, 112*b*, 112*c*, 112*d*, and 112*e*. The establishing of the sustained connection between the tunnel device and the TB server 71 completes the "Registration and Connection" phase 81 in the flow chart 80.

In a case where a tunnel device is selected by the TB server 71 as part of the "Select Tunnel" step 146, the TB server 71 send to the selected tunnel device as part of the "Send Request to Tunnel" step 147 the content request, which is received as part of a "Receive Request from TB" step 174, corresponding to the message path 131*b* shown in the example of selecting the tunnel #4 33*d* in the messaging chart 120*b*. In response, the selected tunnel device #4 33*d* forward the request to the relevant web server, such as the web server 22*b*, as part of a "Send Request to Web Server" step 175, corresponding to the message path 131*c* shown in the example of selecting the tunnel #4 33*d* in the messaging chart 120*b*, thus completing the "Using Tunnel" phase 84 in the flow chart 80 shown in FIG. 8.

As part of the "Content fetching" phase 85, the content retrieved from the web server 22*b* (as a response to the request) is received by the selected tunnel device as part of a "Receive Content from Web Server" step 176 (corresponding to message path 131*d* in the messaging chart 130), and is then forwarded (or 'tunneled') to the TB server 71 as part of a "Send Content to TB" step 177, to be received by the TB server 71 as part of the "Receive Content from Tunnel" step 148, corresponding to message path 131*e* in the messaging chart 130.

The operation from "Receive Request from TB" step 174 to the "Send Content to TB" step 177 may be repeated each time the tunnel is selected. The connection established in the "Establish Connection" step 173 is sustained after each such content tunneling operation, allowing for additional tunneling operation to be performed using the same tunnel. The same tunnel may be selected for the same web server 22*b*, such as for different URLs of the same web page stored in the web server 22*b*. Alternatively or in addition, the same tunnel may be used for different web servers, such as for retrieving different web pages or web sites associated with different web servers.

In one example, one or more of the tunnel devices are used primarily for purposes other than serving as tunnel devices. In such a case, the tunnel functionality or operation, such as executing the flow chart 170 shown in FIG. 17, is executed in the background or when the device is idling from other activities, preferably with the knowledge of the tunnel device owner and user, and preferably with minimum interference or interaction with other processes, operations, or activities of the tunnel device.

In one example, a tunnel device may be a dedicated device, primarily installed, used, or operated for serving as a tunnel device, such as primarily (or solely) for executing the tunnel-related flow chart 170 shown in FIG. 17. In one example, the tunnel #1 33*a* is such a dedicated tunnel device, shown used as a tunnel in a messaging chart 180 shown in FIG. 18. In one example, the dedicated tunnel device #1 33*a* may be owned, operated, or used by an entity 76*a* which also owns, operates, or uses the TB server 71 and the SP server 72, as pictorially illustrated in the arrangement 180*a* shown in FIG. 18*a*. While a single dedicated device in exampled in the arrangement 180, multiple such devices may equally be used, and these dedicated tunnel devices may also be owned, operated, or used by the same entity 76*a*. The using of dedicated tunnel devices allows to provide more available tunnel anytime, and reduces the need of relying of availability third party devices. Further, such dedicated devices may be optimized for their primary tunneling functionality.

While the system operation was exampled above where each tunnel device is associated with a single IP address, multiple IP addresses may be equally associated with any tunnel device. In one example, the dedicated tunnel device 33*a* shown in the arrangement 180 may be addressed using multiple IP addresses, such as by using multihoming. The dedicated tunnel device 33*a* (or any tunnel device) may execute the tunnel process 170 for each of the IP addresses, either in parallel or sequentially (or a combination thereof), thus allowing the savings resulting by using a single hardware device with a single Internet connection executing multiple tunnel functionalities. Alternatively, multiple Internet connection may be used, where one or more IP addresses are associated with each Internet connection. Dedicated tunnels may be implemented as client devices, or preferably as server, such as located as part of data centers. Preferably, the dedicated tunnels, either as client devices or as servers in data centers, are installed in many location around the world, allowing for better load balancing due to the widespread distribution, as well as providing large variety of potential locations or IP geolocations that may be selected as location attribute values by client devices. A dedicated tunnel device may be associated with more than 1,000, 2,000, 5,000, 10,000, 20,000, 50,000 or 100,000 distinct IP addresses.

Further, tunnel devices may be owned, used, or operated by consumers. In such a case, their availability is only controlled by the user. For example, by turning off the device, such as at night, or by being located at no Internet connection locations, the tunnel devices become not available to be used for tunneling functionality. In contrast, dedicated tunnel devices may be available to be selected and used at any time, all year round (usually spoken "twenty-four seven"), and as such may allow the service provider 76*a* to provide stable and consistent tunneling service to client devices. In addition, dedicated tunnel devices that are owned, operated, or controlled by the service provider 76*a*, obviate the need for distributing the tunnel functionality, such as a software code that implements the tunnel flow chart 170, to various devices.

In general, the tasks performed by the TB server 71, as part of the operation of the flow chart 140 shown in FIG. 14, may be partitioned into two main objectives: Selecting a tunnel device, such as the "Select Tunnel" step 146, and being in the 'tunneling' path of fetching the content, such as the "Receive Content from Tunnel" step 148 and the "Send Content to SP" step 149. In one examplary arrangement, the TB server 71 is focused only on the tunnel selecting operation and is not taking part in the "Content Fetching" phase 85.

Figure 19:
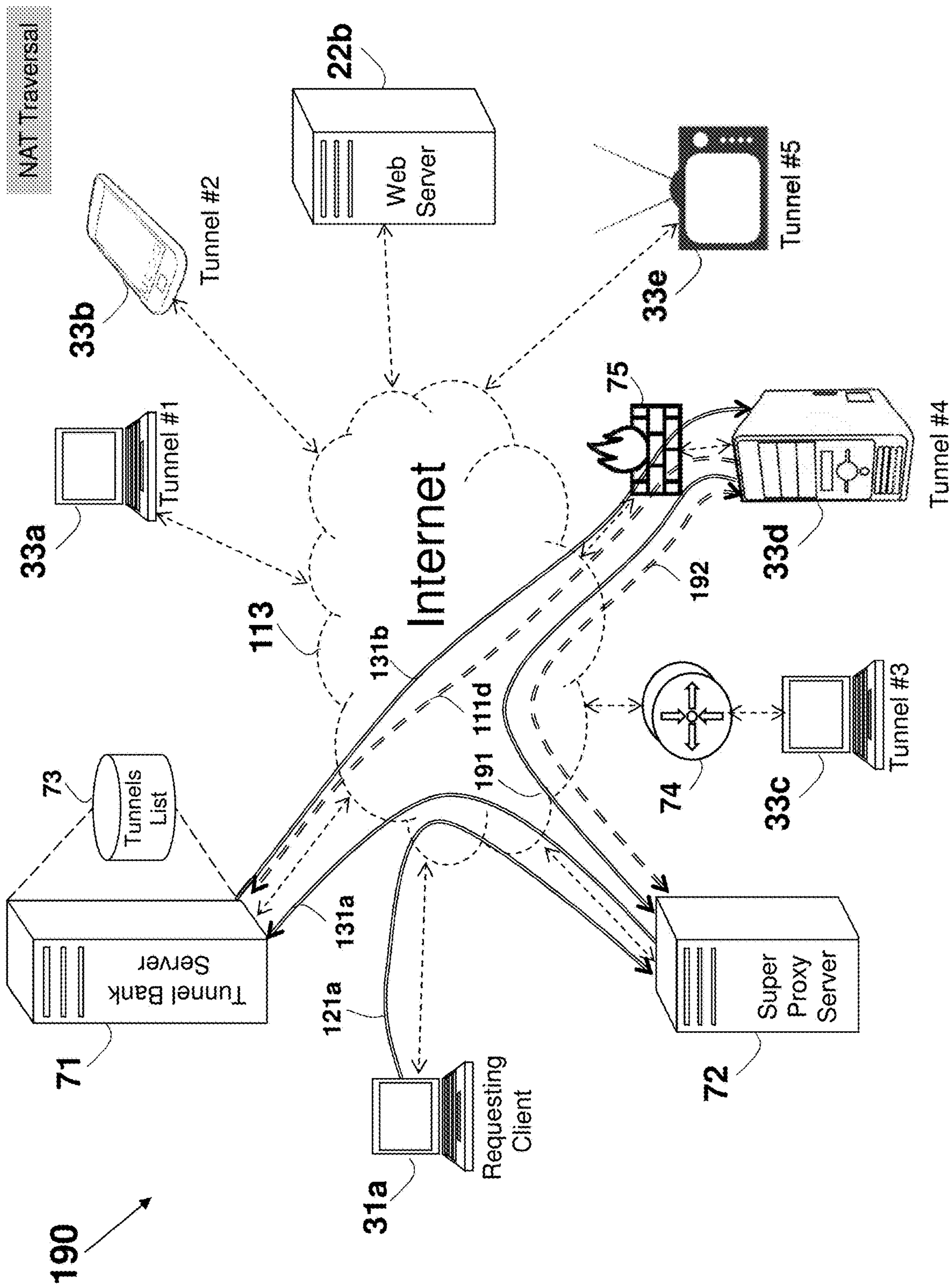
FIGS. 19, 19*a*, and 19*b* depicts schematically messages exchanged over the Internet in an alternative scheme for fetching content from the web server to the client device via a selected tunnel device, the TB server, and the SP server.

A messaging chart arrangement 190 that supports the obviating of the TB server from being part of the content fetching path is shown in FIG. 19. In response to the tunnel #4 33*d* exampled as being selected and communicated by the TB server 71 over the message path 131*b* described above, the selected tunnel #4 33*d* initiates a communication with the SP server 72 over a message path 191. Any technique or technology may be used for directing the selected tunnel #4 33*d* to connect to the SP server 72, preferably a NAT traversal-based technique. Preferably, after the initial communication between the selected tunnel #4 33*d* and the SP server 72 is made, the connection (shown as a dashed line 192) is sustained, such as by using TCP keepalive and part of a TCP Connect scheme, similar to, or different from, the connection 111*d* that is established between the tunnel #4 33*d* and the TB server 71. Once the connection 192 is established and sustained, the SP server 72 may initiate communication with the selected tunnel #4 33*d*. In one example, the SP server 72 sends the identification of the requested content (such as a URL) to the selected tunnel #4 33*d*, shown as a message path 193 in a messaging chart 190*a* in FIG. 19*a* Similar to the example shown in FIG. 13 above and the related description, the selected tunnel #4 33*d* performs the tunneling functionality by forwarding the content request to the web server 22*b* over the message path 131*c*, and receiving the requested content over the message path 131*d*. However, the requested content is then forwarded to the requesting device, namely the SP server 72, over a message path 194 illustrated as part of a messaging chart 190*b* in FIG. 19*b*, rather than being forwarded to the TB server 71 over the message path 131*e* as described above. In turn, the received content from the selected tunnel #4 33*d* is forwarded by the SP server 72 to the requesting client 31*a* over the message path 131g as described above.

The mechanism of the "Content Fetching" phase 85 that is described in the messaging chart 190*b* involves the selected tunnel #4 33*d* receiving the content from the web server 22*d* over the message path 131*d*, forwarding the content from the selected tunnel #4 33*d* over the message path 194 to the SP server 72, which in turn send the fetched content as a response to the requesting client 31*a* over the message path 131*g*. Such content path is preferred since the 'tunneling' via the TB server 71 using the message paths 131*e* and 131*f* is obviated, providing one less hop of carrying information from the web server 22*b* to the client device 31*a*, thus providing less latency, higher reliability, and less costs associated with the additional traffic, hardware and processing power required for handling the unnecessary tunneling via the TB server 71. Further, such scheme allows to optimize the structure and functionalities of the TB server 71 for tunnel selection activities.

Figure 19A:
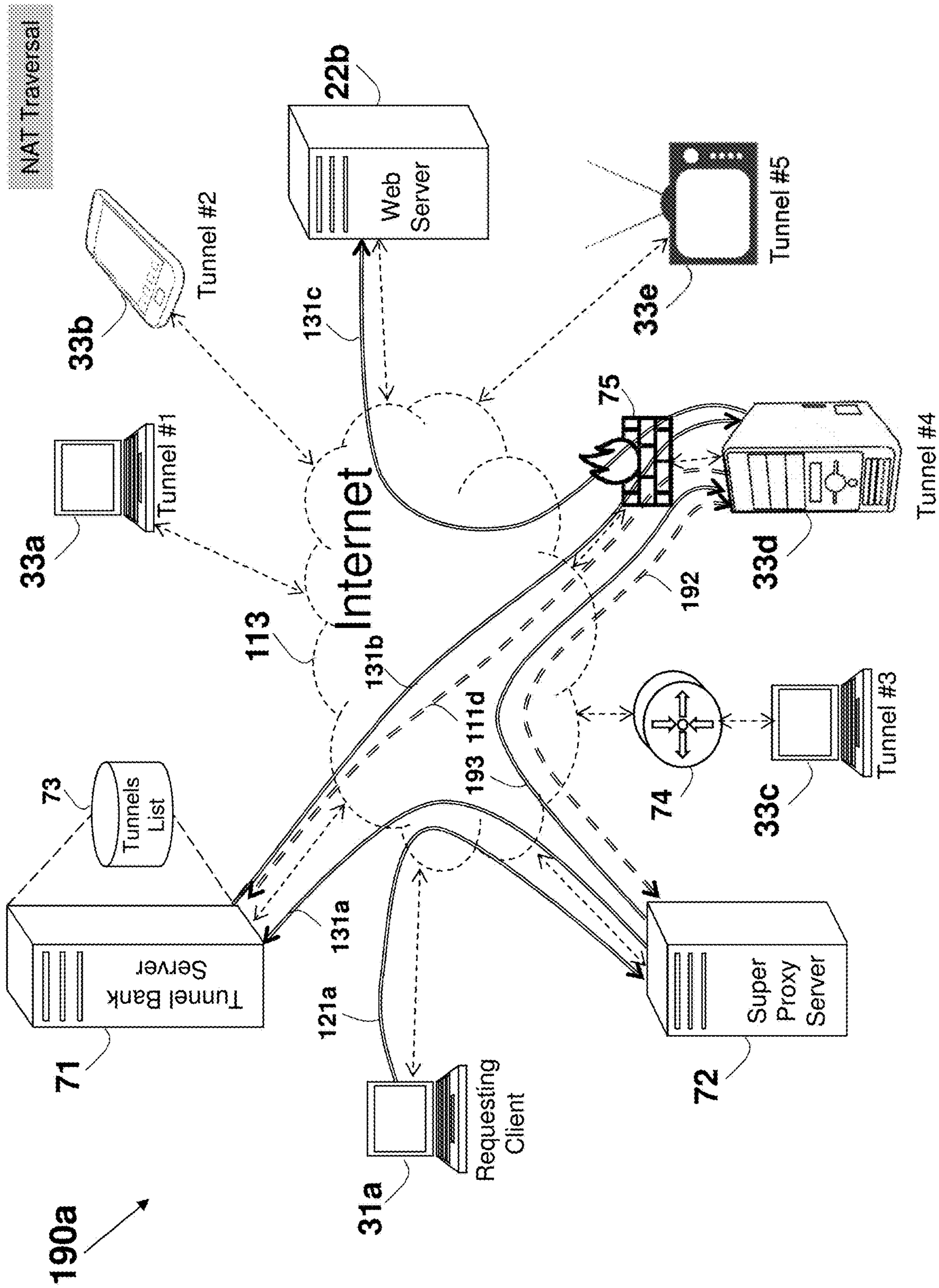
Figure 19B:
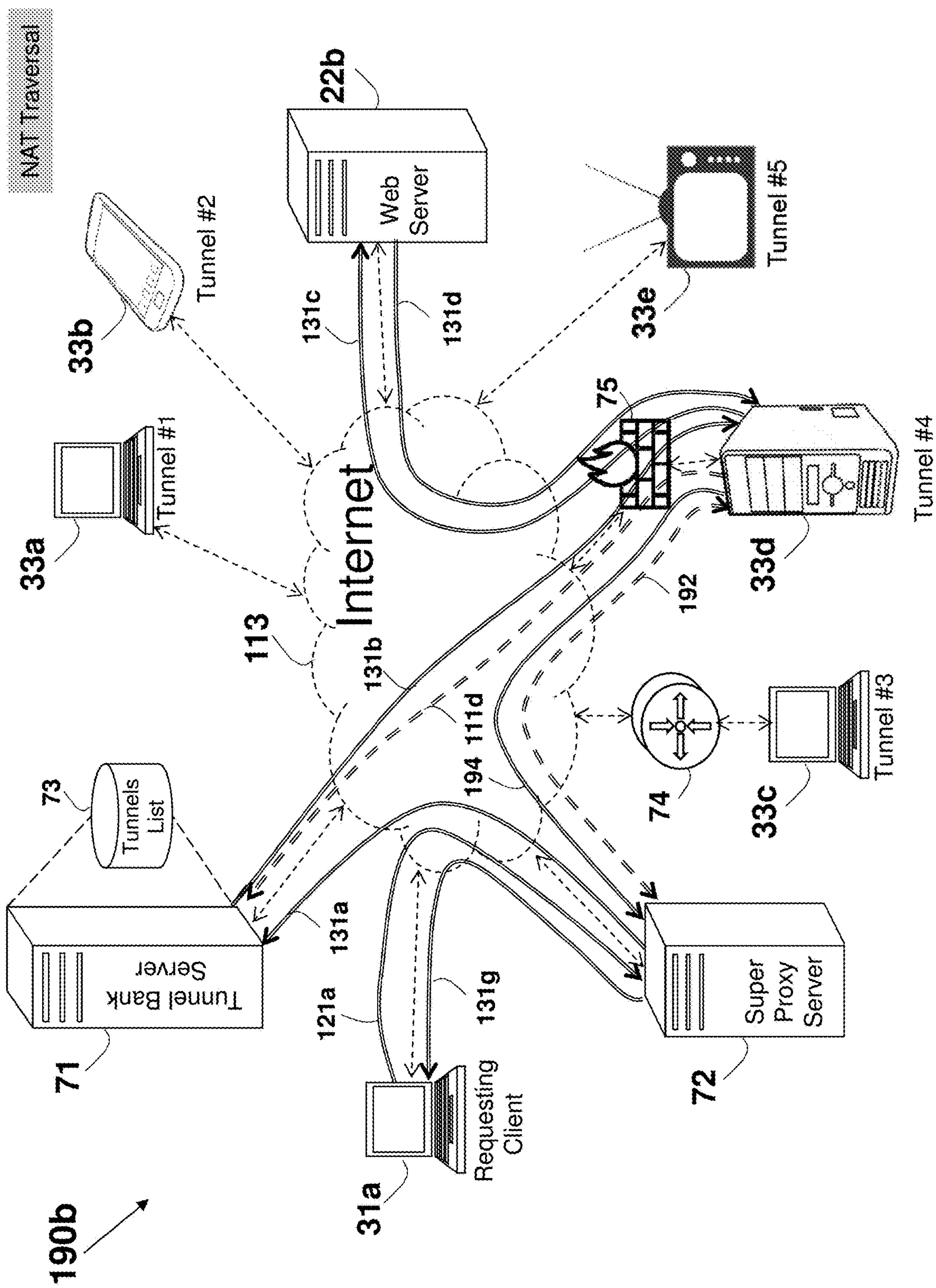
Figure 20:
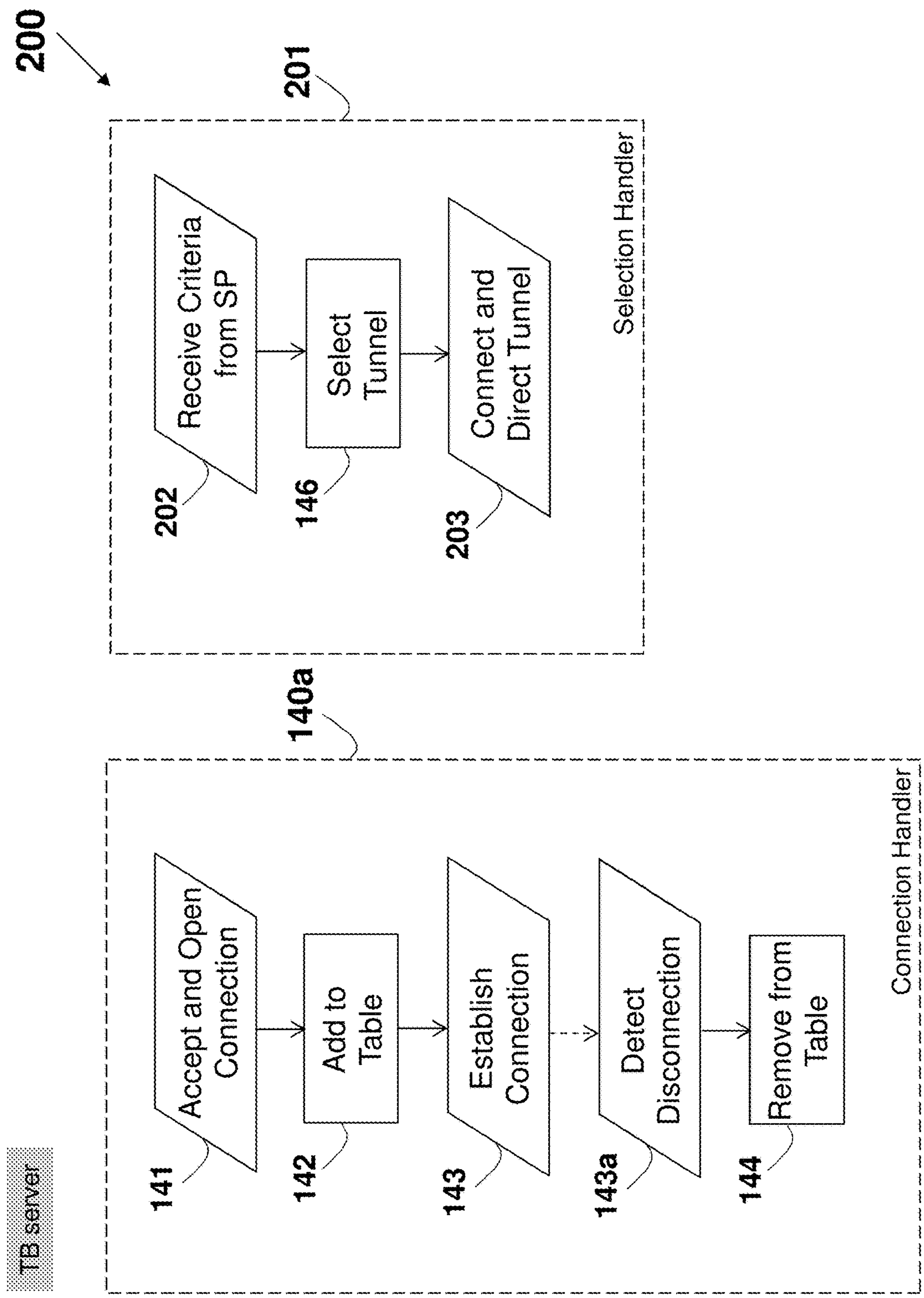
FIG. 20 illustrates schematically another simplified flowchart relating to a TB server.

In the alternative arrangement described in FIGS. 19-19*b*, the TB server 71 generally executes a flowchart 200 shown in FIG. 20, which is based on the flowchart 140 shown in FIG. 14. The TB server 71 generally executes in parallel at least the unchanged "Connection Handler" flow chart 140*a* and a "Selection Handler" flow chart 201, which may replace the "Request Handler" flow chart 140*b*, which is direct to selecting a tunnel device according to a criteria.

As part of processing a content request from the client device 31*a*, the TB server 71 receives from the SP server 72, over the message path 131*a* shown in the messaging chart 190, criteria (or a criterion) for selecting a tunnel device to be used for delivering the requested content, as part of a "Receive Criteria from SP" step 202. While as part of the "Receive Request from SP" step 145 that is part of the flow chart 140*b* the TB server 71 was also notified of the identification of the requested content, such identification is not required in this alternative scheme, since the TB server 71 is no longer part of the actual content request and fetching data paths. In one example, the same message, including also the content identification is sent from the SP server 72 to the TB server 71 over the message path 131*a*, so that the "Receive Criteria from SP" step 202 may be rendered to be the same as the "Receive Request from SP" step 145 described above. After a tunnel device is selected as part of the "Select Tunnel" step 146, the TB server 71 sends a message to the selected tunnel #4 33*d* over the message path 131*b*, directing it to initiate communication (such as by using NAT traversal) with the SP server 72, as part of the "Connect and Direct Tunnel" step 203. In the scheme shown in FIG. 19, the tunnel selection phase 83 is completed, and the involvement of the TB server 71 in the fetching process ends after directing the selected tunnel #4 33*d* in the "Connect and Direct Tunnel" step 203.

Figure 21:
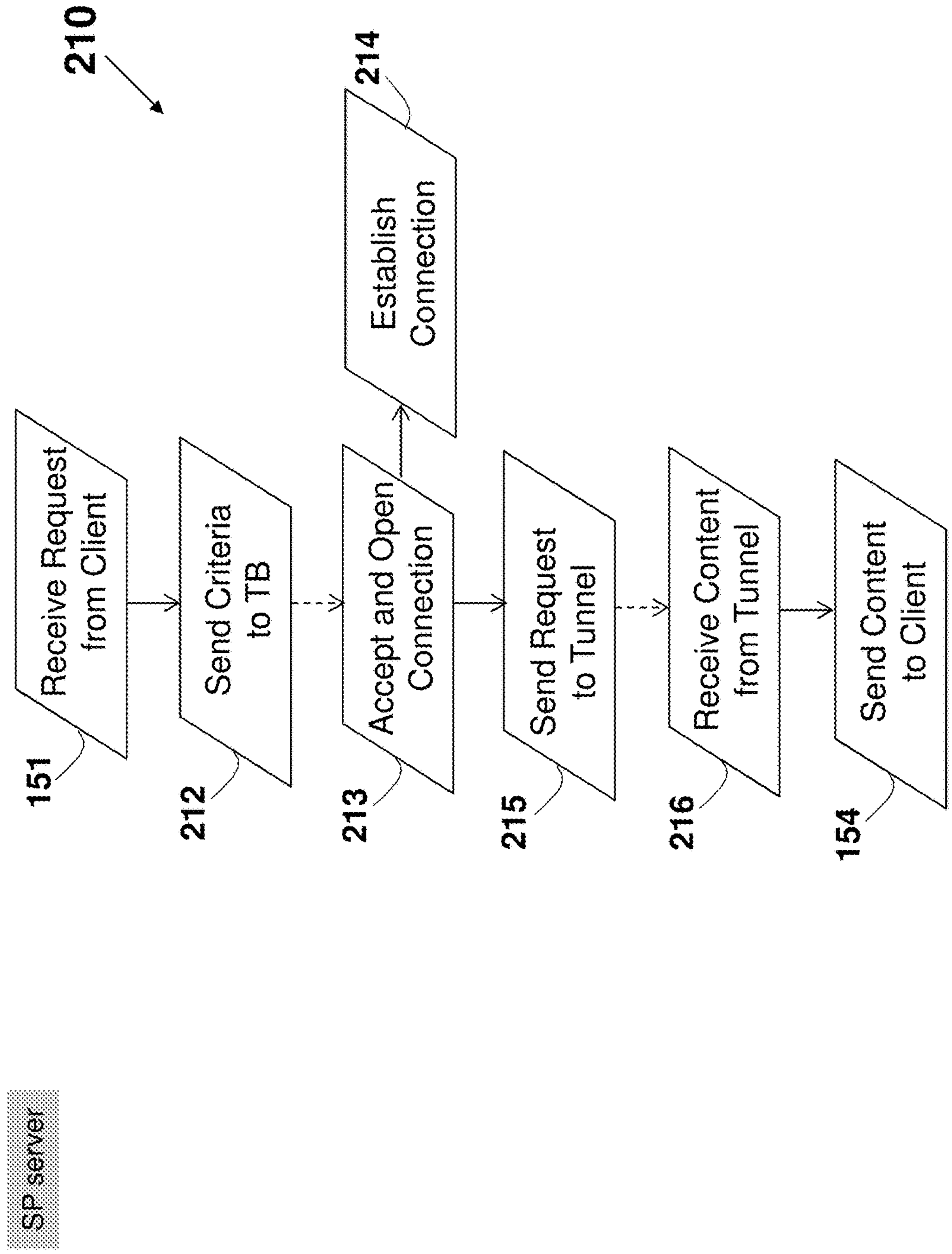
FIG. 21 illustrates schematically another simplified flowchart relating to a SP server.

In the alternative arrangement described in FIGS. 19-19*b*, the SP server 72 generally executes a flowchart 210 shown in FIG. 21, which is based on the flowchart 150 shown in FIG. 15. The SP server 72 generally executes the flowchart 210 shown in FIG. 21 for each piece of information or content (such as a single URL) requested by the client device 31*a*. The operation starts when a content request is received from the client device 31*a* as part of the "Receive Request from Client" step 151, which corresponds to the message path 121*a* shown in the messaging chart 120 and performed as part of the "Content Request" phase 82. A request from the client device 31*a* may include both identification of the requested content and criteria for selecting a tunnel device, such as the attribute type to use and the associated attribute value or values. As part of a "Send Criteria to TB" step 212, the criteria set by the client device 31*a* for selection of a tunnel device, as part of the request, is sent to the TB server 71, without the content identification part, over the message path 131*a*, to be received by the TB server 71 as part of the "Receive Criteria from SP" step 202. Alternatively, the message sent includes the whole content request information, similar to, or identical to, the "Send Request to TB" step 152 in the flow chart 150, which corresponds to the message path 131*a* shown in the messaging chart 120*a*, and received by the TB server 71 as part of the "Receive Request from SP" step 145. As part of an "Accept and Open Connection" step 213, the SP server 72 receives a communication initiated by the selected tunnel #4 33*d*, shown as a message path 191, and the connection between the SP server 72 and the selected tunnel #4 33*d* is sustained as part of an "Establish Connection" step 214. The sustained connection is illustrated as a message path 192, and may be based on TCP connection that uses the TCP keepalive mechanism, similar to the connection 111*d* between the selected tunnel #4 33*d* and the TB server 71. The sustained connection allows the SP server 72 to initiate communication with the tunnel #4 33*d*, even in the presence of a filtering device such as a router or the firewall 75.

Using the established connection 192, the SP server 72 forwards the content identification to the selected tunnel #4 33*d* as part of a "Send Request to Tunnel" step 215, illustrated as message path 193 in a messaging chart 190*a* shown in FIG. 19*a*, and in response the selected tunnel #4 33*d* provides 'tunneling' by forwarding the request to the web server 22*b* over the message path 131*c*, as part of the "Using Tunnel" phase 84. The content fetched by the selected tunnel #4 33*d* is in turn sent to the SP server 72, and received over the message path 194 illustrated in a messaging chart 190*b* shown in FIG. 19*b*, as part of a "Receive Content from Tunnel" step 216. Similar to the flow chart 150 above, the SP server 72 then forward the fetched content as a response to the client device 31*a* request over the message path 131*g* as part of the "Send Content to Client" step 154, completing the "Content Fetching" phase 85.

Figure 22:
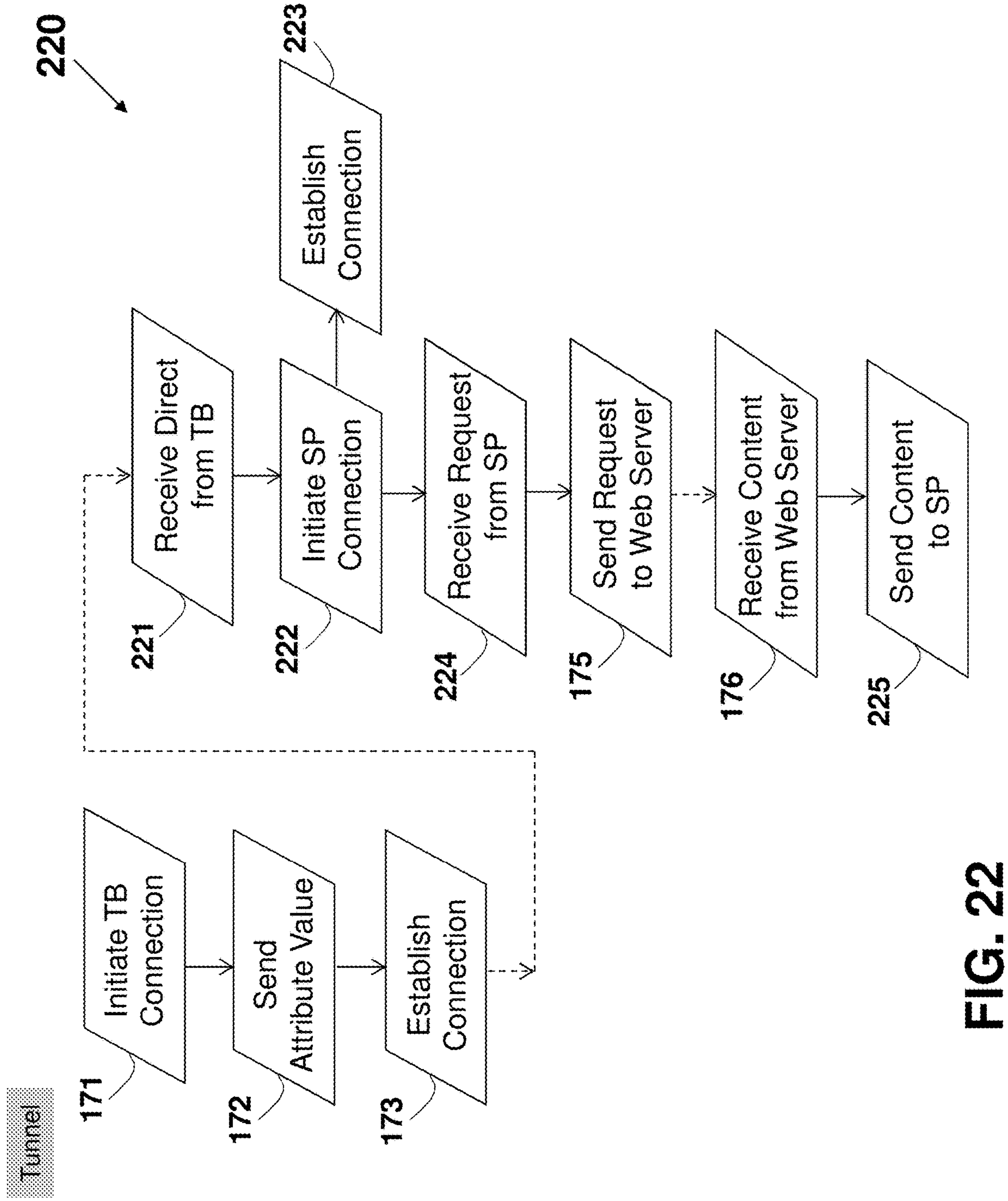
FIG. 22 illustrates schematically another simplified flowchart relating to a tunnel device.

In the alternative arrangement described in FIGS. 19-19*b*, the selected tunnel device, such as the exampled tunnel device #4 33*d*, generally executes a flowchart 220 shown in FIG. 22, which is based on the flowchart 170 shown in FIG. 17. The selected tunnel device generally executes the flowchart 220 shown in FIG. 22 each time it is selected as a tunnel device by the TB server 71. Using the established connection 111*d*, the tunnel #4 33*d* receives an instruction from the TB server 71 (that is sent as part of the "Connect and Direct Tunnel" step 203 of the flow chart 201) to connect to the SP server 72, as part of a "Receive Direct from TB" step 221 over the message path 131*b*. In response, as part of a "Initiate SP Connection" step 222, the tunnel device #4 33*d* connects to the SP server 72, and then a sustained connection, shown as the message path 192, is formed as part of a "Establish Connection" step 223, corresponding to the "Establish Connection" step 214 in the flow chart 210. A content request sent by the SP server 72 as part of the "Send Request to Tunnel" step 215 (in the flow chart 210) is received by the selected tunnel #4 33*d* as part of a "Receive Request from SP" step 224, illustrated as the message path 193 in the messaging chart 190*a* shown in FIG. 19*a*. Similar to the flow chart 170 above, the selected tunnel device forward the request to the relevant web server, such as the web server 22*b*, as part of the "Send Request to Web Server" step 175, corresponding to the message path 131*c* shown in the example of selecting the tunnel #4 33*d* in the messaging chart 190*a*, thus completing the "Using Tunnel" phase 84 in the flow chart 80 shown in FIG. 8.

As part of the "Content fetching" phase 85, the content retrieved from the web server 22*b* (as a response to the request) is received by the selected tunnel device as part of the "Receive Content from Web Server" step 176 (corresponding to the message path 131*d* in the messaging chart 130), and is then forwarded (or 'tunneled') to the SP server 71 as part of a "Send Content to SP" step 225, and received by the SP server 72 as part of the "Receive Content from Tunnel" step 216, corresponding to message path 194 in the messaging chart 190*b*.

Any of the steps or the flow charts to be executed by a tunnel device, may be included as a Software development kit (SDK) that is provided as a non-transitory computer readable medium containing computer instructions. The SDK may be installed in a respective tunnel device, to be executed by a processor in that device, appended to another software program or application installed on the tunnel device.

An attribute type is used herein to include any characteristic, feature, aspect, property, or any other piece of information where one tunnel device is different from another tunnel device. The attribute type may be associated with the tunnel device itself, such as its hardware, software, or any combination thereof, the tunnel device environment, such as its location, or a connectivity related feature or capability, such as relating to Internet connectivity. Each available tunnel device may be associated with a value (or multiple value, such as a range) for each attribute type. The attribute values may be stored in the tunnels list memory 73 that is part of, or connected to, the TB server 71, that may be, for example, in the form of the table 100 shown in FIG. 10.

The table 100 examples in the "Geographic Location" column 102*c* an attribute type relating to the location of tunnel devices, which may be actual geographical location or may be based on IP Geolocation. In the example of the "Geographic Location" column 102*c*, the attributes values are in the form of cities, such as the city of Munich, Germany in the second row 101*b* that corresponds to a tunnel device having an IP address of 176.94.1.17, and the city of Mumbai, India in the sixth row 101*f* that corresponds to a tunnel device having an IP address of 59.144.192.23. While city is exampled as values, any other physical geographical location or region may be used, such as country, state or province, city, street address, ZIP code, or any combination thereof. Similarly, an attribute type may correspond to the Internet connection of a tunnel device, as the table 100 examples in the "ASN" column 102*d* relating to the ASN (or ISP name or any other identification). In the example of the "ASN" column 102*d*, the attributes values are in the form of digits that represent the ASN (or ISP), such as the ASN 3215 in the first row 101*a* that corresponds to a tunnel device having an IP address of 80.12.105.150, and the ASN 11419 in the seventh row 101*g* that corresponds to a tunnel device having an IP address of 200.196.224.89. Any other identification of ASN, ISP, or any other Internet connection relating mechanism or identity may be equally used.

Another attribute type that may correspond to the technology used for interconnecting a tunnel device to the Internet, as the table 100 examples in the "Connection Type" column 102*e* relating to the technology or connection scheme. Similarly, the attribute type may correspond to a tunnel device hardware or software, type, version, or any combination thereof, such as the table 100 examples in the "Operating System" column 102*f*. Alternatively or in addition, an attribute type may correspond to estimated or measured communication related features, such as the bandwidth as exampled in the "BW" column 102*g* or the "RTT" column 102*h*. The BW or RTT may relate to the tunnel estimated or measured communication properties (such as parameters measured in previous transactions) with the web server 22*b* (such as over the message paths 131*c* or 131*d*), with the TB server 71 (such as over the message paths 131*b* and 131*e*), or with the SP server 72 (such as over the message paths 191 and 194).

In one example, a single attribute type is used for distinguishing between the various available tunnel devices. In this case, the client device 31*a*, as part of the "Send Request to SP" step 161, sends to the SP server 72 over the message path 121*a* a value (or multiple values, such as a range) requested for the selected tunnel that is to be used in fetching the requested content. The value (or multiple values, such as a range) is received by the SP server 72 as part of the "Receive Content from Client" step 151, and forwarded to the TB server 71 over the message path 131*a* as part of "Send request to TB" step 152. The value (or multiple values, such as a range) is received by the TB server 71 as part of the "Receive Request from SP" 145, and is used as a criteria for selecting a tunnel device for this content fetching transaction as part of the "Select Tunnel" step 146. In one example, a single value is requested, and the TB server 71 thus selects a tunnel device having a value that is identical to the requested value from the client device 31*a*.

For example, assuming an attribute type of operating system and a value of "Window 7", since there is only a single tunnel, being the tunnel represented in the fourth row 101*d* having an IP address of 83.220.232.67, this tunnel is selected. In a case where multiple available tunnel devices in the table 100 are associated with the requested value, one of these available tunnel is selected, such as using random selection. In another example, few values are requested. For example, assuming an attribute type of 'connection type' and values of "ADSL or VDSL", there are three tunnel devices that may be selected, namely the first row 101*a* (a tunnel device having an IP address of 80.12.105.150), the fourth row 101*d* (a tunnel device having an IP address of 83.220.232.67), and the seventh row 101*g* (a tunnel device having an IP address of 200.196.224.89). Any one of these tunnel devices may be selected, such as using random selection. Similarly, the client device 31*a* may define a range of values, typically where numeral values are involved, such as in the attribute type relating to column "BW" 102*g* or the "RTT" column 102*h*. For example, the client device 31*a* may define a "RTT" attribute type having a range between 200 ms (minimum value) and 400 ms (maximum value), directing the selection of the tunnel device represented in the six row 101*f* (a tunnel device having an IP address of 59.144.192.23) or the tunnel device represented in the seventh row 101*g* (a tunnel device having an IP address of 200.196.224.89), in the example of the table 100. Similarly, the client device 31*a* may define only a minimum value, or only a maximum value. For example, a maximum RTT value of 100 ms results in the first row 101*a* and second row 101*b*.

Alternatively or in addition, the selection of the tunnel device to be used (as part of the "Select Tunnel" step 146), or the priorities assigned to them, may be based on the available communication attributes or their history. For example, based on the costs associated with the usage of a network, the higher cost network may have lower priority and less used than lower cost or free network. In another example, a high quality network, such as having a higher available bandwidth or throughput, lower communication errors or packet loss, lower hops to destination, or lower transfer delay time, is having higher priority that a lower quality network. The system may use Bit Error Rate (BER), Received Signal Strength Indicator (RSSI), Packet Loss Ratio (PLR), Cyclic Redundancy Check (CRC) and other indicators or measures associated with the communication channel associated with a network interface, and may be based on, use, or include the methodology and schemes described in RFC 2544 entitled: "*Benchmarking Methodology for Network Interconnect Devices*", and ITU-T Y.1564 entitled: "*Ethernet Service Activation Test Methodology*", which are both incorporated in their entirety for all purposes as if fully set forth herein. The network quality grade may be affected by the history of using such a network, for example during a pre-set period before the process of selection of a network interface. In one example, the network interface where the last proper packet was received from may be selected as the interface to be used for the next packet to be transmitted. The system may further use, or be based on, the schemes and technologies described in U.S. Pat. No. 7,027,418 to Gan et al. entitled: "Approach for Selecting Communications Channels Based on Performance", which is incorporated in its entirety for all purposes as if fully set forth herein.

Hence, for any value or range of value defined, a tunnel device to be used may be selected from a set of available tunnel devices, which is a subset of all available tunnel devices that match the requested value or range of values. In one example, the client device 31*a* may use two attributes types, and a value (or a group of values) associated with each attribute type. In such a case, two subsets are formed, one for each attribute, which each subset includes of all available tunnel devices that match the respective requested value (or range of values) for each attribute types. The client device 31*a* may further define a subset that is resulted by an operation on the two subsets. For example, the client device 31*a* may define to select a tunnel from a set that is a union of the two subsets (an 'or' operation), where the union (denoted by ∪) of a collection of sets is the set of all elements in the collection, an intersection of the two sets (an 'and' operation), where the intersection A ∩ B of two sets A and B is the set that contains all elements of A that also belong to B (or equivalently, all elements of B that also belong to A), but no other elements, a set difference or complement operation (where the complement of a set A refers to elements not in A), or asymmetric difference operation the symmetric difference, also known as the disjunctive union, which is the set of elements which are in either of the sets and not in their intersection. For example, in a case of defining a value of BW equal or above 1500 Kb/s 'and' an RTT below 300 ms, the resulted intersection subset includes only the tunnel device represented in the sixth row 101*f*, while in a case of a value of BW equal or above 1500 Kb/s 'or' an RTT below 300 ms, the resulted union subset includes all rows except the seventh row 101*g*. Similarly, three or more attributes values may be defined relating to three of more attribute types.

In one example, the entity 76 or 76*a* forms a system that may be used to provide a service to client devices. The service allows the client device (such as the client device 31*a*) to quickly and anonymously fetch content from a web server, such as the web server 22*b*. The service level may be measured, or the service may be billed for, if applicable, for example, using the following parameters (individually or combined):

Content amount. In this example, the amount of data relating to the content fetched from a data server (such as the web server 22*b*) is measured and logged, by the SP server 72 or the TB server 71. Alternatively or in addition, the client device 31*a* may log or send the amount of content fetched. Number of tunnels: The number of tunnel devices that were available to a client device, or the number of tunnel devices that were actually used, may be used as an indication to the service level. Location: The service level may be measured or billed based on the country of the data server, from which the content is fetched, is located. Similarly, the service level may be measured or billed based the country the client device, to which the content is fetched, is located.

Figure 13:
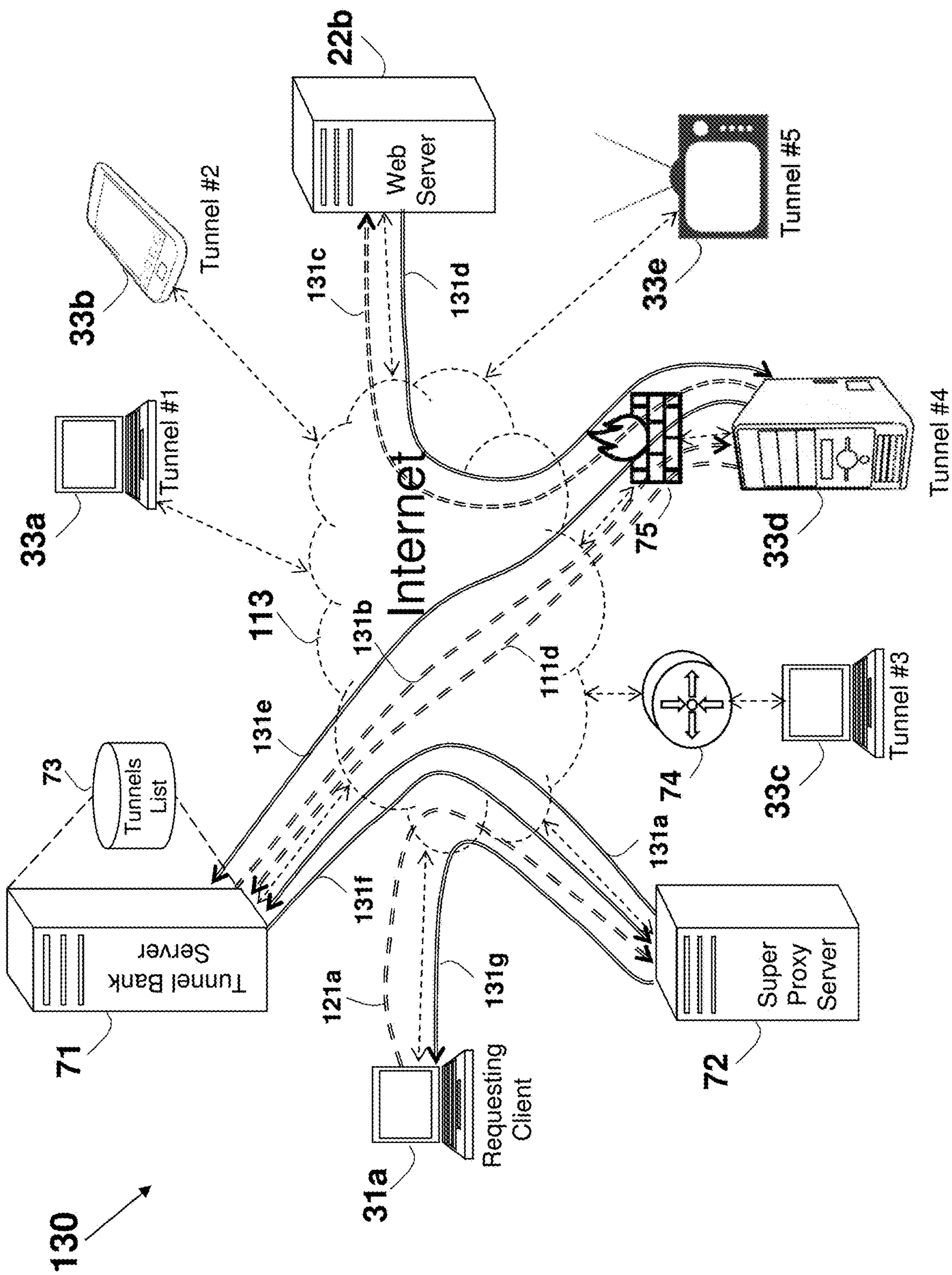
FIG. 13 depicts schematically messages exchanged over the Internet for fetching content from the web server to the client device via the tunnel device, the TB server, and the SP server.
Figure 23:
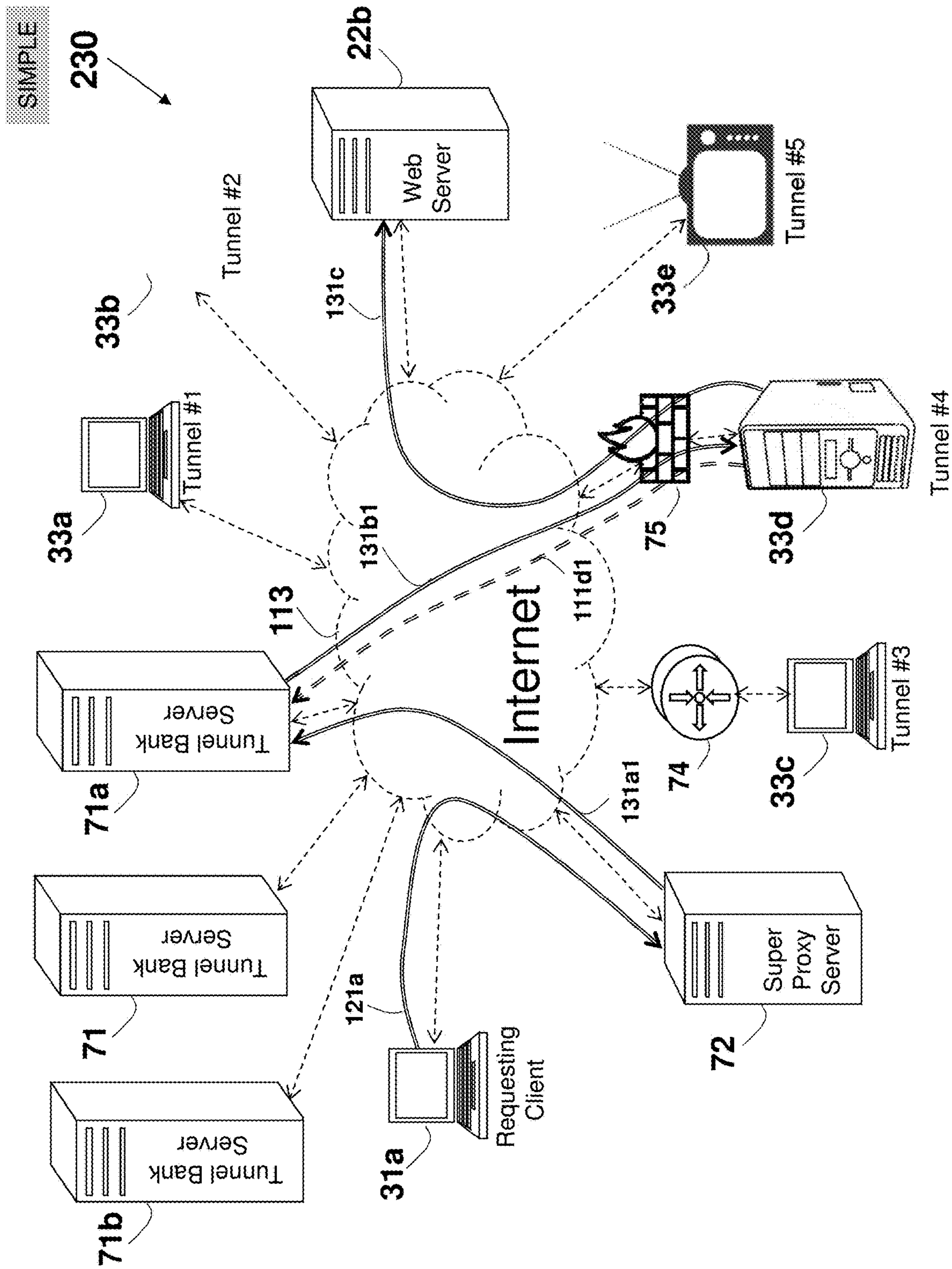
FIGS. 23 and 23*a* depict schematically messages exchanged over the Internet for fetching content from the web server to the client device using multiple TB servers.
Figure 23A:
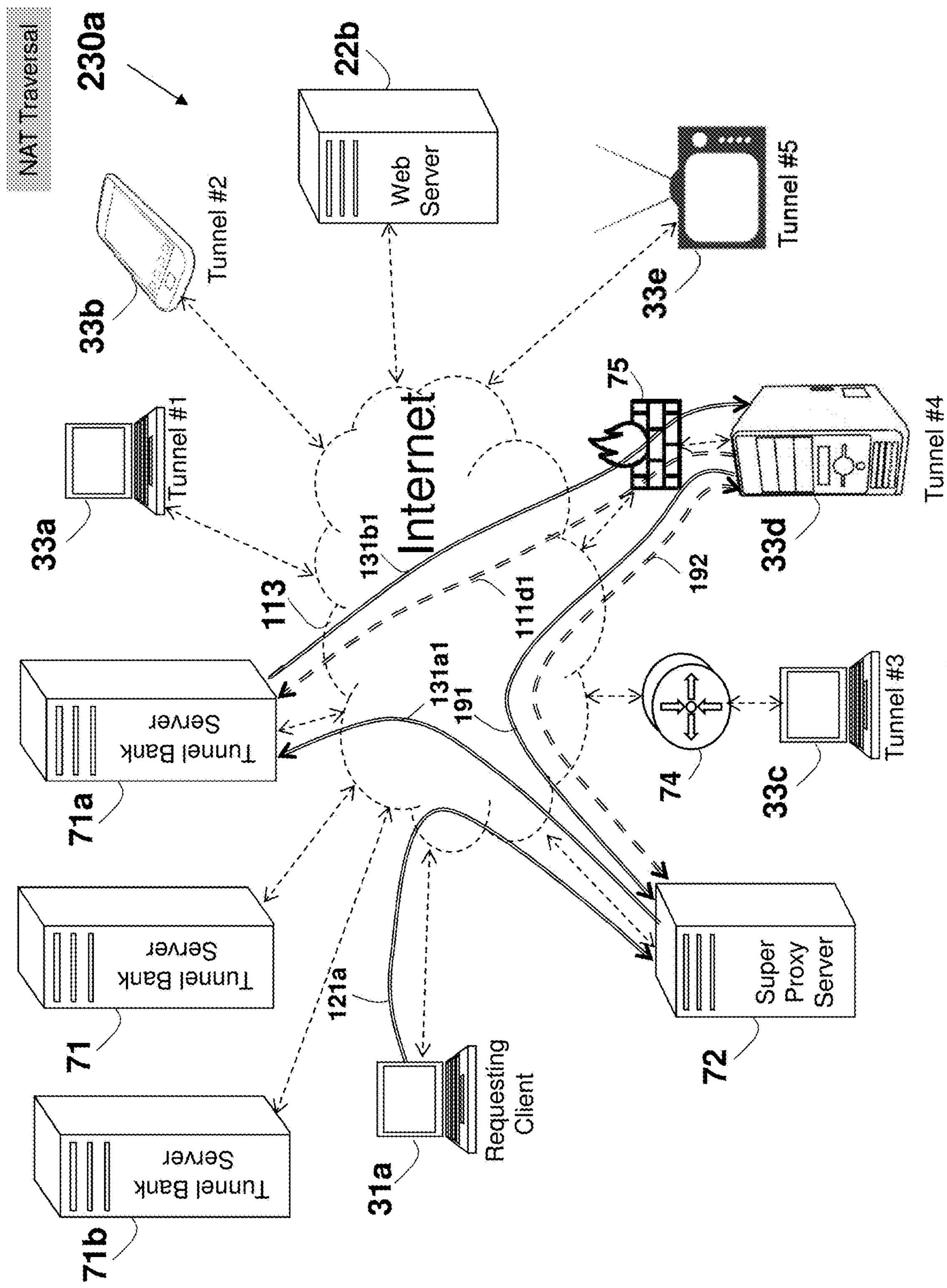

In the messaging chart 190*b* shown in FIG. 19*b*, and in the messaging chart 130 shown in FIG. 13, a single TB server 71 is used. However, multiple TB servers may equally be used, such as for load balancing or for performance optimization. In one example, the tunnel list 73, such as in the form of a table 100, is split among multiple databases stored in, or connected to, multiple servers using database sharding. Such an arrangement is shown in a messaging chart 230 shown in FIG. 23, which is based on the corresponding messaging chart 130. In addition to the TB server 71, a TB server 71*a* and a TB server 71*b* are connected to the Internet and may be used. While three TB servers are exampled in FIG. 23, two, four, five, or any other number of TB servers may equally be used. The messaging chart 230 examples the SP server 72 selecting the TB server 71*a*, rather than using the TB server 71 as shown in the messaging chart 130. Similar to the former described operation, the SP server 72 forward a request to the TB server 71*a* over a message path 131*a*1, and the TB server 71*a* may in turn select the tunnel device #4 33*d*, and send a message to it over a message path 131*b*1, followed by establishing of the connection 111*d*1. Similarly, an arrangement employing multiple TB servers is shown in a messaging chart 230*a* shown in FIG. 23*a*, which is based on the corresponding messaging chart 190*b*, where the TB server 71*a* is used instead of the TB server 71.

Each of the TB servers may execute the flow chart 140 shown in FIG. 14 or the flow chart 200 shown in FIG. 20, and may store a table including tunnel devices, in the form, of the table 100. Preferably, load balancing is achieved where the total available tunnel devices (or IP addresses) are split, such as evenly, between the available TB servers. For example, one third of the available tunnel devices may be associated with the TB server 71, another third with the TB server 71*a*, and the rest third with the TB server 71*b*. Preferably, the allocation of tunnel devices (or IP addresses) between the available TB servers may be based on an attribute type, such as the attribute types described associated with the different tunnel devices. In one example, a geographical location may be used. The various TB servers may be located geographically distributed around the world, and tunnel devices are allocated based on their perspective geographical location, either actual location or IP location. For example, tunnel devices may be allocated to respective TB servers based on their continent, country, region or state, or city. For example, one TB server, such as the TB server 71, may be located in Europe, handling all tunnel devices having an actual geographical location, or IP geolocation, within Europe, such as in Germany or France, a second TB server, such as the TB server 71*a*, may be located in North America, handling all tunnel devices having an actual geographical location, or IP geolocation, within North America, such as in U.S.A. or Canada, and a third TB server, such as the TB server 71*b*, may be located in Asia, handling all tunnel devices having an actual geographical location, or IP geolocation, within Asia such as in China or Thailand. In such a case, the SP server 72 may select the appropriate TB server to use based on the attribute value received from the requesting client 31*a* over the message path 121*a*, as part of the "Receive Request from Client" step 151.

Figure 24:
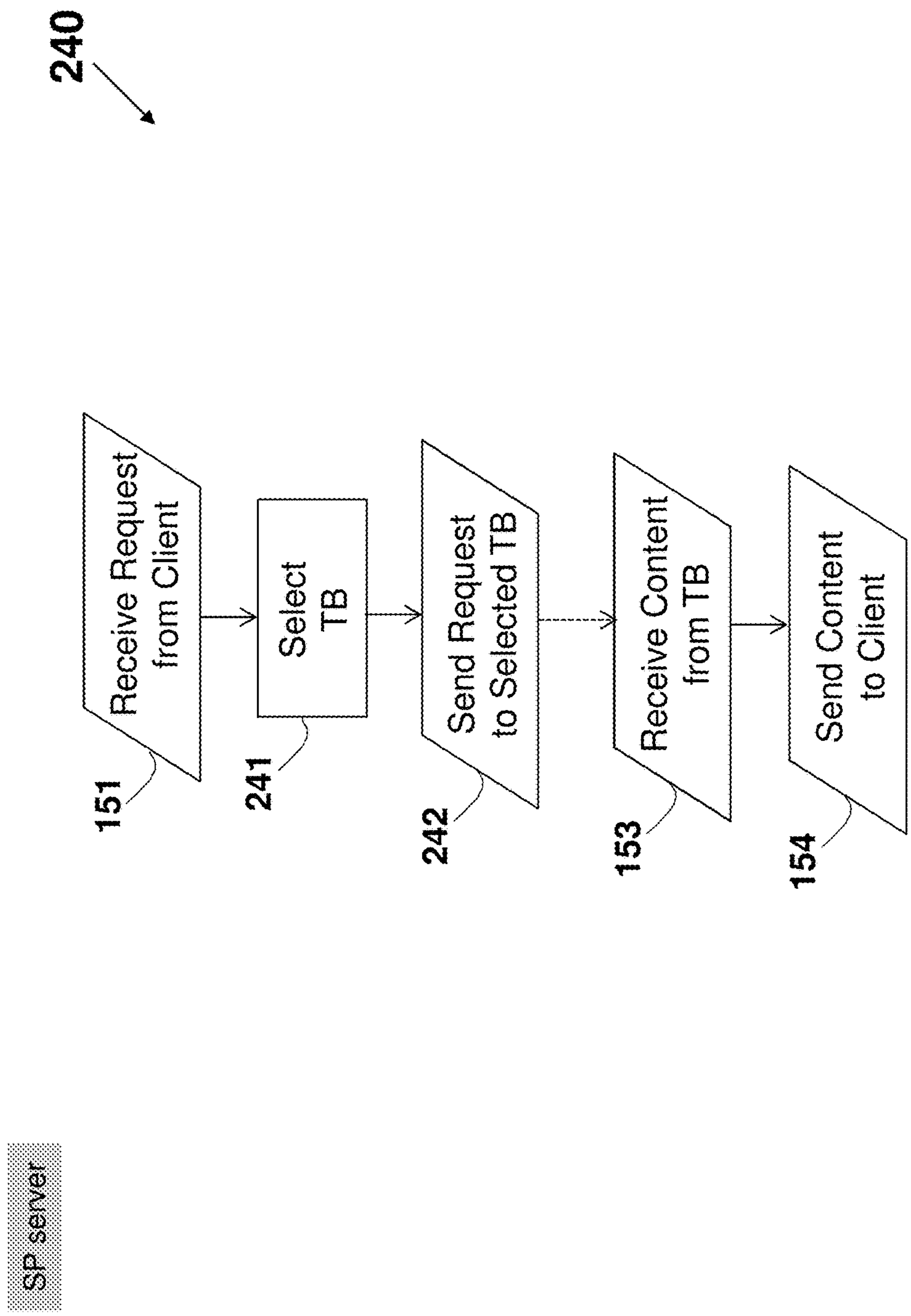
FIGS. 24 and 24*a* illustrate schematically simplified flowcharts relating to a SP server using multiple TB servers.
Figure 24A:
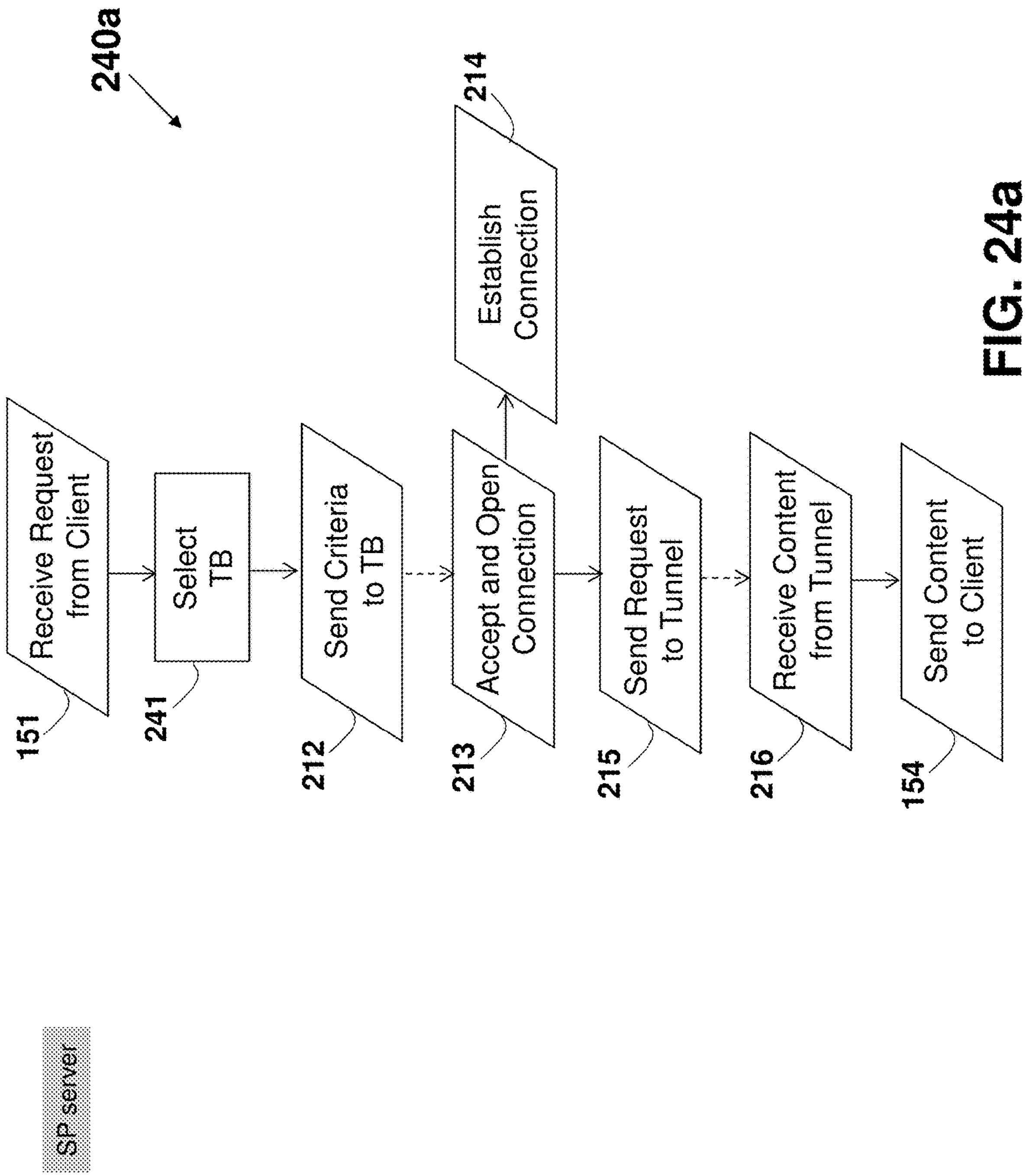

An SP server 72 operation in the case of multiple TB servers arrangement is described in a flow chart 240 shown in FIG. 24, which is based on the corresponding flow chart 150 shown in FIG. 15. As part of a "Select TB" step 241, a specific TB server, such as the TB server 71*a* in the example of the messaging chart 230, is selected, and the operation continues with working with this selected TB server, such as in a "Send Request to Selected TB" step 242. Similarly, an SP server 72 operation in the case of multiple TB servers arrangement is described in a flow chart 240*a* shown in FIG. 24*a*, which is based on the corresponding flow chart 210 shown in FIG. 21. As part of the "Select TB" step 241, a specific TB server, such as the TB server 71*a* in the example of the messaging chart 230, is selected, and the operation continues with working with this selected TB server, such as in the "Send Request to Selected TB" step 242. The TB server may be randomly selected, as part of the "Select TB" step 241, or may be based on an attribute value received from the client device 31*a*, such as geographical location.

Figure 24B:
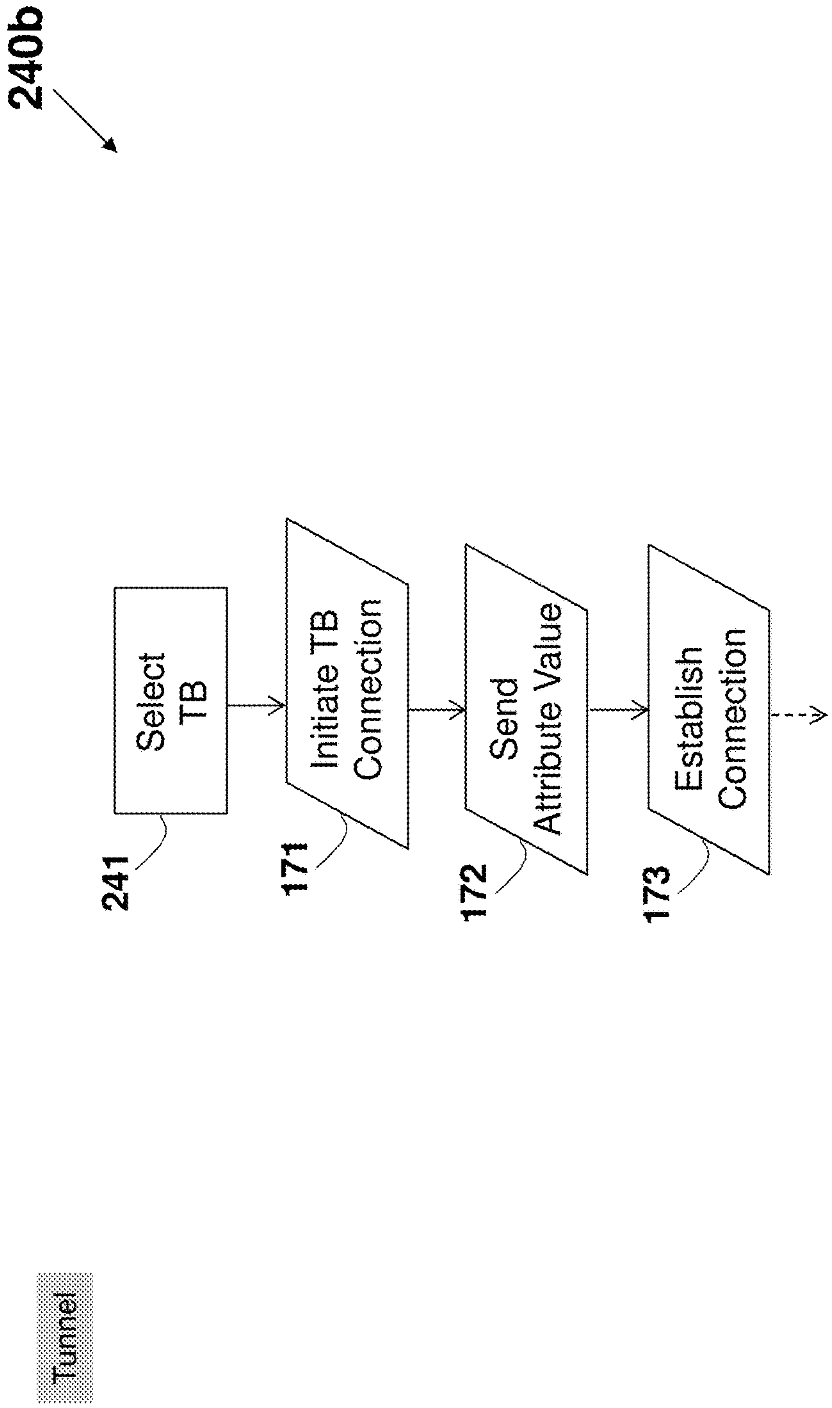
FIGS. 24*b* and 24*c* illustrate schematically simplified flowcharts relating to a tunnel device using multiple TB servers.
Figure 24C:
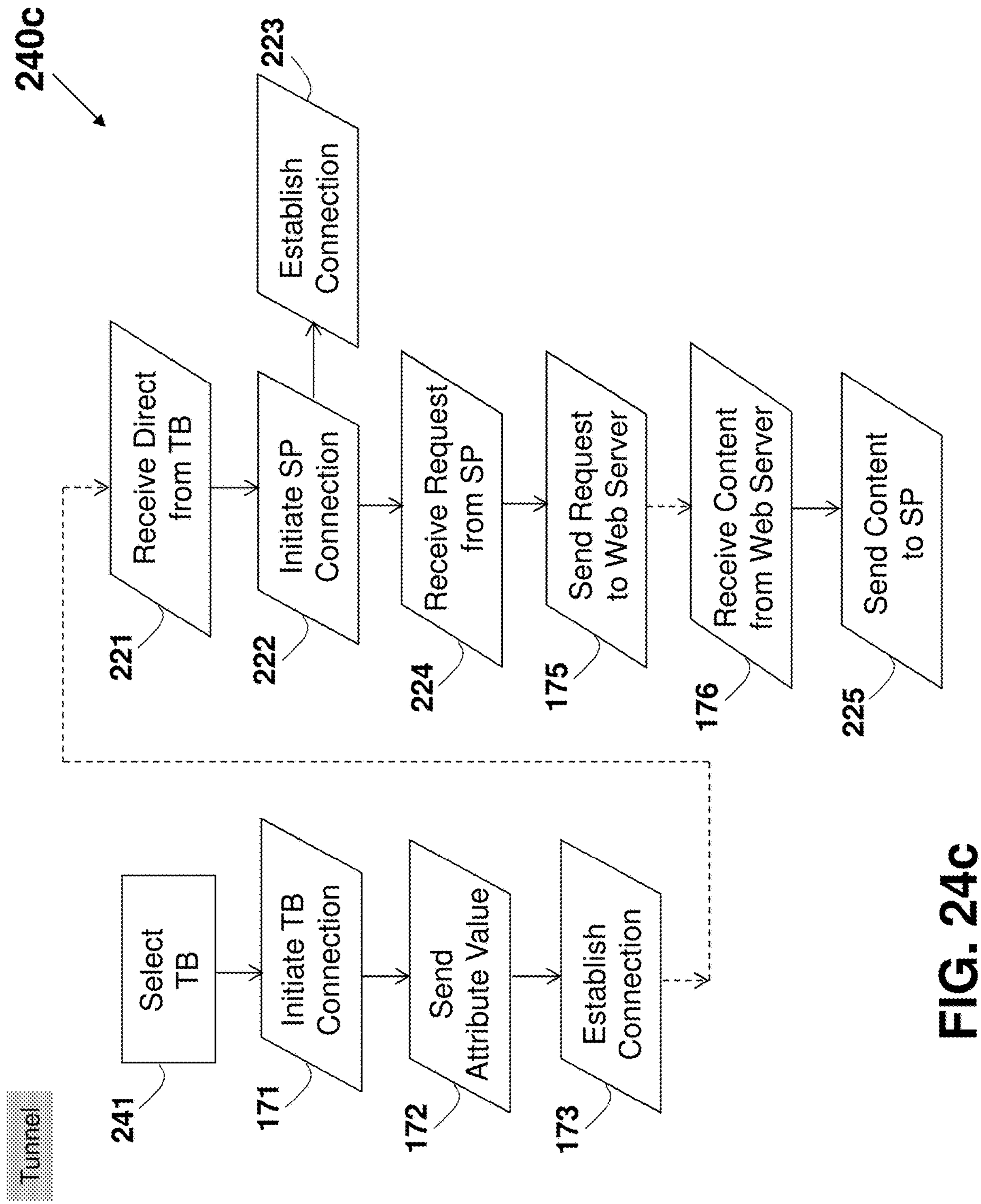

A tunnel device operation, such as the elected tunnel device #4 33*d*, in the case of multiple TB servers arrangement is described in a flow chart 240*b* shown in FIG. 24*b*, which is based on the corresponding flow chart 170 shown in FIG. 17. As part of a "Select TB" step 241, a specific TB server, such as the TB server 71*a* in the example of the messaging chart 230, is selected, and the operation continues with working with this selected TB server, such as in an "Initiate TB Connection" step 171. Similarly, a tunnel device operation in the case of multiple TB servers arrangement is described in a flow chart 240*c* shown in FIG. 24*c*, which is based on the corresponding flow chart 220 shown in FIG. 22. As part of the "Select TB" step 241, a specific TB server, such as the TB server 71*a* in the example of the messaging chart 230, is selected, and the operation continues with working with this selected TB server, such as in the "Initiate TB Connection" step 171. The TB server may be randomly selected, as part of the "Select TB" step 241, or may be based on an attribute value received from the client device 31*a*, such as geographical location.

Figure 25:
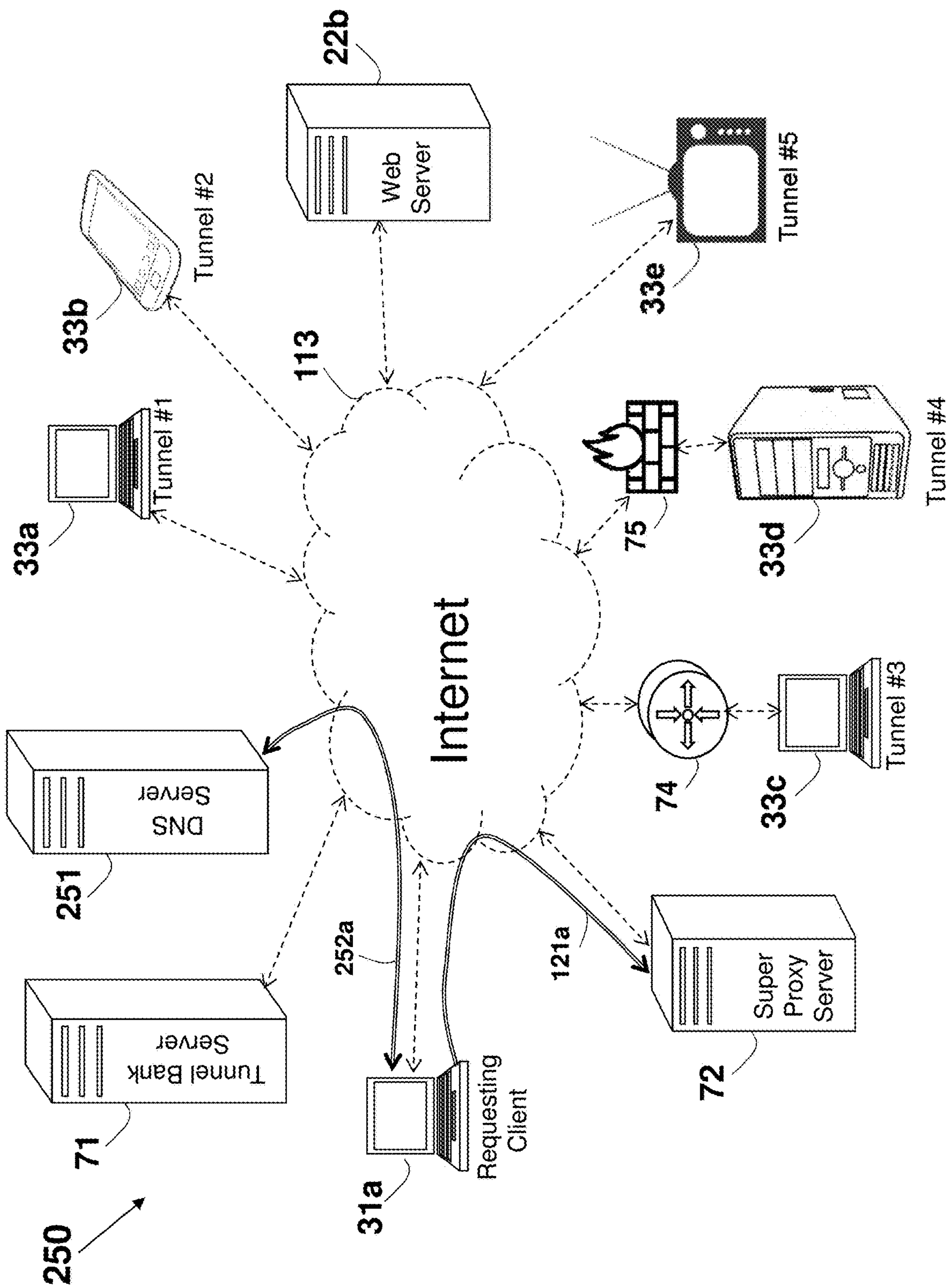
FIGS. 25 and 25*a* depict schematically messages exchanged over the Internet including a DNS resolution by the client device.
Figure 25A:
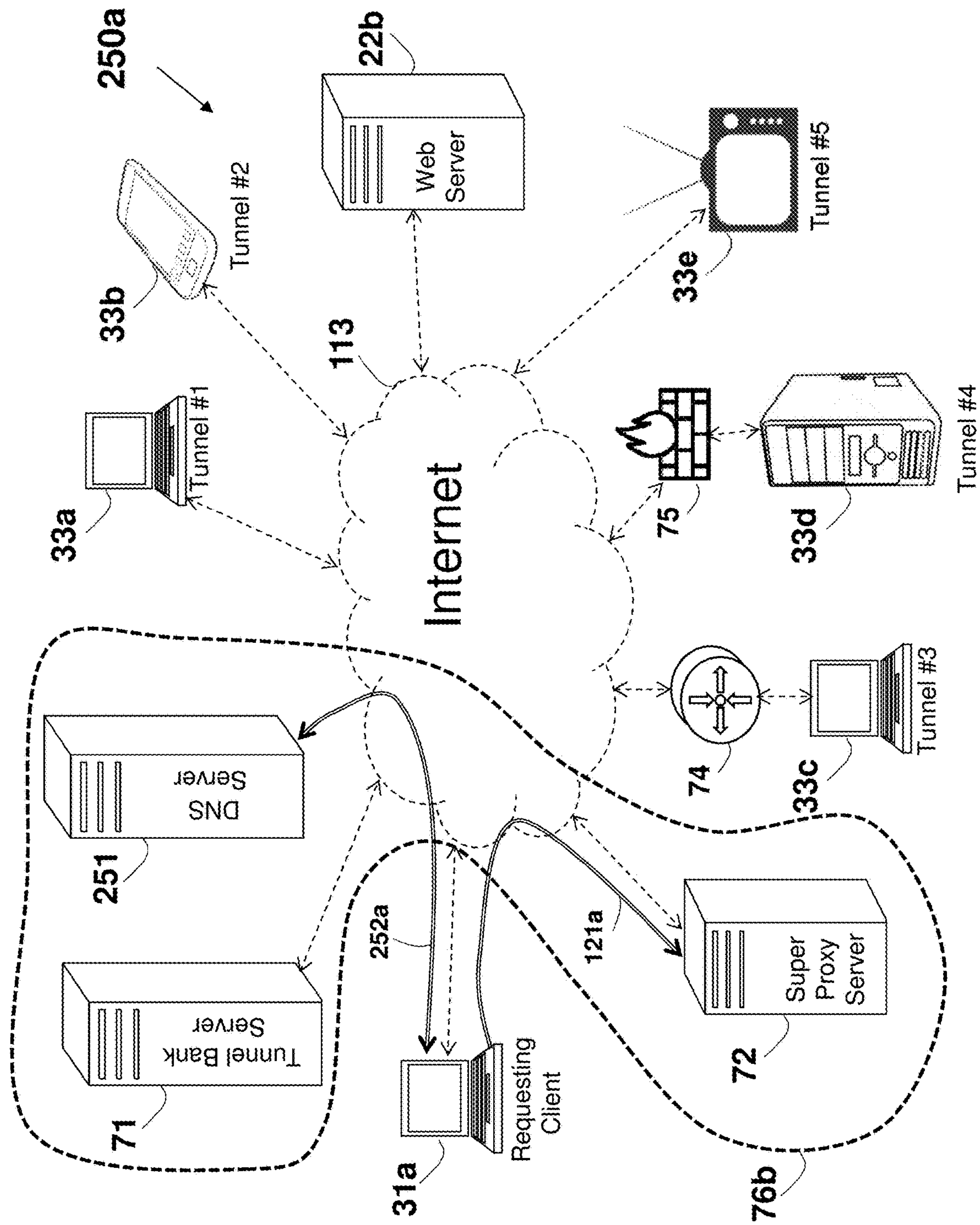
Figure 26:
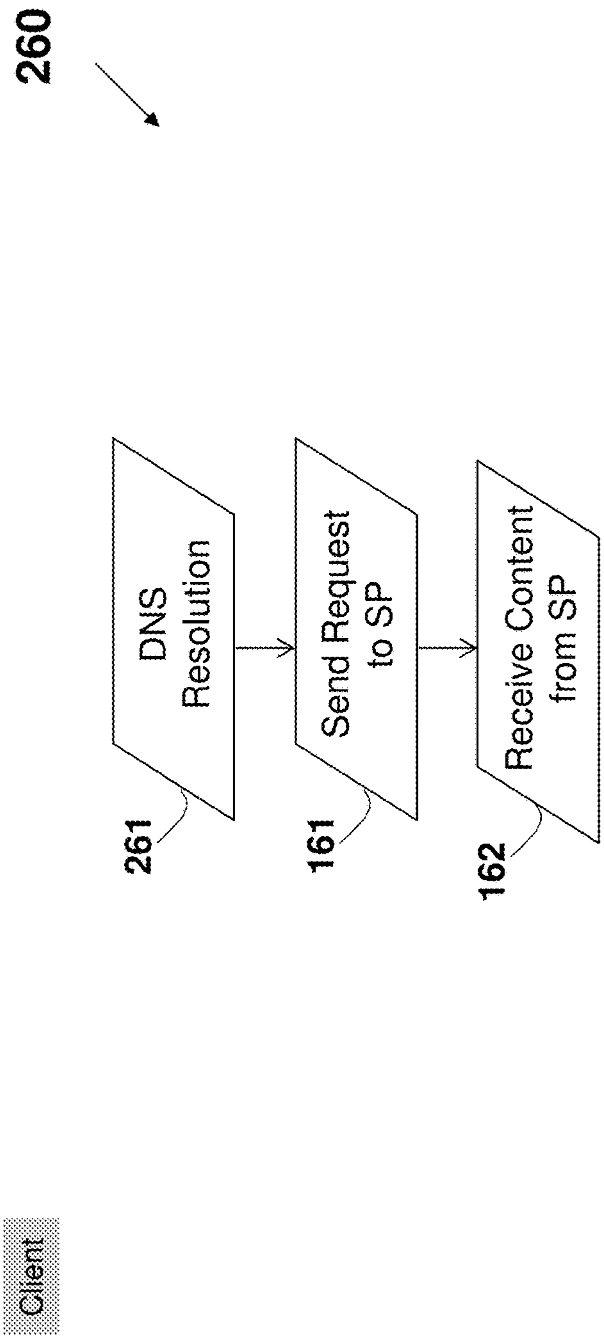
FIG. 26 illustrates schematically a simplified flowchart relating to a client device that includes a DNS resolution.

In one example, a DNS resolution is required for fetching the content from the web server 22*b*. In one example, the DNS resolution is performed by the requesting client 31*a*, as illustrated in a messaging chart 250 shown in FIG. 25. Before requesting the content from the SP server 72, the client device 31*a* uses a DNS server 251 for a DNS resolution, shown as a message path 252*a*. Then, the request sent to the SP server 72 over the message path 121*a* includes the resolution result, so there is no need for any DNS activity afterwards. Any DNS server may be used as the DNS server 251 by the client device 31*a*. In one example, a specific DNS server 251 is used, which is operated, controlled, or managed by an entity 76*b* as illustrated in a messaging chart 250*a* shown in FIG. 25*a*, which also operates, controls, or manage the TB server 71 and the SP server 72. This entity 76*b* may be the same entity as the entity 76*a* (or 76) described above. The client device 31*a* operation, including a "DNS Resolution" step 261 is described in a flow chart 260 shown in FIG. 26, which is based on the corresponding flow chart 160 shown in FIG. 16.

Figure 27:
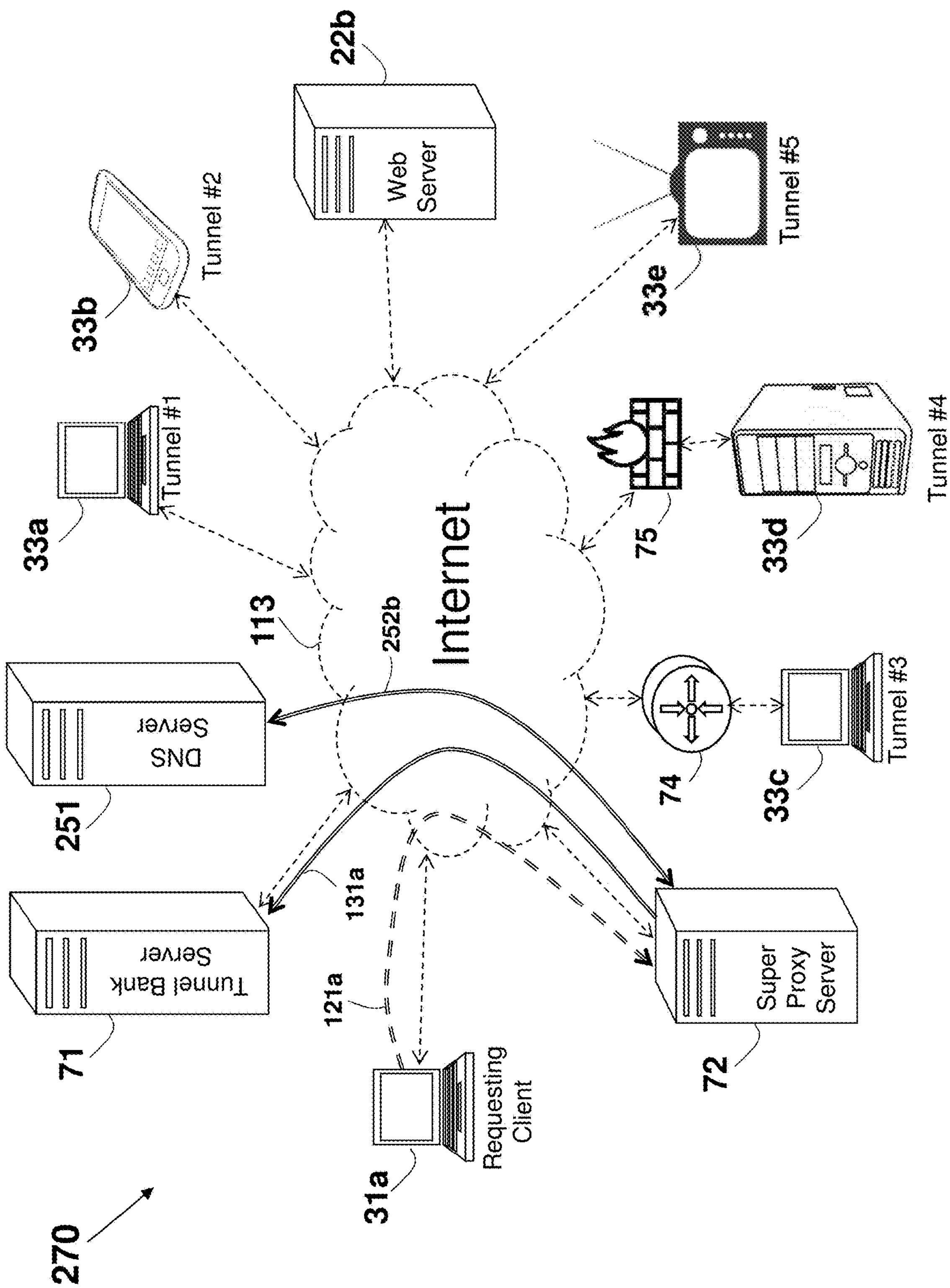
FIG. 27 depicts schematically messages exchanged over the Internet including a DNS resolution by the SP server.
Figure 28:
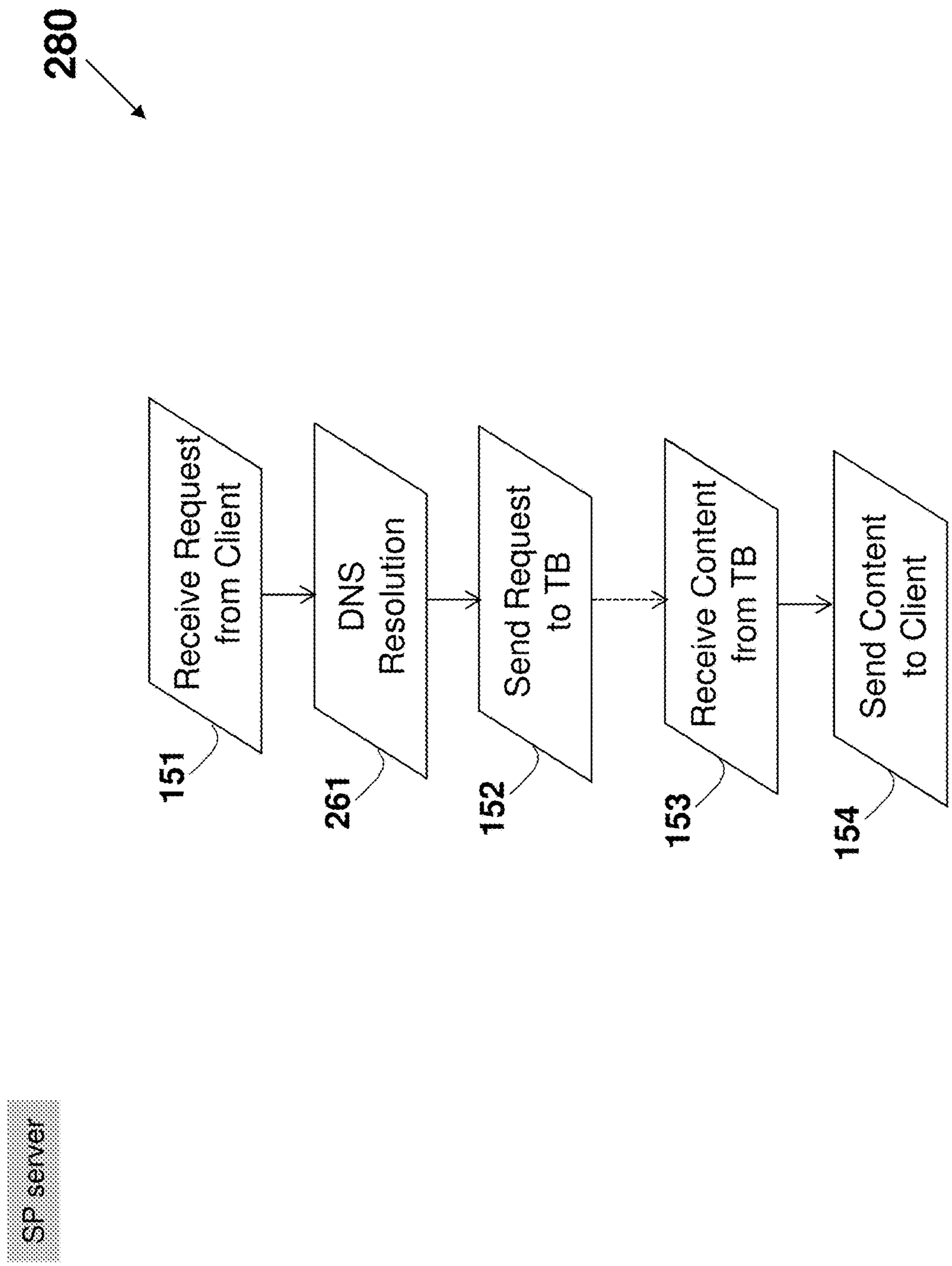
FIGS. 28 and 28*a* illustrate schematically simplified flowcharts relating to the SP server that includes a DNS resolution.
Figure 28A:
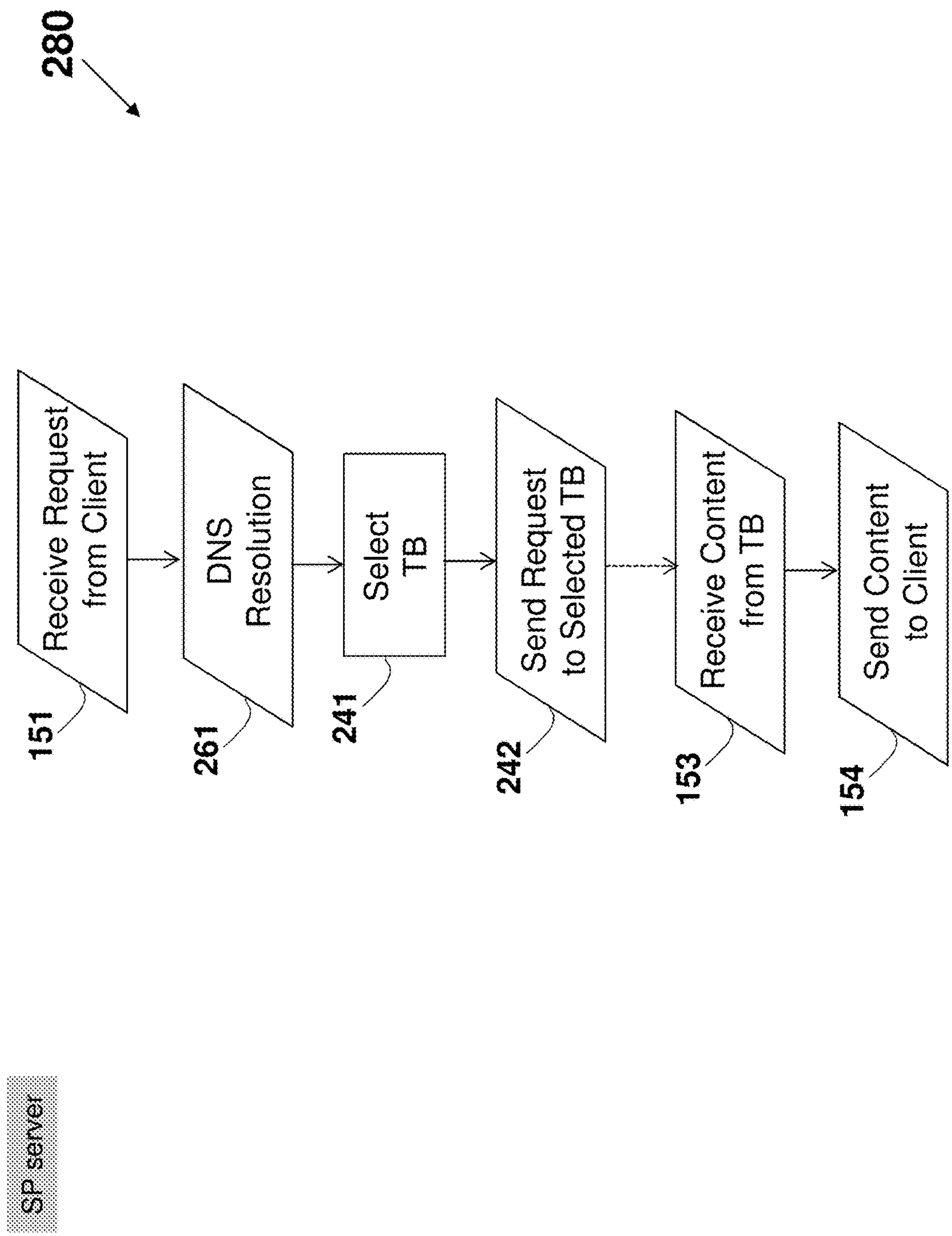

Alternatively or in addition, the DNS resolution may be performed by the SP server 72, as illustrated in a messaging chart 270 shown in FIG. 27. Before requesting for a tunnel device allocation or the content from the TB server 71, the SP server 72 use a DNS server 251 for a DNS resolution, shown as a message path 252*b*. Then, the request that is sent to the selected tunnel device includes the resolution result, so there is no need for any DNS activity afterwards. The SP server 72 operation, including a "DNS Resolution" step 261 is described in a flow chart 280 shown in FIG. 28, which is based on the corresponding flow chart 150 shown in FIG. 15. Alternatively or in addition, the SP server 72 operation, including a "DNS Resolution" step 261 may be as described in a flow chart 280*a* shown in FIG. 28*a*, which is based on the corresponding flow chart 240 shown in FIG. 24.

Figure 29:
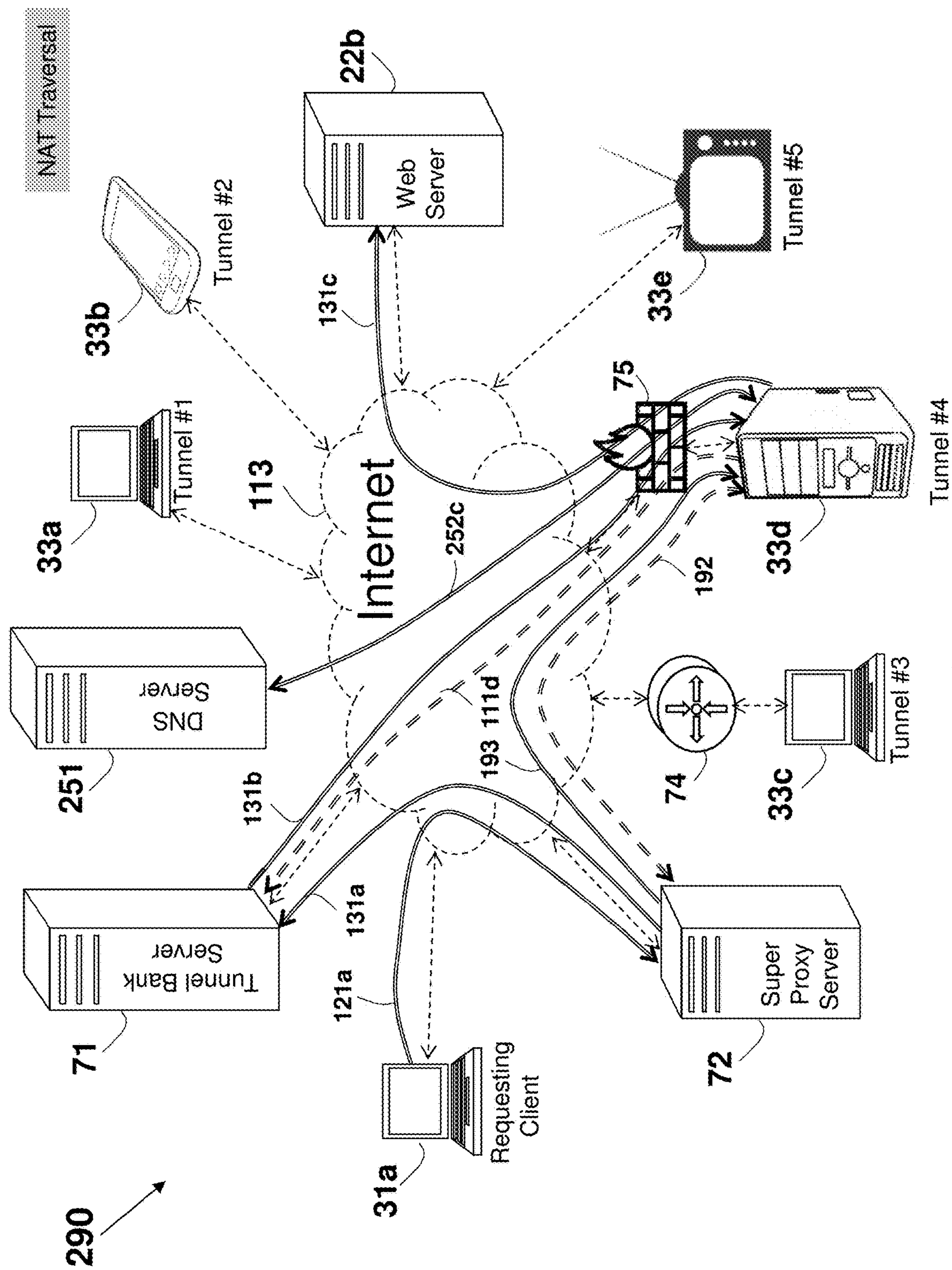
FIG. 29 depicts schematically messages exchanged over the Internet including a DNS resolution by the selected tunnel device.
Figure 30:
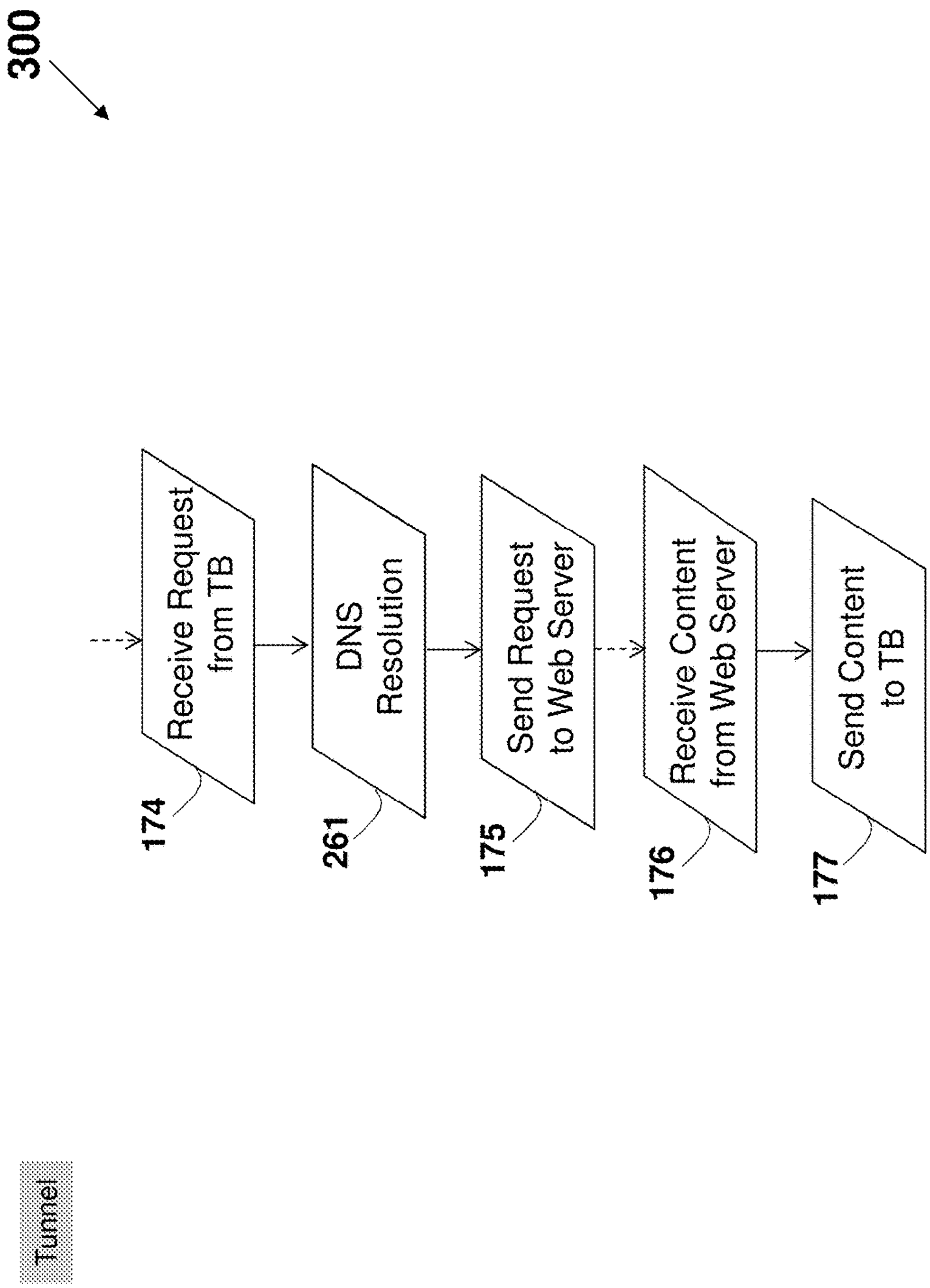
FIGS. 30 and 30*a* illustrate schematically simplified flowcharts relating to the selected tunnel device that includes a DNS resolution.
Figure 30A:
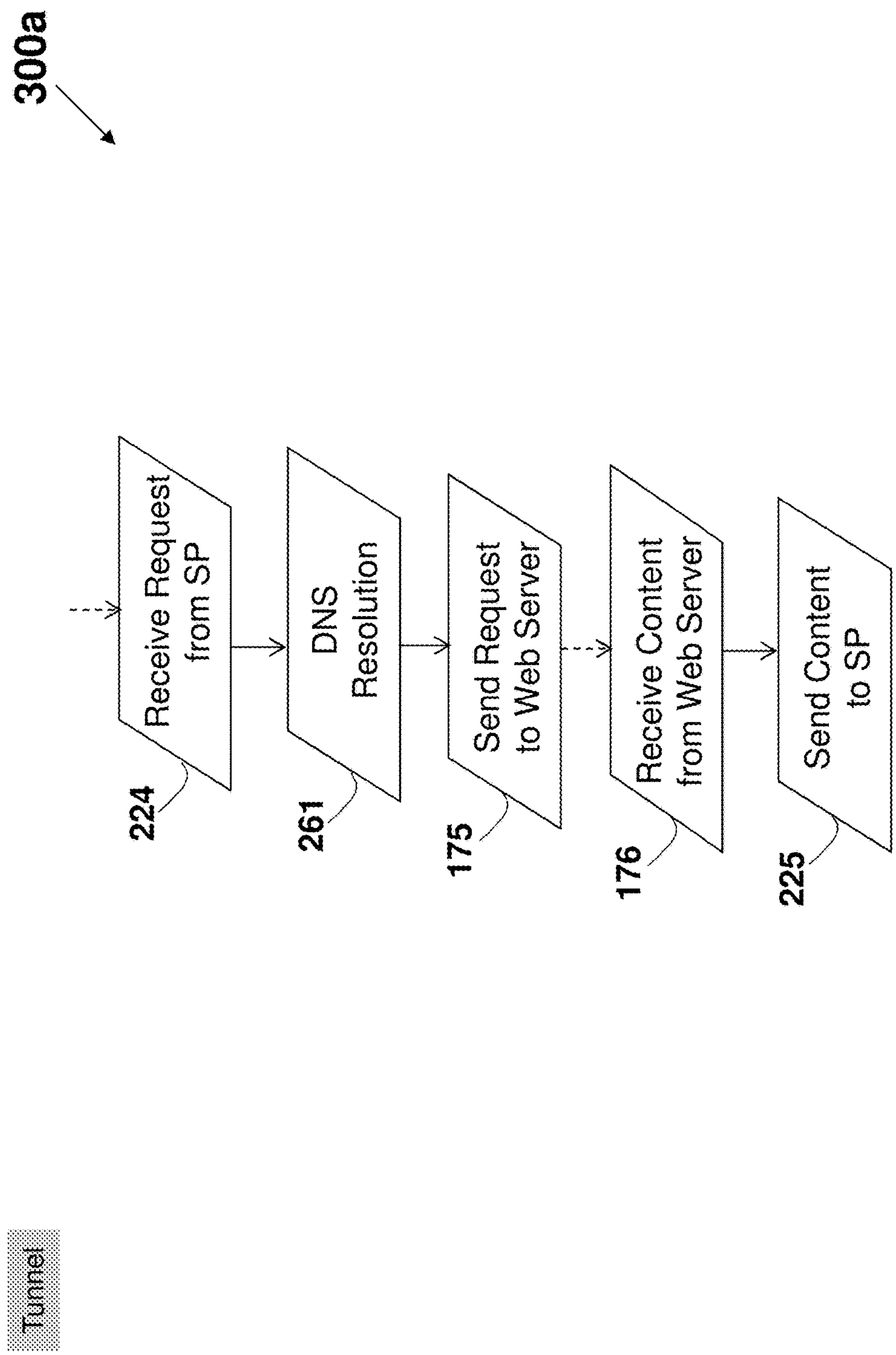

Alternatively or in addition, the DNS resolution may be performed by the selected tunnel device, such as the tunnel device #4 33*d*, as illustrated in a messaging chart 290 shown in FIG. 29. Before requesting the content from the web server 22*b*, the tunnel device #4 33*d* uses a DNS server 251 for a DNS resolution, shown as a message path 252*c*. Then, the request that is sent to the web server 22*b* includes the resolution result. The tunnel device #4 33*d* operation, including a "DNS Resolution" step 261 is described in a flow chart 300 shown in FIG. 30, which is based on the corresponding flow chart 170 shown in FIG. 17. Alternatively or in addition, the tunnel device #4 33*d* operation, including a "DNS Resolution" step 261 may be as described in a flow chart 300*a* shown in FIG. 30*a*, which is based on the corresponding flow chart 220 shown in FIG. 22.

Figure 18:
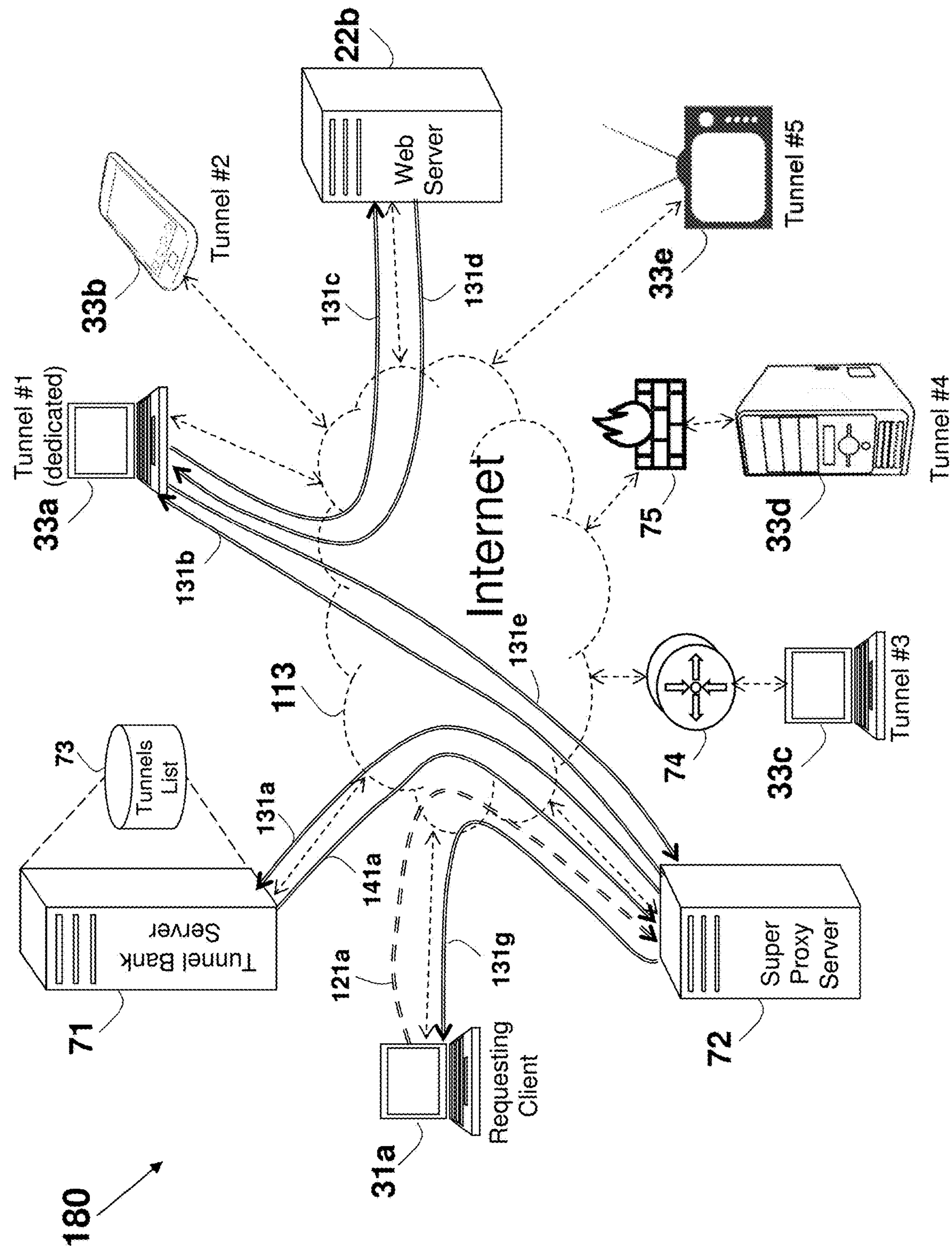
FIGS. 18 and 18*a* depicts schematically messages exchanged over the Internet for fetching content from the web server to the client device via a dedicated tunnel device, the TB server, and the SP server.
Figure 18A:
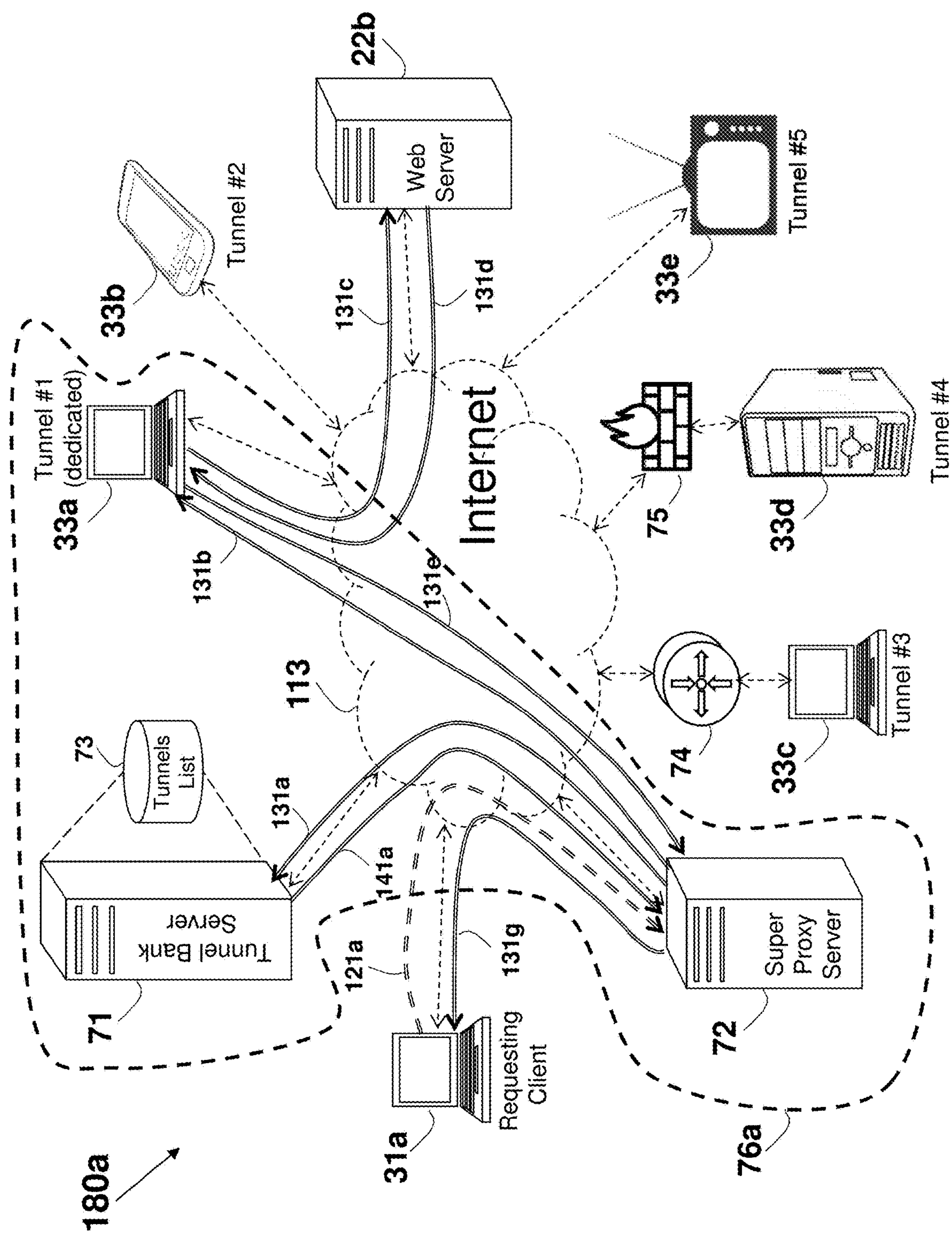

In the example of the messaging chart 180 shown in FIG. 18 above, the tunnel #1 33*a* was described as a dedicated device, which is primarily installed and used to serve as a tunnel device, or as concurrent multiple tunnel devices, each associated with a different IP address. However, one or more of the tunnel devices may be non-dedicated ones, where their primary functionality or use is other than serving as a tunnel device. For example, the device may be intended to be owned, controlled, or used by a human operator, for various functionalities. In one example, the main functionality may be to serve as a smartphone, such as for making telephone call over a cellular network, as exampled in the tunnel #2 33*b*. In such a case, the tunnel functionality is associated with lower priority compared to other tasks or functionalities performed by the device. Furthermore, it is preferred that the tunnel functionality does not affect in any way, the primary functions of the device, and will not interfere or degrade any other task of functionality provided by the device. Preferably, the tunnel related functionality will be operated only when the device is idling, such as not providing any current service or performing any task of interaction with the human user, preferably so the effect of performing any tunnel functionality is hardly or not noticed in any way by the human operator.

As used herein, the term "idle state" is used to refer to a state in which a device and/or one or more resources of the device are not being used to perform operations considered to be of a sufficiently high priority, or device resources are not being used at a level of intensity, that the operations should not be interrupted or competed with by, or such resources should not be diverted to any extent to, one or more relatively lower priority operations. In one example, 'idle state' refers to a state where the human user is not interacting with the device, and hence is not aware of any interfering with any process or task performed. The term "idle condition" is used in connection with some embodiments to refer to a condition that indicates whether and/or an extent to which the device has entered and/or exited such an idle state. Preferably, a tunnel device performs its tunnel related tasks only when in the idle state, so that the human user or operator is not affected by, or aware of, the tunnel related activity.

Figure 31:
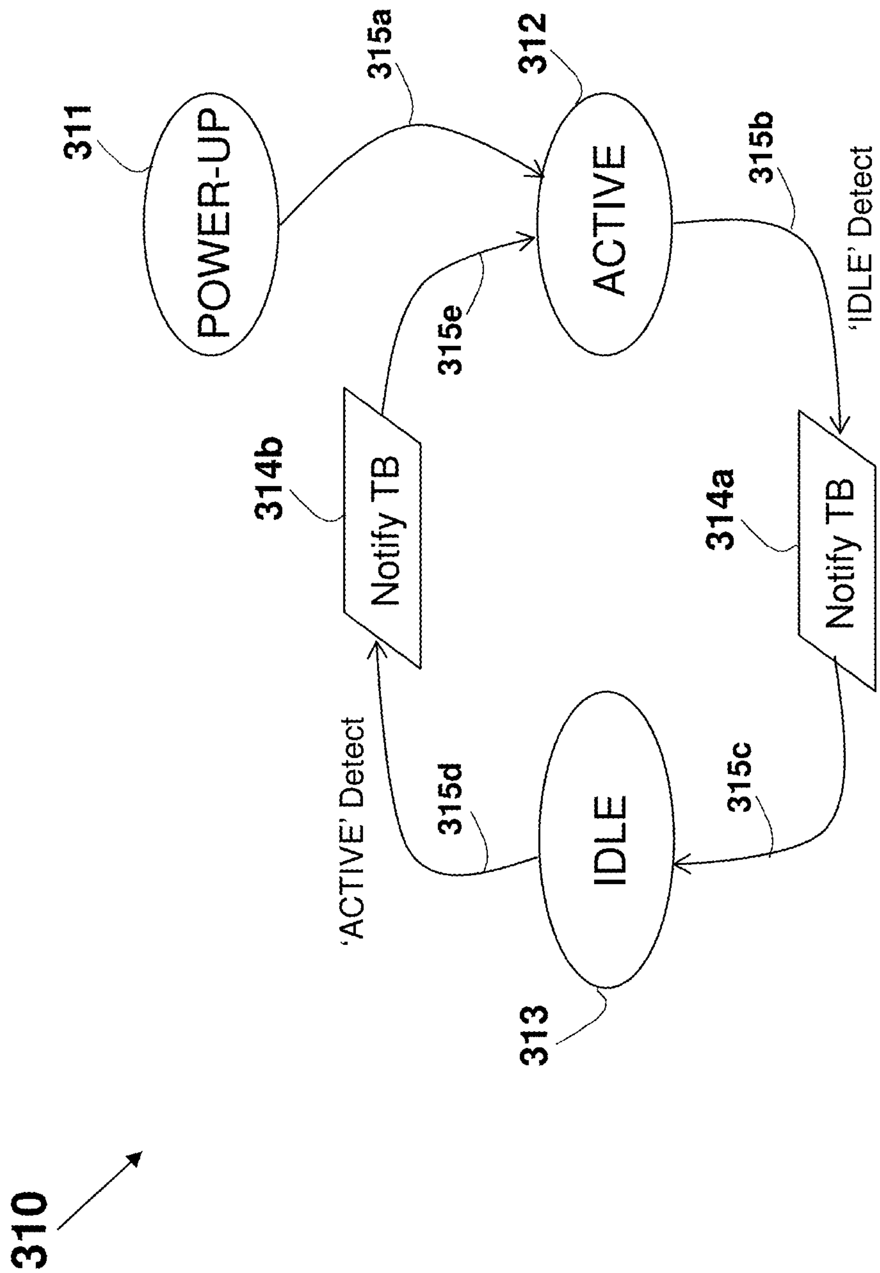
FIG. 31 depicts schematically a state diagram of a tunnel device.

An example of a state diagram 310 of a tunnel device, such as the tunnel #2 33*b*, the tunnel #3 33*c*, the tunnel #4 33*d*, or the tunnel #5 33*e*, is shown in FIG. 31. Upon powering the device, a POWER-UP state 311 is established, during which the computerized system is initialized, such as by booting the operating system and connecting to the Internet. Upon completing the POWER-UP 311 sequence, when normal, operative, runtime environment is attained, and the device may provide its primary functions or functionalities, the device shifts (shown as a line 315*a*) to an 'ACTIVE' state 312, and stays in this state as long as the primarily functions or tasks are used. During the 'ACTIVE' state 312, an idle condition is continuously monitored, and when such idle condition is detected (shown as an 'IDLE' Detect line 315*b*), the device sends a message to the TB server 71 regarding entering an 'IDLE' state 313 in the "Notify TB" step 314*a*, such as by using the established connection 111*d*, which is followed (shown as a line 315*c*) by entering the 'IDLE' state 313. Preferably, the tunnel device is selected by the TB server 71 (as part of the "Select Tunnel" step 146) during the 'IDLE' state 313, allowing for minimum intervention or interfering with the primary tasks and functionalities of the tunnel device.

In one example, the tunnel device connects to the TB server 71 as part of the "Initiate TB Connection" step 171, sends the attribute value as part of the "Send Attribute Value" step 172, and establishes the TCP connection as part of the "Establish Connection" step 173 immediately after completing the POWER-UP state 311, as part of the shift to the ACTIVE state 312 shown as the shift line 315*a*. However, in such a case, the tunnel device may not be selected by the TB server 71 as part of the "Select Tunnel" step 146 as long as the tunnel device has not notified the TB server 71 in the "Notify TB" step 314*a* that is in the IDLE state 313. In such a case, the status of the available tunnel devices is stored in the TB server 71, in a form of table 330 shown in FIG. 33, which is based on the table 100 shown in FIG. 10. An 'IDLE' column 102*i* id added, denoting by 'Y" if the respective tunnel device is in the 'IDLE' state 313, and 'N' if the respective tunnel device is not in the 'IDLE' state 313, such as in the 'ACTIVE' state 312. Upon receiving a message of shifting to IDLE state 313 by the "Notify TB" step 314*a*, the TB server 71 changes the respective value in the IDLE column 102*i* to 'Y'. Preferably, the TB server 71 selects a tunnel that is in the 'IDLE' state 313, as noted by the respective value 'Y' in the IDLE column 102*i*, such as from the tunnel devices associated with the first row 101*a*, the fourth row 101*d*, the fifth row 101*e*, and the seventh row 101*g* in the example of the modified table 330.

During the 'IDLE' state 313, an idle condition is continuously monitored, and when such idle condition is not met (shown as an 'ACTIVE' Detect line 315*d*), the device sends a message to the TB server 71 regarding entering an 'ACTIVE' state 312 in the "Notify TB" step 314*b*, such as by using the established connection 111*d*, which is followed (shown as a line 315*e*) by re-entering the 'ACTIVE' state 312. Upon receiving a message of shifting to ACTIVE state 312 by the "Notify TB" step 314*b*, the TB server 71 changes the respective value in the IDLE column 102*i* to 'N'. Preferably, the TB server 71 does not selects a tunnel that is in the 'IDLE' state 313, as noted by the respective value 'N' in the IDLE column 102*i*, such as from the tunnel devices associated with the second row 101*b*, the third row 101*c*, and the sixth row 101*f* in the example of the modified table 330.

Figure 32:
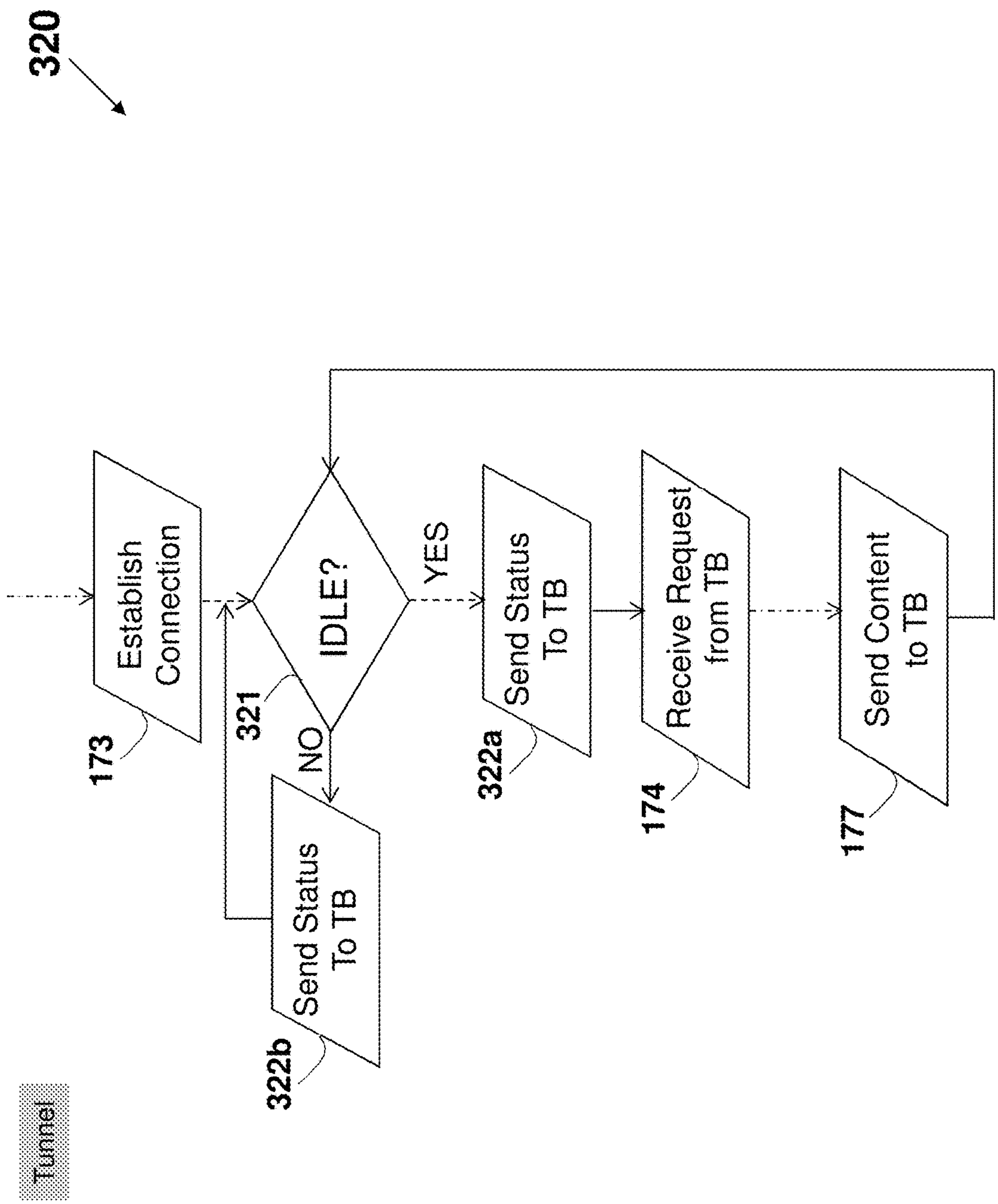
FIGS. 32 and 32*a* illustrate schematically simplified flowcharts relating to a tunnel device associated with an idle state.
Figure 32A:
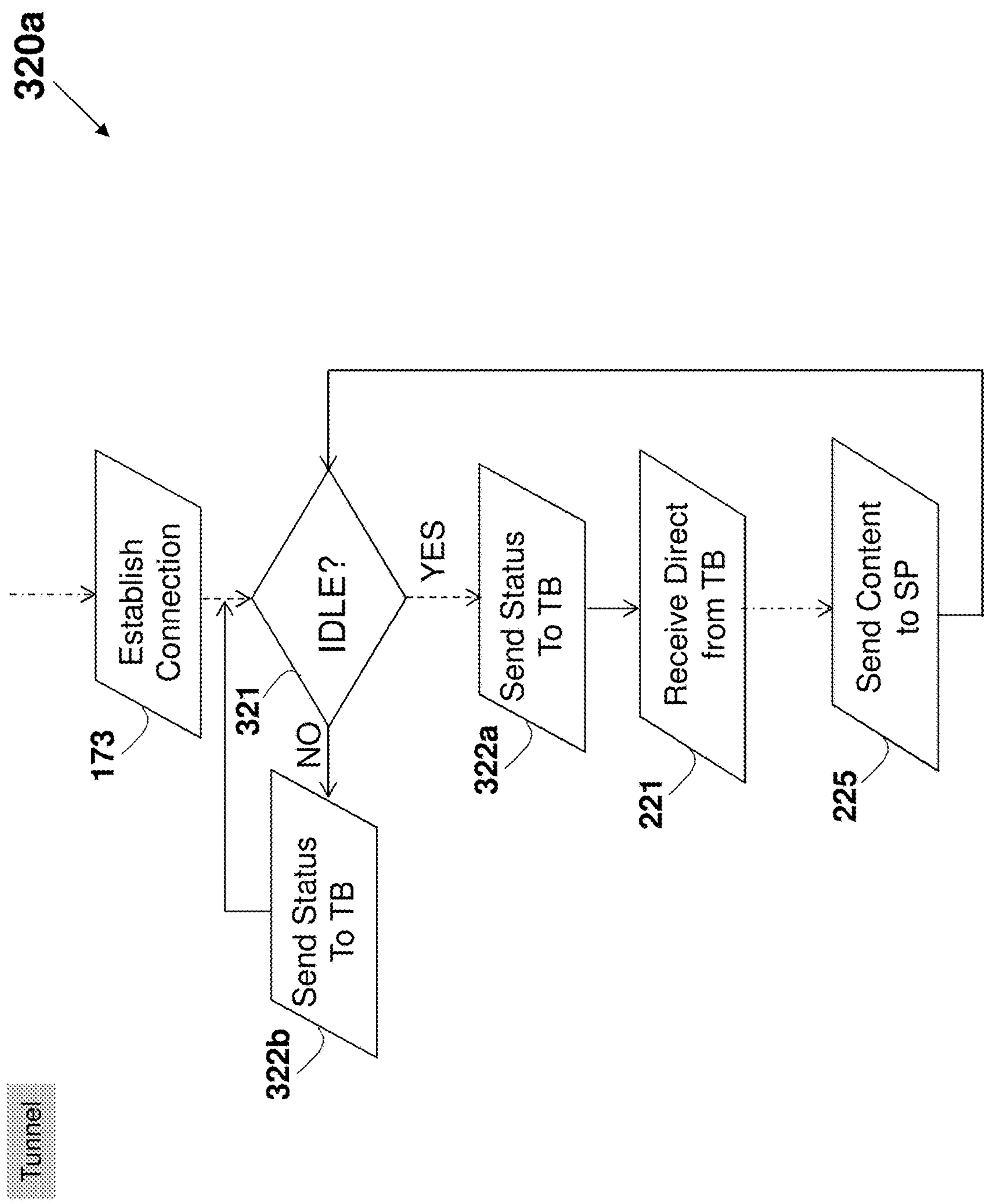

A flow chart 320 of a tunnel device that may be used only when idling is shown in FIG. 32, corresponding to the flow chart 170 shown in FIG. 17. After establishing a connection as part of the "Establish Connection" step 173, the tunnel device checks, as part of the "IDLE?" step 321 if it is in the IDLE state 313. In a case where the tunnel device is not in the IDLE state 313, such as if it is in the ACTIVE state 312, a message notifying the unavailability of the tunnel device to serve as a tunnel is sent to the TB server 71 as part of a "Send Status to TB" step 322*b*, which may corresponds to the "Notify TB" step 314*b*. In a case where the tunnel device is in, or entering, the IDLE state 313, a message notifying the availability of the tunnel device to serve as a tunnel is sent to the TB server 71 as part of a "Send Status to TB" step 322*a*, which may corresponds to the "Notify TB" step 314*a*. Upon receiving such a notification, the TB server 71 may select the tunnel device as part of the "Select Tunnel" step 146, and the selected tunnel is contacted as part of the "Receive Request from TB" step 174. Similarly, a flow chart 320*a* of a tunnel device that may be used only when idling is shown in FIG. 32*a*, corresponding to the flow chart 220 shown in FIG. 22.

Alternatively or in addition, the tunnel device connects to the TB server 71, as part the "Initiate TB Connection" step 171, when entering the IDLE state 313. For example, the "Notify TB" step 314*a* may correspond to the "Initiate TB Connection" step 171, so the TB server 71 may be aware of the tunnel device availability only when such a device is in the IDLE state 313. In such a case, upon the sensing of the 'ACTIVE' detect 315*d*, as part of the "Notify TB" step 314*b*, the established connection 111*d* with the selected tunnel device is disconnected, such as by stopping the TCP keepalive mechanism, so that the TB server 71 is notified that the selected tunnel device is no long available to serve as a tunnel device.

Idle detection techniques are disclosed in U.S. Pat. No. 9,244,682 to Rowles et al. entitled: "Idle detection", which is incorporated in its entirety for all purposes as if fully set forth herein. A set of idle conditions that includes one or more conditions not comprising or triggered by an absence of user input is monitored. The device is determined to be idle based at least in part on results of the monitoring. The device may be determined not to be idle even in the absence of recent user input. Any of the idle detection techniques that are disclosed in the U.S. Pat. No. 9,244,682 to Rowles et al. may equally be used herein. Further, in some embodiments, a user or administrator configurable set of idle detection conditions applicable to the particular device and/or desired by the user or administrator are used.

In one example, the idle condition will be based on, or use, services or tasks provided by the operating system or other software applications that are concurrently executed in the tunnel device with the tunnel related flow chart or functionalities. For example, most operating systems will display an idle task, which is a special task loaded by the OS scheduler only when there is nothing for the computer to do. The idle task can be hard-coded into the scheduler, or it can be implemented as a separate task with the lowest possible priority. An advantage of the latter approach is that programs monitoring the system status can see the idle task along with all other tasks; an example is Windows NT's System Idle Process.

A screensaver (or screen saver) is a computer program that blanks the screen or fills it with moving images or patterns when the computer is not in use, and is typically a computer program that displays aesthetic patterns or images when the computer is not being used, originally intended to prevent screenburn. While the original purpose of screensavers was to prevent phosphor burn-in on CRT and plasma computer monitors (hence the name), though modern monitors are not susceptible to this issue, screensavers are still used for other purposes. Screensavers are often set up to offer a basic layer of security, by requiring a password to re-access the device. Some screensavers use the otherwise unused computer resources to do useful work, such as processing for distributed computing projects. The screensaver typically terminates after receiving a message from the operating system that a key has been pressed or the mouse has been moved. In one example, upon executing an idle process or thread (by the operating system or any other software application), or when a screensaver application is operated, the idle condition is considered to be met, and respectively upon terminating an idle process or the screensaver operation, the idle condition is considered not to be met.

In one example, the idle condition is met when any application other than a screen saver is running in "full screen" mode (e.g., movies or video games often run in this mode), relating to a display which covers the full screen without the operating system's typical window-framing interface, or a window occupying all the available display surface of a screen. Conversely, a screen may not be powered or may be blanked, suggesting that is not visualized by a human user. In one example, upon displaying a full screen by a software application the idle condition is considered not to be met, since it is assumed that the human user is watching that screen. However, upon a blanked display or a closed (such as non-powered) displaying, the idle condition is considered to be met, since it is assumed that the human user is not watching in front of the screen.

An input device, such as the input device 18 as part of the computer system 10 shown in FIG. 1, is a piece of computer hardware equipment used to provide data and control signals to an information processing system such as a computer or information appliance. Such input device may be an integrated or a peripheral input device (e.g., hard/soft keyboard, mouse, resistive or capacitive touch display, etc.). Examples of input devices include keyboards, mouse, scanners, digital cameras and joysticks. Input devices can be categorized based on the modality of input (e.g., mechanical motion, audio, visual, etc.), whether the input is discrete (e.g. pressing of key) or continuous (e.g., a mouse's position, though digitized into a discrete quantity, is fast enough to be considered continuous), the number of degrees of freedom involved (e.g., two-dimensional traditional mice, or three-dimensional navigators designed for CAD applications). Pointing devices (such as 'computer mouse'), which are input devices used to specify a position in space, can further be classified according to whether the input is direct or indirect. With direct input, the input space coincides with the display space, i.e. pointing is done in the space where visual feedback or the pointer appears. Touchscreens and light pens involve direct input. Examples involving indirect input include the mouse and trackball, and whether the positional information is absolute (e.g., on a touch screen) or relative (e.g., with a mouse that can be lifted and repositioned). Direct input is almost necessarily absolute, but indirect input may be either absolute or relative. For example, digitizing graphics tablets that do not have an embedded screen involve indirect input and sense absolute positions and are often run in an absolute input mode, but they may also be set up to simulate a relative input mode like that of a touchpad, where the stylus or puck can be lifted and repositioned.

In one example, the idle detection is based on receiving any input (or change of an input) from an input device. For example, a pre-defined time interval may be used, measured by a dedicated timer or counter or used as a service of the operating system. In case of no input sensed from one or more input devices during the pre-defined time interval, the idle condition is considered to be met. Further, the idle condition is considered not to be met upon receiving any input from one or more of the input devices. Examples include, without limitation, detecting receipt of a user input, e.g., via mouse movement, touch screen interaction, button clicks, or keyboard keystrokes. Such idle-detection methods can detect if a human-interaction device such as a mouse, keyboard, or touch-screen has not been used for a certain amount of time.

When portable or handheld devices are involved, the idle condition may be considered to be met when no motion or acceleration (or a motion or an acceleration below a set threshold) is sensed for a pre-defined time interval, using an accelerometer, a motion sensor, or a GPS. The motion sensor may be based on a piezoelectric accelerometer that utilizes the piezoelectric effect of certain materials to measure dynamic changes in mechanical variables (e.g., acceleration, vibration, and mechanical shock). Piezoelectric accelerometers commonly rely on piezoceramics (e.g., lead zirconate titanate) or single crystals (e.g., quartz, tourmaline). Piezoelectric quartz accelerometer is disclosed in U.S. Pat. No. 7,716,985 to Zhang et al. entitled: "Piezoelectric Quartz Accelerometer", U.S. Pat. No. 5,578,755 to Offenberg entitled: "Accelerometer Sensor of Crystalline Material and Method for Manufacturing the Same" and U.S. Pat. No. 5,962,786 to Le Traon et al. entitled: "Monolithic Accelerometric Transducer", which are all incorporated in their entirety for all purposes as if fully set forth herein. Alternatively or in addition, the motion sensor may be based on the Micro Electro-Mechanical Systems (MEMS, a.k.a. Micro-mechanical Electrical Systems) technology. A MEMS based motion sensor is disclosed in U.S. Pat. No. 7,617,729 to Axelrod et al. entitled: "Accelerometer", U.S. Pat. No. 6,670,212 to McNie et al. entitled: "Micro-Machining" and in U.S. Pat. No. 7,892,876 to Mehregany entitled: "Three-axis Accelerometers and Fabrication Methods", which are all incorporated in their entirety for all purposes as if fully set forth herein. An example of MEMS motion sensor is LIS302DL manufactured by STMicroelectronics NV and described in Data-sheet LIS302DL STMicroelectronics NV, 'MEMS motion sensor 3-axis—±2 g/±8 g smart digital output "piccolo" accelerometer', Rev. 4, October 2008, which is incorporated in its entirety for all purposes as if fully set forth herein.

Alternatively or in addition, the motion sensor may be based on electrical tilt and vibration switch or any other electromechanical switch, such as the sensor described in U.S. Pat. No. 7,326,866 to Whitmore et al. entitled: "Omnidirectional Tilt and vibration sensor", which is incorporated in its entirety for all purposes as if fully set forth herein. An example of an electromechanical switch is SQ-SEN-200 available from SignalQuest, Inc. of Lebanon, NH, USA, described in the data-sheet '*DATASHEET SQ-SEN-200 Omnidirectional Tilt and Vibration Sensor*' Updated 2009 Aug. 3, which is incorporated in its entirety for all purposes as if fully set forth herein. Other types of motion sensors may be equally used, such as devices based on piezoelectric, piezoresistive and capacitive components to convert the mechanical motion into an electrical signal. Using an accelerometer to control is disclosed in U.S. Pat. No. 7,774,155 to Sato et al. entitled: "Accelerometer-Based Controller", which is incorporated in its entirety for all purposes as if fully set forth herein.

The Global Positioning System (GPS) is a space-based radio navigation system owned by the United States government and operated by the United States Air Force. It is a global navigation satellite system that provides geolocation and time information to a GPS receiver anywhere on or near the Earth where there is an unobstructed line of sight to four or more GPS satellites. The GPS system does not require the user to transmit any data, and it operates independently of any telephonic or Internet reception, though these technologies can enhance the usefulness of the GPS positioning information. The GPS system provides critical positioning capabilities to military, civil, and commercial users around the world. The United States government created the system, maintains it, and makes it freely accessible to anyone with a GPS receiver. In addition to GPS, other systems are in use or under development, mainly because of a potential denial of access by the US government. The Russian Global Navigation Satellite System (GLONASS) was developed contemporaneously with GPS, but suffered from incomplete coverage of the globe until the mid-2000s. GLONASS can be added to GPS devices, making more satellites available and enabling positions to be fixed more quickly and accurately, to within two meters. There are also the European Union Galileo positioning system, China's BeiDou Navigation Satellite System and India's NAVIC.

The GPS concept is based on time and the known position of specialized satellites, which carry very stable atomic clocks that are synchronized with one another and to ground clocks, and any drift from true time maintained on the ground is corrected daily. The satellite locations are known with great precision. GPS receivers have clocks as well; however, they are usually not synchronized with true time, and are less stable. GPS satellites continuously transmit their current time and position, and a GPS receiver monitors multiple satellites and solves equations to determine the precise position of the receiver and its deviation from true time. At a minimum, four satellites must be in view of the receiver for it to compute four unknown quantities (three position coordinates and clock deviation from satellite time).

Each GPS satellite continually broadcasts a signal (carrier wave with modulation) that includes: (a) A pseudorandom code (sequence of ones and zeros) that is known to the receiver. By time-aligning a receiver-generated version and the receiver-measured version of the code, the Time-of-Arrival (TOA) of a defined point in the code sequence, called an epoch, can be found in the receiver clock time scale. (b) A message that includes the Time-of-Transmission (TOT) of the code epoch (in GPS system time scale) and the satellite position at that time. Conceptually, the receiver measures the TOAs (according to its own clock) of four satellite signals. From the TOAs and the TOTs, the receiver forms four Time-Of-Flight (TOF) values, which are (given the speed of light) approximately equivalent to receiver-satellite range differences. The receiver then computes its three-dimensional position and clock deviation from the four TOFs. In practice, the receiver position (in three dimensional Cartesian coordinates with origin at the Earth's center) and the offset of the receiver clock relative to the GPS time are computed simultaneously, using the navigation equations to process the TOFs. The receiver's Earth-centered solution location is usually converted to latitude, longitude and height relative to an ellipsoidal Earth model. The height may then be further converted to height relative to the geoid (e.g., EGM96) (essentially, mean sea level). These coordinates may be displayed, e.g., on a moving map display, and/or recorded and/or used by some other system (e.g., a vehicle guidance system).

In one example, the idle condition may be considered to be met when the communication traffic through a network interface, such as over a PAN, LAN, WLAN, WAN or WWAN, is below a threshold.

Portable or handheld devices, such as tablets, laptops, and smartphones, typically use a rechargeable smart battery. A smart battery or a smart battery pack is a rechargeable battery pack with a built-in Battery Management System (BMS), usually designed for use in a portable computer such as a laptop. Besides the usual plus and minus terminals, it also has two or more terminals to connect to the BMS; typically minus is also used as BMS "ground". BMS interface examples are SMBus, PMBus, EIA-232, EIA-485, MIN BM and Local Interconnect Network. The smarter battery can internally measure voltage and current, and deduce charge level and SoH (State of Health) parameters, indicating the state of the cells. Externally the smart battery can communicate with a smart battery charger and a "smart energy user" via the bus interface. The smart battery can demand that the charging stops, ask for charging, or demand that the smart energy user stop using power from this battery. There are standard specifications for smart batteries: Smart Battery System and many ad-hoc specifications.

A Battery Management System (BMS) is any electronic system that manages a rechargeable battery (cell or battery pack), such as by protecting the battery from operating outside its Safe Operating Area, monitoring its state, calculating secondary data, reporting that data, controlling its environment, authenticating it and/or balancing it. A battery pack built together with a battery management system with an external communication data bus is a smart battery pack. A smart battery pack must be charged by a smart battery charger. A BMS may monitor the state of the battery as represented by various items, such as: Voltage: total voltage, voltages of individual cells, minimum and maximum cell voltage or voltage of periodic taps; Temperature: average temperature, coolant intake temperature, coolant output temperature, or temperatures of individual cells; State of Charge (SOC) or Depth of Discharge (DOD), to indicate the charge level of the battery; State of Health (SOH), a variously-defined measurement of the overall condition of the battery;

Coolant flow: for air or fluid cooled batteries; and Current: current in or out of the battery.

In one example, the idle condition may be considered to be met when, based on the BMS output, the battery capacity is above a minimum threshold. For example, the idle condition may be considered to be met when the current capacity of the battery is above 40%, 50%, 60%, 70%, 80%, or 90%. In the case where the capacity is estimated or measured to be below the set threshold, the idle condition may be considered not to be met. Such threshold provides for not draining the battery by using the tunnel functionalities, rendering the device useless or powerless when the human user may want to use it after being used for tunneling.

The methods described herein may provide anonymity, in particular IP anonymization when fetching resources (such as web pages) from a web server. Such anonymization may be used for anonymous tracking of an activity of competitors for obtaining competitive intelligence, for obtaining pricing intelligence by tracking competitor prices, for collecting data needed to make a calculated investment decisions, for identifying key changes in businesses and markets for risk management, for preventing fraud by analyzing suspicious activities, or for web-site scrapping.

As described herein, a web browser executed in a client device, such as in the client device #1 31*a*, may initiate a request for a content (such as a web page identified by a URL) that is stored in a web server, such as the data server #1 22*a*. The request may be received, intercepted, or identified, and direct or non-direct fetching schemes may be used. As used herein, the term 'direct fetching' refers to any fetching of the requested content, where the web server is aware of the identity (such as the IP address), of the requesting client device. Typically in such an arrangement, such as exampled in the arrangement 50*a* shown in FIG. 5*a*, the request message sent by the client device (such as HTTP request) reaches the web server unchanged, so that the web server can identify the IP address of the client device in the 'Source IP Address' field 16*d* of the packets that form the request message. Typically, other than the routers and gateways that form the Internet 113, no intermediate devices, such as another server or another client device, are used for, or are aware of, the content fetching process.

Figure 5:
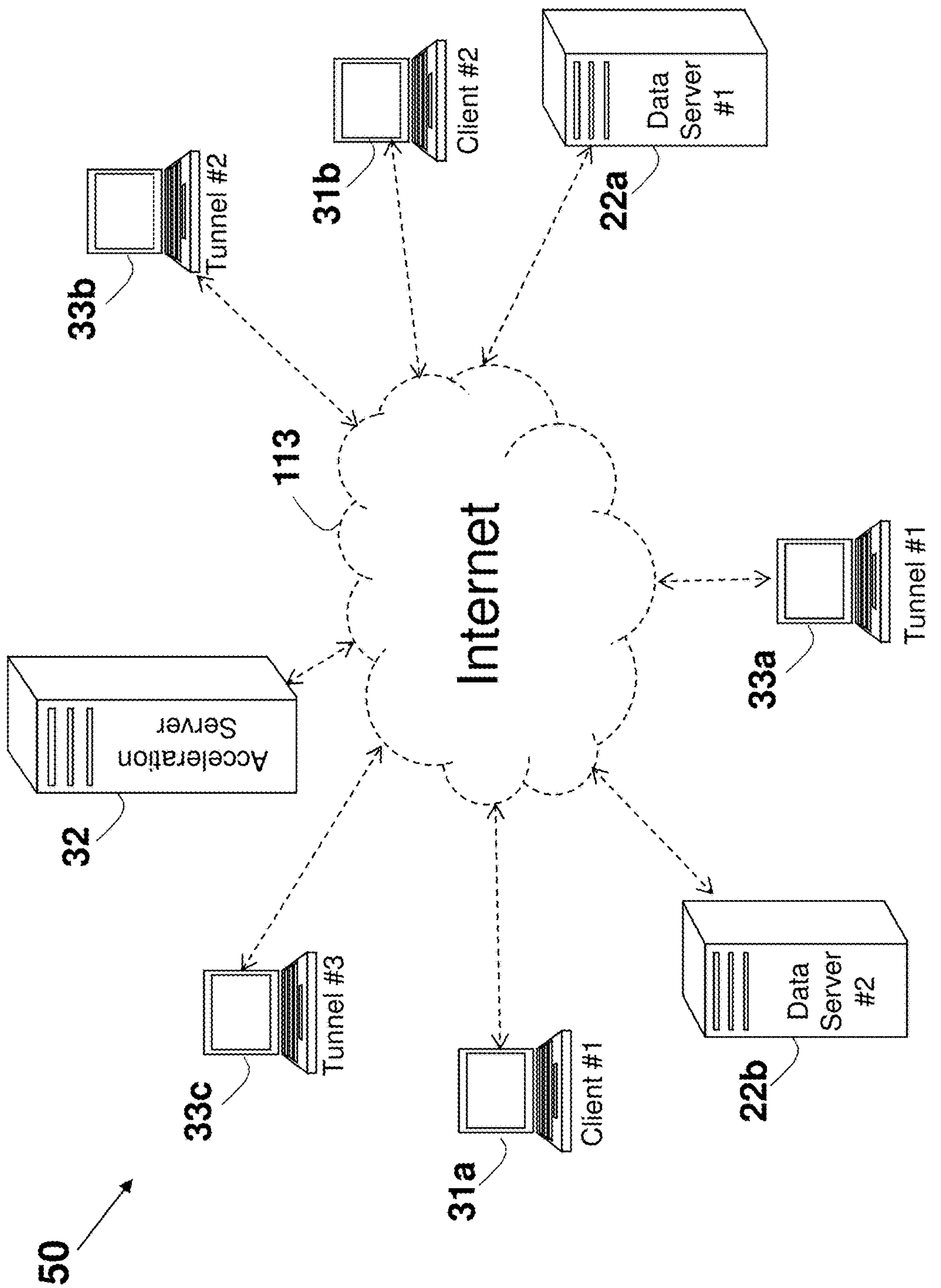
FIG. 5 depicts schematically client devices, tunnel devices, and servers connected to the Internet.
Figure 5A:
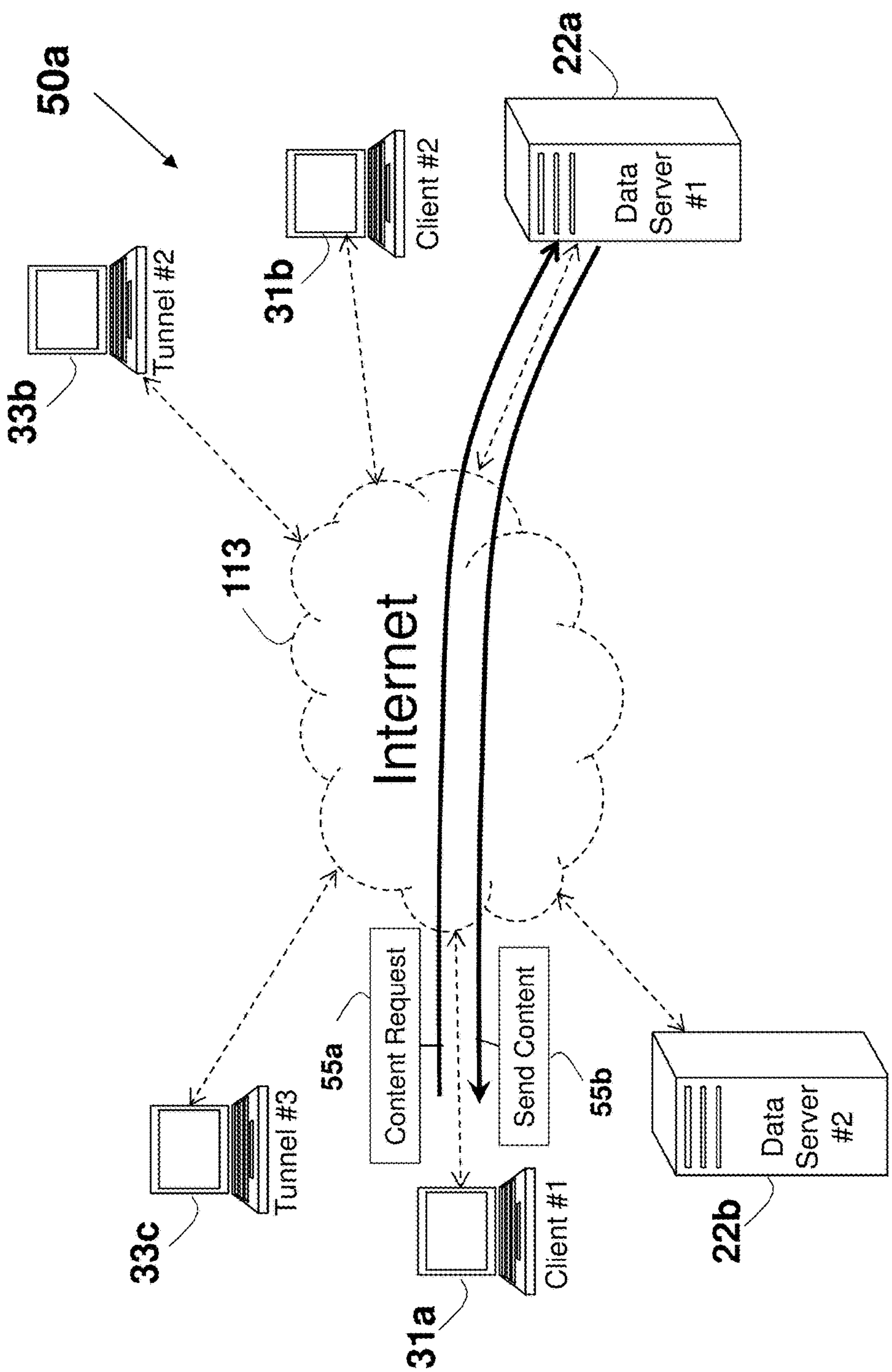
FIG. 5*a* depicts schematically a direct fetching scheme over the Internet.

As used herein, the term 'non-direct fetching' refers to any fetching of the requested content, where the web server is not aware of the identity (such as the IP address), of the requesting client device. Typically in such an arrangement, the request message sent by the client device (such as HTTP request) reaches one or more intermediate devices, that sends the request to the web server using IP address other than those of the requesting client device, so that the web server cannot identify the IP address of the client device. The intermediate device may be a server, such as the proxy server 53 shown as part of the arrangement 50*b* shown in FIG. 5*a*, the DC proxy server 56 shown as part of the arrangement 50*c* shown in FIG. 5*c*, or the tunnel #4 33*d* shown as part of the arrangement 130 shown in FIG. 13. Alternatively or in addition, the intermediate device may be another client device, such as the tunnel #1 33*a* shown a part of the arrangement 60 in FIG. 6, or the tunnel #2 33*b* shown a part of the arrangement 60*a* in FIG. 6*a*.

Figure 5B:
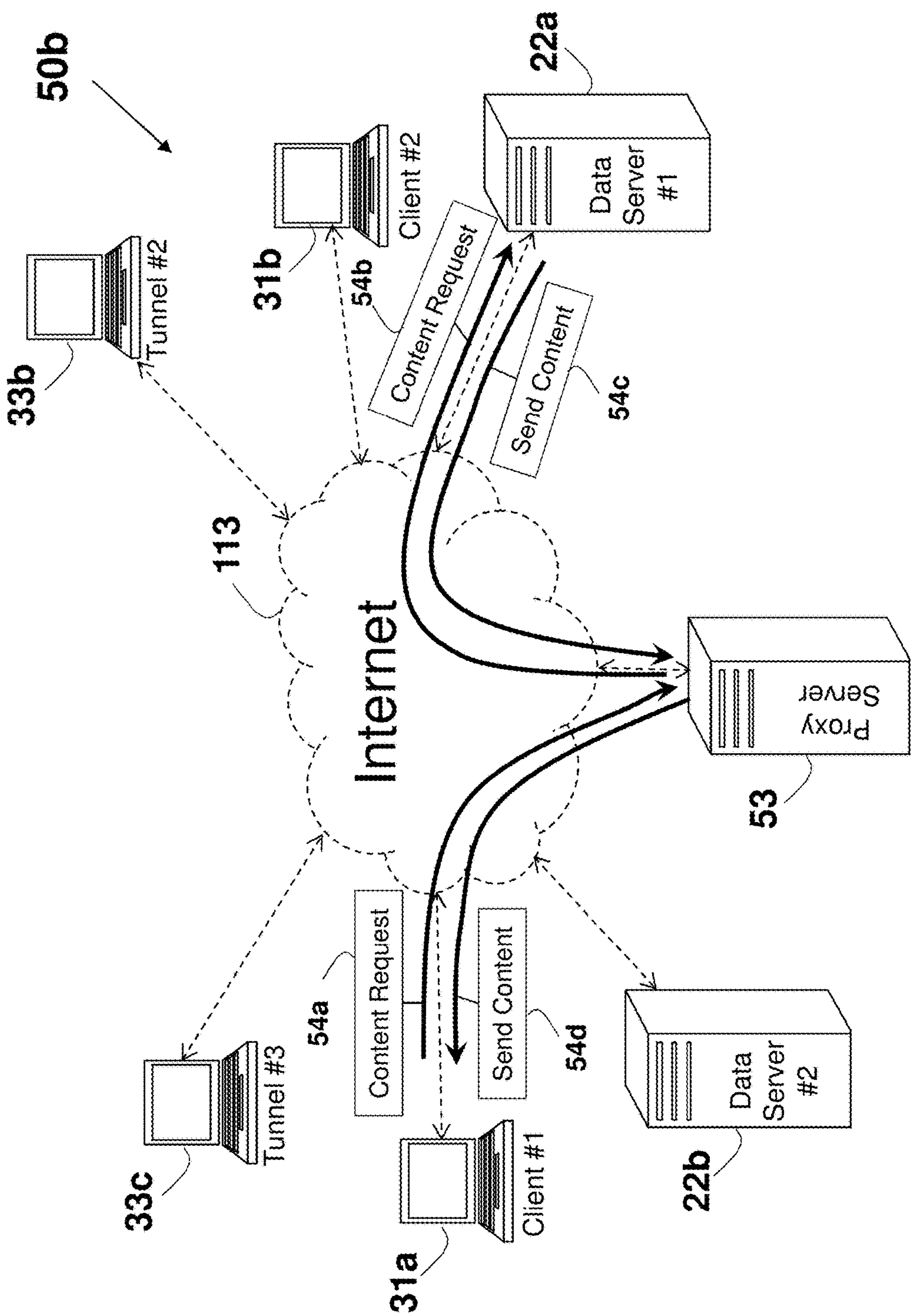
FIG. 5*b* depicts schematically a non-direct fetching scheme over the Internet using a proxy server.
Figure 5C:
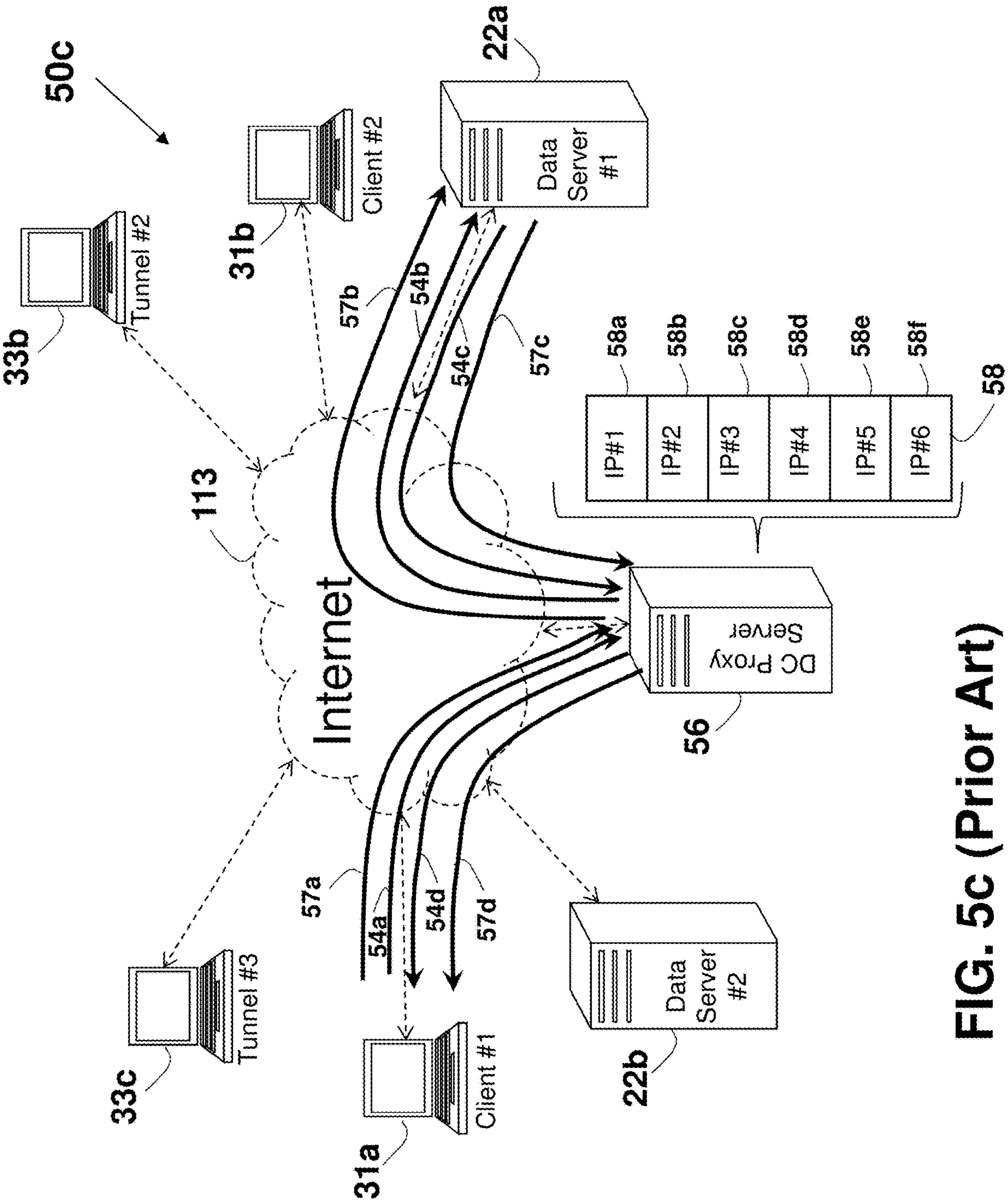
FIG. 5*c* depicts schematically a non-direct fetching scheme over the Internet using a Data Center (DC) proxy server.
Figure 6:
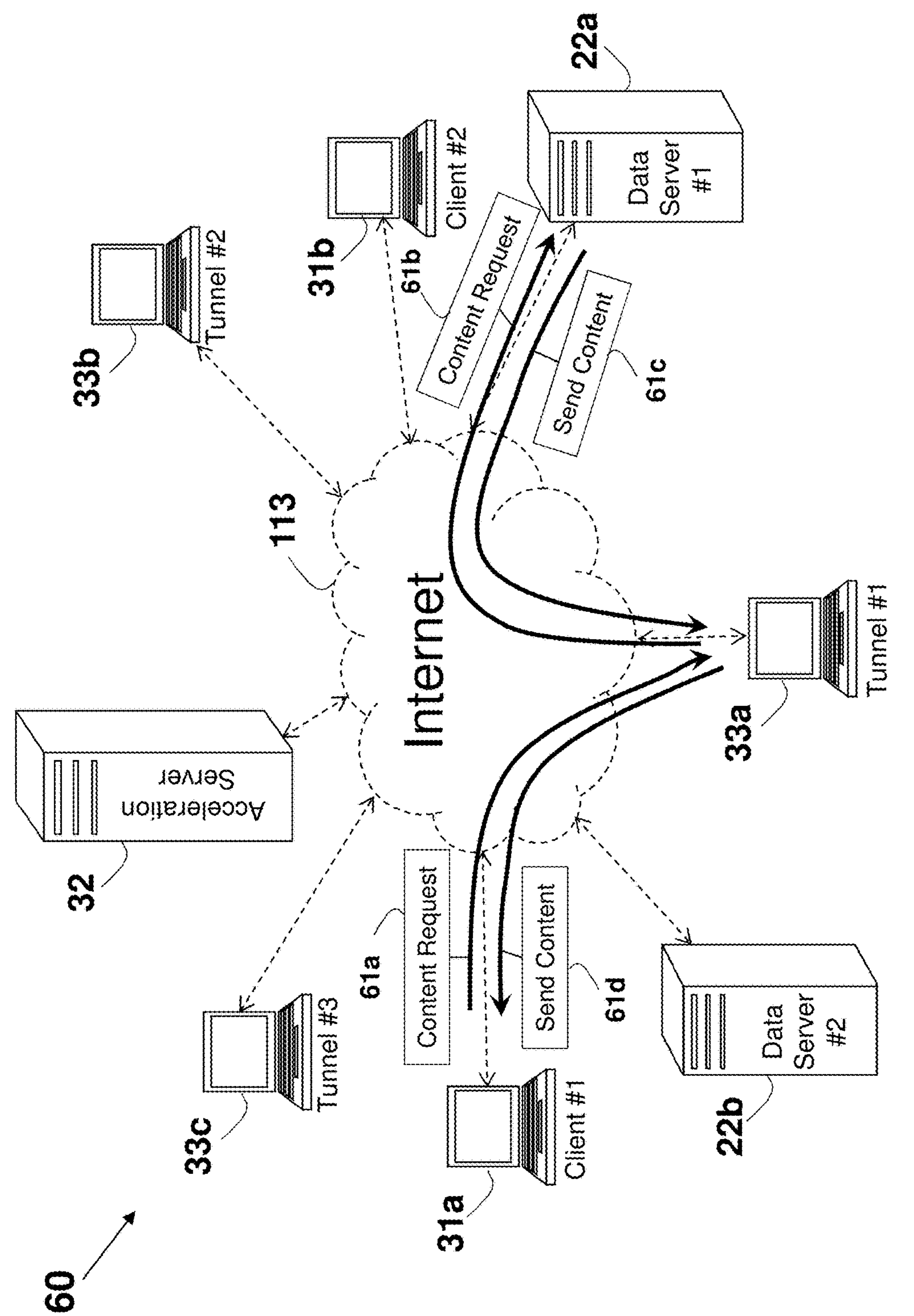
FIGS. 6, 6*a*, and 6*b* depict schematically messages exchanged over the Internet between a client device and a data server, using different tunnel devices, according to '044 patent.
Figure 6A:
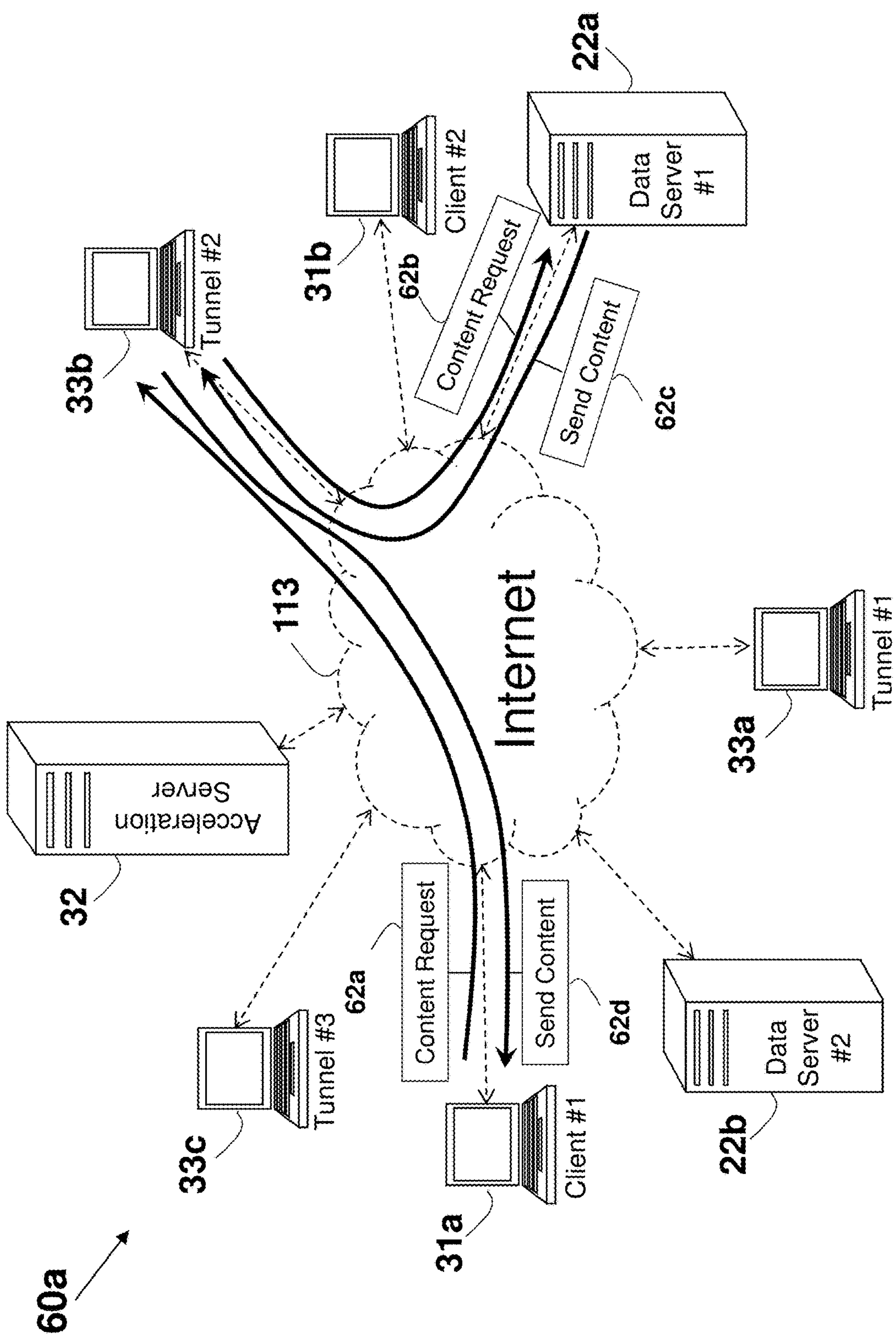
Figure 6B:
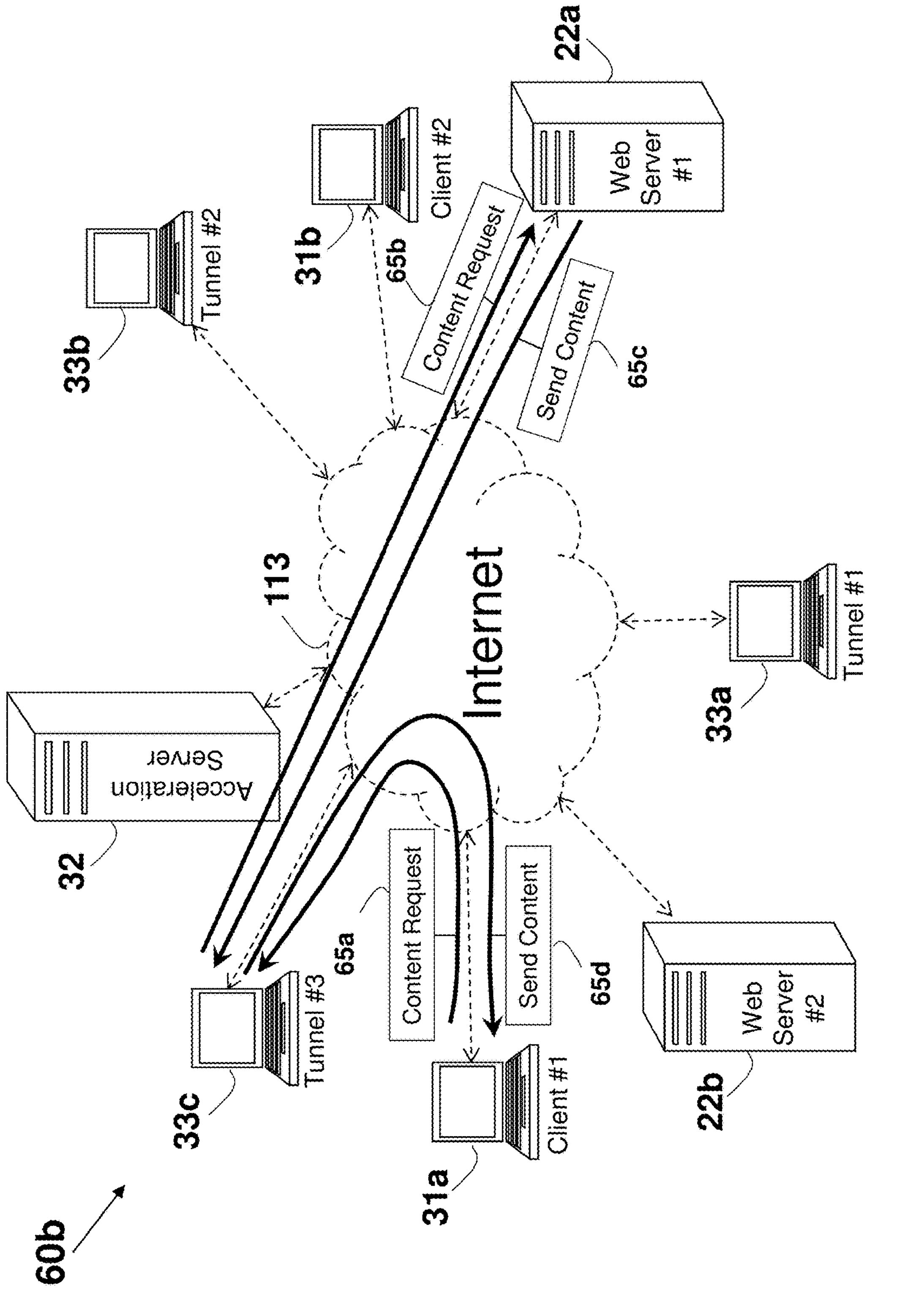

Any non-direct fetching scheme herein may comprise, may be based on, or may be according to, the example of using a proxy server as shown in the arrangement 50*b* shown in FIG. 5*b*, the example of using a DC proxy server as shown in the arrangement 50*c* shown in FIG. 5*c*, the example of using a tunnel as shown in the arrangement 60 shown in FIG. 6, the examples shown in the '604 patent', the examples shown in Patent Cooperation Treaty (PCT) Publication WO 2019/043687, the examples shown in U.S. Pat. No. 9,241,044, or any combination thereof. Any proxy server herein, such as the proxy server 53 or the proxy server 56, may consist of, may include, may be part of, or may be integrated with, any other server described herein.

In one example, multiple proxy servers, such as the proxy server 53 shown in FIG. 5*b*, may be available for a specific non-direct fetching scheme. Similarly, multiple DC proxy servers, such as the DC proxy server 56 shown in FIG. 5*c*, may be available for a specific non-direct fetching scheme. In such a case, the non-direct fetching scheme is preceded by the selecting a single server that is used for the fetching. Such server selection may be based on, or may use, random, quazi-random, or deterministic selection. Using random selection allows for load balancing, preferably by equally distributing the workload across the elements, which may optimize resource use, maximize throughput, minimize response time, and avoid overload of any single resource. The randomness may be based on using a random signal generator. The random signal generator may be based on a digital random signal generator having a digital output. Alternatively, the random signal generator may be based on analog random signal generator having an analog output. Analog random signal generator may use a digital random signal generator whose output is converted to analog using analog to digital converter, or can use a repetitive analog signal generator (substantially not synchronized to any other timing in the system) whose output is randomly time sampled by a sample and hold. A random signal generator (having either analog or digital output) can be hardware based, using a physical process such as thermal noise, shot noise, nuclear decaying radiation, photoelectric effect or other quantum phenomena, or can be software based, using a processor executing an algorithm for generating pseudo-random numbers which approximates the properties of random numbers.

Alternatively or in addition, the selection of a server may be deterministic based. In one example, the elements to select from are listed in an orderly fashion, such as according to a feature, attribute, or a characteristic, using their associated numerical value (e.g., IP address value), according to their alphanumeric identifier (e.g., host name or location name in ASCII value), according to the order that joined the collection or group, or according to the order they were formerly selected from the group or collection. In such a case, the servers are sequentially selected according to the list order. In one example, a LIFO (last in first out) like scheme may be used, where the lastly selected server is re-selected, and upon its unavailability, the one server that was selected before the last is selected. Alternatively or in addition, a FIFO (first in first out) like scheme is used, where the oldest formerly selected server selected.

In one example, the selection of an IP address from the list 58 to be used by the DC Proxy Server 56 as shown in FIG. 5*c*, for use in a specific non-direct fetching scheme may be based on, or may use, random, quazi-random, or deterministic selection. Using random selection allows for load balancing, preferably by equally distributing the workload across the elements, which may optimize resource use, maximize throughput, minimize response time, and avoid overload of any single resource. The randomness may be based on using a random signal generator. The random signal generator may be based on a digital random signal generator having a digital output. Alternatively, the random signal generator may be based on analog random signal generator having an analog output. Analog random signal generator may use a digital random signal generator whose output is converted to analog using analog to digital converter, or can use a repetitive analog signal generator (substantially not synchronized to any other timing in the system) whose output is randomly time sampled by a sample and hold. A random signal generator (having either analog or digital output) can be hardware based, using a physical process such as thermal noise, shot noise, nuclear decaying radiation, photoelectric effect or other quantum phenomena, or can be software based, using a processor executing an algorithm for generating pseudo-random numbers which approximates the properties of random numbers.

Any randomness used typically further provides anonymity and untraceability, as well as load-balancing. Randomness is commonly implemented by using random numbers, defined as a sequence of numbers or symbols that lack any pattern and thus appear random, are often generated by a random number generator. Randomness is described, for example, in IETF RFC 1750 *"Randomness Recommendations for Security"* (December 1994), which is incorporated in its entirety for all purposes as if fully set forth herein. A random number generator (having either analog or digital output) can be hardware based, using a physical process such as thermal noise, shot noise, nuclear decaying radiation, photoelectric effect or other quantum phenomena. Alternatively, or in addition, the generation of the random numbers can be software based, using a processor executing an algorithm for generating pseudo-random numbers which approximates the properties of random numbers.

Alternatively or in addition to using randomness, the selection of a server, such as the selection of the proxy server 53 shown in FIG. 5*b*, or the DC proxy server 56 shown in FIG. 5*c*, may be based on geographical location. Such geographical location may be determined by using geolocation. For example, an element, such as a proxy server or a DC proxy server, or an IP address from any IP addresses list, may be selected based on the location of the requesting client, such as the client device #1 31*a*, the web server, such as the data server #1 22*a*, or any other device. For example, an element may be selected as being in the area as the requesting client device, or as the web server, such as being in the same continent, country, state, region, city, postal/zip code, latitude, longitude, or Timezone. Similarly, an element may be selected as estimated to being the geographically closest to the requesting client device or to the web server.

Alternatively or in addition, an element may be manually selected by a user. For example, a list of the available alternatives may be displayed to the user, such as the user of the client device #1 31*a*, and the user selects the elements from the list of the available alternatives. Further, an element may be selected based on former performance relating to former non-direct fetching actions.

Figure 34:
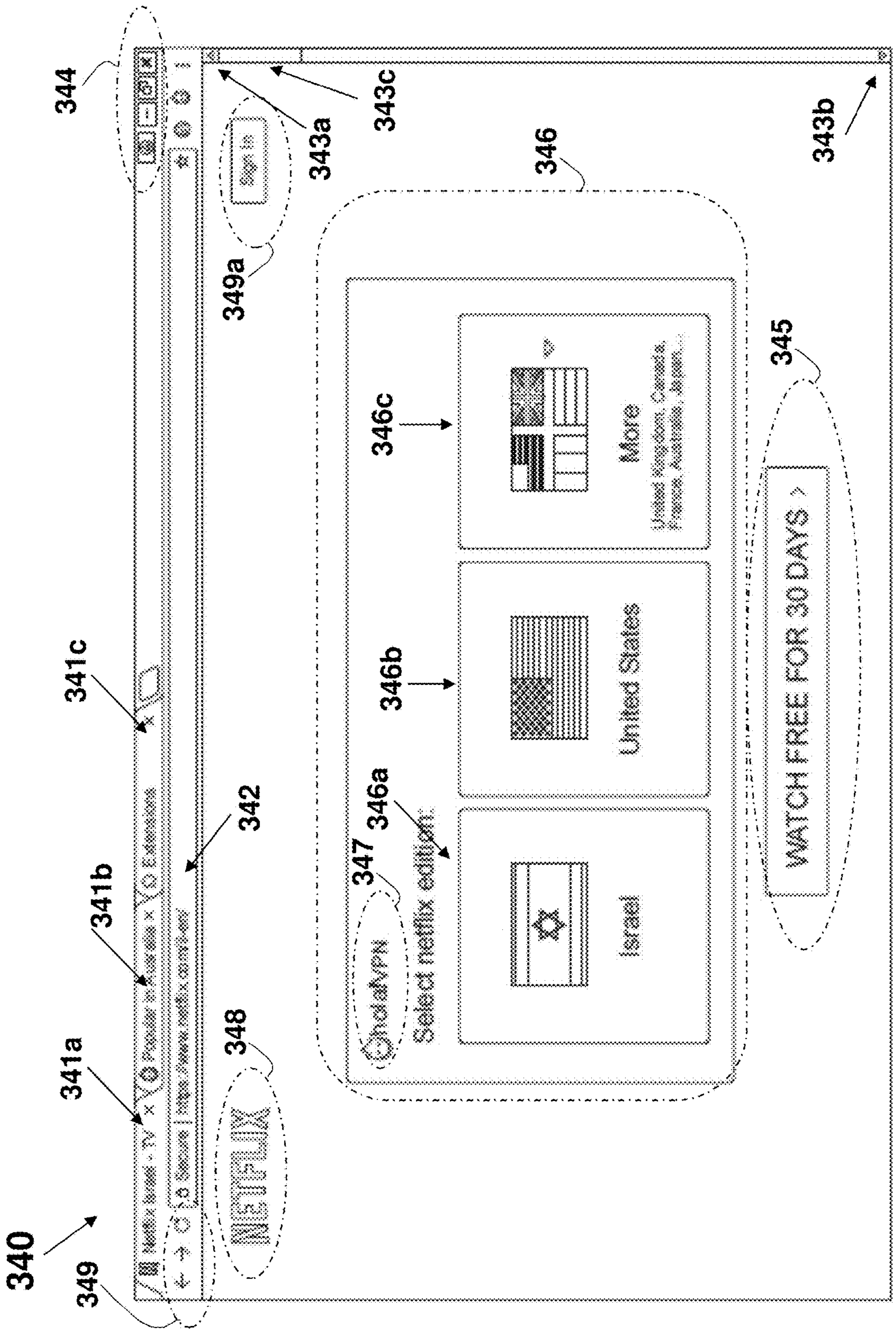
FIGS. 34-38 depicts schematically various screens for offering, using, and managing, a non-direct fetching service.

An example of a screen 340 by a non-direct fetching scheme service provider in a Google Chrome web browser is shown in FIG. 34. A Tabbed Document Interface (TDI) or Tab is a graphical control element that allows multiple documents or panels to be contained within a single window, using tabs as a navigational widget for switching between sets of documents. A web page corresponding to a tab 341*a* is shown, while two other tabs 341*b* and 341*c* are hidden. The URL of the shown tab 341*a* is detailed in the Omnibox URL box 342 that combines the functions of both the address bar and search box. A navigation in the shown web page may use a scroll bar 343*c* that is shown at the right end of the screen, accompanied with an up arrow 343*a* and a down arrow 343*b*. A set of rectangle or square buttons 344 allows a user to close the window, to reduce the screen size, or to minimize the shown web-page screen, by mouse clicking on the respective button. A set of buttons 349 allows for former screen, next screen, or refresh.

In a case where the user is already registered to the service, a button named "Sign In" 349*a* may be clicked by a user for activating the service. Alternatively, a button 345 titled "WATCH FREE FOR 30 DAYS>" allows the user, by clicking on it, to register for a free trial period for experimenting the service. The service is offered by a service provider identified as "hola!VPN" in area 347, and may be used a non-direct fetching scheme to fetch content from a specific content vendor, exampled as an "NETFLIX" area 348. The location, such as the country, of an intermediate device to be used as part of the non-direct fetching scheme service, such as proxy server actual location, a tunnel device actual location, or an IP address associated geolocation, may be chosen by the user, by clicking a specific country symbol in an area of suggested countries 346, such as Israel 346*a* (identified by text and flag), United-States 346*b*, or other countries as shown in area 346*c*.

Figure 35:
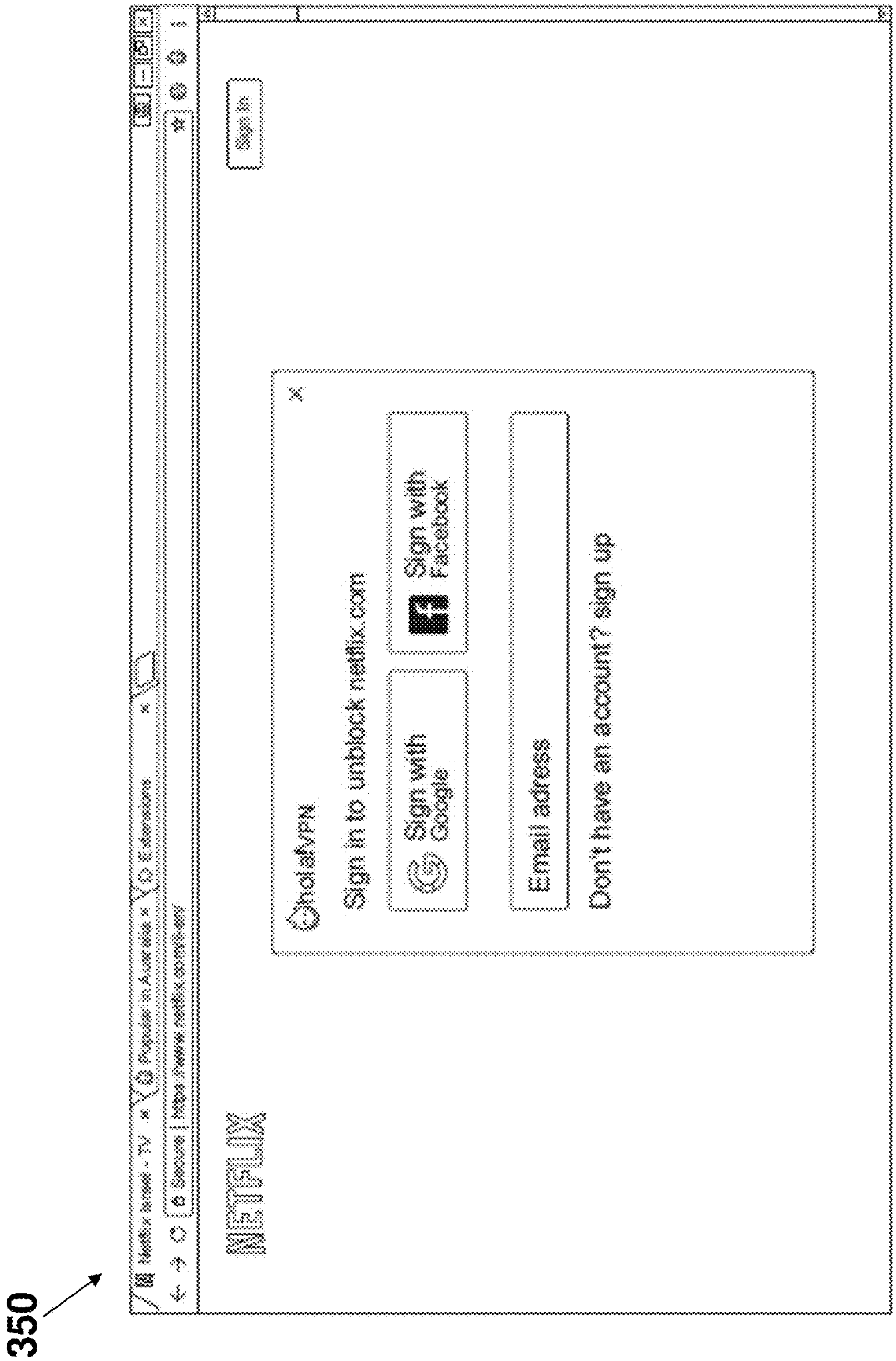
Figure 36:
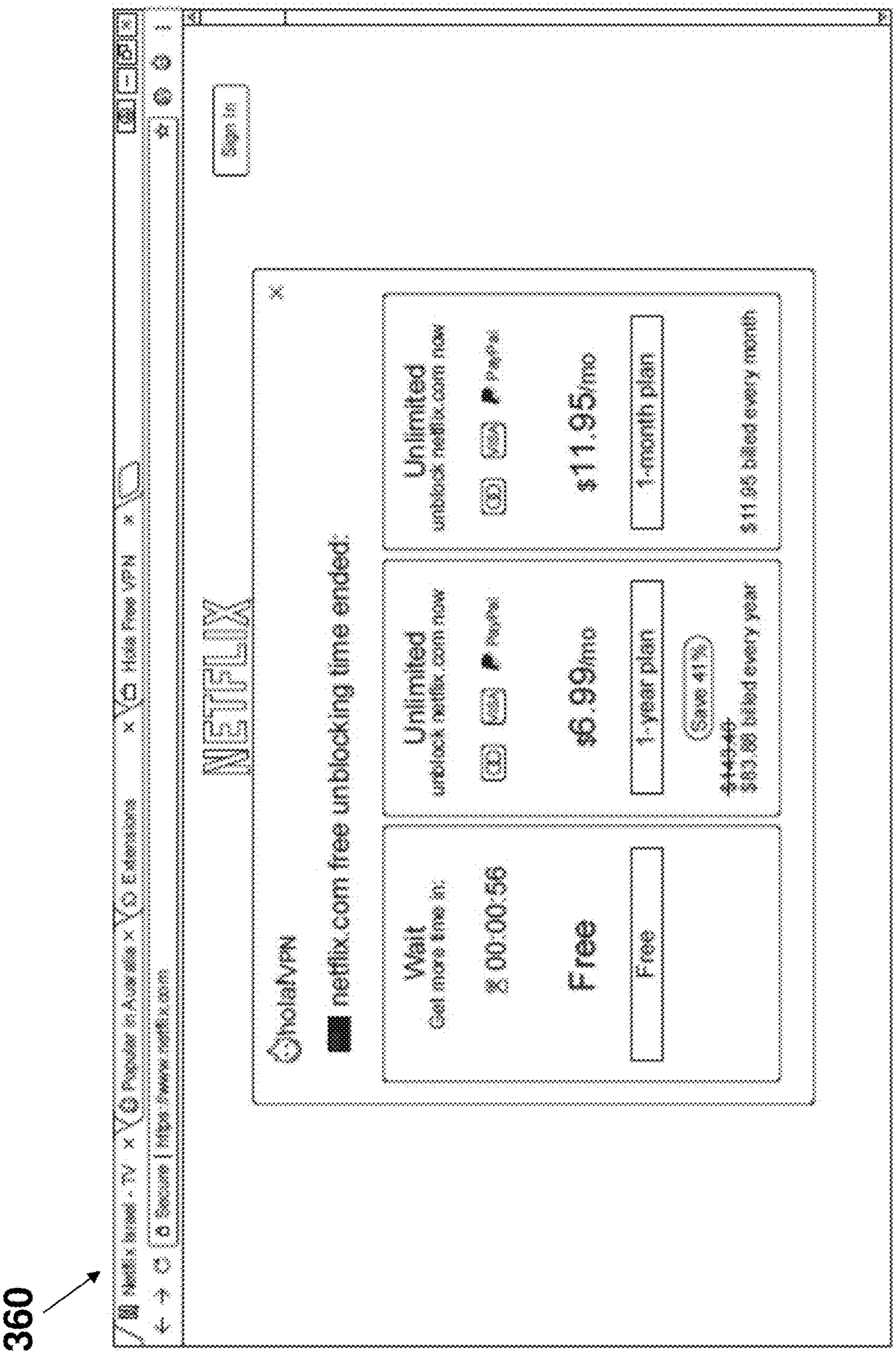
Figure 37:
Figure 38:
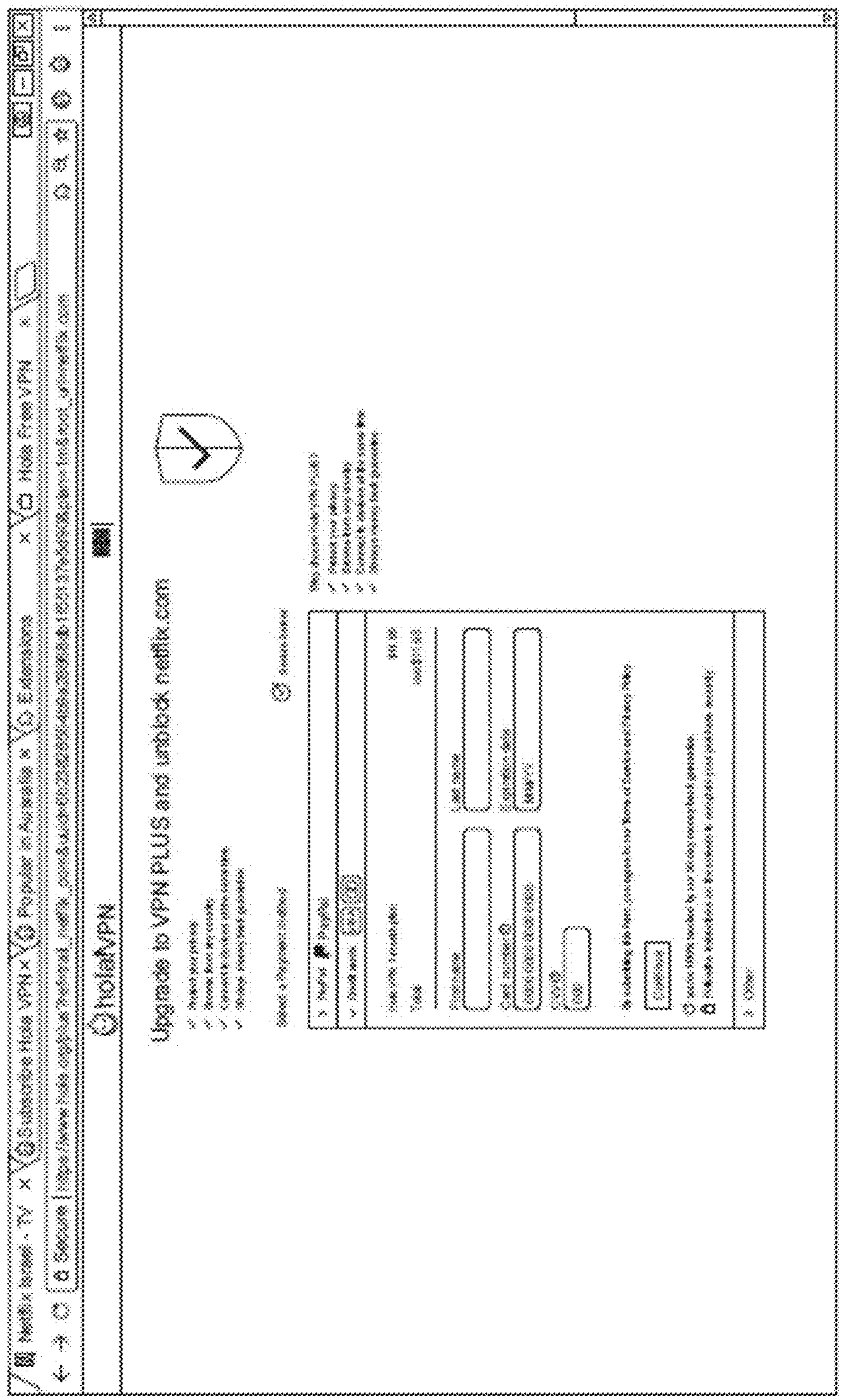

A screen 350 shown in FIG. 35 depicts an action of signing in to an existing account or permission to use the service, such as after clicking the "Sign In" button 349*a*, and offers to the user various signing-in mechanisms and options. A screen 360 shown in FIG. 36 depicts various options for registering to the service, such as a free trial, a yearly payment plan, or a monthly payment plan. A screen 370 shown in FIG. 37 depicts an advertisement, which may use a pop-up mechanism, offering the non-direct fetching scheme service. Similarly, a screen 380 shown in FIG. 38 depicts an advertisement for upgrading the offered service.

A schematic example of a table 510 that represents a PAC file structure is shown in FIG. 39. A first row 511 defines a first column URL 512*a*, and for each web-page identified by a respective URL, a Fetching Scheme 512*b* instructing direct or non-direct fetching, and in case of non-direct fetching, a Proxy Server 512*c* defines what scheme is used for the non-direct fetching, such as identification of the proxy server to be used. As shown in the example of table 510, a first row 511*a* indicates that URL #21 is fetched directly, a third row 511*c* indicates that URL #23 is fetched directly, and a sixth row 511*f* indicates that URL #26 is fetched directly. Further, a second row 511*b* indicates that URL #22 is non-directly fetched using Proxy #1, a fourth row 511*d* indicates that URL #24 is non-directly fetched using Proxy #2, and a fifth row 511*e* indicates that URL #25 is non-directly fetched using Proxy #3.

Figure 39A:
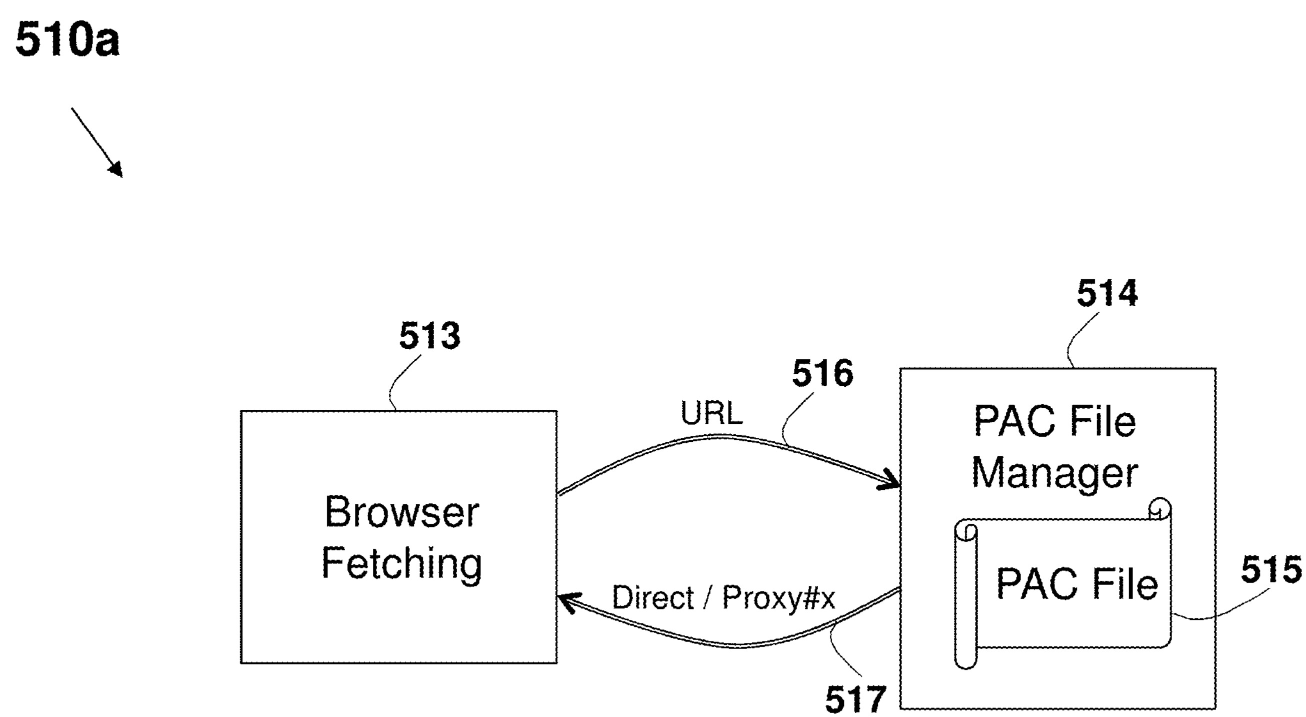
FIG. 39*a* illustrates schematically simplified chart of a prior-art PAC file handling.

An arrangement of using of a PAC file is schematically illustrated in a view 510*a* in FIG. 39*a*. A PAC file 515, such as the table 510, is managed by a PAC File Manager 514, which represents the functionality involved in managing, updating, storing, or reading the PAC file 515. Upon identifying an URL (of the requested web-page) that is to be fetched over the Internet, a browser fetching 513, which represents the functionality of the browser that is involved in the actual URL fetching, sends the URL, shown as request 516, to the PAC File Manager 514. For example, the URL #24 shown as part of the row 511*d* in the table 510 is sent as part of the request 516. The manager 514 looks the received URL up in the PAC File 515, and provides as a response 517 to the fetching functionality 513 the fetching scheme to be used, such as direct or non-direct scheme, and in case of non-direct fetching, the intermediate device to use for the fetching. In the example of URL #24, the response 517 may include indication of a non-direct fetching and using the Proxy #2 as shown in the row 511*d* of the table 510.

Figure 40:
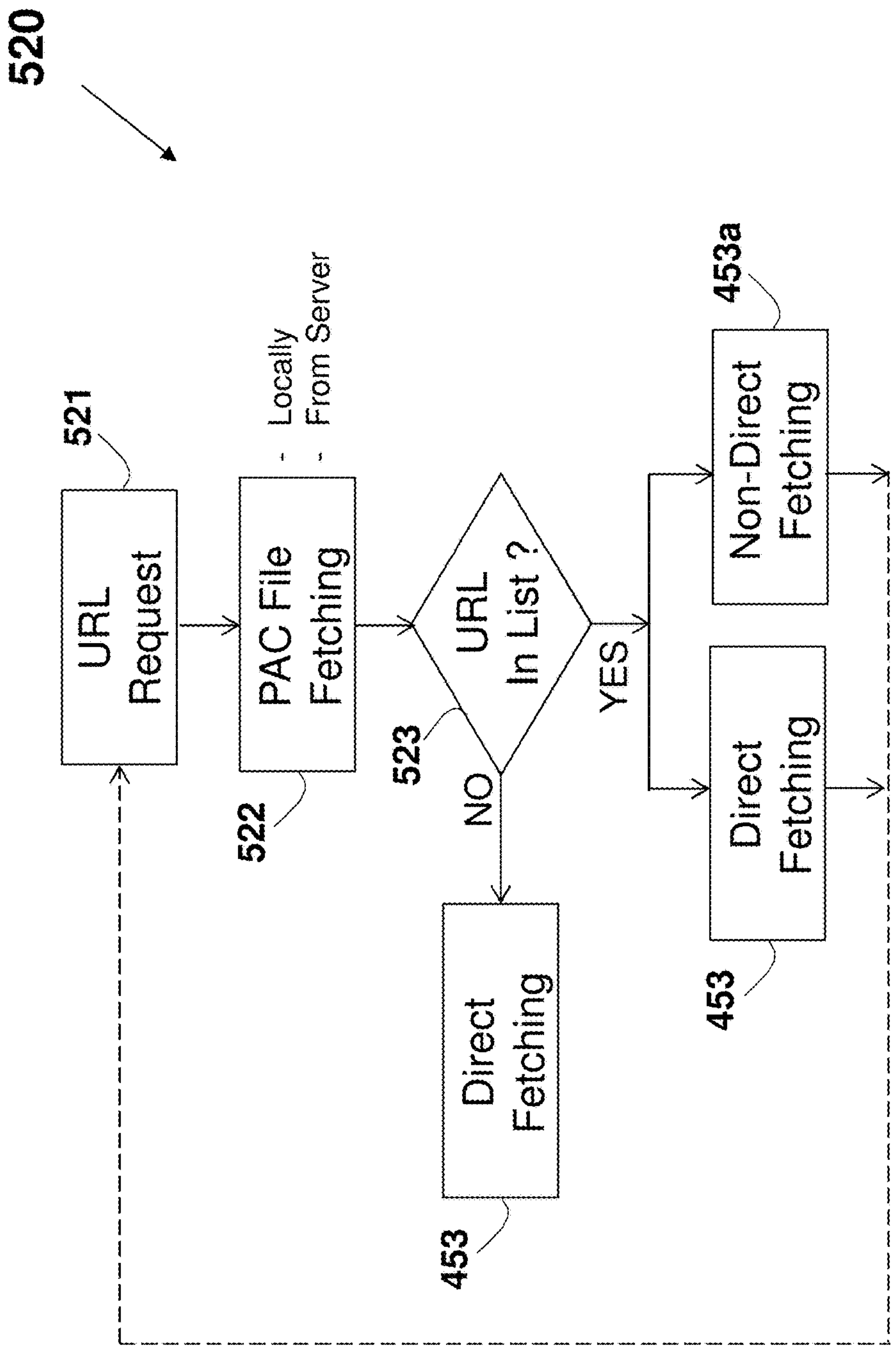
FIG. 40 illustrates schematically a simplified flowchart relating to prior-art using of PAC file.

A flow chart 520 shown in FIG. 40 describes the client device operation when using the PAC file. A URL (of a requested web-page) is identified in a "URL Request" step 521, which may be identical, similar, part of, or includes, the "URL Request" step 443, the "Content Request" step 82, or the "Page URL Request" step 541. As part of a "PAC File Fetching" step 522, the PAC file 515 is obtained, such as from local memory or from a remote server. As part of a "URL In List?" step 523, which may correspond to the request 516 shown in the schematic arrangement 510*a*, the requested URL is checked for availability in the PAC file 515. In case the URL is not in the PAC file 515, such as for example the URL is URL #27 that is not in the URL column 512*a* in the table 510, a response 517 of 'direct fetching' is produced, and a direct fetching scheme is used for the requested web-page, as part of a 'Direct Fetching' step 453. In a case where the required URL was found in the PAC file 515, the response 517 may include the looked-up associated information. In case of a direct fetching associated with the required URL, a response 517 of 'direct fetching' is produced, and a direct fetching scheme is used for the requested web-page, as part of a 'Direct Fetching' step 453. In case where a non-direct fetching is associated with the required URL, a response 517 of 'non-direct fetching' and the proxy server information is produced, and a non-direct fetching scheme using the proxy server information is used for the requested web-page, as part of a 'Non-Direct Fetching' step 453*a*.

Figure 41:
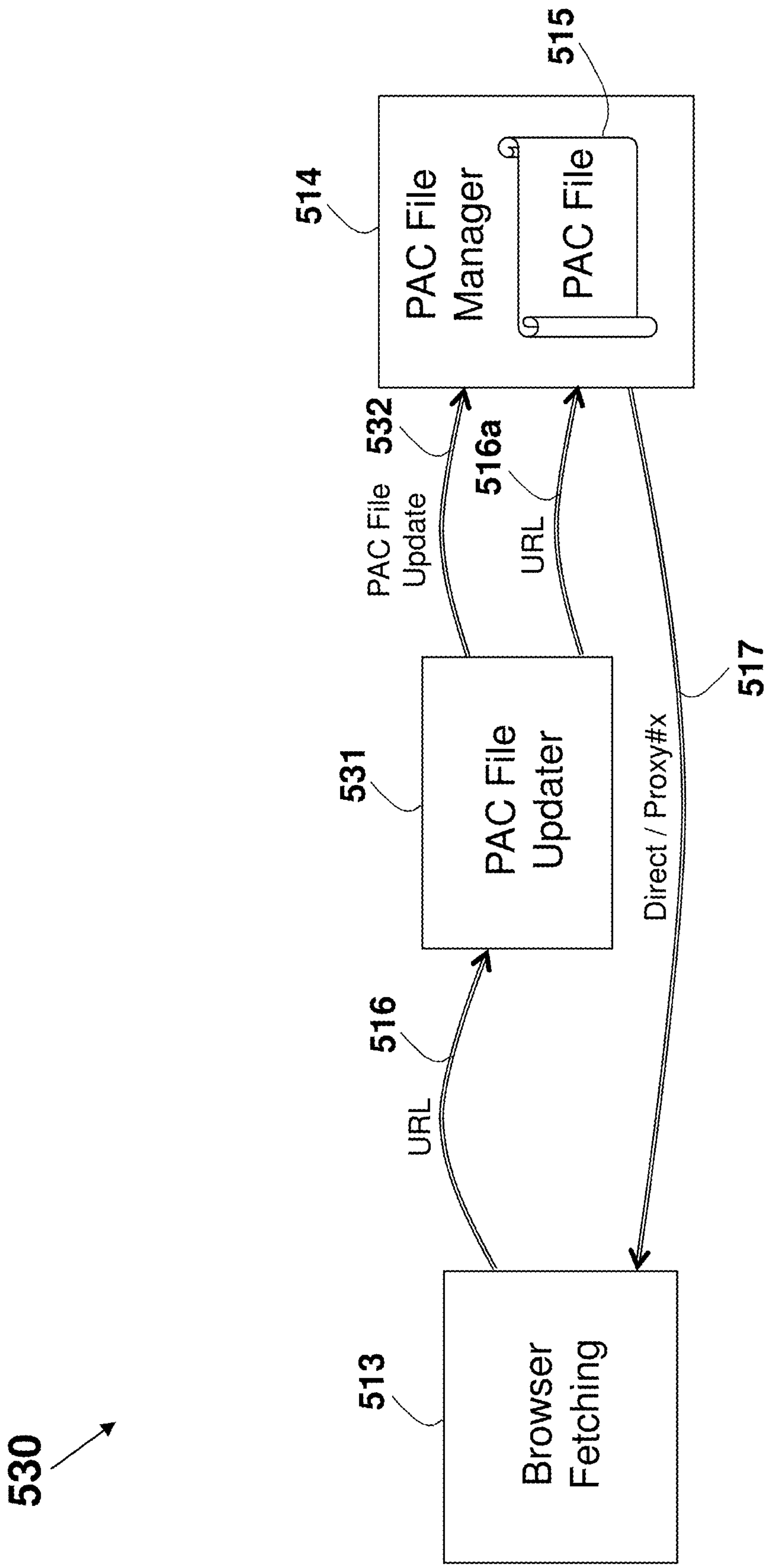
FIG. 41 illustrates schematically simplified chart of a PAC file dynamic real-time updating and using.

The static nature of the PAC file handling, such as the need for off-line and manual configuration, limit its use in many practical applications. In one example, a mechanism that allows dynamic updating of the PAC file is described, providing practical use and in real-time of the PAC file scheme in many applications. A schematic example of such a mechanism 530 is shown in FIG. 41. A 'PAC File Updater' functionality 531 is used, representing the added functionality to the existing browser fetching functionality 513 and the PAC File manager 514, shown as part of the arrangement 510*a* in FIG. 39*a*. The updater 531 intercepts and identifies the request 516 by the browser fetching functionality 513, and suspends it from reaching the PAC file manager 514. The PAC file updater 531 checks in a list if the requested URL is a web-page URL that is stored in a list. In case the URL is in the list, the PAC file 515 is updated with relevant fetching information, similar to normal PAC file structure, shown as a line 532. Next, the URL request 516 is allowed to reach the PAC file manager 514, so that the updated fetching information is retrieved from the PAC file 515 and returned as a response 517 to the browser fetching functionality 513. Such mechanism may be applied to any URL. In particular, the updater 531 may store a list of URLs relating to web pages where special fetching schemes are to be used, and all URLs that are part of, or derived from, the web page URL, are handled according to information that is written in real-time to the PAC file 515.

Figure 41A:
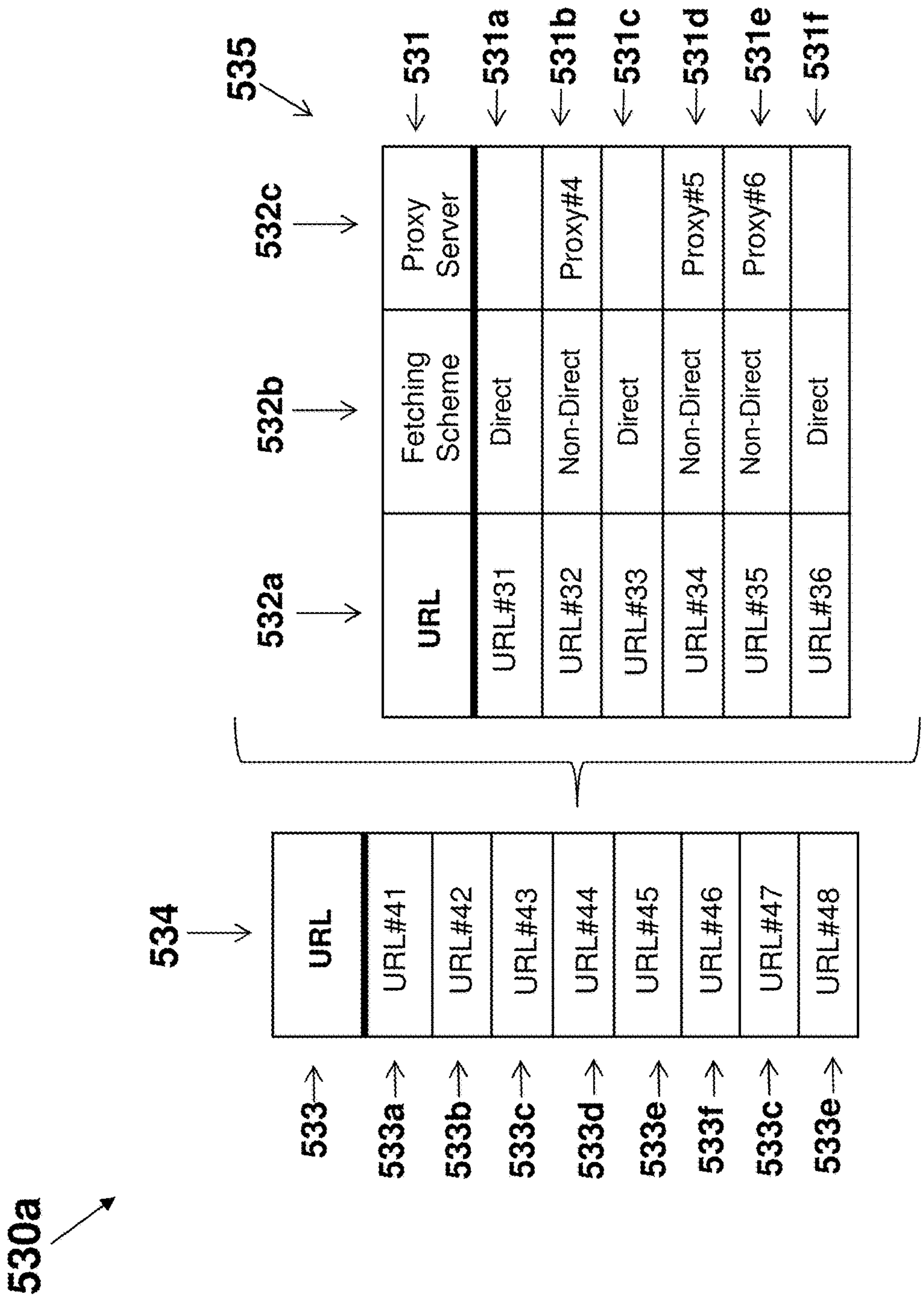
FIG. 41*a* illustrates schematically a table relating to using direct or non-direct fetching for various URLs.

An example of a list 534 of web page related URLs that may be used by the updater 531 is shown in FIG. 41*a*, as part of an arrangement 530*a*. The list involves web-page URLs as shown in the title 'URL' 533, and in this example includes URL #41 533*a*, URL #42 533*b*, URL #43 533*c*, URL #44 533*d*, URL #45 533*e*, URL #46 533*f*, URL #47 533*g*, and URL #48 533*h*. For each of the web page URLs in the list 534, the 'internal' URLs that are part of the web page or derived therefrom are defined, and a table is associated that includes, for each of the 'internal' URLs, a fetching scheme (direct or non-direct) and proxy server identification in case of a non-direct fetching, similar to standard PAC file structure. An example of such a table 535 is shown as part on the arrangement 530*a* in FIG. 41*a*. The table 535 is associated in this example to the web page URL #44 533*d*, and include 6 'internal' URLs.

As shown in the example of the table 535, a first row 531 defines a first column URL 532*a*, and for each respective URL, a Fetching Scheme 532*b* instructing direct or non-direct fetching, and in case of non-direct fetching, a Proxy Server 532*c* defines what scheme is used for the non-direct fetching, such as identification of the proxy server to be used. As shown in the example of table 535, a first row 531*a* indicates that URL #31 is fetched directly, a third row 531*c* indicates that URL #33 is fetched directly, and a sixth row 531*f* indicates that URL #36 is fetched directly. Further, a second row 531*b* indicates that URL #22 is non-directly fetched using Proxy #4, a fourth row 531*d* indicates that URL #34 is non-directly fetched using Proxy #5, and a fifth row 531*e* indicates that URL #35 is non-directly fetched using Proxy #6.

A table 530*b* shown in FIG. 41*b* is an example of the modifications of the PAC file 515 example of the table 510 example shown in FIG. 39. The updater 531 added a seventh row 531*c* as well as an eighth row 531*e*, both derived and copied from the table 535.

Figure 42:
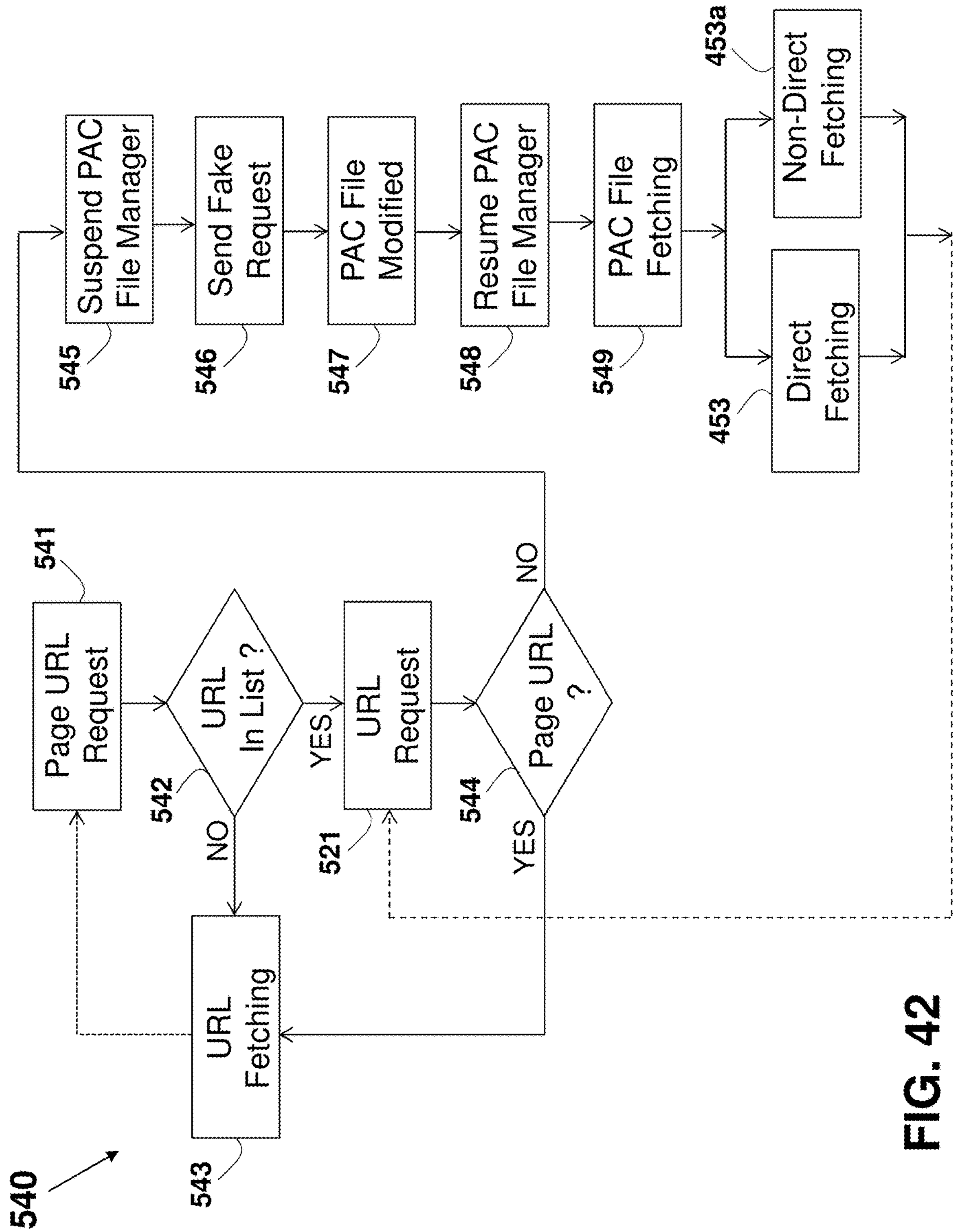
FIG. 42 illustrates schematically a simplified flowchart relating to updating and using of PAC file.

A schematic general flow chart 540 of the updater 531 and system operation is shown in FIG. 42. Upon intercepting or identifying a request for a URL that relates to a web page as part of a "Page URL Request" step 541, the web page URL is checked if included in the web-page URLs list, such as the list 534. In the case the intercepted web page URL is not in the list, such as if the URL is URL #49 that is not in the list 534, then the URL is fetched according to other fetching mechanisms, such as described herein or otherwise, as part of a "URL Fetching" step 543. Such fetching may be a direct fetching such as described herein regarding "Direct Fetching" step 453, or a non-direct fetching as herein regarding "Non-Direct Fetching" step 453*a*. In the case the identified web page URL is included in the web page URLs list, such as URL #44 533*d* that is included in the list 534, then the updater 531 continue to intercept or identify URLs as part of a "URL Request" 521, that may correspond to the URL request 516 shown in the arrangement 530. Any identified URL as part of the "URL Request" 521 is then are checked whether it is a web page URL or an 'internal' URL. In case the next identified or intercepted URL is a web page URL, then this web page URL is fetched according to other fetching mechanisms, such as described herein or otherwise, as part of a "URL Fetching" step 543. However, in most cases the next identified URL is expected to be an internal URL. For example, the internal URL identified may be may be URL #33 or URL #35.

In case of non-web-page or 'internal' URL, the updater 531 inhibit the URL request 516 to be obtained by the PAC file manager 514 as part of a "Suspend PAC File Manager" step 545. Instead, as part of a "Send Fake Request" step 546, the updater 531 communicate with the PAC file manager 514 and causes the PAC file 515 to be modified as part a "PAC File Modified" step 547, that may correspond to the line 532. In the example where the internal URL identified is URL #33, the PAC file 530*b* is modified to include the related URL #33 fetching information 531*c*. In the example where the internal URL identified is URL #35, the PAC file 530*b* is modified to include the related URL #35 fetching information 531*e*. Upon updating the PAC file 515 with the related fetching information, the requested system operation is resumed and the URL is sent to the PAC file manager 514, shown as the line 516*a* in the arrangement 530. The PAC file manager 514 then respond by reading the associated fetching info from the PAC file 515 as part of a "PAC File Fetching" step 549, which may correspond to the line 517 in the arrangement 530. In the example where the internal URL identified is URL #33, the PAC file fetching information 531*c* is read. In the example where the internal URL identified is URL #35, the related URL #35 fetching information 531*e* is read. Then, regular operation is resumed by fetching according to the read fetching information, such as using the "Direct Fetching" step 453 in case of direct fetching information read (for example in case of URL #33), or using the "Non-Direct Fetching" step 453*a* using Proxy #6 in case of direct fetching information read (for example in case of URL #35). Upon completion of the fetching process, the system may revert to identify the next URL, which may be another 'internal' URL, where the process is repeated in steps 545-549, or may be a web page URL, where the "URL Fetching" step 543 is repeated. The described scheme allows for dynamic, real-time per-URL usage of the PAC file.

The identification of the URL request as part of the "Page URL Request" step 541 may be intercepted and routed to be handled as part of the 'client' application or process. Such interception may be in the form of a filter driver (or any other intermediate driver), enabling the interception as part of the OS kernel. Alternatively or in addition, the interception may be in the form of extension or a plug-in of the requesting application, such as a browser plug-in or a browser extension in the case where the application is a web browser. Alternatively or in addition, the interception of the request may use hooking of the requesting application, or of the communication-related application. Alternatively or in addition, the application and the steps described herein may communicate using an Inter-Process Communication (IPC), such as a file sharing, a signal, a socket, a pipe, a message queue, a shared memory, a semaphore, or memory mapped file. In Windows environment, the IPC may be based on a clipboard, a Component Object Model (COM), data copy, a DDE protocol, or mailslots.

Figure 2:
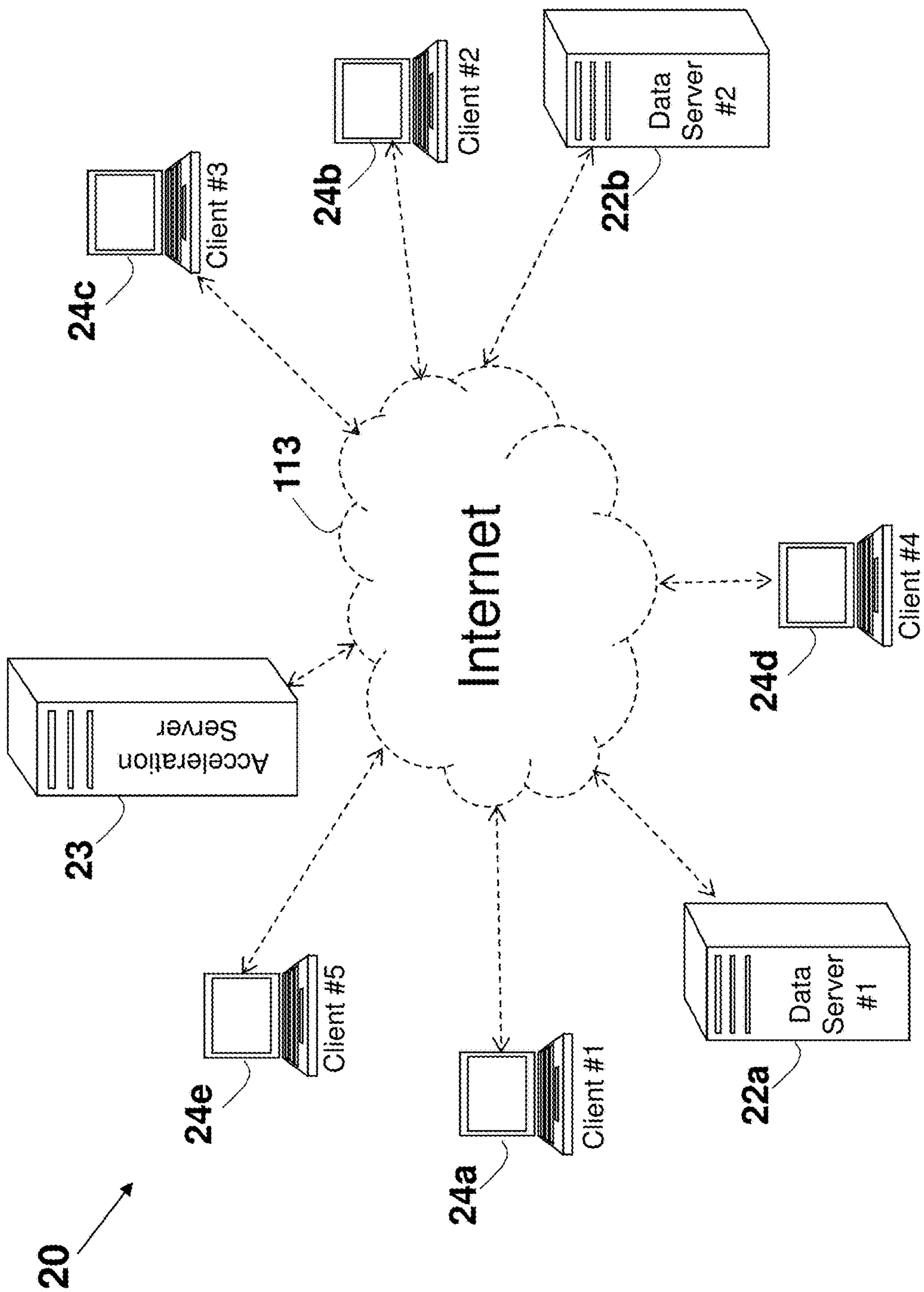
FIG. 2 depicts schematically the Internet and computers connected to the Internet.
Figure 2A:
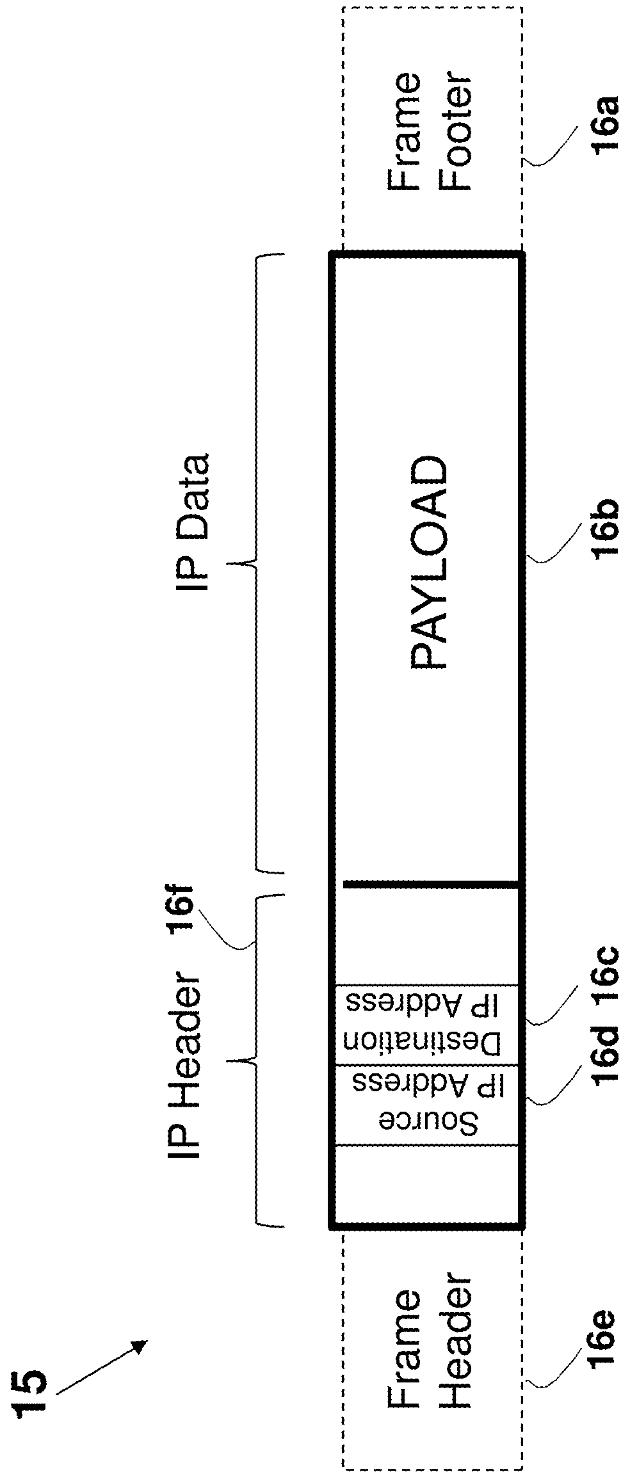
FIG. 2*a* illustrates schematically a structure of an IP-based packet.
Figure 3:
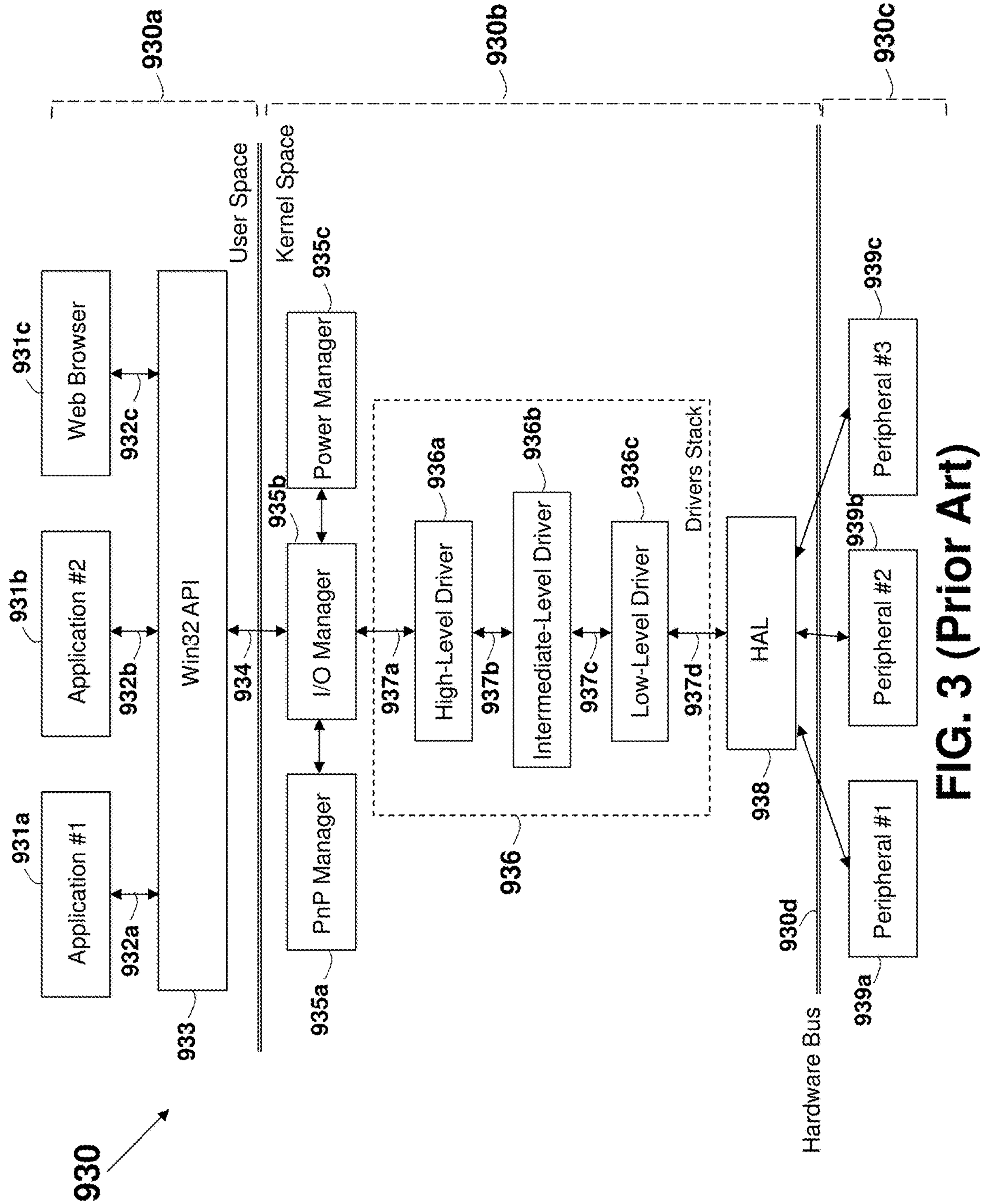
FIG. 3 illustrates schematically a simplified flowchart in a WDM architecture.
Figure 3A:
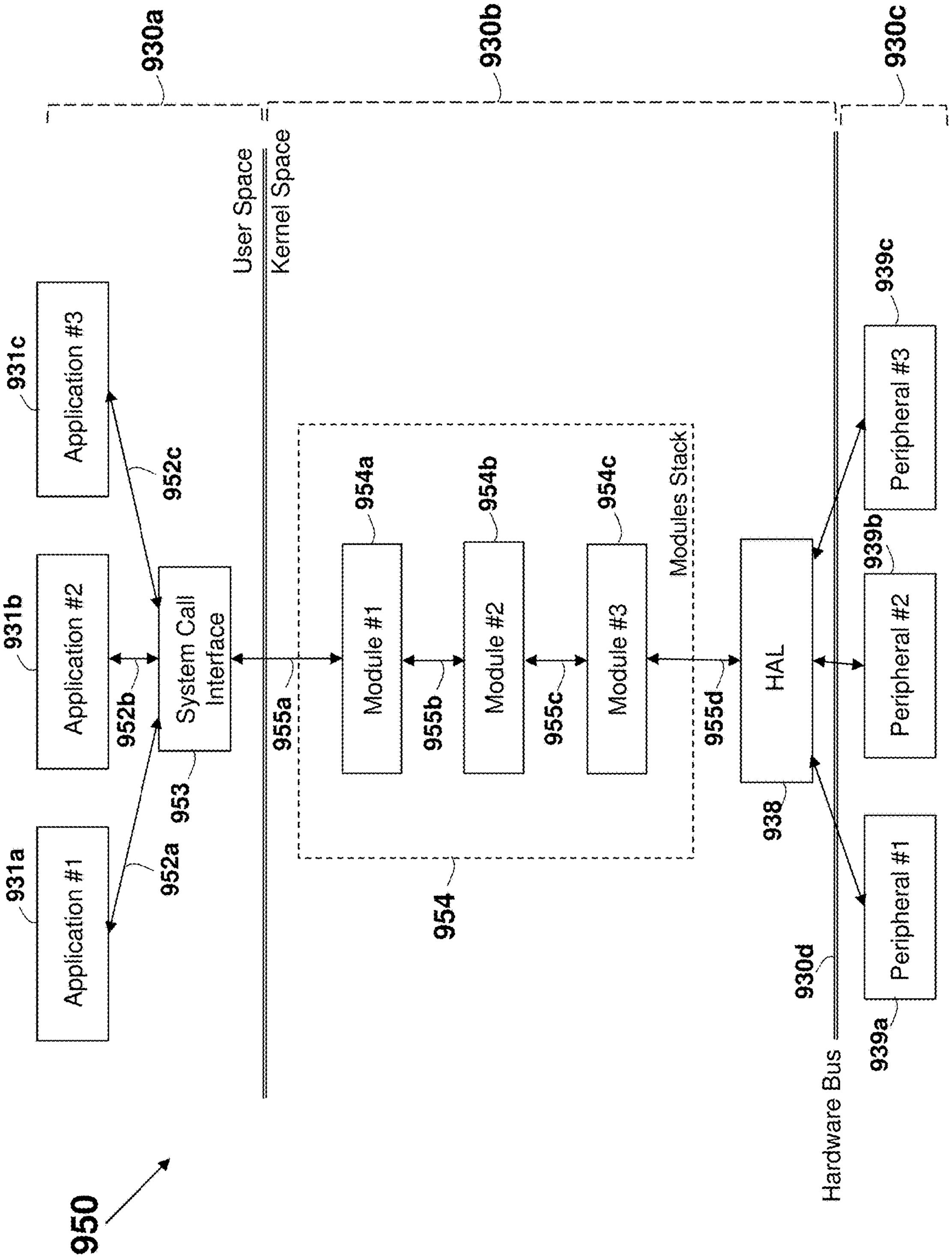
FIG. 3*a* illustrates schematically a simplified flowchart in a Linux architecture.
Figure 3B:
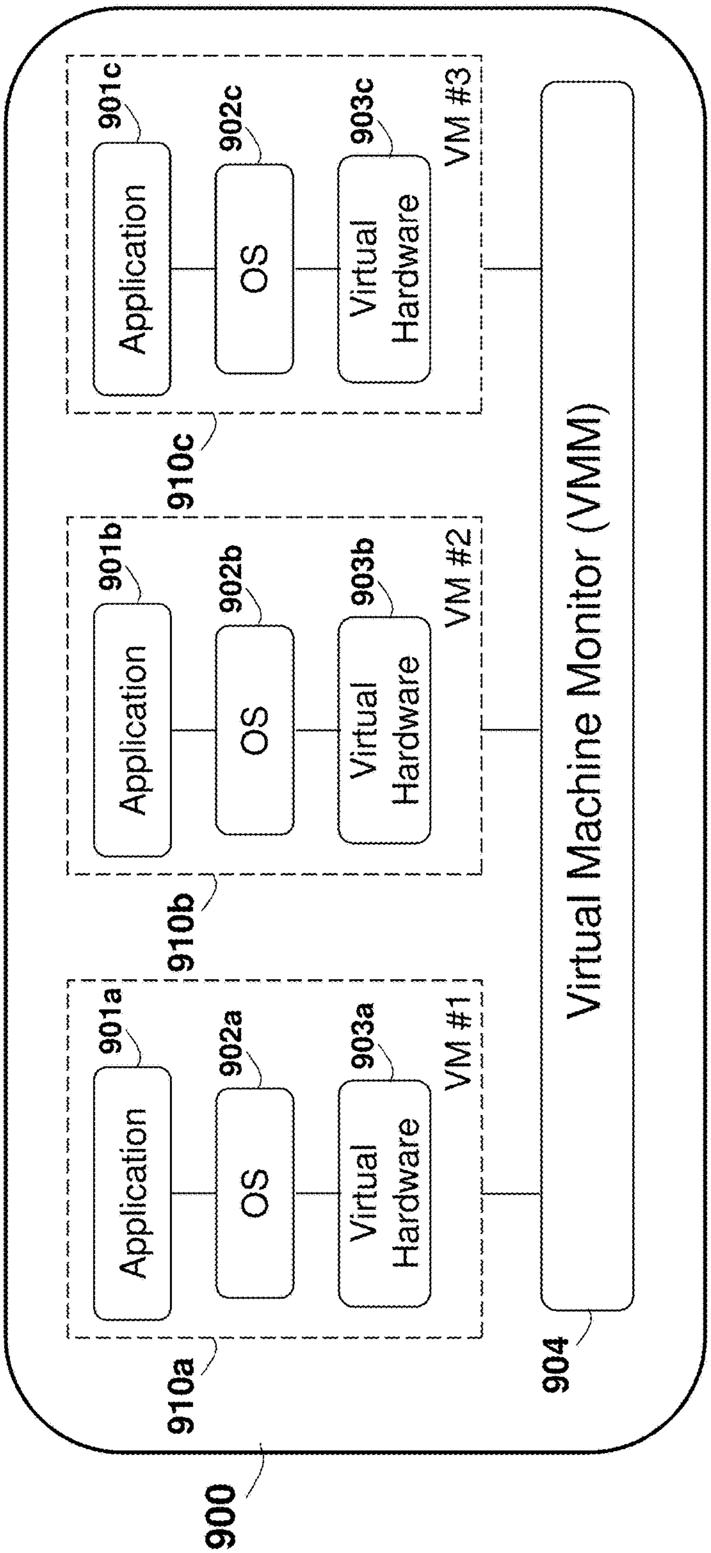
FIG. 3*b* illustrates schematically a prior-art arrangement of virtualization.
Figure 3C:
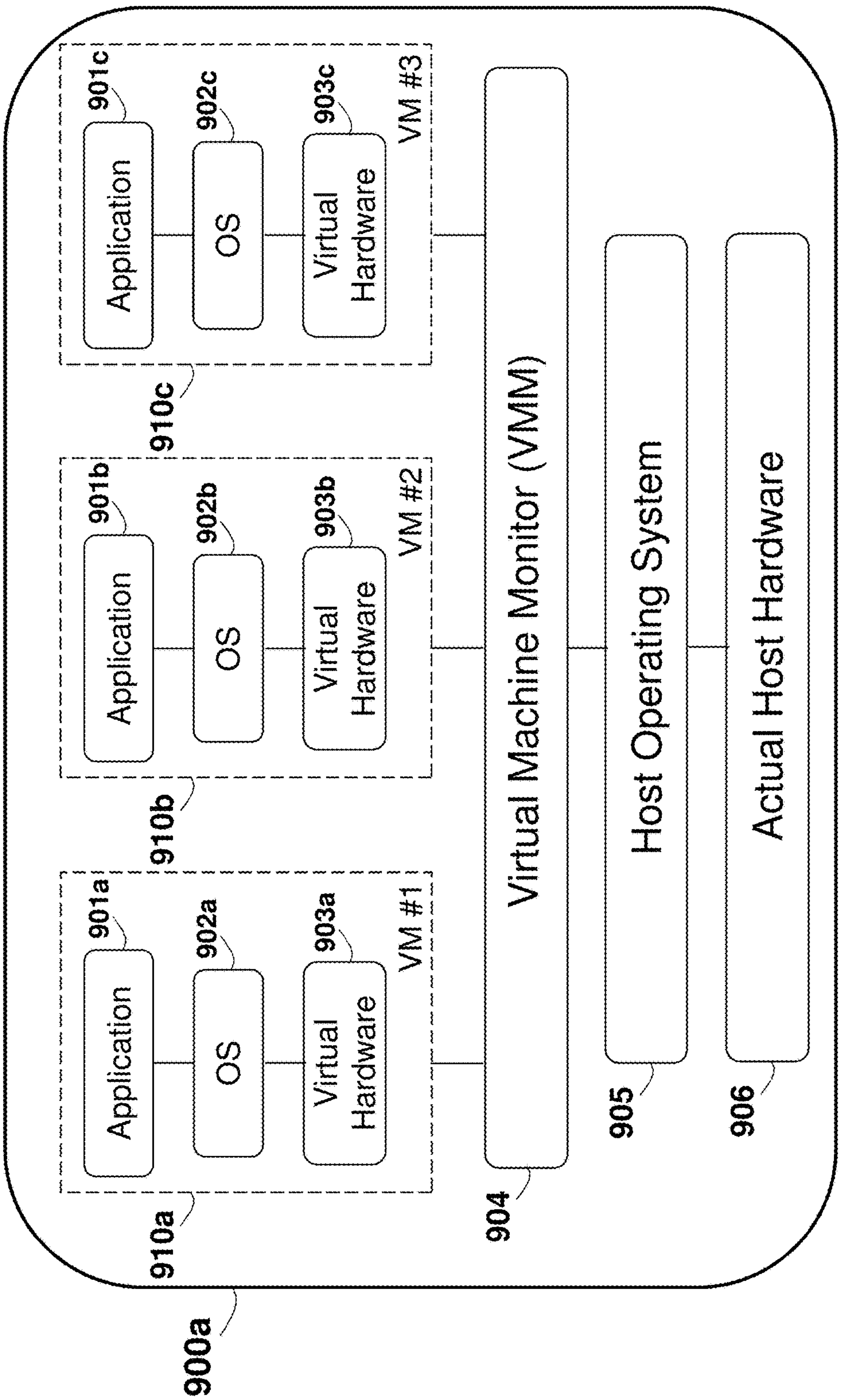
FIG. 3*c* illustrates schematically a prior-art arrangement of hosted architecture of virtualization.
Figure 3D:
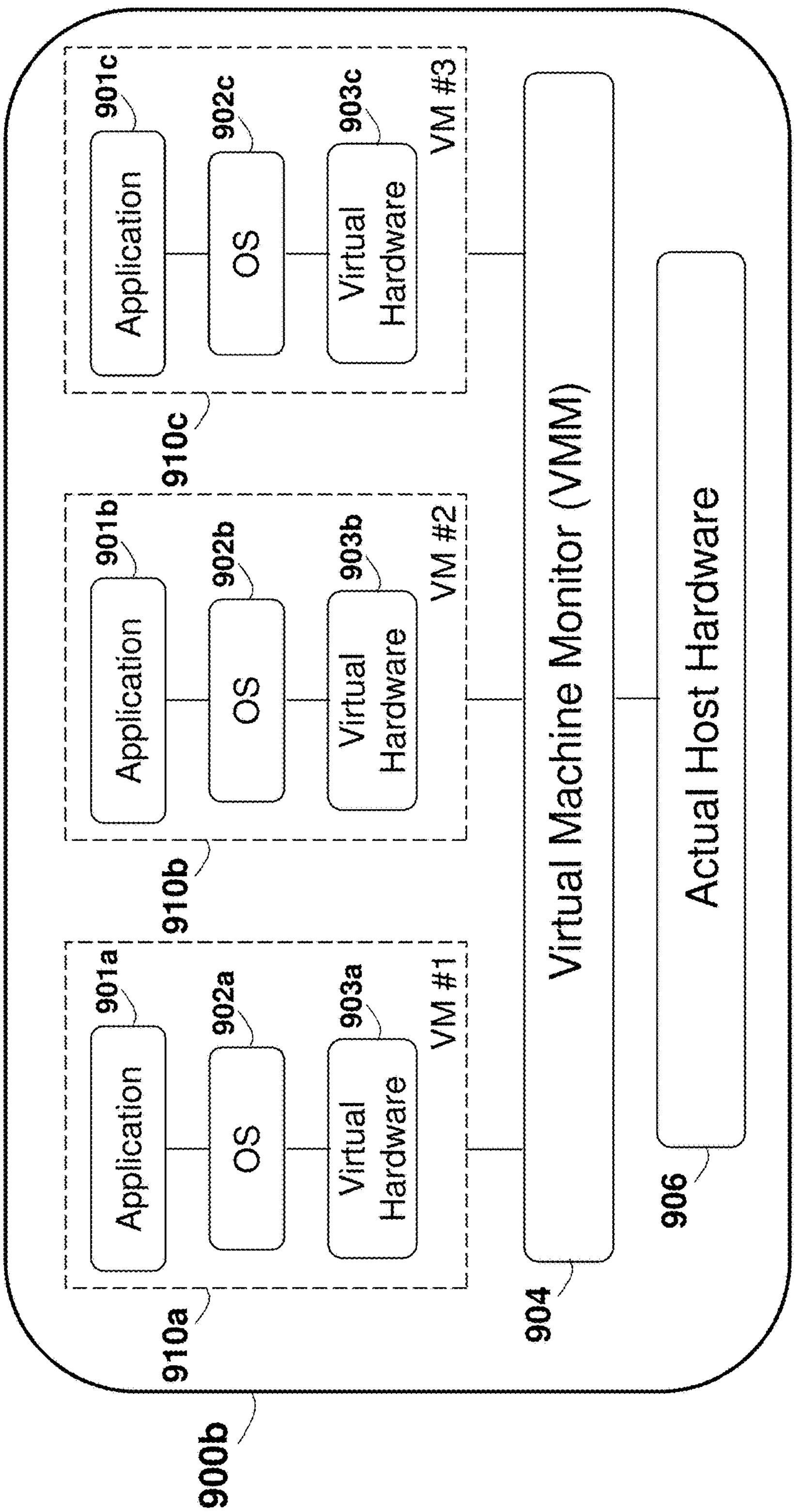
FIG. 3*d* illustrates schematically a prior-art arrangement of bare-metal (hypervisor) architecture of virtualization.
Figure 4:
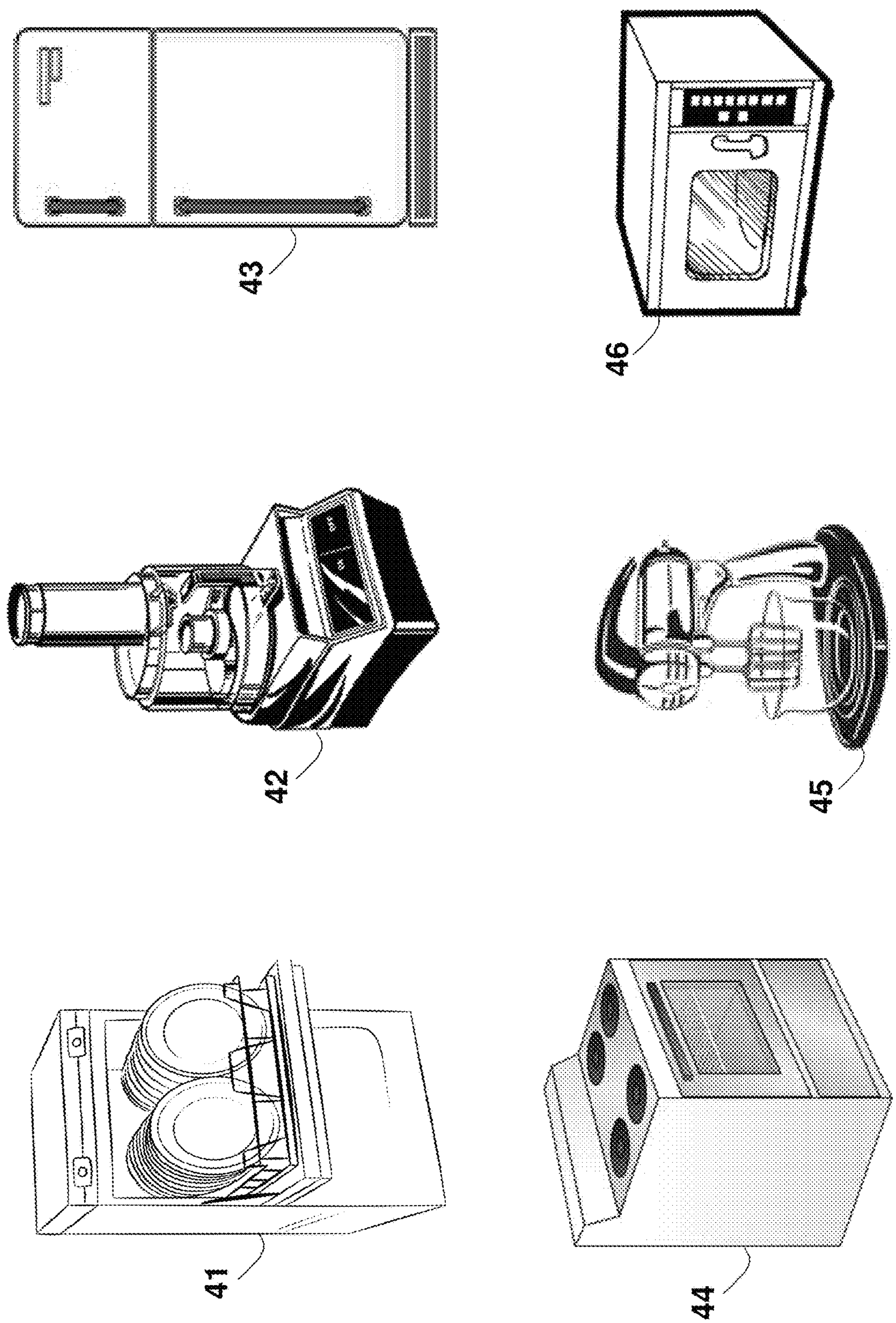
FIG. 4 depicts schematically a few food-related home appliances.
Figure 4A:
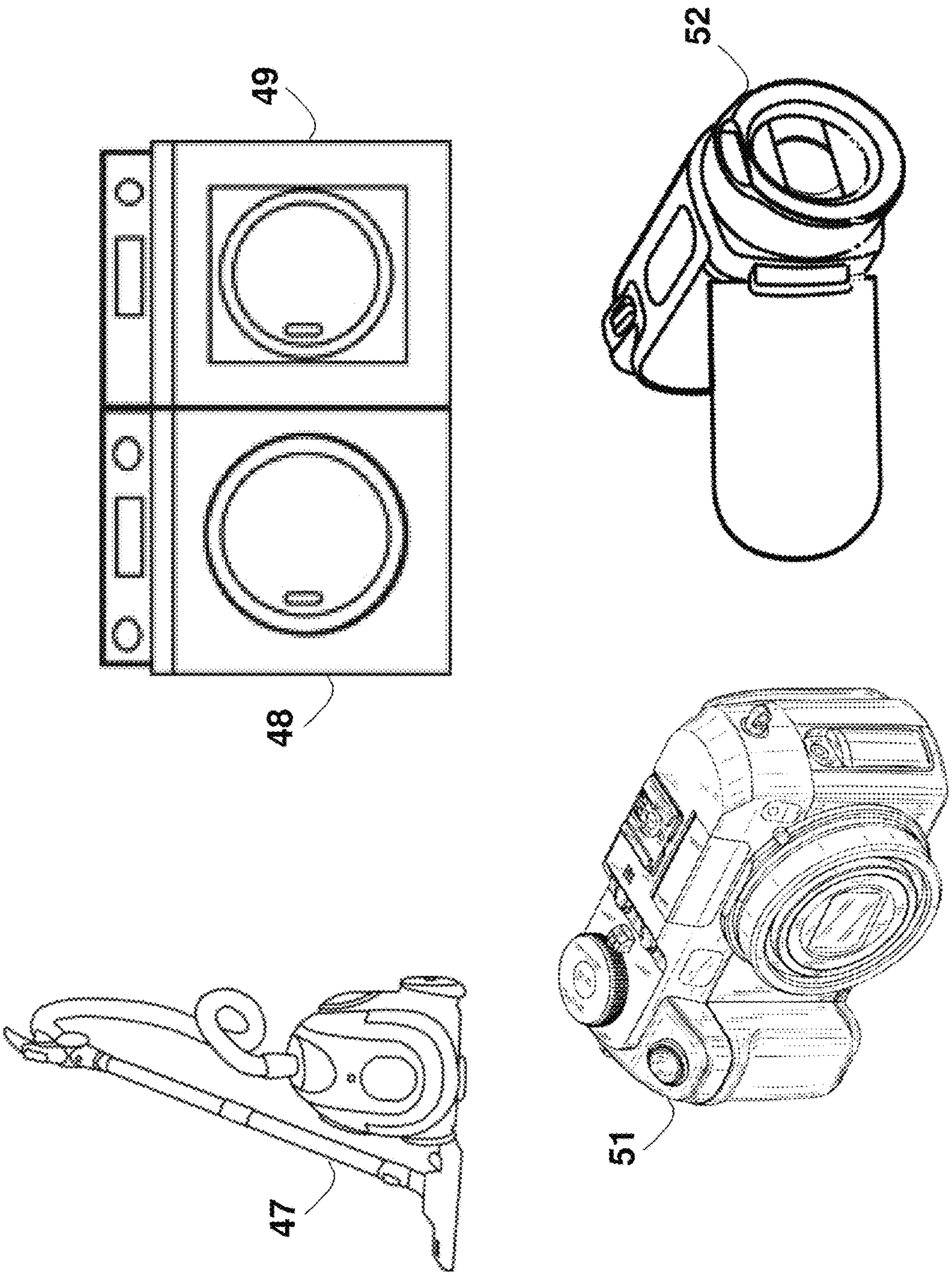
FIG. 4*a* depicts schematically a few cleaning-related home appliances and digital cameras.
Figure 43:
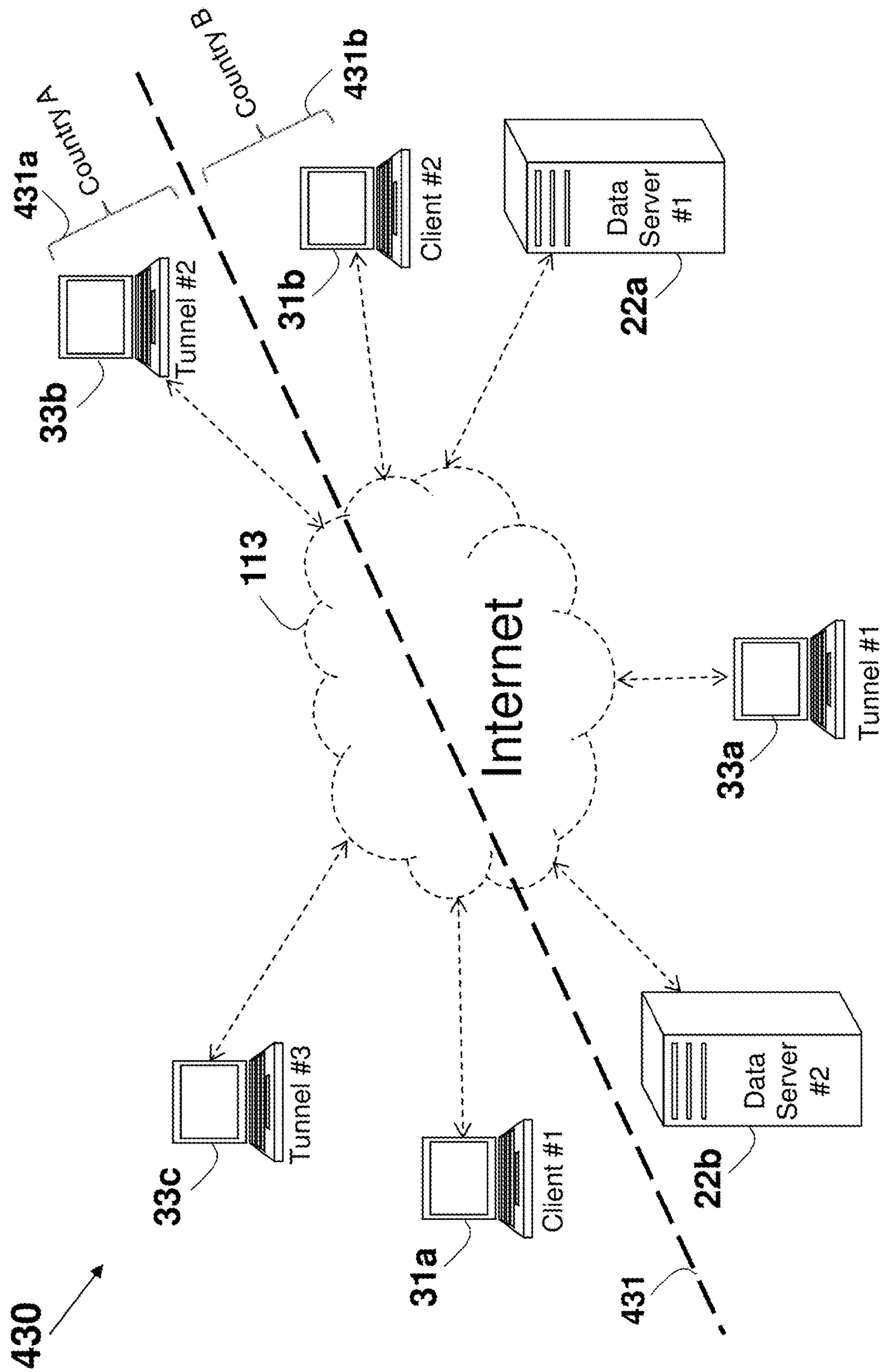
FIG. 43 depicts schematically various devices connected to the Internet and located in two different countries.

An arrangement 430 shown in FIG. 43 is based on the arrangement 20 shown in FIG. 2. In this arrangement, various network elements are located in different countries or other different locations or areas, such as different continents, states, regions, cities, postal/zip codes, latitudes, longitudes, or Timezones, shown by a separating dashed line 431. Client or tunnel devices 31*a*, 33*c*, and 33*b* are located in a country 'A' 431*a*, while data server #1 22*a*, data server #2 22*b*, and tunnel/client devices 33*a* and 33*b* are located in a country 'B' 431*b*. Assuming normal and unblocked communication, the client device #1 31*a* may send a request for content over a route 432*a* to the data server #1 22*a*, which responds by sending the requesting content over route 432*b* to the requesting client device #1 31*a*, as illustrated in an arrangement 430*a* in FIG. 43*a*. In some cases, a requesting message 432*a*1 from the client device #1 31*a* is blocked due to Internet censorship, MITM attack, geoblocking, firewalling, or any other blocking mechanism, and thus does not reach the data server #1 22*a*, as illustrated by a dashed line 432*a*2 in an arrangement 430*b* in FIG. 43*b*. In such a case, no response, or a failure response, is received by the client device #1 31*a*. However, it is noted that the client device #1 31*a* does not know whether the failure is due to the data server #1 22*a* not responding and blocking a reply after receiving the request 432*a*1, or whether the failure is due to the requesting message failing to actually reach and be received by the data server #1 22*a*.

In the case where the blocking is not due to lack of response from the data server #1 22*a*, but rather due to Internet censorship, MITM attack, geoblocking, firewalling, or any other blocking mechanism that is not related to the data server #1 22*a* operation, a non-direct fetching approach may be used. In such a case, illustrated in an arrangement 440 in FIG. 44, the fetching scheme makes use of a proxy device 441, which serves as an intermediary device. The URL request from the client device #1 31*a* is routed over a route 442*a* to the proxy device 441, which in turn forward the request, using its own IP address or another IP address that is different from the client device #1 31*a* IP address, to the data server #1 22*a* over a route 442*b*. As illustrated in an arrangement 440*a* shown in FIG. 44*a*, the data server #1 22*a* responds by sending the requested content over a route 442*c* to the proxy device 441, which in turn forward the received content over a route 442*d* to the requesting client #1 31*a*. Such a non-direct scheme may allow for overcoming of the blocking described in the arrangement 430*b* in FIG. 43*b*, by forming a new fetching route that may not be satisfying the blocking rules.

Figure 44:
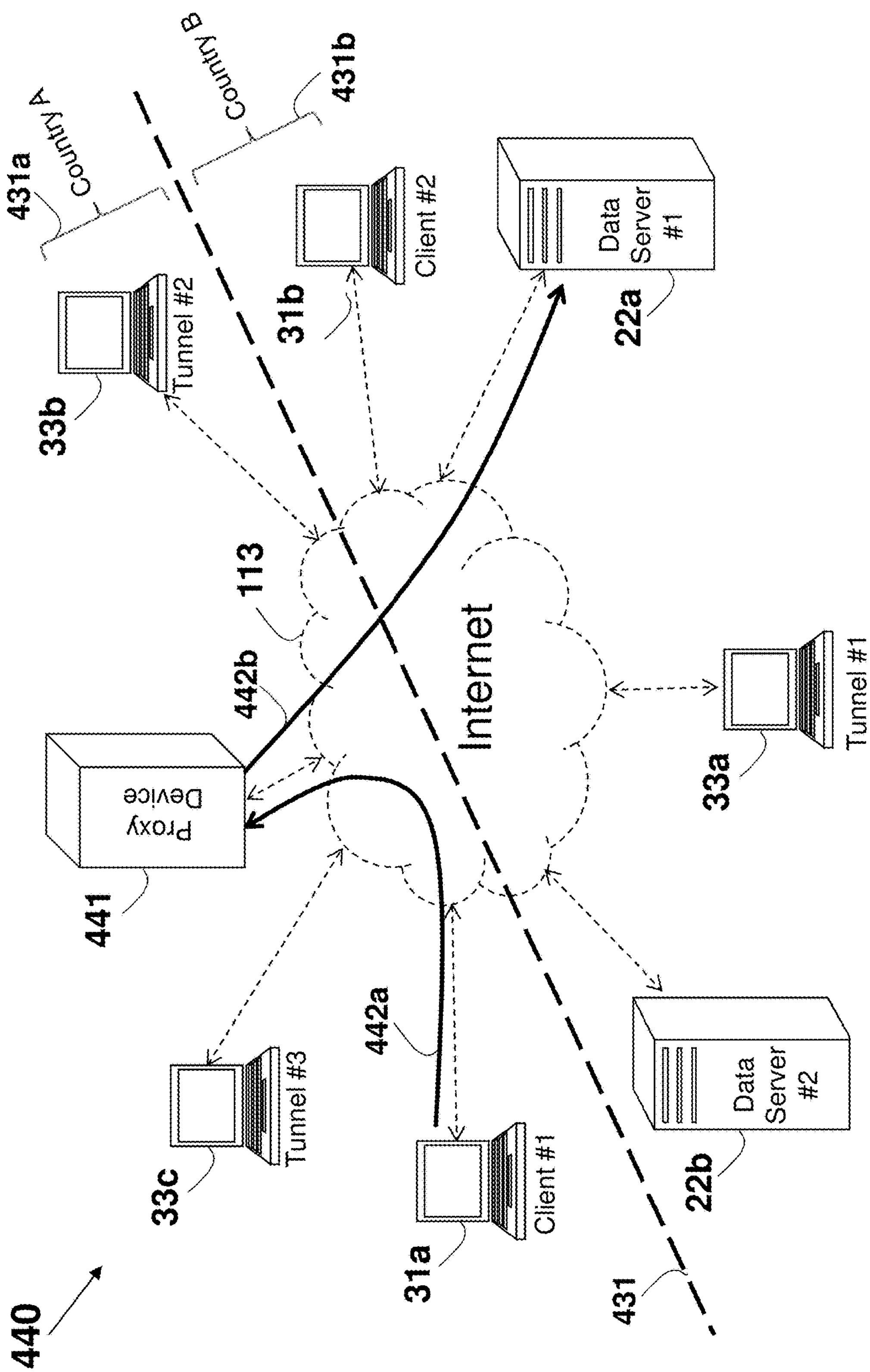
FIGS. 44 and 44*a* depict schematically a non-direct fetching scheme for devices connected to the Internet and located in two different countries.
Figure 44A:
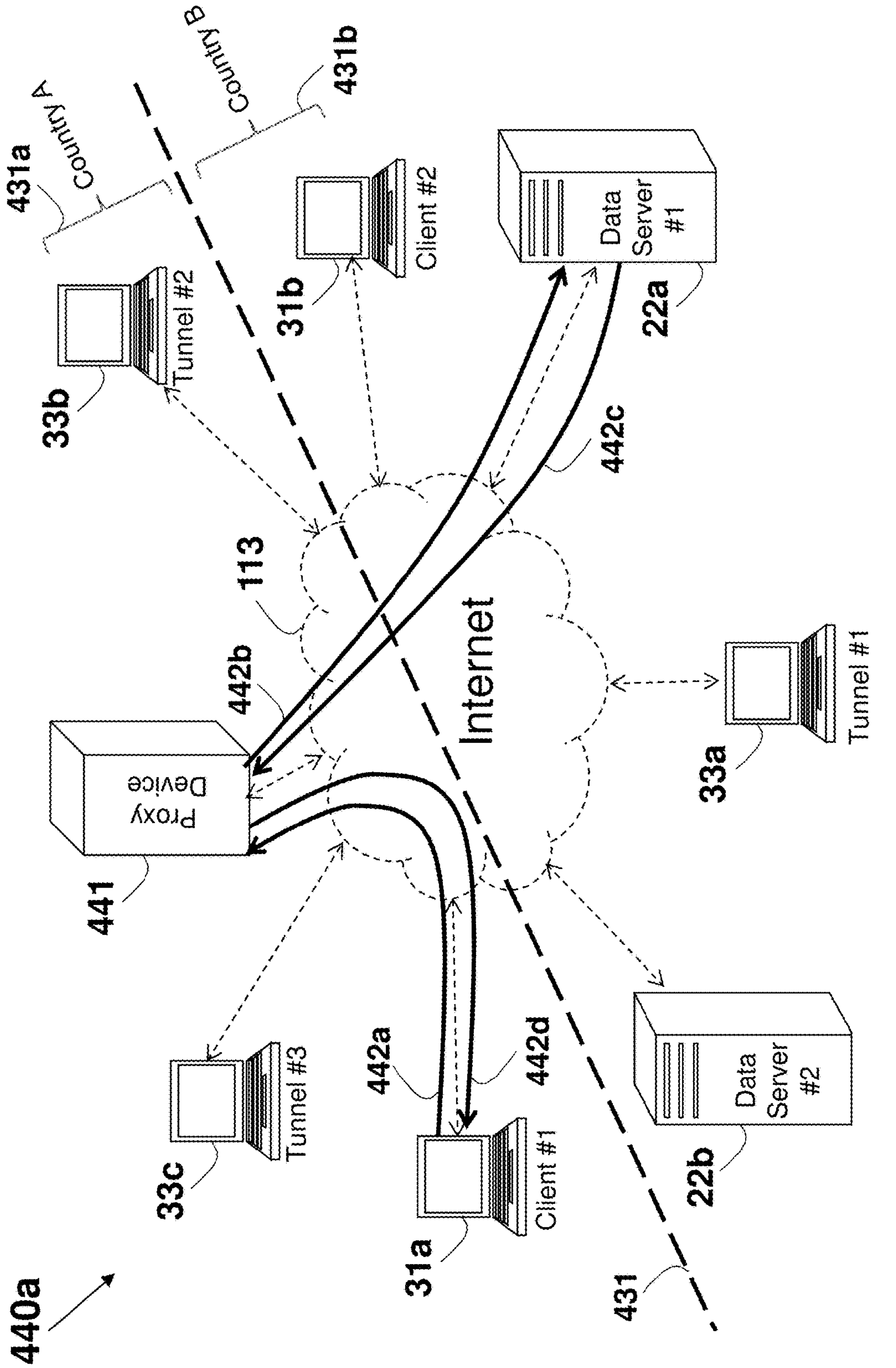

While the arrangement 440 in FIG. 44 illustrated the proxy device 441 as being in country 'A' 431*a*, which is the same country where the requesting client device #1 31*a* is located, the proxy device 441 may be equally located in country 'B' 431*b*, in which the data server #1 22*a* is located, or in a third country which is different from both countries.

The fetching scheme in the arrangement 440 may be based on using a proxy server or a DC proxy server, and the proxy device 441 may be a server, such as the proxy server 53 shown as part of the arrangement 50*b* shown in FIG. 5*a*, the DC proxy server 56 shown as part of the arrangement 50*c* shown in FIG. 5*c*, or the tunnel #4 33*d* shown as part of the arrangement 130 shown in FIG. 13. Alternatively or in addition, the proxy device 441 may be another client device, such as the tunnel #1 33*a* shown a part of the arrangement 60 in FIG. 6, or the tunnel #2 33*b* shown a part of the arrangement 60*a* in FIG. 6*a*. Further, the non-direct fetching scheme in the arrangement 440 may comprise, may be based on, or may be according to, the example of using a proxy server as shown in the arrangement 50*b* shown in FIG. 5*b*, the example of using a DC proxy server as shown in the arrangement 50*c* shown in FIG. 5*c*, the example of using a tunnel as shown in the arrangement 60 shown in FIG. 6, the examples shown in the '604 patent', the examples shown in Patent Cooperation Treaty (PCT) Publication WO 2019/043687, the examples shown in U.S. Pat. No. 9,241,044, or any combination thereof.

Figure 43A:
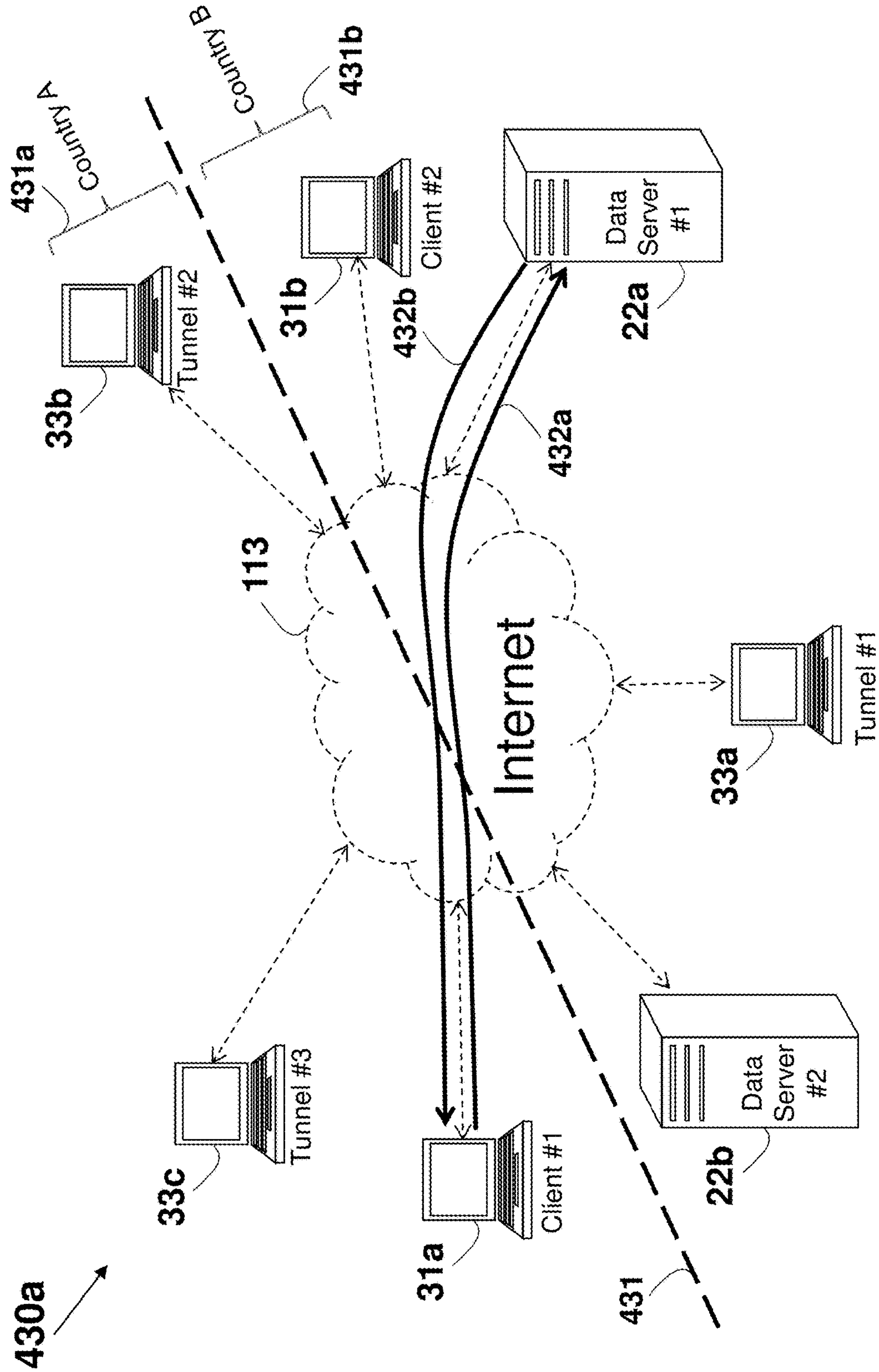
FIG. 43*a* depicts schematically a direct fetching scheme for devices connected to the Internet and located in two different countries.
Figure 43B:
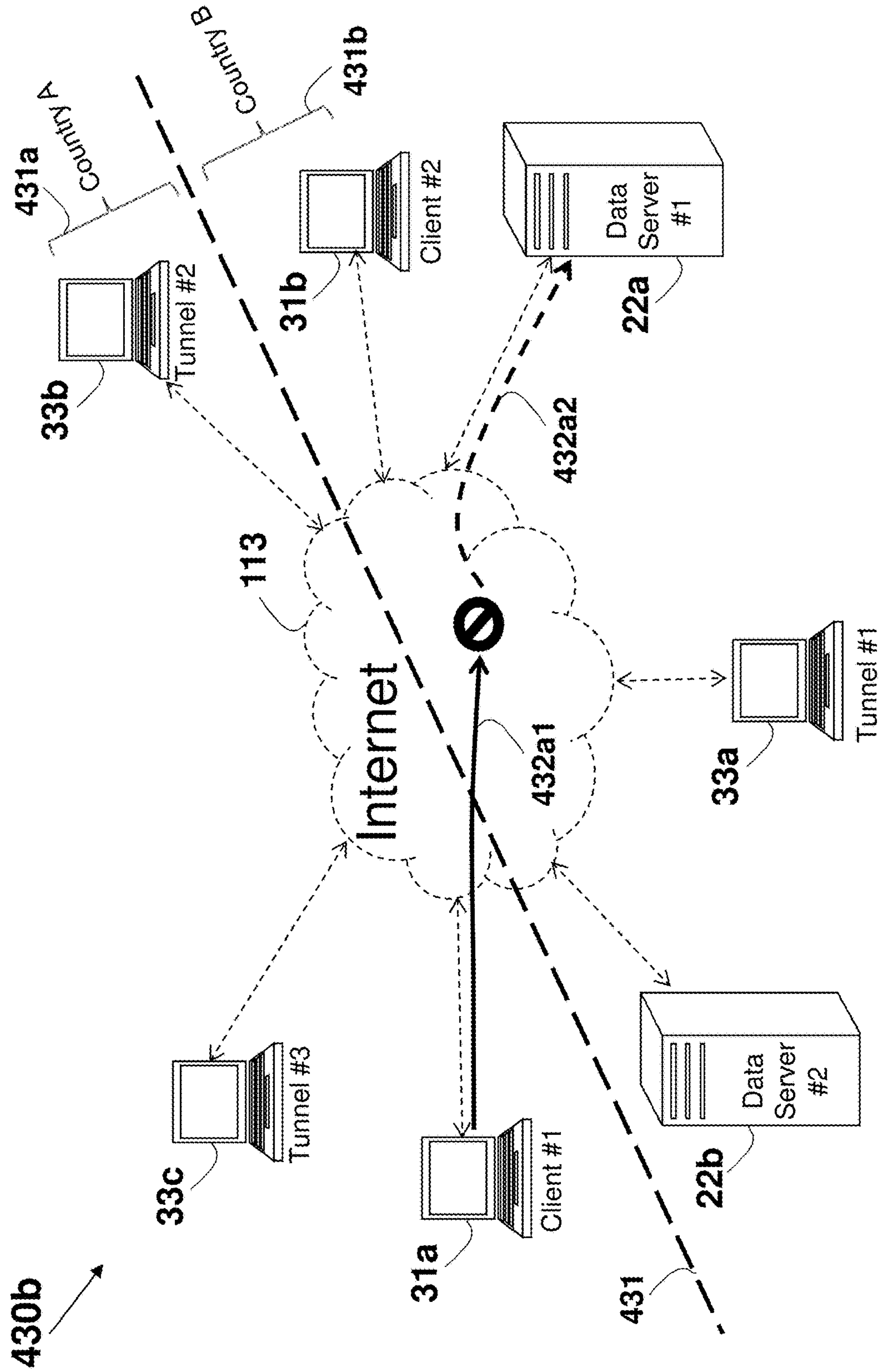
FIG. 43*b* depicts schematically a blocking of a direct fetching scheme for devices connected to the Internet and located in two different countries.
Figure 44B:
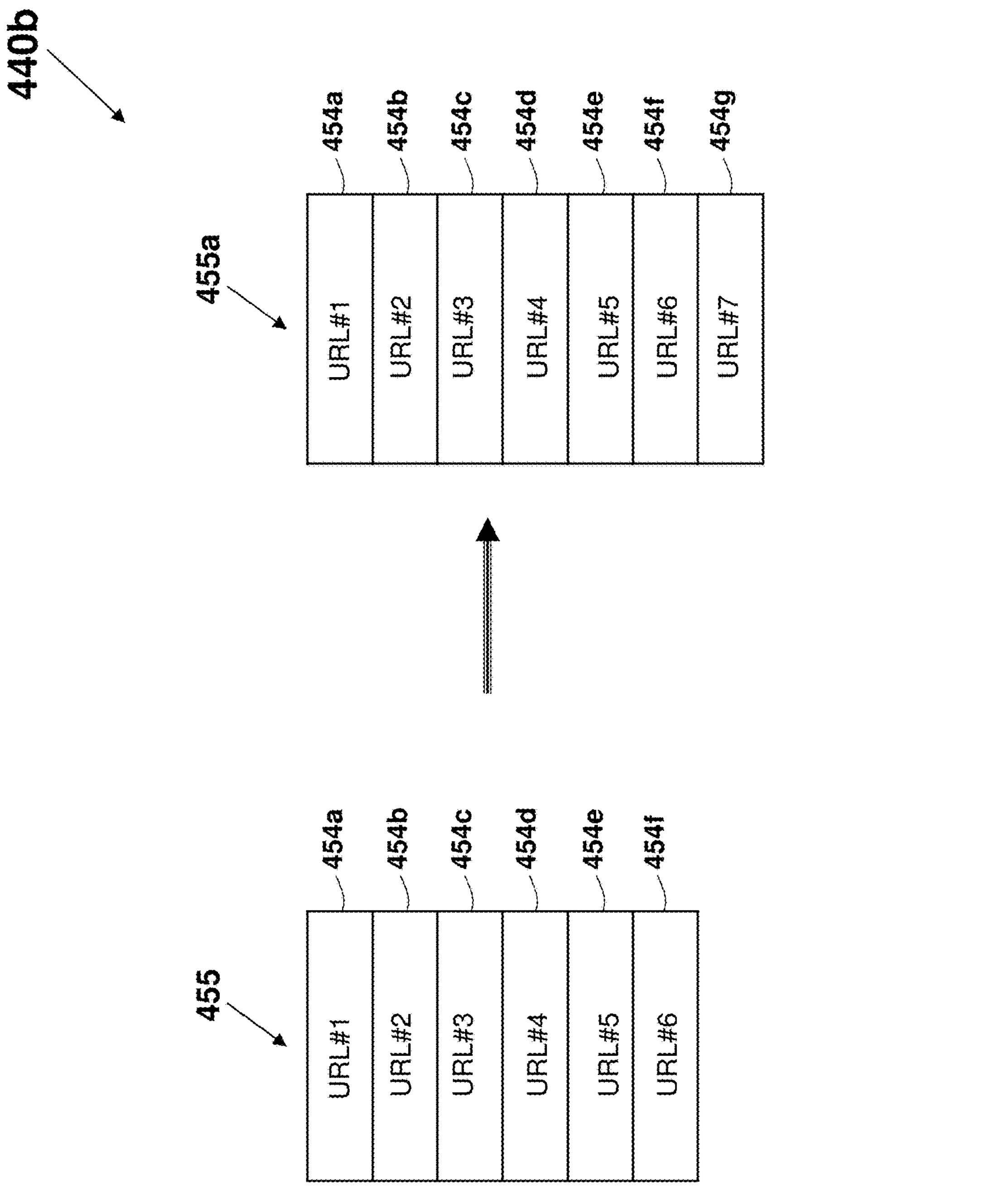
FIG. 44*b* illustrates schematically a list of URLs associating with blocking.

The arrangement 430*a* shown in FIG. 43*a* illustrates a case of successful direct fetching scheme, which is the case in the majority of content fetching actions over the Internet. In such a case, using a non-direct fetching scheme is not required, and if used, may unnecessarily employ various resources, which may be costly and complicated. Hence, it is beneficial to track various URLs, such as in a list, and to mark those URL that requires a non-direct fetching, and to use direct fetching for all URLs that are not part of the list. Such a list may be stored in the requesting client device #1 31*a*, or in a server. For example, a list such as a list 455 shown as part of a view 440*b* is shown in FIG. 44*b* and includes URL #1 454*a*, URL #2 454*b*, URL #3 454*c*, URL #4 454*d*, URL #5 454*e*, and URL #6 454*f*. Each of the URLs in the list 455 have been formerly found to require the use of non-direct fetching.

Figure 44C:
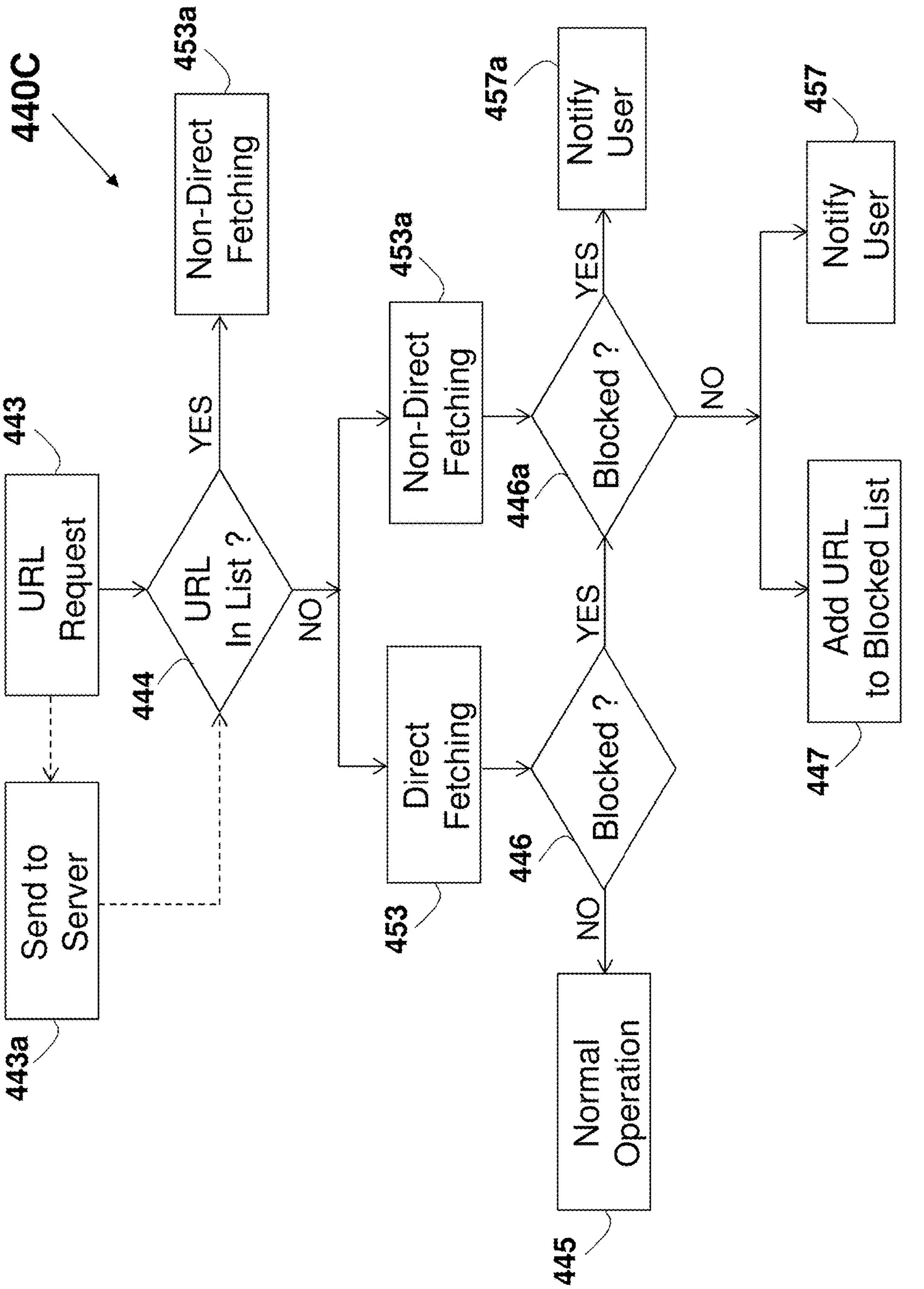
FIG. 44*c* illustrates schematically a simplified flowchart relating overcoming a blocking using a non-direct fetching scheme.

A flow chart 440*c* in FIG. 44*c* shows the using, handling, and management of such URLs list. A URL request by a web server in a client device, such as the client device #1 31*a* is identified or intercepted as part of a "URL Request" step 443. Such identification or interception of any content or URL request may be in the form of a filter driver (or any other intermediate driver), enabling the interception as part of the OS kernel. Alternatively or in addition, the interception may be in the form of extension or a plug-in of the requesting application, such as a browser plug-in or a browser extension in the case where the application is a web browser. Alternatively or in addition, the interception of the request may use hooking of the requesting application, or of the communication-related application. Alternatively or in addition, the application and the steps described herein may communicate using an Inter-Process Communication (IPC), such as a file sharing, a signal, a socket, a pipe, a message queue, a shared memory, a semaphore, or memory mapped file. In Windows environment, the IPC may be based on a clipboard, a Component Object Model (COM), data copy, a DDE protocol, or mailslots.

As part of a "URL in List?" step 444, the identified or intercepted URL is compared to the list 455, to check if this URL is included in the list. For example, in case the identified URL is URL #2 454*b*, then a non-direct fetching operation is initiated as part of a "Non-Direct Fetching' step 453*a*. In a case where the list is not locally stored in the client device, but is stored in a server, then the identified URL is sent to the server that stores the list as part of a "Send to Server" step 443*a*, and the checking in the step "URL in List?" step 444 may be performed in that server, which may continue to perform the "Non-Direct Fetching" step 453*a* in case the identified URL in in the list. Alternatively or in addition, the list 455 or the response to the "URL in List?" step 444 may be sent to the client server and performed locally.

In one example, the identified URL is URL #7 454*g*, which is not in the list 455. In such a case, the client device initiates two parallel operations—a direct fetching as part of a "Direct Fetching" step 453, and the "Non-Direct Fetching' step 453*a*. As part of a "Blocked?" step 446, the response to the direct fetching as part of the "Direct Fetching" step 453 is checked. In a case where a proper response is fetched, corresponding to the arrangement 430*a* shown in FIG. 43*a*, normal operation is resumed as part of a "Normal Operation" step 445, and the web browser uses the properly received content, and resumes normal operation. In case where there is no timely response or a proper content is not properly received, there may be blocking (such as geoblocking, Internet censorship, MITM attack, firewalling, or any other blocking mechanism), as shown in the arrangement 430*b* in FIG. 43*b*. Then the as part of a "Blocked?" step 446*a*, the response to the non-direct fetching as part of the "Non-Direct Fetching" step 453*a* is checked. In case there is no timely response or a proper content is not properly received, then both the direct and non-direct fetching schemes failed to properly provide the requested URL. For example, the data server #1 22*a* may be inoperative or it may be the blocking entity itself. In such a case, the user is notified of the failure to fetch the requested content (in both direct and non-direct fetching schemes) as part of a "Notify User" step 457*a*.

In one example, the "Non-Direct Fetching" step 453*a* and the "Direct Fetching" step 453 are performed, partly or in full, in parallel, using multitasking or multiprocessing. Alternatively or in addition, the "Non-Direct Fetching" step 453*a* and the "Direct Fetching" step 453 are performed, sequentially. For example, the "Non-Direct Fetching" step 453*a* may start only upon determining that the "Direct Fetching" step 453 is completed.

However, in case where the URL is properly received using the non-direct scheme (while failing when using the direct fetching scheme), then it is assumed that the direct fetching failed due to a blocking (such as geoblocking, Internet censorship, MITM attack, firewalling, or any other blocking mechanism), and that such blocking is overcome by using a non-direct fetching scheme. The user is notified that this URL is blocked and that non-direct fetching scheme should be used for fetching this content as part of a "Notify User" step 457. Further, the identified or intercepted URL is added to the list as part of an "Add URL to Blocked List" step 447. For example, the identified URL #7 454*g* is added to form a new list 455*a* shown as part of the view 440*b* in FIG. 44*b*.

In one example, the determining that a blocking is suspected and the response is not a proper response to the URL request, as part of the "Blocked?" step 446 or as part of the "Blocked?" step 446*a*, is based on checking the HTTP status code. For example, if a status code 2xx is received, such as the status code '200 OK', this may be used to indicate that the URL request was successfully received. However, if the HTTP status code received is an error related status code, such as 4xx (400 to 499) client error (such as the HTTP 404 error message) or 5xx (500 to 599) server error, it may indicate that the request was not properly fulfilled. Alternatively or in addition, if URL redirection is identified, such as indicated by a '3xx Redirection' status code, it may be used as an indication that the request was not properly fulfilled.

Alternatively or in addition, the determining that a blocking is suspected and the response is not a proper response to the URL request, may use a timeout mechanism. In such a mechanism, a specified period of time that will be allowed to elapse before receiving a proper response to the URL request, is used. Upon sending the request a timer is initiated, and if a proper response to the URL request is not received before the timer lapses, a timeout is declared, indicating that the request was not properly fulfilled. Such timeout mechanism may be the same as, similar to, or the same as, the HTTP timeout mechanism, or may be independent and different from it.

Alternatively or in addition, the determining that a blocking is suspected and the response is not a proper response to the URL request, may be based on checking the received content (such as a web page) in response to the request. A pre-defined criterion may be used, relating to a feature, parameter, or characteristic of the received content. For example, a size of the received content may be used as a criterion, where the expected size of such a content may be estimated. In the case the received content substantially exceeds, or is substantially lower, that the expected size (such as by 10%, 20%, 50%, or more), it may be used as an indication that the request was not properly fulfilled. For example, if the expected size of the fetched content is 15 MB, then a content received having size of 4 MB or 50 MB may be considered as error. Similarly, the criterion may relates to the content type, arrangement, or any other feature associated with a content or file.

In some examples, a non-direct fetching, such as in the "Non-Direct Fetching" step 453*a* herein, such non-direct fetching is provided as a service by a provider. The service is typically provided to various customers. For example, such service provider may own, operate, control, provide the software to, or manage, an intermediate server used for the non-direct fetching, such as the Proxy Server 53, the DC Proxy Server 56, the Acceleration Server 32, the SP Server 72, or the TB server 71. Each of the customer may use a client device, such as the client device 31*a*, for accessing and using the non-direct fetching service. In such a case, the service provider may own, operate, control, provide the software to, or manage, a software or firmware in the client device for using, interfacing, or managing the non-direct fetching service. Typically, in such a scheme the service provider may implement an accounting or management system for billing and controlling the usage of the customers that use the non-direct fetching service.

In one example, a customer may be provided an unlimited access to the service, without any limitations. For example, a customer may be billed periodically, such as daily, weekly, monthly, bi-monthly, quarterly, or annually, and may use without any limitation (as long as proper payments are made) the non-direct fetching service, without any limitation on the any resources used, such as a cumulative usage duration, a total traffic, or a cumulative volume or size of the received (or transmitted) data, content, or traffic. Alternatively or in addition, a customer may be resources limited when using the non-direct fetching service. In one example, the service provider may offer various service usage plans, each relating to different features or characteristics, where each such plan may be associated with different pricing scheme.

Typically such resource limitation is associated with an accounting period, which may be synchronized with the billing or payment period. The quantity limitation imposed on using any resource as part of the non-direct fetching service, or used as a limitation or billing factor, may be reset at the beginning of any such accounting period. For example, in case of an accounting period that is 1 months, the resource used during the past month is reset to zero at the beginning of the month (such as in 00:00 hour of the 1$^{st}$ of that month), and the cumulative metering or counting of the used resource is re-starting from a zero value. An accounting period may be equal to, or less than, 2 minutes, 5 minutes, 10 minutes, 20 minutes, 30 minutes, an hour, a day, a week, a month, two months, a quarter (3 month), or a year. Alternatively or in addition, an accounting period may be more than 1 minute, 2 minutes, 5 minutes, 10 minutes, 20 minutes, 30 minutes, an hour, a day, a week, a month, two months, a quarter (3 month), or a year. In one example, the accounting period may be unlimited, allowing a customer to use the non-direct fetching service infinitely without any time limitation. However, in such a case the service may be terminated upon reaching the quota, if defined, of a parameter, characteristic, or related value of a resource, such as cumulative received content size. Such scheme may be related to a case of a single non-recurring (one-time) payment for the service, without any mechanism of resuming service after a defined time interval.

In one example, the customer is limited according to the cumulative traffic received by using the non-direct fetching service. For example, a user may be limited to a 2 GB (GigaBytes) of total content received via the non-direct fetching service over a single accounting period. Upon reaching this 2 GB threshold, the customer is inhibited from receiving any more content by using the non-direct fetching service, until the accounting period elapses, and then again a quota of 2 GB may be allocated to the customer. In one example, a cumulative traffic quota (such as in a single accounting period) may be equal to, or less than, 0.1, 0.2, 0.3, 0.5, 0.8, 1, 2, 3, 4, 5, 8, 10, 20, 30, 50, 80, 100, 120, 150, 200, 300, 500, 1,000, 2,000, 3,000, 5,000, 10,000, 20,000, 30,000, 50,000, or 100,000 GB. Alternatively or in addition, a cumulative traffic quota (such as in a single accounting period) may be more than 0.05, 0.1, 0.2, 0.3, 0.5, 0.8, 1, 2, 3, 4, 5, 8, 10, 20, 30, 50, 80, 100, 120, 150, 200, 300, 500, 1,000, 2,000, 3,000, 5,000, 10,000, 20,000, 30,000, 50,000, or 100,000 GB. In one example, the cumulative content or traffic quota may be unlimited, allowing a customer to use the non-direct fetching service without any limitation on the size of the received data, during the accounting period (or indefinitely).

Alternatively or in addition, the customer is limited according to the cumulative time duration of using the non-direct fetching service. Such scheme may be useful in case of loading files or when accessing a streaming media, such as audio or video (such as a movie). In the latter case, the duration of the video content streamed (and played), such as the movie time length, may be metered, and may be limited to a maximum value. For example, a time duration quota may be equal to, or less than, 2 minutes, 5 minutes, 10 minutes, 20 minutes, 30 minutes, an hour, a day, a week, a month, two months, a quarter (3 month), or a year. Alternatively or in addition, a time duration quota may be more than 1 minute, 2 minutes, 5 minutes, 10 minutes, 20 minutes, 30 minutes, an hour, a day, a week, a month, two months, a quarter (3 month), or a year. In one example, a time duration of the usage may be unlimited, allowing to use the service indefinitely without any timing limitations, during the accounting period (or indefinitely).

While exampled above regarding limiting the customer (during the accounting period or indefinitely) by a cumulative traffic quota or a time duration quota, the two limitations may be applied together. In such a case, the non-direct fetching service is inhibited upon exhausting any of the defined quotas, or until the accounting period is restarted. Similarly, other quotas, limitations, and criterions may be used relating any other resources or features for limiting a non-direct fetching service.

In one example, all the customers of a non-direct fetching service are limited using the same accounting period, the same limiting resources, or the same associated quotas. In another example, each customer of the non-direct fetching service is limited using a distinct and different accounting period, distinct and different limiting resources, and distinct and different associated quotas. Alternatively or in addition, some customers of the non-direct fetching service may be limited using the same accounting period, the same limiting resources, and the same associated quotas, while other customers are limited using a distinct and different accounting period, a distinct and different limiting resources, or distinct and different associated quotas.

A table 470 shown in FIG. 47 illustrates an example of a non-direct fetching service that provide service to 7 customers, each associated with distinct limiting features. As shown in a top row 471, the first column 472*a* identifies the customer, such as by a specific IP address or the respective client device that uses the non-direct fetching service, and a sixth column 472*f* defines the accounting period associated with each customer. A second column 472*b* defines the cumulative traffic quota of the associated customer in the accounting period, and a third column 472*c* stores the actual data usage of the cumulative data at the current accounting period. A fourth column 472*d* defines the time duration quota of the associated customer in the accounting period, and a fifth column 472*e* stores the actual duration used already used at the current accounting period.

As shown in the table 470 in FIG. 47, a second row 471*a* corresponds to a first customer identified by IP #1 that is associated with an accounting period of 1 week, hence each week the customer may use the service up to the defined quotas. The customer at this row 471*a* is limited to use up to 2 GB every week (the accounting period), and currently consumed already 85% of the quota, meaning that this customer already downloaded using the non-direct fetching service 1.7 GB, and may download 0.3 GB more until the end of the current accounting period. Further, the customer at this row 471*a* is limited to use the service up to cumulative use of 2 hours, of which 34% were already used in the current accounting period, meaning that the service for used for a total of 0.68 hours, and may use the service for an additional 1.66 hours until the end of the current accounting period. Similarly, a third row 471*b* corresponds to a second customer identified by IP #2 that is associated with an accounting period of 1 month, hence each month the customer may use the service up to the defined quotas. The customer at this row 471*b* is limited to use up to 1 GB every month (the accounting period), out of which 10% were already used in the current month. Further, the customer at this row 471*b* is limited to use the service up to 3 hours, which were all already used. Since it reached the allocated quota, this customer 471*b* cannot use the service anymore in the current month (the accounting period). Similarly, a fourth row 471*c* corresponds to a third customer identified by IP #3 that is associated with an accounting period of 1 day, hence each day the customer may use the service up to the defined quotas. The customer at this row 471*c* is limited to use up to 5 GB every day (the accounting period), out of which 100% were already used in the current day. Since it reached in full the allocated quota, this customer 471*c* cannot use the service anymore in the current day (the accounting period). Further, the customer at this row 471*c* is limited to use the service up to 23 hours a day, out of which 23% were already used in the current day.

A fifth row 471*d* corresponds to a fourth customer identified by IP #4 that is associated with an accounting period of 12 hours, hence each half day the customer may use the service up to the defined quotas. The customer at this row 471*d* is limited to use up to 0.5 GB every half day (the accounting period), out of which 0% were already used in the current half day. Further, this customer at this row 471*d* is limited to use the service up to 30 minutes every half day, out of which 0% were already used in the current day. The fact that 0% have been consumed in both the cumulative data and time duration suggests that this customer having IP #4 is either a new customer that just registered to the service, or alternatively that the accounting period for this customer just began, hence the whole quotas are available for use.

A sixth row 471*e* corresponds to a fifth customer identified by IP #5 that is associated with an accounting period of 1 month, hence each month the customer may use the service up to the defined quotas. The customer at this row 471*e* is limited to use up to 5 GB every month (the accounting period), out of which 4% were already used in the current month. Further, this customer at this row 471*e* is not limited in duration, and thus may use the service as long as it requires, as long as the cumulative traffic quota of the 5 GB is not exceeded. Similarly, a seventh row 471*f* corresponds to a sixth customer identified by IP #6 that is associated with an accounting period of 1 week, hence each week the customer may use the service up to the defined quotas. The customer at this row 471*f* is limited to use the service not longer than 1 hour in the 1 week accounting period, out of which 35% of the time is already used in the current week. Further, this customer at this row 471*f* is not limited in the cumulative received data, and thus may download content by using the service as long as it requires, as long as the cumulative duration time quota of the 1 hour is not exceeded. An eighth row 471*g* corresponds to a seventh customer identified by IP #7 that is associated with an accounting period of 2 days. The customer at this row 471*g* is limited to use up to 2 GB every 2 days (the accounting period), out of which 92% were already used in the current accounting period. Further, this customer at this row 471*g* is limited to use the service up to 45 minutes every 2 days, out of which 92% were already used in the 2 days accounting period.

The table 470 shown in FIG. 47 illustrates an example of seven customers, where each customer is associated with a different profile of limitations or quotas of a non-direct fetching service. Alternatively or in addition, the limitations or quotas of a non-direct fetching service may be different not based on the specific customer, but based on the content that is fetched using the non-direct fetching service. For example, a streaming content (such as audio or video) may be associated with different limitations or quotas. Similarly, the web server locations (from which content is fetched) or the mechanism of the non-direct fetching (such as locations of the intermediate devices) may also be used as a parameter or factor for different limitations or quotas when using the non-direct fetching service.

A table 480 shown in FIG. 48 is an example of associating limitations or quotas per each URL for 6 URLs, each associated with distinct limiting features. As shown in a first row 481, a first column 482*a* identifies the URL that identifies the content to be fetched, and the associated accounting period for each URL is shown in a sixth column 482*f*. Similar to the table 470, a second column 482*b* defines the cumulative traffic quota from the associated URL in the accounting period, and a third column 482*c* stores the actual data usage of the cumulative data at the current accounting period. A fourth column 482*d* defines the time duration quota of the associated URL in the accounting period, and a fifth column 482*e* stores the actual duration used already used at the current accounting period.

As shown in the table 480 in FIG. 48, a second row 481*a* corresponds to a first URL identified by URL #1 that is associated with an accounting period of 1 month, hence each month a customer may access content from the associated URL #1 web server up to the defined quotas. Downloading from the URL #1 associated with this row 481*a* is limited to use up to 3 GB every month (the accounting period), and currently consumed already 91% of the quota. Further, downloading from the URL #1 at this row 481*a* is limited to use the service up to cumulative use of 2 hours, of which 41% were already used in the current accounting period. Similarly, a third row 481*b* corresponds to a second URL identified by URL #2 that is associated with an accounting period of 1 week, hence each week this URL #2 may be accessed via the service up to the defined quotas. The customer may load data from the URL #2 at this row 481*b* but is limited to use up to 0.5 GB every week (the accounting period), out of which no data was yet used (0%) in the current week. Further, the URL #2 at this row 481*b* is limited to be used via the service up to 3 hours, none of which was yet used. Similarly, a fourth row 481*c* corresponds to a third URL identified by URL #3 that is associated with an accounting period of 12 hours, hence each half day the customer may access this URL #3 up to the defined quotas. The customer at this row 481*c* is limited to use up to 4 GB every 12 hours (the accounting period), out of which 100% were already used in the current day. Since it reached in full the allocated quota, this customer may not access URL #3 481*c* anymore in the current half day (the accounting period). Further, the customer access to the URL #3 at this row 481_c_ is limited to use up to 3 hours every 12 hours (the accounting period), out of which 23% were already used in the current half day.

Further, a fifth row 481_d_ corresponds to a third URL identified by URL #4 that is associated with an accounting period of 1 day (24 hours), hence each day the customer may access this URL #4 up to the defined quotas. The customer accessing URL #4 at this row 481_d_ is limited to use up to 0.2 GB every 24 hours (the accounting period), out of which none (0%) were already used in the current day. Furthermore, the customer access to the URL #4 at this row 481_d_ is not limited by any duration quota.

Similarly, a sixth row 481_e_ and a seventh row 481_f_ respectively corresponds to a fifth URL #5 and sixth URL #6, which are respectively associated with accounting periods of 1 month and 2 days. Further, access to the fifth URL #5 and the sixth URL #6 is respectively limited to cumulative traffic data of 6 GB and 2.5 GB, out of which 3% and 12% are respectively loaded as part of the respective accounting period. Furthermore, access to the fifth URL #5 and the sixth URL #6 is respectively limited to duration quotas of 30 minutes and 1 hour, out of which 10% and 100% are respectively used as part of the respective accounting period.

While the table 480 in FIG. 48 exampled 6 distinct URLs, any number of URLs may be equally employed. Such a table may comprise, or may consist of, at least 2, 3, 4, 5, 8, 10, 20, 30, 50, 80, 100, 120, 150, 200, 300, 500, 1,000, 2,000, 3,000, 5,000, 10,000, 20,000, 30,000, 50,000, or 100,000 distinct URLs. Alternatively or in addition, Such a table may comprise, or may consist of, less than 3, 4, 5, 8, 10, 20, 30, 50, 80, 100, 120, 150, 200, 300, 500, 1,000, 2,000, 3,000, 5,000, 10,000, 20,000, 30,000, 50,000, 100,000 or 200,000 distinct URLs.

In one example, the limitations on basis of URLs, as exampled in the table 480, may be shared by all customers that use the non-direct fetching service. Alternatively, the same URL limitations may be shared by few or most of the customers that use the non-direct fetching service. Alternatively or in addition, each customer may be associated with a distinct URL limitation table. Such limitations may be in addition to the global per customer limitation as exampled in the table 470 in FIG. 47. For example, the table 480 may be associated with the customer in the fourth row having IP #3 471_c_, while a different table, having different limitations, may be associated with the customer in the eighth row having IP #6 471_f_. Further, some customers may be associated only global limitations (not URL related), while other may be associated with per-URL limitations.

A customers limitation table, such as the example of the table 470, may be stored and updated in the server that is used for the non-direct fetching service, such as the Proxy Server 53, the DC Proxy Server 56, the Acceleration Server 32, the SP Server 72, or the TB server 71, or may be stored in a separate server, such as a server used only for managing the server. Alternatively or in addition, such table may be stored in the client device 31_a_ used by a customer to access and use the non-direct fetching service. Alternatively or in addition, each such client device 31_a_ only stores and update only the information that is relevant to itself. For example, the client device that is associated with the IP #2 in the table 470, stores only the row 471_b_ with the relevant limitations to its own operation.

Similarly, a URL-based limitation table, such as the example of the table 480, may be stored and updated in the server that is used for the non-direct fetching service, such as the Proxy Server 53, the DC Proxy Server 56, the Acceleration Server 32, the SP Server 72, or the TB server 71, or may be stored in a separate server, such as a server used only for managing the server. Alternatively or in addition, such a table may be stored in the client device 31_a_ used by a customer to access and use the non-direct fetching service. Alternatively or in addition, each such client device 31_a_ only stores and update only the information that is relevant to itself. For example, the client device that is associated with the IP #3 in the table 470, stores only the table 480 with the relevant limitations to its own operation, while the client device that is associated with the IP #7 in the table 470, may store only the table 480_a_ with the relevant limitations only to its own operation.

Figure 49:
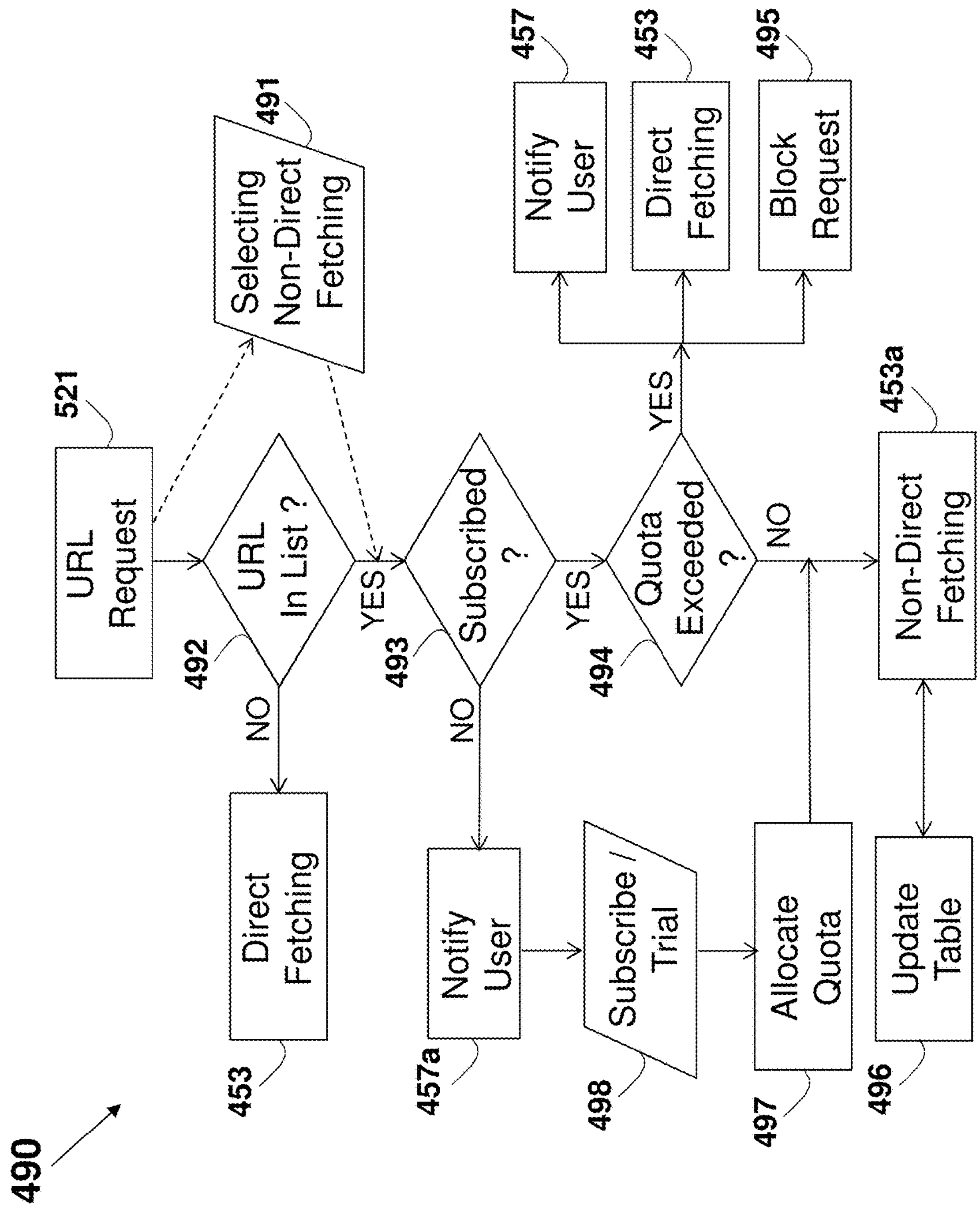
FIG. 49 illustrates schematically a simplified flowchart relating to updating and handling of quotas and utilizations when using a non-direct fetching service.

An example of a flow chart 490 for handling and management of the various limitations and quotas is shown in FIG. 49. The flow chart 490 is explained herein by using the per customer table example 470 and the per URL table example 480. A request for a specific URL is identified as part of a "URL Request" step 521. In some examples, there is a list of URLs that are candidates for a non-direct fetching service, while others may be fetched using a direct fetching. As part of a "URL In List?" step 492, the URL that was identified as part of the "URL Request" step 521 is checked as a candidate for direct fetching. For example, a table, such as table 510 shown in FIG. 39, may be used for associating a URL to a direct or non-direct fetching. Similarly, a table such as the table 480 may be used also for determining the handling of the requested URL, where in case the URL is part of the table 480 (in the column "URL Request" 482_a_), then a non-direct fetching service is to be used for fetching the requested URL. In the case it is determined that non-direct fetching is not required, the URL is fetched using a direct fetching as part of a "Direct Fetching" step 453. In some cases, a customer may want to force a non-direct fetching for the requested URL, as illustrated in a "Selecting Non-Direct Fetching" step 491, hence a non-direct fetching scheme is to be used for such URL.

As part of a "Subscribed?" step 493, the eligibility of the customer to use a non-direct fetching service is checked. In the case the customer, such as based on checking that the IP address of the requesting client device is included in subscribers list, or is included in the table 470 (as part of the "Customer IP" column 472_a_), then the operation proceeds to the "Non-Direct Fetching" step 453_a_ for employing the non-direct fetching service for retrieving the requested URL. In the case where it is determined that the customer is not entitled to use the non-direct fetching service, the customer is notified as part of a "Notify User" step 457_a_. In one example, the customer is provided the option to join the service either as a subscriber (recurring payments and accounting period), or to join for a trial period (no payment, a single non-recurring account period). In the case the user selects to join the service as part of "Subscribe/Trial" step 498, a quota is allocated to this customer as part of an "Allocate Quota" step 497, followed by employing the non-direct fetching service for retrieving the requested URL as part of the "Non-Direct Fetching" step 453_a_. The limitations and quotas allocated may be based on selecting trial versus full subscription, and in case of full subscription, the specific subscription plan selected.

As part of employing the non-direct fetching service before retrieving the requested URL as part of the "Non-Direct Fetching" step 453_a_, the limitations and quotas for the specific customer are selected by using the table 470, and according to the specific URL by using the table 480, as part of a "Quota Exceeded?" step 494. In case no quota was reached, then the requested URL is fetched using non-direct fetching service as part of the "Non-Direct Fetching" step 453*a*. In parallel to the fetching, or alternatively after the fetching is completed, the parameters, features, or characteristics associated with the limitations or quotas are monitored, metered, and the tables are accordingly updated as part an "Update Table" step 496. For example, assuming the customer is associated with IP #2 corresponding to the row 471*b* in the table 470, and assuming the cumulative data fetched as part of the non-direct fetching for the requested URL is 0.5 GB, then the total cumulative received data is 0.6 GB (former 0.1 GB and the additional current 0.5 GB), rendering the total data usage (as shown in the respective Data Usage column 472*c*) from 10% to 60%, and the table 470 are accordingly updated. Similarly, in case the fetched URL is URL #2 that corresponds to the row 481*b* of the table 480, and the usage duration was 1 hours, such as for streaming a movie, then the respective Duration Usage shown in column 482*e* is updated from 0% to 33% (1 hours out of the 3 hours quota).

In the case where it is determined, before starting using the service as part of the "Non-Direct Fetching" step 453*a*, during the service using, or afterwards, that the quota for the specific customer or for the specific URL is exhausted, then the customer is prevented from starting or continuing using the non-direct fetching service, and the request is blocked as part of a "Block Request" step 495. In such as case, a direct fetching may be tried, as an alternative to a non-direct one, as part of the "Direct Fetching" step 453. Further, an appropriate message may be displayed to the customer as part of a "Notify User" step 457.

As explained herein, in order to overcome blocking or in order to improve performance, it may be beneficial to use an intermediate device when a client device accesses a web server for retrieving web page (or web-site) therefrom. The intermediate device may be a server (such as the proxy server 53 shown in FIG. 5*b*), or a client device, such as the client device in the arrangement 60*a* shown in FIG. 6*a*, which serves as a tunnel #2 33*b* that is an intermediate device between the requesting client #1 31*a* and the web server 22*a*. In some cases, better performance is obtained when the intermediate device is in a country (or other geographical location) that is different from the country of the web server from which the URL is to be fetched. In time, there may be an accumulated experience regarding for a web server in a specific country, which country serves as a best (or better) location for an intermediate device. For example, when requesting content from a web site in one country, experience may show that using an intermediate device in a specific country (which is typically different from the web server location) is constantly or in most times better than other alternatives. For example, a specific country may be found to be better by means of less failures to fetch the content, higher bandwidth (BW), lower or Round-Trip delay Time (RTT) or delay, or any other quality or quantity criterion relating to the fetching or a web-page or a web-site. By accumulating such feedback from multiple customers, a reliable metrics may be formed, suggesting best (or better) location for an intermediate device based on the web server country (or other location).

An accumulated experience regarding a preferred country when accessing another country is exampled in a table 451 shown as part of a view 450 in FIG. 45. A first column 452*a* shows the country in which the web server from which content was retrieved is located, a second column 452*b* shows the country in which an intermediary device (such as a tunnel device) is located when fetching data from the country in which the web server 452*a*, and a third column 452*c* shows the count of occasions when the tunnel country 452*b* was chosen when fetching data from the web server location 452*a*. As shown in a first row 451*a*, users selected the US as a country for the intermediate device 325 times when fetching content from a web server located in China, as shown in a second row 451*b*, users used the UK as a country for the intermediate device 120 times when fetching content from a web server located in China, as shown in a third row 451*c*, users selected Argentina as a country for the intermediate device 35 times when fetching content from a web server located in China, as shown in a fourth row 451*d*, users selected Brazil as a country for the intermediate device 30 times when fetching content from a web server located in China, and as shown in a fifth row 451*e*, users selected Bulgaria as a country for the intermediate device 3 times when fetching content from a web server located in China. Clearly the accumulated experience suggests that when fetching content from a web server that is located at China, it is preferred to select an intermediate device located in the US.

Similarly, as shown in a sixth row 451*f*, users selected Egypt as a country for the intermediate device 950 times when fetching content from a web server located in Hungary, as shown in a seventh row 451*g*, users used Lebanon as a country for the intermediate device 82 times when fetching content from a web server located in Hungary, as shown in a eighth row 451*h*, users selected Spain as a country for the intermediate device 33 times when fetching content from a web server located in Hungary, and as shown in a ninth row 451*i*, users selected Germany as a country for the intermediate device 14 times when fetching content from a web server located in Hungary. Clearly the accumulated experience suggests that when fetching content from a web server that is located at Hungary, it is preferred to select an intermediate device located in Egypt.

Similarly, as shown in a tenth row 451*j*, users selected UK as a country for the intermediate device 157 times when fetching content from a web server located in Israel, as shown in a eleventh row 451*k*, users used Australia as a country for the intermediate device 49 times when fetching content from a web server located in Israel, as shown in a twelfth row 451*l*, users selected U.S. as a country for the intermediate device 34 times when fetching content from a web server located in Israel, and as shown in a thirteenth row 451*m*, users selected Germany as a country for the intermediate device 9 times when fetching content from a web server located in Israel. Clearly the accumulated experience suggests that when fetching content from a web server that is located at Israel, it is preferred to select an intermediate device located in the UK.

In one example, the table 451 is a global table, summarizing the 'crowdsourcing' results of the various users, only based on the locations of the web servers and the intermediate devices, but irrespective of any other parameter. Alternatively or in addition, such a table 451 may be built for each URL that was fetched. For example, different URLs may be found to provide better results when using different intermediate devices locations, even when the web server is located in the same country. For example, a table such as table 451 may be used for each individual URL. A list 455 of URLs is shown in FIG. 45, and includes URL #1 454*a*, URL #2 454*b*, URL #3 454*c*, URL #4 454*d*, URL #5 454*e*, and URL #6 454*f*. Each of the URLs may be related to a separate table. In the example of the view 450, the table 451 relates only to the URL #4 454*d*, and other tables are available, one for each of the URLs.

While the view 450 in FIG. 45 summarizes the customers experience of selection of an intermediate device location relating to the web server location, similar summary may be applied regarding the customers experience of selection of an intermediate device location relating to the customer location. Such a summarizing table 451*a* is exampled as part of a view 450*a* shown in FIG. 45*a*. The table 451*a* may be of the same content and structure, with the exception that the first column 452*d* details the customer country and not the web server location.

Figure 46:
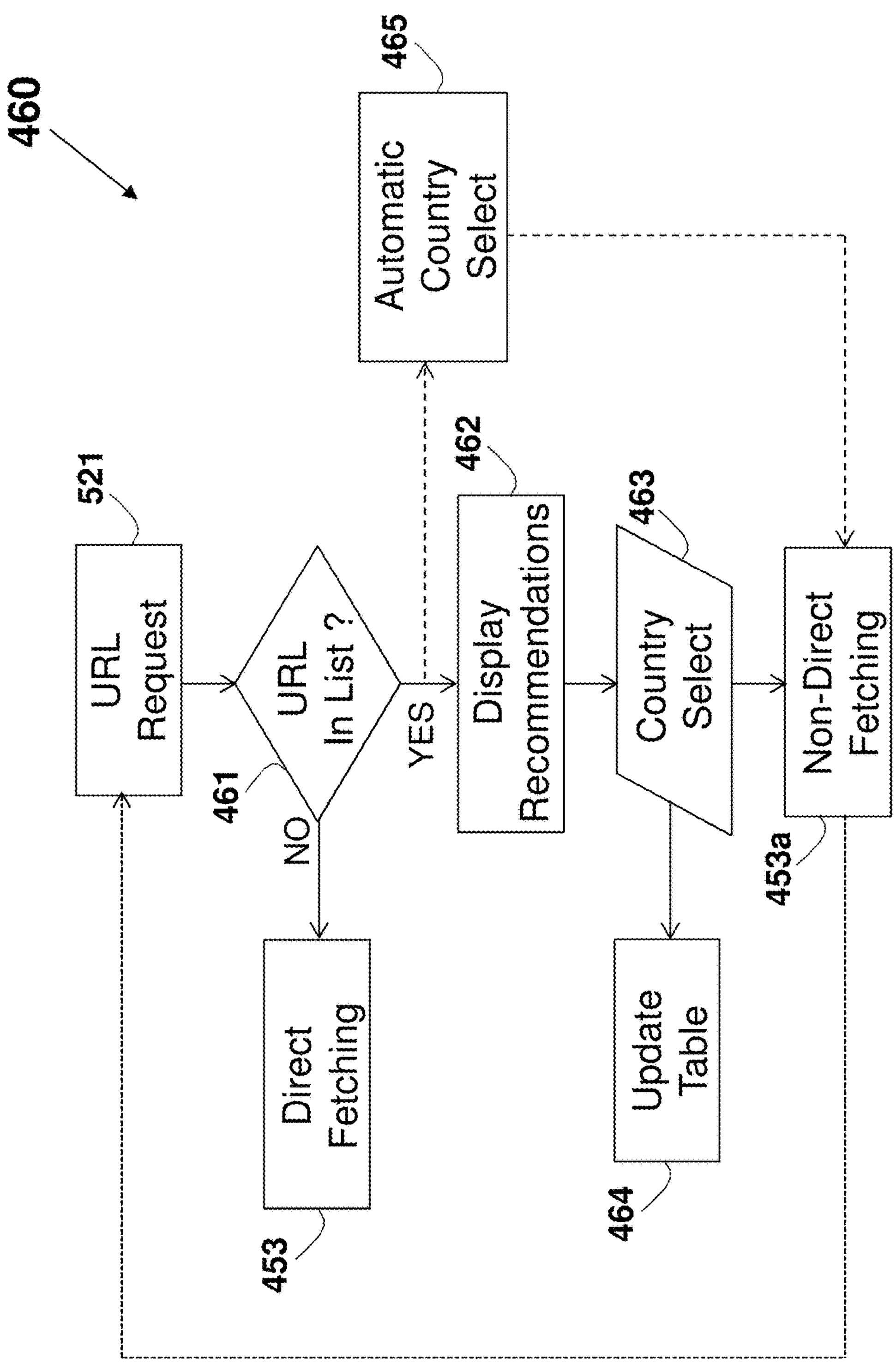
FIG. 46 illustrates schematically a simplified flowchart relating to updating, selecting, and using former counts of selecting intermediate devices locations.

Using and updating the table 451 shown in FIG. 45 (or the table 451*a* shown in FIG. 45*a*) is illustrated in a flow chart 460 shown in FIG. 46. A URL request is identified as part of a "URL Request" step 521. Since typically not all URLs requires a use of a non-direct fetching service or scheme, the first step is to check, as part of a "URL In List?" step 461 is the URL is included in a list (such as the URLs list 455) and as such it is suggested or required to use a non-direct fetching scheme. In the case it is determined that non-direct fetching scheme is not required, a normal direct fetching is performed as part of the "Direct Fetching" step 453. In the case where it is recommended or required to use anon-direct fetching scheme, an IP geolocation is used for determining the location (such as a country) in which the web server associated with the requested URL is located. The determined web server location is used with a table, such as the table 451, to check which location works best, based on prior customers selection, for the determined location (and maybe also for the specific URL). As part of a "Display Recommendations" step 462, the preferred intermediate device locations are presented to the client device user to select from. For example, in case where the web server location is determined to be China, and assuming 3 alternatives are to be displayed as part of the "Display Recommendations" step 462, the three locations to be presented are US (United States), UK, and Argentina, since these locations are associated with the most frequent locations used by customers, hence assumed to be the best to use. Assuming only 2 alternatives are to be displayed as part of the "Display Recommendations" step 462, then the two locations to be presented are US and UK, and similarly only the US may be displayed as suggestion. Alternatively or in addition, the displayed recommendation may be selected based on the customer location, using the table 451*a* shown in FIG. 45*a*.

As part of a "Country Select" step 463, the user of the client device selects a country to use as the location of the intermediary device. In the above example, where the web server location is determined to be China, and assuming 3 alternatives are to be displayed as part of the "Display Recommendations" step 462, the three locations are presented are US, UK, and Argentina, and the user may select one of these countries. Such selection may cause to update the table 451 as part of an "Update Table" step 464. In the above example, in case the user selects to use UK (United Kingdom) as the intermediary device country, the count as part of the usage Counter column 452*c* is updated from 120 to 121, marking the addition of a selection of the UK. Then, as part of the "Non-Direct Fetching" step 453*a*, the requested URL is fetched using non-direct fetching, using an intermediary device that is located in the selected country—UK. It is noted that while the tables 451 and 451*a* were exampled using countries, any other geographical location or partition may be equally used, such as state, region, city, postal/zip code, latitude, longitude, or Timezone.

The selection of the location of the intermediary device was described above as requiring interaction of the user of the client device, such as displaying to the user as part of the "Display Recommendations" step 462 and receiving the user selection input as part of the "Country Select" step 463. Alternatively or in addition, such selection may be made automatically without any user or any other human intervention. Such scheme is shown as dashed lines in the flow chart 460, as part of an "Automatic Country Select" step 465. For example, the most selected location may be automatically selected, without any input from any human being. In the above example, in case where the web server location is determined to be China, the US (United States) will be automatically selected as part of the "Automatic Country Select" step 465, since it is associated with the maximum number of selections—325.

Each of the devices denoted herein as servers, such as the proxy server 53, the DC proxy server 56, the SP server 72, the TB server 71, the web server 22*b*, or the dedicated tunnel 33*a* (when implemented as a server), may function as a server in the meaning of client/server architecture, providing services, functionalities, and resources, to other devices (clients), commonly in response to the clients' request. Each of the server devices may further employ, store, integrate, or operate a server-oriented operating system, such as the Microsoft Windows Server® (2003 R2, 2008, 2008 R2, 2012, or 2012 R2 variant), Linux™ (or GNU/Linux) variants (such as Debian based: Debian GNU/Linux, Debian GNU/kFreeBSD, or Debian GNU/Hurd, Fedora™, Gentoo™, Linspire™, Mandriva, Red Hat® Linux available from Red Hat, Inc. headquartered in Raleigh, North Carolina, U.S.A., Slackware®, SuSE, or Ubuntu®), or UNIX®, including commercial UNIX® variants such as Solaris™ (available from Oracle Corporation headquartered in Redwood City, California, U.S.A.), AIX® (available from IBM Corporation headquartered in Armonk, New York, U.S.A.), or Mac™ OS X (available from Apple Inc. headquartered in Cupertino, California, U.S.A.), or free variants such as FreeBSD®, OpenBSD, and NetBSD®. Alternatively or in addition, each of the devices denoted herein as servers, may equally function as a client in the meaning of client/server architecture.

Devices that are not denoted herein as servers, such as client devices (such as the client device 31*a*) or any of the tunnel devices (including the dedicated tunnel 33*a* when implemented as a server), may typically function as a client in the meaning of client/server architecture, commonly initiating requests for receiving services, functionalities, and resources, from other devices (servers or clients). Each of the these devices may further employ, store, integrate, or operate a client-oriented (or end-point dedicated) operating system, such as Microsoft Windows® (including the variants: Windows 7, Windows XP, Windows 8, and Windows 8.1, available from Microsoft Corporation, headquartered in Redmond, Washington, U.S.A.), Linux, and Google Chrome OS available from Google Inc. headquartered in Mountain View, California, U.S.A. Further, each of the these devices may further employ, store, integrate, or operate a mobile operating system such as Android (available from Google Inc. and includes variants such as version 2.2 (Froyo), version 2.3 (Gingerbread), version 4.0 (Ice Cream Sandwich), Version 4.2 (Jelly Bean), and version 4.4 (KitKat), iOS (available from Apple Inc., and includes variants such as versions 3-7), Windows® Phone (available from Microsoft Corporation and includes variants such as version 7, version 8, or version 9), or Blackberry® operating system (available from BlackBerry Ltd., headquartered in Waterloo, Ontario, Canada). Alternatively or in addition, each of the devices that are not denoted herein as servers, may equally function as a server in the meaning of client/server architecture.

Figure 16A:
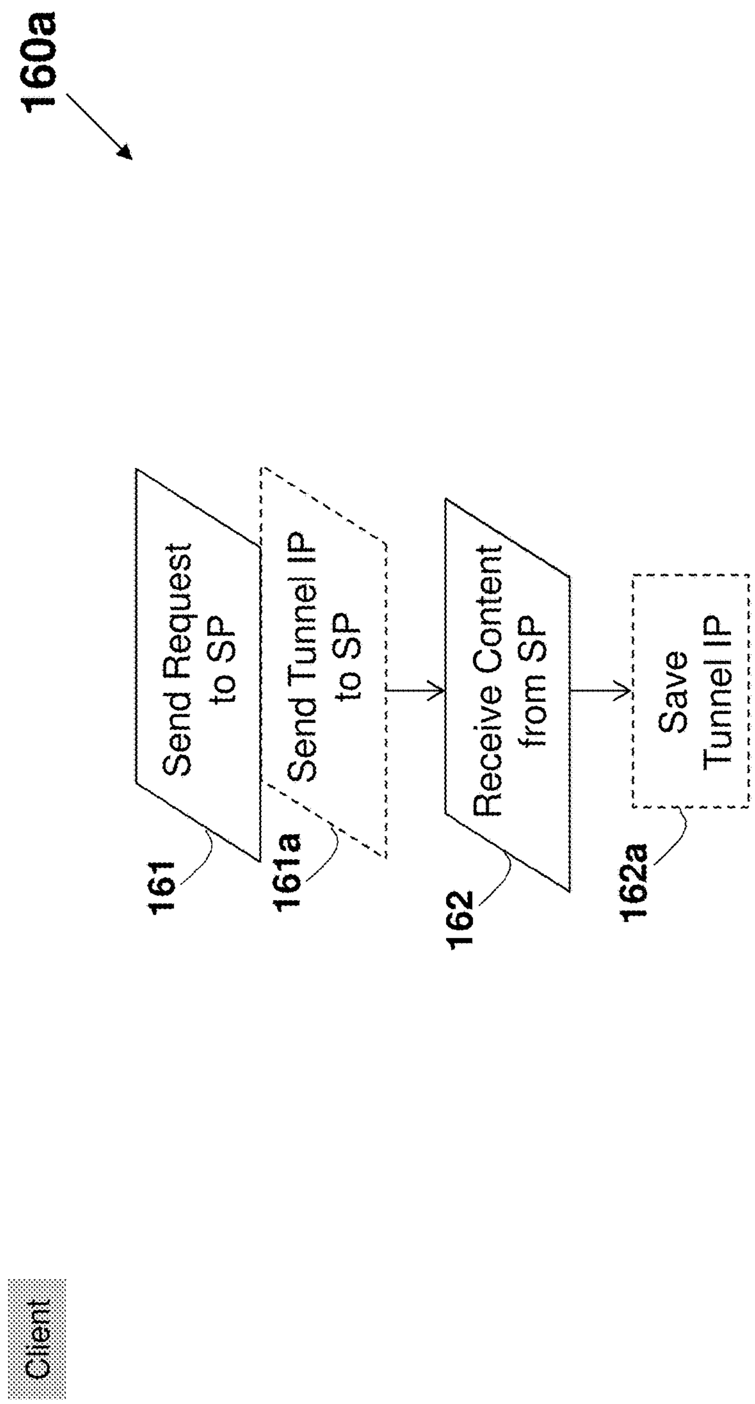

The method and system described herein allows for a client device (such as the client device 31*a* operation described in the flow chart 160 in FIG. 16 or the flow chart 160*a* in FIG. 16*a*) to effectively fetch content from a data server (such as the web server 22*b*). The method and system may be used by the client device for supporting an application, such as a web browser application, when the application is requesting content from the Internet in general, and from a data server in particular. The request for Internet-related content may be intercepted by the 'client' application and process, initiating the client flowchart 160 shown in FIG. 16, or the flowchart 160*a* shown in FIG. 16*a*. In one example, the client device uses a communication-related application to be used by the application when no 'client' application is present, such as HTTP stack handling application. The request from the requesting application to the communication-related application is intercepted and routed to be handled as part of the 'client' application or process. Such interception may be in the form of a filter driver (or any other intermediate driver), enabling the interception as part of the OS kernel. Alternatively or in addition, the interception may be in the form of extension or a plug-in of the requesting application, such as a browser plug-in or a browser extension in the case where the application is a web browser. Alternatively or in addition, the interception of the request may use hooking of the requesting application or of the communication-related application. Alternatively or in addition, the application and the steps described herein may communicate using an Inter-Process Communication (IPC), such as a file sharing, a signal, a socket, a pipe, a message queue, a shared memory, a semaphore, or memory mapped file. In Windows environment, the IPC may be based on a clipboard, a Component Object Model (COM), a data copy, a DDE protocol, or mailslots.

Examples of web browsers include Microsoft Internet Explorer (available from Microsoft Corporation, headquartered in Redmond, Washington, U.S.A.), Google Chrome which is a freeware web browser (developed by Google, headquartered in Googleplex, Mountain View, California, U.S.A.), Opera™ (developed by Opera Software ASA, headquartered in Oslo, Norway), and Mozilla Firefox® (developed by Mozilla Corporation headquartered in Mountain View, California, U.S.A.). The web-browser may be a mobile browser, such as Safari (developed by Apple Inc. headquartered in Apple Campus, Cupertino, California, U.S.A), Opera Mini™ (developed by Opera Software ASA, headquartered in Oslo, Norway), and Android web browser.

Any communication between any two nodes may use the Socket Secure (SOCKS), WebSocket (ws), which may be WebSocket Secure (wss), or HTTP Proxy protocol. Further, any communication between any two nodes may use the HTTP or HTTPS protocol. In one example, a communication between the client device 31*a* or any tunnel device (such as the tunnel #1 33*a*, the tunnel #2 33*b*, the tunnel #3 33*c*, the tunnel #4 33*d*, or the tunnel #5 33*e*) and any server, such as the TB server 71, the SP server 72, or the Web Server 22*b*, may use the SOCKS, WebSocket or HTTP Proxy protocol, wherein the respective device, such as the client device 31*a* or the tunnel device, executes the respective SOCKS, WebSocket or HTTP Proxy client side protocol, and the respective server executes the respective SOCKS, WebSocket or HTTP Proxy server side protocol. Alternatively or in addition, the respective device, such as the client device 31*a* or the tunnel device, executes the respective SOCKS, WebSocket or HTTP Proxy server side protocol, and the respective server executes the respective SOCKS, WebSocket or HTTP Proxy client side protocol. Further, a communication between the client device 31*a* or any tunnel device (such as the tunnel #1 33*a*, the tunnel #2 33*b*, the tunnel #3 33*c*, the tunnel #4 33*d*, or the tunnel #5 33*e*) and any server, such as the TB server 71, the SP server 72, or the Web Server 22*b*, may use the HTTP (or HTTPS) protocol, wherein the respective device, such as the client device 31*a* or the tunnel device, executes the HTTP (or HTTPS) client side protocol, and the respective server executes the HTTP (or HTTPS) server side protocol. Alternatively or in addition, the respective device, such as the client device 31*a* or the tunnel device, executes the HTTP (or HTTPS) server side protocol, and the respective server executes the HTTP (or HTTPS) client side protocol.

The term 'network element' (or 'element') or 'network node' (or 'node') is used herein to include, but not limited to, the client device 31*a*, a tunnel device (such as the tunnel device #1 33*a*), the proxy server 53, the DC proxy server 56, the SP server 72, the TB server 71, or a web server (such as the web server #1 22*a*). Any memory, storage, database, or cache mentioned herein may consist of, comprise, use, or be included in, the local cache as described in U.S. Pat. No. 8,135,912 to Shribman et al., entitled: "System and Method of Increasing Cache Size".

Any device, component, or apparatus herein, may be structured as, may be shaped or configured to serve as, or may be integrated with, a wearable device. In one example, any one or more of the tunnel devices herein, such as the tunnel device #1 33*a*, the tunnel device #2 33*b*, or the tunnel device #3 33*c*, may consist of, may comprise, may be integrated with, or may be part of, a wearable device. Similarly, any one or more of the client devices herein, such as the client device #1 31*a*, or the client device #2 31*b*, may consist of, may comprise, may be integrated with, or may be part of, a wearable device. Any wearable device or any apparatus or device herein may be wearable on an organ such as on the person head, and the organ may be eye, ear, face, cheek, nose, mouth, lip, forehead, or chin. Alternatively or in addition, wearable device or any apparatus or device herein may be constructed to have a form substantially similar to, may be constructed to have a shape allowing mounting or wearing identical or similar to, or may be constructed to have a form to at least in part substitute for, headwear, eyewear, or earpiece. Any headwear herein may consist of, may be structured as, or may comprise, a bonnet, a headband, a cap, a crown, a fillet, a hair cover, a hat, a helmet, a hood, a mask, a turban, a veil, or a wig. Any eyewear herein may consist of, may be structured as, or may comprise, glasses, sunglasses, a contact lens, a blindfold, or a goggle. Any earpiece herein may consist of, may be structured as, or may comprise, a hearing aid, a headphone, a headset, or an earplug. Alternatively or in addition, any enclosure herein may be permanently or releaseably attachable to, or may be part of, a clothing piece of a person. The attaching may use taping, gluing, pinning, enclosing, encapsulating, a pin, or a latch and hook clip, and the clothing piece may be a top, bottom, or full-body underwear, or a headwear, a footwear, an accessory, an outwear, a suit, a dress, a skirt, or a top.

Any system or device herein may use a virtualization. Any system or device herein may further comprise a Virtual Machine (VM) executing a virtualized application. Any device herein, or any part thereof, such as the client device, the web server, at least one of the tunnel devices, the first server, or the second server, may be implemented as virtual hardware as part of the VM. At least one of any action or step herein by any device may be executed as part of the virtualized application.

Any network herein may be used with a virtualization, and any network herein may be executed as a virtualized network as part of a Virtual Machine (VM). The virtualization may be implemented by a host computer that may implement the VM, and any method herein may further comprise executing, by the host computer, a hypervisor or a Virtual Machine Monitor (VMM), and the virtualized may use or interface virtual hardware. Any virtualization herein may include, may be based on, or may use, full virtualization, para-virtualization, or hardware assisted virtualization. For example, any communication between two entities selected from a group consisting of the client device, the web server, at least one of the multiple tunnel devices, the first server, and the second server, may be executed as a virtualized network as part of a Virtual Machine (VM).

Any method herein, any step herein, any flow-chart herein, or any part thereof, may be used with a virtualization, and at least one of the steps or methods herein may be executed as part of a virtualized application as part of a Virtual Machine (VM). Any device herein, such as the analyzer device, the first device, or any part thereof, may be implemented as virtual hardware. Any virtualization herein may be used with an host computer that implement the VM, and may further comprising executing, by the host computer, a hypervisor or a Virtual Machine Monitor (VMM). Any virtualized application herein or any or hardware virtualization herein may use or may interface virtual hardware. Any virtualization herein may include, may be based on, or may use, full virtualization, para-virtualization, or hardware assisted virtualization.

Any operating system herein may be used with a virtualization, and any operating system herein may be executed as a guest operating system as part of a Virtual Machine (VM). The virtualization may be implemented by a host computer that may implement the VM, and any method herein may further comprise executing, by the host computer, a hypervisor or a Virtual Machine Monitor (VMM), and the guest operating system may use or interface virtual hardware. Any such virtualization herein may include, may be based on, or may use, full virtualization, para-virtualization, or hardware assisted virtualization.

Any element or entity herein, such as the client device, the web server, at least one of the multiple tunnel devices, the first server, and the second server, may be implemented as virtualized entity. Any virtualization may include, may be based on, or may use, desktop virtualization, network virtualization, storage virtualization, application virtualization, server virtualization, or any combination thereof. Further, any virtualization herein may include, may be based on, or may use, full virtualization, para-virtualization, or hardware assisted virtualization. Further, any virtualization herein may include, may be based on, or may use, a Virtual Machine (VM) on a host computer that executes a hypervisor or Virtual Machine Monitor (VMM), and the operating system may be a guest operating system that may use or interface a virtual hardware.

Any method herein may be used with a virtualization, where at least one of the steps may be executed as part of a virtualized application as part of a Virtual Machine (VM). Alternatively or in addition, the client device or any part thereof, the web server or any part thereof, at least one of the multiple tunnel devices or any part thereof, the first server or any part thereof, or the second server or any part thereof, may be implemented as virtual hardware. Further, any method herein may be used with a host computer that may implement the VM, and any method herein may further comprise executing, by the host computer, a hypervisor or a Virtual Machine Monitor (VMM), and any virtualized application herein or any hardware herein may use or may interface virtual hardware. Any virtualization herein may include, may be based on, or may uses, full virtualization, para-virtualization, or hardware assisted virtualization. At least two devices that may be selected from a group consisting of the client device, the web server, at least one of the multiple tunnel devices, the first server, and the second server, may be implemented as virtual hardware, and the at least two devices may be virtualized by the same host computer that implements the VM.

The steps described herein may be sequential, and performed in the described order. For example, in a case where a step is performed in response to another step, or upon completion of another step, the steps are executed one after the other. However, in case where two or more steps are not explicitly described as being sequentially executed, these steps may be executed in any order, or may be simultaneously performed. Two or more steps may be executed by two different network elements, or in the same network element, and may be executed in parallel using multiprocessing or multitasking.

As used herein, the term "parallel" in the content of two time periods means that the two time periods are at least partly overlapping. In the content of parallel executing of actions, operations, or activities (such as processes, tasks, or transfers), the term "parallel" means the time periods associated with the actions or activities, are at least partly overlapping. For example, parallel actions may include a case where a second action is initiated before the first action is completed. Any parallel action, activity, or operation herein may use multitasking or multiprocessing, or otherwise using common or separate processing resources. Any parallel executing of actions, operations, or activities may be independent or dependent, such as by using shared resources. A time period of an action, operation, or activity starts when the action or activity is initiated, and ends when the action, operation, or activity is completed. In one example, the completion is defined by an event, action, or occurrence that is responsive to the action, operation, or activity. For example, a content fetching action may be completed when the content request is transmitted to the Internet by the requesting device, when the content request reaches or is received by another device, or when the requested content (or a failure status response) is received by the requesting device.

For example, any two actions or steps of sending, any two actions or steps of receiving, any two actions or steps of selecting, any two actions or steps of processing, or any combination thereof, may be performed in full or in part in parallel by the same entity (e.g., server, client, or tunnel) or separated entities, using multitasking or multiprocessing. Similarly, any steps of sending and receiving, sending and selecting, sending and processing, receiving and selecting, receiving and processing, or any combination thereof, may be performed in full or in part in parallel by the same entity (e.g., server, client, or tunnel) or separated entities, using multitasking or multiprocessing. The term 'sequential' herein means not in parallel, such as when two time periods are not overlapping, but rather follow each other without any overlapping.

Any selecting of an element (or multiple elements) from a collection or a group of elements herein, such as the selecting of a tunnel device (for example, by selecting its associated IP address) as part of the "Tunnel Selection" step 83 shown as part of the flow chart 80 or the "Select Tunnel" step 146 shown as part of the flow chart 140*b*, as well as part of a "Select Tunnel From Group" step 146*a*, may be based on random, quazi-random, or deterministic selection. Similarly, the selection of a sub-group or a label (such as VIP label) may be based on random, quazi-random, or deterministic selection. Similarly, in case of availability of multiple proxy servers such as the proxy server 53, the selection of the proxy server to use may be based on random, quazi-random, or deterministic selection. Similarly, the selection of a sub-group or a label (such as VIP label) may be based on random, quazi-random, or deterministic selection. Similarly, the selecting of IP address from the IP addresses list 58 by the DC proxy server 56, may be based on random, quazi-random, or deterministic selection. Similarly, the selection of a sub-group or a label (such as VIP label) may be based on random, quazi-random, or deterministic selection.

Using random selection allows for load balancing, preferably by equally distributing the workload across the elements, which may optimize resource use, maximize throughput, minimize response time, and avoid overload of any single resource. The randomness may be based on using a random signal generator. The random signal generator may be based on a digital random signal generator having a digital output. Alternatively, the random signal generator may be based on analog random signal generator having an analog output. Analog random signal generator may use a digital random signal generator whose output is converted to analog using analog to digital converter, or can use a repetitive analog signal generator (substantially not synchronized to any other timing in the system) whose output is randomly time sampled by a sample and hold. A random signal generator (having either analog or digital output) can be hardware based, using a physical process such as thermal noise, shot noise, nuclear decaying radiation, photoelectric effect or other quantum phenomena, or can be software based, using a processor executing an algorithm for generating pseudo-random numbers which approximates the properties of random numbers.

Any randomness used typically further provides anonymity and untraceability, as well as load-balancing. Randomness is commonly implemented by using random numbers, defined as a sequence of numbers or symbols that lack any pattern and thus appear random, are often generated by a random number generator. Randomness is described, for example, in IETF RFC 1750 *"Randomness Recommendations for Security"* (December 1994), which is incorporated in its entirety for all purposes as if fully set forth herein. A random number generator (having either analog or digital output) can be hardware based, using a physical process such as thermal noise, shot noise, nuclear decaying radiation, photoelectric effect or other quantum phenomena. Alternatively, or in addition, the generation of the random numbers can be software based, using a processor executing an algorithm for generating pseudo-random numbers which approximates the properties of random numbers.

Alternatively or in addition, the selection may be deterministic based. In one example, the elements to select from are listed in an orderly fashion, such as according to a feature, attribute, or a characteristic, using their associated numerical value (e.g., IP address value), according to their alphanumeric identifier (e.g., host name or location name in ASCII value), according to the order that joined the collection or group, or according to the order they were formerly selected from the group or collection. In such a case, the elements are sequentially selected according to the list order. In one example, a LIFO (last in first out) like scheme may be used, where the lastly selected entity is re-selected, and upon its unavailability, the one entity that was selected before the last is selected. Alternatively or in addition, a FIFO (first in first out) like scheme is used, where the oldest formerly selected entity selected.

Any input from a human user herein may use an input component that comprises, or consists of, a piece of computer hardware equipment used to provide data and control signals to an information processing system such as a computer or information appliance. Such input component 18 may be an integrated or a peripheral input device (e.g., hard/soft keyboard, mouse, resistive or capacitive touch display, etc.). Examples of input components include keyboards, mouse, scanners, digital cameras and joysticks. Input component 18 can be categorized based on the modality of input (e.g., mechanical motion, audio, visual, etc.), whether the input is discrete (e.g. pressing of key) or continuous (e.g., a mouse's position, though digitized into a discrete quantity, is fast enough to be considered continuous), the number of degrees of freedom involved (e.g., two-dimensional traditional mice, or three-dimensional navigators designed for CAD applications). Pointing devices (such as 'computer mouse'), which are input components used to specify a position in space, can further be classified according to whether the input is direct or indirect. With direct input, the input space coincides with the display space, i.e., pointing is done in the space where visual feedback or the pointer appears. Touchscreens and light pens involve direct input. Examples involving indirect input include the mouse and trackball, and whether the positional information is absolute (e.g., on a touch screen) or relative (e.g., with a mouse that can be lifted and repositioned). Direct input is almost necessarily absolute, but indirect input may be either absolute or relative. For example, digitizing graphics tablets that do not have an embedded screen involve indirect input and sense absolute positions and are often run in an absolute input mode, but they may also be set up to simulate a relative input mode like that of a touchpad, where the stylus or puck can be lifted and repositioned. Further, the input component 18 may include dedicated hard controls for frequently used/accessed functions (e.g., repeat system message).

A tangible machine-readable medium (such as a storage) may have a set of instructions detailing part (or all) of the methods and steps described herein stored thereon, so that when executed by one or more processors, may cause the one or more processors to perform part of, or all of, the methods and steps described herein. Any of the network elements may be a computing device that comprises a processor and a computer-readable memory (or any other tangible machine-readable medium), and the computer-readable memory may comprise computer-readable instructions such that, when read by the processor, the instructions causes the processor to perform the one or more of the methods or steps described herein.

Any part of, or the whole of, any of the methods described herein may be provided as part of, or used as, an Application Programming Interface (API), defined as an intermediary software serving as the interface allowing the interaction and data sharing between an application software and the application platform, across which few or all services are provided, and commonly used to expose or use a specific software functionality, while protecting the rest of the application. The API may be based on, or according to, Portable Operating System Interface (POSIX) standard, defining the API along with command line shells and utility interfaces for a software compatibility with variants of Unix and other operating systems, such as POSIX.1-2008 that is simultaneously IEEE STD. 1003.1™—2008 entitled: "*Standard for Information Technology—Portable Operating System Interface (POSIX®) Description*", and The Open Group Technical Standard Base Specifications, Issue 7, IEEE STD. 1003.1™, 2013 Edition.

Any server, client, tunnel, or other device herein, such as the SP server 72, the TB server 71, the proxy server 53, the DC proxy server 56, the client device 31*a*, the tunnel device #1 33*a*, the tunnel device #2 33*b*, the tunnel device #3 33*c*, the tunnel device #4 33*d*, the tunnel device #5 33*e*, or any combination thereof, may execute part of, or whole of, any one or more of the JavaScript program modules, subroutines, programs, or functions included in U.S. Provisional Application Ser. No. 62/827,889, which was filed on Apr. 2, 2019, and in U.S. Provisional Application Ser. No. 62/872,926, which was filed on Jul. 11, 2019.

Any device or network element herein may comprise, consist of, or include a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or a non-portable device. Further, any device or network element herein may comprise, consist of, or include a major appliance (white goods) and may be an air conditioner, dishwasher, clothes dryer, drying cabinet, freezer, refrigerator, kitchen stove, water heater, washing machine, trash compactor, microwave oven and induction cooker. The appliance may similarly be a 'small' appliance such as TV set, CD or DVD player, camcorder, still camera, clock, alarm clock, video game console, HiFi or home cinema, telephone or answering machine.

Any system or apparatus herein may further be operative for storing, operating, or using, an operating system. Any system herein may comprise a Virtual Machine (VM) for virtualization, and the operating system may be executed as a guest operating system. Any system herein may further comprise a host computer that implements the VM, and the host computer may be operative for executing a hypervisor or a Virtual Machine Monitor (VMM), and the guest operating system may use or may interface virtual hardware. Any virtualization herein, such as any operating system virtualization, may include, may be based on, or may use, full virtualization, para-virtualization, or hardware assisted virtualization.

The term 'host' or 'network host' is used herein to include, but not limited to, a computer or other device connected to a computer network, such as the Internet. A network host may offer information resources, services, and applications to users or other nodes on the network, and is typically assigned a network layer host address. Computers participating in networks that use the Internet Protocol Suite may also be called IP hosts, and computers participating in the Internet are called Internet hosts, or Internet nodes. Internet hosts and other IP hosts have one or more IP addresses assigned to their network interfaces. The addresses are configured either manually by an administrator, automatically at start-up by means of the Dynamic Host Configuration Protocol (DHCP), or by stateless address autoconfiguration methods. Network hosts that participate in applications that use the client-server model of computing, are classified as server or client systems. Network hosts may also function as nodes in peer-to-peer applications, in which all nodes share and consume resources in an equipotent manner.

The arrangements and methods described herein may be implemented using hardware, software or a combination of both. The term "software integration" or any other reference to the integration of two programs or processes herein, is used herein to include, but not limited to, software components (e.g., programs, modules, functions, processes, etc.) that are (directly or via another component) combined, working or functioning together or form a whole, commonly for sharing a common purpose or set of objectives. Such software integration can take the form of sharing the same program code, exchanging data, being managed by the same manager program, executed by the same processor, stored on the same medium, sharing the same GUI or other user interface, sharing peripheral hardware (such as a monitor, printer, keyboard and memory), sharing data or a database, or being part of a single package. The term "hardware integration" or integration of hardware components is used herein to include, but not limited to, hardware components that are (directly or via another component) combined, working or functioning together or form a whole, commonly for sharing a common purpose or set of objectives. Such hardware integration can take the form of sharing the same power source (or power supply) or sharing other resources, exchanging data or control (e.g., by communicating), being managed by the same manager, physically connected or attached, sharing peripheral hardware connection (such as a monitor, printer, keyboard and memory), being part of a single package or mounted in a single enclosure (or any other physical collocating), sharing a communication port, or used or controlled with the same software or hardware. The term "integration" herein is used herein to include as applicable, but not limited to, a software integration, a hardware integration, or any combination thereof.

Any networking protocol may be utilized for exchanging information between the network elements (e.g., clients, tunnels, peers, servers) within the network (such as the Internet). For example, it is contemplated that communications can be performed using TCP/IP. Generally, HTTP and HTTPS are utilized on top of TCP/IP as the message transport envelope. These two protocols are able to deal with firewall technology better than other message management techniques. However, partners may choose to use a message-queuing system instead of HTTP and HTTPS if greater communications reliability is needed. A non-limiting example of a message queuing system is IBM's MQ-Series or the Microsoft Message Queue (MSMQ). The system described hereinafter is suited for both HTTP/HTTPS, message-queuing systems, and other communications transport protocol technologies. Furthermore, depending on the differing business and technical requirements of the various partners within the network, the physical network may embrace and utilize multiple communication protocol technologies. Any network herein, such as the first network or the second network, may be implemented as a virtualized network as part of a Virtual Machine (VM). Any system herein may comprise a host computer that implement the VM. The host computer may further be operative for executing a hypervisor or a Virtual Machine Monitor (VMM). Any virtualized network herein may use or may interface virtual hardware. Any virtualization herein may include, may be based on, or may use, full virtualization, para-virtualization, or hardware assisted virtualization.

Any step, method, process, or action herein, or any combination thereof, may be performed in real-time. The term 'real-time' herein refers to performing actions fast enough to satisfy timing requirements or constraints or to keep up with other actions (such as external actions), for example without any perceived delay between events as they occur, or operation during the actual time that an external process occurs, such as to obtain computation or other processes results or responses, so that the results or responses can be used (such as to control, monitor, or respond) in a timely manner. For example, the term "real-time" may used to describe a process of sensing, processing, transmitting, acting on, or responding to, information in a time frame which is equal to or shorter than the minimum timescale at which the information is needed.

The term "port" refers to a place of access to a device, electrical circuit or network, where energy or signal may be supplied or withdrawn. The term "interface" of a networked device refers to a physical interface, a logical interface (e.g., a portion of a physical interface or sometimes referred to in the industry as a sub-interface—for example, such as, but not limited to a particular VLAN associated with a network interface), and/or a virtual interface (e.g., traffic grouped together based on some characteristic—for example, such as, but not limited to, a tunnel interface). As used herein, the term "independent" relating to two (or more) elements, processes, or functionalities, refers to a scenario where one does not affect nor preclude the other. For example, independent communication such as over a pair of independent data routes means that communication over one data route does not affect nor preclude the communication over the other data routes.

Some embodiments may be used in conjunction with various devices, network elements, and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a cellular handset, a handheld PDA device, an on-board device, an off-board device, a hybrid device, a vehicular device, a non-vehicular device, a mobile or portable device, a non-mobile or non-portable device, a wireless communication station, a wireless communication device, a wireless Access Point (AP), a wired or wireless router, a wired or wireless modem, a wired or wireless network, a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards and/or future versions and/or derivatives of the above standards, units and/or devices which are part of the above networks, one way and/or two-way radio communication systems, cellular radio-telephone communication systems, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (AMMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device (e.g., BlackBerry, Palm Treo), a Wireless Application Protocol (WAP) device, or the like.

While the communication sessions between the elements herein, such as between servers and clients, are exampled to be over the Internet 113 using Internet Protocol (IP) or TCP/IP, any other communication protocols may be equally used, such as a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards. For example, each of, or all of, the communication path 111*a* between the tunnel device #1 33*a* and the TB server 71, the communication path 111*b* between the tunnel device #2 33*b* and the TB server 71, the communication path 111*c* between the tunnel device #3 33*c* and the TB server 71, the communication path 111*d* between the tunnel device #4 33*d* and the TB server 71, and the communication path 111*e* between the tunnel device #5 33*e* and the TB server 71, may use any one of the protocols associated with a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards. Similarly, each of, or all of, the communication path 121*a* between the client device 31*a* and the SP server 72, the communication path 131*a* between the SP server 72 and the TB server 71, the communication path 131*c* or 131*d* between the tunnel device #4 33*d* and the web server 22*b*, and the communication path 191 or 192 between the SP server 72 and the tunnel device #4 33*d*, may use a Local Area Network (LAN), a Wireless LAN (WLAN), a Metropolitan Area Network (MAN), a Wireless MAN (WMAN), a Wide Area Network (WAN), a Wireless WAN (WWAN), a Personal Area Network (PAN), a Wireless PAN (WPAN), devices and/or networks operating substantially in accordance with existing IEEE 802.11, 802.11a, 802.11b, 802.11g, 802.11k, 802.11n, 802.11r, 802.16, 802.16d, 802.16e, 802.20, 802.21 standards.

As used herein, the terms "program", "programmable", and "computer program" are meant to include any sequence or human or machine cognizable steps which perform a function. Such programs are not inherently related to any particular computer or other apparatus, and may be rendered in virtually any programming language or environment including, for example, C/C++, Fortran, COBOL, PASCAL, assembly language, markup languages (e.g., HTML, SGML, XML, VoXML), and the likes, as well as object-oriented environments such as the Common Object Request Broker Architecture (CORBA), Java™ (including J2ME, Java Beans, etc.) and the likes, as well as in firmware or other implementations. Generally, program modules include routines, programs, objects, components, data structures, etc., that performs particular tasks or implement particular abstract data types. The term "application program" (also referred to as 'application', 'software application', or 'application software') is used herein to include, but not limited to, a computer program designed to perform a specific function directly for a user, or for another application program. Application software is typically a set of one or more programs designed to carry out operations for a specific application. Commonly, an application software is dependent on system software that manages and integrates computer capabilities, but does not directly perform tasks that benefit the user, such as an operating system, to execute. Examples of types of application software may include accounting software, media players, and office suites. Applications may be bundled with the computer and its system software, or may be published separately, and further may be developed and coded as a proprietary, or as an open-source, software. Most applications are designed to help people perform an activity.

The terms "task" and "process" are used generically herein to describe any type of running programs, including, but not limited to a computer process, task, thread, executing application, operating system, user process, device driver, native code, machine or other language, etc., and can be interactive and/or non-interactive, executing locally and/or remotely, executing in foreground and/or background, executing in the user and/or operating system address spaces, a routine of a library and/or standalone application, and is not limited to any particular memory partitioning technique. The steps, connections, and processing of signals and information illustrated in the figures, including, but not limited to any block and flow diagrams and message sequence charts, may typically be performed in the same or in a different serial or parallel ordering and/or by different components and/or processes, threads, etc., and/or over different connections and be combined with other functions in other embodiments, unless this disables the embodiment or a sequence is explicitly or implicitly required (e.g., for a sequence of reading the value, processing the value—the value must be obtained prior to processing it, although some of the associated processing may be performed prior to, concurrently with, and/or after the read operation). Where certain process steps are described in a particular order or where alphabetic and/or alphanumeric labels are used to identify certain steps, the embodiments are not limited to any particular order of carrying out such steps. In particular, the labels are used merely for convenient identification of steps, and are not intended to imply, specify or require a particular order for carrying out such steps. Furthermore, other embodiments may use more or less steps than those discussed herein. They may also be practiced in distributed computing environments where tasks are performed by remote processing devices that are linked through a communications network. In a distributed computing environment, program modules may be located in both local and remote memory storage devices.

The corresponding structures, materials, acts, and equivalents of all means plus function elements in the claims below are intended to include any structure, or material, for performing the function in combination with other claimed elements as specifically claimed. The description of the present invention has been presented for purposes of illustration and description, but is not intended to be exhaustive or limited to the invention in the form disclosed. The present invention should not be considered limited to the particular embodiments described above, but rather should be understood to cover all aspects of the invention as fairly set out in the attached claims. Various modifications, equivalent processes, as well as numerous structures to which the present invention may be applicable, will be readily apparent to those skilled in the art to which the present invention is directed upon review of the present disclosure.

All publications, standards, patents, and patent applications cited in this specification are incorporated herein by reference as if each individual publication, patent, or patent application were specifically and individually indicated to be incorporated by reference and set forth in its entirety herein.

Any of the arrangements or actions described herein (or any part thereof) may be implemented as a system, a method, and/or a computer program product. The computer program product may include a computer readable storage medium (or media) having computer readable program instructions thereon for causing a processor to carry out aspects of the present invention. The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a Random Access Memory (RAM), a Read-Only Memory (ROM), an Erasable Programmable Read-Only Memory (EPROM or Flash memory), a Static Random Access Memory (SRAM), a portable Compact Disc Read-Only Memory (CD-ROM), a Digital Versatile Disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Any computer readable program instructions described herein may be downloaded to respective computing/processing devices from a computer readable storage medium or to an external computer or external storage device via a network, for example, the Internet, a local area network, a wide area network and/or a wireless network. Any network herein may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, Instruction-Set-Architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network mentioned herein. In some embodiments, electronic circuitry including, for example, programmable logic circuitry, Field-Programmable Gate Arrays (FPGA), or Programmable Logic Arrays (PLA) may execute the computer readable program instructions by utilizing state information of the computer readable program instructions to personalize the electronic circuitry, in order to perform aspects of the present invention.

Spatially relative terms, such as “under”, “below”, “lower”, “over”, “upper” and the like, may be used herein for ease of description to describe one element or feature’s relationship to another element(s) or feature(s) as illustrated in the figures. It will be understood that the spatially relative terms are intended to encompass different orientations of a device in use or operation in addition to the orientation depicted in the figures. For example, if a device in the figures is inverted, elements described as “under” or “beneath” other elements or features would then be oriented “over” the other elements or features. Thus, the exemplary term “under” can encompass both an orientation of “over” and “under”. The device may be otherwise oriented (rotated 90 degrees or at other orientations) and the spatially relative descriptors used herein interpreted accordingly. Similarly, the terms “upwardly”, “downwardly”, “vertical”, “horizontal” and the like are used herein for the purpose of explanation only unless specifically indicated otherwise.

Aspects of the various arrangements described herein with reference to flowchart illustrations and/or block diagrams of methods, apparatus (systems), and computer program products according to embodiments of the invention. Further, each block of the flowchart illustrations and/or block diagrams, and combinations of blocks in the flowchart illustrations and/or block diagrams, may be implemented by computer readable program instructions.

Any computer readable program instructions or steps herein may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Any program described herein may be identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The invention claimed is:

1. A method for using a Proxy Auto-Configuration (PAC) file that is managed by a PAC file manager associated with a web browser, the PAC file associates each URL out of a first list of Uniform Resource Locators (URLs) to a respective different first or second fetching scheme, and for use with a second file that associates each URL out of a second list of URLs respectively to the first or second fetching scheme, the method by a client device comprising:

executing the web browser;

identifying a first URL request by the web browser;

checking the first URL for determining whether the first URL is included in the second list;

responsive to determining that the first URL is included in the second list, preventing the first URL request to be received by the PAC file manager;

identifying the fetching scheme associated with the first URL in the second file;

updating the PAC file with the first URL and associating the first URL with the identified fetching scheme in the second file;

enabling the first URL request to be received by the PAC file manager;

receiving, by the PAC file manager, the first URL;

sending, to the web browser, the fetching scheme associated with the first URL in the PAC file; and fetching, by the web browser, the first URL using the fetching scheme associated with the first URL in the PAC file, wherein the first or second fetching scheme is a non-direct fetching scheme that comprises:

sending, by the client device, an HTTP request that is responsive to the URL;

receiving, by the web server, the HTTP request that includes an IP address that is distinct from the IP address of the client device;

sending, by the web server, a web-page or a web-site, in response to the received HTTP request; and receiving, by the client device, the web-page or the web-site, wherein the HTTP request received by the web server does not include the IP address of the client device so that the IP address of the client device is unknown to the web server.

2. The method according to claim 1, further comprising:

responsive to determining that the first URL is not included in the second list, receiving, by the PAC file manager, the first URL;

sending, to the web browser, the fetching scheme associated with the first URL in the PAC file; and fetching, by the web browser, the first URL using the fetching scheme associated with the first URL in the PAC file.

3. The method according to claim 1, wherein the PAC file comprises a JavaScript script function [FindProxyForURL (url, host)].

4. The method according to claim 1, further comprising manually configuring the PAC file.

5. The method according to claim 1, further comprising automatically configuring the PAC file using Web Proxy Autodiscovery Protocol (WPAD).

6. The method according to claim 1, wherein the updating comprises automatically configuring the PAC file using Web Proxy Autodiscovery Protocol (WPAD).

7. The method according to claim 1, wherein the PAC file or the second file is stored in the client device.

8. The method according to claim 1, wherein the PAC file or the second file is stored in a server device.

9. The method according to claim 8, further comprising receiving, by the client device, the PAC file or the second file over the Internet from the server.

10. The method according to claim 1, wherein the first fetching scheme comprises a direct fetching.

11. The method according to claim 10, wherein the second fetching scheme comprises a non-direct fetching.

12. The method according to claim 11, wherein the first fetching scheme comprises fetching using a proxy server, and wherein an identification of the proxy server is associated with the respective URL as part of the PAC file or the second file.

13. The method according to claim 1, wherein the first or second fetching scheme is a direct fetching scheme comprises:

sending, by the client device, an HTTP request that includes an IP address of the client device, that is responsive to the URL to the web server;

receiving, by the web server, the HTTP request from the client device;

sending, by the web server, a web-page or a web-site, in response to the received HTTP request; and receiving, by the client device, the web-page or the web-site, wherein the HTTP request sent by the client device is received unchanged by the web server so that the IP address of the client device is known to the web server.

14. The method according to claim 1, further for use with a first device that serves as an intermediary device, wherein the non-direct fetching scheme comprises:

sending, by the client device, the HTTP request that is responsive to the URL;

sending, by the first device, the HTTP request to the web server;

sending, by the web server to the first device, the web-page or the web-site, in response to the received HTTP request; and receiving, by the client device, the web-page or the web-site.

15. The method according to claim 14, for use with a group of multiple devices that comprises the first device, wherein the method further comprising selecting the first device from the group.

16. The method according to claim 15, wherein the selection is based on, or uses, load balancing.

17. The method according to claim 15, wherein the selection is based on, or uses, random selection.

18. The method according to claim 17, wherein random selection uses, or is based on, one or more random numbers generated by a random number generator.

19. The method according to claim 18, wherein the random number generator is hardware based.

20. The method according to claim 19, wherein the random number generator is using thermal noise, shot noise, nuclear decaying radiation, photoelectric effect, or quantum phenomena.

21. The method according to claim 18, wherein the random number generator is software based, and wherein the random number generator is based on executing an algorithm for generating pseudo-random numbers.

22. The method according to claim 15, wherein the selection is based on, or uses, an estimated geographical location of the client device or of the web server.

23. The method according to claim 22, further comprising estimating the geographical location of the client device or of the web server using geolocation.

24. The method according to claim 23, wherein the geolocation is based on IP geolocation.

25. The method according to claim 23, wherein the geolocation is based on W3C Geolocation Application Programming Interface (API).

26. The method according to claim 22, wherein the first device is selected based on estimated as being in the same area as the client device or the web server.

27. The method according to claim 26, wherein the first device is selected based on estimated as being in the same continent, country, state, region, city, postal/zip code, latitude, longitude, or Timezone as the client device or the web server.

28. The method according to claim 15, wherein the first device is selected based on being a recent one to be selected, or based on being the least recent to be selected.

29. The method according to claim 15, wherein the first device is manually selected by a user.

30. The method according to claim 29, further comprising displaying to the user the multiple devices in the group, and selecting, by the user, the first device from the group.

31. The method according to claim 14, wherein the first device comprises, is part of, or is integrated with, a server device.

32. The method according to claim 31, wherein the server includes, is part of, or is integrated with, a proxy server.

33. The method according to claim 32, wherein the proxy server includes, is part of, or is integrated with, an HTTP proxy server, a web-proxy server, a caching proxy, an open-source caching proxy server, a cloud-based proxy server, an open proxy server, a forwarding proxy server, a reverse proxy server, a transparent proxy server, a non-transparent proxy server, an anonymous proxy server, a translation proxy server, a SOCKS proxy server, a CGI web proxy server, a suffix proxy server, an I2P anonymous proxy server, a DNS proxy server, or any combination thereof.

34. The method according to claim 14, for use with a list of IP addresses, wherein the method further comprising selecting an IP address from the list, and wherein the sending, by the first device, of the HTTP request to the web server includes the selected IP address as the source address.

35. The method according to claim 34, wherein the selected IP address is the IP address of the first device.

36. The method according to claim 34, for use with multiple client devices, each associated with a distinct IP address from the list, and wherein the selected IP address is the IP address of the first device.

37. The method according to claim 34, for use with multiple server devices, each associated with a distinct IP address from the list, and wherein the selected IP address is the IP address of the first device.

38. The method according to claim 34, wherein the selection of the IP address from the list is based on, or uses, load balancing.

39. The method according to claim 38, wherein the selection is based on, or uses, random selection.

40. The method according to claim 39, wherein random selection uses, or is based on, one or more random numbers generated by a random number generator.

41. The method according to claim 40, wherein the random number generator is hardware based.

42. The method according to claim 41, wherein the random number generator is using thermal noise, shot noise, nuclear decaying radiation, photoelectric effect, or quantum phenomena.

43. The method according to claim 40, wherein the random number generator is software based.

44. The method according to claim 43, wherein the random number generator is based on executing an algorithm for generating pseudo-random numbers.

45. The method according to claim 34, wherein the selection is based on, or uses, an estimated geographical location of the client device or of the web server.

46. The method according to claim 45, further comprising estimating the geographical location of the client device or of the web server using geolocation.

47. The method according to claim 46, wherein the geolocation is based on IP geolocation.

48. The method according to claim 47, wherein the geolocation is based on W3C Geolocation Application Programming Interface (API).

49. The method according to claim 34, wherein the IP address is selected based on estimated as being in the same area as the client device or the web server.

50. The method according to claim 49, wherein the IP address is selected based on estimated as being in the same continent, country, state, region, city, postal/zip code, latitude, longitude, or Timezone as the client device or the web server.

51. The method according to claim 34, wherein the IP address is selected based on being the recent one to be selected, or based on being the least recent to be selected.

52. The method according to claim 34, wherein the IP address is manually selected by the user.

53. The method according to claim 52, further comprising displaying to the user the list of IP addresses, and selecting, by the user, the selected IP address from the list.

54. The method according to claim 34, further for use with a virtualization, wherein the first device comprises, is part of, or is integrated with, a server device that virtualize a client device addressed by the selected IP address.

55. The method according to claim 54, wherein the client device virtualization executed as part of a Virtual Machine (VM).

56. The method according to claim 55, for use with an host computer that implement the VM, wherein the method further comprising executing, by the host computer, a hypervisor or a Virtual Machine Monitor (VMM).

57. The method according to claim 55, wherein the virtualization includes, is based on, or uses, full virtualization, para-virtualization, or hardware assisted virtualization.

58. The method according to claim 1, further comprising storing, operating, or using, by the client device, a client operating system.

59. The method according to claim 58, wherein the client operating system comprises one out of Microsoft Windows 7, Microsoft Windows XP, Microsoft Windows 8, Microsoft Windows 8.1, Linux, and Google Chrome OS.

60. The method according to claim 58, wherein the client operating system is a Real-Time Operating System (RTOS).

61. The method according to claim 60, wherein the RTOS comprises FreeRTOS, SafeRTOS, QNX, VxWorks, or Micro-Controller Operating Systems (μC/OS).

62. The method according to claim 1, further comprising storing, operating, or using, by the client device, the web browser.

63. The method according to claim 62, wherein the web browser comprises of, or is based on, Microsoft Internet Explorer, Google Chrome, Opera™, or Mozilla Firefox®.

64. The method according to claim 62, wherein the web browser is a mobile web browser.

65. The method according to claim 64, wherein the mobile web browser comprises of, or is based on, Safari, Opera Mini™, or Android web browser.

66. The method according to claim 1, wherein the client device comprises a wearable device that is wearable on a person.

67. The method according to claim 66, wherein the wearable device is wearable on an organ of the person head.

68. The method according to claim 66, wherein the organ is an eye, ear, face, cheek, nose, mouth, lip, forehead, or chin.

69. The method according to claim 66, wherein the wearable device is constructed to have a form substantially similar to, is constructed to have a shape allowing mounting or wearing identical or similar to, or is constructed to have a form to at least in part substitute for, headwear, eyewear, or earpiece.

70. The method according to claim 69, wherein the headwear comprises a bonnet, a cap, a crown, a fillet, a hair cover, a hat, a helmet, a hood, a mask, a turban, a veil, or a wig.

71. The method according to claim 69, wherein the eyewear comprises glasses, sunglasses, a contact lens, a blindfold, or a goggle.

72. The method according to claim 69, wherein the earpiece comprises a hearing aid, a headphone, a headset, or an earplug.

73. The method according to claim 66, wherein the wearable device is shaped for permanently or releasably being attachable to, or be part of, a clothing piece of a person.

74. The method according to claim 1, wherein the attaching uses taping, gluing, pinning, enclosing, encapsulating, a pin, or a latch and hook clip.

75. The method according to claim 74, wherein the clothing piece is a top, bottom, or full-body underwear, or a headwear, a footwear, an accessory, an outwear, a suit, a dress, a skirt, or a top.

76. The method according to claim 66, wherein the wearable device further comprises an annular member defining an aperture therethrough that is sized for receipt therein of a part of a human body.

77. The method according to claim 1, wherein at least one of the steps is performed integrated with the web browser in a form of a plug-in or an extension.

78. The method according to claim 77, wherein at least one of the steps performed by the client device is integrated with the web browser in a form of a plug-in or an extension.

79. The method according to claim 77, wherein the identifying of the first URL request uses a plug-in or an extension to the web browser.

80. The method according to claim 77, wherein the integration is by hooking to the web browser, wherein the integration is in a filter driver form, or, wherein the web browser and the steps are communicating using an Inter-Process Communication (IPC).

81. The method according to claim 80, wherein the identifying of the first URL request uses hooking to the web browser, a filter driver form, or using an Inter-Process Communication (IPC).

82. The method according to claim 80, wherein the IPC is using a file sharing, a signal, a socket, a pipe, a message queue, a shared memory, a semaphore, or memory mapped file.

83. The method according to claim 80, wherein the IPC is using a clipboard, a Component Object Model (COM), a data copy, a DDE protocol, or mailslots.

84. The method according to claim 1, wherein the client device, is integrated in part, or entirely, in an appliance.

85. The method according to claim 84, wherein a primary functionality of the appliance is associated with food storage, handling, or preparation.

86. The method according to claim 85, wherein a primary function of the appliance is heating food, and wherein the appliance is a microwave oven, an electric mixer, a stove, an oven, or an induction cooker.

87. The method according to claim 85, wherein the appliance is a refrigerator, a freezer, a food processor, a dishwasher, a food blender, a beverage maker, a coffee-maker, or an iced-tea maker.

88. The method according to claim 84, wherein a primary function of the appliance is associated with environmental control, and the appliance consists of, or is part of, an HVAC system.

89. The method according to claim 88, wherein a primary function of the appliance is associated with temperature control, and wherein the appliance is an air conditioner or a heater.

90. The method according to claim 84, wherein a primary function of the appliance is associated with cleaning, wherein the primary function is associated with clothes cleaning, and the appliance is a washing machine or a clothes dryer, or wherein the appliance is a vacuum cleaner.

91. The method according to claim 84, wherein a primary function of the appliance is associated with water control or water heating.

92. The method according to claim 84, wherein the appliance is an answering machine, a telephone set, a home cinema method, a HiFi method, a CD or DVD player, an electric furnace, a trash compactor, a smoke detector, a light fixture, or a dehumidifier.

93. The method according to claim 84, wherein the appliance is a battery-operated portable electronic device, and the appliance is a notebook, a laptop computer, a media player, a cellular phone, a Personal Digital Assistant (PDA), an image processing device, a digital camera, a video recorder, or a handheld computing device.

94. The method according to claim 84, wherein the integration involves sharing a component.

95. The method according to claim 94, wherein the integration involves housing in same enclosure, sharing same processor, or mounting onto same surface.

96. The method according to claim 94, wherein the integration involves sharing a same connector.

97. The method according to claim 96, wherein the connector is a power connector for connecting to a power source, and wherein the integration involves sharing the same connector for being powered from same power source, or wherein the integration involves sharing same power supply.

98. The method according to claim 1, wherein the client device is housed in a single enclosure that is a hand-held enclosure or a portable enclosure.

99. The method according to claim 98, wherein the client device is further integrated with at least one of a notebook computer, a laptop computer, a media player, a Digital Still Camera (DSC), a Digital video Camera (DVC or digital camcorder), a Personal Digital Assistant (PDA), a cellular telephone, a digital camera, a video recorder, or a smartphone.

100. The method according to claim 99, wherein the smartphone comprises, or is based on, an Apple iPhone 6 or a Samsung Galaxy S6.

101. The method according to claim 1, further comprising storing, operating, or using an operating system, by the client device.

102. The method according to claim 101, wherein the operating system is a mobile operating system.

103. The method according to claim 102, wherein the mobile operating system comprises Android version 2.2 (Froyo), Android version 2.3 (Gingerbread), Android version 4.0 (Ice Cream Sandwich), Android Version 4.2 (Jelly Bean), Android version 4.4 (KitKat), Apple iOS version 3, Apple iOS version 4, Apple iOS version 5, Apple iOS version 6, Apple iOS version 7, Microsoft Windows® Phone version 7, Microsoft Windows® Phone version 8, Microsoft Windows® Phone version 9, or Blackberry® operating system.

104. The method according to claim 1, wherein the URL identifies a web-page, a web-site, or a part thereof.

105. A non-transitory computer readable medium containing computer instructions that, when executed by a computer processor, cause the processor to perform all of the steps of claim 1.

106. The method according to claim 1, wherein at least part of steps of claim 1 are included in a Software Development Kit (SDK) that is provided as a non-transitory computer readable medium containing computer instructions, and wherein the method further comprising installing the SDK.

* * * * *